US012381769B2

United States Patent
Madadi et al.

(10) Patent No.: US 12,381,769 B2
(45) Date of Patent: Aug. 5, 2025

(54) AI/ML EMPOWERED HIGH ORDER MODULATION

(71) Applicant: Samsung Electronics Co., Ltd., Suwon-si (KR)

(72) Inventors: Pranav Madadi, Sunnyvale, CA (US); Joonyoung Cho, Portland, OR (US); Jianzhong Zhang, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 143 days.

(21) Appl. No.: 18/456,249

(22) Filed: Aug. 25, 2023

(65) Prior Publication Data

US 2024/0187295 A1    Jun. 6, 2024

Related U.S. Application Data

(60) Provisional application No. 63/417,577, filed on Oct. 19, 2022.

(51) Int. Cl.
*H04L 27/26* (2006.01)
(52) U.S. Cl.
CPC ...... *H04L 27/2639* (2013.01); *H04L 27/2695* (2013.01)
(58) Field of Classification Search
CPC ............. H04L 27/2639; H04L 27/2695; H04L 1/0003; H04L 1/0042; H04L 1/0015; G06N 3/045; G06N 3/0455
USPC ................................................ 375/260, 262
See application file for complete search history.

(56) References Cited

U.S. PATENT DOCUMENTS

| | | | |
|---|---|---|---|
| 11,411,796 B1 | 8/2022 | Gulati et al. | |
| 11,864,007 B2* | 1/2024 | Barsoum | H04L 27/3483 |
| 2011/0090948 A1 | 4/2011 | Zhou et al. | |
| 2013/0170571 A1* | 7/2013 | Barsoum | H04L 27/3405 375/285 |
| 2016/0006515 A1* | 1/2016 | Kojima | H04B 10/508 398/193 |
| 2020/0228234 A1 | 7/2020 | Handte et al. | |
| 2020/0396115 A1 | 12/2020 | Wong et al. | |
| 2021/0184910 A1 | 6/2021 | Stadelmeier et al. | |
| 2021/0218607 A1 | 7/2021 | Ait Aoudia et al. | |
| 2021/0392669 A1* | 12/2021 | Manne | H04W 72/0446 |
| 2022/0045894 A1 | 2/2022 | Loghin et al. | |

(Continued)

OTHER PUBLICATIONS

Cammerer, S., et al., "Trainable Communication Systems: Concepts and Prototype", arXiv:1911.13055v2 [cs.IT], Jun. 5, 2020, 14 pages.

(Continued)

*Primary Examiner* — Emmanuel Bayard

(57) ABSTRACT

A two-dimensional constellation for data signals having improved bitwise mutual information of data points is based on a signal-to-noise ratio (SNR) and a code rate where, based on the SNR, data bits are mapped to pre-defined in-phase and quadrature values. The in-phase and quadrature values denote points in the two-dimensional space such that the efficiency of bitwise mutual information is adapted based on the SNR. The mapping is preferably subject to a constraint selected from one of quadrant symmetry Lagrangian (QSL), quadrant symmetry constraint (QSC), or rectangular structure constraint (RSC).

18 Claims, 10 Drawing Sheets

(56) References Cited

U.S. PATENT DOCUMENTS

2022/0116137 A1    4/2022 Ouchi

OTHER PUBLICATIONS

International Search Report and Written Opinion issued Jan. 23, 2024 regarding International Application No. PCT/KR2023/016139, 10 pages.
Extended European Search Report issued Mar. 4, 2024 regarding Application No. 23204577.3, 14 pages.
Maher et al., "Increasing the information rates of optical communications via coded modulation: a study of transceiver performance", Scientific Reports, Feb. 2016; 6: 21278, 10 pages.
Baptista et al., "A self-organizing map and a normalizing multi-layer perceptron approach to baselining in prognostics under dynamic regimes", Neurocomputing, vol. 456, Oct. 2021, pp. 268-287.
Han et al., "Two-Dimensional Transmission of Four-Dimensional LDPC-Coded Modulation with Slepian Sequences for DSP-Free 40 km Metro Network Applications", vol. 22, No. 5, Feb. 2022, 9 pages.
Cammerer et al., "Trainable Communication Systems: Concepts and Prototype", Transactions on Communications, vol. 68, No. 9, Jun. 2020, pp. 5489-5503.

\* cited by examiner

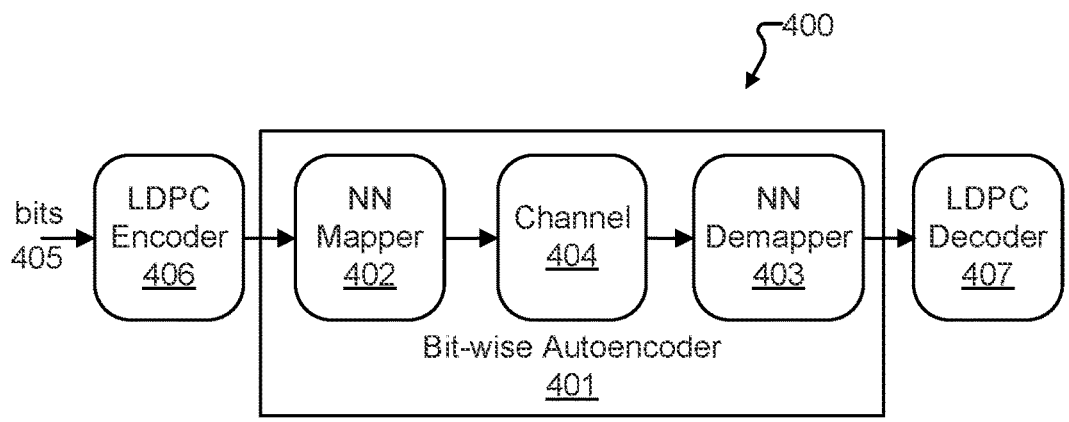
FIG. 4
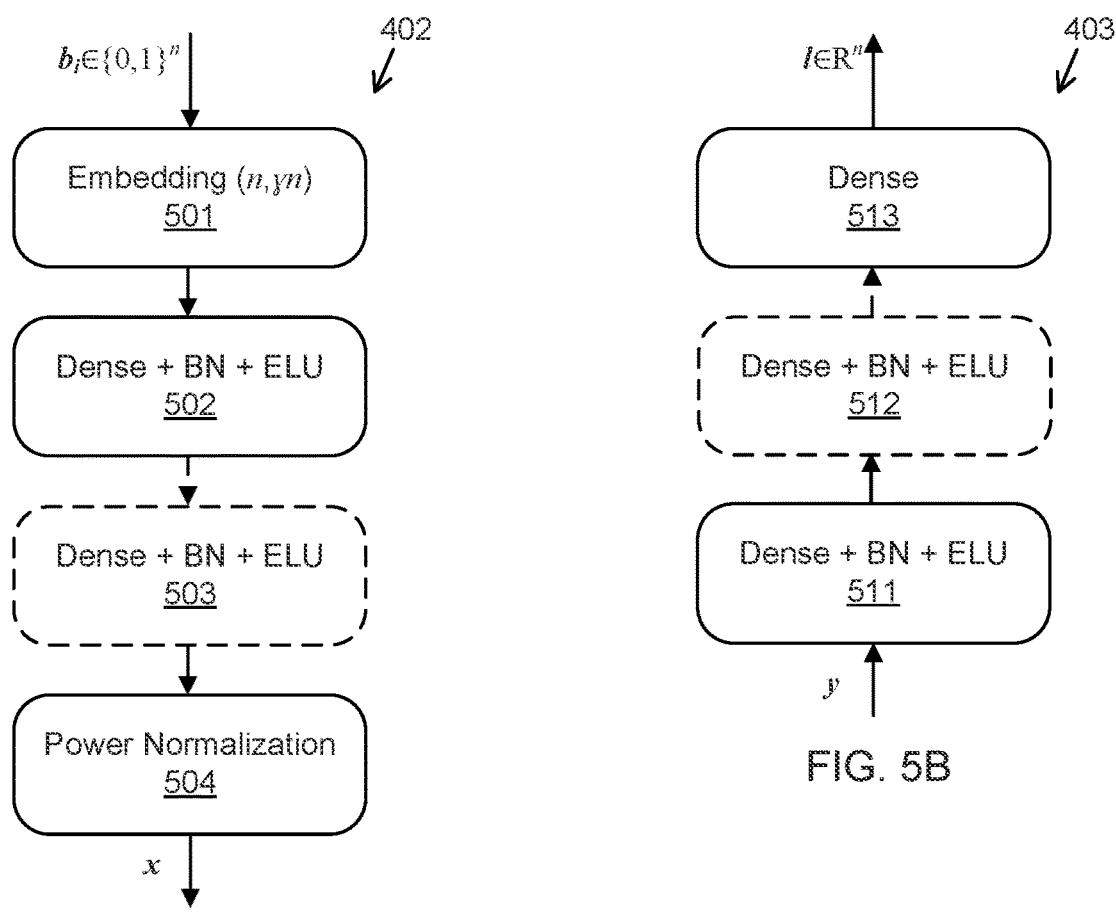
FIG. 5A
FIG. 5B

AI/ML EMPOWERED HIGH ORDER MODULATION

CROSS-REFERENCE TO RELATED APPLICATION AND CLAIM OF PRIORITY

This application claims priority under 35 U.S.C. § 119(e) to U.S. Provisional Patent Application No. 63/417,577 filed Oct. 19, 2022. The content of the above-identified patent document(s) is incorporated herein by reference.

TECHNICAL FIELD

The present disclosure relates generally to determining two-dimensional constellations for data signals and, more specifically, to improving bitwise mutual information of data points for such constellations.

BACKGROUND

To meet the demand for wireless data traffic having increased since deployment of 4G communication systems and to enable various vertical applications, 6G/5G/NR communication systems have been developed and are currently being deployed. The 6G/5G/NR communication system is considered to be implemented in higher frequency (mm-Wave) bands, e.g., 28 giga-Hertz (GHz) or 60 GHz bands, so as to accomplish higher data rates or in lower frequency bands, such as 6 GHz, to enable robust coverage and mobility support. To decrease propagation loss of the radio waves and increase the transmission distance, the beam-forming, massive multiple-input multiple-output (MIMO), full dimensional MIMO (FD-MIMO), array antenna, an analog beam forming, large scale antenna techniques are discussed in 5G/NR communication systems.

In addition, in 6G/5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 6G and 5G systems and frequency bands associated therewith is for reference as certain embodiments of the present disclosure may be implemented in 6G/5G systems. However, the present disclosure is not limited to 6G/5G systems or the frequency bands associated therewith, and embodiments of the present disclosure may be utilized in connection with any frequency band. For example, aspects of the present disclosure may also be applied to deployment of 6G/5G communication systems, 6G or even later releases which may use terahertz (THz) bands.

SUMMARY

A two-dimensional constellation for data signals having improved bitwise mutual information of data points is based on a signal-to-noise ratio (SNR) and a code rate where, based on the SNR, data bits are mapped to pre-defined in-phase and quadrature values. The in-phase and quadrature values denote points in the two-dimensional space such that the efficiency of bitwise mutual information is adapted based on the SNR. The mapping is preferably subject to a constraint selected from one of quadrant symmetry Lagrangian (QSL), quadrant symmetry constraint (QSC), or rectangular structure constraint (RSC). The mapping may be according to one of TABLE 6, TABLE 7, TABLE 8, or TABLE 8 herein.

In a first embodiment, a method includes receiving configuration information including a signal-to-noise ratio (SNR) and a code rate, and mapping, based on the SNR, data bits to pre-defined in-phase and quadrature values. The in-phase and quadrature values denote points on a 2D space such that bitwise mutual information is maximized.

In a second embodiment, an apparatus includes a transceiver configured to receive configuration information including a signal-to-noise ratio (SNR) and a code rate. The apparatus also includes a controller configured to map, based on the SNR, data bits to pre-defined in-phase and quadrature values. The in-phase and quadrature values denote points on a two-dimensional (2D) space such that optimality of bitwise mutual information is adapted based on the SNR.

In a third embodiment, a method includes determining configuration information including a signal-to-noise ratio (SNR) and a code rate for use in mapping, based on the SNR, data bits to pre-defined in-phase and quadrature values. The method also includes transmitting the configuration information. The in-phase and quadrature values denote points on a two-dimensional (2D) space such that optimality of bitwise mutual information is adapted based on the SNR.

In any of the preceding embodiments, the mapping may be subject to a constraint selected from one of QSL, QSC, or RSC.

In the preceding embodiment, the mapping may be according to one of TABLE 6, TABLE 7, TABLE 8, or TABLE 9 herein.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. Likewise, the term "set" means one or more. Accordingly, a set of items can be a single item or a collection of two or more items.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIG. 4 illustrates a high level diagram of an overall setup for AI/ML empowered high order modulation according to various embodiments of this disclosure;

FIGS. 5A and 5B illustrate high level diagrams of the encoder and decoder, respectively, for a bitwise autoencoder architecture for AI/ML empowered high order modulation according to various embodiments of this disclosure;

DETAILED DESCRIPTION

Figure 1:
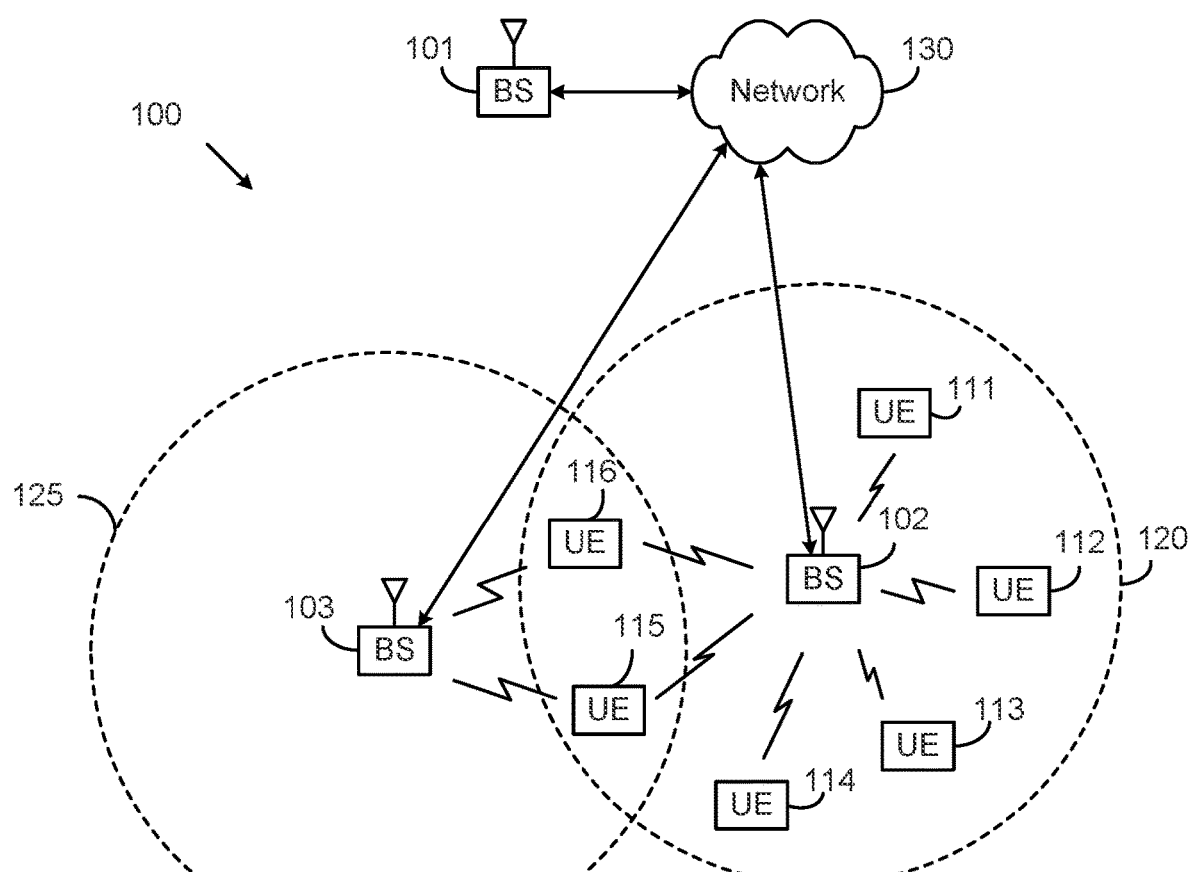
FIG. 1 illustrates an exemplary networked system utilizing AI/ML empowered high order modulation in a cellular system according to various embodiments of this disclosure.

The figures included herein, and the various embodiments used to describe the principles of the present disclosure are by way of illustration only and should not be construed in any way to limit the scope of the disclosure. Further, those skilled in the art will understand that the principles of the present disclosure may be implemented in any suitably arranged wireless communication system.

REFERENCES

[1] Cammerer, Sebastian, et al. "Trainable communication systems: Concepts and prototype." IEEE Transactions on Communications 68.9 (2020): 5489-5503.

The above-identified reference(s) are incorporated herein by reference.

The design of optimum modulation schemes guarantees effective use of spectrum with increased capacity. The square quadrature amplitude modulation (QAM) schemes of 16/64/256/1024 modulation orders have been widely adopted in various communication standards, but fundamentally exhibit a shaping loss of up to 1.53 decibels (dB) loss with respect to the Shannon capacity bound, in terms of the required signal to noise ratio (SNR) for a target date rate. Channel capacity is shown to be approached by equiprobable constellation symbols with geometrical Gaussian-like signal shaping. Thus, there are significant gains to be achieved with designing an optimum modulation scheme.

This disclosure pertains to the design of artificial intelligence (AI)/machine learning (ML) empowered modulation schemes, i.e., non-uniform constellations and bit-to-symbol mapping, for different modulation orders (64/256/1024) under various SNR conditions.

Designing of modulation schemes is essentially an optimization problem under certain constraints. The bit-wise mutual information is the achievable rate for bit-metric decoding (BMD) at receiver for bit-interleaved coded modulation (BICM) systems. Maximizing BICM capacity is equivalent to maximizing the bit-wise mutual information (BMI)—that is, the loss function binary cross entropy (BCE) is closely related to BMI, which is the achievable rate in BICM systems with bot-metric decoding (BCD) at the receiver. Thus, designing the modulation scheme is an optimization problem under constraints imposed due to power constraints.

Various conventional optimization techniques can be used for the above problem, but their complexity increases with increase in number of parameters, which is the case in higher order modulation. Thus, AI/ML is employed as optimization tool to design optimal modulation schemes for higher order modulation. Training the model for convergence to clean constellations is very challenging, especially for higher order modulations. To help with convergence, and to also obtain cleaner constellations with desirable properties, three different architectures for modulation optimization are proposed: quadrant symmetry Lagrangian (QSL); quadrant symmetry constraint (QSC); and rectangular structure constraint (RSC).

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Figure 2:
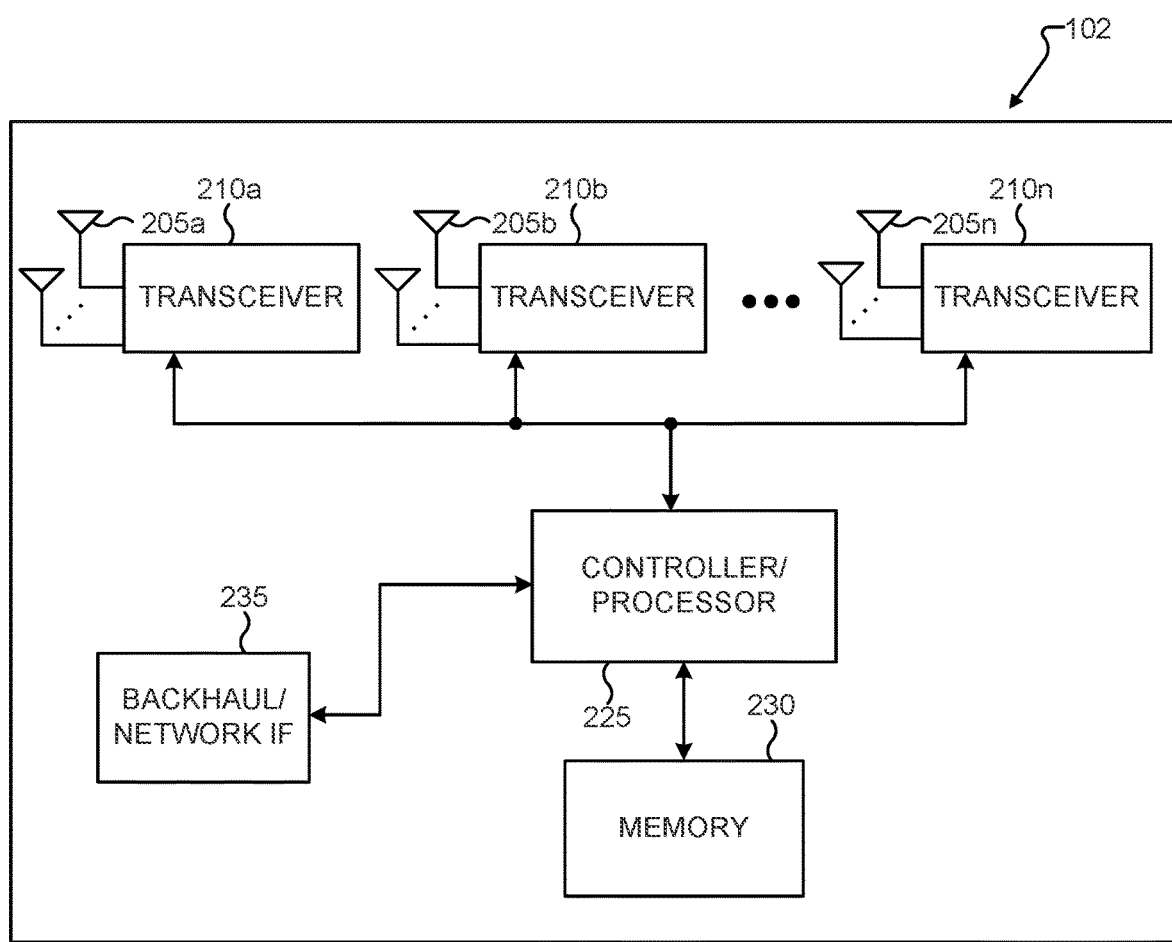
FIG. 2 illustrates an exemplary base station (BS) utilizing AI/ML empowered high order modulation according to various embodiments of this disclosure.
Figure 3:
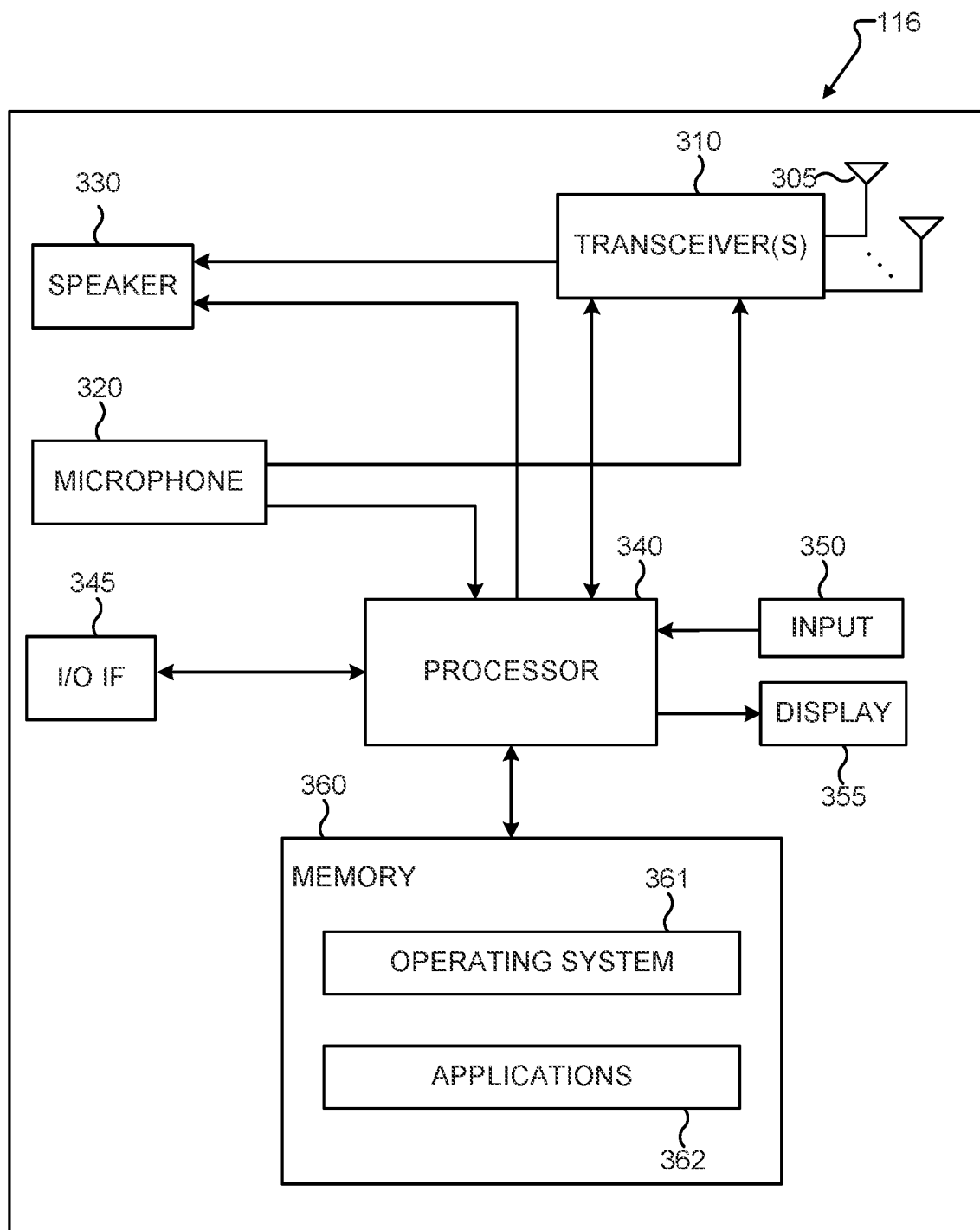
FIG. 3 illustrates an exemplary electronic device for communicating in the networked computing system utilizing AI/ML empowered high order modulation according to various embodiments of this disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an exemplary networked system utilizing AI/ML empowered high order modulation in a cellular system according to various embodiments of this disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an exemplary base station (BS) utilizing AI/ML empowered high order modulation according to various embodiments of this disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an exemplary electronic device for communicating in the networked computing system utilizing AI/ML empowered high order modulation according to various embodiments of this disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs).

In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

FIG. 4 illustrates a high level diagram of an overall setup for AI/ML empowered high order modulation according to various embodiments of this disclosure. The embodiment of FIG. 4 is for illustration only. Other embodiments of the system 400 could be used without departing from the scope of this disclosure.

FIG. 4 illustrates the overall setup of an end-to-end system 400 with a bit-wise autoencoder 401 ML framework for a neural network (NN)-mapper 402 and a NN-demapper 403, with a signal transmission channel 404 in between. Bits 405 are received by a low density parity check (LDPC) encoder 406, the output of which is passed to bit-wise autoencoder 401. The output of bit-wise autoencoder 401 is received by a LDPC decoder 407.

Let n be the number of binary bits 405 used per channel then bit vectors b∈ $\{0,1\}^n$ are considered as inputs, which are mapped to a complex symbol x∈ $\mathbb{C}$ by the NN-mapper 402. The NN-mapper 402 can be a mapping function $f\theta$:{0, 1}$^m$→$\mathbb{C}$, with trainable parameters $\Theta_1$ and where m is a value ≥n. For example, in case of modulations with modulation symbol alphabet size 256 (so called "256-ary" modulation), n becomes 8 and a bit vector consisting of 8 binary bits are mapped to a modulation symbol.

The complex symbol is then sent over the channel, for example, additive white Gaussian noise (AWGN) static channel and at the receiver, the received symbol y∈ $\mathbb{C}$ can be mapped to a real vector comprising the log likelihood ratios (LLRs) by the NN-demapper 403, i.e., $g_\theta$: $\mathbb{C}$ →l, where l∈ $\mathbb{R}^n$ resent the LLRs and $\Theta_2$ are the trainable parameters. The LLRs can indicate how likely the respective bits composing the received modulation symbol is either 0 or 1.

FIGS. 5A and 5B illustrate high level diagrams of the encoder and decoder, respectively, for a bitwise autoencoder architecture for AI/ML empowered high order modulation according to various embodiments of this disclosure. The embodiment of FIGS. 5A and 5B is for illustration only. Other embodiments of the encoder 500 and decoder 510 could be used without departing from the scope of this disclosure.

FIGS. 5A and 5B are exemplary embodiments of the neural network architecture for NN-mapper 402 and NN-demapper 403 illustrated in FIG. 4. An embodiment of the NN-mapper 402 consists of an embedding layer 501, followed by a series 502. 503 of dense layers with varied input/output dimensions specific to the modulation order. In the embodiment, every dense layer is followed by batch normalization (BN) and exponential linear unit (ELU) activation layer, where ELU activation function is given as $$ELU(z) = \begin{cases} z, & z > 0 \\ \alpha(e^z - 1), & z \le 0 \end{cases}$$

In the embodiment, the output of the last dense layer 503 of the NN-mapper 402 is a two-dimensional real vector corresponding to in-phase and quadrature phase values of the complex baseband symbol. The final layer 504 of the NN-mapper 402 is a power normalization layer that ensures $\mathbb{E}_x[|x|^2]=1$.

The NN-demapper 403 also consists of a series 511, 512, 513 of dense layers with different input/output dimensions followed by (for 511 and 512 batch normalization and ELU activation layers. The final output of the NN-demapper 403 is the n-dimensional real vector l∈ $\mathbb{R}^n$, i.e., n logits (one logit per bit). Probabilities over n bits can be calculated by applying the sigmoid function, $$\sigma(z) = \frac{1}{1+e^{-z}},$$

elementally to the corresponding logits. Logits can correspond to LLRs since the inverse of sigmoid function is the log-likelihood ratio, thus the output of the NN-demapper 403 can be considered as LLRs.

In [1], it is shown that bit-wise mutual information that is the achievable rate in bit-metric decoding (BMD) receivers is inversely related to the BCE, i.e., minimizing the BCE maximizes the achievable rate. BCE with logits $BCE_{logits}$ ($\Theta_1$, $\Theta_2$) that combines the sigmoid function and binary cross entropy can be considered as a part of loss function. Let $B_n$ represent all $2^n$ bit vectors of length n, then the BCE can be estimated as follows:

$$BCE_{logits}(\Theta_1, \Theta_2) \sim -\frac{1}{|B_n|} \sum_{b \in B_n} \sum_{j=1}^{n} b_j \log[\sigma(l_j)] + (1 - b_j) \log[1 - \sigma(l_j)],$$

where $l_j$, $b_j$ corresponds to the $j^{th}$ element l, b vectors, respectively, and σ(·) Is the sigmoid function.

Well performing modulations tend to have symmetries among the constellation points from four different quadrants comprising the 2-D constellation space, and in an exemplary embodiment, a loss function QS($\Theta_1$) given below to reflect the quadrant symmetry is incorporated as a part of the loss function:

$$QS(\Theta_1) = 1 - \exp\left[-\frac{\Sigma_{\square}(x^{(r)})^2 + (x^{(i)})^2}{2\eta}\right],$$

where x=($x^{(r)}$, $x^{(i)}$)∈ $\mathbb{C}$ represent the in-phase and quadrature phase values of the constellation point, i.e., $\mathbb{C}$ the real and imaginary parts of the complex symbol x, and η is the Gaussian variance.

The set $B_n$ represents all possible $2^n$ bit vectors, that corresponds to $2^n$ complex symbols x, i.e., the constellation points. In an exemplary embodiment, these points are made to be quadrant symmetric, by minimizing the sum of squares of real and imaginary values by using the above function.

The loss function for end-to-end training can be an additive sum of the BCE and the quadrant symmetry loss term QS($\Theta_1$) scaled with a Lagrangian constant λ as shown below:

$$L(\Theta_1,\Theta_2)=BCE_{logits}(\Theta_1,\Theta_2)+\lambda QS(\Theta_1),$$

which is referred to as quadrant symmetry-Lagrangian (QSL) method in this embodiment.

Training can be done using Adam Optimizer with stepwise decreasing learning rates at different SNR values. In one embodiment the auto encoder is trained at two different training SNR values, one lower and one higher each can correspond to relatively a higher code rate and lower code rate scenarios. The resulting two different constellations for modulation orders of 64/256/1024 are evaluated using LDPC encoder and decoder and comparing the resulting coded bit-error-rate (BER) with baseline models of uniform constellations and non-uniform broadcasting constellations from Advanced Television Systems Committee (ATSC) and Digital Video Broadcasting (DVB) standards.

Modulation Schemes for 64 Modulation Order

An embodiment of the neural network architecture and parameters for 64 modulations are as in TABLE 1.

For 64 modulation order, in an exemplary embodiment the autoencoder is trained at a training SNR of 9 dB and 16 dB ratio of symbol energy to noise power spectral density (Es/N0) for code rates of ⅓ and ¹¹⁄₁₅ respectively. The parameters of an embodiment of the encoder and decoder layers are shown in TABLE 1.

TABLE 1

Detailed Neural Network parameters for 64-ary constellations

| | |
|---|---|
| BATCH SIZE | 128 |
| TOTAL NO. OF EPOCHS | 30 |
| NO. OF STEPS | 5000 |
| EPOCH MILESTONES | [5, 10, 20] |
| LEARNING RATES | [4e-4, 4e-5, 1e-5] |
| λ | [0.001, 0.001, 0.05] |
| η | [1000, 1000, 300] |
| ENCODER (LAYER, OUTPUT DIM) | Embedding (128) |
| | Dense (128) |
| | Dense (64) |
| | Dense (32) |
| | Dense (2) |
| DECODER (LAYER, OUTPUT DIM) | Dense (32) |
| | Dense (64) |
| | Dense (64) |
| | Dense (6) |

The encoder has an embedding layer with output dimension of 128 followed by 4 dense layers with decreasing output dimensions, and the decoder has 4 dense layers, each of the dense layers is followed by batch normalization and an ELU activation layer as mentioned before.

The training can be done by focusing more or less on reducing one or both of the BCE term and quadrant symmetric (QS) terms. In an exemplary embodiment, the training is focused on reducing the BCE loss term, by starting with lower values for λ=0.001, the Lagrangian constant for the QS loss term and higher values for variance η=1000 and changing those values after few epochs. For example, λ, η may be updated to $5 \times 10^{-2}$ and 300, respectively, after 20 epochs.

In an exemplary embodiment, training is done for 30 epochs with 5000 steps per epoch for a batch size of 128 for a starting learning rate of $4 \times 10^{-3}$ that decreases by a factor of 0.01 after every 5 epochs.

64-Ary Constellation for Lower Code Rate

Figure 6:
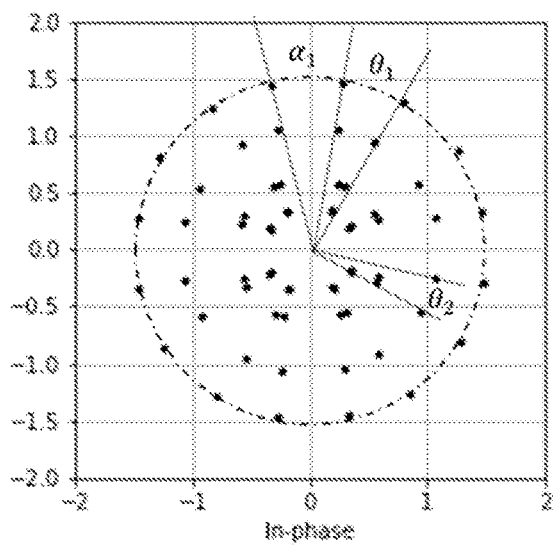
FIG. 6 illustrates an example 64-ary constellation for lower code rates of $1/3$.

For relatively low code rates, which can be useful in low SNR scenarios, an embodiment of the 64-constellation in FIG. 6 is close to circular in shape, with 16 constellation points placed on each of the four concentric circular shapes of different radii. The shape may not be perfectly circular, however, but instead may be nearly optimal for the loss function at the trained SNR. The distance between two concentric circular shapes may not be same, $r_{12}$, $r_{23}$, and $r_{34}$ may all different values, where $r_{ij}$ denotes the distance between $i^{th}$, $j^{th}$ concentric circular shapes.

On each of the circular shapes, 16 points are placed in 8 pairs with angular separation between two points in a pair being $\theta_i$ and angular separation between two pairs being $\alpha_i$ as illustrated in FIG. 6, where $\theta_i$ and $\alpha_i$ correspond to angular separations on $i^{th}$ circular shape with $1^{st}$ circular shape being the outermost one.

The angular separation between points in a pair is smaller than angular separation between pairs, i.e., $\theta_i < \alpha_i$, $\forall i \in \{1,2,3,4\}$. Depending on the target SNR of the modulation, e.g., as the target SNR increases, $\theta_i$ and $\alpha_i$ can become the same, that is, the angular separation between the neighboring constellation points on a circular shape of a radius becomes equal.

The angular separation between the two points in a pair, $\theta_1$, is higher for outer shapes and lower for inner shapes, i.e., $\theta_1 > \theta_2 > \theta_3 > \theta_4$, as illustrated in FIG. 6. Thus, each pair of the points on the inner most circular shape come very close to each other.

Any angular rotation of the constellations around the center presented in this disclosure results in an equivalent constellation and leads to the same or similar effects.

64-Ary Constellation Description for Higher Code Rate

Figure 7:
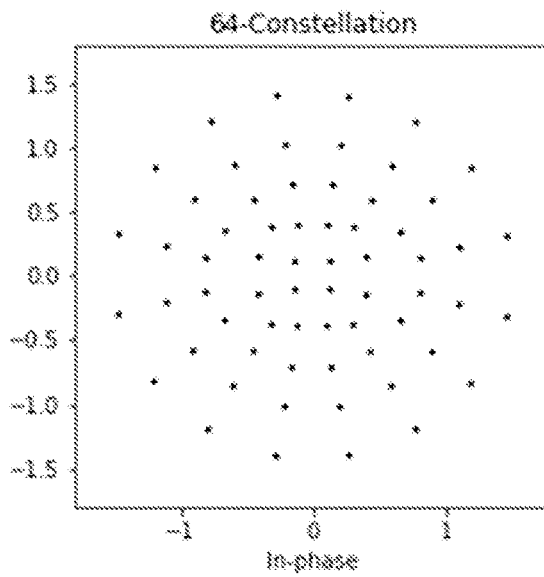
FIG. 7 illustrates an example 64-ary constellation for a higher code rate of $11/15$.

For higher code rates, which can be useful in high SNR scenarios, an embodiment of the 64-constellations in FIG. 7 is almost circular in shape for the outer three concentric shapes, with 16 points almost equally placed on each of the two outermost concentric circles of different radii and another set of 16 points placed on a third concentric shape which seems in between circle and ellipse. The remaining 16 points are placed on two inner shapes which seems to be close to quadrilateral, with 12 points on the outer shape and 4 on the inner one.

Coded BER Performance

In an exemplary embodiment, the NN-mapper and NN-demapper were trained at two different training SNR values, each resulting in an optimal constellation for a lower and higher code rate. The coded-BER of the modulations were evaluated for code block size of 2400 bits.

Figure 8:
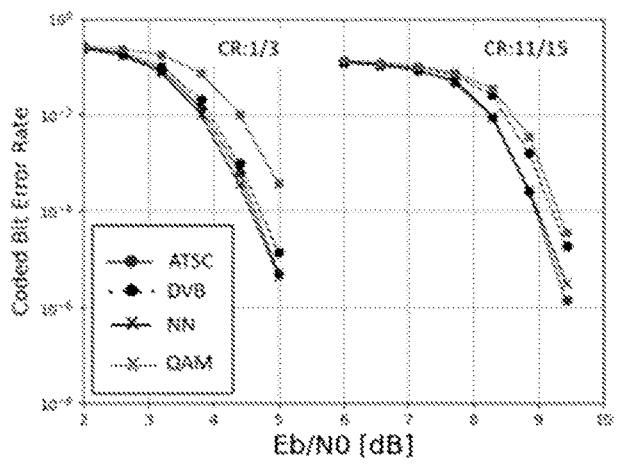
FIG. 8 comparatively illustrates the coded BER as a function of ratio of bit energy to noise power spectral density (Eb/N0) for 64-ary constellations from NN with ATSC, DVB and with uniform QAM.

The 64-ary constellations from NN have slightly better performance than ATSC, especially in lower coded-BER regime and have better performance than DVB and uniform-QAM both in terms of coded BER for both code rates as illustrated in FIG. 8. Thus, in this example, the non-uniform constellations obtained from our NN effectively outperforms all existing schemes.

Modulation Schemes for 256 Modulation Order

For 256 modulation order, in an exemplary embodiment the autoencoder is trained at a SNR of 18 dB and 22 dB Es/N0 for code rates of ⅔ and ⅘ respectively. The parameters of an embodiment of the encoder and decoder layers are shown in TABLE 2.

TABLE 2

Detailed Neural Network parameters for 256-ary constellations

| | |
|---|---|
| BATCH SIZE | 512 |
| TOTAL NO. OF EPOCHS | 90 |
| NO. OF STEPS | 10000 |
| EPOCH MILESTONES | [30, 30, 30] |
| LEARNING RATES | [4e-4, 2e-4, 1e-5] |
| λ | [0.001, 0.001, 0.05] |
| η | [1000, 1000, 300] |
| ENCODER (LAYER, OUTPUT DIM) | Embedding (128) |
| | Dense (128) |
| | Dense (64) |
| | Dense (32) |
| | Dense (32) |
| DECODER (LAYER, OUTPUT DIM) | Dense (64) |
| | Dense (128) |
| | Dense (128) |
| | Dense (8) |

The encoder has an embedding layer with output dimension of 128 followed by 4 dense layers with decreasing output dimensions, and decoder has 4 dense layers, each of the dense layers is followed by batch normalization and an ELU activation layer as mentioned before.

The training can be done by focusing more or less on reducing one or both of the BCE term and QS terms. In an exemplary embodiment, the training is focused on reducing the BCE loss term, by starting with lower values for $\lambda=0.001$, the Lagrangian constant for QS loss term and higher values for variance $\eta=1000$ and changing them after few epochs. For example, updating $\lambda,\eta$ to $5\times10^{\wedge}(-2)$ and 300 respectively after 60 epochs.

In an exemplary embodiment, training is done for 90 epochs with 10000 steps per epoch for a batch size of 512 and a starting learning rate of $4\times10^{-3}$ that decreases to $4\times10^{-4}$, $2\times10^{-4}$ and $1\times10^{-5}$ after every 30 epochs.

Figure 9A:
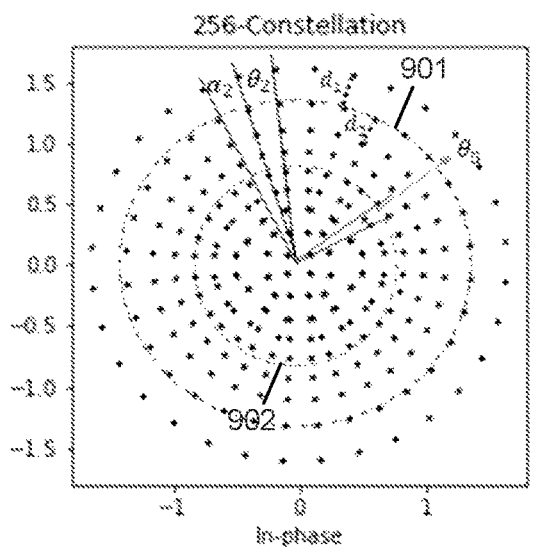
FIGS. 9A and 9B illustrate examples of 256-ary constellations for a higher code rate of $4/5$.
Figure 9B:
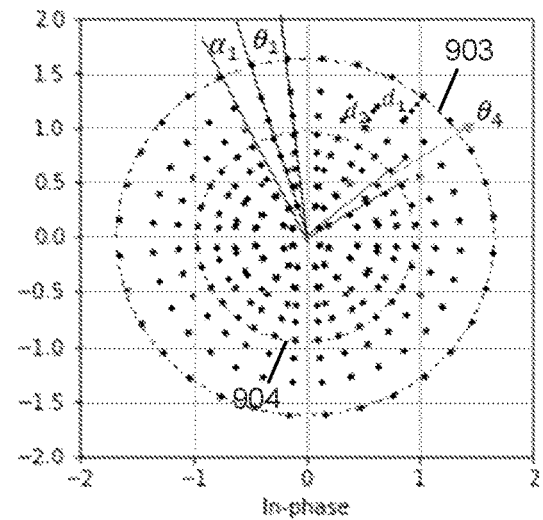

FIGS. 9A and 9B illustrate examples of 256-ary constellations for a higher code rate of ⅘. For higher code rates, which can be useful in high SNR scenarios, the two embodiments of 256-ary constellations shown in FIGS. 9A and 9B are close to circular in shape, with 32 points placed on each of the 7 outer concentric circular shapes of different radii. In the constellation shown in FIG. 9A, the two dashed-dotted circles 901, 902 compare with the 2nd and 5th circular constellation shapes, respectively (starting with numbering the outermost constellation shape as the 1st constellation shape). Circles 901, 902 indicate the degree of circularity for the corresponding constellation shapes. The 5th circular constellation (circle 902) is less circular than the 2nd circular constellation (circle 901). In general, with a decrease in the radius, the shape becomes less circular and more elliptic. The changes in the constellation shape can enable decrease in the modulation symbol detection error events, especially for cases where a smaller signal energy is used for the modulation symbols on the inner shapes as compared to the signal energy for modulation symbols on outer shapes. In case of the constellation shown in FIG. 9B, the two shapes overlaid by the dashed-dotted circles 903, 904 are closer to circles than the ones in FIG. 9A.

In both of the constellations of FIGS. 9A and 9B, the angular separation between the neighboring constellation points on the outer-most circular shape is almost equal—that is, $\theta_1=\alpha_1$. In case of the other six concentric shapes inside of the outer-most circular shape, $\theta_i$ (which denotes the angular separation between two points in a pair in the constellation) gradually becomes smaller than $\alpha_1$ (which denotes the angular separation between two points from neighboring pairs), with decreasing radius of the shapes. That is, the angular separation between the two points in a pair is higher for outer shapes and lower for inner shapes, which results in (for example) $\theta_5<\theta_2$ and $\theta_4<\theta_1$, respectively, in FIG. 9A. On the 7th circular shape, with the smallest radius among the seven outer circular shapes, $\theta_i$ becomes very small, and the constellation points in a pair almost touch each other as seen in FIGS. 9A and 9B The Euclidean distance between the constellation points on the neighboring circular shapes is the largest between the constellation points on the two outermost circular shapes, which are the 1st and 2nd constellation shapes separated by distance denoted as $d_1$ in FIGS. 9A and 9B. The distance decreases for the constellation points on the circular shapes closer to the center. That is, the distance between the constellation points on the 2nd and 3rd constellation shapes, denoted as $d_2$ in FIGS. 9A and 9B, is shorter than $d_1$, and further decreases as the circular shapes get closer to the center.

For the both constellations shown in FIGS. 9A and 9B, 32 constellation points are located inside of the inner-most ($7^{th}$) circular shape. In case of the constellation in FIG. 9A, two quadrilateral shapes result, with 24 points on the outer quadrilateral and 8 on the inner quadrilateral. Each of the 16 dots in the two quadrilateral shapes actually reflects two constellation points located on slightly different locations. Similarly, in case of the constellation in FIG. 9B, the remaining 32 constellation points result in two quadrilateral shapes and each of the 16 dots in the two quadrilateral shapes actually correspond to two constellation points located on slightly different locations. Compared to the quadrilateral shapes in FIG. 9A, the width of the outer quadrilateral is narrower and accordingly the eight constellation points on the inner quadrilateral, seen as four dots in FIG. 9B, are located quite close to the constellation points on the outer quadrilateral on the left and right sides.

Figure 10:
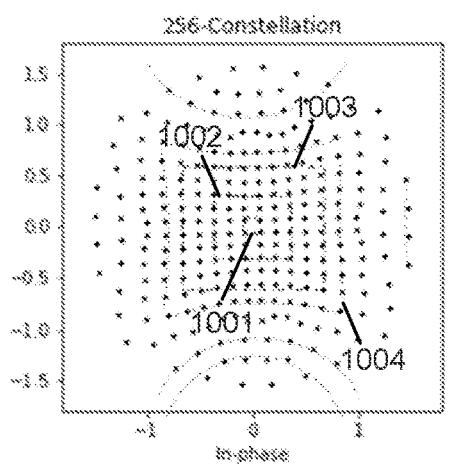
FIG. 10 illustrates an example of a 256-ary constellation for lower code rate of $2/3$.

For relatively low code rates, which can be useful in low SNR scenarios, an embodiment of the 256-ary constellation shown in FIG. 10 contains shapes close to quadrilateral, especially in the inner region close to the center, rather than taking circular shapes as in the embodiments shown in FIGS. 9A and 9B. In the inner region, the constellation points are located along the concentric quadrilateral with similar lengths on each side, close to a square. The inner most quadrilateral 1001 has 4 points, followed by a quadrilateral 1002 with 12 points, a quadrilateral 1003 with 20 points, a quadrilateral 1004 with 28 points, a quadrilateral with 36 points, a quadrilateral with 44 points, and with outermost quadrilateral having 52 points. The sides of the quadrilateral may be straight or may have curvature like concave/convex with curvature being more prominent on two opposites than the curvature on remaining sides. The curvature is more prominent for outer quadrilaterals than inner quadrilaterals. The points may not be placed exactly on the curvature and may have some small deviations.

The remaining outermost 50 points are almost placed along the curvatures, with 16 points on each of the more prominent curvature sides and 14 points on each less prominent curvature side. The 16 points are placed on almost 3 almost concentric concave shaped curvatures with 8 points on the innermost curvature, followed by 6 points and 2 points. The 14 points are places on 2 almost concentric concave shaped curvatures, with 10 points on inner most curvature and 4 points on the outermost curvature.

Figure 11:
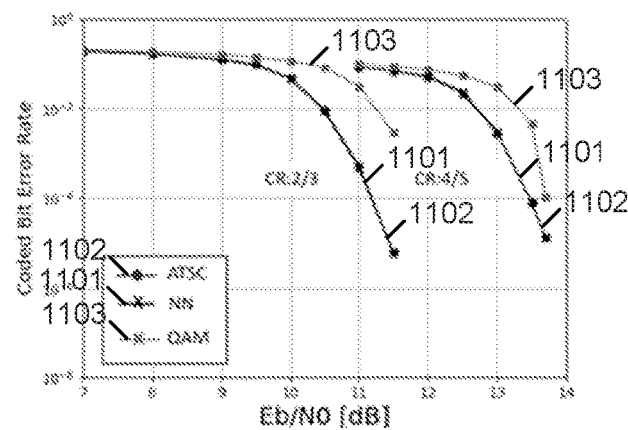
FIG. 11 illustrates simulation results comparing the coded BER of 256-ary constellations from NN with ATSC, DVB and uniform QAM.

FIG. 11 illustrate simulation results comparing the coded BER plotted as a function of ratio of bit energy to noise power spectral density (Eb/N0) for 256-ary constellations from NN with ATSC, DVB and uniform QAM. In an exemplary embodiment, the NN-mapper and NN-demapper are trained at two different training SNR values, each resulting in an optimal constellation for a lower and higher code rate. The coded-BER is then evaluated for a code block of size of 3000 bits.

The 256-ary constellations from NN 1101 have slightly better performance than the 256-ary constellations from ATSC 1102, and a better performance than the 256-ary constellations from DVB and uniform-QAM 1103, both in terms of coded BER for both code rates as illustrated in FIG>0.11. Thus, in this example, the non-uniform constellations obtained from NN effectively outperforms all existing schemes.

Modulation Schemes for 1024 Modulation Order

For 1024 modulation order, in an exemplary embodiment the autoencoder is trained at a SNR of 23 dB and 28 dB Es/N0 for code rates of ⅗ and ⅘ respectively. The parameters of an embodiment of the encoder and decoder layers are shown in TABLE 3:

TABLE 3

Detailed Neural Network parameters for 1024-ary constellations

| | |
|---|---|
| BATCH SIZE | 1024 |
| TOTAL NO. OF EPOCHS | 50 |
| NO. OF STEPS | 10000 |
| EPOCH MILESTONES | — |
| LEARNING RATES | 4e−4 |
| λ | 0.001 |
| η | 1000 |
| ENCODER (LAYER, OUTPUT DIM) | Embedding (4096) |
| | Dense (4096) |
| | Dense (2048) |
| | Dense (2) |
| DECODER (LAYER, OUTPUT DIM) | Dense (64) |
| | Dense (128) |
| | Dense (128) |
| | Dense (10) |

The encoder has an embedding layer with output dimension of 4096 followed by 4 dense layers with decreasing output dimensions, and the decoder has 4 dense layers, with each of the dense layers followed by batch normalization and an ELU activation layer as mentioned before.

The training can be done by focusing more or less on reducing one or both of the BCE term and QS terms. In an exemplary embodiment, the training is focused on reducing the BCE loss term, by starting with lower values for $\lambda=0.001$, the Lagrangian constant for quadrant symmetric (QS) loss term and higher values for variance $\eta=1000$ and changing the values after few epochs. For example, updating $\lambda$, $\eta$ to $5\times10^{-2}$ and 300, respectively, after 60 epochs.

In an exemplary embodiment, training is done for 100 epochs with 15000 steps per epoch for a batch size of 2048 and a starting learning rate of $4\times10^{-3}$ that decreases to $4\times10^{-4}$ after every 50 epochs.

1024-Ary Constellation Description for Higher Code Rate

Figure 12:
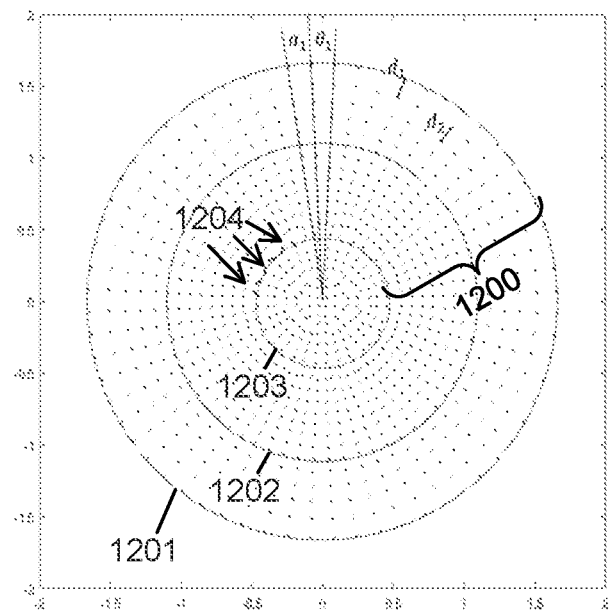
FIG. 12 illustrates an example of a 1024-ary constellations for higher code rate of $4/5$ obtained by NN.

For higher code rates, which can be useful in high SNR scenarios, an embodiment of the 1024-ary constellation is shown in FIG. 12, which is close to circular in shape, with 64 points placed on each of the 14 outer concentric circular shapes 1200 of different radii.

The Euclidean distance between the constellation points on the neighboring circular shapes is the largest between the ones on the outer-most circular shapes (which are the $1^{st}$ and $2^{nd}$ ones), denoted as $d_1$ in FIG. 12. The distance decreases for the constellation points on the circular shapes closer to the center. That is, the distance between the constellation points on the $2^{nd}$ and $3^{rd}$ circular shape, denoted as $d_2$ in FIG. 12, is shorter than $d_1$, and further decreases as the circular shapes get closer to the center.

In the constellation shown in FIG. 12, the two dashed-dotted circles 1201, 1202 compares with the $1^{st}$ and $6^{th}$ circular constellation shapes, starting from the outer-most one as the $1^{st}$, and indicates how circular the corresponding constellation shapes are. The $6^{th}$ constellation shape is less circular than the $1^{st}$ one and, with decreases in the radius, the constellation shapes become less circular and more elliptic. The changes in the constellation shape can enable decrease in the modulation symbol detection error events, especially for cases where a smaller signal energy is used for the modulation symbols on the inner constellation shapes as compared to the symbols on outer constellation shapes.

In the constellation of FIG. 12, the angular separation between the neighboring constellation points on 13 out of 14 concentric circular shapes 1200 is almost equal, that is $\theta_1=\alpha_1$. In case of the innermost concentric circle 1203 of the 14 constellation shapes 1200, the pairs of points maintain almost equal distance and are in almost a zig-zag fashion intersecting the circular shape, as shown by the connecting lines 1204.

The remaining 128 points are located inside of the innermost (14th) circular shape 1203, with 32 points placed with similar angular distance on two almost circular shapes 1201, 1202, 32 points on almost octagonal shape (with 8 points on each "side"), and the innermost 24 and 8 points placed on almost concentric polygonal shapes.

1024-Ary Constellation Description for Lower Code Rate

Figure 13:
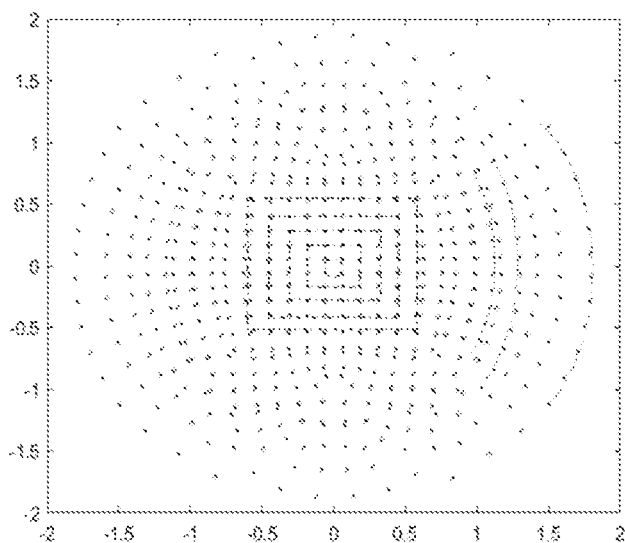
FIG. 13 illustrates an example of a 1024-ary constellation for lower code rate of $3/5$ obtained by NN.

For relatively low code rates, which can be useful in low SNR scenarios, an embodiment of the 1024-constellation such at that depicted in FIG. 13 is close to concentric polygonal shapes, with constellation shapes that may be a quadrilateral for at least inner most points. The innermost points in the concentric polygonal shapes are placed in way such that two points are almost in the same location, with increasing separation as the constellation shapes proceed outward.

The sides of the polygons when moving outward may be straight or may have curvature (e.g., concave/convex), with curvature being more prominent on two of the opposite sides than the curvature on remaining sides. The curvature may be more prominent for outer polygons than for inner quadrilaterals. The points may not be placed exactly on the curvature, and may have some small deviations.

Quadrant Symmetric Constraint (QSC)

A desirable property of four-quadrant symmetry for the constellations can be introduced as a constraint. In an exemplary embodiment, the set of all possible 10-bit vectors $\{0,1\}^{10}$ is split into two parts, one with 8 bits and other with 2 bits. The 8 bit vectors, $b^{(1)}\in\{0,1\}^{10}$, are then fed in to NN-mapper to be mapped to 256 points in the first quadrant, i.e., positive values. The output of the NN-mapper is positive by using activation functions. An example for such activation function is a sigmoid activation function. The remaining 2-bit vectors $b^{(2)}\in\{0,1\}^2$ can be used to assign sign to the 256 points resulting in a quadrant symmetric 1024 points.

The sign can be assigned by various operations and one such operation could be as follows:

$$x=(-2\cdot b^{(2)}+1)\cdot \hat{x},$$

where 1 denotes a vector of ones and $\hat{x}$ corresponds to the output of NN-mapper, i.e., all positive (I, Q) pairs in first quadrant.

Figure 14:
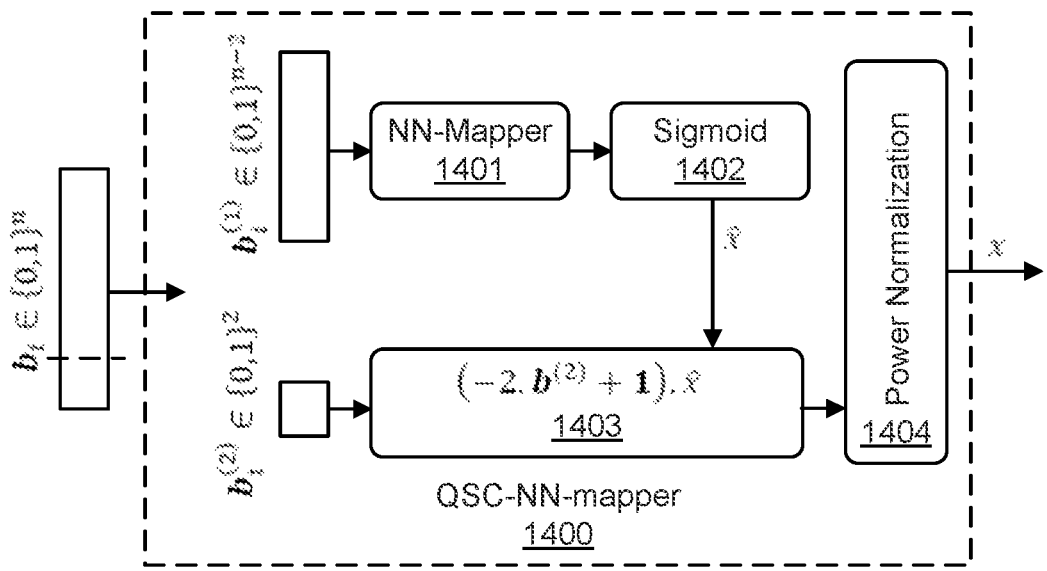
FIG. 14 illustrates an architecture for a QSC-autoencoder according to various embodiments of this disclosure.

FIG. 14 illustrates an architecture for a QSC-autoencoder according to various embodiments of this disclosure. The embodiment shown in FIG. 14 is for illustration only. Other embodiments of a QSC-NN-mapper could be used without departing from the scope of this disclosure.

The QSC-autoencoder 1400 operates on a set of $b_i$ vectors each of n bits, and partitions those vectors into a first subset $b_i^{(1)}\in\{0,1\}^{n-2}$ and a second set $b_i^{(2)}\in\{0,1\}^2$. The first vector subset $b_i^{(1)}\in\{0,1\}^{n-2}$ is passed to NN-mapper 1401, the output of which is operated on by sigmoid activation function 1402 to generate $\hat{x}$. The second vector subset $b_i^{(2)}\in\{0,1\}^2$ is one input, and $\hat{x}$ is another input, for operation $(-2\cdot b^{(2)}+1)\cdot \hat{x}$ 1403. The output of that operation 1403 is received by power normalization function 1404, which produces the set of signed values x for constellation points.

For 1024 modulation order with the quadrant symmetry constraint, in an exemplary embodiment the autoencoder is trained at a SNR of 24 dB and 28 dB Es/N0 for code rates of ⅗ and ⅘ respectively. The parameters of an embodiment of the encoder and decoder layers are shown in TABLE 4:

TABLE 4

Detailed Neural Network parameters for 1024-ary constellations with QSC

| | |
|---|---|
| BATCH SIZE | 1024 |
| TOTAL NO. OF EPOCHS | 80 |
| NO. OF STEPS | 15000 |
| EPOCH MILESTONES | [20, 40, 60] |
| LEARNING RATES | [4e−4, 4e−5, 4e−6] |
| ENCODER (LAYER, OUTPUT DIM) | Embedding (4096) |
| | Dense (2048) |
| | Dense (1024) |
| | Dense (512) |
| | Dense (2) |
| DECODER (LAYER, OUTPUT DIM) | Dense (64) |
| | Dense (128) |
| | Dense (256) |
| | Dense (256) |
| | Dense (256) |
| | Dense (10) |

The encoder has an embedding layer with output dimension of 4096 followed by 4 dense layers with decreasing output dimensions, and the decoder has 6 dense layers, with each dense layer followed by batch normalization and an ELU activation layer as mentioned before.

In an exemplary embodiment, training is done for 80 epochs with 15000 steps per epoch for a batch size of 1024 and a starting learning rate of $4 \times 10^{-3}$, which decreases by a factor of 0.1 after every 20 epochs.

1024-Ary Constellation Description for Higher Code Rate from QSC

Figure 15:
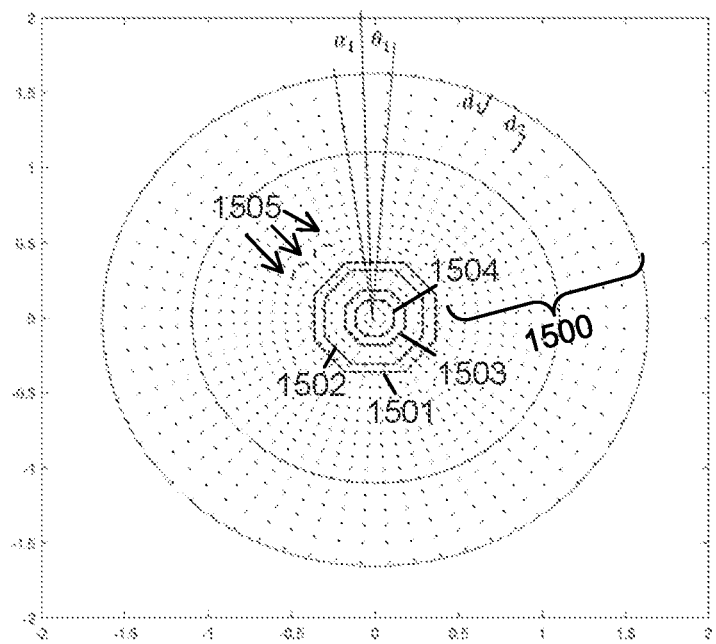
FIG. 15 illustrates an example of 1024-ary constellations for higher code rate of $4/5$ obtained by NN-QSC.

For higher code rates, which can be useful in high SNR scenarios, one embodiment of the 1024-ary constellation is shown in FIG. 15, which is close to circular in shape, with 64 points placed on each of the 14 outer concentric, generally circular shapes 1500 of different radii.

The Euclidean distance between the constellation points on the neighboring circular shapes is the largest between the ones on the outer-most circular shapes, which are the 1st and 2nd ones, denoted as $d_1$ in FIG. 15. The distance decreases for the constellation points on the circular shapes closer to the center. That is, the distance between the constellation points on the $2^{nd}$ and $3^{rd}$ circular shape, denoted as $d_2$ in FIG. 15, is shorter than $d_1$, and further decreases as the circular shapes get closer to the center.

The dashed-dotted shapes 1501, 1502, 1503 and 1504 compare with inner constellation shapes, starting from the outer-most ($1^{st}$) constellation shape and ending with the innermost ($6^{th}$) constellation shape, and indicates how circular the corresponding constellation shapes are. The $6^{th}$ constellation shape is less circular than the $1^{st}$ constellation shape, and with a decrease in the radius, the shape becomes less circular and more elliptic. The changes in the constellation shape can enable decrease in modulation symbol detection error events, especially for cases that a smaller signal energy is used for the modulation symbols on the inner shapes as compared to the modulation symbols on outer shapes.

The angular separation between the neighboring constellation points on 13 out of 14 concentric circular shape is almost equal, that is $\theta_1 = \alpha_1$. In case of the inner concentric circles, the pairs of points maintain almost equal distance and are in almost a zig-zag fashion intersecting the circular shape as highlighted by the lines 1505 in FIG. 15.

The remaining 128 points are placed on almost 6 concentric octagonal shapes, with 40 points placed on outermost octagonal shape with alternate sides having 6 and 4 points each side, followed by three concentric octagonal shapes having 24 points with alternate sides having 4 and 2 points each side and with innermost two octagonal shapes having 8 points each.

1024-Ary Constellation Description for Lower Code Rate from QSC

Figure 16:
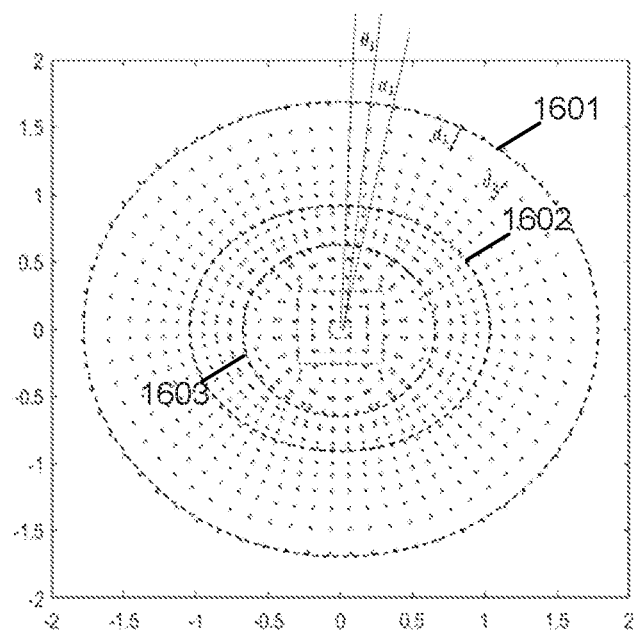
FIG. 16 illustrates an example of 1024-ary constellations for lower code rate of $3/5$ obtained by NN-QSC.

For lower code rates, which can be useful in low SNR scenarios, one embodiment of the 1024-ary constellation is shown in FIG. 16, which is close to circular in shape and has 64 points placed on each of the 10 outer concentric circular shapes of different radii.

The Euclidean distance between the constellation points on the neighboring circular shapes is the largest between the constellation shapes on the outer-most circular shapes, which are the $1^{st}$ and $2^{nd}$ constellation shapes, is denoted as $d_1$ in FIG. 16. The distance decreases for the constellation points on the constellation shapes closer to the center. That is, the distance between the constellation points on the $2^{nd}$ and $3^{rd}$ constellation shapes, denoted as $d_2$ in FIG. 16, is shorter than $d_1$, and further decreases as the constellation shapes get closer to the center.

The dashed-dotted circles compare the $1^{st}$ and $7^{th}$ constellation shapes 1601, 1602, starting from the outer-most one as the $1^{st}$, and indicates how circular the corresponding constellation shapes are. The $6^{th}$ constellation shape is less circular than the $1^{st}$ constellation and, with a decrease in the radius, the shape becomes less circular and more elliptic. The changes in the constellation shape can enable decrease in the modulation symbol detection error events, especially for cases that a smaller signal energy is used for the modulation symbols on the inner shapes compared to the modulation symbols on outer shapes.

The angular separation between the neighboring constellation points on 6 out of 10 constellation shape is almost equal, that is $\theta_1 = \alpha_1$. Along with the shapes becoming more elliptical, the angular separation $\theta_1$ between pair of points is no longer same for all pairs of points. The separation of the points on the elongated curvature of each inner shape is less that the pair of points on shorter curvature side, to an extent that the points are almost at same location as can be seen by points on dashed-dotted ellipse 1503 in FIG. 16.

The remaining points are placed on almost concentric elliptical and/or polygonal shapes, with two points almost sharing the same location.

Rectangular Structure Constraint (RSC)

Figure 17:
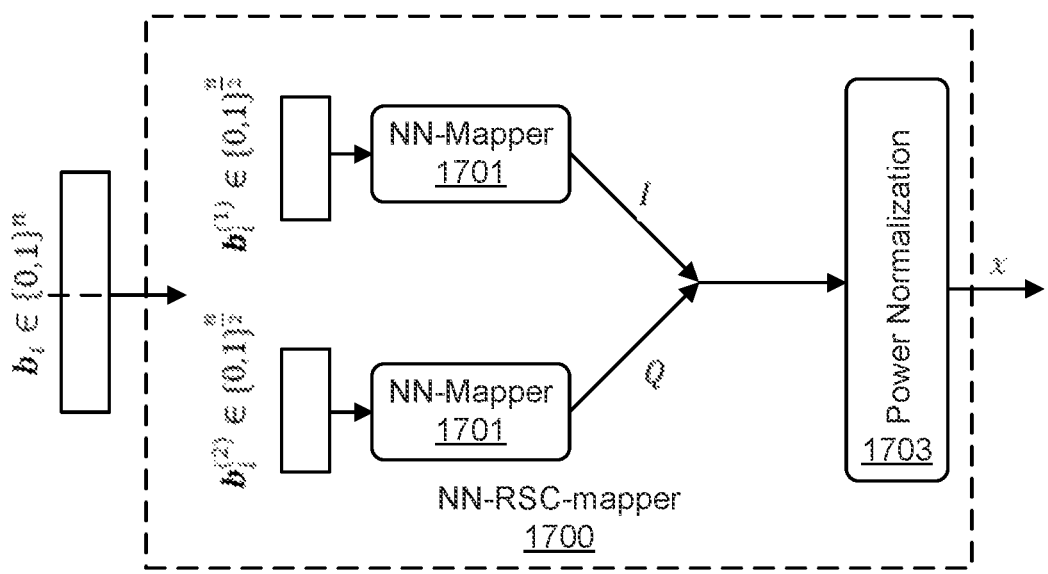
FIG. 17 illustrates an architecture for an RSC-autoencoder according to various embodiments of this disclosure.

In this embodiment, a rectangular shape for the constellation map can be introduced as a constraint. In an exemplary embodiment, this is done by splitting the 10-bit vector into two halves of 5-bit vectors and have each of those vectors go through an NN-mapper, as illustrated in FIG. 17.

The RSC-autoencoder 1700 operates on a set of $b_i$ vectors n bits, and partitions those vectors into a first subset $$b_i^{(1)} \in \{0, 1\}^{\frac{n}{2}}$$

and a second set $$b_i^{(2)} \in \{0, 1\}^{\frac{n}{2}}.$$

The first vector subset is passed to NN-mapper 1701 and the second vector subset is passed to NN-mapper 1702. The exemplary embodiment of FIG. 17 contemplates using the same network weights and architecture for both NN-mappers 1701, 1702. The output of each NN-mapper is a single real value, where one value corresponds to in-phase (I) and other corresponds to the quadrature phase (Q). The outputs of the NN-mappers 1701, 1702 are received by power normalization function 1703, which produces the set of signed values x for constellation points.

The parameters of an exemplary embodiment of the encoder and decoder layers for 1024 modulation order with the rectangular symmetry constraint are shown in TABLE 5:

TABLE 5

Detailed Neural Network parameters for 1024-ary constellations with RSC

| | |
|---|---|
| BATCH SIZE | 1024 |
| TOTAL NO. OF EPOCHS | 10 |
| NO. OF STEPS | 10000 |
| EPOCH MILESTONES | [5] |
| LEARNING RATES | [4e−4] |
| λ | [0.001] |
| η | [1000] |
| ENCODER (LAYER, OUTPUT DIM) | Embedding (2048) |
| | Dense (2048) |
| | Dense (512) |
| | Dense (256) |
| | Dense (2) |
| DECODER (LAYER, OUTPUT DIM) | Dense (64) |
| | Dense (128) |
| | Dense (256) |
| | Dense (256) |
| | Dense (256) |
| | Dense (10) |

Figure 18A:
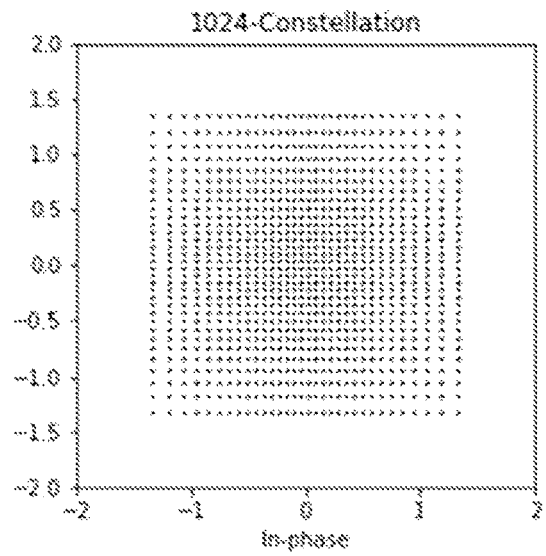
FIGS. 18A and 18B illustrate 1024-ary constellations obtained by NN-RSC, respectively for a higher code rate of $4/5$ and a lower code rate of $3/5$.
Figure 18B:
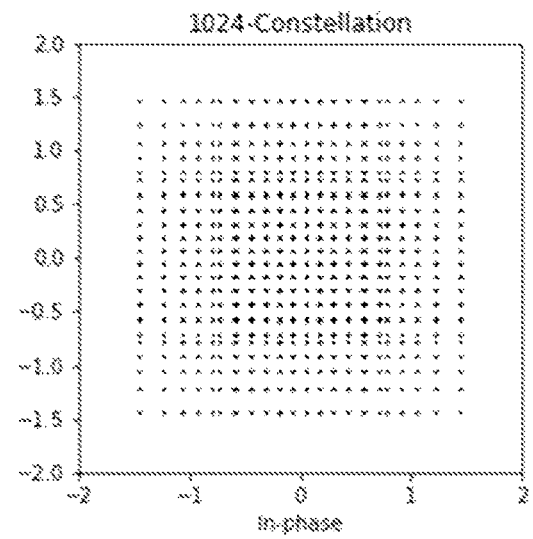

FIGS. 18A and 18B illustrate 1024-ary constellations obtained by NN-RSC. FIG. 18A illustrates the constellations for a higher code rate of 4/5, while FIG. 18B illustrates the constellations for a lower code rate of 3/5. One example of the 16-positive x coordinates of 1024-ary constellation obtained from RSC for the higher code rate of 4/5 can be (1.3347, 1.1878, 1.0626, 0.9504, 0.8462, 0.7523, 0.6629, 0.5805, 0.5035, 0.4297, 0.3594, 0.2916, 0.2239, 0.1597, 0.0937, 0.0328). One example of the 16-positive x coordinates of 1024-ary constellation obtained from RSC for lower code rate of 3/5 can be (0.0601, 0.0605, 0.1794, 0.1796, 0.3027, 0.3039, 0.4309, 0.4375, 0.5676, 0.5905, 0.7189, 0.7866, 0.9201, 1.0561, 1.2280, 1.4486).

Simulation Results: Coded BER for 1024-Modulation Schemes

Figure 19:
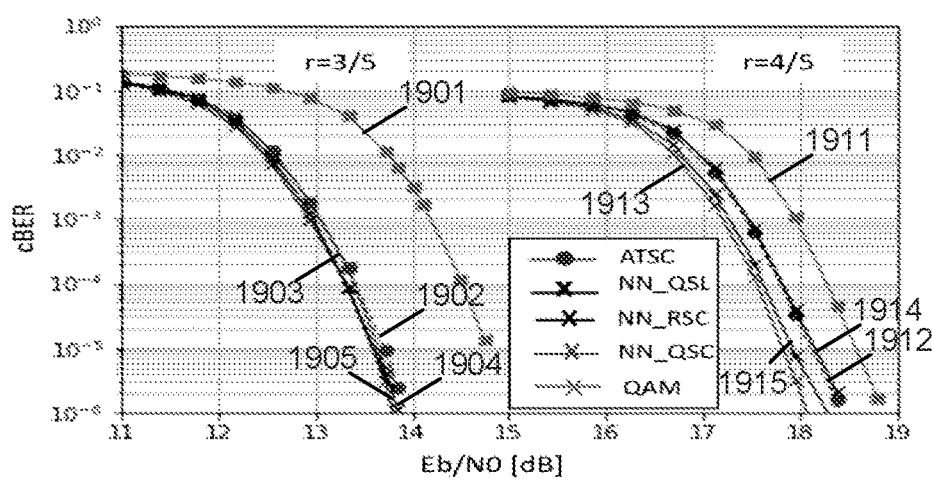
FIG. 19 illustrates simulation results comparing the coded BER of 1024-ary constellations from NN and NN-QSC with ATSC and uniform QAM.

FIG. 19 illustrates simulation results comparing the coded BER of 1024-ary constellations from NN and NN-QSC with ATSC and uniform QAM. As illustrated, embodiments of 1024-constellations from various NN architectures (NN-QSL 1905, 1915; NN-RSC 1904, 1914; and NN-QSC 1903, 1913) outperform or closely match a non-uniform constellation from ATSC 1902, 1912, and outperform a constellation from uniform QAM 1901, 1911 by a significant margin, at lower/higher code rates of 3/5 and 4/5.

Bit-to-Symbol Mapping for all Modulation Orders

The non-uniform constellations described above may not usually form a grid as in a conventional QAM, and finding the optimal labeling is a combinatorial problem with $2^n!$ possibilities. Using neural network can provide with optimal bit-to-symbol mapping. An exemplary bit-to-symbol mapping for the embodiments of 64/256/1204 constellations are listed below.

The following tables provide with mapping from binary bits associated with integers in the column labeled mapping with locations denoted by the complex numbers that denotes in-phase and quadrature phase values.

For modulation order of 64, the mapping is from binary bits of size 6 (integers from 0-63) to constellation points. For 256 and 1024 modulation orders, the mapping is from 8 binary bits (integers from 0-256) and 10 binary bits (integers from 0-1023) respectively.

Bit-to-Symbol Mapping for 64-Modulation Order Schemes

An example of the bit-to-symbol mapping for 64-ary non-uniform constellations for code rates 1/3 and 11/15 is given in TABLE 6:

TABLE 6

An example of the bit-to-symbol mapping for 64-ary non-uniform constellations from NN

| Mapping | Code Rate, r = 1/3 | Code Rate, r = 11/15 |
|---|---|---|
| 0 | (−0.2097 + 0.3403j) | (0.4907 + 0.0364j) |
| 1 | (−0.8372 + 1.2398j) | (0.733 + 0.0826j) |
| 2 | (0.1936 + 0.3481j) | (1.4016 + 0.2667j) |
| 3 | (0.796 + 1.2854j) | (1.0335 + 0.1572j) |
| 4 | (−0.1939 + 0.3283j) | (−0.0631 − 0.4863j) |
| 5 | (−0.3343 + 1.4425j) | (−0.124 − 0.7262j) |
| 6 | (0.1786 + 0.3361j) | (−0.3216 − 1.3896j) |
| 7 | (0.2682 + 1.4537j) | (−0.209 − 1.0221j) |
| 8 | (−0.194 − 0.3509j) | (0.3853 − 0.1957j) |
| 9 | (−0.7978 − 1.2857j) | (0.7104 − 0.2442j) |
| 10 | (0.2062 − 0.3392j) | (1.4333 − 0.2849j) |
| 11 | (0.8574 − 1.2622j) | (1.0537 − 0.2444j) |
| 12 | (−0.1782 − 0.3381j) | (0.1741 − 0.3976j) |
| 13 | (−0.2735 − 1.461j) | (0.2082 − 0.7241j) |
| 14 | (0.1898 − 0.3298j) | (0.223 − 1.4431j) |
| 15 | (0.3312 − 1.4431j) | (0.1977 − 1.0622j) |
| 16 | (−0.3204 + 0.5482j) | (0.0638 + 0.4865j) |
| 17 | (−0.5788 + 0.9226j) | (0.1225 + 0.726j) |
| 18 | (0.298 + 0.5581j) | (0.335 + 1.386j) |
| 19 | (0.5472 + 0.945j) | (0.2155 + 1.0211j) |
| 20 | (−0.2534 + 0.5721j) | (−0.4897 − 0.0399j) |
| 21 | (−0.2862 + 1.0536j) | (−0.7342 − 0.0864j) |
| 22 | (0.2353 + 0.5805j) | (−1.4092 − 0.2568j) |
| 23 | (0.2491 + 1.0588j) | (−1.0349 − 0.1617j) |
| 24 | (−0.2988 − 0.5626j) | (−0.1738 + 0.3927j) |
| 25 | (−0.5412 − 0.9449j) | (−0.2068 + 0.7201j) |
| 26 | (0.317 − 0.5426j) | (−0.2136 + 1.4405j) |
| 27 | (0.5812 − 0.9185j) | (−0.191 + 1.0578j) |
| 28 | (−0.2322 − 0.5813j) | (−0.3854 + 0.1923j) |
| 29 | (−0.2367 − 1.0684j) | (−0.7125 + 0.2403j) |
| 30 | (0.2575 − 0.5657j) | (−1.4237 + 0.2957j) |
| 31 | (0.2906 − 1.0509j) | (−1.0473 + 0.2465j) |
| 32 | (−0.352 + 0.1938j) | (0.3653 + 0.1894j) |
| 33 | (−1.2881 + 0.8197j) | (0.6174 + 0.3805j) |
| 34 | (0.3433 + 0.209j) | (1.196 + 0.7683j) |
| 35 | (1.2595 + 0.8631j) | (0.8805 + 0.5471j) |
| 36 | (−0.3413 + 0.1757j) | (−0.2085 − 0.3501j) |
| 37 | (−1.4694 + 0.2835j) | (−0.4147 − 0.5984j) |
| 38 | (0.3344 + 0.1928j) | (−0.8177 − 1.1683j) |
| 39 | (1.4572 + 0.3276j) | (−0.5933 − 0.8561j) |
| 40 | (−0.3444 − 0.2082j) | (0.171 − 0.0231j) |
| 41 | (−1.251 − 0.8582j) | (0.6615 − 0.4969j) |
| 42 | (0.3506 − 0.192j) | (1.2448 − 0.8446j) |
| 43 | (1.2861 − 0.7998j) | (0.9254 − 0.6516j) |
| 44 | (−0.3322 − 0.1903j) | (0.0127 − 0.1724j) |
| 45 | (−1.4674 − 0.3372j) | (0.4644 − 0.6824j) |
| 46 | (0.3391 − 0.1761j) | (0.7842 − 1.2815j) |
| 47 | (1.4689 − 0.2864j) | (0.606 − 0.9536j) |
| 48 | (−0.5618 + 0.2961j) | (0.2077 + 0.3502j) |
| 49 | (−0.9392 + 0.546j) | (0.4094 + 0.5995j) |
| 50 | (0.548 + 0.3187j) | (0.8246 + 1.1648j) |
| 51 | (0.9214 + 0.5806j) | (0.5941 + 0.8515j) |
| 52 | (−0.5842 + 0.23j) | (−0.3639 − 0.1896j) |
| 53 | (−1.0695 + 0.2436j) | (−0.6211 − 0.3821j) |
| 54 | (0.5732 + 0.2577j) | (−1.2031 − 0.7729j) |
| 55 | (1.0582 + 0.287j) | (−0.8821 − 0.5525j) |

TABLE 6-continued

An example of the bit-to-symbol mapping for
64-ary non-uniform constellations from NN

| Mapping | Code Rate, r = 1/3 | Code Rate, r = 11/15 |
|---|---|---|
| 56 | (−0.555 − 0.3223j) | (−0.014 + 0.1707j) |
| 57 | (−0.9227 − 0.5751j) | (−0.4624 + 0.6764j) |
| 58 | (0.5616 − 0.2961j) | (−0.7756 + 1.2841j) |
| 59 | (0.9424 − 0.54j) | (−0.5986 + 0.9545j) |
| 60 | (−0.5733 − 0.2549j) | (−0.172 + 0.0203j) |
| 61 | (−1.0611 − 0.28j) | (−0.6556 + 0.4954j) |
| 62 | (0.5797 − 0.2343j) | (−1.2347 + 0.8481j) |
| 63 | (1.0608 − 0.2502j) | (−0.9178 + 0.6516j) |

Bit-to-Symbol Mapping for 256-Modulation Order Schemes

An example of the bit-to-symbol mapping for 256-ary non-uniform constellations for code rates 2/3 and 4/5 is given in TABLE 7:

TABLE 7

An example of the bit-to-symbol mapping for
256-ary non-uniform constellations from NN

| Mapping | Code Rate, r = 2/3 | Code Rate, r = 4/5 |
|---|---|---|
| 0 | (−1.0309 − 1.2883j) | (−0.833 − 0.6718j) |
| 1 | (−0.8502 − 1.0541j) | (−0.466 − 1.4825j) |
| 2 | (−1.0467 + 1.2821j) | (−1.0369 − 0.6834j) |
| 3 | (−0.8606 + 1.0438j) | (−0.1292 − 1.5554j) |
| 4 | (−0.1474 − 1.6275j) | (0.8439 − 0.6544j) |
| 5 | (−0.1214 − 1.3269j) | (0.4833 − 1.4678j) |
| 6 | (−0.1645 + 1.6214j) | (1.0517 − 0.6729j) |
| 7 | (−0.1376 + 1.325j) | (0.156 − 1.5533j) |
| 8 | (−0.1555 − 0.262j) | (−0.8424 + 0.6547j) |
| 9 | (−0.2661 − 0.3671j) | (−0.4881 + 1.4648j) |
| 10 | (−0.155 + 0.2545j) | (−1.0446 + 0.6609j) |
| 11 | (−0.2732 + 0.3618j) | (−0.1531 + 1.5416j) |
| 12 | (−0.0753 − 0.275j) | (0.8318 + 0.6704j) |
| 13 | (−0.091 − 0.4666j) | (0.4579 + 1.484j) |
| 14 | (−0.078 + 0.2773j) | (1.0374 + 0.6824j) |
| 15 | (−0.0927 + 0.4624j) | (0.1222 + 1.5554j) |
| 16 | (−1.2646 − 1.06j) | (−0.8114 − 0.8501j) |
| 17 | (−1.0432 − 0.8725j) | (−0.7666 − 1.0495j) |
| 18 | (−1.2775 + 1.044j) | (−1.0158 − 0.8862j) |
| 19 | (−1.0548 + 0.8607j) | (−0.9539 − 1.1302j) |
| 20 | (−1.6439 − 0.1751j) | (0.8213 − 0.8365j) |
| 21 | (−1.3545 − 0.1443j) | (0.7791 − 1.0298j) |
| 22 | (−1.651 + 0.1517j) | (1.0312 − 0.8741j) |
| 23 | (−1.3531 + 0.1252j) | (0.9748 − 1.1142j) |
| 24 | (−0.1967 − 0.1087j) | (−0.8216 + 0.8328j) |
| 25 | (−0.3748 − 0.2021j) | (−0.7772 + 1.0261j) |
| 26 | (−0.1918 + 0.0992j) | (−1.0317 + 0.8669j) |
| 27 | (−0.3822 + 0.194j) | (−0.9709 + 1.1098j) |
| 28 | (−0.1197 − 0.0802j) | (0.8112 + 0.8548j) |
| 29 | (−0.4481 − 0.0819j) | (0.7651 + 1.0524j) |
| 30 | (−0.12 + 0.0763j) | (1.0165 + 0.8875j) |
| 31 | (−0.4437 + 0.0772j) | (0.9567 + 1.1338j) |
| 32 | (−0.7569 − 1.458j) | (−0.6551 − 0.6444j) |
| 33 | (−0.627 − 1.1912j) | (−0.5403 − 1.2205j) |
| 34 | (−0.7746 − 1.4527j) | (−1.2652 − 0.6149j) |
| 35 | (−0.6386 + 1.1796j) | (−0.7555 − 1.3569j) |
| 36 | (−0.4559 − 1.5578j) | (0.6635 − 0.6314j) |
| 37 | (−0.3829 − 1.283j) | (0.5625 − 1.2117j) |
| 38 | (−0.4772 + 1.5703j) | (1.2766 − 0.5888j) |
| 39 | (−0.3963 + 1.277j) | (0.7747 − 1.3429j) |
| 40 | (−0.1525 − 0.2635j) | (−0.6639 + 0.6303j) |
| 41 | (−0.2593 − 0.3793j) | (−0.5648 + 1.2103j) |
| 42 | (−0.1547 + 0.2555j) | (−1.2769 + 0.5883j) |
| 43 | (−0.2609 + 0.3724j) | (−0.7756 + 1.3405j) |
| 44 | (−0.0769 − 0.2775j) | (0.6564 + 0.6447j) |
| 45 | (−0.1068 − 0.4558j) | (0.5407 + 1.215j) |
| 46 | (−0.0812 + 0.2744j) | (1.2701 + 0.6103j) |
| 47 | (−0.1137 + 0.4524j) | (0.747 + 1.3553j) |
| 48 | (−1.4505 − 0.7934j) | (−0.6293 − 0.8119j) |
| 49 | (−1.1915 − 0.6534j) | (−0.5831 − 1.0052j) |

TABLE 7-continued

An example of the bit-to-symbol mapping for
256-ary non-uniform constellations from NN

| Mapping | Code Rate, r = 2/3 | Code Rate, r = 4/5 |
|---|---|---|
| 50 | (−1.4599 + 0.7759j) | (−1.2756 − 0.8434j) |
| 51 | (−1.1996 + 0.6368j) | (−1.2068 − 1.11j) |
| 52 | (−1.5785 − 0.4933j) | (0.6368 − 0.7976j) |
| 53 | (−1.2964 − 0.4059j) | (0.5969 − 0.9978j) |
| 54 | (−1.5821 + 0.4758j) | (1.2987 − 0.8262j) |
| 55 | (−1.2979 + 0.3889j) | (1.2221 − 1.0854j) |
| 56 | (−0.1926 − 0.1051j) | (−0.6437 + 0.804j) |
| 57 | (−0.3861 − 0.1959j) | (−0.6002 + 0.9983j) |
| 58 | (−0.2046 + 0.1038j) | (−1.2932 + 0.8204j) |
| 59 | (−0.394 + 0.2j) | (−1.2228 + 1.0901j) |
| 60 | (−0.1165 − 0.0829j) | (0.6281 + 0.8169j) |
| 61 | (−0.4419 − 0.0868j) | (0.5847 + 1.0103j) |
| 62 | (−0.1181 + 0.0789j) | (1.2836 + 0.8439j) |
| 63 | (−0.4446 + 0.0838j) | (1.205 + 1.104j) |
| 64 | (1.044 − 1.2792j) | (−0.834 − 0.5001j) |
| 65 | (0.8595 − 1.0416j) | (−0.8212 − 0.0749j) |
| 66 | (1.0288 + 1.2916j) | (−1.0203 − 0.5063j) |
| 67 | (0.8507 + 1.0572j) | (−0.997 − 0.0718j) |
| 68 | (0.168 − 1.6223j) | (0.8488 − 0.4913j) |
| 69 | (0.1391 − 1.3292j) | (0.8268 − 0.0627j) |
| 70 | (0.1467 + 1.6274j) | (1.0382 − 0.4922j) |
| 71 | (0.1258 + 1.3281j) | (1.0046 − 0.0538j) |
| 72 | (0.1596 − 0.2514j) | (−0.8417 + 0.4859j) |
| 73 | (0.2775 − 0.3696j) | (−0.8241 + 0.0628j) |
| 74 | (0.1528 + 0.2603j) | (−1.0297 + 0.4872j) |
| 75 | (0.2684 + 0.3683j) | (−0.9937 + 0.0545j) |
| 76 | (0.0786 − 0.2741j) | (0.8344 + 0.5052j) |
| 77 | (0.0952 − 0.4566j) | (0.8255 + 0.0768j) |
| 78 | (0.0802 + 0.2772j) | (1.023 + 0.5086j) |
| 79 | (0.0933 + 0.4616j) | (0.996 + 0.0707j) |
| 80 | (1.2775 − 1.0482j) | (−0.8367 − 0.3491j) |
| 81 | (1.0545 − 0.8602j) | (−0.8306 − 0.2127j) |
| 82 | (1.2616 + 1.0617j) | (−1.0358 − 0.3495j) |
| 83 | (1.0381 + 0.8704j) | (−1.0319 − 0.1928j) |
| 84 | (1.6461 − 0.1553j) | (0.8423 − 0.3354j) |
| 85 | (1.3551 − 0.1273j) | (0.8375 − 0.2003j) |
| 86 | (1.6492 + 0.174j) | (1.0431 − 0.3346j) |
| 87 | (1.3493 + 0.1466j) | (1.0385 − 0.1789j) |
| 88 | (0.1982 − 0.1043j) | (−0.8433 + 0.3323j) |
| 89 | (0.3859 − 0.1988j) | (−0.8386 + 0.1982j) |
| 90 | (0.1948 + 0.1048j) | (−1.0436 + 0.3294j) |
| 91 | (0.3772 + 0.2009j) | (−1.0397 + 0.1798j) |
| 92 | (0.1226 − 0.08j) | (0.8388 + 0.3504j) |
| 93 | (0.4501 − 0.0802j) | (0.8329 + 0.2123j) |
| 94 | (0.1137 + 0.076j) | (1.0448 + 0.3499j) |
| 95 | (0.4515 + 0.0848j) | (1.0381 + 0.1965j) |
| 96 | (0.7693 − 1.4481j) | (−0.6673 − 0.4924j) |
| 97 | (0.6373 − 1.1841j) | (−0.6625 − 0.072j) |
| 98 | (0.7545 + 1.4609j) | (−1.4663 − 0.4376j) |
| 99 | (0.6254 + 1.1911j) | (−1.4811 − 0.1441j) |
| 100 | (0.4742 − 1.5629j) | (0.6726 − 0.4751j) |
| 101 | (0.3951 − 1.2742j) | (0.6643 − 0.0629j) |
| 102 | (0.4549 + 1.5735j) | (1.4775 − 0.4139j) |
| 103 | (0.3825 + 1.2824j) | (1.4891 − 0.127j) |
| 104 | (0.1616 − 0.2614j) | (−0.6704 + 0.4743j) |
| 105 | (0.2623 − 0.3739j) | (−0.6565 + 0.065j) |
| 106 | (0.1531 + 0.2616j) | (−1.4695 + 0.4071j) |
| 107 | (0.2555 + 0.3781j) | (−1.4837 + 0.1219j) |
| 108 | (0.0813 − 0.2736j) | (0.6645 + 0.4893j) |
| 109 | (0.1158 − 0.4563j) | (0.6641 + 0.0743j) |
| 110 | (0.0803 + 0.2742j) | (1.4647 + 0.4351j) |
| 111 | (0.1097 + 0.4559j) | (1.4832 + 0.1473j) |
| 112 | (1.464 − 0.778j) | (−0.6648 − 0.3425j) |
| 113 | (1.2006 − 0.6389j) | (−0.6658 − 0.2057j) |
| 114 | (1.4524 + 0.7969j) | (−1.2418 − 0.3367j) |
| 115 | (1.189 + 0.6528j) | (−1.2427 − 0.1189j) |
| 116 | (1.5838 − 0.4742j) | (0.6711 − 0.3333j) |
| 117 | (1.3004 − 0.3897j) | (0.6683 − 0.1985j) |
| 118 | (1.581 + 0.4938j) | (1.2527 − 0.3187j) |
| 119 | (1.2996 + 0.408j) | (1.2424 − 0.0953j) |
| 120 | (0.1985 − 0.1041j) | (−0.6691 + 0.331j) |
| 121 | (0.3847 − 0.1915j) | (−0.6655 + 0.1958j) |
| 122 | (0.1946 + 0.1041j) | (−1.2532 + 0.3148j) |
| 123 | (0.3839 + 0.1962j) | (−1.2427 + 0.0971j) |
| 124 | (0.1191 − 0.0776j) | (0.6663 + 0.3461j) |

TABLE 7-continued

An example of the bit-to-symbol mapping for 256-ary non-uniform constellations from NN

| Mapping | Code Rate, r = 2/3 | Code Rate, r = 4/5 |
| --- | --- | --- |
| 125 | (0.4508 − 0.0861j) | (0.6642 + 0.2081j) |
| 126 | (0.1167 + 0.0799j) | (1.2465 + 0.3391j) |
| 127 | (0.4443 + 0.0901j) | (1.2407 + 0.1196j) |
| 128 | (−0.6035 − 0.7372j) | (−0.3426 − 0.5924j) |
| 129 | (−0.7155 − 0.8765j) | (−0.2948 − 1.317j) |
| 130 | (−0.6096 + 0.728j) | (−0.1952 − 0.5751j) |
| 131 | (−0.722 + 0.8656j) | (−0.095 − 1.3018j) |
| 132 | (−0.0972 − 0.9395j) | (0.3513 − 0.5857j) |
| 133 | (−0.1068 − 1.1062j) | (0.3113 − 1.3081j) |
| 134 | (−0.1056 + 0.9375j) | (0.2063 − 0.5717j) |
| 135 | (−0.117 + 1.1098j) | (0.1108 − 1.3018j) |
| 136 | (−0.4901 − 0.6017j) | (−0.352 − 0.5866j) |
| 137 | (−0.3868 − 0.4884j) | (−0.3127 − 1.3081j) |
| 138 | (−0.4948 + 0.5952j) | (−0.2069 + 0.5749j) |
| 139 | (−0.389 + 0.4809j) | (−0.1122 + 1.2975j) |
| 140 | (−0.092 − 0.7733j) | (0.3472 + 0.5924j) |
| 141 | (−0.0898 − 0.6254j) | (0.2899 + 1.3204j) |
| 142 | (−0.1033 + 0.7706j) | (0.196 + 0.5779j) |
| 143 | (−0.099 + 0.6252j) | (0.0884 + 1.3025j) |
| 144 | (−0.7442 − 0.6004j) | (−0.3296 − 0.7415j) |
| 145 | (−0.8755 − 0.7254j) | (−0.2982 − 0.8937j) |
| 146 | (−0.7527 + 0.5925j) | (−0.1843 − 0.722j) |
| 147 | (−0.8812 + 0.7162j) | (−0.1784 − 0.8835j) |
| 148 | (−0.9662 − 0.1059j) | (0.3428 − 0.7309j) |
| 149 | (−1.1316 − 0.1181j) | (0.3163 − 0.8929j) |
| 150 | (−0.9633 + 0.0941j) | (0.1964 − 0.7202j) |
| 151 | (−1.1364 + 0.1062j) | (0.1902 − 0.8809j) |
| 152 | (−0.6278 − 0.4704j) | (−0.3444 − 0.7346j) |
| 153 | (−0.5174 − 0.3498j) | (−0.3167 − 0.8895j) |
| 154 | (−0.6352 + 0.4622j) | (−0.1963 + 0.7189j) |
| 155 | (−0.5174 + 0.3423j) | (−0.1927 + 0.8775j) |
| 156 | (−0.7918 − 0.1017j) | (0.328 + 0.7406j) |
| 157 | (−0.6303 − 0.101j) | (0.2989 + 0.8936j) |
| 158 | (−0.7784 + 0.0789j) | (0.1823 + 0.7228j) |
| 159 | (−0.6302 + 0.0919j) | (0.1725 + 0.8831j) |
| 160 | (−0.4587 − 0.8301j) | (−0.4947 − 0.6114j) |
| 161 | (−0.5311 − 0.9906j) | (−0.3248 − 1.1294j) |
| 162 | (−0.4685 + 0.821j) | (−0.061 − 0.566j) |
| 163 | (−0.5439 + 0.9794j) | (−0.0995 − 1.1051j) |
| 164 | (−0.2781 − 0.9041j) | (0.5007 − 0.6053j) |
| 165 | (−0.3272 − 1.0694j) | (0.3383 − 1.1214j) |
| 166 | (−0.287 + 0.9011j) | (0.0701 − 0.5642j) |
| 167 | (−0.3357 + 1.0624j) | (0.1164 − 1.0996j) |
| 168 | (−0.3952 − 0.6655j) | (−0.5035 + 0.6025j) |
| 169 | (−0.3406 − 0.5227j) | (−0.3414 + 1.1211j) |
| 170 | (−0.4004 + 0.6579j) | (−0.073 + 0.5639j) |
| 171 | (−0.344 + 0.5158j) | (−0.1216 + 1.1005j) |
| 172 | (−0.2179 − 0.7465j) | (0.4932 + 0.612j) |
| 173 | (−0.1619 − 0.613j) | (0.3197 + 1.1293j) |
| 174 | (−0.2257 + 0.7407j) | (0.0628 + 0.5591j) |
| 175 | (−0.1663 + 0.6071j) | (0.0984 + 1.0998j) |
| 176 | (−0.8432 − 0.4615j) | (−0.4759 − 0.7767j) |
| 177 | (−0.9992 − 0.5457j) | (−0.4226 − 0.961j) |
| 178 | (−0.8513 + 0.4563j) | (−0.0545 − 0.7211j) |
| 179 | (−1.0027 + 0.5337j) | (−0.0625 − 0.9204j) |
| 180 | (−0.9271 − 0.2802j) | (0.487 − 0.7678j) |
| 181 | (−1.0898 − 0.3382j) | (0.4409 − 0.9567j) |
| 182 | (−0.9279 + 0.2705j) | (0.0662 − 0.7211j) |
| 183 | (−1.0956 + 0.3271j) | (0.0766 − 0.9222j) |
| 184 | (−0.6893 − 0.3855j) | (−0.49 + 0.7663j) |
| 185 | (−0.5386 − 0.3113j) | (−0.439 + 0.9536j) |
| 186 | (−0.6925 + 0.3774j) | (−0.0673 + 0.7196j) |
| 187 | (−0.5459 + 0.303j) | (−0.0782 + 0.9219j) |
| 188 | (−0.7697 − 0.2125j) | (0.4742 + 0.774j) |
| 189 | (−0.6195 − 0.1445j) | (0.4222 + 0.959j) |
| 190 | (−0.7733 + 0.2059j) | (0.0566 + 0.7256j) |
| 191 | (−0.6181 + 0.139j) | (0.0591 + 0.9217j) |
| 192 | (0.6147 − 0.7308j) | (−0.3488 − 0.4502j) |
| 193 | (0.7226 − 0.8647j) | (−0.3681 − 0.0663j) |
| 194 | (0.6019 + 0.737j) | (−0.2044 − 0.4357j) |
| 195 | (0.7121 + 0.8745j) | (−0.2162 − 0.0601j) |
| 196 | (0.1067 − 0.9378j) | (0.3578 − 0.4463j) |
| 197 | (0.1198 − 1.1044j) | (0.3589 − 0.0613j) |
| 198 | (0.0973 + 0.9358j) | (0.2127 − 0.4358j) |
| 199 | (0.1074 + 1.1064j) | (0.219 − 0.0588j) |
| 200 | (0.4999 − 0.5998j) | (−0.3584 + 0.4476j) |
| 201 | (0.3925 − 0.4818j) | (−0.3635 + 0.0628j) |
| 202 | (0.4906 + 0.6037j) | (−0.2118 + 0.4348j) |
| 203 | (0.3846 + 0.484j) | (−0.2172 + 0.0603j) |
| 204 | (0.1019 − 0.7708j) | (0.3513 + 0.4528j) |
| 205 | (0.0992 − 0.6236j) | (0.3634 + 0.0671j) |
| 206 | (0.0958 + 0.7708j) | (0.202 + 0.4379j) |
| 207 | (0.0927 + 0.6249j) | (0.2195 + 0.0627j) |
| 208 | (0.7555 − 0.5917j) | (−0.3572 − 0.3189j) |
| 209 | (0.8805 − 0.715j) | (−0.3645 − 0.1912j) |
| 210 | (0.7434 + 0.6016j) | (−0.2071 − 0.3094j) |
| 211 | (0.8701 + 0.7261j) | (−0.2152 − 0.1813j) |
| 212 | (0.9663 − 0.0933j) | (0.3612 − 0.3139j) |
| 213 | (1.1382 − 0.1046j) | (0.3637 − 0.1844j) |
| 214 | (0.9617 + 0.1077j) | (0.2159 − 0.3054j) |
| 215 | (1.1339 + 0.1207j) | (0.2181 − 0.1782j) |
| 216 | (0.6318 − 0.4615j) | (−0.3602 + 0.3131j) |
| 217 | (0.525 − 0.3414j) | (−0.361 + 0.1865j) |
| 218 | (0.6265 + 0.4726j) | (−0.2146 + 0.3078j) |
| 219 | (0.5164 + 0.3477j) | (−0.2214 + 0.187j) |
| 220 | (0.795 − 0.0914j) | (0.3586 + 0.3214j) |
| 221 | (0.6293 − 0.0901j) | (0.3616 + 0.1939j) |
| 222 | (0.7951 + 0.0982j) | (0.2086 + 0.3082j) |
| 223 | (0.6326 + 0.1012j) | (0.2147 + 0.1801j) |
| 224 | (0.4667 − 0.8203j) | (−0.4985 − 0.4678j) |
| 225 | (0.5406 − 0.9826j) | (−0.5089 − 0.0659j) |
| 226 | (0.4585 + 0.827j) | (−0.0658 − 0.4274j) |
| 227 | (0.5299 + 0.9888j) | (−0.0741 − 0.0613j) |
| 228 | (0.2871 − 0.902j) | (0.5103 − 0.4618j) |
| 229 | (0.3345 − 1.0594j) | (0.5132 − 0.0606j) |
| 230 | (0.2773 − 0.8994j) | (0.0681 − 0.4285j) |
| 231 | (0.3241 + 1.0686j) | (0.0758 − 0.0607j) |
| 232 | (0.4021 − 0.6614j) | (−0.5094 + 0.4606j) |
| 233 | (0.3489 − 0.5163j) | (−0.5092 + 0.0609j) |
| 234 | (0.3966 + 0.6663j) | (−0.073 + 0.4284j) |
| 235 | (0.3383 + 0.5148j) | (−0.068 + 0.0594j) |
| 236 | (0.2267 − 0.7435j) | (0.5029 + 0.4687j) |
| 237 | (0.1686 − 0.6051j) | (0.5118 + 0.0715j) |
| 238 | (0.217 + 0.7431j) | (0.0645 + 0.4234j) |
| 239 | (0.1593 + 0.6089j) | (0.075 + 0.0621j) |
| 240 | (0.8506 − 0.4537j) | (−0.5062 − 0.3344j) |
| 241 | (1.003 − 0.532j) | (−0.5069 − 0.2014j) |
| 242 | (0.8401 + 0.4644j) | (−0.0709 − 0.3015j) |
| 243 | (0.9958 + 0.5484j) | (−0.0716 − 0.1761j) |
| 244 | (0.9293 − 0.2696j) | (0.5109 − 0.3256j) |
| 245 | (1.0919 − 0.3262j) | (0.5134 − 0.1941j) |
| 246 | (0.9291 + 0.2847j) | (0.0739 − 0.3015j) |
| 247 | (1.0848 + 0.3413j) | (0.0733 − 0.1766j) |
| 248 | (0.6916 − 0.3755j) | (−0.5106 + 0.3233j) |
| 249 | (0.5505 − 0.305j) | (−0.5106 + 0.1935j) |
| 250 | (0.6919 + 0.3891j) | (−0.0733 + 0.2979j) |
| 251 | (0.5408 + 0.309j) | (−0.0729 + 0.1793j) |
| 252 | (0.7709 − 0.201j) | (0.5078 + 0.3338j) |
| 253 | (0.6217 − 0.139j) | (0.5098 + 0.2009j) |
| 254 | (0.7696 + 0.216j) | (0.0676 + 0.3007j) |
| 255 | (0.616 + 0.1473j) | (0.0729 + 0.1779j) |

Bit-to-Symbol Mapping for 1024-Modulation Order Schemes

An example of the bit-to-symbol mapping for 1024-ary non-uniform constellations from various embodiments discussed above, including (a) quadrant Lagrangian method (QSL), (b) quadrant symmetric constraint (QSC), and (c) rectangular structure constraint (RSC) for code rates ⅗ is given in TABLE 8 and for code rate 4/5 is given in TABLE 9:

TABLE 8

An example of the bit-to-symbol mapping for 1024-ary non-uniform constellations from NN for code rate 3/5

| Mapping | NN_QSL | NN_QSC | NN_RSC |
|---|---|---|---|
| 0 | (−0.4436 + 0.1629j) | (0.1882 + 0.0524j) | (−0.3051 − 0.3051j) |
| 1 | (−0.3972 + 0.9864j) | (0.1882 − 0.0524j) | (−0.3051 − 0.3045j) |
| 2 | (−0.4398 + 0.2783j) | (−0.1882 + 0.0524j) | (−0.3051 − 0.7193j) |
| 3 | (−0.4297 + 0.6732j) | (−0.1882 − 0.0524j) | (−0.3051 − 0.7851j) |
| 4 | (−0.0602 + 0.1666j) | (0.1889 + 0.0525j) | (−0.3051 + 0.3039j) |
| 5 | (−0.0498 + 0.8944j) | (0.1889 − 0.0525j) | (−0.3051 + 0.3027j) |
| 6 | (−0.0583 + 0.283j) | (−0.1889 + 0.0525j) | (−0.3051 + 0.7189j) |
| 7 | (−0.0629 + 0.6689j) | (−0.1889 − 0.0525j) | (−0.3051 + 0.7866j) |
| 8 | (−0.4539 + 0.1628j) | (0.1383 + 0.3806j) | (−0.3051 − 0.4316j) |
| 9 | (−0.4065 + 0.8715j) | (0.1383 − 0.3806j) | (−0.3051 − 0.4374j) |
| 10 | (−0.4512 + 0.2785j) | (−0.1383 + 0.3806j) | (−0.3051 − 0.5905j) |
| 11 | (−0.4253 + 0.7369j) | (−0.1383 − 0.3806j) | (−0.3051 − 0.5662j) |
| 12 | (−0.0591 + 0.1668j) | (0.1413 + 0.3788j) | (−0.3051 + 0.4309j) |
| 13 | (−0.0678 + 0.8242j) | (0.1413 − 0.3788j) | (−0.3051 + 0.4375j) |
| 14 | (−0.0612 + 0.2851j) | (−0.1413 + 0.3788j) | (−0.3051 + 0.5905j) |
| 15 | (−0.063 + 0.7017j) | (−0.1413 − 0.3788j) | (−0.3051 + 0.5676j) |
| 16 | (−0.4427 + 0.1627j) | (1.1863 + 0.2942j) | (−0.3051 − 0.1795j) |
| 17 | (−0.4016 + 0.994j) | (1.1863 − 0.2942j) | (−0.3051 − 0.1792j) |
| 18 | (−0.4387 + 0.2802j) | (−1.1863 + 0.2942j) | (−0.3051 − 1.0559j) |
| 19 | (−0.4308 + 0.6764j) | (−1.1863 − 0.2942j) | (−0.3051 − 0.919j) |
| 20 | (−0.0611 + 0.1684j) | (1.149 + 0.406j) | (−0.3051 + 0.1794j) |
| 21 | (−0.0514 + 0.8961j) | (1.149 − 0.406j) | (−0.3051 + 0.1796j) |
| 22 | (−0.0619 + 0.284j) | (−1.149 + 0.406j) | (−0.3051 + 1.0561j) |
| 23 | (−0.0595 + 0.668j) | (−1.149 − 0.406j) | (−0.3051 + 0.9201j) |
| 24 | (−0.4556 + 0.162j) | (0.2812 + 1.0761j) | (−0.3051 − 0.0609j) |
| 25 | (−0.4051 + 0.8665j) | (0.2812 − 1.0761j) | (−0.3051 − 0.0607j) |
| 26 | (−0.4501 + 0.2784j) | (−0.2812 + 1.0761j) | (−0.3051 − 1.2271j) |
| 27 | (−0.4242 + 0.7339j) | (−0.2812 − 1.0761j) | (−0.3051 − 1.4453j) |
| 28 | (−0.0613 + 0.1682j) | (0.3918 + 1.0585j) | (−0.3051 + 0.0601j) |
| 29 | (−0.0681 + 0.8258j) | (0.3918 − 1.0585j) | (−0.3051 + 0.0601j) |
| 30 | (−0.0614 + 0.2838j) | (−0.3918 + 1.0585j) | (−0.3051 + 1.228j) |
| 31 | (−0.0642 + 0.7042j) | (−0.3918 − 1.0585j) | (−0.3051 + 1.4486j) |
| 32 | (−0.4433 + 0.0562j) | (0.0634 + 0.052j) | (−0.3045 − 0.3051j) |
| 33 | (−0.3879 + 1.1503j) | (0.0634 − 0.052j) | (−0.3045 − 0.3045j) |
| 34 | (−0.4381 + 0.3983j) | (−0.0634 + 0.052j) | (−0.3045 − 0.7193j) |
| 35 | (−0.4351 + 0.544j) | (−0.0634 − 0.052j) | (−0.3045 − 0.7851j) |
| 36 | (−0.0617 + 0.0568j) | (0.0626 + 0.052j) | (−0.3045 + 0.3039j) |
| 37 | (−0.0842 + 1.6424j) | (0.0626 − 0.052j) | (−0.3045 + 0.3027j) |
| 38 | (−0.0612 + 0.4045j) | (−0.0626 + 0.052j) | (−0.3045 + 0.7189j) |
| 39 | (−0.063 + 0.5411j) | (−0.0626 − 0.052j) | (−0.3045 + 0.7866j) |
| 40 | (−0.4568 + 0.0559j) | (0.0483 + 0.3828j) | (−0.3045 − 0.4316j) |
| 41 | (−0.3739 + 1.2957j) | (0.0483 − 0.3828j) | (−0.3045 − 0.4374j) |
| 42 | (−0.4457 + 0.3965j) | (−0.0483 + 0.3828j) | (−0.3045 − 0.5905j) |
| 43 | (−0.438 + 0.5248j) | (−0.0483 − 0.3828j) | (−0.3045 − 0.5662j) |
| 44 | (−0.0621 + 0.0574j) | (0.0465 + 0.383j) | (−0.3045 + 0.4309j) |
| 45 | (−0.0719 + 1.4634j) | (0.0465 − 0.383j) | (−0.3045 + 0.4375j) |
| 46 | (−0.0624 + 0.4067j) | (−0.0465 + 0.383j) | (−0.3045 + 0.5905j) |
| 47 | (−0.0623 + 0.5313j) | (−0.0465 − 0.383j) | (−0.3045 + 0.5676j) |
| 48 | (−0.4439 + 0.0559j) | (1.2119 + 0.1779j) | (−0.3045 − 0.1795j) |
| 49 | (−0.388 + 1.1192j) | (1.2119 − 0.1779j) | (−0.3045 − 0.1792j) |
| 50 | (−0.4354 + 0.3947j) | (−1.2119 + 0.1779j) | (−0.3045 − 1.0559j) |
| 51 | (−0.4355 + 0.5456j) | (−1.2119 − 0.1779j) | (−0.3045 − 0.919j) |
| 52 | (−0.0614 + 0.058j) | (1.2248 + 0.0595j) | (−0.3045 + 0.1794j) |
| 53 | (−0.266 + 1.6246j) | (1.2248 − 0.0595j) | (−0.3045 + 0.1796j) |
| 54 | (−0.0612 + 0.4046j) | (−1.2248 + 0.0595j) | (−0.3045 + 1.0561j) |
| 55 | (−0.0626 + 0.5408j) | (−1.2248 − 0.0595j) | (−0.3045 + 0.9201j) |
| 56 | (−0.4569 + 0.055j) | (0.1696 + 1.0853j) | (−0.3045 − 0.0609j) |
| 57 | (−0.3281 + 1.4063j) | (0.1696 − 1.0853j) | (−0.3045 − 0.0607j) |
| 58 | (−0.4444 + 0.3973j) | (−0.1696 + 1.0853j) | (−0.3045 − 1.2271j) |
| 59 | (−0.4386 + 0.5241j) | (−0.1696 − 1.0853j) | (−0.3045 − 1.4453j) |
| 60 | (−0.0617 + 0.0572j) | (0.057 + 1.0886j) | (−0.3045 + 0.0601j) |
| 61 | (−0.2102 + 1.4711j) | (0.057 − 1.0886j) | (−0.3045 + 0.0601j) |
| 62 | (−0.059 + 0.4039j) | (−0.057 + 1.0886j) | (−0.3045 + 1.228j) |
| 63 | (−0.0618 + 0.5322j) | (−0.057 − 1.0886j) | (−0.3045 + 1.4486j) |
| 64 | (−0.3132 + 0.1607j) | (0.3061 + 0.0563j) | (−0.7193 − 0.3051j) |
| 65 | (−0.2576 + 0.9857j) | (0.3061 − 0.0563j) | (−0.7193 − 0.3045j) |
| 66 | (−0.3106 + 0.2787j) | (−0.3061 + 0.0563j) | (−0.7193 − 0.7193j) |
| 67 | (−0.3064 + 0.6693j) | (−0.3061 − 0.0563j) | (−0.7193 − 0.7851j) |
| 68 | (−0.1824 + 0.166j) | (0.306 + 0.0563j) | (−0.7193 + 0.3039j) |
| 69 | (−0.1233 + 0.9671j) | (0.306 − 0.0563j) | (−0.7193 + 0.3027j) |
| 70 | (−0.1819 + 0.2796j) | (−0.306 + 0.0563j) | (−0.7193 + 0.7189j) |
| 71 | (−0.1851 + 0.6654j) | (−0.306 − 0.0563j) | (−0.7193 + 0.7866j) |
| 72 | (−0.3111 + 0.1624j) | (0.1843 + 0.4706j) | (−0.7193 − 0.4316j) |
| 73 | (−0.2822 + 0.8615j) | (0.1843 − 0.4706j) | (−0.7193 − 0.4374j) |
| 74 | (−0.3093 + 0.2794j) | (−0.1843 + 0.4706j) | (−0.7193 − 0.5905j) |
| 75 | (−0.3039 + 0.7217j) | (−0.1843 − 0.4706j) | (−0.7193 − 0.5662j) |
| 76 | (−0.1806 + 0.1652j) | (0.2033 + 0.4579j) | (−0.7193 + 0.4309j) |
| 77 | (−0.1752 + 0.8407j) | (0.2033 − 0.4579j) | (−0.7193 + 0.4375j) |
| 78 | (−0.185 + 0.2805j) | (−0.2033 + 0.4579j) | (−0.7193 + 0.5905j) |
| 79 | (−0.1838 + 0.7066j) | (−0.2033 − 0.4579j) | (−0.7193 + 0.5676j) |
| 80 | (−0.3135 + 0.1615j) | (1.291 + 0.3246j) | (−0.7193 − 0.1795j) |
| 81 | (−0.258 + 0.9839j) | (1.291 − 0.3246j) | (−0.7193 − 0.1792j) |
| 82 | (−0.3122 + 0.2776j) | (−1.291 + 0.3246j) | (−0.7193 − 1.0559j) |
| 83 | (−0.3101 + 0.6718j) | (−1.291 − 0.3246j) | (−0.7193 − 0.919j) |
| 84 | (−0.1822 + 0.1652j) | (1.2498 + 0.4482j) | (−0.7193 + 0.1794j) |
| 85 | (−0.1249 + 0.9632j) | (1.2498 − 0.4482j) | (−0.7193 + 0.1796j) |
| 86 | (−0.1832 + 0.2813j) | (−1.2498 + 0.4482j) | (−0.7193 + 1.0561j) |
| 87 | (−0.1845 + 0.6644j) | (−1.2498 − 0.4482j) | (−0.7193 + 0.9201j) |
| 88 | (−0.3089 + 0.1662j) | (0.2952 + 1.1878j) | (−0.7193 − 0.0609j) |
| 89 | (−0.2832 + 0.8595j) | (0.2952 − 1.1878j) | (−0.7193 − 0.0607j) |
| 90 | (−0.3096 + 0.2789j) | (−0.2952 + 1.1878j) | (−0.7193 − 1.2271j) |
| 91 | (−0.3021 + 0.7201j) | (−0.2952 − 1.1878j) | (−0.7193 − 1.4453j) |
| 92 | (−0.1826 + 0.164j) | (0.4147 + 1.1678j) | (−0.7193 + 0.0601j) |
| 93 | (−0.1764 + 0.8416j) | (0.4147 − 1.1678j) | (−0.7193 + 0.0601j) |
| 94 | (−0.1823 + 0.2813j) | (−0.4147 + 1.1678j) | (−0.7193 + 1.228j) |
| 95 | (−0.1847 + 0.7051j) | (−0.4147 − 1.1678j) | (−0.7193 + 1.4486j) |
| 96 | (−0.3148 + 0.0557j) | (0.4542 + 0.0691j) | (−0.7851 − 0.3051j) |
| 97 | (−0.2397 + 1.1183j) | (0.4542 − 0.0691j) | (−0.7851 − 0.3045j) |
| 98 | (−0.312 + 0.3976j) | (−0.4542 + 0.0691j) | (−0.7851 − 0.7193j) |
| 99 | (−0.3119 + 0.5402j) | (−0.4542 − 0.0691j) | (−0.7851 − 0.7851j) |
| 100 | (−0.1822 + 0.0543j) | (0.4539 + 0.069j) | (−0.7851 + 0.3039j) |
| 101 | (−0.0747 + 1.098j) | (0.4539 − 0.069j) | (−0.7851 + 0.3027j) |
| 102 | (−0.1814 + 0.3982j) | (−0.4539 + 0.069j) | (−0.7851 + 0.7189j) |
| 103 | (−0.1849 + 0.5416j) | (−0.4539 − 0.069j) | (−0.7851 + 0.7866j) |
| 104 | (−0.3132 + 0.0555j) | (0.0723 + 0.5171j) | (−0.7851 − 0.4316j) |
| 105 | (−0.2252 + 1.2542j) | (0.0723 − 0.5171j) | (−0.7851 − 0.4374j) |
| 106 | (−0.3079 + 0.3991j) | (−0.0723 + 0.5171j) | (−0.7851 − 0.5905j) |
| 107 | (−0.3118 + 0.5237j) | (−0.0723 − 0.5171j) | (−0.7851 − 0.5662j) |
| 108 | (−0.1825 + 0.0554j) | (0.0491 + 0.5202j) | (−0.7851 + 0.4309j) |
| 109 | (−0.0704 + 1.2881j) | (0.0491 − 0.5202j) | (−0.7851 + 0.4375j) |
| 110 | (−0.1825 + 0.4018j) | (−0.0491 + 0.5202j) | (−0.7851 + 0.5905j) |
| 111 | (−0.1827 + 0.5292j) | (−0.0491 − 0.5202j) | (−0.7851 + 0.5676j) |
| 112 | (−0.315 + 0.0547j) | (1.3191 + 0.1962j) | (−0.7851 − 0.1795j) |
| 113 | (−0.2356 + 1.1172j) | (1.3191 − 0.1962j) | (−0.7851 − 0.1792j) |
| 114 | (−0.3117 + 0.3978j) | (−1.3191 + 0.1962j) | (−0.7851 − 1.0559j) |
| 115 | (−0.3121 + 0.5414j) | (−1.3191 − 0.1962j) | (−0.7851 − 0.919j) |
| 116 | (−0.1835 + 0.0561j) | (1.3334 + 0.0658j) | (−0.7851 + 0.1794j) |
| 117 | (−0.0758 + 1.1042j) | (1.3334 − 0.0658j) | (−0.7851 + 0.1796j) |
| 118 | (−0.1826 + 0.3999j) | (−1.3334 + 0.0658j) | (−0.7851 + 1.0561j) |
| 119 | (−0.1849 + 0.5419j) | (−1.3334 − 0.0658j) | (−0.7851 + 0.9201j) |
| 120 | (−0.3141 + 0.056j) | (0.1765 + 1.1997j) | (−0.7851 − 0.0609j) |
| 121 | (−0.2127 + 1.2612j) | (0.1765 − 1.1997j) | (−0.7851 − 0.0607j) |
| 122 | (−0.3091 + 0.3983j) | (−0.1765 + 1.1997j) | (−0.7851 − 1.2271j) |
| 123 | (−0.3108 + 0.524j) | (−0.1765 − 1.1997j) | (−0.7851 − 1.4453j) |
| 124 | (−0.183 + 0.0551j) | (0.0588 + 1.204j) | (−0.7851 + 0.0601j) |
| 125 | (−0.0822 + 1.2574j) | (0.0588 − 1.204j) | (−0.7851 + 0.0601j) |
| 126 | (−0.1837 + 0.4026j) | (−0.0588 + 1.204j) | (−0.7851 + 1.228j) |
| 127 | (−0.1833 + 0.5306j) | (−0.0588 − 1.204j) | (−0.7851 + 1.4486j) |
| 128 | (0.4457 + 0.1663j) | (0.1844 + 0.0517j) | (0.3039 − 0.3051j) |
| 129 | (0.4021 + 0.9839j) | (0.1844 − 0.0517j) | (0.3039 − 0.3045j) |
| 130 | (0.4379 + 0.2808j) | (−0.1844 + 0.0517j) | (0.3039 − 0.7193j) |
| 131 | (0.4325 + 0.6762j) | (−0.1844 − 0.0517j) | (0.3039 − 0.7851j) |
| 132 | (0.0631 + 0.1645j) | (0.185 + 0.0518j) | (0.3039 + 0.3039j) |
| 133 | (0.0535 + 0.8976j) | (0.185 − 0.0518j) | (0.3039 + 0.3027j) |
| 134 | (0.0623 + 0.2853j) | (−0.185 + 0.0518j) | (0.3039 + 0.7189j) |
| 135 | (0.063 + 0.6686j) | (−0.185 − 0.0518j) | (0.3039 + 0.7866j) |
| 136 | (0.4544 + 0.1646j) | (0.1366 + 0.3818j) | (0.3039 − 0.4316j) |
| 137 | (0.4085 + 0.8717j) | (0.1366 − 0.3818j) | (0.3039 − 0.4374j) |
| 138 | (0.4495 + 0.2802j) | (−0.1366 + 0.3818j) | (0.3039 − 0.5905j) |
| 139 | (0.4239 + 0.7355j) | (−0.1366 − 0.3818j) | (0.3039 − 0.5662j) |
| 140 | (0.0616 + 0.1678j) | (0.1396 + 0.3793j) | (0.3039 + 0.4309j) |
| 141 | (0.0717 + 0.8232j) | (0.1396 − 0.3793j) | (0.3039 + 0.4375j) |
| 142 | (0.0601 + 0.2845j) | (−0.1396 + 0.3793j) | (0.3039 + 0.5905j) |
| 143 | (0.0643 + 0.7007j) | (−0.1396 − 0.3793j) | (0.3039 + 0.5676j) |
| 144 | (0.4433 + 0.1641j) | (1.0929 + 0.2663j) | (0.3039 − 0.1795j) |
| 145 | (0.4014 + 0.9946j) | (1.0929 − 0.2663j) | (0.3039 − 0.1792j) |
| 146 | (0.4407 + 0.2809j) | (−1.0929 + 0.2663j) | (0.3039 − 1.0559j) |
| 147 | (0.4318 + 0.6767j) | (−1.0929 − 0.2663j) | (0.3039 − 0.919j) |

TABLE 8-continued

An example of the bit-to-symbol mapping for 1024-ary non-uniform constellations from NN for code rate 3/5

| Mapping | NN_QSL | NN_QSC | NN_RSC |
|---|---|---|---|
| 148 | (0.0596 + 0.1661j) | (1.0591 + 0.3672j) | (0.3039 + 0.1794j) |
| 149 | (0.0534 + 0.8952j) | (1.0591 − 0.3672j) | (0.3039 + 0.1796j) |
| 150 | (0.0624 + 0.2838j) | (−1.0591 + 0.3672j) | (0.3039 + 1.0561j) |
| 151 | (0.0623 + 0.6658j) | (−1.0591 − 0.3672j) | (0.3039 + 0.9201j) |
| 152 | (0.4542 + 0.1627j) | (0.2721 + 0.9816j) | (0.3039 − 0.0609j) |
| 153 | (0.4078 + 0.8696j) | (0.2721 − 0.9816j) | (0.3039 − 0.0607j) |
| 154 | (0.453 + 0.2821j) | (−0.2721 + 0.9816j) | (0.3039 − 1.2271j) |
| 155 | (0.4271 + 0.7389j) | (−0.2721 − 0.9816j) | (0.3039 − 1.4453j) |
| 156 | (0.0592 + 0.1678j) | (0.3739 + 0.9631j) | (0.3039 + 0.0601j) |
| 157 | (0.0682 + 0.8215j) | (0.3739 − 0.9631j) | (0.3039 + 0.0601j) |
| 158 | (0.0599 + 0.2834j) | (−0.3739 + 0.9631j) | (0.3039 + 1.228j) |
| 159 | (0.0644 + 0.7j) | (−0.3739 − 0.9631j) | (0.3039 + 1.4486j) |
| 160 | (0.4431 + 0.0571j) | (0.064 + 0.0515j) | (0.3027 − 0.3051j) |
| 161 | (0.3957 + 1.1527j) | (0.064 − 0.0515j) | (0.3027 − 0.3045j) |
| 162 | (0.4383 + 0.3959j) | (−0.064 + 0.0515j) | (0.3027 − 0.7193j) |
| 163 | (0.4369 + 0.5469j) | (−0.064 − 0.0515j) | (0.3027 − 0.7851j) |
| 164 | (0.0585 + 0.0556j) | (0.0631 + 0.0515j) | (0.3027 + 0.3039j) |
| 165 | (0.0883 + 1.6505j) | (0.0631 − 0.0515j) | (0.3027 + 0.3027j) |
| 166 | (0.0615 + 0.4042j) | (−0.0631 + 0.0515j) | (0.3027 + 0.7189j) |
| 167 | (0.0631 + 0.5409j) | (−0.0631 − 0.0515j) | (0.3027 + 0.7866j) |
| 168 | (0.4538 + 0.0562j) | (0.0485 + 0.3857j) | (0.3027 − 0.4316j) |
| 169 | (0.3742 + 1.2962j) | (0.0485 − 0.3857j) | (0.3027 − 0.4374j) |
| 170 | (0.4493 + 0.3995j) | (−0.0485 + 0.3857j) | (0.3027 − 0.5905j) |
| 171 | (0.441 + 0.5283j) | (−0.0485 − 0.3857j) | (0.3027 − 0.5662j) |
| 172 | (0.0605 + 0.0567j) | (0.0466 + 0.3859j) | (0.3027 + 0.4309j) |
| 173 | (0.0749 + 1.4616j) | (0.0466 − 0.3859j) | (0.3027 + 0.4375j) |
| 174 | (0.0639 + 0.4059j) | (−0.0466 + 0.3859j) | (0.3027 + 0.5905j) |
| 175 | (0.0621 + 0.5316j) | (−0.0466 − 0.3859j) | (0.3027 + 0.5676j) |
| 176 | (0.4428 + 0.0576j) | (1.117 + 0.1611j) | (0.3027 − 0.1795j) |
| 177 | (0.3942 + 1.1194j) | (1.117 − 0.1611j) | (0.3027 − 0.1792j) |
| 178 | (0.4395 + 0.396j) | (−1.117 + 0.1611j) | (0.3027 − 1.0559j) |
| 179 | (0.4386 + 0.5472j) | (−1.117 − 0.1611j) | (0.3027 − 0.919j) |
| 180 | (0.0632 + 0.0565j) | (1.1289 + 0.0541j) | (0.3027 + 0.1794j) |
| 181 | (0.2742 + 1.6248j) | (1.1289 − 0.0541j) | (0.3027 + 0.1796j) |
| 182 | (0.0605 + 0.4048j) | (−1.1289 + 0.0541j) | (0.3027 + 1.0561j) |
| 183 | (0.062 + 0.5419j) | (−1.1289 − 0.0541j) | (0.3027 + 0.9201j) |
| 184 | (0.4557 + 0.0557j) | (0.1662 + 0.9932j) | (0.3027 − 0.0609j) |
| 185 | (0.3307 + 1.4037j) | (0.1662 − 0.9932j) | (0.3027 − 0.0607j) |
| 186 | (0.4473 + 0.3995j) | (−0.1662 + 0.9932j) | (0.3027 − 1.2271j) |
| 187 | (0.4414 + 0.5267j) | (−0.1662 − 0.9932j) | (0.3027 − 1.4453j) |
| 188 | (0.0626 + 0.0554j) | (0.0565 + 0.9992j) | (0.3027 + 0.0601j) |
| 189 | (0.2129 + 1.4638j) | (0.0565 − 0.9992j) | (0.3027 + 0.0601j) |
| 190 | (0.0631 + 0.4059j) | (−0.0565 + 0.9992j) | (0.3027 + 1.228j) |
| 191 | (0.0617 + 0.5321j) | (−0.0565 − 0.9992j) | (0.3027 + 1.4486j) |
| 192 | (0.3132 + 0.1639j) | (0.3195 + 0.0553j) | (0.7189 − 0.3051j) |
| 193 | (0.2618 + 0.9824j) | (0.3195 − 0.0553j) | (0.7189 − 0.3045j) |
| 194 | (0.3131 + 0.281j) | (−0.3195 + 0.0553j) | (0.7189 − 0.7193j) |
| 195 | (0.3103 + 0.6676j) | (−0.3195 − 0.0553j) | (0.7189 − 0.7851j) |
| 196 | (0.1815 + 0.1665j) | (0.3192 + 0.0552j) | (0.7189 + 0.3039j) |
| 197 | (0.1257 + 0.965j) | (0.3192 − 0.0552j) | (0.7189 + 0.3027j) |
| 198 | (0.1836 + 0.2838j) | (−0.3192 + 0.0552j) | (0.7189 + 0.7189j) |
| 199 | (0.1883 + 0.6668j) | (−0.3192 − 0.0552j) | (0.7189 + 0.7866j) |
| 200 | (0.312 + 0.1625j) | (0.1726 + 0.4754j) | (0.7189 − 0.4316j) |
| 201 | (0.2852 + 0.8597j) | (0.1726 − 0.4754j) | (0.7189 − 0.4374j) |
| 202 | (0.3108 + 0.2809j) | (−0.1726 + 0.4754j) | (0.7189 − 0.5905j) |
| 203 | (0.3047 + 0.7226j) | (−0.1726 − 0.4754j) | (0.7189 − 0.5662j) |
| 204 | (0.1829 + 0.1648j) | (0.1882 + 0.4624j) | (0.7189 + 0.4309j) |
| 205 | (0.178 + 0.8411j) | (0.1882 − 0.4624j) | (0.7189 + 0.4375j) |
| 206 | (0.1828 + 0.2832j) | (−0.1882 + 0.4624j) | (0.7189 + 0.5905j) |
| 207 | (0.1865 + 0.7073j) | (−0.1882 − 0.4624j) | (0.7189 + 0.5676j) |
| 208 | (0.3135 + 0.1635j) | (1.4104 + 0.3594j) | (0.7189 − 0.1795j) |
| 209 | (0.2594 + 0.982j) | (1.4104 − 0.3594j) | (0.7189 − 0.1792j) |
| 210 | (0.3133 + 0.2798j) | (−1.4104 + 0.3594j) | (0.7189 − 1.0559j) |
| 211 | (0.3112 + 0.6688j) | (−1.4104 − 0.3594j) | (0.7189 − 0.919j) |
| 212 | (0.1821 + 0.1627j) | (1.3645 + 0.4968j) | (0.7189 + 0.1794j) |
| 213 | (0.1269 + 0.9655j) | (1.3645 − 0.4968j) | (0.7189 + 0.1796j) |
| 214 | (0.1846 + 0.2836j) | (−1.3645 + 0.4968j) | (0.7189 + 1.0561j) |
| 215 | (0.1886 + 0.6651j) | (−1.3645 − 0.4968j) | (0.7189 + 0.9201j) |
| 216 | (0.3109 + 0.1627j) | (0.3164 + 1.315j) | (0.7189 − 0.0609j) |
| 217 | (0.2846 + 0.8585j) | (0.3164 − 1.315j) | (0.7189 − 0.0607j) |
| 218 | (0.3092 + 0.2805j) | (−0.3164 + 1.315j) | (0.7189 − 1.2271j) |
| 219 | (0.3047 + 0.7224j) | (−0.3164 − 1.315j) | (0.7189 − 1.4453j) |
| 220 | (0.1841 + 0.1645j) | (0.4451 + 1.2916j) | (0.7189 + 0.0601j) |
| 221 | (0.1766 + 0.8398j) | (0.4451 − 1.2916j) | (0.7189 + 0.0601j) |
| 222 | (0.1861 + 0.2834j) | (−0.4451 + 1.2916j) | (0.7189 + 1.228j) |
| 223 | (0.1861 + 0.7085j) | (−0.4451 − 1.2916j) | (0.7189 + 1.4486j) |
| 224 | (0.3139 + 0.0565j) | (0.421 + 0.0652j) | (0.7866 − 0.3051j) |
| 225 | (0.244 + 1.1191j) | (0.421 − 0.0652j) | (0.7866 − 0.3045j) |
| 226 | (0.3103 + 0.3997j) | (−0.421 + 0.0652j) | (0.7866 − 0.7193j) |
| 227 | (0.3129 + 0.5431j) | (−0.421 − 0.0652j) | (0.7866 − 0.7851j) |
| 228 | (0.1826 + 0.055j) | (0.4209 + 0.065j) | (0.7866 + 0.3039j) |
| 229 | (0.08 + 1.0978j) | (0.4209 − 0.065j) | (0.7866 + 0.3027j) |
| 230 | (0.1845 + 0.3999j) | (−0.4209 + 0.065j) | (0.7866 + 0.7189j) |
| 231 | (0.1848 + 0.5411j) | (−0.4209 − 0.065j) | (0.7866 + 0.7866j) |
| 232 | (0.3114 + 0.0559j) | (0.0738 + 0.5142j) | (0.7866 − 0.4316j) |
| 233 | (0.2295 + 1.2458j) | (0.0738 − 0.5142j) | (0.7866 − 0.4374j) |
| 234 | (0.3098 + 0.4037j) | (−0.0738 + 0.5142j) | (0.7866 − 0.5905j) |
| 235 | (0.3121 + 0.5282j) | (−0.0738 − 0.5142j) | (0.7866 − 0.5662j) |
| 236 | (0.1809 + 0.0553j) | (0.0509 + 0.5166j) | (0.7866 + 0.4309j) |
| 237 | (0.0743 + 1.289j) | (0.0509 − 0.5166j) | (0.7866 + 0.4375j) |
| 238 | (0.1838 + 0.4025j) | (−0.0509 + 0.5166j) | (0.7866 + 0.5905j) |
| 239 | (0.1844 + 0.531j) | (−0.0509 − 0.5166j) | (0.7866 + 0.5676j) |
| 240 | (0.3124 + 0.0574j) | (1.4413 + 0.2175j) | (0.7866 − 0.1795j) |
| 241 | (0.2377 + 1.1143j) | (1.4413 − 0.2175j) | (0.7866 − 0.1792j) |
| 242 | (0.3127 + 0.3984j) | (−1.4413 + 0.2175j) | (0.7866 − 1.0559j) |
| 243 | (0.3142 + 0.5418j) | (−1.4413 − 0.2175j) | (0.7866 − 0.919j) |
| 244 | (0.1843 + 0.0564j) | (1.4575 + 0.0727j) | (0.7866 + 0.1794j) |
| 245 | (0.0788 + 1.1019j) | (1.4575 − 0.0727j) | (0.7866 + 0.1796j) |
| 246 | (0.1841 + 0.4031j) | (−1.4575 + 0.0727j) | (0.7866 + 1.0561j) |
| 247 | (0.1849 + 0.543j) | (−1.4575 − 0.0727j) | (0.7866 + 0.9201j) |
| 248 | (0.311 + 0.0564j) | (0.1885 + 1.329j) | (0.7866 − 0.0609j) |
| 249 | (0.2161 + 1.2595j) | (0.1885 − 1.329j) | (0.7866 − 0.0607j) |
| 250 | (0.3124 + 0.4009j) | (−0.1885 + 1.329j) | (0.7866 − 1.2271j) |
| 251 | (0.3127 + 0.5274j) | (−0.1885 − 1.329j) | (0.7866 − 1.4453j) |
| 252 | (0.1827 + 0.0558j) | (0.0624 + 1.3354j) | (0.7866 + 0.0601j) |
| 253 | (0.0798 + 1.2563j) | (0.0624 − 1.3354j) | (0.7866 + 0.0601j) |
| 254 | (0.1836 + 0.4039j) | (−0.0624 + 1.3354j) | (0.7866 + 1.228j) |
| 255 | (0.1833 + 0.5285j) | (−0.0624 − 1.3354j) | (0.7866 + 1.4486j) |
| 256 | (−0.4463 − 0.1639j) | (0.1855 + 0.1634j) | (−0.4316 − 0.3051j) |
| 257 | (−0.4012 − 0.9844j) | (0.1855 − 0.1634j) | (−0.4316 − 0.3045j) |
| 258 | (−0.4402 − 0.2796j) | (−0.1855 + 0.1634j) | (−0.4316 − 0.7193j) |
| 259 | (−0.431 − 0.6768j) | (−0.1855 − 0.1634j) | (−0.4316 − 0.7851j) |
| 260 | (−0.0611 − 0.1653j) | (0.1855 + 0.1632j) | (−0.4316 + 0.3039j) |
| 261 | (−0.054 − 0.8956j) | (0.1855 − 0.1632j) | (−0.4316 + 0.3027j) |
| 262 | (−0.0593 − 0.2844j) | (−0.1855 + 0.1632j) | (−0.4316 + 0.7189j) |
| 263 | (−0.0637 − 0.6671j) | (−0.1855 − 0.1632j) | (−0.4316 + 0.7866j) |
| 264 | (−0.4571 − 0.1634j) | (0.1677 + 0.2795j) | (−0.4316 − 0.4316j) |
| 265 | (−0.4078 − 0.8694j) | (0.1677 − 0.2795j) | (−0.4316 − 0.4374j) |
| 266 | (−0.4542 − 0.2825j) | (−0.1677 + 0.2795j) | (−0.4316 − 0.5905j) |
| 267 | (−0.4268 − 0.7398j) | (−0.1677 − 0.2795j) | (−0.4316 − 0.5662j) |
| 268 | (−0.0615 − 0.1665j) | (0.1679 + 0.2806j) | (−0.4316 + 0.4309j) |
| 269 | (−0.0668 − 0.8218j) | (0.1679 − 0.2806j) | (−0.4316 + 0.4375j) |
| 270 | (−0.0618 − 0.2836j) | (−0.1679 + 0.2806j) | (−0.4316 + 0.5905j) |
| 271 | (−0.0659 − 0.7013j) | (−0.1679 − 0.2806j) | (−0.4316 + 0.5676j) |
| 272 | (−0.4426 − 0.1658j) | (1.04 + 0.6132j) | (−0.4316 − 0.1795j) |
| 273 | (−0.4045 − 0.991j) | (1.04 − 0.6132j) | (−0.4316 − 0.1792j) |
| 274 | (−0.4439 − 0.2793j) | (−1.04 + 0.6132j) | (−0.4316 − 1.0559j) |
| 275 | (−0.4312 − 0.6763j) | (−1.04 − 0.6132j) | (−0.4316 − 0.919j) |
| 276 | (−0.0619 − 0.1669j) | (1.0999 + 0.513j) | (−0.4316 + 0.1794j) |
| 277 | (−0.0516 − 0.8964j) | (1.0999 − 0.513j) | (−0.4316 + 0.1796j) |
| 278 | (−0.0606 − 0.2841j) | (−1.0999 + 0.513j) | (−0.4316 + 1.0561j) |
| 279 | (−0.0621 − 0.6653j) | (−1.0999 − 0.513j) | (−0.4316 + 0.9201j) |
| 280 | (−0.4562 − 0.1637j) | (0.6058 + 0.989j) | (−0.4316 − 0.0609j) |
| 281 | (−0.4091 − 0.8668j) | (0.6058 − 0.989j) | (−0.4316 − 0.0607j) |
| 282 | (−0.4518 − 0.2793j) | (−0.6058 + 0.989j) | (−0.4316 − 1.2271j) |
| 283 | (−0.4263 − 0.7353j) | (−0.6058 − 0.989j) | (−0.4316 − 1.4453j) |
| 284 | (−0.0616 − 0.1664j) | (0.5002 + 1.0297j) | (−0.4316 + 0.0601j) |
| 285 | (−0.0694 − 0.8212j) | (0.5002 − 1.0297j) | (−0.4316 + 0.0601j) |
| 286 | (−0.0621 − 0.2859j) | (−0.5002 + 1.0297j) | (−0.4316 + 1.228j) |
| 287 | (−0.0638 − 0.6996j) | (−0.5002 − 1.0297j) | (−0.4316 + 1.4486j) |
| 288 | (−0.4441 − 0.0564j) | (0.0642 + 0.1537j) | (−0.4374 − 0.3051j) |
| 289 | (−0.3921 − 1.1538j) | (0.0642 − 0.1537j) | (−0.4374 − 0.3045j) |
| 290 | (−0.4389 − 0.3984j) | (−0.0642 + 0.1537j) | (−0.4374 − 0.7193j) |
| 291 | (−0.4375 − 0.5492j) | (−0.0642 − 0.1537j) | (−0.4374 − 0.7851j) |
| 292 | (−0.0601 − 0.0565j) | (0.0641 + 0.1536j) | (−0.4374 + 0.3039j) |
| 293 | (−0.085 − 1.6521j) | (0.0641 − 0.1536j) | (−0.4374 + 0.3027j) |
| 294 | (−0.0621 − 0.4039j) | (−0.0641 + 0.1536j) | (−0.4374 + 0.7189j) |
| 295 | (−0.0628 − 0.5387j) | (−0.0641 − 0.1536j) | (−0.4374 + 0.7866j) |

TABLE 8-continued

An example of the bit-to-symbol mapping for 1024-ary non-uniform constellations from NN for code rate 3/5

| Mapping | NN_QSL | NN_QSC | NN_RSC |
|---|---|---|---|
| 296 | (−0.4565 − 0.0576j) | (0.0555 + 0.2577j) | (−0.4374 − 0.4316j) |
| 297 | (−0.3747 − 1.294j) | (0.0555 − 0.2577j) | (−0.4374 − 0.4374j) |
| 298 | (−0.4464 − 0.4017j) | (−0.0555 + 0.2577j) | (−0.4374 − 0.5905j) |
| 299 | (−0.4436 − 0.5288j) | (−0.0555 − 0.2577j) | (−0.4374 − 0.5662j) |
| 300 | (−0.061 − 0.0561j) | (0.0554 + 0.2578j) | (−0.4374 + 0.4309j) |
| 301 | (−0.0721 − 1.4593j) | (0.0554 − 0.2578j) | (−0.4374 + 0.4375j) |
| 302 | (−0.0618 − 0.4061j) | (−0.0554 + 0.2578j) | (−0.4374 + 0.5905j) |
| 303 | (−0.0635 − 0.5302j) | (−0.0554 − 0.2578j) | (−0.4374 + 0.5676j) |
| 304 | (−0.4456 − 0.0571j) | (0.9702 + 0.7075j) | (−0.4374 − 0.1795j) |
| 305 | (−0.3904 − 1.1162j) | (0.9702 − 0.7075j) | (−0.4374 − 0.1792j) |
| 306 | (−0.4383 − 0.3992j) | (−0.9702 + 0.7075j) | (−0.4374 − 1.0559j) |
| 307 | (−0.4379 − 0.5468j) | (−0.9702 − 0.7075j) | (−0.4374 − 0.919j) |
| 308 | (−0.062 − 0.0559j) | (0.8908 + 0.7938j) | (−0.4374 + 0.1794j) |
| 309 | (−0.2695 − 1.6295j) | (0.8908 − 0.7938j) | (−0.4374 + 0.1796j) |
| 310 | (−0.062 − 0.4037j) | (−0.8908 + 0.7938j) | (−0.4374 + 1.0561j) |
| 311 | (−0.0627 − 0.5416j) | (−0.8908 − 0.7938j) | (−0.4374 + 0.9201j) |
| 312 | (−0.4568 − 0.0577j) | (0.7072 + 0.9358j) | (−0.4374 − 0.0609j) |
| 313 | (−0.3298 − 1.3989j) | (0.7072 − 0.9358j) | (−0.4374 − 0.0607j) |
| 314 | (−0.4467 − 0.3999j) | (−0.7072 + 0.9358j) | (−0.4374 − 1.2271j) |
| 315 | (−0.4404 − 0.5285j) | (−0.7072 − 0.9358j) | (−0.4374 − 1.4453j) |
| 316 | (−0.0612 − 0.0559j) | (0.8023 + 0.8711j) | (−0.4374 + 0.0601j) |
| 317 | (−0.2128 − 1.4708j) | (0.8023 − 0.8711j) | (−0.4374 + 0.0601j) |
| 318 | (−0.0618 − 0.4046j) | (−0.8023 + 0.8711j) | (−0.4374 + 1.228j) |
| 319 | (−0.0611 − 0.5307j) | (−0.8023 − 0.8711j) | (−0.4374 + 1.4486j) |
| 320 | (−0.3159 − 0.1616j) | (0.293 + 0.1628j) | (−0.5905 − 0.3051j) |
| 321 | (−0.2603 − 0.9838j) | (0.293 − 0.1628j) | (−0.5905 − 0.3045j) |
| 322 | (−0.3145 − 0.2812j) | (−0.293 + 0.1628j) | (−0.5905 − 0.7193j) |
| 323 | (−0.3105 − 0.6693j) | (−0.293 − 0.1628j) | (−0.5905 − 0.7851j) |
| 324 | (−0.1837 − 0.1651j) | (0.293 + 0.1625j) | (−0.5905 + 0.3039j) |
| 325 | (−0.1264 − 0.9659j) | (0.293 − 0.1625j) | (−0.5905 + 0.3027j) |
| 326 | (−0.1851 − 0.2838j) | (−0.293 + 0.1625j) | (−0.5905 + 0.7189j) |
| 327 | (−0.1865 − 0.6639j) | (−0.293 − 0.1625j) | (−0.5905 + 0.7866j) |
| 328 | (−0.3126 − 0.1634j) | (0.2875 + 0.373j) | (−0.5905 − 0.4316j) |
| 329 | (−0.2876 − 0.8595j) | (0.2875 − 0.373j) | (−0.5905 − 0.4374j) |
| 330 | (−0.3108 − 0.2794j) | (−0.2875 + 0.373j) | (−0.5905 − 0.5905j) |
| 331 | (−0.3051 − 0.7213j) | (−0.2875 − 0.373j) | (−0.5905 − 0.5662j) |
| 332 | (−0.1827 − 0.1672j) | (0.2837 + 0.3794j) | (−0.5905 + 0.4309j) |
| 333 | (−0.1796 − 0.8387j) | (0.2837 − 0.3794j) | (−0.5905 + 0.4375j) |
| 334 | (−0.1859 − 0.2832j) | (−0.2837 + 0.3794j) | (−0.5905 + 0.5905j) |
| 335 | (−0.1862 − 0.7084j) | (−0.2837 − 0.3794j) | (−0.5905 + 0.5676j) |
| 336 | (−0.3155 − 0.1627j) | (1.1297 + 0.6783j) | (−0.5905 − 0.1795j) |
| 337 | (−0.2619 − 0.9855j) | (1.1297 − 0.6783j) | (−0.5905 − 0.1792j) |
| 338 | (−0.3137 − 0.2821j) | (−1.1297 + 0.6783j) | (−0.5905 − 1.0559j) |
| 339 | (−0.3101 − 0.6678j) | (−1.1297 − 0.6783j) | (−0.5905 − 0.919j) |
| 340 | (−0.183 − 0.165j) | (1.1955 + 0.5675j) | (−0.5905 + 0.1794j) |
| 341 | (−0.1247 − 0.9674j) | (1.1955 − 0.5675j) | (−0.5905 + 0.1796j) |
| 342 | (−0.1856 − 0.281j) | (−1.1955 + 0.5675j) | (−0.5905 + 1.0561j) |
| 343 | (−0.1866 − 0.6624j) | (−1.1955 − 0.5675j) | (−0.5905 + 0.9201j) |
| 344 | (−0.3119 − 0.1637j) | (0.6492 + 1.0902j) | (−0.5905 − 0.0609j) |
| 345 | (−0.2868 − 0.8599j) | (0.6492 − 1.0902j) | (−0.5905 − 0.0607j) |
| 346 | (−0.3095 − 0.2803j) | (−0.6492 + 1.0902j) | (−0.5905 − 1.2271j) |
| 347 | (−0.3061 − 0.7215j) | (−0.6492 − 1.0902j) | (−0.5905 − 1.4453j) |
| 348 | (−0.1838 − 0.1657j) | (0.5334 + 1.1357j) | (−0.5905 + 0.0601j) |
| 349 | (−0.1802 − 0.8426j) | (0.5334 − 1.1357j) | (−0.5905 + 0.0601j) |
| 350 | (−0.1842 − 0.2806j) | (−0.5334 + 1.1357j) | (−0.5905 + 1.228j) |
| 351 | (−0.1884 − 0.7047j) | (−0.5334 − 1.1357j) | (−0.5905 + 1.4486j) |
| 352 | (−0.3157 − 0.0567j) | (0.4177 + 0.2045j) | (−0.5662 − 0.3051j) |
| 353 | (−0.2455 − 1.1165j) | (0.4177 − 0.2045j) | (−0.5662 − 0.3045j) |
| 354 | (−0.3114 − 0.3996j) | (−0.4177 + 0.2045j) | (−0.5662 − 0.7193j) |
| 355 | (−0.3127 − 0.5438j) | (−0.4177 − 0.2045j) | (−0.5662 − 0.7851j) |
| 356 | (−0.1847 − 0.0565j) | (0.4177 + 0.2052j) | (−0.5662 + 0.3039j) |
| 357 | (−0.0756 − 1.0986j) | (0.4177 − 0.2052j) | (−0.5662 + 0.3027j) |
| 358 | (−0.1839 − 0.4027j) | (−0.4177 + 0.2052j) | (−0.5662 + 0.7189j) |
| 359 | (−0.1865 − 0.5398j) | (−0.4177 − 0.2052j) | (−0.5662 + 0.7866j) |
| 360 | (−0.3144 − 0.0565j) | (0.3688 + 0.3255j) | (−0.5662 − 0.4316j) |
| 361 | (−0.2283 − 1.2495j) | (0.3688 − 0.3255j) | (−0.5662 − 0.4374j) |
| 362 | (−0.3095 − 0.4037j) | (−0.3688 + 0.3255j) | (−0.5662 − 0.5905j) |
| 363 | (−0.3107 − 0.5281j) | (−0.3688 − 0.3255j) | (−0.5662 − 0.5662j) |
| 364 | (−0.1848 − 0.0563j) | (0.3702 + 0.3233j) | (−0.5662 + 0.4309j) |
| 365 | (−0.0716 − 1.2893j) | (0.3702 − 0.3233j) | (−0.5662 + 0.4375j) |
| 366 | (−0.1831 − 0.4034j) | (−0.3702 + 0.3233j) | (−0.5662 + 0.5905j) |
| 367 | (−0.186 − 0.5317j) | (−0.3702 − 0.3233j) | (−0.5662 + 0.5676j) |
| 368 | (−0.3148 − 0.0572j) | (1.0512 + 0.7809j) | (−0.5662 − 0.1795j) |
| 369 | (−0.2394 − 1.1164j) | (1.0512 − 0.7809j) | (−0.5662 − 0.1792j) |
| 370 | (−0.3113 − 0.3991j) | (−1.0512 + 0.7809j) | (−0.5662 − 1.0559j) |
| 371 | (−0.3128 − 0.5448j) | (−1.0512 − 0.7809j) | (−0.5662 − 0.919j) |
| 372 | (−0.1837 − 0.0551j) | (0.9635 + 0.8762j) | (−0.5662 + 0.1794j) |
| 373 | (−0.078 − 1.1028j) | (0.9635 − 0.8762j) | (−0.5662 + 0.1796j) |
| 374 | (−0.1821 − 0.4041j) | (−0.9635 + 0.8762j) | (−0.5662 + 1.0561j) |
| 375 | (−0.1853 − 0.5397j) | (−0.9635 − 0.8762j) | (−0.5662 + 0.9201j) |
| 376 | (−0.3127 − 0.0567j) | (0.761 + 1.0318j) | (−0.5662 − 0.0609j) |
| 377 | (−0.2149 − 1.2591j) | (0.761 − 1.0318j) | (−0.5662 − 0.0607j) |
| 378 | (−0.3088 − 0.4004j) | (−0.761 + 1.0318j) | (−0.5662 − 1.2271j) |
| 379 | (−0.3116 − 0.5285j) | (−0.761 − 1.0318j) | (−0.5662 − 1.4453j) |
| 380 | (−0.1847 − 0.056j) | (0.8664 + 0.9602j) | (−0.5662 + 0.0601j) |
| 381 | (−0.0801 − 1.2579j) | (0.8664 − 0.9602j) | (−0.5662 + 0.0601j) |
| 382 | (−0.1853 − 0.4049j) | (−0.8664 + 0.9602j) | (−0.5662 + 1.228j) |
| 383 | (−0.1844 − 0.5298j) | (−0.8664 − 0.9602j) | (−0.5662 + 1.4486j) |
| 384 | (0.4425 − 0.1648j) | (0.1863 + 0.167j) | (0.4309 − 0.3051j) |
| 385 | (0.3988 − 0.9835j) | (0.1863 − 0.167j) | (0.4309 − 0.3045j) |
| 386 | (0.4399 − 0.2776j) | (−0.1863 + 0.167j) | (0.4309 − 0.7193j) |
| 387 | (0.4309 − 0.6751j) | (−0.1863 − 0.167j) | (0.4309 − 0.7851j) |
| 388 | (0.0607 − 0.1653j) | (0.1864 + 0.1668j) | (0.4309 + 0.3039j) |
| 389 | (0.0532 − 0.8943j) | (0.1864 − 0.1668j) | (0.4309 + 0.3027j) |
| 390 | (0.0621 − 0.2824j) | (−0.1864 + 0.1668j) | (0.4309 + 0.7189j) |
| 391 | (0.0614 − 0.6661j) | (−0.1864 − 0.1668j) | (0.4309 + 0.7866j) |
| 392 | (0.4541 − 0.1622j) | (0.179 + 0.2802j) | (0.4309 − 0.4316j) |
| 393 | (0.4095 − 0.8731j) | (0.179 − 0.2802j) | (0.4309 − 0.4374j) |
| 394 | (0.453 − 0.2786j) | (−0.179 + 0.2802j) | (0.4309 − 0.5905j) |
| 395 | (0.4263 − 0.7383j) | (−0.179 − 0.2802j) | (0.4309 − 0.5662j) |
| 396 | (0.0611 − 0.1662j) | (0.1791 + 0.2814j) | (0.4309 + 0.4309j) |
| 397 | (0.069 − 0.8242j) | (0.1791 − 0.2814j) | (0.4309 + 0.4375j) |
| 398 | (0.0599 − 0.2843j) | (−0.1791 + 0.2814j) | (0.4309 + 0.5905j) |
| 399 | (0.0649 − 0.701j) | (−0.1791 − 0.2814j) | (0.4309 + 0.5676j) |
| 400 | (0.4437 − 0.1663j) | (0.9608 + 0.5557j) | (0.4309 − 0.1795j) |
| 401 | (0.4033 − 0.9933j) | (0.9608 − 0.5557j) | (0.4309 − 0.1792j) |
| 402 | (0.4404 − 0.2821j) | (−0.9608 + 0.5557j) | (0.4309 − 1.0559j) |
| 403 | (0.4316 − 0.676j) | (−0.9608 − 0.5557j) | (0.4309 − 0.919j) |
| 404 | (0.0615 − 0.167j) | (1.0147 + 0.464j) | (0.4309 + 0.1794j) |
| 405 | (0.0533 − 0.8948j) | (1.0147 − 0.464j) | (0.4309 + 0.1796j) |
| 406 | (0.0612 − 0.2829j) | (−1.0147 + 0.464j) | (0.4309 + 1.0561j) |
| 407 | (0.063 − 0.6656j) | (−1.0147 − 0.464j) | (0.4309 + 0.9201j) |
| 408 | (0.4544 − 0.1652j) | (0.5685 + 0.8988j) | (0.4309 − 0.0609j) |
| 409 | (0.4086 − 0.8704j) | (0.5685 − 0.8988j) | (0.4309 − 0.0607j) |
| 410 | (0.4516 − 0.2784j) | (−0.5685 + 0.8988j) | (0.4309 − 1.2271j) |
| 411 | (0.4257 − 0.7376j) | (−0.5685 − 0.8988j) | (0.4309 − 1.4453j) |
| 412 | (0.0618 − 0.167j) | (0.4732 + 0.9359j) | (0.4309 + 0.0601j) |
| 413 | (0.0689 − 0.8256j) | (0.4732 − 0.9359j) | (0.4309 + 0.0601j) |
| 414 | (0.062 − 0.2833j) | (−0.4732 + 0.9359j) | (0.4309 + 1.228j) |
| 415 | (0.0667 − 0.6992j) | (−0.4732 − 0.9359j) | (0.4309 + 1.4486j) |
| 416 | (0.4439 − 0.0568j) | (0.0634 + 0.1536j) | (0.4375 − 0.3051j) |
| 417 | (0.3929 − 1.1546j) | (0.0634 − 0.1536j) | (0.4375 − 0.3045j) |
| 418 | (0.437 − 0.3961j) | (−0.0634 + 0.1536j) | (0.4375 − 0.7193j) |
| 419 | (0.4346 − 0.5457j) | (−0.0634 − 0.1536j) | (0.4375 − 0.7851j) |
| 420 | (0.0611 − 0.0605j) | (0.0632 + 0.1535j) | (0.4375 + 0.3039j) |
| 421 | (0.0892 − 1.6511j) | (0.0632 − 0.1535j) | (0.4375 + 0.3027j) |
| 422 | (0.0617 − 0.4037j) | (−0.0632 + 0.1535j) | (0.4375 + 0.7189j) |
| 423 | (0.0627 − 0.5417j) | (−0.0632 − 0.1535j) | (0.4375 + 0.7866j) |
| 424 | (0.457 − 0.0577j) | (0.0541 + 0.2567j) | (0.4375 − 0.4316j) |
| 425 | (0.3778 − 1.3029j) | (0.0541 − 0.2567j) | (0.4375 − 0.4374j) |
| 426 | (0.4473 − 0.3989j) | (−0.0541 + 0.2567j) | (0.4375 − 0.5905j) |
| 427 | (0.4419 − 0.5263j) | (−0.0541 − 0.2567j) | (0.4375 − 0.5662j) |
| 428 | (0.0614 − 0.0588j) | (0.054 + 0.2567j) | (0.4375 + 0.4309j) |
| 429 | (0.0775 − 1.4648j) | (0.054 − 0.2567j) | (0.4375 + 0.4375j) |
| 430 | (0.0629 − 0.4063j) | (−0.054 + 0.2567j) | (0.4375 + 0.5905j) |
| 431 | (0.063 − 0.5307j) | (−0.054 − 0.2567j) | (0.4375 + 0.5676j) |
| 432 | (0.444 − 0.054j) | (0.898 + 0.6419j) | (0.4375 − 0.1795j) |
| 433 | (0.394 − 1.1154j) | (0.898 − 0.6419j) | (0.4375 − 0.1792j) |
| 434 | (0.4385 − 0.397j) | (−0.898 + 0.6419j) | (0.4375 − 1.0559j) |
| 435 | (0.4378 − 0.5465j) | (−0.898 − 0.6419j) | (0.4375 − 0.919j) |
| 436 | (0.0602 − 0.0583j) | (0.8263 + 0.7216j) | (0.4375 + 0.1794j) |
| 437 | (0.2731 − 1.6277j) | (0.8263 − 0.7216j) | (0.4375 + 0.1796j) |
| 438 | (0.063 − 0.403j) | (−0.8263 + 0.7216j) | (0.4375 + 1.0561j) |
| 439 | (0.0619 − 0.5397j) | (−0.8263 − 0.7216j) | (0.4375 + 0.9201j) |
| 440 | (0.4554 − 0.0547j) | (0.6605 + 0.8504j) | (0.4375 − 0.0609j) |
| 441 | (0.3334 − 1.4054j) | (0.6605 − 0.8504j) | (0.4375 − 0.0607j) |
| 442 | (0.4498 − 0.3989j) | (−0.6605 + 0.8504j) | (0.4375 − 1.2271j) |
| 443 | (0.4417 − 0.5261j) | (−0.6605 − 0.8504j) | (0.4375 − 1.4453j) |

TABLE 8-continued

An example of the bit-to-symbol mapping for 1024-ary non-uniform constellations from NN for code rate 3/5

| Mapping | NN_QSL | NN_QSC | NN_RSC |
|---|---|---|---|
| 444 | (0.0616 − 0.0581j) | (0.7468 + 0.7914j) | (0.4375 + 0.0601j) |
| 445 | (0.2143 − 1.4736j) | (0.7468 − 0.7914j) | (0.4375 + 0.0601j) |
| 446 | (0.061 − 0.4046j) | (−0.7468 + 0.7914j) | (0.4375 + 1.228j) |
| 447 | (0.062 − 0.5304j) | (−0.7468 − 0.7914j) | (0.4375 + 1.4486j) |
| 448 | (0.3132 − 0.164j) | (0.2991 + 0.1736j) | (0.5905 − 0.3051j) |
| 449 | (0.2604 − 0.982j) | (0.2991 − 0.1736j) | (0.5905 − 0.3045j) |
| 450 | (0.3108 − 0.2809j) | (−0.2991 + 0.1736j) | (0.5905 − 0.7193j) |
| 451 | (0.3091 − 0.6673j) | (−0.2991 − 0.1736j) | (0.5905 − 0.7851j) |
| 452 | (0.1819 − 0.1665j) | (0.2992 + 0.1734j) | (0.5905 + 0.3039j) |
| 453 | (0.1263 − 0.9664j) | (0.2992 − 0.1734j) | (0.5905 + 0.3027j) |
| 454 | (0.1843 − 0.2836j) | (−0.2992 + 0.1734j) | (0.5905 + 0.7189j) |
| 455 | (0.1856 − 0.6618j) | (−0.2992 − 0.1734j) | (0.5905 + 0.7866j) |
| 456 | (0.3109 − 0.1655j) | (0.2758 + 0.3148j) | (0.5905 − 0.4316j) |
| 457 | (0.2837 − 0.8602j) | (0.2758 − 0.3148j) | (0.5905 − 0.4374j) |
| 458 | (0.3092 − 0.2818j) | (−0.2758 + 0.3148j) | (0.5905 − 0.5905j) |
| 459 | (0.3043 − 0.7214j) | (−0.2758 − 0.3148j) | (0.5905 − 0.5662j) |
| 460 | (0.1834 − 0.1644j) | (0.2746 + 0.3175j) | (0.5905 + 0.4309j) |
| 461 | (0.1797 − 0.8393j) | (0.2746 − 0.3175j) | (0.5905 + 0.4375j) |
| 462 | (0.1849 − 0.2814j) | (−0.2746 + 0.3175j) | (0.5905 + 0.5905j) |
| 463 | (0.1876 − 0.7068j) | (−0.2746 − 0.3175j) | (0.5905 + 0.5676j) |
| 464 | (0.3116 − 0.1642j) | (1.2314 + 0.7518j) | (0.5905 − 0.1795j) |
| 465 | (0.2604 − 0.9862j) | (1.2314 − 0.7518j) | (0.5905 − 0.1792j) |
| 466 | (0.3111 − 0.2808j) | (−1.2314 + 0.7518j) | (0.5905 − 1.0559j) |
| 467 | (0.3083 − 0.6661j) | (−1.2314 − 0.7518j) | (0.5905 − 0.919j) |
| 468 | (0.1835 − 0.1672j) | (1.3049 + 0.6281j) | (0.5905 − 0.1794j) |
| 469 | (0.126 − 0.9679j) | (1.3049 − 0.6281j) | (0.5905 − 0.1796j) |
| 470 | (0.1839 − 0.2808j) | (−1.3049 + 0.6281j) | (0.5905 − 1.0561j) |
| 471 | (0.1864 − 0.6628j) | (−1.3049 − 0.6281j) | (0.5905 − 0.9201j) |
| 472 | (0.3116 − 0.1632j) | (0.7007 + 1.2053j) | (0.5905 − 0.0609j) |
| 473 | (0.2836 − 0.8595j) | (0.7007 − 1.2053j) | (0.5905 − 0.0607j) |
| 474 | (0.3092 − 0.2809j) | (−0.7007 + 1.2053j) | (0.5905 − 1.2271j) |
| 475 | (0.3035 − 0.7203j) | (−0.7007 − 1.2053j) | (0.5905 − 1.4453j) |
| 476 | (0.1826 − 0.1665j) | (0.5738 + 1.2552j) | (0.5905 + 0.0601j) |
| 477 | (0.177 − 0.8415j) | (0.5738 − 1.2552j) | (0.5905 + 0.0601j) |
| 478 | (0.1829 − 0.2848j) | (−0.5738 + 1.2552j) | (0.5905 + 1.228j) |
| 479 | (0.1866 − 0.7062j) | (−0.5738 − 1.2552j) | (0.5905 + 1.4486j) |
| 480 | (0.3145 − 0.0575j) | (0.3883 + 0.198j) | (0.5676 − 0.3051j) |
| 481 | (0.2424 − 1.1134j) | (0.3883 − 0.198j) | (0.5676 − 0.3045j) |
| 482 | (0.312 − 0.3975j) | (−0.3883 + 0.198j) | (0.5676 − 0.7193j) |
| 483 | (0.3147 − 0.5415j) | (−0.3883 − 0.198j) | (0.5676 − 0.7851j) |
| 484 | (0.1796 − 0.0577j) | (0.3884 + 0.1984j) | (0.5676 + 0.3039j) |
| 485 | (0.0776 − 1.1022j) | (0.3884 − 0.1984j) | (0.5676 + 0.3027j) |
| 486 | (0.1846 − 0.4j) | (−0.3884 + 0.1984j) | (0.5676 + 0.7189j) |
| 487 | (0.1857 − 0.5404j) | (−0.3884 − 0.1984j) | (0.5676 + 0.7866j) |
| 488 | (0.3098 − 0.0574j) | (0.3488 + 0.3029j) | (0.5676 − 0.4316j) |
| 489 | (0.2299 − 1.2495j) | (0.3488 − 0.3029j) | (0.5676 − 0.4374j) |
| 490 | (0.3106 − 0.4026j) | (−0.3488 + 0.3029j) | (0.5676 − 0.5905j) |
| 491 | (0.3109 − 0.5257j) | (−0.3488 − 0.3029j) | (0.5676 − 0.5662j) |
| 492 | (0.1835 − 0.0579j) | (0.3495 + 0.302j) | (0.5676 + 0.4309j) |
| 493 | (0.0742 − 1.2921j) | (0.3495 − 0.302j) | (0.5676 + 0.4375j) |
| 494 | (0.1855 − 0.4017j) | (−0.3495 + 0.302j) | (0.5676 + 0.5905j) |
| 495 | (0.1829 − 0.5297j) | (−0.3495 − 0.302j) | (0.5676 + 0.5676j) |
| 496 | (0.3118 − 0.0592j) | (1.1443 + 0.8653j) | (0.5676 − 0.1795j) |
| 497 | (0.2395 − 1.1147j) | (1.1443 − 0.8653j) | (0.5676 − 0.1792j) |
| 498 | (0.3123 − 0.398j) | (−1.1443 + 0.8653j) | (0.5676 − 1.0559j) |
| 499 | (0.3136 − 0.5422j) | (−1.1443 − 0.8653j) | (0.5676 − 0.919j) |
| 500 | (0.1816 − 0.0607j) | (1.0475 + 0.9694j) | (0.5676 − 0.1794j) |
| 501 | (0.0773 − 1.1108j) | (1.0475 − 0.9694j) | (0.5676 − 0.1796j) |
| 502 | (0.185 − 0.3996j) | (−1.0475 + 0.9694j) | (0.5676 − 1.0561j) |
| 503 | (0.186 − 0.5408j) | (−1.0475 − 0.9694j) | (0.5676 − 0.9201j) |
| 504 | (0.3115 − 0.0555j) | (0.8236 + 1.1404j) | (0.5676 − 0.0609j) |
| 505 | (0.2196 − 1.2598j) | (0.8236 − 1.1404j) | (0.5676 − 0.0607j) |
| 506 | (0.3106 − 0.4051j) | (−0.8236 + 1.1404j) | (0.5676 − 1.2271j) |
| 507 | (0.3088 − 0.5263j) | (−0.8236 − 1.1404j) | (0.5676 − 1.4453j) |
| 508 | (0.1827 − 0.0583j) | (0.9399 + 1.062j) | (0.5676 + 0.0601j) |
| 509 | (0.0816 − 1.2601j) | (0.9399 − 1.062j) | (0.5676 + 0.0601j) |
| 510 | (0.1833 − 0.4008j) | (−0.9399 + 1.062j) | (0.5676 + 1.228j) |
| 511 | (0.1861 − 0.5291j) | (−0.9399 − 1.062j) | (0.5676 + 1.4486j) |
| 512 | (−0.6227 + 0.1645j) | (0.8321 + 0.193j) | (−0.1795 − 0.3051j) |
| 513 | (−0.5436 + 0.9862j) | (0.8321 − 0.193j) | (−0.1795 − 0.3045j) |
| 514 | (−0.6129 + 0.2814j) | (−0.8321 + 0.193j) | (−0.1795 − 0.7193j) |
| 515 | (−0.5663 + 0.6799j) | (−0.8321 − 0.193j) | (−0.1795 − 0.7851j) |
| 516 | (−1.2862 + 0.2201j) | (0.8151 + 0.2453j) | (−0.1795 + 0.3039j) |
| 517 | (−1.0365 + 0.9846j) | (0.8151 − 0.2453j) | (−0.1795 + 0.3027j) |
| 518 | (−1.2651 + 0.3694j) | (−0.8151 + 0.2453j) | (−0.1795 + 0.7189j) |
| 519 | (−1.1121 + 0.8407j) | (−0.8151 − 0.2453j) | (−0.1795 + 0.7866j) |
| 520 | (−0.5867 + 0.1624j) | (0.2429 + 0.7216j) | (−0.1795 − 0.4316j) |
| 521 | (−0.5516 + 0.8732j) | (0.2429 − 0.7216j) | (−0.1795 − 0.4374j) |
| 522 | (−0.5798 + 0.2789j) | (−0.2429 + 0.7216j) | (−0.1795 − 0.5905j) |
| 523 | (−0.5544 + 0.7452j) | (−0.2429 − 0.7216j) | (−0.1795 − 0.5662j) |
| 524 | (−1.7794 + 0.2913j) | (0.3191 + 0.6989j) | (−0.1795 + 0.4309j) |
| 525 | (−1.3142 + 1.3286j) | (0.3191 − 0.6989j) | (−0.1795 + 0.4375j) |
| 526 | (−1.7442 + 0.4947j) | (−0.3191 + 0.6989j) | (−0.1795 + 0.5905j) |
| 527 | (−1.4975 + 1.1188j) | (−0.3191 − 0.6989j) | (−0.1795 + 0.5676j) |
| 528 | (−0.6252 + 0.1641j) | (0.9202 + 0.2151j) | (−0.1795 − 0.1795j) |
| 529 | (−0.5423 + 0.9986j) | (0.9202 − 0.2151j) | (−0.1795 − 0.1792j) |
| 530 | (−0.6136 + 0.2813j) | (−0.9202 + 0.2151j) | (−0.1795 − 1.0559j) |
| 531 | (−0.5675 + 0.6818j) | (−0.9202 − 0.2151j) | (−0.1795 − 0.919j) |
| 532 | (−1.4072 + 0.2385j) | (0.8955 + 0.29j) | (−0.1795 + 0.1794j) |
| 533 | (−1.0931 + 1.0525j) | (0.8955 − 0.29j) | (−0.1795 + 0.1796j) |
| 534 | (−1.3798 + 0.3969j) | (−0.8955 + 0.29j) | (−0.1795 + 1.0561j) |
| 535 | (−1.2017 + 0.8794j) | (−0.8955 − 0.29j) | (−0.1795 + 0.9201j) |
| 536 | (−0.5868 + 0.1631j) | (0.2587 + 0.82j) | (−0.1795 − 0.0609j) |
| 537 | (−0.5538 + 0.8711j) | (0.2587 − 0.82j) | (−0.1795 − 0.0607j) |
| 538 | (−0.5818 + 0.2804j) | (−0.2587 + 0.82j) | (−0.1795 − 1.2271j) |
| 539 | (−0.5562 + 0.7436j) | (−0.2587 − 0.82j) | (−0.1795 − 1.4453j) |
| 540 | (−1.574 + 0.2573j) | (0.3448 + 0.7935j) | (−0.1795 + 0.0601j) |
| 541 | (−1.2295 + 1.1433j) | (0.3448 − 0.7935j) | (−0.1795 + 0.0601j) |
| 542 | (−1.544 + 0.4427j) | (−0.3448 + 0.7935j) | (−0.1795 + 1.228j) |
| 543 | (−1.3376 + 0.9743j) | (−0.3448 − 0.7935j) | (−0.1795 + 1.4486j) |
| 544 | (−0.628 + 0.1558j) | (0.8526 + 0.0967j) | (−0.1792 − 0.3051j) |
| 545 | (−0.5287 + 1.1843j) | (0.8526 − 0.0967j) | (−0.1792 − 0.3045j) |
| 546 | (−0.6062 + 0.4018j) | (−0.8526 + 0.0967j) | (−0.1792 − 0.7193j) |
| 547 | (−0.5817 + 0.5451j) | (−0.8526 − 0.0967j) | (−0.1792 − 0.7851j) |
| 548 | (−1.3006 + 0.0729j) | (0.8582 + 0.0486j) | (−0.1792 + 0.3039j) |
| 549 | (−0.1272 + 1.8556j) | (0.8582 − 0.0486j) | (−0.1792 + 0.3027j) |
| 550 | (−1.231 + 0.5136j) | (−0.8582 + 0.0486j) | (−0.1792 + 0.7189j) |
| 551 | (−1.1874 + 0.6662j) | (−0.8582 − 0.0486j) | (−0.1792 + 0.7866j) |
| 552 | (−0.5897 + 0.0577j) | (0.1472 + 0.7455j) | (−0.1792 − 0.4316j) |
| 553 | (−0.5169 + 1.3322j) | (0.1472 − 0.7455j) | (−0.1792 − 0.4374j) |
| 554 | (−0.5752 + 0.4027j) | (−0.1472 + 0.7455j) | (−0.1792 − 0.5905j) |
| 555 | (−0.5606 + 0.5245j) | (−0.1472 − 0.7455j) | (−0.1792 − 0.5662j) |
| 556 | (−1.7966 + 0.0968j) | (0.0513 + 0.7587j) | (−0.1792 + 0.4309j) |
| 557 | (−0.8231 + 1.7139j) | (0.0513 − 0.7587j) | (−0.1792 + 0.4375j) |
| 558 | (−1.6882 + 0.6974j) | (−0.0513 + 0.7587j) | (−0.1792 + 0.5905j) |
| 559 | (−1.6057 + 0.905j) | (−0.0513 − 0.7587j) | (−0.1792 + 0.5676j) |
| 560 | (−0.6265 + 0.0547j) | (0.9408 + 0.1226j) | (−0.1792 − 0.1795j) |
| 561 | (−0.5314 + 1.131j) | (0.9408 − 0.1226j) | (−0.1792 − 0.1792j) |
| 562 | (−0.6086 + 0.402j) | (−0.9408 + 0.1226j) | (−0.1792 − 1.0559j) |
| 563 | (−0.5832 + 0.5446j) | (−0.9408 − 0.1226j) | (−0.1792 − 0.919j) |
| 564 | (−1.4219 + 0.0793j) | (0.9496 + 0.047j) | (−0.1792 + 0.1794j) |
| 565 | (−0.3738 + 1.8028j) | (0.9496 − 0.047j) | (−0.1792 + 0.1796j) |
| 566 | (−1.3453 + 0.5519j) | (−0.9496 + 0.047j) | (−0.1792 + 1.0561j) |
| 567 | (−1.2785 + 0.7176j) | (−0.9496 − 0.047j) | (−0.1792 + 0.9201j) |
| 568 | (−0.5885 + 0.0554j) | (0.1603 + 0.8422j) | (−0.1792 − 0.0609j) |
| 569 | (−0.4892 + 1.4833j) | (0.1603 − 0.8422j) | (−0.1792 − 0.0607j) |
| 570 | (−0.5776 + 0.4018j) | (−0.1603 + 0.8422j) | (−0.1792 − 1.2271j) |
| 571 | (−0.5652 + 0.527j) | (−0.1603 − 0.8422j) | (−0.1792 − 1.4453j) |
| 572 | (−1.5881 + 0.0862j) | (0.0544 + 0.8559j) | (−0.1792 + 0.0601j) |
| 573 | (−0.5614 + 1.6802j) | (0.0544 − 0.8559j) | (−0.1792 + 0.0601j) |
| 574 | (−1.4975 + 0.6188j) | (−0.0544 + 0.8559j) | (−0.1792 + 1.228j) |
| 575 | (−1.4256 + 0.7973j) | (−0.0544 − 0.8559j) | (−0.1792 + 1.4486j) |
| 576 | (−0.7542 + 0.1663j) | (0.5835 + 0.145j) | (−1.0559 − 0.3051j) |
| 577 | (−0.6935 + 1.0034j) | (0.5835 − 0.145j) | (−1.0559 − 0.3045j) |
| 578 | (−0.7436 + 0.2856j) | (−0.5835 + 0.145j) | (−1.0559 − 0.7193j) |
| 579 | (−0.6843 + 0.6705j) | (−0.5835 − 0.145j) | (−1.0559 − 0.7851j) |
| 580 | (−1.1569 + 0.2004j) | (0.5837 + 0.1468j) | (−1.0559 + 0.3039j) |
| 581 | (−0.892 + 1.0205j) | (0.5837 − 0.1468j) | (−1.0559 + 0.3027j) |
| 582 | (−1.1324 + 0.3418j) | (−0.5837 + 0.1468j) | (−1.0559 + 0.7189j) |
| 583 | (−1.0142 + 0.7744j) | (−0.5837 − 0.1468j) | (−1.0559 + 0.7866j) |
| 584 | (−0.8411 + 0.1733j) | (0.2107 + 0.5776j) | (−1.0559 − 0.4316j) |
| 585 | (−0.704 + 0.8771j) | (0.2107 − 0.5776j) | (−1.0559 − 0.4374j) |
| 586 | (−0.8307 + 0.2961j) | (−0.2107 + 0.5776j) | (−1.0559 − 0.5905j) |
| 587 | (−0.7238 + 0.7219j) | (−0.2107 − 0.5776j) | (−1.0559 − 0.5662j) |
| 588 | (−0.9702 + 0.1841j) | (0.2541 + 0.5487j) | (−1.0559 + 0.4309j) |
| 589 | (−0.8433 + 0.8757j) | (0.2541 − 0.5487j) | (−1.0559 + 0.4375j) |
| 590 | (−0.9553 + 0.3136j) | (−0.2541 + 0.5487j) | (−1.0559 + 0.5905j) |
| 591 | (−0.8687 + 0.7403j) | (−0.2541 − 0.5487j) | (−1.0559 + 0.5676j) |

TABLE 8-continued

An example of the bit-to-symbol mapping for 1024-ary non-uniform constellations from NN for code rate 3/5

| Mapping | NN_QSL | NN_QSC | NN_RSC |
|---|---|---|---|
| 592 | (−0.7512 + 0.1657j) | (1.7239 + 0.449j) | (−1.0559 − 0.1795j) |
| 593 | (−0.6981 + 1.0166j) | (1.7239 − 0.449j) | (−1.0559 − 0.1792j) |
| 594 | (−0.7443 + 0.2868j) | (−1.7239 + 0.449j) | (−1.0559 − 1.0559j) |
| 595 | (−0.6877 + 0.6784j) | (−1.7239 − 0.449j) | (−1.0559 − 0.919j) |
| 596 | (−1.1052 + 0.197j) | (1.6668 + 0.6204j) | (−1.0559 + 0.1794j) |
| 597 | (−0.8631 + 1.0063j) | (1.6668 − 0.6204j) | (−1.0559 + 0.1796j) |
| 598 | (−1.0823 + 0.3312j) | (−1.6668 + 0.6204j) | (−1.0559 + 1.0561j) |
| 599 | (−0.9851 + 0.7489j) | (−1.6668 − 0.6204j) | (−1.0559 + 0.9201j) |
| 600 | (−0.8419 + 0.1741j) | (0.3776 + 1.6445j) | (−1.0559 − 0.0609j) |
| 601 | (−0.7023 + 0.8722j) | (0.3776 − 1.6445j) | (−1.0559 − 0.0607j) |
| 602 | (−0.8243 + 0.2959j) | (−0.3776 + 1.6445j) | (−1.0559 − 1.2271j) |
| 603 | (−0.7203 + 0.7251j) | (−0.3776 − 1.6445j) | (−1.0559 − 1.4453j) |
| 604 | (−0.9876 + 0.1862j) | (0.5319 + 1.6115j) | (−1.0559 − 0.0601j) |
| 605 | (−0.8441 + 0.8814j) | (0.5319 − 1.6115j) | (−1.0559 + 0.0601j) |
| 606 | (−0.9688 + 0.3144j) | (−0.5319 + 1.6115j) | (−1.0559 + 1.228j) |
| 607 | (−0.8788 + 0.7414j) | (−0.5319 − 1.6115j) | (−1.0559 + 1.4486j) |
| 608 | (−0.7574 + 0.0547j) | (0.5584 + 0.0608j) | (−0.919 − 0.3051j) |
| 609 | (−0.7036 + 1.1955j) | (0.5584 − 0.0608j) | (−0.919 − 0.3045j) |
| 610 | (−0.7332 + 0.4129j) | (−0.5584 + 0.0608j) | (−0.919 − 0.7193j) |
| 611 | (−0.7094 + 0.5524j) | (−0.5584 − 0.0608j) | (−0.919 − 0.7851j) |
| 612 | (−1.1685 + 0.0665j) | (0.5584 + 0.0594j) | (−0.919 + 0.3039j) |
| 613 | (−0.8661 + 1.1985j) | (0.5584 − 0.0594j) | (−0.919 + 0.3027j) |
| 614 | (−1.0999 + 0.4799j) | (−0.5584 + 0.0594j) | (−0.919 + 0.7189j) |
| 615 | (−1.0732 + 0.6266j) | (−0.5584 − 0.0594j) | (−0.919 + 0.7866j) |
| 616 | (−0.8522 + 0.0583j) | (0.113 + 0.621j) | (−0.919 − 0.4316j) |
| 617 | (−0.6738 + 1.331j) | (0.113 − 0.621j) | (−0.919 − 0.4374j) |
| 618 | (−0.8097 + 0.4242j) | (−0.113 + 0.621j) | (−0.919 − 0.5905j) |
| 619 | (−0.7853 + 0.5572j) | (−0.113 − 0.621j) | (−0.919 − 0.5662j) |
| 620 | (−0.9772 + 0.0605j) | (0.0488 + 0.6357j) | (−0.919 + 0.4309j) |
| 621 | (−1.0775 + 1.5207j) | (0.0488 − 0.6357j) | (−0.919 + 0.4375j) |
| 622 | (−0.9325 + 0.4453j) | (−0.0488 + 0.6357j) | (−0.919 + 0.5905j) |
| 623 | (−0.9066 + 0.5865j) | (−0.0488 − 0.6357j) | (−0.919 + 0.5676j) |
| 624 | (−0.7569 + 0.0541j) | (1.7619 + 0.2717j) | (−0.919 − 0.1795j) |
| 625 | (−0.68 + 1.1391j) | (1.7619 − 0.2717j) | (−0.919 − 0.1792j) |
| 626 | (−0.7355 + 0.4136j) | (−1.7619 + 0.2717j) | (−0.919 − 1.0559j) |
| 627 | (−0.7132 + 0.5556j) | (−1.7619 − 0.2717j) | (−0.919 − 0.919j) |
| 628 | (−1.1174 + 0.0638j) | (1.7821 + 0.0908j) | (−0.919 + 0.1794j) |
| 629 | (−0.9889 + 1.2725j) | (1.7821 − 0.0908j) | (−0.919 + 0.1796j) |
| 630 | (−1.0597 + 0.4682j) | (−1.7821 + 0.0908j) | (−0.919 + 1.0561j) |
| 631 | (−1.0311 + 0.616j) | (−1.7821 − 0.0908j) | (−0.919 + 0.9201j) |
| 632 | (−0.8497 + 0.0561j) | (0.2251 + 1.6619j) | (−0.919 − 0.0609j) |
| 633 | (−0.6858 + 1.4691j) | (0.2251 − 1.6619j) | (−0.919 − 0.0607j) |
| 634 | (−0.8029 + 0.424j) | (−0.2251 + 1.6619j) | (−0.919 − 1.2271j) |
| 635 | (−0.7825 + 0.5601j) | (−0.2251 − 1.6619j) | (−0.919 − 1.4453j) |
| 636 | (−0.9912 + 0.0613j) | (0.0747 + 1.6718j) | (−0.919 − 0.0601j) |
| 637 | (−0.8802 + 1.4402j) | (0.0747 − 1.6718j) | (−0.919 − 0.0601j) |
| 638 | (−0.944 + 0.446j) | (−0.0747 + 1.6718j) | (−0.919 + 1.228j) |
| 639 | (−0.9145 + 0.5877j) | (−0.0747 − 1.6718j) | (−0.919 + 1.4486j) |
| 640 | (0.6235 + 0.1649j) | (0.7504 + 0.1738j) | (0.1794 − 0.3051j) |
| 641 | (0.5445 + 0.9871j) | (0.7504 − 0.1738j) | (0.1794 − 0.3045j) |
| 642 | (0.6165 + 0.2839j) | (−0.7504 + 0.1738j) | (0.1794 − 0.7193j) |
| 643 | (0.5678 + 0.6808j) | (−0.7504 − 0.1738j) | (0.1794 − 0.7851j) |
| 644 | (1.2839 + 0.2269j) | (0.7429 + 0.2033j) | (0.1794 + 0.3039j) |
| 645 | (1.0357 + 0.9897j) | (0.7429 − 0.2033j) | (0.1794 + 0.3027j) |
| 646 | (1.264 + 0.3765j) | (−0.7429 + 0.2033j) | (0.1794 + 0.7189j) |
| 647 | (1.1137 + 0.8483j) | (−0.7429 − 0.2033j) | (0.1794 + 0.7866j) |
| 648 | (0.5856 + 0.1664j) | (0.2368 + 0.6902j) | (0.1794 − 0.4316j) |
| 649 | (0.5534 + 0.8718j) | (0.2368 − 0.6902j) | (0.1794 − 0.4374j) |
| 650 | (0.5822 + 0.2813j) | (−0.2368 + 0.6902j) | (0.1794 − 0.5905j) |
| 651 | (0.5561 + 0.7489j) | (−0.2368 − 0.6902j) | (0.1794 − 0.5662j) |
| 652 | (1.7789 + 0.3004j) | (0.3057 + 0.6584j) | (0.1794 + 0.4309j) |
| 653 | (1.3158 + 1.3361j) | (0.3057 − 0.6584j) | (0.1794 + 0.4375j) |
| 654 | (1.7471 + 0.5029j) | (−0.3057 + 0.6584j) | (0.1794 + 0.5905j) |
| 655 | (1.5019 + 1.1286j) | (−0.3057 − 0.6584j) | (0.1794 + 0.5676j) |
| 656 | (0.6222 + 0.1662j) | (1.0031 + 0.2389j) | (0.1794 − 0.1795j) |
| 657 | (0.5436 + 1.0014j) | (1.0031 − 0.2389j) | (0.1794 − 0.1792j) |
| 658 | (0.6183 + 0.2826j) | (−1.0031 + 0.2389j) | (0.1794 − 1.0559j) |
| 659 | (0.5658 + 0.6807j) | (−1.0031 − 0.2389j) | (0.1794 − 0.919j) |
| 660 | (1.4032 + 0.2435j) | (0.9725 + 0.3279j) | (0.1794 + 0.1794j) |
| 661 | (1.0963 + 1.0564j) | (0.9725 − 0.3279j) | (0.1794 + 0.1796j) |
| 662 | (1.383 + 0.4027j) | (−0.9725 + 0.3279j) | (0.1794 + 1.0561j) |
| 663 | (1.202 + 0.883j) | (−0.9725 − 0.3279j) | (0.1794 + 0.9201j) |
| 664 | (0.5828 + 0.1664j) | (0.2642 + 0.8819j) | (0.1794 − 0.0609j) |
| 665 | (0.5514 + 0.8708j) | (0.2642 − 0.8819j) | (0.1794 − 0.0607j) |
| 666 | (0.5814 + 0.2799j) | (−0.2642 + 0.8819j) | (0.1794 − 1.2271j) |
| 667 | (0.5548 + 0.746j) | (−0.2642 − 0.8819j) | (0.1794 − 1.4453j) |
| 668 | (1.5686 + 0.2684j) | (0.3578 + 0.8654j) | (0.1794 − 0.0601j) |
| 669 | (1.228 + 1.1483j) | (0.3578 − 0.8654j) | (0.1794 − 0.0601j) |
| 670 | (1.5442 + 0.4492j) | (−0.3578 + 0.8654j) | (0.1794 + 1.228j) |
| 671 | (1.3328 + 0.9769j) | (−0.3578 − 0.8654j) | (0.1794 + 1.4486j) |
| 672 | (0.6261 + 0.0567j) | (0.7641 + 0.0701j) | (0.1796 − 0.3051j) |
| 673 | (0.5291 + 1.1814j) | (0.7641 − 0.0701j) | (0.1796 − 0.3045j) |
| 674 | (0.609 + 0.4066j) | (−0.7641 + 0.0701j) | (0.1796 − 0.7193j) |
| 675 | (0.5827 + 0.5481j) | (−0.7641 − 0.0701j) | (0.1796 − 0.7851j) |
| 676 | (1.2988 + 0.0784j) | (0.7659 + 0.0783j) | (0.1796 + 0.3039j) |
| 677 | (0.1337 + 1.8634j) | (0.7659 − 0.0783j) | (0.1796 + 0.3027j) |
| 678 | (1.2328 + 0.5201j) | (−0.7659 + 0.0783j) | (0.1796 + 0.7189j) |
| 679 | (1.1891 + 0.671j) | (−0.7659 − 0.0783j) | (0.1796 + 0.7866j) |
| 680 | (0.5865 + 0.0563j) | (0.1431 + 0.7251j) | (0.1796 − 0.4316j) |
| 681 | (0.5176 + 1.3243j) | (0.1431 − 0.7251j) | (0.1796 − 0.4374j) |
| 682 | (0.5713 + 0.403j) | (−0.1431 + 0.7251j) | (0.1796 − 0.5905j) |
| 683 | (0.5633 + 0.5286j) | (−0.1431 − 0.7251j) | (0.1796 − 0.5662j) |
| 684 | (1.7888 + 0.1044j) | (0.0506 + 0.7433j) | (0.1796 + 0.4309j) |
| 685 | (0.829 + 1.7154j) | (0.0506 − 0.7433j) | (0.1796 + 0.4375j) |
| 686 | (1.6889 + 0.7064j) | (−0.0506 + 0.7433j) | (0.1796 + 0.5905j) |
| 687 | (1.6085 + 0.9071j) | (−0.0506 − 0.7433j) | (0.1796 + 0.5676j) |
| 688 | (0.626 + 0.0571j) | (1.0258 + 0.1432j) | (0.1796 − 0.1795j) |
| 689 | (0.5386 + 1.1329j) | (1.0258 − 0.1432j) | (0.1796 − 0.1792j) |
| 690 | (0.607 + 0.4048j) | (−1.0258 + 0.1432j) | (0.1796 − 1.0559j) |
| 691 | (0.5823 + 0.5452j) | (−1.0258 − 0.1432j) | (0.1796 − 0.919j) |
| 692 | (1.4175 + 0.0845j) | (1.0364 + 0.0494j) | (0.1796 + 0.1794j) |
| 693 | (0.3747 + 1.7968j) | (1.0364 − 0.0494j) | (0.1796 + 0.1796j) |
| 694 | (1.3445 + 0.5598j) | (−1.0364 + 0.0494j) | (0.1796 + 1.0561j) |
| 695 | (1.2785 + 0.7205j) | (−1.0364 − 0.0494j) | (0.1796 + 0.9201j) |
| 696 | (0.5876 + 0.0571j) | (0.1624 + 0.8923j) | (0.1796 − 0.0609j) |
| 697 | (0.4965 + 1.1489j) | (0.1624 − 0.8923j) | (0.1796 − 0.0607j) |
| 698 | (0.575 + 0.4038j) | (−0.1624 + 0.8923j) | (0.1796 − 1.2271j) |
| 699 | (0.5618 + 0.5281j) | (−0.1624 − 0.8923j) | (0.1796 − 1.4453j) |
| 700 | (1.5817 + 0.0942j) | (0.0553 + 0.8988j) | (0.1796 + 0.0601j) |
| 701 | (0.5631 + 1.679j) | (0.0553 − 0.8988j) | (0.1796 + 0.0601j) |
| 702 | (1.491 + 0.6223j) | (−0.0553 + 0.8988j) | (0.1796 + 1.228j) |
| 703 | (1.4216 + 0.7997j) | (−0.0553 − 0.8988j) | (0.1796 + 1.4486j) |
| 704 | (0.7485 + 0.1703j) | (0.6607 + 0.1535j) | (1.0561 − 0.3051j) |
| 705 | (0.6949 + 1.0025j) | (0.6607 − 0.1535j) | (1.0561 − 0.3045j) |
| 706 | (0.7435 + 0.2913j) | (−0.6607 + 0.1535j) | (1.0561 − 0.7193j) |
| 707 | (0.6888 + 0.6815j) | (−0.6607 − 0.1535j) | (1.0561 − 0.7851j) |
| 708 | (1.1533 + 0.2081j) | (0.6594 + 0.163j) | (1.0561 + 0.3039j) |
| 709 | (0.8978 + 1.0283j) | (0.6594 − 0.163j) | (1.0561 + 0.3027j) |
| 710 | (1.1333 + 0.3461j) | (−0.6594 + 0.163j) | (1.0561 + 0.7189j) |
| 711 | (1.0119 + 0.7766j) | (−0.6594 − 0.163j) | (1.0561 + 0.7866j) |
| 712 | (0.8414 + 0.1771j) | (0.2136 + 0.59j) | (1.0561 − 0.4316j) |
| 713 | (0.7032 + 0.8792j) | (0.2136 − 0.59j) | (1.0561 − 0.4374j) |
| 714 | (0.8286 + 0.2992j) | (−0.2136 + 0.59j) | (1.0561 − 0.5905j) |
| 715 | (0.7299 + 0.7291j) | (−0.2136 − 0.59j) | (1.0561 − 0.5662j) |
| 716 | (0.9611 + 0.1876j) | (0.2638 + 0.568j) | (1.0561 + 0.4309j) |
| 717 | (0.8455 + 0.8827j) | (0.2638 − 0.568j) | (1.0561 + 0.4375j) |
| 718 | (0.9556 + 0.3162j) | (−0.2638 + 0.568j) | (1.0561 + 0.5905j) |
| 719 | (0.8702 + 0.7449j) | (−0.2638 − 0.568j) | (1.0561 + 0.5676j) |
| 720 | (0.7511 + 0.1706j) | (1.5512 + 0.4002j) | (1.0561 − 0.1795j) |
| 721 | (0.6959 + 1.013j) | (1.5512 − 0.4002j) | (1.0561 − 0.1792j) |
| 722 | (0.7428 + 0.2911j) | (−1.5512 + 0.4002j) | (1.0561 − 1.0559j) |
| 723 | (0.6864 + 0.6795j) | (−1.5512 − 0.4002j) | (1.0561 − 0.919j) |
| 724 | (1.1016 + 0.2011j) | (1.5002 + 0.553j) | (1.0561 + 0.1794j) |
| 725 | (0.8637 + 1.0087j) | (1.5002 − 0.553j) | (1.0561 + 0.1796j) |
| 726 | (1.0881 + 0.3373j) | (−1.5002 + 0.553j) | (1.0561 + 1.0561j) |
| 727 | (0.9844 + 0.7545j) | (−1.5002 − 0.553j) | (1.0561 + 0.9201j) |
| 728 | (0.8387 + 0.1788j) | (0.3436 + 1.4636j) | (1.0561 − 0.0609j) |
| 729 | (0.7083 + 0.8765j) | (0.3436 − 1.4636j) | (1.0561 − 0.0607j) |
| 730 | (0.8235 + 0.2991j) | (−0.3436 + 1.4636j) | (1.0561 − 1.2271j) |
| 731 | (0.7284 + 0.7308j) | (−0.3436 − 1.4636j) | (1.0561 − 1.4453j) |
| 732 | (0.9821 + 0.1904j) | (0.4838 + 1.4363j) | (1.0561 − 0.0601j) |
| 733 | (0.8396 + 0.8832j) | (0.4838 − 1.4363j) | (1.0561 − 0.0601j) |
| 734 | (0.9681 + 0.3202j) | (−0.4838 + 1.4363j) | (1.0561 + 1.228j) |
| 735 | (0.8756 + 0.7423j) | (−0.4838 − 1.4363j) | (1.0561 + 1.4486j) |
| 736 | (0.7564 + 0.0581j) | (0.6607 + 0.0514j) | (0.9201 − 0.3051j) |
| 737 | (0.7053 + 1.1983j) | (0.6607 − 0.0514j) | (0.9201 − 0.3045j) |
| 738 | (0.7309 + 0.4158j) | (−0.6607 + 0.0514j) | (0.9201 − 0.7193j) |
| 739 | (0.7138 + 0.5587j) | (−0.6607 − 0.0514j) | (0.9201 − 0.7851j) |

TABLE 8-continued

An example of the bit-to-symbol mapping for 1024-ary non-uniform constellations from NN for code rate 3/5

| Mapping | NN_QSL | NN_QSC | NN_RSC |
| --- | --- | --- | --- |
| 740 | (1.1628 + 0.0706j) | (0.6602 + 0.0461j) | (0.9201 + 0.3039j) |
| 741 | (0.8686 + 1.2002j) | (0.6602 − 0.0461j) | (0.9201 + 0.3027j) |
| 742 | (1.0982 + 0.4839j) | (−0.6602 + 0.0461j) | (0.9201 + 0.7189j) |
| 743 | (1.0677 + 0.6266j) | (−0.6602 − 0.0461j) | (0.9201 + 0.7866j) |
| 744 | (0.8457 + 0.0608j) | (0.1171 + 0.6262j) | (0.9201 − 0.4316j) |
| 745 | (0.6732 + 1.335j) | (0.1171 − 0.6262j) | (0.9201 − 0.4374j) |
| 746 | (0.803 + 0.4271j) | (−0.1171 + 0.6262j) | (0.9201 − 0.5905j) |
| 747 | (0.7832 + 0.5618j) | (−0.1171 − 0.6262j) | (0.9201 − 0.5662j) |
| 748 | (0.9769 + 0.0649j) | (0.0496 + 0.6408j) | (0.9201 + 0.4309j) |
| 749 | (1.0787 + 1.5235j) | (0.0496 − 0.6408j) | (0.9201 + 0.4375j) |
| 750 | (0.9336 + 0.4458j) | (−0.0496 + 0.6408j) | (0.9201 + 0.5905j) |
| 751 | (0.9033 + 0.5861j) | (−0.0496 − 0.6408j) | (0.9201 + 0.5676j) |
| 752 | (0.756 + 0.0579j) | (1.5854 + 0.2423j) | (0.9201 − 0.1795j) |
| 753 | (0.6833 + 1.1387j) | (1.5854 − 0.2423j) | (0.9201 − 0.1792j) |
| 754 | (0.7302 + 0.4161j) | (−1.5854 + 0.2423j) | (0.9201 − 1.0559j) |
| 755 | (0.7097 + 0.5568j) | (−1.5854 − 0.2423j) | (0.9201 − 0.919j) |
| 756 | (1.1158 + 0.0685j) | (1.6031 + 0.0814j) | (0.9201 + 0.1794j) |
| 757 | (0.9888 + 1.2766j) | (1.6031 − 0.0814j) | (0.9201 + 0.1796j) |
| 758 | (1.0607 + 0.4725j) | (−1.6031 + 0.0814j) | (0.9201 + 1.0561j) |
| 759 | (1.0274 + 0.6189j) | (−1.6031 − 0.0814j) | (0.9201 + 0.9201j) |
| 760 | (0.8466 + 0.0606j) | (0.2051 + 1.4802j) | (0.9201 − 0.0609j) |
| 761 | (0.6926 + 1.4691j) | (0.2051 − 1.4802j) | (0.9201 − 0.0607j) |
| 762 | (0.8017 + 0.4262j) | (−0.2051 + 1.4802j) | (0.9201 − 1.2271j) |
| 763 | (0.7827 + 0.5603j) | (−0.2051 − 1.4802j) | (0.9201 − 1.4453j) |
| 764 | (0.9963 + 0.0648j) | (0.0679 + 1.4881j) | (0.9201 + 0.0601j) |
| 765 | (0.8816 + 1.4415j) | (0.0679 − 1.4881j) | (0.9201 + 0.0601j) |
| 766 | (0.9456 + 0.4497j) | (−0.0679 + 1.4881j) | (0.9201 + 1.228j) |
| 767 | (0.9113 + 0.5881j) | (−0.0679 − 1.4881j) | (0.9201 + 1.4486j) |
| 768 | (−0.6256 − 0.166j) | (0.7488 + 0.3906j) | (−0.0609 − 0.3051j) |
| 769 | (−0.5474 − 0.9834j) | (0.7488 − 0.3906j) | (−0.0609 − 0.3045j) |
| 770 | (−0.6184 − 0.2849j) | (−0.7488 + 0.3906j) | (−0.0609 − 0.7193j) |
| 771 | (−0.5681 − 0.6794j) | (−0.7488 − 0.3906j) | (−0.0609 − 0.7851j) |
| 772 | (−1.2913 − 0.2246j) | (0.7767 + 0.3382j) | (−0.0609 + 0.3039j) |
| 773 | (−1.035 − 0.9873j) | (0.7767 − 0.3382j) | (−0.0609 + 0.3027j) |
| 774 | (−1.2698 − 0.3685j) | (−0.7767 + 0.3382j) | (−0.0609 + 0.7189j) |
| 775 | (−1.1142 − 0.8464j) | (−0.7767 − 0.3382j) | (−0.0609 + 0.7866j) |
| 776 | (−0.5875 − 0.1646j) | (0.4634 + 0.6444j) | (−0.0609 − 0.4316j) |
| 777 | (−0.5563 − 0.8753j) | (0.4634 − 0.6444j) | (−0.0609 − 0.4374j) |
| 778 | (−0.583 − 0.2827j) | (−0.4634 + 0.6444j) | (−0.0609 − 0.5905j) |
| 779 | (−0.5579 − 0.7479j) | (−0.4634 − 0.6444j) | (−0.0609 − 0.5662j) |
| 780 | (−1.7885 − 0.2939j) | (0.4078 + 0.6678j) | (−0.0609 + 0.4309j) |
| 781 | (−1.3136 − 1.3361j) | (0.4078 − 0.6678j) | (−0.0609 + 0.4375j) |
| 782 | (−1.7635 − 0.4945j) | (−0.4078 + 0.6678j) | (−0.0609 + 0.5905j) |
| 783 | (−1.4937 − 1.1225j) | (−0.4078 − 0.6678j) | (−0.0609 + 0.5676j) |
| 784 | (−0.6267 − 0.1653j) | (0.8177 + 0.448j) | (−0.0609 − 0.1795j) |
| 785 | (−0.5464 − 1.0029j) | (0.8177 − 0.448j) | (−0.0609 − 0.1792j) |
| 786 | (−0.6193 − 0.2836j) | (−0.8177 + 0.448j) | (−0.0609 − 1.0559j) |
| 787 | (−0.5689 − 0.6802j) | (−0.8177 − 0.448j) | (−0.0609 − 0.919j) |
| 788 | (−1.4137 − 0.2389j) | (0.8572 + 0.3768j) | (−0.0609 + 0.1794j) |
| 789 | (−1.0985 − 1.058j) | (0.8572 − 0.3768j) | (−0.0609 + 0.1796j) |
| 790 | (−1.3895 − 0.3958j) | (−0.8572 + 0.3768j) | (−0.0609 + 1.0561j) |
| 791 | (−1.2108 − 0.8839j) | (−0.8572 − 0.3768j) | (−0.0609 + 0.9201j) |
| 792 | (−0.5871 − 0.1654j) | (0.5015 + 0.731j) | (−0.0609 − 0.0609j) |
| 793 | (−0.5561 − 0.8731j) | (0.5015 − 0.731j) | (−0.0609 − 0.0607j) |
| 794 | (−0.5811 − 0.2835j) | (−0.5015 + 0.731j) | (−0.0609 − 1.2271j) |
| 795 | (−0.5589 − 0.7479j) | (−0.5015 − 0.731j) | (−0.0609 − 1.4453j) |
| 796 | (−1.581 − 0.2621j) | (0.4301 + 0.7622j) | (−0.0609 + 0.0601j) |
| 797 | (−1.2327 − 1.1487j) | (0.4301 − 0.7622j) | (−0.0609 + 0.0601j) |
| 798 | (−1.5528 − 0.4392j) | (−0.4301 + 0.7622j) | (−0.0609 + 1.228j) |
| 799 | (−1.3336 − 0.9755j) | (−0.4301 − 0.7622j) | (−0.0609 + 1.4486j) |
| 800 | (−0.6283 − 0.057j) | (0.6917 + 0.4713j) | (−0.0607 − 0.3051j) |
| 801 | (−0.5295 − 1.1829j) | (0.6917 − 0.4713j) | (−0.0607 − 0.3045j) |
| 802 | (−0.6074 − 0.4048j) | (−0.6917 + 0.4713j) | (−0.0607 − 0.7193j) |
| 803 | (−0.583 − 0.5511j) | (−0.6917 − 0.4713j) | (−0.0607 − 0.7851j) |
| 804 | (−1.3003 − 0.0721j) | (0.6571 + 0.5102j) | (−0.0607 + 0.3039j) |
| 805 | (−0.1253 − 1.8671j) | (0.6571 − 0.5102j) | (−0.0607 + 0.3027j) |
| 806 | (−1.2376 − 0.5163j) | (−0.6571 + 0.5102j) | (−0.0607 + 0.7189j) |
| 807 | (−1.1975 − 0.6706j) | (−0.6571 − 0.5102j) | (−0.0607 + 0.7866j) |
| 808 | (−0.5886 − 0.057j) | (0.5438 + 0.5982j) | (−0.0607 − 0.4316j) |
| 809 | (−0.5136 − 1.3286j) | (0.5438 − 0.5982j) | (−0.0607 − 0.4374j) |
| 810 | (−0.5758 − 0.4065j) | (−0.5438 + 0.5982j) | (−0.0607 − 0.5905j) |
| 811 | (−0.5611 − 0.527j) | (−0.5438 − 0.5982j) | (−0.0607 − 0.5662j) |
| 812 | (−1.802 − 0.0992j) | (0.585 + 0.571j) | (−0.0607 + 0.4309j) |
| 813 | (−0.8263 − 1.7115j) | (0.585 + 0.571j) | (−0.0607 + 0.4375j) |
| 814 | (−1.7001 − 0.701j) | (−0.585 + 0.571j) | (−0.0607 + 0.5905j) |
| 815 | (−1.6146 − 0.9089j) | (−0.585 − 0.571j) | (−0.0607 + 0.5676j) |
| 816 | (−0.6294 − 0.0568j) | (0.7628 + 0.5255j) | (−0.0607 − 0.1795j) |
| 817 | (−0.5374 − 1.1319j) | (0.7628 − 0.5255j) | (−0.0607 − 0.1792j) |
| 818 | (−0.6086 − 0.4059j) | (−0.7628 + 0.5255j) | (−0.0607 − 1.0559j) |
| 819 | (−0.5828 − 0.5502j) | (−0.7628 − 0.5255j) | (−0.0607 − 0.919j) |
| 820 | (−1.4203 − 0.0815j) | (0.711 + 0.5843j) | (−0.0607 + 0.1794j) |
| 821 | (−0.3766 − 1.8088j) | (0.711 − 0.5843j) | (−0.0607 + 0.1796j) |
| 822 | (−1.3503 − 0.5573j) | (−0.711 + 0.5843j) | (−0.0607 + 1.0561j) |
| 823 | (−1.2881 − 0.7205j) | (−0.711 − 0.5843j) | (−0.0607 + 0.9201j) |
| 824 | (−0.5888 − 0.0581j) | (0.5802 + 0.6879j) | (−0.0607 − 0.0609j) |
| 825 | (−0.4902 − 1.4819j) | (0.5802 − 0.6879j) | (−0.0607 − 0.0607j) |
| 826 | (−0.5798 − 0.4071j) | (−0.5802 + 0.6879j) | (−0.0607 − 1.2271j) |
| 827 | (−0.565 − 0.5268j) | (−0.5802 − 0.6879j) | (−0.0607 − 1.4453j) |
| 828 | (−1.5922 − 0.0884j) | (0.6418 + 0.6455j) | (−0.0607 + 0.0601j) |
| 829 | (−0.5607 − 1.6779j) | (0.6418 − 0.6455j) | (−0.0607 + 0.0601j) |
| 830 | (−1.5069 − 0.6219j) | (−0.6418 + 0.6455j) | (−0.0607 + 1.228j) |
| 831 | (−1.4334 − 0.8025j) | (−0.6418 − 0.6455j) | (−0.0607 + 1.4486j) |
| 832 | (−0.7537 − 0.1707j) | (0.5574 + 0.2288j) | (−1.2271 − 0.3051j) |
| 833 | (−0.6934 − 1.0026j) | (0.5574 − 0.2288j) | (−1.2271 − 0.3045j) |
| 834 | (−0.7479 − 0.2934j) | (−0.5574 + 0.2288j) | (−1.2271 − 0.7193j) |
| 835 | (−0.6935 − 0.6815j) | (−0.5574 − 0.2288j) | (−1.2271 − 0.7851j) |
| 836 | (−1.1595 − 0.2059j) | (0.5589 + 0.2277j) | (−1.2271 + 0.3039j) |
| 837 | (−0.8948 − 1.0294j) | (0.5589 − 0.2277j) | (−1.2271 + 0.3027j) |
| 838 | (−1.1381 − 0.3446j) | (−0.5589 + 0.2277j) | (−1.2271 + 0.7189j) |
| 839 | (−1.0186 − 0.7744j) | (−0.5589 − 0.2277j) | (−1.2271 + 0.7866j) |
| 840 | (−0.8475 − 0.1783j) | (0.3498 + 0.4641j) | (−1.2271 − 0.4316j) |
| 841 | (−0.7045 − 0.8734j) | (0.3498 − 0.4641j) | (−1.2271 − 0.4374j) |
| 842 | (−0.8329 − 0.3009j) | (−0.3498 + 0.4641j) | (−1.2271 − 0.5905j) |
| 843 | (−0.7305 − 0.7316j) | (−0.3498 − 0.4641j) | (−1.2271 − 0.5662j) |
| 844 | (−0.971 − 0.1881j) | (0.336 + 0.4751j) | (−1.2271 + 0.4309j) |
| 845 | (−0.8488 − 0.8824j) | (0.336 − 0.4751j) | (−1.2271 + 0.4375j) |
| 846 | (−0.9554 − 0.3139j) | (−0.336 + 0.4751j) | (−1.2271 + 0.5905j) |
| 847 | (−0.872 − 0.7431j) | (−0.336 − 0.4751j) | (−1.2271 + 0.5676j) |
| 848 | (−0.7549 − 0.1699j) | (1.4992 + 0.9395j) | (−1.2271 − 0.1795j) |
| 849 | (−0.7024 − 1.0223j) | (1.4992 − 0.9395j) | (−1.2271 − 0.1792j) |
| 850 | (−0.7469 − 0.2895j) | (−1.4992 + 0.9395j) | (−1.2271 − 1.0559j) |
| 851 | (−0.689 − 0.6783j) | (−1.4992 − 0.9395j) | (−1.2271 − 0.919j) |
| 852 | (−1.1088 − 0.1984j) | (1.5913 + 0.785j) | (−1.2271 + 0.1794j) |
| 853 | (−0.8629 − 1.012j) | (1.5913 − 0.785j) | (−1.2271 + 0.1796j) |
| 854 | (−1.0899 − 0.3349j) | (−1.5913 + 0.785j) | (−1.2271 + 1.0561j) |
| 855 | (−0.9908 − 0.7546j) | (−1.5913 − 0.785j) | (−1.2271 + 0.9201j) |
| 856 | (−0.8433 − 0.1773j) | (0.8423 + 1.5041j) | (−1.2271 − 0.0609j) |
| 857 | (−0.7058 − 0.8765j) | (0.8423 − 1.5041j) | (−1.2271 − 0.0607j) |
| 858 | (−0.8266 − 0.2979j) | (−0.8423 + 1.5041j) | (−1.2271 − 1.2271j) |
| 859 | (−0.73 − 0.7316j) | (−0.8423 − 1.5041j) | (−1.2271 − 1.4453j) |
| 860 | (−0.9927 − 0.1926j) | (0.6877 + 1.567j) | (−1.2271 + 0.0601j) |
| 861 | (−0.84 − 0.8821j) | (0.6877 − 1.567j) | (−1.2271 + 0.0601j) |
| 862 | (−0.9678 − 0.3174j) | (−0.6877 + 1.567j) | (−1.2271 + 1.228j) |
| 863 | (−0.8811 − 0.7424j) | (−0.6877 − 1.567j) | (−1.2271 + 1.4486j) |
| 864 | (−0.7615 − 0.0593j) | (0.5019 + 0.2772j) | (−1.4453 − 0.3051j) |
| 865 | (−0.7113 − 1.201j) | (0.5019 − 0.2772j) | (−1.4453 − 0.3045j) |
| 866 | (−0.7358 − 0.4169j) | (−0.5019 + 0.2772j) | (−1.4453 − 0.7193j) |
| 867 | (−0.7111 − 0.5569j) | (−0.5019 − 0.2772j) | (−1.4453 − 0.7851j) |
| 868 | (−1.1714 − 0.0711j) | (0.5006 + 0.2783j) | (−1.4453 + 0.3039j) |
| 869 | (−0.8677 − 1.2003j) | (0.5006 − 0.2783j) | (−1.4453 + 0.3027j) |
| 870 | (−1.1082 − 0.4852j) | (−0.5006 + 0.2783j) | (−1.4453 + 0.7189j) |
| 871 | (−1.0697 − 0.6262j) | (−0.5006 − 0.2783j) | (−1.4453 + 0.7866j) |
| 872 | (−0.849 − 0.0622j) | (0.4263 + 0.391j) | (−1.4453 − 0.4316j) |
| 873 | (−0.6719 − 1.3322j) | (0.4263 − 0.391j) | (−1.4453 − 0.4374j) |
| 874 | (−0.8073 − 0.4268j) | (−0.4263 + 0.391j) | (−1.4453 − 0.5905j) |
| 875 | (−0.785 − 0.5627j) | (−0.4263 − 0.391j) | (−1.4453 − 0.5662j) |
| 876 | (−0.9819 − 0.0652j) | (0.4317 + 0.3838j) | (−1.4453 + 0.4309j) |
| 877 | (−1.082 − 1.5252j) | (0.4317 − 0.3838j) | (−1.4453 + 0.4375j) |
| 878 | (−0.9394 − 0.449j) | (−0.4317 + 0.3838j) | (−1.4453 + 0.5905j) |
| 879 | (−0.907 − 0.5883j) | (−0.4317 − 0.3838j) | (−1.4453 + 0.5676j) |
| 880 | (−0.759 − 0.0587j) | (1.3915 + 1.0821j) | (−1.4453 − 0.1795j) |
| 881 | (−0.6864 − 1.1427j) | (1.3915 − 1.0821j) | (−1.4453 − 0.1792j) |
| 882 | (−0.7315 − 0.4169j) | (−1.3915 + 1.0821j) | (−1.4453 − 1.0559j) |
| 883 | (−0.709 − 0.5576j) | (−1.3915 − 1.0821j) | (−1.4453 − 0.919j) |
| 884 | (−1.1186 − 0.0679j) | (1.2693 + 1.2108j) | (−1.4453 + 0.1794j) |
| 885 | (−0.9889 − 1.2742j) | (1.2693 − 1.2108j) | (−1.4453 + 0.1796j) |
| 886 | (−1.0622 − 0.4685j) | (−1.2693 + 1.2108j) | (−1.4453 + 1.0561j) |
| 887 | (−1.0334 − 0.6182j) | (−1.2693 − 1.2108j) | (−1.4453 + 0.9201j) |

TABLE 8-continued

An example of the bit-to-symbol mapping for 1024-ary non-uniform constellations from NN for code rate 3/5

| Mapping | NN_QSL | NN_QSC | NN_RSC |
|---|---|---|---|
| 888 | (−0.8496 − 0.0607j) | (0.9921 + 1.4233j) | (−1.4453 − 0.0609j) |
| 889 | (−0.6982 − 1.4703j) | (0.9921 + 1.4233j) | (−1.4453 − 0.0607j) |
| 890 | (−0.8022 − 0.4245j) | (−0.9921 + 1.4233j) | (−1.4453 − 1.2271j) |
| 891 | (−0.7856 − 0.563j) | (−0.9921 − 1.4233j) | (−1.4453 − 1.4453j) |
| 892 | (−0.997 − 0.0646j) | (1.1356 + 1.3257j) | (−1.4453 + 0.0601j) |
| 893 | (−0.8802 − 1.4371j) | (1.1356 − 1.3257j) | (−1.4453 + 0.0601j) |
| 894 | (−0.9454 − 0.4482j) | (−1.1356 + 1.3257j) | (−1.4453 + 1.228j) |
| 895 | (−0.9139 − 0.5896j) | (−1.1356 − 1.3257j) | (−1.4453 + 1.4486j) |
| 896 | (0.6243 − 0.165j) | (0.6883 + 0.3373j) | (0.0601 − 0.3051j) |
| 897 | (0.5469 − 0.985j) | (0.6883 − 0.3373j) | (0.0601 − 0.3045j) |
| 898 | (0.6164 − 0.2812j) | (−0.6883 + 0.3373j) | (0.0601 − 0.7193j) |
| 899 | (0.567 − 0.6809j) | (−0.6883 − 0.3373j) | (0.0601 − 0.7851j) |
| 900 | (1.2933 − 0.2212j) | (0.7047 + 0.3065j) | (0.0601 + 0.3039j) |
| 901 | (1.0332 − 0.9826j) | (0.7047 − 0.3065j) | (0.0601 + 0.3027j) |
| 902 | (1.2676 − 0.367j) | (−0.7047 + 0.3065j) | (0.0601 + 0.7189j) |
| 903 | (1.1144 − 0.843j) | (−0.7047 − 0.3065j) | (0.0601 + 0.7866j) |
| 904 | (0.5868 − 0.1642j) | (0.4317 + 0.5823j) | (0.0601 − 0.4316j) |
| 905 | (0.5543 − 0.8737j) | (0.4317 − 0.5823j) | (0.0601 − 0.4374j) |
| 906 | (0.5826 − 0.2806j) | (−0.4317 + 0.5823j) | (0.0601 − 0.5905j) |
| 907 | (0.559 − 0.7455j) | (−0.4317 − 0.5823j) | (0.0601 − 0.5662j) |
| 908 | (1.7864 − 0.2881j) | (0.3919 + 0.607j) | (0.0601 − 0.4309j) |
| 909 | (1.3108 − 1.3372j) | (0.3919 − 0.607j) | (0.0601 − 0.4375j) |
| 910 | (1.7507 − 0.4867j) | (−0.3919 + 0.607j) | (0.0601 − 0.5905j) |
| 911 | (1.4991 − 1.1213j) | (−0.3919 − 0.607j) | (0.0601 − 0.5676j) |
| 912 | (0.6234 − 0.165j) | (0.8852 + 0.4995j) | (0.0601 − 0.1795j) |
| 913 | (0.547 − 1.0016j) | (0.8852 − 0.4995j) | (0.0601 − 0.1792j) |
| 914 | (0.6178 − 0.2811j) | (−0.8852 + 0.4995j) | (0.0601 − 1.0559j) |
| 915 | (0.567 − 0.6783j) | (−0.8852 − 0.4995j) | (0.0601 − 0.919j) |
| 916 | (1.412 − 0.2345j) | (0.9323 + 0.4173j) | (0.0601 + 0.1794j) |
| 917 | (1.0937 − 1.0549j) | (0.9323 − 0.4173j) | (0.0601 + 0.1796j) |
| 918 | (1.3864 − 0.3933j) | (−0.9323 + 0.4173j) | (0.0601 + 1.0561j) |
| 919 | (1.2033 − 0.8786j) | (−0.9323 − 0.4173j) | (0.0601 + 0.9201j) |
| 920 | (0.5885 − 0.1642j) | (0.5331 + 0.8095j) | (0.0601 − 0.0609j) |
| 921 | (0.5545 − 0.8725j) | (0.5331 − 0.8095j) | (0.0601 − 0.0607j) |
| 922 | (0.5815 − 0.2807j) | (−0.5331 + 0.8095j) | (0.0601 − 1.2271j) |
| 923 | (0.5548 − 0.7451j) | (−0.5331 − 0.8095j) | (0.0601 − 1.4453j) |
| 924 | (1.5774 − 0.2573j) | (0.4495 + 0.8419j) | (0.0601 + 0.0601j) |
| 925 | (1.2284 − 1.1433j) | (0.4495 − 0.8419j) | (0.0601 + 0.0601j) |
| 926 | (1.5511 − 0.4361j) | (−0.4495 + 0.8419j) | (0.0601 + 1.228j) |
| 927 | (1.3354 − 0.9773j) | (−0.4495 − 0.8419j) | (0.0601 + 1.4486j) |
| 928 | (0.6283 − 0.0558j) | (0.6247 + 0.4193j) | (0.0601 − 0.3051j) |
| 929 | (0.5291 − 1.1819j) | (0.6247 − 0.4193j) | (0.0601 − 0.3045j) |
| 930 | (0.6051 − 0.402j) | (−0.6247 + 0.4193j) | (0.0601 − 0.7193j) |
| 931 | (0.5814 − 0.5448j) | (−0.6247 − 0.4193j) | (0.0601 − 0.7851j) |
| 932 | (1.2999 − 0.0712j) | (0.6061 + 0.4389j) | (0.0601 + 0.3039j) |
| 933 | (0.1369 − 1.8677j) | (0.6061 − 0.4389j) | (0.0601 + 0.3027j) |
| 934 | (1.2418 − 0.516j) | (−0.6061 + 0.4389j) | (0.0601 + 0.7189j) |
| 935 | (1.1902 − 0.6679j) | (−0.6061 − 0.4389j) | (0.0601 + 0.7866j) |
| 936 | (0.5873 − 0.0559j) | (0.511 + 0.5228j) | (0.0601 − 0.4316j) |
| 937 | (0.5173 − 1.3265j) | (0.511 − 0.5228j) | (0.0601 − 0.4374j) |
| 938 | (0.5751 − 0.4014j) | (−0.511 + 0.5228j) | (0.0601 − 0.5905j) |
| 939 | (0.5636 − 0.528j) | (−0.511 − 0.5228j) | (0.0601 − 0.5662j) |
| 940 | (1.7981 − 0.093j) | (0.5344 + 0.505j) | (0.0601 − 0.4309j) |
| 941 | (0.8308 − 1.7184j) | (0.5344 − 0.505j) | (0.0601 − 0.4375j) |
| 942 | (1.7005 − 0.6966j) | (−0.5344 + 0.505j) | (0.0601 − 0.5905j) |
| 943 | (1.6087 − 0.9062j) | (−0.5344 − 0.505j) | (0.0601 − 0.5676j) |
| 944 | (0.6268 − 0.0558j) | (0.8281 + 0.5806j) | (0.0601 − 0.1795j) |
| 945 | (0.5414 − 1.1347j) | (0.8281 − 0.5806j) | (0.0601 − 0.1792j) |
| 946 | (0.6059 − 0.4021j) | (−0.8281 + 0.5806j) | (0.0601 − 1.0559j) |
| 947 | (0.5805 − 0.547j) | (−0.8281 − 0.5806j) | (0.0601 − 0.919j) |
| 948 | (1.4178 − 0.0771j) | (0.7656 + 0.6506j) | (0.0601 + 0.1794j) |
| 949 | (0.3826 − 1.813j) | (0.7656 − 0.6506j) | (0.0601 + 0.1796j) |
| 950 | (1.3484 − 0.5553j) | (−0.7656 + 0.6506j) | (0.0601 + 1.0561j) |
| 951 | (1.2836 − 0.7204j) | (−0.7656 − 0.6506j) | (0.0601 + 0.9201j) |
| 952 | (0.5857 − 0.055j) | (0.6173 + 0.7664j) | (0.0601 − 0.0609j) |
| 953 | (0.4961 − 1.4846j) | (0.6173 − 0.7664j) | (0.0601 − 0.0607j) |
| 954 | (0.5773 − 0.4005j) | (−0.6173 + 0.7664j) | (0.0601 − 1.2271j) |
| 955 | (0.5643 − 0.5263j) | (−0.6173 − 0.7664j) | (0.0601 − 1.4453j) |
| 956 | (1.5788 − 0.0837j) | (0.6923 + 0.7149j) | (0.0601 + 0.0601j) |
| 957 | (0.5694 − 1.686j) | (0.6923 − 0.7149j) | (0.0601 + 0.0601j) |
| 958 | (1.4996 − 0.6152j) | (−0.6923 + 0.7149j) | (0.0601 + 1.228j) |
| 959 | (1.4303 − 0.8j) | (−0.6923 − 0.7149j) | (0.0601 + 1.4486j) |
| 960 | (0.7516 − 0.1684j) | (0.6194 + 0.279j) | (1.228 − 0.3051j) |
| 961 | (0.6934 − 0.9988j) | (0.6194 − 0.279j) | (1.228 − 0.3045j) |
| 962 | (0.7419 − 0.2872j) | (−0.6194 + 0.279j) | (1.228 − 0.7193j) |
| 963 | (0.6901 − 0.6786j) | (−0.6194 − 0.279j) | (1.228 − 0.7851j) |
| 964 | (1.1588 − 0.2042j) | (0.6253 + 0.2698j) | (1.228 + 0.3039j) |
| 965 | (0.9018 − 1.0284j) | (0.6253 − 0.2698j) | (1.228 + 0.3027j) |
| 966 | (1.135 − 0.3413j) | (−0.6253 + 0.2698j) | (1.228 + 0.7189j) |
| 967 | (1.0117 − 0.7674j) | (−0.6253 − 0.2698j) | (1.228 + 0.7866j) |
| 968 | (0.8433 − 0.1752j) | (0.3796 + 0.5044j) | (1.228 − 0.4316j) |
| 969 | (0.7021 − 0.8721j) | (0.3796 − 0.5044j) | (1.228 − 0.4374j) |
| 970 | (0.8268 − 0.2959j) | (−0.3796 + 0.5044j) | (1.228 − 0.5905j) |
| 971 | (0.7323 − 0.7298j) | (−0.3796 − 0.5044j) | (1.228 − 0.5662j) |
| 972 | (0.9716 − 0.1854j) | (0.3557 + 0.5188j) | (1.228 − 0.4309j) |
| 973 | (0.8465 − 0.8771j) | (0.3557 − 0.5188j) | (1.228 − 0.4375j) |
| 974 | (0.9546 − 0.3122j) | (−0.3557 + 0.5188j) | (1.228 − 0.5905j) |
| 975 | (0.8752 − 0.7432j) | (−0.3557 − 0.5188j) | (1.228 − 0.5676j) |
| 976 | (0.7521 − 0.1687j) | (1.3509 + 0.837j) | (1.228 − 0.1795j) |
| 977 | (0.6996 − 1.0164j) | (1.3509 − 0.837j) | (1.228 − 0.1792j) |
| 978 | (0.7454 − 0.2889j) | (−1.3509 + 0.837j) | (1.228 − 1.0559j) |
| 979 | (0.6881 − 0.6803j) | (−1.3509 − 0.837j) | (1.228 − 0.919j) |
| 980 | (1.1025 − 0.1974j) | (1.4337 + 0.6993j) | (1.228 + 0.1794j) |
| 981 | (0.8613 − 1.0075j) | (1.4337 − 0.6993j) | (1.228 + 0.1796j) |
| 982 | (1.0905 − 0.333j) | (−1.4337 + 0.6993j) | (1.228 + 1.0561j) |
| 983 | (0.9886 − 0.7498j) | (−1.4337 − 0.6993j) | (1.228 + 0.9201j) |
| 984 | (0.844 − 0.1753j) | (0.7641 + 1.3398j) | (1.228 − 0.0609j) |
| 985 | (0.7042 − 0.8704j) | (0.7641 − 1.3398j) | (1.228 − 0.0607j) |
| 986 | (0.8241 − 0.2959j) | (−0.7641 + 1.3398j) | (1.228 − 1.2271j) |
| 987 | (0.7293 − 0.7284j) | (−0.7641 − 1.3398j) | (1.228 − 1.4453j) |
| 988 | (0.9853 − 0.1875j) | (0.6248 + 1.3957j) | (1.228 + 0.0601j) |
| 989 | (0.8402 − 0.8791j) | (0.6248 − 1.3957j) | (1.228 + 0.0601j) |
| 990 | (0.9675 − 0.3141j) | (−0.6248 + 1.3957j) | (1.228 + 1.228j) |
| 991 | (0.8821 − 0.7432j) | (−0.6248 − 1.3957j) | (1.228 + 1.4486j) |
| 992 | (0.758 − 0.0568j) | (0.555 + 0.3523j) | (1.4486 − 0.3051j) |
| 993 | (0.7116 − 1.1997j) | (0.555 − 0.3523j) | (1.4486 − 0.3045j) |
| 994 | (0.7289 − 0.4142j) | (−0.555 + 0.3523j) | (1.4486 − 0.7193j) |
| 995 | (0.7109 − 0.5574j) | (−0.555 − 0.3523j) | (1.4486 − 0.7851j) |
| 996 | (1.1685 − 0.0674j) | (0.5483 + 0.357j) | (1.4486 + 0.3039j) |
| 997 | (0.8699 − 1.1981j) | (0.5483 − 0.357j) | (1.4486 + 0.3027j) |
| 998 | (1.1063 − 0.4788j) | (−0.5483 + 0.357j) | (1.4486 + 0.7189j) |
| 999 | (1.0665 − 0.6214j) | (−0.5483 − 0.357j) | (1.4486 + 0.7866j) |
| 1000 | (0.8509 − 0.0599j) | (0.4626 + 0.4325j) | (1.4486 − 0.4316j) |
| 1001 | (0.6789 − 1.3376j) | (0.4626 − 0.4325j) | (1.4486 − 0.4374j) |
| 1002 | (0.8082 − 0.4231j) | (−0.4626 + 0.4325j) | (1.4486 − 0.5905j) |
| 1003 | (0.7847 − 0.5571j) | (−0.4626 − 0.4325j) | (1.4486 − 0.5662j) |
| 1004 | (0.9808 − 0.0636j) | (0.4723 + 0.4235j) | (1.4486 − 0.4309j) |
| 1005 | (1.0845 − 1.525j) | (0.4723 − 0.4235j) | (1.4486 − 0.4375j) |
| 1006 | (0.935 − 0.4441j) | (−0.4723 + 0.4235j) | (1.4486 − 0.5905j) |
| 1007 | (0.9018 − 0.5822j) | (−0.4723 − 0.4235j) | (1.4486 − 0.5676j) |
| 1008 | (0.7563 − 0.0541j) | (1.2548 + 0.9637j) | (1.4486 − 0.1795j) |
| 1009 | (0.6846 − 1.137j) | (1.2548 − 0.9637j) | (1.4486 − 0.1792j) |
| 1010 | (0.732 − 0.4142j) | (−1.2548 + 0.9637j) | (1.4486 − 1.0559j) |
| 1011 | (0.7126 − 0.5538j) | (−1.2548 − 0.9637j) | (1.4486 − 0.919j) |
| 1012 | (1.1128 − 0.0658j) | (1.1465 + 1.0787j) | (1.4486 + 0.1794j) |
| 1013 | (0.9928 − 1.2762j) | (1.1465 − 1.0787j) | (1.4486 + 0.1796j) |
| 1014 | (1.0595 − 0.4669j) | (−1.1465 + 1.0787j) | (1.4486 + 1.0561j) |
| 1015 | (1.0277 − 0.6118j) | (−1.1465 − 1.0787j) | (1.4486 + 0.9201j) |
| 1016 | (0.8491 − 0.0588j) | (0.8992 + 1.2679j) | (1.4486 − 0.0609j) |
| 1017 | (0.6995 − 1.4755j) | (0.8992 − 1.2679j) | (1.4486 − 0.0607j) |
| 1018 | (0.8088 − 0.4246j) | (−0.8992 + 1.2679j) | (1.4486 − 1.2271j) |
| 1019 | (0.7788 − 0.5561j) | (−0.8992 − 1.2679j) | (1.4486 − 1.4453j) |
| 1020 | (0.9928 − 0.062j) | (1.0275 + 1.1809j) | (1.4486 + 0.0601j) |
| 1021 | (0.881 − 1.4348j) | (1.0275 − 1.1809j) | (1.4486 + 0.0601j) |
| 1022 | (0.9463 − 0.4454j) | (−1.0275 + 1.1809j) | (1.4486 + 1.228j) |
| 1023 | (0.9131 − 0.5855j) | (−1.0275 − 1.1809j) | (1.4486 + 1.4486j) |

TABLE 9

An example of the bit-to-symbol mapping for 1024-ary non-uniform constellations from NN for code rate 4/5

| Mapping | NN_QSL | NN_QSC | NN_RSC |
| --- | --- | --- | --- |
| 0 | (0.0905 + 0.6153j) | (0.0412 + 0.8491j) | (1.0626 + 1.0626j) |
| 1 | (0.0726 + 0.5304j) | (0.0412 − 0.8491j) | (1.0626 − 0.3591j) |
| 2 | (−0.087 + 0.6142j) | (−0.0412 + 0.8491j) | (1.0626 + 1.1878j) |
| 3 | (−0.0705 + 0.5308j) | (−0.0412 − 0.8491j) | (1.0626 − 0.4301j) |
| 4 | (0.1512 + 0.6093j) | (0.2881 + 0.81j) | (1.0626 − 1.058j) |
| 5 | (0.1337 + 0.5247j) | (0.2881 − 0.81j) | (1.0626 − 0.7494j) |
| 6 | (−0.1463 + 0.6076j) | (−0.2881 + 0.81j) | (1.0626 − 1.1847j) |
| 7 | (−0.1323 + 0.5167j) | (−0.2881 − 0.81j) | (1.0626 − 0.6628j) |
| 8 | (0.1277 + 0.8468j) | (0.124 + 0.8429j) | (1.0626 + 0.7523j) |
| 9 | (0.03 + 0.2228j) | (0.124 − 0.8429j) | (1.0626 − 0.1607j) |
| 10 | (−0.1212 + 0.8513j) | (−0.124 + 0.8429j) | (1.0626 + 0.6629j) |
| 11 | (−0.0377 + 0.2278j) | (−0.124 − 0.8429j) | (1.0626 − 0.0944j) |
| 12 | (0.2087 + 0.8286j) | (0.2064 + 0.8301j) | (1.0626 + 0.3594j) |
| 13 | (0.0751 + 0.2278j) | (0.2064 − 0.8301j) | (1.0626 + 0.1597j) |
| 14 | (−0.2038 + 0.8338j) | (−0.2064 + 0.8301j) | (1.0626 + 0.4297j) |
| 15 | (−0.0805 + 0.2288j) | (−0.2064 − 0.8301j) | (1.0626 + 0.0937j) |
| 16 | (0.0329 + 0.6239j) | (0.0382 + 0.7703j) | (1.0626 + 0.9504j) |
| 17 | (0.0283 + 0.5464j) | (0.0382 − 0.7703j) | (1.0626 − 0.2918j) |
| 18 | (−0.0299 + 0.6233j) | (−0.0382 + 0.7703j) | (1.0626 + 1.3347j) |
| 19 | (−0.0246 + 0.5492j) | (−0.0382 − 0.7703j) | (1.0626 − 0.503j) |
| 20 | (0.2038 + 0.5925j) | (0.2647 + 0.7371j) | (1.0626 − 0.946j) |
| 21 | (0.1759 + 0.5208j) | (0.2647 − 0.7371j) | (1.0626 − 0.8449j) |
| 22 | (−0.2034 + 0.5935j) | (−0.2647 + 0.7371j) | (1.0626 − 1.331j) |
| 23 | (−0.1799 + 0.516j) | (−0.2647 − 0.7371j) | (1.0626 − 0.5804j) |
| 24 | (0.0438 + 0.8551j) | (0.1142 + 0.7653j) | (1.0626 − 0.8462j) |
| 25 | (0.0256 + 0.1565j) | (0.1142 − 0.7653j) | (1.0626 − 0.2242j) |
| 26 | (−0.0406 + 0.8549j) | (−0.1142 + 0.7653j) | (1.0626 + 0.5805j) |
| 27 | (−0.0358 + 0.1574j) | (−0.1142 − 0.7653j) | (1.0626 − 0.0332j) |
| 28 | (0.2873 + 0.8036j) | (0.1901 + 0.7546j) | (1.0626 − 0.2916j) |
| 29 | (0.0278 + 0.1041j) | (0.1901 − 0.7546j) | (1.0626 + 0.2239j) |
| 30 | (−0.283 + 0.8097j) | (−0.1901 + 0.7546j) | (1.0626 + 0.5035j) |
| 31 | (−0.0364 + 0.1031j) | (−0.1901 − 0.7546j) | (1.0626 + 0.0328j) |
| 32 | (0.0851 − 0.6146j) | (0.0335 + 0.6142j) | (−0.3591 − 1.0626j) |
| 33 | (0.0647 − 0.5301j) | (0.0335 − 0.6142j) | (−0.3591 − 0.3591j) |
| 34 | (−0.0932 − 0.6134j) | (−0.0335 + 0.6142j) | (−0.3591 + 1.1878j) |
| 35 | (−0.0764 − 0.5278j) | (−0.0335 − 0.6142j) | (−0.3591 − 0.4301j) |
| 36 | (0.1436 − 0.6061j) | (0.2243 + 0.5872j) | (−0.3591 − 1.058j) |
| 37 | (0.1253 − 0.5197j) | (0.2243 − 0.5872j) | (−0.3591 − 0.7494j) |
| 38 | (−0.1581 − 0.6059j) | (−0.2243 + 0.5872j) | (−0.3591 − 1.1847j) |
| 39 | (−0.1414 − 0.5141j) | (−0.2243 − 0.5872j) | (−0.3591 − 0.6628j) |
| 40 | (0.1171 − 0.8463j) | (0.0983 + 0.6107j) | (−0.3591 + 0.7523j) |
| 41 | (0.0244 − 0.2175j) | (0.0983 − 0.6107j) | (−0.3591 − 0.1607j) |
| 42 | (−0.1323 − 0.8443j) | (−0.0983 + 0.6107j) | (−0.3591 + 0.6629j) |
| 43 | (−0.0377 − 0.2194j) | (−0.0983 − 0.6107j) | (−0.3591 − 0.0944j) |
| 44 | (0.1984 − 0.8274j) | (0.162 + 0.6012j) | (−0.3591 + 0.3594j) |
| 45 | (0.0741 − 0.2254j) | (0.162 − 0.6012j) | (−0.3591 + 0.1597j) |
| 46 | (−0.2126 − 0.8267j) | (−0.162 + 0.6012j) | (−0.3591 + 0.4297j) |
| 47 | (−0.0802 − 0.2244j) | (−0.162 − 0.6012j) | (−0.3591 + 0.0937j) |
| 48 | (0.0258 − 0.621j) | (0.0352 + 0.6922j) | (−0.3591 + 0.9504j) |
| 49 | (0.0226 − 0.5432j) | (0.0352 − 0.6922j) | (−0.3591 − 0.2918j) |
| 50 | (−0.039 − 0.6218j) | (−0.0352 + 0.6922j) | (−0.3591 + 1.3347j) |
| 51 | (−0.034 − 0.544j) | (−0.0352 − 0.6922j) | (−0.3591 − 0.503j) |
| 52 | (0.1967 − 0.5901j) | (0.2428 + 0.6632j) | (−0.3591 − 0.946j) |
| 53 | (0.172 − 0.5162j) | (0.2428 − 0.6632j) | (−0.3591 − 0.8449j) |
| 54 | (−0.2091 − 0.5878j) | (−0.2428 + 0.6632j) | (−0.3591 − 1.331j) |
| 55 | (−0.1838 − 0.518j) | (−0.2428 − 0.6632j) | (−0.3591 − 0.5804j) |
| 56 | (0.0358 − 0.8517j) | (0.1057 + 0.6878j) | (−0.3591 − 0.8462j) |
| 57 | (0.0265 − 0.1552j) | (0.1057 − 0.6878j) | (−0.3591 − 0.2242j) |
| 58 | (−0.052 − 0.8529j) | (−0.1057 + 0.6878j) | (−0.3591 + 0.5805j) |
| 59 | (−0.0294 − 0.1497j) | (−0.1057 − 0.6878j) | (−0.3591 − 0.0332j) |
| 60 | (0.2811 − 0.799j) | (0.1754 + 0.6784j) | (−0.3591 − 0.2916j) |
| 61 | (0.0225 − 0.1034j) | (0.1754 − 0.6784j) | (−0.3591 + 0.2239j) |
| 62 | (−0.2913 − 0.8052j) | (−0.1754 + 0.6784j) | (−0.3591 + 0.5035j) |
| 63 | (−0.0353 − 0.1029j) | (−0.1754 − 0.6784j) | (−0.3591 + 0.0328j) |
| 64 | (0.6232 + 0.0923j) | (0.8497 + 0.0412j) | (1.1878 + 1.0626j) |
| 65 | (0.5459 + 0.0722j) | (0.8497 − 0.0412j) | (1.1878 − 0.3591j) |
| 66 | (−0.6279 + 0.0985j) | (−0.8497 + 0.0412j) | (1.1878 + 1.1878j) |
| 67 | (−0.5475 + 0.0765j) | (−0.8497 − 0.0412j) | (1.1878 − 0.4301j) |
| 68 | (0.6112 + 0.1529j) | (0.8102 + 0.2874j) | (1.1878 − 1.058j) |
| 69 | (0.5327 + 0.1345j) | (0.8102 − 0.2874j) | (1.1878 − 0.7494j) |
| 70 | (−0.6161 + 0.1549j) | (−0.8102 + 0.2874j) | (1.1878 − 1.1847j) |
| 71 | (−0.5353 + 0.1413j) | (−0.8102 − 0.2874j) | (1.1878 − 0.6628j) |
| 72 | (0.8437 + 0.1242j) | (0.8436 + 0.1238j) | (1.1878 + 0.7523j) |
| 73 | (0.2464 + 0.0312j) | (0.8436 − 0.1238j) | (1.1878 − 0.1607j) |
| 74 | (−0.8508 + 0.1338j) | (−0.8436 + 0.1238j) | (1.1878 + 0.6629j) |

TABLE 9-continued

An example of the bit-to-symbol mapping for 1024-ary
non-uniform constellations from NN for code rate 4/5

| Mapping | NN_QSL | NN_QSC | NN_RSC |
|---|---|---|---|
| 75 | (−0.2532 + 0.0313j) | (−0.8436 − 0.1238j) | (1.1878 − 0.0944j) |
| 76 | (0.8236 + 0.2067j) | (0.8306 + 0.2059j) | (1.1878 + 0.3594j) |
| 77 | (0.2607 + 0.0719j) | (0.8306 − 0.2059j) | (1.1878 + 0.1597j) |
| 78 | (−0.8333 + 0.2169j) | (−0.8306 + 0.2059j) | (1.1878 + 0.4297j) |
| 79 | (−0.2658 + 0.0741j) | (−0.8306 − 0.2059j) | (1.1878 + 0.0937j) |
| 80 | (0.6317 + 0.0305j) | (0.771 + 0.0382j) | (1.1878 + 0.9504j) |
| 81 | (0.5553 + 0.0285j) | (0.771 − 0.0382j) | (1.1878 − 0.2918j) |
| 82 | (−0.637 + 0.0371j) | (−0.771 + 0.0382j) | (1.1878 + 1.3347j) |
| 83 | (−0.5621 + 0.0301j) | (−0.771 − 0.0382j) | (1.1878 − 0.503j) |
| 84 | (0.5893 + 0.2067j) | (0.7374 + 0.2643j) | (1.1878 − 0.946j) |
| 85 | (0.5227 + 0.185j) | (0.7374 − 0.2643j) | (1.1878 − 0.8449j) |
| 86 | (−0.5955 + 0.2141j) | (−0.7374 + 0.2643j) | (1.1878 − 1.331j) |
| 87 | (−0.5257 + 0.19j) | (−0.7374 − 0.2643j) | (1.1878 − 0.5804j) |
| 88 | (0.852 + 0.0424j) | (0.7656 + 0.1141j) | (1.1878 + 0.8462j) |
| 89 | (0.1783 + 0.0292j) | (0.7656 − 0.1141j) | (1.1878 − 0.2242j) |
| 90 | (−0.8597 + 0.0457j) | (−0.7656 + 0.1141j) | (1.1878 + 0.5805j) |
| 91 | (−0.1895 + 0.0298j) | (−0.7656 − 0.1141j) | (1.1878 − 0.0332j) |
| 92 | (0.7982 + 0.2906j) | (0.7545 + 0.1894j) | (1.1878 + 0.2916j) |
| 93 | (0.0291 + 0.03j) | (0.7545 − 0.1894j) | (1.1878 + 0.2239j) |
| 94 | (−0.8039 + 0.2975j) | (−0.7545 + 0.1894j) | (1.1878 + 0.5035j) |
| 95 | (−0.034 + 0.0331j) | (−0.7545 − 0.1894j) | (1.1878 + 0.0328j) |
| 96 | (0.6194 − 0.0972j) | (0.6147 + 0.0331j) | (−0.4301 + 1.0626j) |
| 97 | (0.5444 − 0.079j) | (0.6147 − 0.0331j) | (−0.4301 − 0.3591j) |
| 98 | (−0.6257 − 0.0906j) | (−0.6147 + 0.0331j) | (−0.4301 + 1.1878j) |
| 99 | (−0.5454 − 0.0701j) | (−0.6147 − 0.0331j) | (−0.4301 − 0.4301j) |
| 100 | (0.6084 − 0.152j) | (0.5872 + 0.2241j) | (−0.4301 − 1.058j) |
| 101 | (0.5262 − 0.1433j) | (0.5872 − 0.2241j) | (−0.4301 − 0.7494j) |
| 102 | (−0.6127 − 0.1516j) | (−0.5872 + 0.2241j) | (−0.4301 − 1.1847j) |
| 103 | (−0.5334 − 0.1337j) | (−0.5872 − 0.2241j) | (−0.4301 − 0.6628j) |
| 104 | (0.8457 − 0.1252j) | (0.6108 + 0.0978j) | (−0.4301 + 0.7523j) |
| 105 | (0.2492 − 0.0318j) | (0.6108 − 0.0978j) | (−0.4301 − 0.1607j) |
| 106 | (−0.8508 − 0.1251j) | (−0.6108 + 0.0978j) | (−0.4301 + 0.6629j) |
| 107 | (−0.2563 − 0.0301j) | (−0.6108 − 0.0978j) | (−0.4301 − 0.0944j) |
| 108 | (0.825 − 0.2124j) | (0.6016 + 0.1618j) | (−0.4301 + 0.3594j) |
| 109 | (0.263 − 0.0742j) | (0.6016 − 0.1618j) | (−0.4301 + 0.1597j) |
| 110 | (−0.8349 − 0.2082j) | (−0.6016 + 0.1618j) | (−0.4301 + 0.4297j) |
| 111 | (−0.2674 − 0.0732j) | (−0.6016 − 0.1618j) | (−0.4301 + 0.0937j) |
| 112 | (0.6291 − 0.0356j) | (0.6928 + 0.0352j) | (−0.4301 + 0.9504j) |
| 113 | (0.5543 − 0.0309j) | (0.6928 − 0.0352j) | (−0.4301 − 0.2918j) |
| 114 | (−0.6409 − 0.0308j) | (−0.6928 + 0.0352j) | (−0.4301 + 1.3347j) |
| 115 | (−0.5606 − 0.0274j) | (−0.6928 − 0.0352j) | (−0.4301 − 0.503j) |
| 116 | (0.5908 − 0.212j) | (0.6636 + 0.2429j) | (−0.4301 − 0.946j) |
| 117 | (0.5167 − 0.191j) | (0.6636 − 0.2429j) | (−0.4301 − 0.8449j) |
| 118 | (−0.5935 − 0.2049j) | (−0.6636 + 0.2429j) | (−0.4301 − 1.331j) |
| 119 | (−0.5246 − 0.1834j) | (−0.6636 − 0.2429j) | (−0.4301 − 0.5804j) |
| 120 | (0.8559 − 0.0494j) | (0.6879 + 0.1053j) | (−0.4301 + 0.8462j) |
| 121 | (0.1776 − 0.0275j) | (0.6879 − 0.1053j) | (−0.4301 − 0.2242j) |
| 122 | (−0.8623 − 0.0413j) | (−0.6879 + 0.1053j) | (−0.4301 + 0.5805j) |
| 123 | (−0.1851 − 0.0237j) | (−0.6879 − 0.1053j) | (−0.4301 − 0.0332j) |
| 124 | (0.7951 − 0.2921j) | (0.6786 + 0.1752j) | (−0.4301 + 0.2916j) |
| 125 | (0.0264 − 0.0314j) | (0.6786 − 0.1752j) | (−0.4301 + 0.2239j) |
| 126 | (−0.808 − 0.2898j) | (−0.6786 + 0.1752j) | (−0.4301 + 0.5035j) |
| 127 | (−0.0306 − 0.0312j) | (−0.6786 − 0.1752j) | (−0.4301 + 0.0328j) |
| 128 | (0.3676 + 0.5027j) | (0.045 + 0.9288j) | (−1.058 + 1.0626j) |
| 129 | (0.3226 + 0.4348j) | (0.045 − 0.9288j) | (−1.058 − 0.3591j) |
| 130 | (−0.3679 + 0.509j) | (−0.045 + 0.9288j) | (−1.058 + 1.1878j) |
| 131 | (−0.3184 + 0.44j) | (−0.045 − 0.9288j) | (−1.058 − 0.4301j) |
| 132 | (0.317 + 0.537j) | (0.3128 + 0.884j) | (−1.058 − 1.058j) |
| 133 | (0.2673 + 0.4727j) | (0.3128 − 0.884j) | (−1.058 − 0.7494j) |
| 134 | (−0.3152 + 0.5441j) | (−0.3128 + 0.884j) | (−1.058 − 1.1847j) |
| 135 | (−0.2634 + 0.4732j) | (−0.3128 − 0.884j) | (−1.058 − 0.6628j) |
| 136 | (0.506 + 0.6853j) | (0.1346 + 0.9215j) | (−1.058 + 0.7523j) |
| 137 | (0.1572 + 0.1746j) | (0.1346 − 0.9215j) | (−1.058 − 0.1607j) |
| 138 | (−0.5018 + 0.691j) | (−0.1346 + 0.9215j) | (−1.058 + 0.6629j) |
| 139 | (−0.1603 + 0.1732j) | (−0.1346 − 0.9215j) | (−1.058 − 0.0944j) |
| 140 | (0.4358 + 0.7315j) | (0.2242 + 0.9064j) | (−1.058 + 0.3594j) |
| 141 | (0.1294 + 0.2023j) | (0.2242 − 0.9064j) | (−1.058 + 0.1597j) |
| 142 | (−0.4324 + 0.7385j) | (−0.2242 + 0.9064j) | (−1.058 + 0.4297j) |
| 143 | (−0.1329 + 0.2047j) | (−0.2242 − 0.9064j) | (−1.058 + 0.0937j) |
| 144 | (0.4152 + 0.4649j) | (0.0488 + 1.0102j) | (−1.058 + 0.9504j) |
| 145 | (0.3631 + 0.4052j) | (0.0488 − 1.0102j) | (−1.058 − 0.2918j) |
| 146 | (−0.4097 + 0.467j) | (−0.0488 + 1.0102j) | (−1.058 + 1.3347j) |
| 147 | (−0.3601 + 0.4096j) | (−0.0488 − 1.0102j) | (−1.058 − 0.503j) |
| 148 | (0.2622 + 0.5707j) | (0.3391 + 0.9595j) | (−1.058 − 0.946j) |
| 149 | (0.2322 + 0.5018j) | (0.3391 − 0.9595j) | (−1.058 − 0.8449j) |

TABLE 9-continued

An example of the bit-to-symbol mapping for 1024-ary non-uniform constellations from NN for code rate 4/5

| Mapping | NN_QSL | NN_QSC | NN_RSC |
|---|---|---|---|
| 150 | (−0.2606 + 0.5676j) | (−0.3391 + 0.9595j) | (−1.058 − 1.331j) |
| 151 | (−0.2348 + 0.4978j) | (−0.3391 − 0.9595j) | (−1.058 − 0.5804j) |
| 152 | (0.5726 + 0.6333j) | (0.1466 + 1.0017j) | (−1.058 + 0.8462j) |
| 153 | (0.1106 + 0.1198j) | (0.1466 − 1.0017j) | (−1.058 − 0.2242j) |
| 154 | (−0.5682 + 0.6409j) | (−0.1466 + 1.0017j) | (−1.058 + 0.5805j) |
| 155 | (−0.1178 + 0.1189j) | (−0.1466 − 1.0017j) | (−1.058 − 0.0332j) |
| 156 | (0.363 + 0.7757j) | (0.2434 + 0.9852j) | (−1.058 + 0.2916j) |
| 157 | (0.0848 + 0.1073j) | (0.2434 − 0.9852j) | (−1.058 − 0.2239j) |
| 158 | (−0.362 + 0.7788j) | (−0.2434 + 0.9852j) | (−1.058 + 0.5035j) |
| 159 | (−0.0912 + 0.1086j) | (−0.2434 − 0.9852j) | (−1.058 − 0.0328j) |
| 160 | (0.3606 − 0.5047j) | (0.0793 + 1.6276j) | (−0.7494 + 1.0626j) |
| 161 | (0.3152 − 0.4353j) | (0.0793 − 1.6276j) | (−0.7494 − 0.3591j) |
| 162 | (−0.3685 − 0.5011j) | (−0.0793 + 1.6276j) | (−0.7494 + 1.1878j) |
| 163 | (−0.3289 − 0.4324j) | (−0.0793 − 1.6276j) | (−0.7494 − 0.4301j) |
| 164 | (0.3093 − 0.5357j) | (0.5459 + 1.5384j) | (−0.7494 − 1.058j) |
| 165 | (0.2589 − 0.4704j) | (0.5459 − 1.5384j) | (−0.7494 − 0.7494j) |
| 166 | (−0.3208 − 0.5383j) | (−0.5459 + 1.5384j) | (−0.7494 − 1.1847j) |
| 167 | (−0.2715 − 0.4696j) | (−0.5459 − 1.5384j) | (−0.7494 − 0.6628j) |
| 168 | (0.4948 − 0.6925j) | (0.2373 + 1.6128j) | (−0.7494 + 0.7523j) |
| 169 | (0.1516 − 0.1683j) | (0.2373 − 1.6128j) | (−0.7494 + 0.1607j) |
| 170 | (−0.5073 − 0.6829j) | (−0.2373 + 1.6128j) | (−0.7494 + 0.6629j) |
| 171 | (−0.1608 − 0.1692j) | (−0.2373 − 1.6128j) | (−0.7494 − 0.0944j) |
| 172 | (0.426 − 0.7356j) | (0.393 + 1.5827j) | (−0.7494 + 0.3594j) |
| 173 | (0.1227 − 0.2002j) | (0.393 − 1.5827j) | (−0.7494 + 0.1597j) |
| 174 | (−0.4387 − 0.7317j) | (−0.393 + 1.5827j) | (−0.7494 + 0.4297j) |
| 175 | (−0.1314 − 0.2024j) | (−0.393 − 1.5827j) | (−0.7494 + 0.0937j) |
| 176 | (0.4079 − 0.4685j) | (0.0728 + 1.4962j) | (−0.7494 + 0.9504j) |
| 177 | (0.3554 − 0.4091j) | (0.0728 − 1.4962j) | (−0.7494 − 0.2918j) |
| 178 | (−0.4179 − 0.4629j) | (−0.0728 + 1.4962j) | (−0.7494 + 1.3347j) |
| 179 | (−0.3691 − 0.4064j) | (−0.0728 − 1.4962j) | (−0.7494 − 0.503j) |
| 180 | (0.2559 − 0.5654j) | (0.5026 + 1.4144j) | (−0.7494 − 0.946j) |
| 181 | (0.2249 − 0.4937j) | (0.5026 − 1.4144j) | (−0.7494 − 0.8449j) |
| 182 | (−0.2654 − 0.5672j) | (−0.5026 + 1.4144j) | (−0.7494 − 1.331j) |
| 183 | (−0.2352 − 0.4942j) | (−0.5026 − 1.4144j) | (−0.7494 − 0.5804j) |
| 184 | (0.5621 − 0.637j) | (0.218 + 1.4825j) | (−0.7494 + 0.8462j) |
| 185 | (0.1105 − 0.1167j) | (0.218 − 1.4825j) | (−0.7494 − 0.2242j) |
| 186 | (−0.5709 − 0.633j) | (−0.218 + 1.4825j) | (−0.7494 + 0.5805j) |
| 187 | (−0.1167 − 0.1161j) | (−0.218 − 1.4825j) | (−0.7494 − 0.0332j) |
| 188 | (0.3523 − 0.7731j) | (0.3615 + 1.4551j) | (−0.7494 + 0.2916j) |
| 189 | (0.0869 − 0.107j) | (0.3615 − 1.4551j) | (−0.7494 − 0.2239j) |
| 190 | (−0.3709 − 0.7752j) | (−0.3615 + 1.4551j) | (−0.7494 + 0.5035j) |
| 191 | (−0.0873 − 0.1019j) | (−0.3615 − 1.4551j) | (−0.7494 − 0.0328j) |
| 192 | (0.5017 + 0.3733j) | (0.9295 + 0.0448j) | (−1.1847 + 1.0626j) |
| 193 | (0.433 + 0.3274j) | (0.9295 − 0.0448j) | (−1.1847 − 0.3591j) |
| 194 | (−0.4996 + 0.3766j) | (−0.9295 + 0.0448j) | (−1.1847 + 1.1878j) |
| 195 | (−0.4365 + 0.3322j) | (−0.9295 − 0.0448j) | (−1.1847 − 0.4301j) |
| 196 | (0.5383 + 0.3214j) | (0.8841 + 0.3122j) | (−1.1847 − 1.058j) |
| 197 | (0.4685 + 0.2775j) | (0.8841 − 0.3122j) | (−1.1847 − 0.7494j) |
| 198 | (−0.5348 + 0.3258j) | (−0.8841 + 0.3122j) | (−1.1847 − 1.1847j) |
| 199 | (−0.471 + 0.2765j) | (−0.8841 − 0.3122j) | (−1.1847 − 0.6628j) |
| 200 | (0.6824 + 0.5069j) | (0.9223 + 0.1344j) | (−1.1847 + 0.7523j) |
| 201 | (0.2041 + 0.1325j) | (0.9223 − 0.1344j) | (−1.1847 + 0.1607j) |
| 202 | (−0.6791 + 0.5175j) | (−0.9223 + 0.1344j) | (−1.1847 + 0.6629j) |
| 203 | (−0.2045 + 0.132j) | (−0.9223 − 0.1344j) | (−1.1847 − 0.0944j) |
| 204 | (0.731 + 0.4389j) | (0.9071 + 0.2239j) | (−1.1847 + 0.3594j) |
| 205 | (0.2367 + 0.1203j) | (0.9071 − 0.2239j) | (−1.1847 + 0.1597j) |
| 206 | (−0.7255 + 0.4463j) | (−0.9071 + 0.2239j) | (−1.1847 + 0.4297j) |
| 207 | (−0.237 + 0.1193j) | (−0.9071 − 0.2239j) | (−1.1847 + 0.0937j) |
| 208 | (0.4603 + 0.4175j) | (1.0112 + 0.0488j) | (−1.1847 + 0.9504j) |
| 209 | (0.4063 + 0.3693j) | (1.0112 − 0.0488j) | (−1.1847 − 0.2918j) |
| 210 | (−0.4607 + 0.4242j) | (−1.0112 + 0.0488j) | (−1.1847 + 1.3347j) |
| 211 | (−0.4028 + 0.3683j) | (−1.0112 − 0.0488j) | (−1.1847 − 0.503j) |
| 212 | (0.5655 + 0.2706j) | (0.9595 + 0.3387j) | (−1.1847 − 0.946j) |
| 213 | (0.4972 + 0.2352j) | (0.9595 − 0.3387j) | (−1.1847 − 0.8449j) |
| 214 | (−0.5663 + 0.2728j) | (−0.9595 + 0.3387j) | (−1.1847 − 1.331j) |
| 215 | (−0.4987 + 0.2352j) | (−0.9595 − 0.3387j) | (−1.1847 − 0.5804j) |
| 216 | (0.6282 + 0.5729j) | (1.0026 + 0.1464j) | (−1.1847 + 0.8462j) |
| 217 | (0.1461 + 0.0614j) | (1.0026 − 0.1464j) | (−1.1847 − 0.2242j) |
| 218 | (−0.629 + 0.5813j) | (−1.0026 + 0.1464j) | (−1.1847 + 0.5805j) |
| 219 | (−0.1499 + 0.0621j) | (−1.0026 − 0.1464j) | (−1.1847 − 0.0332j) |
| 220 | (0.7712 + 0.3678j) | (0.9858 + 0.2431j) | (−1.1847 + 0.2916j) |
| 221 | (0.0864 + 0.0375j) | (0.9858 − 0.2431j) | (−1.1847 − 0.2239j) |
| 222 | (−0.7709 + 0.3758j) | (−0.9858 + 0.2431j) | (−1.1847 + 0.5035j) |
| 223 | (−0.0946 + 0.037j) | (−0.9858 − 0.2431j) | (−1.1847 − 0.0328j) |
| 224 | (0.4907 − 0.3721j) | (1.6285 + 0.0791j) | (−0.6628 + 1.0626j) |

TABLE 9-continued

An example of the bit-to-symbol mapping for 1024-ary non-uniform constellations from NN for code rate 4/5

| Mapping | NN_QSL | NN_QSC | NN_RSC |
| --- | --- | --- | --- |
| 225 | (0.4272 − 0.327j) | (1.6285 − 0.0791j) | (−0.6628 − 0.3591j) |
| 226 | (−0.5032 − 0.3732j) | (−1.6285 + 0.0791j) | (−0.6628 + 1.1878j) |
| 227 | (−0.4385 − 0.3286j) | (−1.6285 − 0.0791j) | (−0.6628 − 0.4301j) |
| 228 | (0.5296 − 0.3255j) | (1.5386 + 0.5469j) | (−0.6628 − 1.058j) |
| 229 | (0.4632 − 0.2748j) | (1.5386 − 0.5469j) | (−0.6628 − 0.7494j) |
| 230 | (−0.5388 − 0.3189j) | (−1.5386 + 0.5469j) | (−0.6628 − 1.1847j) |
| 231 | (−0.4755 − 0.2712j) | (−1.5386 − 0.5469j) | (−0.6628 − 0.6628j) |
| 232 | (0.6754 − 0.519j) | (1.6131 + 0.237j) | (−0.6628 − 0.7523j) |
| 233 | (0.1995 − 0.1273j) | (1.6131 − 0.237j) | (−0.6628 − 0.1607j) |
| 234 | (−0.6842 − 0.5066j) | (−1.6131 + 0.237j) | (−0.6628 + 0.6629j) |
| 235 | (−0.2066 − 0.1312j) | (−1.6131 − 0.237j) | (−0.6628 − 0.0944j) |
| 236 | (0.7211 − 0.4468j) | (1.583 + 0.3934j) | (−0.6628 + 0.3594j) |
| 237 | (0.2335 − 0.1172j) | (1.583 − 0.3934j) | (−0.6628 + 0.1597j) |
| 238 | (−0.7312 − 0.4415j) | (−1.583 + 0.3934j) | (−0.6628 + 0.4297j) |
| 239 | (−0.2462 − 0.1171j) | (−1.583 − 0.3934j) | (−0.6628 + 0.0937j) |
| 240 | (0.4558 − 0.424j) | (1.4969 + 0.0726j) | (−0.6628 + 0.9504j) |
| 241 | (0.3981 − 0.3655j) | (1.4969 − 0.0726j) | (−0.6628 − 0.2918j) |
| 242 | (−0.4676 − 0.4191j) | (−1.4969 + 0.0726j) | (−0.6628 + 1.3347j) |
| 243 | (−0.4098 − 0.369j) | (−1.4969 − 0.0726j) | (−0.6628 − 0.503j) |
| 244 | (0.5637 − 0.2743j) | (1.4145 + 0.5032j) | (−0.6628 − 0.946j) |
| 245 | (0.4938 − 0.2386j) | (1.4145 − 0.5032j) | (−0.6628 − 0.8449j) |
| 246 | (−0.571 − 0.2635j) | (−1.4145 + 0.5032j) | (−0.6628 − 1.331j) |
| 247 | (−0.5007 − 0.2353j) | (−1.4145 − 0.5032j) | (−0.6628 − 0.5804j) |
| 248 | (0.6183 − 0.5836j) | (1.4829 + 0.2182j) | (−0.6628 − 0.8462j) |
| 249 | (0.1465 − 0.0602j) | (1.4829 − 0.2182j) | (−0.6628 − 0.2242j) |
| 250 | (−0.6288 − 0.5726j) | (−1.4829 + 0.2182j) | (−0.6628 + 0.5805j) |
| 251 | (−0.1548 − 0.0603j) | (−1.4829 − 0.2182j) | (−0.6628 − 0.0332j) |
| 252 | (0.763 − 0.3764j) | (1.4551 + 0.3617j) | (−0.6628 + 0.2916j) |
| 253 | (0.085 − 0.0339j) | (1.4551 − 0.3617j) | (−0.6628 + 0.2239j) |
| 254 | (−0.7748 − 0.3684j) | (−1.4551 + 0.3617j) | (−0.6628 + 0.5035j) |
| 255 | (−0.0927 − 0.0278j) | (−1.4551 − 0.3617j) | (−0.6628 + 0.0328j) |
| 256 | (0.1013 + 0.6984j) | (0.5869 + 0.6485j) | (0.7523 + 1.0626j) |
| 257 | (0.0558 + 0.4624j) | (0.5869 − 0.6485j) | (0.7523 − 0.3591j) |
| 258 | (−0.0963 + 0.7007j) | (−0.5869 + 0.6485j) | (0.7523 + 1.1878j) |
| 259 | (−0.0551 + 0.4603j) | (−0.5869 − 0.6485j) | (0.7523 − 0.4301j) |
| 260 | (0.169 + 0.6862j) | (0.3677 + 0.7819j) | (0.7523 − 1.058j) |
| 261 | (0.1232 + 0.4492j) | (0.3677 − 0.7819j) | (0.7523 − 0.7494j) |
| 262 | (−0.1643 + 0.6844j) | (−0.3677 + 0.7819j) | (0.7523 − 1.1847j) |
| 263 | (−0.1223 + 0.4513j) | (−0.3677 − 0.7819j) | (0.7523 − 0.6628j) |
| 264 | (0.1146 + 0.7745j) | (0.5188 + 0.7018j) | (0.7523 + 0.7523j) |
| 265 | (0.0303 + 0.2988j) | (0.5188 − 0.7018j) | (0.7523 − 0.1607j) |
| 266 | (−0.1078 + 0.7737j) | (−0.5188 + 0.7018j) | (0.7523 + 0.6629j) |
| 267 | (−0.0306 + 0.303j) | (−0.5188 − 0.7018j) | (0.7523 − 0.0944j) |
| 268 | (0.1878 + 0.7561j) | (0.445 + 0.7463j) | (0.7523 + 0.3594j) |
| 269 | (0.094 + 0.2936j) | (0.445 − 0.7463j) | (0.7523 + 0.1597j) |
| 270 | (−0.186 + 0.7586j) | (−0.445 + 0.7463j) | (0.7523 + 0.4297j) |
| 271 | (−0.0962 + 0.2893j) | (−0.445 − 0.7463j) | (0.7523 + 0.0937j) |
| 272 | (0.0361 + 0.7022j) | (0.5389 + 0.5945j) | (0.7523 + 0.9504j) |
| 273 | (0.0348 + 0.4317j) | (0.5389 − 0.5945j) | (0.7523 − 0.2918j) |
| 274 | (−0.0312 + 0.7j) | (−0.5389 + 0.5945j) | (0.7523 + 1.3347j) |
| 275 | (−0.0333 + 0.4266j) | (−0.5389 − 0.5945j) | (0.7523 − 0.503j) |
| 276 | (0.2349 + 0.6655j) | (0.338 + 0.7122j) | (0.7523 − 0.946j) |
| 277 | (0.1304 + 0.415j) | (0.338 − 0.7122j) | (0.7523 − 0.8449j) |
| 278 | (−0.2376 + 0.663j) | (−0.338 + 0.7122j) | (0.7523 − 1.331j) |
| 279 | (−0.1281 + 0.4148j) | (−0.338 − 0.7122j) | (0.7523 − 0.5804j) |
| 280 | (0.0396 + 0.7779j) | (0.4765 + 0.6415j) | (0.7523 + 0.8462j) |
| 281 | (0.0355 + 0.3627j) | (0.4765 − 0.6415j) | (0.7523 − 0.2242j) |
| 282 | (−0.0352 + 0.7793j) | (−0.4765 + 0.6415j) | (0.7523 + 0.5805j) |
| 283 | (−0.0391 + 0.361j) | (−0.4765 − 0.6415j) | (0.7523 − 0.0332j) |
| 284 | (0.2594 + 0.7335j) | (0.4091 + 0.6803j) | (0.7523 + 0.2916j) |
| 285 | (0.1071 + 0.3528j) | (0.4091 − 0.6803j) | (0.7523 + 0.2239j) |
| 286 | (−0.2581 + 0.7369j) | (−0.4091 + 0.6803j) | (0.7523 + 0.5035j) |
| 287 | (−0.1093 + 0.343j) | (−0.4091 − 0.6803j) | (0.7523 + 0.0328j) |
| 288 | (0.0953 − 0.6954j) | (0.4403 + 0.4792j) | (−0.1607 + 1.0626j) |
| 289 | (0.0473 − 0.4604j) | (0.4403 − 0.4792j) | (−0.1607 − 0.3591j) |
| 290 | (−0.1075 − 0.6946j) | (−0.4403 + 0.4792j) | (−0.1607 + 1.1878j) |
| 291 | (−0.0599 − 0.4574j) | (−0.4403 − 0.4792j) | (−0.1607 − 0.4301j) |
| 292 | (0.1584 − 0.6792j) | (0.2846 + 0.572j) | (−0.1607 − 1.058j) |
| 293 | (0.1198 − 0.4495j) | (0.2846 − 0.572j) | (−0.1607 − 0.7494j) |
| 294 | (−0.1731 − 0.6792j) | (−0.2846 + 0.572j) | (−0.1607 − 1.1847j) |
| 295 | (−0.1267 − 0.4471j) | (−0.2846 − 0.572j) | (−0.1607 − 0.6628j) |
| 296 | (0.1038 − 0.7681j) | (0.3971 + 0.5118j) | (−0.1607 + 0.7523j) |
| 297 | (0.0241 − 0.2945j) | (0.3971 − 0.5118j) | (−0.1607 − 0.1607j) |
| 298 | (−0.1222 − 0.7711j) | (−0.3971 + 0.5118j) | (−0.1607 + 0.6629j) |
| 299 | (−0.032 − 0.2934j) | (−0.3971 − 0.5118j) | (−0.1607 − 0.0944j) |

TABLE 9-continued

An example of the bit-to-symbol mapping for 1024-ary non-uniform constellations from NN for code rate 4/5

| Mapping | NN_QSL | NN_QSC | NN_RSC |
| --- | --- | --- | --- |
| 300 | (0.178 − 0.7553j) | (0.3409 + 0.5481j) | (−0.1607 + 0.3594j) |
| 301 | (0.085 − 0.2892j) | (0.3409 − 0.5481j) | (−0.1607 + 0.1597j) |
| 302 | (−0.1922 − 0.7587j) | (−0.3409 + 0.5481j) | (−0.1607 + 0.4297j) |
| 303 | (−0.0966 − 0.29j) | (−0.3409 − 0.5481j) | (−0.1607 + 0.0937j) |
| 304 | (0.0277 − 0.7029j) | (0.491 + 0.5389j) | (−0.1607 + 0.9504j) |
| 305 | (0.0289 − 0.426j) | (0.491 − 0.5389j) | (−0.1607 − 0.2918j) |
| 306 | (−0.038 − 0.702j) | (−0.491 + 0.5389j) | (−0.1607 + 1.3347j) |
| 307 | (−0.042 − 0.4295j) | (−0.491 − 0.5389j) | (−0.1607 − 0.503j) |
| 308 | (0.2234 − 0.6626j) | (0.3098 + 0.6428j) | (−0.1607 − 0.946j) |
| 309 | (0.1215 − 0.4077j) | (0.3098 − 0.6428j) | (−0.1607 − 0.8449j) |
| 310 | (−0.2387 − 0.6644j) | (−0.3098 + 0.6428j) | (−0.1607 − 1.331j) |
| 311 | (−0.1305 − 0.409j) | (−0.3098 − 0.6428j) | (−0.1607 − 0.5804j) |
| 312 | (0.0301 − 0.7807j) | (0.4363 + 0.5791j) | (−0.1607 + 0.8462j) |
| 313 | (0.0303 − 0.3591j) | (0.4363 − 0.5791j) | (−0.1607 − 0.2242j) |
| 314 | (−0.0465 − 0.7785j) | (−0.4363 + 0.5791j) | (−0.1607 + 0.5805j) |
| 315 | (−0.0456 − 0.3566j) | (−0.4363 − 0.5791j) | (−0.1607 − 0.0332j) |
| 316 | (0.2496 − 0.7328j) | (0.375 + 0.6138j) | (−0.1607 + 0.2916j) |
| 317 | (0.0994 − 0.3418j) | (0.375 − 0.6138j) | (−0.1607 + 0.2239j) |
| 318 | (−0.2667 − 0.7328j) | (−0.375 + 0.6138j) | (−0.1607 + 0.5035j) |
| 319 | (−0.1126 − 0.3464j) | (−0.375 − 0.6138j) | (−0.1607 + 0.0328j) |
| 320 | (0.6978 + 0.1033j) | (0.6485 + 0.5868j) | (0.6629 + 1.0626j) |
| 321 | (0.4746 + 0.0555j) | (0.6485 − 0.5868j) | (0.6629 − 0.3591j) |
| 322 | (−0.7054 + 0.1101j) | (−0.6485 + 0.5868j) | (0.6629 + 1.1878j) |
| 323 | (−0.4839 + 0.0617j) | (−0.6485 − 0.5868j) | (0.6629 − 0.4301j) |
| 324 | (0.684 + 0.1699j) | (0.782 + 0.3674j) | (0.6629 − 1.058j) |
| 325 | (0.4599 + 0.1257j) | (0.782 − 0.3674j) | (0.6629 − 0.7494j) |
| 326 | (−0.6846 + 0.1737j) | (−0.782 + 0.3674j) | (0.6629 − 1.1847j) |
| 327 | (−0.4678 + 0.1235j) | (−0.782 − 0.3674j) | (0.6629 − 0.6628j) |
| 328 | (0.7735 + 0.1152j) | (0.7016 + 0.5185j) | (0.6629 + 0.7523j) |
| 329 | (0.3319 + 0.0298j) | (0.7016 − 0.5185j) | (0.6629 − 0.1607j) |
| 330 | (−0.7747 + 0.1171j) | (−0.7016 + 0.5185j) | (0.6629 + 0.6629j) |
| 331 | (−0.3384 + 0.0336j) | (−0.7016 − 0.5185j) | (0.6629 − 0.0944j) |
| 332 | (0.7572 + 0.1878j) | (0.7462 + 0.445j) | (0.6629 + 0.3594j) |
| 333 | (0.3215 + 0.0853j) | (0.7462 − 0.445j) | (0.6629 + 0.1597j) |
| 334 | (−0.7581 + 0.1947j) | (−0.7462 + 0.445j) | (0.6629 + 0.4297j) |
| 335 | (−0.3301 + 0.0957j) | (−0.7462 − 0.445j) | (0.6629 + 0.0937j) |
| 336 | (0.7024 + 0.0345j) | (0.5943 + 0.5387j) | (0.6629 + 0.9504j) |
| 337 | (0.4548 + 0.033j) | (0.5943 − 0.5387j) | (0.6629 − 0.2918j) |
| 338 | (−0.711 + 0.0382j) | (−0.5943 + 0.5387j) | (0.6629 + 1.3347j) |
| 339 | (−0.459 + 0.0384j) | (−0.5943 − 0.5387j) | (0.6629 − 0.503j) |
| 340 | (0.661 + 0.2372j) | (0.7127 + 0.3377j) | (0.6629 − 0.946j) |
| 341 | (0.4304 + 0.1413j) | (0.7127 − 0.3377j) | (0.6629 − 0.8449j) |
| 342 | (−0.6658 + 0.2416j) | (−0.7127 + 0.3377j) | (0.6629 − 1.331j) |
| 343 | (−0.4375 + 0.139j) | (−0.7127 − 0.3377j) | (0.6629 − 0.5804j) |
| 344 | (0.7815 + 0.0351j) | (0.6416 + 0.4762j) | (0.6629 + 0.8462j) |
| 345 | (0.3845 + 0.0331j) | (0.6416 − 0.4762j) | (0.6629 − 0.2242j) |
| 346 | (−0.784 + 0.037j) | (−0.6416 + 0.4762j) | (0.6629 + 0.5805j) |
| 347 | (−0.3946 + 0.0376j) | (−0.6416 − 0.4762j) | (0.6629 − 0.0332j) |
| 348 | (0.7308 + 0.2641j) | (0.6805 + 0.4088j) | (0.6629 + 0.2916j) |
| 349 | (0.3662 + 0.1117j) | (0.6805 − 0.4088j) | (0.6629 + 0.2239j) |
| 350 | (−0.7321 + 0.2669j) | (−0.6805 + 0.4088j) | (0.6629 + 0.5035j) |
| 351 | (−0.3756 + 0.1152j) | (−0.6805 − 0.4088j) | (0.6629 + 0.0328j) |
| 352 | (0.6946 − 0.1047j) | (0.4788 + 0.4401j) | (−0.0944 + 1.0626j) |
| 353 | (0.472 − 0.0599j) | (0.4788 − 0.4401j) | (−0.0944 − 0.3591j) |
| 354 | (−0.707 − 0.1019j) | (−0.4788 + 0.4401j) | (−0.0944 + 1.1878j) |
| 355 | (−0.481 − 0.0578j) | (−0.4788 − 0.4401j) | (−0.0944 − 0.4301j) |
| 356 | (0.6803 − 0.1731j) | (0.5723 + 0.2842j) | (−0.0944 − 1.058j) |
| 357 | (0.4592 − 0.1234j) | (0.5723 − 0.2842j) | (−0.0944 − 0.7494j) |
| 358 | (−0.6945 − 0.1702j) | (−0.5723 + 0.2842j) | (−0.0944 − 1.1847j) |
| 359 | (−0.4666 − 0.1204j) | (−0.5723 − 0.2842j) | (−0.0944 − 0.6628j) |
| 360 | (0.7686 − 0.1174j) | (0.5126 + 0.3966j) | (−0.0944 + 0.7523j) |
| 361 | (0.3344 − 0.0345j) | (0.5126 − 0.3966j) | (−0.0944 − 0.1607j) |
| 362 | (−0.7795 − 0.1132j) | (−0.5126 + 0.3966j) | (−0.0944 + 0.6629j) |
| 363 | (−0.3338 − 0.0267j) | (−0.5126 − 0.3966j) | (−0.0944 − 0.0944j) |
| 364 | (0.7525 − 0.192j) | (0.5486 + 0.3406j) | (−0.0944 + 0.3594j) |
| 365 | (0.3214 − 0.0877j) | (0.5486 − 0.3406j) | (−0.0944 + 0.1597j) |
| 366 | (−0.7618 − 0.1884j) | (−0.5486 + 0.3406j) | (−0.0944 + 0.4297j) |
| 367 | (−0.327 − 0.0901j) | (−0.5486 − 0.3406j) | (−0.0944 + 0.0937j) |
| 368 | (0.7037 − 0.0376j) | (0.5388 + 0.491j) | (−0.0944 + 0.9504j) |
| 369 | (0.4509 − 0.0353j) | (0.5388 − 0.491j) | (−0.0944 − 0.2918j) |
| 370 | (−0.7125 − 0.0349j) | (−0.5388 + 0.491j) | (−0.0944 + 1.3347j) |
| 371 | (−0.4601 − 0.0338j) | (−0.5388 − 0.491j) | (−0.0944 − 0.503j) |
| 372 | (0.658 − 0.2415j) | (0.6432 + 0.3095j) | (−0.0944 − 0.946j) |
| 373 | (0.4253 − 0.138j) | (0.6432 − 0.3095j) | (−0.0944 − 0.8449j) |
| 374 | (−0.6673 − 0.2334j) | (−0.6432 + 0.3095j) | (−0.0944 − 1.331j) |

TABLE 9-continued

An example of the bit-to-symbol mapping for 1024-ary non-uniform constellations from NN for code rate 4/5

| Mapping | NN_QSL | NN_QSC | NN_RSC |
|---|---|---|---|
| 375 | (−0.4353 − 0.142j) | (−0.6432 − 0.3095j) | (−0.0944 − 0.5804j) |
| 376 | (0.7776 − 0.0416j) | (0.5792 + 0.4361j) | (−0.0944 + 0.8462j) |
| 377 | (0.3828 − 0.0336j) | (0.5792 − 0.4361j) | (−0.0944 − 0.2242j) |
| 378 | (−0.7872 − 0.0398j) | (−0.5792 + 0.4361j) | (−0.0944 + 0.5805j) |
| 379 | (−0.391 − 0.0341j) | (−0.5792 − 0.4361j) | (−0.0944 − 0.0332j) |
| 380 | (0.7242 − 0.2666j) | (0.6142 + 0.3748j) | (−0.0944 + 0.2916j) |
| 381 | (0.3657 − 0.108j) | (0.6142 − 0.3748j) | (−0.0944 − 0.2239j) |
| 382 | (−0.7381 − 0.2626j) | (−0.6142 + 0.3748j) | (−0.0944 + 0.5035j) |
| 383 | (−0.3728 − 0.111j) | (−0.6142 − 0.3748j) | (−0.0944 − 0.0328j) |
| 384 | (0.4153 + 0.5601j) | (0.6369 + 0.7034j) | (0.3594 + 1.0626j) |
| 385 | (0.2833 + 0.3791j) | (0.6369 − 0.7034j) | (0.3594 − 0.3591j) |
| 386 | (−0.4077 + 0.5667j) | (−0.6369 + 0.7034j) | (0.3594 + 1.1878j) |
| 387 | (−0.2787 + 0.3761j) | (−0.6369 − 0.7034j) | (0.3594 − 0.4301j) |
| 388 | (0.3594 + 0.6034j) | (0.3992 + 0.8521j) | (0.3594 − 1.058j) |
| 389 | (0.2226 + 0.4131j) | (0.3992 − 0.8521j) | (0.3594 − 0.7494j) |
| 390 | (−0.3546 + 0.6133j) | (−0.3992 + 0.8521j) | (0.3594 − 1.1847j) |
| 391 | (−0.2211 + 0.412j) | (−0.3992 − 0.8521j) | (0.3594 − 0.6628j) |
| 392 | (0.4609 + 0.6268j) | (0.5628 + 0.7625j) | (0.3594 + 0.7523j) |
| 393 | (0.2077 + 0.2388j) | (0.5628 − 0.7625j) | (0.3594 − 0.1607j) |
| 394 | (−0.4572 + 0.6304j) | (−0.5628 + 0.7625j) | (0.3594 + 0.6629j) |
| 395 | (−0.2071 + 0.2395j) | (−0.5628 − 0.7625j) | (0.3594 − 0.0944j) |
| 396 | (0.398 + 0.6663j) | (0.483 + 0.8118j) | (0.3594 + 0.3594j) |
| 397 | (0.1564 + 0.2707j) | (0.483 − 0.8118j) | (0.3594 + 0.1597j) |
| 398 | (−0.3919 + 0.6739j) | (−0.483 + 0.8118j) | (0.3594 − 0.4297j) |
| 399 | (−0.1588 + 0.2723j) | (−0.483 − 0.8118j) | (0.3594 − 0.0937j) |
| 400 | (0.4691 + 0.5203j) | (0.6889 + 0.7607j) | (0.3594 + 0.9504j) |
| 401 | (0.2908 + 0.3407j) | (0.6889 − 0.7607j) | (0.3594 − 0.2918j) |
| 402 | (−0.4657 + 0.5244j) | (−0.6889 + 0.7607j) | (0.3594 + 1.3347j) |
| 403 | (−0.288 + 0.3402j) | (−0.6889 − 0.7607j) | (0.3594 − 0.503j) |
| 404 | (0.2992 + 0.636j) | (0.4324 + 0.9241j) | (0.3594 − 0.946j) |
| 405 | (0.195 + 0.3956j) | (0.4324 − 0.9241j) | (0.3594 − 0.8449j) |
| 406 | (−0.292 + 0.6388j) | (−0.4324 + 0.9241j) | (0.3594 − 1.331j) |
| 407 | (−0.1945 + 0.3903j) | (−0.4324 − 0.9241j) | (0.3594 − 0.5804j) |
| 408 | (0.5189 + 0.5794j) | (0.6091 + 0.8245j) | (0.3594 + 0.8462j) |
| 409 | (0.2445 + 0.2905j) | (0.6091 − 0.8245j) | (0.3594 − 0.2242j) |
| 410 | (−0.5158 + 0.5817j) | (−0.6091 + 0.8245j) | (0.3594 + 0.5805j) |
| 411 | (−0.2461 + 0.2872j) | (−0.6091 − 0.8245j) | (0.3594 − 0.0332j) |
| 412 | (0.3348 + 0.7019j) | (0.5228 + 0.8795j) | (0.3594 + 0.2916j) |
| 413 | (0.1782 + 0.3285j) | (0.5228 − 0.8795j) | (0.3594 + 0.2239j) |
| 414 | (−0.327 + 0.7086j) | (−0.5228 + 0.8795j) | (0.3594 + 0.5035j) |
| 415 | (−0.1797 + 0.3239j) | (−0.5228 − 0.8795j) | (0.3594 + 0.0328j) |
| 416 | (0.4044 − 0.5663j) | (1.0985 + 1.2137j) | (0.1597 + 1.0626j) |
| 417 | (0.2784 − 0.3723j) | (1.0985 − 1.2137j) | (0.1597 − 0.3591j) |
| 418 | (−0.414 − 0.5661j) | (−1.0985 + 1.2137j) | (0.1597 + 1.1878j) |
| 419 | (−0.2855 − 0.3768j) | (−1.0985 − 1.2137j) | (0.1597 − 0.4301j) |
| 420 | (0.3464 − 0.6042j) | (0.6952 + 1.4795j) | (0.1597 − 1.058j) |
| 421 | (0.218 − 0.4068j) | (0.6952 − 1.4795j) | (0.1597 − 0.7494j) |
| 422 | (−0.3588 − 0.6031j) | (−0.6952 + 1.4795j) | (0.1597 − 1.1847j) |
| 423 | (−0.228 − 0.4086j) | (−0.6952 − 1.4795j) | (0.1597 − 0.6628j) |
| 424 | (0.4496 − 0.6241j) | (0.9727 + 1.316j) | (0.1597 + 0.7523j) |
| 425 | (0.1973 − 0.2358j) | (0.9727 − 1.316j) | (0.1597 − 0.1607j) |
| 426 | (−0.4618 − 0.6251j) | (−0.9727 + 1.316j) | (0.1597 + 0.6629j) |
| 427 | (−0.2074 − 0.2334j) | (−0.9727 − 1.316j) | (0.1597 − 0.0944j) |
| 428 | (0.3837 − 0.6687j) | (0.8374 + 1.4043j) | (0.1597 + 0.3594j) |
| 429 | (0.15 − 0.2654j) | (0.8374 − 1.4043j) | (0.1597 + 0.1597j) |
| 430 | (−0.3983 − 0.6688j) | (−0.8374 + 1.4043j) | (0.1597 + 0.4297j) |
| 431 | (−0.1577 − 0.2634j) | (−0.8374 − 1.4043j) | (0.1597 + 0.0937j) |
| 432 | (0.4584 − 0.523j) | (1.0103 + 1.1159j) | (0.1597 + 0.9504j) |
| 433 | (0.286 − 0.3374j) | (1.0103 − 1.1159j) | (0.1597 − 0.2918j) |
| 434 | (−0.4707 − 0.5192j) | (−1.0103 + 1.1159j) | (0.1597 + 1.3347j) |
| 435 | (−0.291 − 0.3391j) | (−1.0103 − 1.1159j) | (0.1597 − 0.503j) |
| 436 | (0.2872 − 0.6367j) | (0.6395 + 1.3601j) | (0.1597 − 0.946j) |
| 437 | (0.1885 − 0.3827j) | (0.6395 − 1.3601j) | (0.1597 − 0.8449j) |
| 438 | (−0.2972 − 0.6351j) | (−0.6395 + 1.3601j) | (0.1597 − 1.331j) |
| 439 | (−0.1996 − 0.3857j) | (−0.6395 − 1.3601j) | (0.1597 − 0.5804j) |
| 440 | (0.5098 − 0.5831j) | (0.8958 + 1.2097j) | (0.1597 + 0.8462j) |
| 441 | (0.2378 − 0.2832j) | (0.8958 − 1.2097j) | (0.1597 − 0.2242j) |
| 442 | (−0.5185 − 0.5724j) | (−0.8958 + 1.2097j) | (0.1597 + 0.5805j) |
| 443 | (−0.245 − 0.2864j) | (−0.8958 − 1.2097j) | (0.1597 − 0.0332j) |
| 444 | (0.3213 − 0.7036j) | (0.7706 + 1.2911j) | (0.1597 + 0.2916j) |
| 445 | (0.1694 − 0.3292j) | (0.7706 − 1.2911j) | (0.1597 + 0.2239j) |
| 446 | (−0.333 − 0.7005j) | (−0.7706 + 1.2911j) | (0.1597 + 0.5035j) |
| 447 | (−0.1813 − 0.3203j) | (−0.7706 − 1.2911j) | (0.1597 + 0.0328j) |
| 448 | (0.5565 + 0.4175j) | (0.7036 + 0.6365j) | (0.4297 + 1.0626j) |
| 449 | (0.3788 + 0.2851j) | (0.7036 − 0.6365j) | (0.4297 − 0.3591j) |

TABLE 9-continued

An example of the bit-to-symbol mapping for 1024-ary
non-uniform constellations from NN for code rate 4/5

| Mapping | NN_QSL | NN_QSC | NN_RSC |
| --- | --- | --- | --- |
| 450 | (−0.559 + 0.4229j) | (−0.7036 + 0.6365j) | (0.4297 + 1.1878j) |
| 451 | (−0.3788 + 0.2891j) | (−0.7036 − 0.6365j) | (0.4297 − 0.4301j) |
| 452 | (0.5995 + 0.3619j) | (0.8522 + 0.3989j) | (0.4297 − 1.058j) |
| 453 | (0.41 + 0.2381j) | (0.8522 − 0.3989j) | (0.4297 − 0.7494j) |
| 454 | (−0.6012 + 0.3679j) | (−0.8522 + 0.3989j) | (0.4297 − 1.1847j) |
| 455 | (−0.4115 + 0.237j) | (−0.8522 − 0.3989j) | (0.4297 − 0.6628j) |
| 456 | (0.6205 + 0.4659j) | (0.7622 + 0.5621j) | (0.4297 + 0.7523j) |
| 457 | (0.2561 + 0.1988j) | (0.7622 − 0.5621j) | (0.4297 − 0.1607j) |
| 458 | (−0.6201 + 0.4704j) | (−0.7622 + 0.5621j) | (0.4297 + 0.6629j) |
| 459 | (−0.2602 + 0.2035j) | (−0.7622 − 0.5621j) | (0.4297 − 0.0944j) |
| 460 | (0.666 + 0.4j) | (0.8121 + 0.4829j) | (0.4297 + 0.3594j) |
| 461 | (0.2927 + 0.155j) | (0.8121 − 0.4829j) | (0.4297 + 0.1597j) |
| 462 | (−0.6627 + 0.4065j) | (−0.8121 + 0.4829j) | (0.4297 + 0.4297j) |
| 463 | (−0.2942 + 0.1577j) | (−0.8121 − 0.4829j) | (0.4297 + 0.0937j) |
| 464 | (0.52 + 0.4703j) | (0.761 + 0.6881j) | (0.4297 + 0.9504j) |
| 465 | (0.3402 + 0.2969j) | (0.761 − 0.6881j) | (0.4297 − 0.2918j) |
| 466 | (−0.5136 + 0.4742j) | (−0.761 + 0.6881j) | (0.4297 + 1.3347j) |
| 467 | (−0.3425 + 0.3006j) | (−0.761 − 0.6881j) | (0.4297 − 0.503j) |
| 468 | (0.6335 + 0.2992j) | (0.9243 + 0.4319j) | (0.4297 − 0.946j) |
| 469 | (0.404 + 0.2052j) | (0.9243 − 0.4319j) | (0.4297 − 0.8449j) |
| 470 | (−0.636 + 0.3079j) | (−0.9243 + 0.4319j) | (0.4297 − 1.331j) |
| 471 | (−0.407 + 0.2004j) | (−0.9243 − 0.4319j) | (0.4297 − 0.5804j) |
| 472 | (0.5761 + 0.5217j) | (0.8247 + 0.6086j) | (0.4297 + 0.8462j) |
| 473 | (0.2943 + 0.2471j) | (0.8247 − 0.6086j) | (0.4297 − 0.2242j) |
| 474 | (−0.5723 + 0.5251j) | (−0.8247 + 0.6086j) | (0.4297 + 0.5805j) |
| 475 | (−0.2985 + 0.2461j) | (−0.8247 − 0.6086j) | (0.4297 − 0.0332j) |
| 476 | (0.7045 + 0.336j) | (0.8793 + 0.5228j) | (0.4297 + 0.2916j) |
| 477 | (0.3384 + 0.174j) | (0.8793 − 0.5228j) | (0.4297 + 0.2239j) |
| 478 | (−0.7003 + 0.3413j) | (−0.8793 + 0.5228j) | (0.4297 + 0.5035j) |
| 479 | (−0.3426 + 0.1793j) | (−0.8793 − 0.5228j) | (0.4297 + 0.0328j) |
| 480 | (0.5483 − 0.4219j) | (1.2125 + 1.0979j) | (0.0937 + 1.0626j) |
| 481 | (0.3728 − 0.2866j) | (1.2125 − 1.0979j) | (0.0937 − 0.3591j) |
| 482 | (−0.5634 − 0.4175j) | (−1.2125 + 1.0979j) | (0.0937 + 1.1878j) |
| 483 | (−0.3815 − 0.2874j) | (−1.2125 − 1.0979j) | (0.0937 − 0.4301j) |
| 484 | (0.5909 − 0.3657j) | (1.4792 + 0.6961j) | (0.0937 − 1.058j) |
| 485 | (0.4019 − 0.2375j) | (1.4792 − 0.6961j) | (0.0937 − 0.7494j) |
| 486 | (−0.6034 − 0.3608j) | (−1.4792 + 0.6961j) | (0.0937 − 1.1847j) |
| 487 | (−0.4194 − 0.233j) | (−1.4792 − 0.6961j) | (0.0937 − 0.6628j) |
| 488 | (0.6129 − 0.4726j) | (1.3155 + 0.973j) | (0.0937 + 0.7523j) |
| 489 | (0.2535 − 0.1974j) | (1.3155 − 0.973j) | (0.0937 − 0.1607j) |
| 490 | (−0.6218 − 0.4643j) | (−1.3155 + 0.973j) | (0.0937 + 0.6629j) |
| 491 | (−0.2603 − 0.1987j) | (−1.3155 − 0.973j) | (0.0937 − 0.0944j) |
| 492 | (0.6588 − 0.4093j) | (1.4038 + 0.8377j) | (0.0937 + 0.3594j) |
| 493 | (0.2842 − 0.1506j) | (1.4038 − 0.8377j) | (0.0937 + 0.1597j) |
| 494 | (−0.6665 − 0.4036j) | (−1.4038 + 0.8377j) | (0.0937 + 0.4297j) |
| 495 | (−0.2976 − 0.1518j) | (−1.4038 − 0.8377j) | (0.0937 + 0.0937j) |
| 496 | (0.51 − 0.4746j) | (1.1144 + 1.0103j) | (0.0937 + 0.9504j) |
| 497 | (0.3347 − 0.2965j) | (1.1144 − 1.0103j) | (0.0937 − 0.2918j) |
| 498 | (−0.5148 − 0.4713j) | (−1.1144 + 1.0103j) | (0.0937 + 1.3347j) |
| 499 | (−0.3461 − 0.2979j) | (−1.1144 − 1.0103j) | (0.0937 − 0.503j) |
| 500 | (0.6272 − 0.3068j) | (1.3602 + 0.6395j) | (0.0937 − 0.946j) |
| 501 | (0.4006 − 0.2039j) | (1.3602 − 0.6395j) | (0.0937 − 0.8449j) |
| 502 | (−0.64 − 0.3011j) | (−1.3602 + 0.6395j) | (0.0937 − 1.331j) |
| 503 | (−0.4088 − 0.1967j) | (−1.3602 − 0.6395j) | (0.0937 − 0.5804j) |
| 504 | (0.5658 − 0.5287j) | (1.209 + 0.8956j) | (0.0937 + 0.8462j) |
| 505 | (0.2884 − 0.238j) | (1.209 − 0.8956j) | (0.0937 − 0.2242j) |
| 506 | (−0.5678 − 0.5205j) | (−1.209 + 0.8956j) | (0.0937 + 0.5805j) |
| 507 | (−0.2983 − 0.2402j) | (−1.209 − 0.8956j) | (0.0937 − 0.0332j) |
| 508 | (0.6931 − 0.3397j) | (1.2908 + 0.7709j) | (0.0937 + 0.2916j) |
| 509 | (0.3332 − 0.1749j) | (1.2908 − 0.7709j) | (0.0937 + 0.2239j) |
| 510 | (−0.7075 − 0.3341j) | (−1.2908 + 0.7709j) | (0.0937 + 0.5035j) |
| 511 | (−0.3454 − 0.176j) | (−1.2908 − 0.7709j) | (0.0937 + 0.0328j) |
| 512 | (0.1786 + 1.1724j) | (0.027 + 0.0611j) | (0.9504 + 1.0626j) |
| 513 | (0.1917 + 1.2732j) | (0.027 − 0.0611j) | (0.9504 − 0.3591j) |
| 514 | (−0.1693 + 1.1787j) | (−0.027 + 0.0611j) | (0.9504 + 1.1878j) |
| 515 | (−0.1855 + 1.2741j) | (−0.027 − 0.0611j) | (0.9504 − 0.4301j) |
| 516 | (0.2907 + 1.1433j) | (0.0317 + 0.262j) | (0.9504 − 1.058j) |
| 517 | (0.309 + 1.2499j) | (0.0317 − 0.262j) | (0.9504 − 0.7494j) |
| 518 | (−0.2863 + 1.1591j) | (−0.0317 + 0.262j) | (0.9504 − 1.1847j) |
| 519 | (−0.3086 + 1.25j) | (−0.0317 − 0.262j) | (0.9504 − 0.6628j) |
| 520 | (0.1416 + 0.9264j) | (0.043 + 0.1103j) | (0.9504 + 0.7523j) |
| 521 | (0.258 + 1.6315j) | (0.043 − 0.1103j) | (0.9504 − 0.1607j) |
| 522 | (−0.1358 + 0.9275j) | (−0.043 + 0.1103j) | (0.9504 + 0.6629j) |
| 523 | (−0.2411 + 1.6341j) | (−0.043 − 0.1103j) | (0.9504 − 0.0944j) |
| 524 | (0.2287 + 0.902j) | (0.025 + 0.1818j) | (0.9504 + 0.3594j) |

TABLE 9-continued

An example of the bit-to-symbol mapping for 1024-ary non-uniform constellations from NN for code rate 4/5

| Mapping | NN_QSL | NN_QSC | NN_RSC |
|---|---|---|---|
| 525 | (0.3934 + 1.4627j) | (0.025 − 0.1818j) | (0.9504 + 0.1597j) |
| 526 | (−0.2253 + 0.9122j) | (−0.025 + 0.1818j) | (0.9504 + 0.4297j) |
| 527 | (−0.3962 + 1.6036j) | (−0.025 − 0.1818j) | (0.9504 + 0.0937j) |
| 528 | (0.0567 + 1.1856j) | (0.0278 + 0.3759j) | (0.9504 − 0.9504j) |
| 529 | (0.0657 + 1.2858j) | (0.0278 − 0.3759j) | (0.9504 − 0.2918j) |
| 530 | (−0.0561 + 1.1863j) | (−0.0278 + 0.3759j) | (0.9504 + 1.3347j) |
| 531 | (−0.0624 + 1.286j) | (−0.0278 − 0.3759j) | (0.9504 − 0.503j) |
| 532 | (0.4094 + 1.1197j) | (0.0553 + 0.3141j) | (0.9504 − 0.946j) |
| 533 | (0.4903 + 1.3021j) | (0.0553 − 0.3141j) | (0.9504 − 0.8449j) |
| 534 | (−0.3997 + 1.1155j) | (−0.0553 + 0.3141j) | (0.9504 − 1.331j) |
| 535 | (−0.4291 + 1.2139j) | (−0.0553 − 0.3141j) | (0.9504 − 0.5804j) |
| 536 | (0.048 + 0.9321j) | (0.0722 + 0.3941j) | (0.9504 − 0.8462j) |
| 537 | (0.0854 + 1.6496j) | (0.0722 − 0.3941j) | (0.9504 − 0.2242j) |
| 538 | (−0.0436 + 0.9357j) | (−0.0722 + 0.3941j) | (0.9504 + 0.5805j) |
| 539 | (−0.077 + 1.65j) | (−0.0722 − 0.3941j) | (0.9504 − 0.0332j) |
| 540 | (0.3228 + 0.8843j) | (0.1151 + 0.3654j) | (0.9504 + 0.2916j) |
| 541 | (0.531 + 1.4186j) | (0.1151 − 0.3654j) | (0.9504 − 0.2239j) |
| 542 | (−0.3122 + 0.8829j) | (−0.1151 + 0.3654j) | (0.9504 + 0.5035j) |
| 543 | (−0.5528 + 1.5565j) | (−0.1151 − 0.3654j) | (0.9504 + 0.0328j) |
| 544 | (0.1657 − 1.171j) | (0.0317 + 0.5381j) | (−0.2918 + 1.0626j) |
| 545 | (0.1862 − 1.274j) | (0.0317 − 0.5381j) | (−0.2918 − 0.3591j) |
| 546 | (−0.1783 − 1.1678j) | (−0.0317 + 0.5381j) | (−0.2918 + 1.1878j) |
| 547 | (−0.1975 − 1.2723j) | (−0.0317 − 0.5381j) | (−0.2918 − 0.4301j) |
| 548 | (0.2774 − 1.1499j) | (0.2051 + 0.5107j) | (−0.2918 − 1.058j) |
| 549 | (0.2994 − 1.2522j) | (0.2051 − 0.5107j) | (−0.2918 − 0.7494j) |
| 550 | (−0.2937 − 1.1526j) | (−0.2051 + 0.5107j) | (−0.2918 − 1.1847j) |
| 551 | (−0.3184 − 1.2475j) | (−0.2051 − 0.5107j) | (−0.2918 − 0.6628j) |
| 552 | (0.1268 − 0.9247j) | (0.0921 + 0.5307j) | (−0.2918 + 0.7523j) |
| 553 | (0.2411 − 1.6341j) | (0.0921 − 0.5307j) | (−0.2918 − 0.1607j) |
| 554 | (−0.146 − 0.9209j) | (−0.0921 + 0.5307j) | (−0.2918 + 0.6629j) |
| 555 | (−0.2471 − 1.6332j) | (−0.0921 − 0.5307j) | (−0.2918 − 0.0944j) |
| 556 | (0.2174 − 0.9034j) | (0.1506 + 0.526j) | (−0.2918 + 0.3594j) |
| 557 | (0.4076 − 1.6007j) | (0.1506 − 0.526j) | (−0.2918 + 0.1597j) |
| 558 | (−0.2309 − 0.9025j) | (−0.1506 + 0.526j) | (−0.2918 + 0.4297j) |
| 559 | (−0.4053 − 1.6013j) | (−0.1506 − 0.526j) | (−0.2918 + 0.0937j) |
| 560 | (0.0491 − 1.1786j) | (0.0272 + 0.4642j) | (−0.2918 + 0.9504j) |
| 561 | (0.0566 − 1.2863j) | (0.0272 − 0.4642j) | (−0.2918 − 0.2918j) |
| 562 | (−0.0675 − 1.1846j) | (−0.0272 + 0.4642j) | (−0.2918 + 1.3347j) |
| 563 | (−0.0679 − 1.2857j) | (−0.0272 − 0.4642j) | (−0.2918 − 0.503j) |
| 564 | (0.3898 − 1.1113j) | (0.1897 + 0.4469j) | (−0.2918 − 0.946j) |
| 565 | (0.4225 − 1.2162j) | (0.1897 − 0.4469j) | (−0.2918 − 0.8449j) |
| 566 | (−0.409 − 1.1185j) | (−0.1897 + 0.4469j) | (−0.2918 − 1.331j) |
| 567 | (−0.439 − 1.2104j) | (−0.1897 − 0.4469j) | (−0.2918 − 0.5804j) |
| 568 | (0.035 − 0.9278j) | (0.0838 + 0.4552j) | (−0.2918 − 0.8462j) |
| 569 | (0.0826 − 1.6497j) | (0.0838 − 0.4552j) | (−0.2918 − 0.2242j) |
| 570 | (−0.0547 − 0.9275j) | (−0.0838 + 0.4552j) | (−0.2918 + 0.5805j) |
| 571 | (−0.0884 − 1.6494j) | (−0.0838 − 0.4552j) | (−0.2918 − 0.0332j) |
| 572 | (0.3 − 0.881j) | (0.1492 + 0.4302j) | (−0.2918 + 0.2916j) |
| 573 | (0.5598 − 1.554j) | (0.1492 − 0.4302j) | (−0.2918 − 0.2239j) |
| 574 | (−0.3188 − 0.8774j) | (−0.1492 + 0.4302j) | (−0.2918 + 0.5035j) |
| 575 | (−0.5712 − 1.5499j) | (−0.1492 − 0.4302j) | (−0.2918 + 0.0328j) |
| 576 | (1.1647 + 0.1694j) | (0.0534 + 0.0265j) | (1.3347 + 1.0626j) |
| 577 | (1.4993 + 0.2153j) | (0.0534 − 0.0265j) | (1.3347 − 0.3591j) |
| 578 | (−1.1674 + 0.1824j) | (−0.0534 + 0.0265j) | (1.3347 + 1.1878j) |
| 579 | (−1.2728 + 0.1939j) | (−0.0534 − 0.0265j) | (1.3347 − 0.4301j) |
| 580 | (1.1424 + 0.2787j) | (0.2607 + 0.0314j) | (1.3347 − 1.058j) |
| 581 | (1.4721 + 0.3567j) | (0.2607 − 0.0314j) | (1.3347 − 0.7494j) |
| 582 | (−1.1453 + 0.2988j) | (−0.2607 + 0.0314j) | (1.3347 − 1.1847j) |
| 583 | (−1.2465 + 0.3223j) | (−0.2607 − 0.0314j) | (1.3347 − 0.6628j) |
| 584 | (0.9202 + 0.1383j) | (0.1082 + 0.0417j) | (1.3347 + 0.7523j) |
| 585 | (1.6358 + 0.2295j) | (0.1082 − 0.0417j) | (1.3347 − 0.1607j) |
| 586 | (−0.9246 + 0.1443j) | (−0.1082 + 0.0417j) | (1.3347 + 0.6629j) |
| 587 | (−1.6335 + 0.2451j) | (−0.1082 − 0.0417j) | (1.3347 − 0.0944j) |
| 588 | (0.9042 + 0.2274j) | (0.1795 + 0.0247j) | (1.3347 + 0.3594j) |
| 589 | (1.6071 + 0.3817j) | (0.1795 − 0.0247j) | (1.3347 + 0.1597j) |
| 590 | (−0.9054 + 0.2344j) | (−0.1795 + 0.0247j) | (1.3347 + 0.4297j) |
| 591 | (−1.6014 + 0.4048j) | (−0.1795 − 0.0247j) | (1.3347 + 0.0937j) |
| 592 | (1.1743 + 0.0533j) | (0.3752 + 0.0277j) | (1.3347 + 0.9504j) |
| 593 | (1.5134 + 0.0631j) | (0.3752 − 0.0277j) | (1.3347 − 0.2918j) |
| 594 | (−1.1776 + 0.0638j) | (−0.3752 + 0.0277j) | (1.3347 + 1.3347j) |
| 595 | (−1.2856 + 0.0698j) | (−0.3752 − 0.0277j) | (1.3347 − 0.503j) |
| 596 | (1.1172 + 0.3913j) | (0.3134 + 0.0556j) | (1.3347 − 0.946j) |
| 597 | (1.4323 + 0.4929j) | (0.3134 − 0.0556j) | (1.3347 − 0.8449j) |
| 598 | (−1.1139 + 0.4116j) | (−0.3134 + 0.0556j) | (1.3347 − 1.331j) |
| 599 | (−1.209 + 0.4427j) | (−0.3134 − 0.0556j) | (1.3347 − 0.5804j) |

TABLE 9-continued

An example of the bit-to-symbol mapping for 1024-ary
non-uniform constellations from NN for code rate 4/5

| Mapping | NN_QSL | NN_QSC | NN_RSC |
|---|---|---|---|
| 600 | (0.9317 + 0.0452j) | (0.3933 + 0.0716j) | (1.3347 + 0.8462j) |
| 601 | (1.6504 + 0.0689j) | (0.3933 − 0.0716j) | (1.3347 − 0.2242j) |
| 602 | (−0.9339 + 0.0509j) | (−0.3933 + 0.0716j) | (1.3347 + 0.5805j) |
| 603 | (−1.6494 + 0.0884j) | (−0.3933 − 0.0716j) | (1.3347 − 0.0332j) |
| 604 | (0.8748 + 0.3161j) | (0.365 + 0.1149j) | (1.3347 + 0.2916j) |
| 605 | (1.5636 + 0.5325j) | (0.365 − 0.1149j) | (1.3347 + 0.2239j) |
| 606 | (−0.8734 + 0.322j) | (−0.365 + 0.1149j) | (1.3347 + 0.5035j) |
| 607 | (−1.5514 + 0.5672j) | (−0.365 − 0.1149j) | (1.3347 + 0.0328j) |
| 608 | (1.1645 − 0.1744j) | (0.538 + 0.0316j) | (−0.503 + 1.0626j) |
| 609 | (1.498 − 0.2244j) | (0.538 − 0.0316j) | (−0.503 − 0.3591j) |
| 610 | (−1.1728 − 0.1765j) | (−0.538 + 0.0316j) | (−0.503 + 1.1878j) |
| 611 | (−1.2737 − 0.1879j) | (−0.538 − 0.0316j) | (−0.503 − 0.4301j) |
| 612 | (1.1384 − 0.2837j) | (0.5107 + 0.2047j) | (−0.503 − 1.058j) |
| 613 | (1.4708 − 0.3623j) | (0.5107 − 0.2047j) | (−0.503 − 0.7494j) |
| 614 | (−1.1494 − 0.2879j) | (−0.5107 + 0.2047j) | (−0.503 − 1.1847j) |
| 615 | (−1.2492 − 0.3118j) | (−0.5107 − 0.2047j) | (−0.503 − 0.6628j) |
| 616 | (0.9147 − 0.1392j) | (0.5312 + 0.0918j) | (−0.503 − 0.7523j) |
| 617 | (1.634 − 0.2415j) | (0.5312 − 0.0918j) | (−0.503 − 0.1607j) |
| 618 | (−0.9308 − 0.1394j) | (−0.5312 + 0.0918j) | (−0.503 + 0.6629j) |
| 619 | (−1.6357 − 0.2298j) | (−0.5312 − 0.0918j) | (−0.503 − 0.0944j) |
| 620 | (0.8961 − 0.2302j) | (0.5264 + 0.1505j) | (−0.503 − 0.3594j) |
| 621 | (1.6044 − 0.3927j) | (0.5264 − 0.1505j) | (−0.503 + 0.1597j) |
| 622 | (−0.9094 − 0.2263j) | (−0.5264 + 0.1505j) | (−0.503 + 0.4297j) |
| 623 | (−1.6046 − 0.3921j) | (−0.5264 − 0.1505j) | (−0.503 + 0.0937j) |
| 624 | (1.1802 − 0.0531j) | (0.464 + 0.0275j) | (−0.503 + 0.9504j) |
| 625 | (1.5126 − 0.0797j) | (0.464 − 0.0275j) | (−0.503 − 0.2918j) |
| 626 | (−1.1809 − 0.0568j) | (−0.464 + 0.0275j) | (−0.503 + 1.3347j) |
| 627 | (−1.2861 − 0.0597j) | (−0.464 − 0.0275j) | (−0.503 − 0.503j) |
| 628 | (1.1032 − 0.3996j) | (0.4471 + 0.1888j) | (−0.503 − 0.946j) |
| 629 | (1.4282 − 0.5046j) | (0.4471 − 0.1888j) | (−0.503 − 0.8449j) |
| 630 | (−1.1225 − 0.4008j) | (−0.4471 + 0.1888j) | (−0.503 − 1.331j) |
| 631 | (−1.2128 − 0.4322j) | (−0.4471 − 0.1888j) | (−0.503 − 0.5804j) |
| 632 | (0.928 − 0.0459j) | (0.4551 + 0.0837j) | (−0.503 + 0.8462j) |
| 633 | (1.6495 − 0.0876j) | (0.4551 − 0.0837j) | (−0.503 − 0.2242j) |
| 634 | (−0.9373 − 0.0446j) | (−0.4551 + 0.0837j) | (−0.503 + 0.5805j) |
| 635 | (−1.6498 − 0.0804j) | (−0.4551 − 0.0837j) | (−0.503 − 0.0332j) |
| 636 | (0.8685 − 0.3189j) | (0.4306 + 0.1487j) | (−0.503 + 0.2916j) |
| 637 | (1.5587 − 0.5466j) | (0.4306 − 0.1487j) | (−0.503 + 0.2239j) |
| 638 | (−0.8786 − 0.3163j) | (−0.4306 + 0.1487j) | (−0.503 + 0.5035j) |
| 639 | (−1.5586 − 0.547j) | (−0.4306 − 0.1487j) | (−0.503 + 0.0328j) |
| 640 | (0.7069 + 0.9425j) | (0.0575 + 1.1837j) | (−0.946 + 1.0626j) |
| 641 | (0.8322 + 1.115j) | (0.0575 − 1.1837j) | (−0.946 − 0.3591j) |
| 642 | (−0.698 + 0.952j) | (−0.0575 + 1.1837j) | (−0.946 + 1.1878j) |
| 643 | (−0.7634 + 1.0368j) | (−0.0575 − 1.1837j) | (−0.946 − 0.4301j) |
| 644 | (0.615 + 1.0184j) | (0.3973 + 1.121j) | (−0.946 − 1.058j) |
| 645 | (0.7224 + 1.1891j) | (0.3973 − 1.121j) | (−0.946 − 0.7494j) |
| 646 | (−0.6048 + 1.0285j) | (−0.3973 + 1.121j) | (−0.946 − 1.1847j) |
| 647 | (−0.653 + 1.1096j) | (−0.3973 − 1.121j) | (−0.946 − 0.6628j) |
| 648 | (0.5515 + 0.7486j) | (0.172 + 1.1733j) | (−0.946 − 0.7523j) |
| 649 | (0.9152 + 1.207j) | (0.172 − 1.1733j) | (−0.946 − 0.1607j) |
| 650 | (−0.5507 + 0.7546j) | (−0.172 + 1.1733j) | (−0.946 + 0.6629j) |
| 651 | (−0.9814 + 1.3286j) | (−0.172 − 1.1733j) | (−0.946 − 0.0944j) |
| 652 | (0.4755 + 0.8063j) | (0.2858 + 1.1531j) | (−0.946 − 0.3594j) |
| 653 | (0.7878 + 1.2937j) | (0.2858 − 1.1531j) | (−0.946 + 0.1597j) |
| 654 | (−0.4733 + 0.805j) | (−0.2858 + 1.1531j) | (−0.946 + 0.4297j) |
| 655 | (−0.8424 + 1.4208j) | (−0.2858 − 1.1531j) | (−0.946 + 0.0937j) |
| 656 | (0.7981 + 0.8749j) | (0.0532 + 1.0946j) | (−0.946 + 0.9504j) |
| 657 | (0.9342 + 1.0311j) | (0.0532 − 1.0946j) | (−0.946 − 0.2918j) |
| 658 | (−0.7956 + 0.8855j) | (−0.0532 + 1.0946j) | (−0.946 + 1.3347j) |
| 659 | (−0.8619 + 0.9565j) | (−0.0532 − 1.0946j) | (−0.946 − 0.503j) |
| 660 | (0.5126 + 1.0729j) | (0.367 + 1.0381j) | (−0.946 − 0.946j) |
| 661 | (0.6094 + 1.2508j) | (0.367 − 1.0381j) | (−0.946 − 0.8449j) |
| 662 | (−0.5018 + 1.0771j) | (−0.367 + 1.0381j) | (−0.946 − 1.331j) |
| 663 | (−0.5458 + 1.1661j) | (−0.367 − 1.0381j) | (−0.946 − 0.5804j) |
| 664 | (0.6234 + 0.6912j) | (0.159 + 1.0852j) | (−0.946 + 0.8462j) |
| 665 | (1.0257 + 1.1146j) | (0.159 − 1.0852j) | (−0.946 − 0.2242j) |
| 666 | (−0.6154 + 0.6921j) | (−0.159 + 1.0852j) | (−0.946 + 0.5805j) |
| 667 | (−1.1063 + 1.2266j) | (−0.159 − 1.0852j) | (−0.946 − 0.0332j) |
| 668 | (0.3995 + 0.8429j) | (0.264 + 1.067j) | (−0.946 + 0.2916j) |
| 669 | (0.6712 + 1.3579j) | (0.264 − 1.067j) | (−0.946 + 0.2239j) |
| 670 | (−0.3961 + 0.8456j) | (−0.264 + 1.067j) | (−0.946 + 0.5035j) |
| 671 | (−0.7021 + 1.4952j) | (−0.264 − 1.067j) | (−0.946 + 0.0328j) |
| 672 | (0.7008 − 0.9586j) | (0.0622 + 1.2787j) | (−0.8449 + 1.0626j) |
| 673 | (0.8267 − 1.1191j) | (0.0622 − 1.2787j) | (−0.8449 − 0.3591j) |
| 674 | (−0.7111 − 0.9504j) | (−0.0622 + 1.2787j) | (−0.8449 + 1.1878j) |

TABLE 9-continued

An example of the bit-to-symbol mapping for 1024-ary non-uniform constellations from NN for code rate 4/5

| Mapping | NN_QSL | NN_QSC | NN_RSC |
| --- | --- | --- | --- |
| 675 | (−0.767 − 1.0341j) | (−0.0622 − 1.2787j) | (−0.8449 − 0.4301j) |
| 676 | (0.6035 − 1.0258j) | (0.4301 + 1.2101j) | (−0.8449 − 1.058j) |
| 677 | (0.7162 − 1.1928j) | (0.4301 − 1.2101j) | (−0.8449 − 0.7494j) |
| 678 | (−0.6122 − 1.0147j) | (−0.4301 + 1.2101j) | (−0.8449 − 1.1847j) |
| 679 | (−0.6685 − 1.1004j) | (−0.4301 − 1.2101j) | (−0.8449 − 0.6628j) |
| 680 | (0.5477 − 0.7505j) | (0.1863 + 1.2674j) | (−0.8449 + 0.7523j) |
| 681 | (0.9065 − 1.2135j) | (0.1863 − 1.2674j) | (−0.8449 − 0.1607j) |
| 682 | (−0.5559 − 0.752j) | (−0.1863 + 1.2674j) | (−0.8449 + 0.6629j) |
| 683 | (−0.9899 − 1.3223j) | (−0.1863 − 1.2674j) | (−0.8449 − 0.0944j) |
| 684 | (0.4665 − 0.7984j) | (0.3092 + 1.2448j) | (−0.8449 + 0.3594j) |
| 685 | (0.7816 − 1.2975j) | (0.3092 − 1.2448j) | (−0.8449 + 0.1597j) |
| 686 | (−0.4862 − 0.8005j) | (−0.3092 + 1.2448j) | (−0.8449 + 0.4297j) |
| 687 | (−0.8591 − 1.4108j) | (−0.3092 − 1.2448j) | (−0.8449 + 0.0937j) |
| 688 | (0.7846 − 0.8762j) | (0.0672 + 1.3819j) | (−0.8449 + 0.9504j) |
| 689 | (0.9281 − 1.0365j) | (0.0672 − 1.3819j) | (−0.8449 − 0.2918j) |
| 690 | (−0.7992 − 0.8736j) | (−0.0672 + 1.3819j) | (−0.8449 + 1.3347j) |
| 691 | (−0.8668 − 0.952j) | (−0.0672 − 1.3819j) | (−0.8449 − 0.503j) |
| 692 | (0.4984 − 1.0659j) | (0.4648 + 1.307j) | (−0.8449 − 0.946j) |
| 693 | (0.5355 − 1.1709j) | (0.4648 − 1.307j) | (−0.8449 − 0.8449j) |
| 694 | (−0.513 − 1.071j) | (−0.4648 + 1.307j) | (−0.8449 − 1.331j) |
| 695 | (−0.5555 − 1.1615j) | (−0.4648 − 1.307j) | (−0.8449 − 0.5804j) |
| 696 | (0.6114 − 0.6943j) | (0.2016 + 1.3696j) | (−0.8449 − 0.8462j) |
| 697 | (1.0215 − 1.1184j) | (0.2016 − 1.3696j) | (−0.8449 − 0.2242j) |
| 698 | (−0.6263 − 0.6837j) | (−0.2016 + 1.3696j) | (−0.8449 − 0.5805j) |
| 699 | (−1.1178 − 1.2161j) | (−0.2016 − 1.3696j) | (−0.8449 − 0.0332j) |
| 700 | (0.3859 − 0.8401j) | (0.3344 + 1.3443j) | (−0.8449 + 0.2916j) |
| 701 | (0.6538 − 1.3664j) | (0.3344 − 1.3443j) | (−0.8449 + 0.2239j) |
| 702 | (−0.4012 − 0.8435j) | (−0.3344 + 1.3443j) | (−0.8449 + 0.5035j) |
| 703 | (−0.7165 − 1.4883j) | (−0.3344 − 1.3443j) | (−0.8449 + 0.0328j) |
| 704 | (0.9555 + 0.702j) | (1.1848 + 0.0575j) | (−1.331 + 1.0626j) |
| 705 | (1.2319 + 0.8814j) | (1.1848 − 0.0575j) | (−1.331 − 0.3591j) |
| 706 | (−0.9498 + 0.7129j) | (−1.1848 + 0.0575j) | (−1.331 + 1.1878j) |
| 707 | (−1.027 + 0.7766j) | (−1.1848 − 0.0575j) | (−1.331 − 0.4301j) |
| 708 | (1.0187 + 0.6027j) | (1.1213 + 0.3973j) | (−1.331 − 1.058j) |
| 709 | (1.315 + 0.7518j) | (1.1213 − 0.3973j) | (−1.331 − 0.7494j) |
| 710 | (−1.0083 + 0.6151j) | (−1.1213 + 0.3973j) | (−1.331 − 1.1847j) |
| 711 | (−1.1015 + 0.6666j) | (−1.1213 − 0.3973j) | (−1.331 − 0.6628j) |
| 712 | (0.7463 + 0.5537j) | (1.1742 + 0.1718j) | (−1.331 + 0.7523j) |
| 713 | (1.3417 + 0.9634j) | (1.1742 − 0.1718j) | (−1.331 − 0.1607j) |
| 714 | (−0.745 + 0.5654j) | (−1.1742 + 0.1718j) | (−1.331 + 0.6629j) |
| 715 | (−1.3284 + 0.9818j) | (−1.1742 − 0.1718j) | (−1.331 − 0.0944j) |
| 716 | (0.7927 + 0.4759j) | (1.1536 + 0.2855j) | (−1.331 + 0.3594j) |
| 717 | (1.4277 + 0.8308j) | (1.1536 − 0.2855j) | (−1.331 + 0.1597j) |
| 718 | (−0.7941 + 0.4894j) | (−1.1536 + 0.2855j) | (−1.331 + 0.4297j) |
| 719 | (−1.413 + 0.8554j) | (−1.1536 − 0.2855j) | (−1.331 + 0.0937j) |
| 720 | (0.8747 + 0.7861j) | (1.0956 + 0.053j) | (−1.331 + 0.9504j) |
| 721 | (1.1389 + 0.9987j) | (1.0956 − 0.053j) | (−1.331 − 0.2918j) |
| 722 | (−0.8696 + 0.7966j) | (−1.0956 + 0.053j) | (−1.331 + 1.3347j) |
| 723 | (−0.9505 + 0.8685j) | (−1.0956 − 0.053j) | (−1.331 − 0.503j) |
| 724 | (1.0692 + 0.5015j) | (1.0383 + 0.3669j) | (−1.331 − 0.946j) |
| 725 | (1.3757 + 0.6339j) | (1.0383 − 0.3669j) | (−1.331 − 0.8449j) |
| 726 | (−1.0658 + 0.5137j) | (−1.0383 + 0.3669j) | (−1.331 − 1.331j) |
| 727 | (−1.161 + 0.5566j) | (−1.0383 − 0.3669j) | (−1.331 − 0.5804j) |
| 728 | (0.687 + 0.6205j) | (1.0863 + 0.159j) | (−1.331 − 0.8462j) |
| 729 | (1.2372 + 1.0944j) | (1.0863 − 0.159j) | (−1.331 − 0.2242j) |
| 730 | (−0.6877 + 0.6333j) | (−1.0863 + 0.159j) | (−1.331 + 0.5805j) |
| 731 | (−1.2251 + 1.1079j) | (−1.0863 − 0.159j) | (−1.331 − 0.0332j) |
| 732 | (0.8436 + 0.3975j) | (1.0675 + 0.264j) | (−1.331 + 0.2916j) |
| 733 | (1.5011 + 0.6893j) | (1.0675 − 0.264j) | (−1.331 + 0.2239j) |
| 734 | (−0.8394 + 0.4073j) | (−1.0675 + 0.264j) | (−1.331 + 0.5035j) |
| 735 | (−1.4925 + 0.7078j) | (−1.0675 − 0.264j) | (−1.331 + 0.0328j) |
| 736 | (0.9443 − 0.7071j) | (1.2799 + 0.062j) | (−0.5804 + 1.0626j) |
| 737 | (1.2202 − 0.8975j) | (1.2799 − 0.062j) | (−0.5804 − 0.3591j) |
| 738 | (−0.9487 − 0.6996j) | (−1.2799 + 0.062j) | (−0.5804 + 1.1878j) |
| 739 | (−1.038 − 0.7618j) | (−1.2799 − 0.062j) | (−0.5804 − 0.4301j) |
| 740 | (1.0102 − 0.6086j) | (1.2103 + 0.4297j) | (−0.5804 − 1.058j) |
| 741 | (1.3042 − 0.7703j) | (1.2103 − 0.4297j) | (−0.5804 − 0.7494j) |
| 742 | (−1.0086 − 0.6001j) | (−1.2103 + 0.4297j) | (−0.5804 − 1.1847j) |
| 743 | (−1.1065 − 0.6583j) | (−1.2103 − 0.4297j) | (−0.5804 − 0.6628j) |
| 744 | (0.738 − 0.5612j) | (1.2684 + 0.186j) | (−0.5804 + 0.7523j) |
| 745 | (1.3385 − 0.968j) | (1.2684 − 0.186j) | (−0.5804 − 0.1607j) |
| 746 | (−0.7447 − 0.5564j) | (−1.2684 + 0.186j) | (−0.5804 + 0.6629j) |
| 747 | (−1.3369 − 0.9701j) | (−1.2684 − 0.186j) | (−0.5804 − 0.0944j) |
| 748 | (0.7897 − 0.4876j) | (1.2451 + 0.3089j) | (−0.5804 + 0.3594j) |
| 749 | (1.4243 − 0.8365j) | (1.2451 − 0.3089j) | (−0.5804 + 0.1597j) |

TABLE 9-continued

An example of the bit-to-symbol mapping for 1024-ary
non-uniform constellations from NN for code rate 4/5

| Mapping | NN_QSL | NN_QSC | NN_RSC |
| --- | --- | --- | --- |
| 750 | (−0.7977 − 0.4802j) | (−1.2451 + 0.3089j) | (−0.5804 + 0.4297j) |
| 751 | (−1.4225 − 0.8396j) | (−1.2451 − 0.3089j) | (−0.5804 + 0.0937j) |
| 752 | (0.8677 − 0.793j) | (1.383 + 0.0678j) | (−0.5804 + 0.9504j) |
| 753 | (1.1351 − 1.003j) | (1.383 − 0.0678j) | (−0.5804 − 0.2918j) |
| 754 | (−0.8831 − 0.7952j) | (−1.383 + 0.0678j) | (−0.5804 + 1.3347j) |
| 755 | (−0.9571 − 0.8612j) | (−1.383 − 0.0678j) | (−0.5804 − 0.503j) |
| 756 | (1.0586 − 0.5052j) | (1.3072 + 0.465j) | (−0.5804 − 0.946j) |
| 757 | (1.3741 − 0.6374j) | (1.3072 − 0.465j) | (−0.5804 − 0.8449j) |
| 758 | (−1.0708 − 0.5059j) | (−1.3072 + 0.465j) | (−0.5804 − 1.331j) |
| 759 | (−1.1655 − 0.547j) | (−1.3072 − 0.465j) | (−0.5804 − 0.5804j) |
| 760 | (0.6789 − 0.6352j) | (1.3701 + 0.2024j) | (−0.5804 + 0.8462j) |
| 761 | (1.2379 − 1.0937j) | (1.3701 − 0.2024j) | (−0.5804 − 0.2242j) |
| 762 | (−0.6897 − 0.6256j) | (−1.3701 + 0.2024j) | (−0.5804 + 0.5805j) |
| 763 | (−1.2375 − 1.0941j) | (−1.3701 − 0.2024j) | (−0.5804 − 0.0332j) |
| 764 | (0.8306 − 0.3999j) | (1.3443 + 0.3352j) | (−0.5804 + 0.2916j) |
| 765 | (1.4995 − 0.6928j) | (1.3443 − 0.3352j) | (−0.5804 − 0.2239j) |
| 766 | (−0.844 − 0.4028j) | (−1.3443 + 0.3352j) | (−0.5804 + 0.5035j) |
| 767 | (−1.4993 − 0.6933j) | (−1.3443 − 0.3352j) | (−0.5804 − 0.0328j) |
| 768 | (0.1656 + 1.084j) | (0.1481 + 0.1893j) | (0.8462 + 1.0626j) |
| 769 | (0.2096 + 1.3754j) | (0.1481 − 0.1893j) | (0.8462 − 0.3591j) |
| 770 | (−0.1593 + 1.0928j) | (−0.1481 + 0.1893j) | (0.8462 + 1.1878j) |
| 771 | (−0.2008 + 1.3767j) | (−0.1481 − 0.1893j) | (0.8462 − 0.4301j) |
| 772 | (0.2771 + 1.0629j) | (0.0947 + 0.2322j) | (0.8462 − 1.058j) |
| 773 | (0.3461 + 1.3476j) | (0.0947 − 0.2322j) | (0.8462 − 0.7494j) |
| 774 | (−0.268 + 1.0658j) | (−0.0947 + 0.2322j) | (0.8462 − 1.1847j) |
| 775 | (−0.335 + 1.3504j) | (−0.0947 − 0.2322j) | (0.8462 − 0.6628j) |
| 776 | (0.1532 + 1.0087j) | (0.0996 + 0.1406j) | (0.8462 + 0.7523j) |
| 777 | (0.2329 + 1.4967j) | (0.0996 − 0.1406j) | (0.8462 − 0.1607j) |
| 778 | (−0.1438 + 1.0059j) | (−0.0996 + 0.1406j) | (0.8462 + 0.6629j) |
| 779 | (−0.222 + 1.4984j) | (−0.0996 − 0.1406j) | (0.8462 − 0.0944j) |
| 780 | (0.2497 + 0.9813j) | (0.0674 + 0.1859j) | (0.8462 + 0.3594j) |
| 781 | (0.4377 + 1.5927j) | (0.0674 − 0.1859j) | (0.8462 + 0.1597j) |
| 782 | (−0.243 + 0.9898j) | (−0.0674 + 0.1859j) | (0.8462 + 0.4297j) |
| 783 | (−0.3635 + 1.4705j) | (−0.0674 − 0.1859j) | (0.8462 + 0.0937j) |
| 784 | (0.0552 + 1.0973j) | (0.1858 + 0.2349j) | (0.8462 + 0.9504j) |
| 785 | (0.0692 + 1.3896j) | (0.1858 − 0.2349j) | (0.8462 − 0.2918j) |
| 786 | (−0.0533 + 1.1004j) | (−0.1858 + 0.2349j) | (0.8462 + 1.3347j) |
| 787 | (−0.0645 + 1.3898j) | (−0.1858 − 0.2349j) | (0.8462 − 0.503j) |
| 788 | (0.3786 + 1.0415j) | (0.1264 + 0.2775j) | (0.8462 − 0.946j) |
| 789 | (0.4427 + 1.209j) | (0.1264 − 0.2775j) | (0.8462 − 0.8449j) |
| 790 | (−0.366 + 1.0374j) | (−0.1264 + 0.2775j) | (0.8462 − 1.331j) |
| 791 | (−0.4614 + 1.3126j) | (−0.1264 − 0.2775j) | (0.8462 − 0.5804j) |
| 792 | (0.0518 + 1.0143j) | (0.2228 + 0.2756j) | (0.8462 + 0.8462j) |
| 793 | (0.0782 + 1.5127j) | (0.2228 − 0.2756j) | (0.8462 − 0.2242j) |
| 794 | (−0.046 + 1.0123j) | (−0.2228 + 0.2756j) | (0.8462 + 0.5805j) |
| 795 | (−0.0701 + 1.5131j) | (−0.2228 − 0.2756j) | (0.8462 − 0.0332j) |
| 796 | (0.3459 + 0.9602j) | (0.1646 + 0.3239j) | (0.8462 + 0.2916j) |
| 797 | (0.5834 + 1.5453j) | (0.1646 − 0.3239j) | (0.8462 − 0.2239j) |
| 798 | (−0.339 + 0.9602j) | (−0.1646 + 0.3239j) | (0.8462 + 0.5035j) |
| 799 | (−0.5068 + 1.4274j) | (−0.1646 − 0.3239j) | (0.8462 + 0.0328j) |
| 800 | (0.1542 − 1.0848j) | (0.3621 + 0.4078j) | (−0.2242 + 1.0626j) |
| 801 | (0.195 − 1.3776j) | (0.3621 − 0.4078j) | (−0.2242 − 0.3591j) |
| 802 | (−0.1692 − 1.0862j) | (−0.3621 + 0.4078j) | (−0.2242 + 1.1878j) |
| 803 | (−0.2105 − 1.3753j) | (−0.3621 − 0.4078j) | (−0.2242 − 0.4301j) |
| 804 | (0.2571 − 1.0604j) | (0.2671 + 0.4864j) | (−0.2242 − 1.058j) |
| 805 | (0.3269 − 1.3524j) | (0.2671 − 0.4864j) | (−0.2242 − 0.7494j) |
| 806 | (−0.2773 − 1.0626j) | (−0.2671 + 0.4864j) | (−0.2242 − 1.1847j) |
| 807 | (−0.3392 − 1.3493j) | (−0.2671 − 0.4864j) | (−0.2242 − 0.6628j) |
| 808 | (0.1408 − 0.9984j) | (0.3557 + 0.4498j) | (−0.2242 + 0.7523j) |
| 809 | (0.2184 − 1.4989j) | (0.3557 − 0.4498j) | (−0.2242 − 0.1607j) |
| 810 | (−0.1557 − 0.9979j) | (−0.3557 + 0.4498j) | (−0.2242 + 0.6629j) |
| 811 | (−0.2305 − 1.4971j) | (−0.3557 − 0.4498j) | (−0.2242 − 0.0944j) |
| 812 | (0.2392 − 0.984j) | (0.3098 + 0.4844j) | (−0.2242 + 0.3594j) |
| 813 | (0.3623 − 1.4708j) | (0.3098 − 0.4844j) | (−0.2242 + 0.1597j) |
| 814 | (−0.2536 − 0.981j) | (−0.3098 + 0.4844j) | (−0.2242 + 0.4297j) |
| 815 | (−0.3706 − 1.4687j) | (−0.3098 − 0.4844j) | (−0.2242 + 0.0937j) |
| 816 | (0.0449 − 1.0969j) | (0.3069 + 0.3625j) | (−0.2242 + 0.9504j) |
| 817 | (0.0641 − 1.3898j) | (0.3069 − 0.3625j) | (−0.2242 − 0.2918j) |
| 818 | (−0.0605 − 1.0926j) | (−0.3069 + 0.3625j) | (−0.2242 + 1.3347j) |
| 819 | (−0.0755 − 1.3893j) | (−0.3069 − 0.3625j) | (−0.2242 − 0.503j) |
| 820 | (0.3587 − 1.0333j) | (0.2448 + 0.4128j) | (−0.2242 − 0.946j) |
| 821 | (0.4569 − 1.3142j) | (0.2448 − 0.4128j) | (−0.2242 − 0.8449j) |
| 822 | (−0.378 − 1.0328j) | (−0.2448 + 0.4128j) | (−0.2242 − 1.331j) |
| 823 | (−0.4736 − 1.3082j) | (−0.2448 − 0.4128j) | (−0.2242 − 0.5804j) |
| 824 | (0.0429 − 1.0191j) | (0.2662 + 0.3202j) | (−0.2242 + 0.8462j) |

TABLE 9-continued

An example of the bit-to-symbol mapping for 1024-ary non-uniform constellations from NN for code rate 4/5

| Mapping | NN_QSL | NN_QSC | NN_RSC |
| --- | --- | --- | --- |
| 825 | (0.0686 − 1.5132j) | (0.2662 − 0.3202j) | (−0.2242 − 0.2242j) |
| 826 | (−0.0648 − 1.0092j) | (−0.2662 + 0.3202j) | (−0.2242 + 0.5805j) |
| 827 | (−0.0795 − 1.5126j) | (−0.2662 − 0.3202j) | (−0.2242 − 0.0332j) |
| 828 | (0.3307 − 0.9507j) | (0.2125 + 0.367j) | (−0.2242 + 0.2916j) |
| 829 | (0.5016 − 1.4293j) | (0.2125 − 0.367j) | (−0.2242 + 0.2239j) |
| 830 | (−0.3502 − 0.9508j) | (−0.2125 + 0.367j) | (−0.2242 + 0.5035j) |
| 831 | (−0.5177 − 1.4235j) | (−0.2125 − 0.367j) | (−0.2242 + 0.0328j) |
| 832 | (1.0784 + 0.1597j) | (0.1893 + 0.1475j) | (0.5805 + 1.0626j) |
| 833 | (1.2742 + 0.1847j) | (0.1893 − 0.1475j) | (0.5805 − 0.3591j) |
| 834 | (−1.0825 + 0.1662j) | (−0.1893 + 0.1475j) | (0.5805 + 1.1878j) |
| 835 | (−1.3752 + 0.2111j) | (−0.1893 − 0.1475j) | (0.5805 − 0.4301j) |
| 836 | (1.0563 + 0.2659j) | (0.2314 + 0.0941j) | (0.5805 − 1.058j) |
| 837 | (1.2502 + 0.3076j) | (0.2314 − 0.0941j) | (0.5805 − 0.7494j) |
| 838 | (−1.0638 + 0.2757j) | (−0.2314 + 0.0941j) | (0.5805 − 1.1847j) |
| 839 | (−1.3486 + 0.3422j) | (−0.2314 − 0.0941j) | (0.5805 − 0.6628j) |
| 840 | (0.9951 + 0.1479j) | (0.1398 + 0.0991j) | (0.5805 − 0.7523j) |
| 841 | (1.3773 + 0.1969j) | (0.1398 − 0.0991j) | (0.5805 − 0.1607j) |
| 842 | (−1.0058 + 0.1556j) | (−0.1398 + 0.0991j) | (0.5805 + 0.6629j) |
| 843 | (−1.4969 + 0.2316j) | (−0.1398 − 0.0991j) | (0.5805 − 0.0944j) |
| 844 | (0.9768 + 0.245j) | (0.1843 + 0.0666j) | (0.5805 + 0.3594j) |
| 845 | (1.3521 + 0.3281j) | (0.1843 − 0.0666j) | (0.5805 + 0.1597j) |
| 846 | (−0.9837 + 0.2569j) | (−0.1843 + 0.0666j) | (0.5805 + 0.4297j) |
| 847 | (−1.4666 + 0.3789j) | (−0.1843 − 0.0666j) | (0.5805 + 0.0937j) |
| 848 | (1.0838 + 0.0529j) | (0.2352 + 0.1848j) | (0.5805 + 0.9504j) |
| 849 | (1.2863 + 0.0567j) | (0.2352 − 0.1848j) | (0.5805 − 0.2918j) |
| 850 | (−1.0962 + 0.0587j) | (−0.2352 + 0.1848j) | (0.5805 + 1.3347j) |
| 851 | (−1.3895 + 0.0714j) | (−0.2352 − 0.1848j) | (0.5805 − 0.503j) |
| 852 | (1.0289 + 0.3656j) | (0.2771 + 0.1258j) | (0.5805 − 0.946j) |
| 853 | (1.2154 + 0.4249j) | (0.2771 − 0.1258j) | (0.5805 − 0.8449j) |
| 854 | (−1.0295 + 0.3802j) | (−0.2771 + 0.1258j) | (0.5805 − 1.331j) |
| 855 | (−1.3075 + 0.4757j) | (−0.2771 − 0.1258j) | (0.5805 − 0.5804j) |
| 856 | (1.006 + 0.0523j) | (0.2763 + 0.2225j) | (0.5805 + 0.8462j) |
| 857 | (1.39 + 0.0615j) | (0.2763 − 0.2225j) | (0.5805 − 0.2242j) |
| 858 | (−1.0152 + 0.0528j) | (−0.2763 + 0.2225j) | (0.5805 + 0.5805j) |
| 859 | (−1.5125 + 0.0817j) | (−0.2763 − 0.2225j) | (0.5805 − 0.0332j) |
| 860 | (0.9507 + 0.3372j) | (0.3242 + 0.1645j) | (0.5805 + 0.2916j) |
| 861 | (1.3152 + 0.454j) | (0.3242 − 0.1645j) | (0.5805 + 0.2239j) |
| 862 | (−0.9467 + 0.3511j) | (−0.3242 + 0.1645j) | (0.5805 + 0.5035j) |
| 863 | (−1.4226 + 0.5201j) | (−0.3242 − 0.1645j) | (0.5805 + 0.0328j) |
| 864 | (1.0752 − 0.1571j) | (0.4086 + 0.3619j) | (−0.0332 + 1.0626j) |
| 865 | (1.2735 − 0.1898j) | (0.4086 − 0.3619j) | (−0.0332 − 0.3591j) |
| 866 | (−1.0862 − 0.1623j) | (−0.4086 + 0.3619j) | (−0.0332 + 1.1878j) |
| 867 | (−1.3769 − 0.1999j) | (−0.4086 − 0.3619j) | (−0.0332 − 0.4301j) |
| 868 | (1.0539 − 0.2656j) | (0.4865 + 0.2669j) | (−0.0332 − 1.058j) |
| 869 | (1.2487 − 0.3136j) | (0.4865 − 0.2669j) | (−0.0332 − 0.7494j) |
| 870 | (−1.0604 − 0.2658j) | (−0.4865 + 0.2669j) | (−0.0332 − 1.1847j) |
| 871 | (−1.3511 − 0.3321j) | (−0.4865 − 0.2669j) | (−0.0332 − 0.6628j) |
| 872 | (0.988 − 0.1488j) | (0.4504 + 0.3557j) | (−0.0332 + 0.7523j) |
| 873 | (1.3763 − 0.2037j) | (0.4504 − 0.3557j) | (−0.0332 − 0.1607j) |
| 874 | (−1.0072 − 0.1479j) | (−0.4504 + 0.3557j) | (−0.0332 + 0.6629j) |
| 875 | (−1.4996 − 0.2134j) | (−0.4504 − 0.3557j) | (−0.0332 − 0.0944j) |
| 876 | (0.9724 − 0.247j) | (0.4847 + 0.3094j) | (−0.0332 + 0.3594j) |
| 877 | (1.3498 − 0.3374j) | (0.4847 − 0.3094j) | (−0.0332 + 0.1597j) |
| 878 | (−0.9882 − 0.2467j) | (−0.4847 + 0.3094j) | (−0.0332 + 0.4297j) |
| 879 | (−1.4708 − 0.3622j) | (−0.4847 − 0.3094j) | (−0.0332 + 0.0937j) |
| 880 | (1.089 − 0.0592j) | (0.363 + 0.3068j) | (−0.0332 + 0.9504j) |
| 881 | (1.2859 − 0.0654j) | (0.363 − 0.3068j) | (−0.0332 − 0.2918j) |
| 882 | (−1.093 − 0.0536j) | (−0.363 + 0.3068j) | (−0.0332 + 1.3347j) |
| 883 | (−1.3899 − 0.0633j) | (−0.363 − 0.3068j) | (−0.0332 − 0.503j) |
| 884 | (1.0253 − 0.3732j) | (0.4129 + 0.2445j) | (−0.0332 − 0.946j) |
| 885 | (1.2132 − 0.4312j) | (0.4129 − 0.2445j) | (−0.0332 − 0.8449j) |
| 886 | (−1.0408 − 0.3706j) | (−0.4129 + 0.2445j) | (−0.0332 − 1.331j) |
| 887 | (−1.3113 − 0.4649j) | (−0.4129 − 0.2445j) | (−0.0332 − 0.5804j) |
| 888 | (1.0092 − 0.0483j) | (0.3205 + 0.2657j) | (−0.0332 + 0.8462j) |
| 889 | (1.3895 − 0.0711j) | (0.3205 − 0.2657j) | (−0.0332 − 0.2242j) |
| 890 | (−1.0172 − 0.0485j) | (−0.3205 + 0.2657j) | (−0.0332 + 0.5805j) |
| 891 | (−1.5133 − 0.0646j) | (−0.3205 − 0.2657j) | (−0.0332 − 0.0332j) |
| 892 | (0.9458 − 0.3399j) | (0.3674 + 0.2122j) | (−0.0332 + 0.2916j) |
| 893 | (1.3103 − 0.4677j) | (0.3674 − 0.2122j) | (−0.0332 + 0.2239j) |
| 894 | (−0.9545 − 0.3424j) | (−0.3674 + 0.2122j) | (−0.0332 + 0.5035j) |
| 895 | (−1.4303 − 0.4985j) | (−0.3674 − 0.2122j) | (−0.0332 + 0.0328j) |
| 896 | (0.6532 + 0.8818j) | (0.8022 + 0.8857j) | (0.2916 + 1.0626j) |
| 897 | (0.7689 + 1.0327j) | (0.8022 − 0.8857j) | (0.2916 − 0.3591j) |
| 898 | (−0.6455 + 0.8871j) | (−0.8022 + 0.8857j) | (0.2916 + 1.1878j) |
| 899 | (−0.8234 + 1.1215j) | (−0.8022 − 0.8857j) | (0.2916 − 0.4301j) |

TABLE 9-continued

An example of the bit-to-symbol mapping for 1024-ary non-uniform constellations from NN for code rate 4/5

| Mapping | NN_QSL | NN_QSC | NN_RSC |
| --- | --- | --- | --- |
| 900 | (0.5646 + 0.9425j) | (0.506 + 1.0783j) | (0.2916 − 1.058j) |
| 901 | (0.6666 + 1.1015j) | (0.506 − 1.0783j) | (0.2916 − 0.7494j) |
| 902 | (−0.5563 + 0.9462j) | (−0.506 + 1.0783j) | (0.2916 − 1.1847j) |
| 903 | (−0.7067 + 1.1985j) | (−0.506 − 1.0783j) | (0.2916 − 0.6628j) |
| 904 | (0.6029 + 0.8146j) | (0.7104 + 0.9607j) | (0.2916 + 0.7523j) |
| 905 | (0.9883 + 1.3235j) | (0.7104 − 0.9607j) | (0.2916 − 0.1607j) |
| 906 | (−0.5945 + 0.8251j) | (−0.7104 + 0.9607j) | (0.2916 + 0.6629j) |
| 907 | (−0.8944 + 1.2224j) | (−0.7104 − 0.9607j) | (0.2916 − 0.0944j) |
| 908 | (0.5233 + 0.8676j) | (0.6108 + 1.0246j) | (0.2916 + 0.3594j) |
| 909 | (0.8662 + 1.4065j) | (0.6108 − 1.0246j) | (0.2916 + 0.1597j) |
| 910 | (−0.5133 + 0.8727j) | (−0.6108 + 1.0246j) | (0.2916 + 0.4297j) |
| 911 | (−0.7718 + 1.3033j) | (−0.6108 − 1.0246j) | (0.2916 + 0.0937j) |
| 912 | (0.7297 + 0.8077j) | (0.7434 + 0.8215j) | (0.2916 + 0.9504j) |
| 913 | (0.8724 + 0.9469j) | (0.7434 − 0.8215j) | (0.2916 − 0.2918j) |
| 914 | (−0.729 + 0.8128j) | (−0.7434 + 0.8215j) | (0.2916 + 1.3347j) |
| 915 | (−0.929 + 1.0357j) | (−0.7434 − 0.8215j) | (0.2916 − 0.503j) |
| 916 | (0.4763 + 0.9931j) | (0.4684 + 0.9992j) | (0.2916 − 0.946j) |
| 917 | (0.5541 + 1.1622j) | (0.4684 − 0.9992j) | (0.2916 − 0.8449j) |
| 918 | (−0.4616 + 0.9907j) | (−0.4684 + 0.9992j) | (0.2916 − 1.331j) |
| 919 | (−0.5872 + 1.2613j) | (−0.4684 − 0.9992j) | (0.2916 − 0.5804j) |
| 920 | (0.6768 + 0.7481j) | (0.6577 + 0.8905j) | (0.2916 + 0.8462j) |
| 921 | (1.1181 + 1.2159j) | (0.6577 − 0.8905j) | (0.2916 − 0.2242j) |
| 922 | (−0.6755 + 0.7585j) | (−0.6577 + 0.8905j) | (0.2916 + 0.5805j) |
| 923 | (−1.0129 + 1.1262j) | (−0.6577 − 0.8905j) | (0.2916 − 0.0332j) |
| 924 | (0.4387 + 0.9208j) | (0.5657 + 0.9496j) | (0.2916 + 0.2916j) |
| 925 | (0.7372 + 1.4782j) | (0.5657 − 0.9496j) | (0.2916 + 0.2239j) |
| 926 | (−0.4289 + 0.9212j) | (−0.5657 + 0.9496j) | (0.2916 + 0.5035j) |
| 927 | (−0.6488 + 1.3687j) | (−0.5657 − 0.9496j) | (0.2916 + 0.0328j) |
| 928 | (0.6479 − 0.882j) | (0.8652 + 0.9554j) | (0.2239 + 1.0626j) |
| 929 | (0.7639 − 1.0364j) | (0.8652 − 0.9554j) | (0.2239 − 0.3591j) |
| 930 | (−0.6553 − 0.8759j) | (−0.8652 + 0.9554j) | (0.2239 + 1.1878j) |
| 931 | (−0.8344 − 1.1133j) | (−0.8652 − 0.9554j) | (0.2239 − 0.4301j) |
| 932 | (0.5559 − 0.9472j) | (0.5472 + 1.1638j) | (0.2239 − 1.058j) |
| 933 | (0.6621 − 1.1042j) | (0.5472 − 1.1638j) | (0.2239 − 0.7494j) |
| 934 | (−0.5669 − 0.9389j) | (−0.5472 + 1.1638j) | (0.2239 − 1.1847j) |
| 935 | (−0.7239 − 1.1881j) | (−0.5472 − 1.1638j) | (0.2239 − 0.6628j) |
| 936 | (0.5907 − 0.8185j) | (0.7666 + 1.0364j) | (0.2239 + 0.7523j) |
| 937 | (0.9877 − 1.324j) | (0.7666 − 1.0364j) | (0.2239 − 0.1607j) |
| 938 | (−0.6059 − 0.8127j) | (−0.7666 + 1.0364j) | (0.2239 + 0.6629j) |
| 939 | (−0.9008 − 1.2178j) | (−0.7666 − 1.0364j) | (0.2239 − 0.0944j) |
| 940 | (0.5129 − 0.8711j) | (0.6592 + 1.1052j) | (0.2239 + 0.3594j) |
| 941 | (0.8612 − 1.4095j) | (0.6592 − 1.1052j) | (0.2239 + 0.1597j) |
| 942 | (−0.5256 − 0.8663j) | (−0.6592 + 1.1052j) | (0.2239 + 0.4297j) |
| 943 | (−0.7915 − 1.2915j) | (−0.6592 − 1.1052j) | (0.2239 + 0.0937j) |
| 944 | (0.7269 − 0.8184j) | (0.9339 + 1.0315j) | (0.2239 + 0.9504j) |
| 945 | (0.8653 − 0.9534j) | (0.9339 − 1.0315j) | (0.2239 − 0.2918j) |
| 946 | (−0.7372 − 0.807j) | (−0.9339 + 1.0315j) | (0.2239 + 1.3347j) |
| 947 | (−0.9334 − 1.0318j) | (−0.9339 − 1.0315j) | (0.2239 − 0.503j) |
| 948 | (0.4592 − 0.9935j) | (0.5914 + 1.2566j) | (0.2239 − 0.946j) |
| 949 | (0.5837 − 1.263j) | (0.5914 − 1.2566j) | (0.2239 − 0.8449j) |
| 950 | (−0.4801 − 0.9887j) | (−0.5914 + 1.2566j) | (0.2239 − 1.331j) |
| 951 | (−0.6002 − 1.2552j) | (−0.5914 − 1.2566j) | (0.2239 − 0.5804j) |
| 952 | (0.6671 − 0.7639j) | (0.8275 + 1.1188j) | (0.2239 + 0.8462j) |
| 953 | (1.1142 − 1.2194j) | (0.8275 − 1.1188j) | (0.2239 − 0.2242j) |
| 954 | (−0.6836 − 0.744j) | (−0.8275 + 1.1188j) | (0.2239 + 0.5805j) |
| 955 | (−1.0229 − 1.1172j) | (−0.8275 − 1.1188j) | (0.2239 − 0.0332j) |
| 956 | (0.4203 − 0.9175j) | (0.7127 + 1.193j) | (0.2239 + 0.2916j) |
| 957 | (0.7214 − 1.4859j) | (0.7127 − 1.193j) | (0.2239 + 0.2239j) |
| 958 | (−0.4409 − 0.9147j) | (−0.7127 + 1.193j) | (0.2239 + 0.5035j) |
| 959 | (−0.6634 − 1.3617j) | (−0.7127 − 1.193j) | (0.2239 + 0.0328j) |
| 960 | (0.8769 + 0.647j) | (0.8858 + 0.8019j) | (0.5035 + 1.0626j) |
| 961 | (1.0411 + 0.7574j) | (0.8858 − 0.8019j) | (0.5035 − 0.3591j) |
| 962 | (−0.8744 + 0.6624j) | (−0.8858 + 0.8019j) | (0.5035 + 1.1878j) |
| 963 | (−1.1172 + 0.8293j) | (−0.8858 − 0.8019j) | (0.5035 − 0.4301j) |
| 964 | (0.9383 + 0.5578j) | (1.0787 + 0.5061j) | (0.5035 − 1.058j) |
| 965 | (1.1115 + 0.6498j) | (1.0787 − 0.5061j) | (0.5035 − 0.7494j) |
| 966 | (−0.9375 + 0.5721j) | (−1.0787 + 0.5061j) | (0.5035 − 1.1847j) |
| 967 | (−1.1891 + 0.7224j) | (−1.0787 − 0.5061j) | (0.5035 − 0.6628j) |
| 968 | (0.814 + 0.5948j) | (0.9607 + 0.7095j) | (0.5035 + 0.7523j) |
| 969 | (1.1276 + 0.8151j) | (0.9607 − 0.7095j) | (0.5035 − 0.1607j) |
| 970 | (−0.8049 + 0.6104j) | (−0.9607 + 0.7095j) | (0.5035 + 0.6629j) |
| 971 | (−1.2139 + 0.906j) | (−0.9607 − 0.7095j) | (0.5035 − 0.0944j) |
| 972 | (0.8693 + 0.5177j) | (1.025 + 0.6104j) | (0.5035 + 0.3594j) |
| 973 | (1.2028 + 0.6993j) | (1.025 − 0.6104j) | (0.5035 + 0.1597j) |
| 974 | (−0.8649 + 0.528j) | (−1.025 + 0.6104j) | (0.5035 + 0.4297j) |

TABLE 9-continued

An example of the bit-to-symbol mapping for 1024-ary
non-uniform constellations from NN for code rate 4/5

| Mapping | NN_QSL | NN_QSC | NN_RSC |
|---|---|---|---|
| 975 | (−1.2958 + 0.7845j) | (−1.025 − 0.6104j) | (0.5035 + 0.0937j) |
| 976 | (0.8089 + 0.7301j) | (0.8214 + 0.7431j) | (0.5035 + 0.9504j) |
| 977 | (0.9582 + 0.86j) | (0.8214 − 0.7431j) | (0.5035 − 0.2918j) |
| 978 | (−0.8061 + 0.7389j) | (−0.8214 + 0.7431j) | (0.5035 + 1.3347j) |
| 979 | (−1.0319 + 0.9333j) | (−0.8214 − 0.7431j) | (0.5035 − 0.503j) |
| 980 | (0.9923 + 0.4623j) | (0.9992 + 0.4681j) | (0.5035 − 0.946j) |
| 981 | (1.1683 + 0.541j) | (0.9992 − 0.4681j) | (0.5035 − 0.8449j) |
| 982 | (−0.9856 + 0.4757j) | (−0.9992 + 0.4681j) | (0.5035 − 1.331j) |
| 983 | (−1.2561 + 0.5982j) | (−0.9992 − 0.4681j) | (0.5035 − 0.5804j) |
| 984 | (0.7466 + 0.6777j) | (0.8906 + 0.6574j) | (0.5035 + 0.8462j) |
| 985 | (1.0453 + 0.9182j) | (0.8906 − 0.6574j) | (0.5035 − 0.2242j) |
| 986 | (−0.7472 + 0.6886j) | (−0.8906 + 0.6574j) | (0.5035 + 0.5805j) |
| 987 | (−1.1228 + 1.0167j) | (−0.8906 − 0.6574j) | (0.5035 − 0.0332j) |
| 988 | (0.9147 + 0.4298j) | (0.9499 + 0.5651j) | (0.5035 + 0.2916j) |
| 989 | (1.2633 + 0.5829j) | (0.9499 − 0.5651j) | (0.5035 + 0.2239j) |
| 990 | (−0.9119 + 0.4417j) | (−0.9499 + 0.5651j) | (0.5035 + 0.5035j) |
| 991 | (−1.3666 + 0.6533j) | (−0.9499 − 0.5651j) | (0.5035 + 0.0328j) |
| 992 | (0.8655 − 0.653j) | (0.9556 + 0.8647j) | (0.0328 + 1.0626j) |
| 993 | (1.0331 − 0.7683j) | (0.9556 − 0.8647j) | (0.0328 − 0.3591j) |
| 994 | (−0.8785 − 0.6522j) | (−0.9556 + 0.8647j) | (0.0328 + 1.1878j) |
| 995 | (−1.1227 − 0.8217j) | (−0.9556 − 0.8647j) | (0.0328 − 0.4301j) |
| 996 | (0.9319 − 0.5627j) | (1.1638 + 0.5473j) | (0.0328 − 1.058j) |
| 997 | (1.1045 − 0.6616j) | (1.1638 − 0.5473j) | (0.0328 − 0.7494j) |
| 998 | (−0.938 − 0.5631j) | (−1.1638 + 0.5473j) | (0.0328 − 1.1847j) |
| 999 | (−1.1945 − 0.7134j) | (−1.1638 − 0.5473j) | (0.0328 − 0.6628j) |
| 1000 | (0.8033 − 0.6019j) | (1.0357 + 0.7657j) | (0.0328 + 0.7523j) |
| 1001 | (1.1238 − 0.8203j) | (1.0357 − 0.7657j) | (0.0328 − 0.1607j) |
| 1002 | (−0.8138 − 0.6023j) | (−1.0357 + 0.7657j) | (0.0328 + 0.6629j) |
| 1003 | (−1.2205 − 0.8971j) | (−1.0357 − 0.7657j) | (0.0328 − 0.0944j) |
| 1004 | (0.8538 − 0.5249j) | (1.1055 + 0.6592j) | (0.0328 + 0.3594j) |
| 1005 | (1.1972 − 0.7089j) | (1.1055 − 0.6592j) | (0.0328 + 0.1597j) |
| 1006 | (−0.8684 − 0.5228j) | (−1.1055 + 0.6592j) | (0.0328 + 0.4297j) |
| 1007 | (−1.3042 − 0.7704j) | (−1.1055 − 0.6592j) | (0.0328 + 0.0937j) |
| 1008 | (0.8025 − 0.7331j) | (1.0309 + 0.9337j) | (0.0328 + 0.9504j) |
| 1009 | (0.9536 − 0.865j) | (1.0309 − 0.9337j) | (0.0328 − 0.2918j) |
| 1010 | (−0.8166 − 0.7338j) | (−1.0309 + 0.9337j) | (0.0328 + 1.3347j) |
| 1011 | (−1.0327 − 0.9324j) | (−1.0309 − 0.9337j) | (0.0328 − 0.503j) |
| 1012 | (0.9794 − 0.4689j) | (1.2567 + 0.5915j) | (0.0328 − 0.946j) |
| 1013 | (1.1627 − 0.5531j) | (1.2567 − 0.5915j) | (0.0328 − 0.8449j) |
| 1014 | (−0.9855 − 0.4624j) | (−1.2567 + 0.5915j) | (0.0328 − 1.331j) |
| 1015 | (−1.2569 − 0.5967j) | (−1.2567 − 0.5915j) | (0.0328 − 0.5804j) |
| 1016 | (0.7398 − 0.6807j) | (1.1183 + 0.8269j) | (0.0328 + 0.8462j) |
| 1017 | (1.0371 − 0.9274j) | (1.1183 − 0.8269j) | (0.0328 − 0.2242j) |
| 1018 | (−0.7514 − 0.6796j) | (−1.1183 + 0.8269j) | (0.0328 + 0.5805j) |
| 1019 | (−1.1271 − 1.0119j) | (−1.1183 − 0.8269j) | (0.0328 − 0.0332j) |
| 1020 | (0.905 − 0.437j) | (1.193 + 0.7123j) | (0.0328 + 0.2916j) |
| 1021 | (1.259 − 0.5921j) | (1.193 − 0.7123j) | (0.0328 + 0.2239j) |
| 1022 | (−0.9134 − 0.4372j) | (−1.193 + 0.7123j) | (0.0328 + 0.5035j) |
| 1023 | (−1.3709 − 0.6442j) | (−1.193 − 0.7123j) | (0.0328 + 0.0328j) |

Modulation & Coding Schemes

As described above, an optimal modulation constellation along with bit-to-symbol mapping can be different depending on situations such as the channel conditions, channel coding rate, transmission signal power, etc., and can be adaptively applied through coordination between the transmitting and receiving entities. In cellular communication systems, the base station (gNB) can inform to the mobile terminal (UE) of which modulation and channel coding scheme(s) (MCSs) are applied to the corresponding data transmission from the gNB to the UE (downlink) or from the UE to the gNB (uplink). In sidelink communications, a transmitting UE can signal to another (receiving) UE the MCS for the corresponding communication between the UEs.

As an embodiment of the MCS signaling, a modulation format and an MCS indication table can be defined as follows:

TABLE 10

Modulation index

| Modulation Index | Modulation Format | |
|---|---|---|
| | Modulation Order | Index (1 or 2) for a given modulation order |
| 0 | 4-ary (QPSK) | — |
| 1 | 16-ary | 1 |
| 2 | 16-ary | 2 |
| 3 | 64-ary | 1 |
| 4 | 64-ary | 2 |
| 5 | 256-ary | 1 |
| 6 | 256-ary | 2 |
| 7 | 1024-ary | 1 |
| 8 | 1024-ary | 2 |

In TABLE 10, two modulation formats are assumed to be adopted for the respective modulation orders of 64, 256, and 1024, and only QPSK modulation is adopted for the modulation order of 4. The 64/256/1024-ary modulations can be selected from the examples presented above, or one of the two modulations for a given order can be the square QAM modulation. Once two modulation formats are determined for a given modulation order, the index 1 or 2 can be assigned to the two selected modulation formats, which is indicated in the last column in TABLE 10. The modulation index in TABLE 10 can uniquely determine the modulation order and the format (constellation, bit-to-symbol mapping), and is linked to the MC index in TABLE 11:

TABLE 11

MCS index

| MCS index | Modulation index | Spectral efficiency parameter |
|---|---|---|
| 0 | 0 | r0 |
| 1 | 0 | r1 |
| 2 | 0 | r2 |
| 3 | 0 | r3 |
| 4 | 0 | r4 |
| 5 | 0 | r5 |
| 6 | 1 | r6 |
| 7 | 1 | r7 |
| 8 | 1 | r8 |
| 9 | 2 | r9 |
| 10 | 2 | r10 |
| 11 | 2 | r11 |
| 12 | 3 | r12 |
| 13 | 3 | r13 |
| 14 | 3 | r14 |
| 15 | 4 | r15 |
| 16 | 4 | r16 |
| 17 | 4 | r17 |
| 18 | 5 | r18 |
| 19 | 5 | r19 |
| 20 | 5 | r20 |
| 21 | 6 | r21 |
| 22 | 6 | r22 |
| 23 | 6 | r23 |
| 24 | 7 | r24 |
| 25 | 7 | r25 |
| 26 | 7 | r26 |
| 27 | 8 | r27 |
| 28 | 8 | r28 |
| 29 | 8 | r29 |
| 30 | reserved | |
| 31 | reserved | |

The mapping between the MCS index and the modulation index in TABLE 11 is an example, and the range of the MCS index and the mapping between the MCS index and the modulation format can be differently defined depending on cases. The spectral efficiency parameter in the last column in TABLE 11 can determine the channel coding rate to be applied to the transmitted data, which can be represented by the channel coding rate or by a different type of value or index related to the spectral efficiency of the transmission. The mapping between the MCS index, the modulation index and the spectral efficiency parameter may be defined such that the modulation and coding formats corresponding to the MCS index can secure a reliable communication between the transmitting and receiving entities for the given situation.

In cellular commination systems, the gNB can indicate the MCS index to the UE for a corresponding downlink or uplink transmission. In broadcast communication systems, the transmitting entity for the broadcast can inform to the receivers the MCS index of the corresponding transmission.

For illustrative purposes the steps of algorithms above are described serially. However, some of these steps may be performed in parallel to each other. The operation diagrams illustrate example methods that can be implemented in accordance with the principles of the present disclosure and various changes could be made to the methods illustrated in the flowcharts. For example, while shown as a series of steps, various steps in each figure could overlap, occur in parallel, occur in a different order, or occur multiple times. In another example, steps may be omitted or replaced by other steps.

Although this disclosure has been described with an exemplary embodiment, various changes and modifications may be suggested to one skilled in the art. It is intended that this disclosure encompass such changes and modifications as fall within the scope of the appended claims.

What is claimed is:

1. A method, comprising:
  receiving configuration information including a signal-to-noise ratio (SNR) and a code rate; and
  mapping, based on the SNR, data bits to pre-defined in-phase and quadrature values,
  wherein the in-phase and quadrature values denote points on a two-dimensional (2D)) space such that optimality of bitwise mutual information is adapted based on the SNR.

2. The method of claim 1, wherein the mapping is according to a constraint selected from one of quadrant symmetry Lagrangian (QSL), quadrant symmetry constraint (QSC), or rectangular structure constraint (RSC).

3. The method of claim 2, wherein the mapping is, for the code rate r equal to one of $1/3$ or $11/15$, according to:

| Mapping | CodeRate, r = 1/3 | CodeRate, r = 11/15 |
|---|---|---|
| 0 | (−0.2097 + 0.3403j) | (0.4907 + 0.0364j) |
| 1 | (−0.8372 + 1.2398j) | (0.733 + 0.0826j) |
| 2 | (0.1936 + 0.3481j) | (1.4016 + 0.2667j) |
| 3 | (0.796 + 1.2854j) | (1.0335 + 0.1572j) |
| 4 | (−0.1939 + 0.3283j) | (−0.0631 − 0.4863j) |
| 5 | (−0.3343 + 1.4425j) | (−0.124 − 0.7262j) |
| 6 | (0.1786 + 0.3361j) | (−0.3216 − 1.3896j) |
| 7 | (0.2682 + 1.4537j) | (−0.209 − 1.0221j) |
| 8 | (−0.194 − 0.3509j) | (0.3853 − 0.1957j) |
| 9 | (−0.7978 − 1.2857j) | (0.7104 − 0.2442j) |
| 10 | (0.2062 − 0.3392j) | (1.4333 − 0.2849j) |
| 11 | (0.8574 − 1.2622j) | (1.0537 − 0.2444j) |
| 12 | (−0.1782 − 0.3381j) | (0.1741 − 0.3976j) |
| 13 | (−0.2735 − 1.461j) | (0.2082 − 0.7241j) |
| 14 | (0.1898 − 0.3298j) | (0.223 − 1.4431j) |
| 15 | (0.3312 − 1.4431j) | (0.1977 − 1.0622j) |
| 16 | (−0.3204 + 0.5482j) | (0.0638 + 0.4865j) |
| 17 | (−0.5788 + 0.9226j) | (0.1225 + 0.726j) |
| 18 | (0.298 + 0.5581j) | (0.335 + 1.386j) |
| 19 | (0.5472 + 0.945j) | (0.2155 + 1.0211j) |
| 20 | (−0.2534 + 0.5721j) | (−0.4897 − 0.0399j) |
| 21 | (−0.2862 + 1.0536j) | (−0.7342 − 0.0864j) |
| 22 | (0.2353 + 0.5805j) | (−1.4092 − 0.2568j) |
| 23 | (0.2491 + 1.0588j) | (−1.0349 − 0.1617j) |
| 24 | (−0.2988 − 0.5626j) | (−0.1738 + 0.3927j) |
| 25 | (−0.5412 − 0.9449j) | (−0.2068 + 0.7201j) |
| 26 | (0.317 − 0.5426j) | (−0.2136 + 1.4405j) |
| 27 | (0.5812 − 0.9185j) | (−0.191 + 1.0578j) |
| 28 | (−0.2322 − 0.5813j) | (−0.3854 + 0.1923j) |
| 29 | (−0.2367 − 1.0684j) | (−0.7125 + 0.2403j) |
| 30 | (0.2575 − 0.5657j) | (−1.4237 + 0.2957j) |
| 31 | (0.2906 − 1.0509j) | (−1.0473 + 0.2465j) |
| 32 | (−0.352 + 0.1938j) | (0.3653 + 0.1894j) |
| 33 | (−1.2881 + 0.8197j) | (0.6174 + 0.3805j) |
| 34 | (0.3433 + 0.209j) | (1.196 + 0.7683j) |
| 35 | (1.2595 + 0.8631j) | (0.8805 + 0.5471j) |
| 36 | (−0.3413 + 0.1757j) | (−0.2085 − 0.3501j) |
| 37 | (−1.4694 + 0.2835j) | (−0.4147 − 0.5984j) |
| 38 | (0.3344 + 0.1928j) | (−0.8177 − 1.1683j) |
| 39 | (1.4572 + 0.3276j) | (−0.5933 − 0.8561j) |
| 40 | (−0.3444 − 0.2082j) | (0.171 − 0.0231j) |

-continued

| Mapping | CodeRate, r = 1/3 | CodeRate, r = 11/15 |
|---|---|---|
| 41 | (−1.251 − 0.8582j) | (0.6615 − 0.4969j) |
| 42 | (0.3506 − 0.192j) | (1.2448 − 0.8446j) |
| 43 | (1.2861 − 0.7998j) | (0.9254 − 0.6516j) |
| 44 | (−0.3322 − 0.1903j) | (0.0127 − 0.1724j) |
| 45 | (−1.4674 − 0.3372j) | (0.4644 − 0.6824j) |
| 46 | (0.3391 − 0.1761j) | (0.7842 − 1.2815j) |
| 47 | (1.4689 − 0.2864j) | (0.606 − 0.9536j) |
| 48 | (−0.5618 + 0.2961j) | (0.2077 + 0.3502j) |
| 49 | (−0.9392 + 0.546j) | (0.4094 + 0.5995j) |
| 50 | (0.548 + 0.3187j) | (0.8246 + 1.1648j) |
| 51 | (0.9214 + 0.5806j) | (0.5941 + 0.8515j) |
| 52 | (−0.5842 + 0.23j) | (−0.3639 − 0.1896j) |
| 53 | (−1.0695 + 0.2436j) | (−0.6211 − 0.3821j) |
| 54 | (0.5732 + 0.2577j) | (−1.2031 − 0.7729j) |
| 55 | (1.0582 + 0.287j) | (−0.8821 − 0.5525j) |
| 56 | (−0.555 − 0.3223j) | (−0.014 + 0.1707j) |
| 57 | (−0.9227 − 0.5751j) | (−0.4624 + 0.6764j) |
| 58 | (0.5616 − 0.2961j) | (−0.7756 − 1.2841j) |
| 59 | (0.9424 − 0.54j) | (−0.5986 + 0.9545j) |
| 60 | (−0.5733 − 0.2549j) | (−0.172 + 0.0203j) |
| 61 | (−1.0611 − 0.28j) | (−0.6556 + 0.4954j) |
| 62 | (0.5797 − 0.2343j) | (−1.2347 + 0.8481j) |
| 63 | (1.0608 − 0.2502j) | (−0.9178 + 0.6516j). |

4. The method of claim 2, wherein the mapping, for the code rate r equal to one of ⅔ or ⅘, is according to:

| Mapping | CodeRate, r = 2/3 | CodeRate, r = 4/5 |
|---|---|---|
| 0 | (−1.0309 − 1.2883j) | (−0.833 − 0.6718j) |
| 1 | (−0.8502 − 1.0541j) | (−0.466 − 1.4825j) |
| 2 | (−1.0467 + 1.2821j) | (−1.0369 − 0.6834j) |
| 3 | (−0.8606 + 1.0438j) | (−0.1292 − 1.5554j) |
| 4 | (−0.1474 − 1.6275j) | (0.8439 − 0.6544j) |
| 5 | (−0.1214 − 1.3269j) | (0.4833 − 1.4678j) |
| 6 | (−0.1645 + 1.6214j) | (1.0517 − 0.6729j) |
| 7 | (−0.1376 + 1.325j) | (0.156 − 1.5533j) |
| 8 | (−0.1555 − 0.262j) | (−0.8424 + 0.6547j) |
| 9 | (−0.2661 − 0.3671j) | (−0.4881 + 1.4648j) |
| 10 | (−0.155 + 0.2545j) | (−1.0446 + 0.6609j) |
| 11 | (−0.2732 + 0.3618j) | (−0.1531 + 1.5416j) |
| 12 | (−0.0753 − 0.275j) | (0.8318 + 0.6704j) |
| 13 | (−0.091 − 0.4666j) | (0.4579 + 1.484j) |
| 14 | (−0.078 + 0.2773j) | (1.0374 + 0.6824j) |
| 15 | (−0.0927 + 0.4624j) | (0.1222 + 1.5554j) |
| 16 | (−1.2646 − 1.06j) | (−0.8114 − 0.8501j) |
| 17 | (−1.0432 − 0.8725j) | (−0.7666 − 1.0495j) |
| 18 | (−1.2775 + 1.044j) | (−1.0158 − 0.8862j) |
| 19 | (−1.0548 + 0.8607j) | (−0.9539 − 1.1302j) |
| 20 | (−1.6439 − 0.1751j) | (0.8213 − 0.8365j) |
| 21 | (−1.3545 − 0.1443j) | (0.7791 − 1.0298j) |
| 22 | (−1.651 + 0.1517j) | (1.0312 − 0.8741j) |
| 23 | (−1.3531 + 0.1252j) | (0.9748 − 1.1142j) |
| 24 | (−0.1967 − 0.1087j) | (−0.8216 + 0.8328j) |
| 25 | (−0.3748 − 0.2021j) | (−0.7772 + 1.0261j) |
| 26 | (−0.1918 + 0.0992j) | (−1.0317 + 0.8669j) |
| 27 | (−0.3822 + 0.194j) | (−0.9709 + 1.1098j) |
| 28 | (−0.1197 − 0.0802j) | (0.8112 + 0.8548j) |
| 29 | (−0.4481 − 0.0819j) | (0.7651 + 1.0524j) |
| 30 | (−0.12 + 0.0763j) | (1.0165 + 0.8875j) |
| 31 | (−0.4437 + 0.0772j) | (0.9567 + 1.1338j) |
| 32 | (−0.7569 − 1.458j) | (−0.6551 − 0.6444j) |
| 33 | (−0.627 − 1.1912j) | (−0.5403 − 1.2205j) |
| 34 | (−0.7746 + 1.4527j) | (−1.2652 − 0.6149j) |
| 35 | (−0.6386 + 1.1796j) | (−0.7555 − 1.3569j) |
| 36 | (−0.4559 − 1.5578j) | (0.6635 − 0.6314j) |
| 37 | (−0.3829 − 1.283j) | (0.5625 − 1.2117j) |
| 38 | (−0.4772 + 1.5703j) | (1.2766 − 0.5888j) |
| 39 | (−0.3963 + 1.277j) | (0.7747 − 1.3429j) |
| 40 | (−0.1525 − 0.2635j) | (−0.6639 + 0.6303j) |
| 41 | (−0.2593 − 0.3793j) | (−0.5648 + 1.2103j) |
| 42 | (−0.1547 + 0.2555j) | (−1.2769 + 0.5883j) |
| 43 | (−0.2609 + 0.3724j) | (−0.7756 + 1.3405j) |
| 44 | (−0.0769 − 0.2775j) | (0.6564 + 0.6447j) |
| 45 | (−0.1068 − 0.4558j) | (0.5407 + 1.215j) |

-continued

| Mapping | CodeRate, r = 2/3 | CodeRate, r = 4/5 |
|---|---|---|
| 46 | (−0.0812 + 0.2744j) | (1.2701 + 0.6103j) |
| 47 | (−0.1137 + 0.4524j) | (0.747 + 1.3553j) |
| 48 | (−1.4505 − 0.7934j) | (−0.6293 − 0.8119j) |
| 49 | (−1.1915 − 0.6534j) | (−0.5831 − 1.0052j) |
| 50 | (−1.4599 + 0.7759j) | (−1.2756 − 0.8434j) |
| 51 | (−1.1996 + 0.6368j) | (−1.2068 − 1.11j) |
| 52 | (−1.5785 − 0.4933j) | (0.6368 − 0.7976j) |
| 53 | (−1.2964 − 0.4059j) | (0.5969 − 0.9978j) |
| 54 | (−1.5821 + 0.4758j) | (1.2987 − 0.8262j) |
| 55 | (−1.2979 + 0.3889j) | (1.2221 − 1.0854j) |
| 56 | (−0.1926 − 0.1051j) | (−0.6437 + 0.804j) |
| 57 | (−0.3861 − 0.1959j) | (−0.6002 + 0.9983j) |
| 58 | (−0.2046 + 0.1038j) | (−1.2932 + 0.8204j) |
| 59 | (−0.394 + 0.2j) | (−1.2228 + 1.0901j) |
| 60 | (−0.1165 − 0.0829j) | (0.6281 + 0.8169j) |
| 61 | (−0.4419 − 0.0868j) | (0.5847 + 1.0103j) |
| 62 | (−0.1181 + 0.0789j) | (1.2836 + 0.8439j) |
| 63 | (−0.4446 + 0.0838j) | (1.205 + 1.104j) |
| 64 | (1.044 − 1.2792j) | (−0.834 − 0.5001j) |
| 65 | (0.8595 − 1.0416j) | (−0.8212 − 0.0749j) |
| 66 | (1.0288 + 1.2916j) | (−1.0203 − 0.5063j) |
| 67 | (0.8507 + 1.0572j) | (−0.997 − 0.0718j) |
| 68 | (0.168 − 1.6223j) | (0.8488 − 0.4913j) |
| 69 | (0.1391 − 1.3292j) | (0.8268 − 0.0627j) |
| 70 | (0.1467 + 1.6274j) | (1.0382 − 0.4922j) |
| 71 | (0.1258 + 1.3281j) | (1.0046 − 0.0538j) |
| 72 | (0.1596 − 0.2514j) | (−0.8417 + 0.4859j) |
| 73 | (0.2775 − 0.3696j) | (−0.8241 + 0.0628j) |
| 74 | (0.1528 + 0.2603j) | (−1.0297 + 0.4872j) |
| 75 | (0.2684 + 0.3683j) | (−0.9937 + 0.0545j) |
| 76 | (0.0786 − 0.2741j) | (0.8344 + 0.5052j) |
| 77 | (0.0952 − 0.4566j) | (0.8255 + 0.0768j) |
| 78 | (0.0802 + 0.2772j) | (1.023 + 0.5086j) |
| 79 | (0.0933 + 0.4616j) | (0.996 + 0.0707j) |
| 80 | (1.2775 − 1.0482j) | (−0.8367 − 0.3491j) |
| 81 | (1.0545 − 0.8602j) | (−0.8306 − 0.2127j) |
| 82 | (1.2616 + 1.0617j) | (−1.0358 − 0.3495j) |
| 83 | (1.0381 + 0.8704j) | (−1.0319 − 0.1928j) |
| 84 | (1.6461 − 0.1553j) | (0.8423 − 0.3354j) |
| 85 | (1.3551 − 0.1273j) | (0.8375 − 0.2003j) |
| 86 | (1.6492 + 0.174j) | (1.0431 − 0.3346j) |
| 87 | (1.3493 + 0.1466j) | (1.0385 − 0.1789j) |
| 88 | (0.1982 − 0.1043j) | (−0.8433 + 0.3323j) |
| 89 | (0.3859 − 0.1988j) | (−0.8386 + 0.1982j) |
| 90 | (0.1948 + 0.1048j) | (−1.0436 + 0.3294j) |
| 91 | (0.3772 + 0.2009j) | (−1.0397 + 0.1798j) |
| 92 | (0.1226 − 0.08j) | (0.8388 + 0.3504j) |
| 93 | (0.4501 − 0.0802j) | (0.8329 + 0.2123j) |
| 94 | (0.1137 + 0.076j) | (1.0448 + 0.3499j) |
| 95 | (0.4515 + 0.0848j) | (1.0381 + 0.1965j) |
| 96 | (0.7693 − 1.4481j) | (−0.6673 − 0.4924j) |
| 97 | (0.6373 − 1.1841j) | (−0.6625 − 0.072j) |
| 98 | (0.7545 + 1.4609j) | (−1.4663 − 0.4376j) |
| 99 | (0.6254 + 1.1911j) | (−1.4811 − 0.1441j) |
| 100 | (0.4742 − 1.5629j) | (0.6726 − 0.4751j) |
| 101 | (0.3951 − 1.2742j) | (0.6643 − 0.0629j) |
| 102 | (0.4549 + 1.5735j) | (1.4775 − 0.4139j) |
| 103 | (0.3825 + 1.2824j) | (1.4891 − 0.127j) |
| 104 | (0.1616 − 0.2614j) | (−0.6704 + 0.4743j) |
| 105 | (0.2623 − 0.3739j) | (−0.6565 + 0.065j) |
| 106 | (0.1531 + 0.2616j) | (−1.4695 + 0.4071j) |
| 107 | (0.2555 + 0.3781j) | (−1.4837 + 0.1219j) |
| 108 | (0.0813 − 0.2736j) | (0.6645 + 0.4893j) |
| 109 | (0.1158 − 0.4563j) | (0.6641 + 0.0743j) |
| 110 | (0.0803 + 0.2742j) | (1.4647 + 0.4351j) |
| 111 | (0.1097 + 0.4545j) | (1.4832 + 0.1473j) |
| 112 | (1.464 − 0.778j) | (−0.6648 − 0.3425j) |
| 113 | (1.2006 − 0.6389j) | (−0.6658 − 0.2057j) |
| 114 | (1.4524 + 0.7969j) | (−1.2418 − 0.3367j) |
| 115 | (1.189 + 0.6528j) | (−1.2427 − 0.1189j) |
| 116 | (1.5838 − 0.4742j) | (0.6711 − 0.3333j) |
| 117 | (1.3004 − 0.3897j) | (0.6683 − 0.1985j) |
| 118 | (1.581 + 0.4938j) | (1.2527 − 0.3187j) |
| 119 | (1.2996 + 0.408j) | (1.2424 − 0.0953j) |
| 120 | (0.1985 − 0.1041j) | (−0.6691 + 0.331j) |
| 121 | (0.3847 − 0.1915j) | (−0.6655 + 0.1958j) |
| 122 | (0.1946 + 0.1041j) | (−1.2532 + 0.3148j) |

| Mapping | CodeRate, r = 2/3 | CodeRate, r = 4/5 |
|---|---|---|
| 123 | (0.3839 + 0.1962j) | (−1.2427 + 0.0971j) |
| 124 | (0.1191 − 0.0776j) | (0.6663 + 0.3461j) |
| 125 | (0.4508 − 0.0861j) | (0.6642 + 0.2081j) |
| 126 | (0.1167 + 0.0799j) | (1.2465 + 0.3391j) |
| 127 | (0.4443 + 0.0901j) | (1.2407 + 0.1196j) |
| 128 | (−0.6035 − 0.7372j) | (−0.3426 − 0.5924j) |
| 129 | (−0.7155 − 0.8765j) | (−0.2948 − 1.317j) |
| 130 | (−0.6096 + 0.728j) | (−0.1952 − 0.5751j) |
| 131 | (−0.722 + 0.8656j) | (−0.095 − 1.3018j) |
| 132 | (−0.0972 − 0.9395j) | (0.3513 − 0.5857j) |
| 133 | (−0.1068 − 1.1062j) | (0.3113 − 1.3081j) |
| 134 | (−0.1056 + 0.9375j) | (0.2063 − 0.5717j) |
| 135 | (−0.117 + 1.1098j) | (0.1108 − 1.3018j) |
| 136 | (−0.4901 − 0.6017j) | (−0.352 + 0.5866j) |
| 137 | (−0.3868 − 0.4884j) | (−0.3127 + 1.3081j) |
| 138 | (−0.4948 + 0.5952j) | (−0.2069 + 0.5749j) |
| 139 | (−0.389 + 0.4809j) | (−0.1122 + 1.2975j) |
| 140 | (−0.092 − 0.7733j) | (0.3472 + 0.5924j) |
| 141 | (−0.0898 − 0.6254j) | (0.2899 + 1.3204j) |
| 142 | (−0.1033 + 0.7706j) | (0.196 + 0.5779j) |
| 143 | (−0.099 + 0.6252j) | (0.0884 + 1.3025j) |
| 144 | (−0.7442 − 0.6004j) | (−0.3296 − 0.7415j) |
| 145 | (−0.8755 − 0.7254j) | (−0.2982 − 0.8937j) |
| 146 | (−0.7527 − 0.5925j) | (−0.1843 − 0.722j) |
| 147 | (−0.8812 − 0.7162j) | (−0.1784 − 0.8835j) |
| 148 | (−0.9662 − 0.1059j) | (0.3428 − 0.7309j) |
| 149 | (−1.1316 − 0.1181j) | (0.3163 − 0.8929j) |
| 150 | (−0.9633 + 0.0941j) | (0.1964 − 0.7202j) |
| 151 | (−1.1364 + 0.1062j) | (0.1902 − 0.8809j) |
| 152 | (−0.6278 − 0.4704j) | (−0.3444 − 0.7346j) |
| 153 | (−0.5174 − 0.3498j) | (−0.3167 − 0.8895j) |
| 154 | (−0.6352 + 0.4622j) | (−0.1963 − 0.7189j) |
| 155 | (−0.5174 + 0.3423j) | (−0.1927 − 0.8775j) |
| 156 | (−0.7918 − 0.1017j) | (0.328 + 0.7406j) |
| 157 | (−0.6303 − 0.101j) | (0.2989 + 0.8936j) |
| 158 | (−0.7784 + 0.0789j) | (0.1823 + 0.7228j) |
| 159 | (−0.6302 + 0.0919j) | (0.1725 + 0.8831j) |
| 160 | (−0.4587 − 0.8301j) | (−0.4947 − 0.6114j) |
| 161 | (−0.5311 − 0.9906j) | (−0.3248 − 1.1294j) |
| 162 | (−0.4685 + 0.821j) | (−0.061 − 0.566j) |
| 163 | (−0.5439 + 0.9794j) | (−0.0995 − 1.1051j) |
| 164 | (−0.2781 − 0.9041j) | (0.5007 − 0.6053j) |
| 165 | (−0.3272 − 1.0694j) | (0.3383 − 1.1214j) |
| 166 | (−0.287 + 0.9011j) | (0.0701 − 0.5642j) |
| 167 | (−0.3357 + 1.0624j) | (0.1164 − 1.0996j) |
| 168 | (−0.3952 − 0.6655j) | (−0.5035 + 0.6025j) |
| 169 | (−0.3406 − 0.5227j) | (−0.3414 + 1.1211j) |
| 170 | (−0.4004 + 0.6579j) | (−0.073 + 0.5639j) |
| 171 | (−0.344 + 0.5158j) | (−0.1216 + 1.1005j) |
| 172 | (−0.2179 − 0.7465j) | (0.4932 + 0.612j) |
| 173 | (−0.1619 − 0.613j) | (0.3197 + 1.1293j) |
| 174 | (−0.2257 + 0.7407j) | (0.0628 + 0.5591j) |
| 175 | (−0.1663 + 0.6071j) | (0.0984 + 1.0998j) |
| 176 | (−0.8432 − 0.4615j) | (−0.4759 − 0.7767j) |
| 177 | (−0.9992 − 0.5457j) | (−0.4226 − 0.961j) |
| 178 | (−0.8513 + 0.4563j) | (−0.0545 − 0.7211j) |
| 179 | (−1.0027 + 0.5337j) | (−0.0625 − 0.9204j) |
| 180 | (−0.9271 − 0.2802j) | (0.487 − 0.7678j) |
| 181 | (−1.0898 − 0.3382j) | (0.4409 − 0.9567j) |
| 182 | (−0.9279 + 0.2705j) | (0.0662 − 0.7211j) |
| 183 | (−1.0956 + 0.3271j) | (0.0766 − 0.9222j) |
| 184 | (−0.6893 − 0.3855j) | (−0.49 − 0.7663j) |
| 185 | (−0.5386 − 0.3113j) | (−0.439 + 0.9536j) |
| 186 | (−0.6925 + 0.3774j) | (−0.0673 + 0.7196j) |
| 187 | (−0.5459 + 0.303j) | (−0.0782 + 0.9219j) |
| 188 | (−0.7697 − 0.2125j) | (0.4742 + 0.774j) |
| 189 | (−0.6195 − 0.1445j) | (0.4222 + 0.959j) |
| 190 | (−0.7733 + 0.2059j) | (0.0566 + 0.7256j) |
| 191 | (−0.6181 + 0.139j) | (0.0591 + 0.9217j) |
| 192 | (0.6147 − 0.7308j) | (−0.3488 − 0.4502j) |
| 193 | (0.7226 − 0.8647j) | (−0.3681 − 0.0663j) |
| 194 | (0.6019 + 0.737j) | (−0.2044 − 0.4357j) |
| 195 | (0.7121 + 0.8745j) | (−0.2162 − 0.0601j) |
| 196 | (0.1067 − 0.9378j) | (0.3578 − 0.4463j) |
| 197 | (0.1198 − 1.1044j) | (0.3589 − 0.0613j) |
| 198 | (0.0973 + 0.9358j) | (0.2127 − 0.4358j) |
| 199 | (0.1074 + 1.1064j) | (0.219 − 0.0588j) |
| 200 | (0.4999 − 0.5998j) | (−0.3584 + 0.4476j) |
| 201 | (0.3925 − 0.4818j) | (−0.3635 + 0.0628j) |
| 202 | (0.4906 + 0.6037j) | (−0.2118 + 0.4348j) |
| 203 | (0.3846 + 0.484j) | (−0.2172 + 0.0603j) |
| 204 | (0.1019 − 0.7708j) | (0.3513 + 0.4528j) |
| 205 | (0.0992 − 0.6236j) | (0.3634 + 0.0671j) |
| 206 | (0.0958 + 0.7708j) | (0.202 + 0.4379j) |
| 207 | (0.0927 + 0.6249j) | (0.2195 + 0.0627j) |
| 208 | (0.7555 − 0.5917j) | (−0.3572 − 0.3189j) |
| 209 | (0.8805 − 0.715j) | (−0.3645 − 0.1912j) |
| 210 | (0.7434 + 0.6016j) | (−0.2071 − 0.3094j) |
| 211 | (0.8701 + 0.7261j) | (−0.2152 − 0.1813j) |
| 212 | (0.9663 − 0.0933j) | (0.3612 − 0.3139j) |
| 213 | (1.1382 − 0.1046j) | (0.3637 − 0.1844j) |
| 214 | (0.9617 + 0.1077j) | (0.2159 − 0.3054j) |
| 215 | (1.1339 + 0.1207j) | (0.2181 − 0.1782j) |
| 216 | (0.6318 − 0.4615j) | (−0.3602 + 0.3131j) |
| 217 | (0.525 − 0.3414j) | (−0.361 + 0.1865j) |
| 218 | (0.6265 + 0.4726j) | (−0.2146 + 0.3078j) |
| 219 | (0.5164 + 0.3477j) | (−0.2214 + 0.187j) |
| 220 | (0.795 − 0.0914j) | (0.3586 + 0.3214j) |
| 221 | (0.6293 − 0.0901j) | (0.3616 + 0.1939j) |
| 222 | (0.7951 + 0.0982j) | (0.2086 + 0.3082j) |
| 223 | (0.6326 + 0.1012j) | (0.2147 + 0.1801j) |
| 224 | (0.4667 − 0.8203j) | (−0.4985 − 0.4678j) |
| 225 | (0.5406 − 0.9826j) | (−0.5089 − 0.0659j) |
| 226 | (0.4585 + 0.827j) | (−0.0658 − 0.4274j) |
| 227 | (0.5299 + 0.9888j) | (−0.0741 − 0.0613j) |
| 228 | (0.2871 − 0.902j) | (0.5103 − 0.4618j) |
| 229 | (0.3345 − 1.0594j) | (0.5132 − 0.0606j) |
| 230 | (0.2773 + 0.8994j) | (0.0681 − 0.4285j) |
| 231 | (0.3241 + 1.0686j) | (0.0758 − 0.0607j) |
| 232 | (0.4021 − 0.6614j) | (−0.5094 + 0.4606j) |
| 233 | (0.3489 − 0.5163j) | (−0.5092 + 0.0609j) |
| 234 | (0.3966 + 0.6663j) | (−0.073 + 0.4284j) |
| 235 | (0.3383 + 0.5148j) | (−0.068 + 0.0594j) |
| 236 | (0.2267 − 0.7435j) | (0.5029 + 0.4687j) |
| 237 | (0.1686 − 0.6051j) | (0.5118 + 0.0715j) |
| 238 | (0.217 + 0.7431j) | (0.0645 + 0.4234j) |
| 239 | (0.1593 + 0.6089j) | (0.075 + 0.0621j) |
| 240 | (0.8506 − 0.4537j) | (−0.5062 − 0.3344j) |
| 241 | (1.003 − 0.532j) | (−0.5069 − 0.2014j) |
| 242 | (0.8401 + 0.4644j) | (−0.0709 − 0.3015j) |
| 243 | (0.9958 + 0.5484j) | (−0.0716 − 0.1761j) |
| 244 | (0.9293 − 0.2696j) | (0.5109 − 0.3256j) |
| 245 | (1.0919 − 0.3262j) | (0.5134 − 0.1941j) |
| 246 | (0.9291 + 0.2847j) | (0.0739 − 0.3015j) |
| 247 | (1.0848 + 0.3413j) | (0.0733 − 0.1766j) |
| 248 | (0.6916 − 0.3755j) | (−0.5106 + 0.3233j) |
| 249 | (0.5505 − 0.305j) | (−0.5106 + 0.1935j) |
| 250 | (0.6919 + 0.3891j) | (−0.0733 + 0.2979j) |
| 251 | (0.5408 + 0.309j) | (−0.0729 + 0.1793j) |
| 252 | (0.7709 − 0.201j) | (0.5078 + 0.3338j) |
| 253 | (0.6217 − 0.139j) | (0.5098 + 0.2009j) |
| 254 | (0.7696 − 0.216j) | (0.0676 + 0.3007j) |
| 255 | (0.616 + 0.1473j) | (0.0729 + 0.1779j). |

5. The method of claim 2, wherein the mapping is, for one of a neural network subject to the QSL constraint (NN_QSL), a neural network subject to the QSC constraint (NN_QSC), or a neural network subject to the RSC constraint (NN_RSC), according to:

| Mapping | NN_QSL | NN_QSC | NN_RSC |
|---|---|---|---|
| 0 | (−0.4436 + 0.1629j) | (0.1882 + 0.0524j) | (−0.3051 − 0.3051j) |
| 1 | (−0.3972 + 0.9864j) | (0.1882 − 0.0524j) | (−0.3051 − 0.3045j) |
| 2 | (−0.4398 + 0.2783j) | (−0.1882 + 0.0524j) | (−0.3051 − 0.7193j) |
| 3 | (−0.4297 + 0.6732j) | (−0.1882 − 0.0524j) | (−0.3051 − 0.7851j) |
| 4 | (−0.0602 + 0.1666j) | (0.1889 + 0.0525j) | (−0.3051 + 0.3039j) |
| 5 | (−0.0498 + 0.8944j) | (0.1889 − 0.0525j) | (−0.3051 + 0.3027j) |
| 6 | (−0.0583 + 0.283j) | (−0.1889 + 0.0525j) | (−0.3051 + 0.7189j) |
| 7 | (−0.0629 + 0.6689j) | (−0.1889 − 0.0525j) | (−0.3051 + 0.7866j) |

-continued

| Mapping | NN_QSL | NN_QSC | NN_RSC |
|---|---|---|---|
| 8 | (−0.4539 + 0.1628j) | (0.1383 + 0.3806j) | (−0.3051 − 0.4316j) |
| 9 | (−0.4065 + 0.8715j) | (0.1383 − 0.3806j) | (−0.3051 − 0.4374j) |
| 10 | (−0.4512 + 0.2785j) | (−0.1383 + 0.3806j) | (−0.3051 − 0.5905j) |
| 11 | (−0.4253 + 0.7369j) | (−0.1383 − 0.3806j) | (−0.3051 − 0.5662j) |
| 12 | (−0.0591 + 0.1668j) | (0.1413 + 0.3788j) | (−0.3051 + 0.4309j) |
| 13 | (−0.0678 + 0.8242j) | (0.1413 − 0.3788j) | (−0.3051 + 0.4375j) |
| 14 | (−0.0612 + 0.2851j) | (−0.1413 + 0.3788j) | (−0.3051 + 0.5905j) |
| 15 | (−0.063 + 0.7017j) | (−0.1413 − 0.3788j) | (−0.3051 + 0.5676j) |
| 16 | (−0.4427 + 0.1627j) | (1.1863 + 0.2942j) | (−0.3051 − 0.1795j) |
| 17 | (−0.4016 + 0.994j) | (1.1863 − 0.2942j) | (−0.3051 − 0.1792j) |
| 18 | (−0.4387 + 0.2802j) | (−1.1863 + 0.2942j) | (−0.3051 − 1.0559j) |
| 19 | (−0.4308 + 0.6764j) | (−1.1863 − 0.2942j) | (−0.3051 − 0.919j) |
| 20 | (−0.0611 + 0.1684j) | (1.149 + 0.406j) | (−0.3051 + 0.1794j) |
| 21 | (−0.0514 + 0.8961j) | (1.149 − 0.406j) | (−0.3051 + 0.1796j) |
| 22 | (−0.0619 + 0.284j) | (−1.149 + 0.406j) | (−0.3051 + 1.0561j) |
| 23 | (−0.0595 + 0.668j) | (−1.149 − 0.406j) | (−0.3051 + 0.9201j) |
| 24 | (−0.4556 + 0.162j) | (0.2812 + 1.0761j) | (−0.3051 − 0.0609j) |
| 25 | (−0.4051 + 0.8665j) | (0.2812 − 1.0761j) | (−0.3051 − 0.0607j) |
| 26 | (−0.4501 + 0.2784j) | (−0.2812 + 1.0761j) | (−0.3051 − 1.2271j) |
| 27 | (−0.4242 + 0.7339j) | (−0.2812 − 1.0761j) | (−0.3051 − 1.4453j) |
| 28 | (−0.0613 + 0.1682j) | (0.3918 + 1.0585j) | (−0.3051 + 0.0601j) |
| 29 | (−0.0681 + 0.8258j) | (0.3918 − 1.0585j) | (−0.3051 + 0.0601j) |
| 30 | (−0.0614 + 0.2838j) | (−0.3918 + 1.0585j) | (−0.3051 + 1.228j) |
| 31 | (−0.0642 + 0.7042j) | (−0.3918 − 1.0585j) | (−0.3051 + 1.4486j) |
| 32 | (−0.4433 + 0.0562j) | (0.0634 + 0.052j) | (−0.3045 − 0.3051j) |
| 33 | (−0.3879 + 1.1503j) | (0.0634 − 0.052j) | (−0.3045 − 0.3045j) |
| 34 | (−0.4381 + 0.3983j) | (−0.0634 + 0.052j) | (−0.3045 − 0.7193j) |
| 35 | (−0.4351 + 0.544j) | (−0.0634 − 0.052j) | (−0.3045 − 0.7851j) |
| 36 | (−0.0617 + 0.0568j) | (0.0626 + 0.052j) | (−0.3045 + 0.3039j) |
| 37 | (−0.0842 + 1.6424j) | (0.0626 − 0.052j) | (−0.3045 + 0.3027j) |
| 38 | (−0.0612 + 0.4045j) | (−0.0626 + 0.052j) | (−0.3045 + 0.7189j) |
| 39 | (−0.063 + 0.5411j) | (−0.0626 − 0.052j) | (−0.3045 + 0.7866j) |
| 40 | (−0.4568 + 0.0559j) | (0.0483 + 0.3828j) | (−0.3045 − 0.4316j) |
| 41 | (−0.3739 + 1.2957j) | (0.0483 − 0.3828j) | (−0.3045 − 0.4374j) |
| 42 | (−0.4457 + 0.3965j) | (−0.0483 + 0.3828j) | (−0.3045 − 0.5905j) |
| 43 | (−0.438 + 0.5248j) | (−0.0483 − 0.3828j) | (−0.3045 − 0.5662j) |
| 44 | (−0.0621 + 0.0574j) | (0.0465 + 0.383j) | (−0.3045 + 0.4309j) |
| 45 | (−0.0719 + 1.4634j) | (0.0465 − 0.383j) | (−0.3045 + 0.4375j) |
| 46 | (−0.0624 + 0.4067j) | (−0.0465 + 0.383j) | (−0.3045 + 0.5905j) |
| 47 | (−0.0623 + 0.5313j) | (−0.0465 − 0.383j) | (−0.3045 + 0.5676j) |
| 48 | (−0.4439 + 0.0559j) | (1.2119 + 0.1779j) | (−0.3045 − 0.1795j) |
| 49 | (−0.388 + 1.1192j) | (1.2119 − 0.1779j) | (−0.3045 − 0.1792j) |
| 50 | (−0.4354 + 0.3947j) | (−1.2119 + 0.1779j) | (−0.3045 − 1.0559j) |
| 51 | (−0.4355 + 0.5456j) | (−1.2119 − 0.1779j) | (−0.3045 − 0.919j) |
| 52 | (−0.0614 + 0.058j) | (1.2248 + 0.0595j) | (−0.3045 + 0.1794j) |
| 53 | (−0.266 + 1.6246j) | (1.2248 − 0.0595j) | (−0.3045 + 0.1796j) |
| 54 | (−0.0612 + 0.4046j) | (−1.2248 + 0.0595j) | (−0.3045 + 1.0561j) |
| 55 | (−0.0626 + 0.5408j) | (−1.2248 − 0.0595j) | (−0.3045 + 0.9201j) |
| 56 | (−0.4569 + 0.055j) | (0.1696 + 1.0853j) | (−0.3045 − 0.0609j) |
| 57 | (−0.3281 + 1.4063j) | (0.1696 − 1.0853j) | (−0.3045 − 0.0607j) |
| 58 | (−0.4444 + 0.3973j) | (−0.1696 + 1.0853j) | (−0.3045 − 1.2271j) |
| 59 | (−0.4386 + 0.5241j) | (−0.1696 − 1.0853j) | (−0.3045 − 1.4453j) |
| 60 | (−0.0617 + 0.0572j) | (0.057 + 1.0886j) | (−0.3045 + 0.0601j) |
| 61 | (−0.2102 + 1.4711j) | (0.057 − 1.0886j) | (−0.3045 + 0.0601j) |
| 62 | (−0.059 + 0.4039j) | (−0.057 + 1.0886j) | (−0.3045 + 1.228j) |
| 63 | (−0.0618 + 0.5322j) | (−0.057 − 1.0886j) | (−0.3045 + 1.4486j) |
| 64 | (−0.3132 + 0.1607j) | (0.3061 + 0.0563j) | (−0.7193 − 0.3051j) |
| 65 | (−0.2576 + 0.9857j) | (0.3061 − 0.0563j) | (−0.7193 − 0.3045j) |
| 66 | (−0.3106 + 0.2787j) | (−0.3061 + 0.0563j) | (−0.7193 − 0.7193j) |
| 67 | (−0.3064 + 0.6693j) | (−0.3061 − 0.0563j) | (−0.7193 − 0.7851j) |
| 68 | (−0.1824 + 0.166j) | (0.306 + 0.0563j) | (−0.7193 + 0.3039j) |
| 69 | (−0.1233 + 0.9671j) | (0.306 − 0.0563j) | (−0.7193 + 0.3027j) |
| 70 | (−0.1819 + 0.2796j) | (−0.306 + 0.0563j) | (−0.7193 + 0.7189j) |
| 71 | (−0.1851 + 0.6654j) | (−0.306 − 0.0563j) | (−0.7193 + 0.7866j) |
| 72 | (−0.3111 + 0.1624j) | (0.1843 + 0.4706j) | (−0.7193 − 0.4316j) |
| 73 | (−0.2822 + 0.8615j) | (0.1843 − 0.4706j) | (−0.7193 − 0.4374j) |
| 74 | (−0.3093 + 0.2794j) | (−0.1843 + 0.4706j) | (−0.7193 − 0.5905j) |
| 75 | (−0.3039 + 0.7217j) | (−0.1843 − 0.4706j) | (−0.7193 − 0.5662j) |
| 76 | (−0.1806 + 0.1652j) | (0.2033 + 0.4579j) | (−0.7193 + 0.4309j) |
| 77 | (−0.1752 + 0.8407j) | (0.2033 − 0.4579j) | (−0.7193 + 0.4375j) |
| 78 | (−0.185 + 0.2805j) | (−0.2033 + 0.4579j) | (−0.7193 + 0.5905j) |
| 79 | (−0.1838 + 0.7066j) | (−0.2033 − 0.4579j) | (−0.7193 + 0.5676j) |
| 80 | (−0.3135 + 0.1615j) | (1.291 + 0.3246j) | (−0.7193 − 0.1795j) |
| 81 | (−0.258 + 0.9839j) | (1.291 − 0.3246j) | (−0.7193 − 0.1792j) |
| 82 | (−0.3122 + 0.2776j) | (−1.291 + 0.3246j) | (−0.7193 − 1.0559j) |
| 83 | (−0.3101 + 0.6718j) | (−1.291 − 0.3246j) | (−0.7193 − 0.919j) |
| 84 | (−0.1822 + 0.1652j) | (1.2498 + 0.4482j) | (−0.7193 + 0.1794j) |
| 85 | (−0.1249 + 0.9632j) | (1.2498 − 0.4482j) | (−0.7193 + 0.1796j) |
| 86 | (−0.1832 + 0.2813j) | (−1.2498 + 0.4482j) | (−0.7193 + 1.0561j) |
| 87 | (−0.1845 + 0.6644j) | (−1.2498 − 0.4482j) | (−0.7193 + 0.9201j) |
| 88 | (−0.3089 + 0.1662j) | (0.2952 + 1.1878j) | (−0.7193 − 0.0609j) |
| 89 | (−0.2832 + 0.8595j) | (0.2952 − 1.1878j) | (−0.7193 − 0.0607j) |
| 90 | (−0.3096 + 0.2789j) | (−0.2952 + 1.1878j) | (−0.7193 − 1.2271j) |
| 91 | (−0.3021 + 0.7201j) | (−0.2952 − 1.1878j) | (−0.7193 − 1.4453j) |
| 92 | (−0.1826 + 0.164j) | (0.4147 + 1.1678j) | (−0.7193 + 0.0601j) |
| 93 | (−0.1764 + 0.8416j) | (0.4147 − 1.1678j) | (−0.7193 + 0.0601j) |
| 94 | (−0.1823 + 0.2813j) | (−0.4147 + 1.1678j) | (−0.7193 + 1.228j) |
| 95 | (−0.1847 + 0.7051j) | (−0.4147 − 1.1678j) | (−0.7193 + 1.4486j) |
| 96 | (−0.3148 + 0.0557j) | (0.4542 + 0.0691j) | (−0.7851 − 0.3051j) |
| 97 | (−0.2397 + 1.1183j) | (0.4542 − 0.0691j) | (−0.7851 − 0.3045j) |
| 98 | (−0.312 + 0.3976j) | (−0.4542 + 0.0691j) | (−0.7851 − 0.7193j) |
| 99 | (−0.3119 + 0.5402j) | (−0.4542 − 0.0691j) | (−0.7851 − 0.7851j) |
| 100 | (−0.1822 + 0.0543j) | (0.4539 + 0.069j) | (−0.7851 + 0.3039j) |
| 101 | (−0.0747 + 1.098j) | (0.4539 − 0.069j) | (−0.7851 + 0.3027j) |
| 102 | (−0.1814 + 0.3982j) | (−0.4539 + 0.069j) | (−0.7851 + 0.7189j) |
| 103 | (−0.1849 + 0.5416j) | (−0.4539 − 0.069j) | (−0.7851 + 0.7866j) |
| 104 | (−0.3132 + 0.0555j) | (0.0723 + 0.5171j) | (−0.7851 − 0.4316j) |
| 105 | (−0.2252 + 1.2542j) | (0.0723 − 0.5171j) | (−0.7851 − 0.4374j) |
| 106 | (−0.3079 + 0.3991j) | (−0.0723 + 0.5171j) | (−0.7851 − 0.5905j) |
| 107 | (−0.3118 + 0.5237j) | (−0.0723 − 0.5171j) | (−0.7851 − 0.5662j) |
| 108 | (−0.1825 + 0.0554j) | (0.0491 + 0.5202j) | (−0.7851 + 0.4309j) |
| 109 | (−0.0704 + 1.2881j) | (0.0491 − 0.5202j) | (−0.7851 + 0.4375j) |
| 110 | (−0.1825 + 0.4018j) | (−0.0491 + 0.5202j) | (−0.7851 + 0.5905j) |
| 111 | (−0.1827 + 0.5292j) | (−0.0491 − 0.5202j) | (−0.7851 + 0.5676j) |
| 112 | (−0.315 + 0.0547j) | (1.3191 + 0.1962j) | (−0.7851 − 0.1795j) |
| 113 | (−0.2356 + 1.1172j) | (1.3191 − 0.1962j) | (−0.7851 − 0.1792j) |
| 114 | (−0.3117 + 0.3978j) | (−1.3191 + 0.1962j) | (−0.7851 − 1.0559j) |
| 115 | (−0.3121 + 0.5414j) | (−1.3191 − 0.1962j) | (−0.7851 − 0.919j) |
| 116 | (−0.1835 + 0.0561j) | (1.3334 + 0.0658j) | (−0.7851 + 0.1794j) |
| 117 | (−0.0758 + 1.1042j) | (1.3334 − 0.0658j) | (−0.7851 + 0.1796j) |
| 118 | (−0.1826 + 0.3999j) | (−1.3334 + 0.0658j) | (−0.7851 + 1.0561j) |
| 119 | (−0.1849 + 0.5419j) | (−1.3334 − 0.0658j) | (−0.7851 + 0.9201j) |
| 120 | (−0.3141 + 0.056j) | (0.1765 + 1.1997j) | (−0.7851 − 0.0609j) |
| 121 | (−0.2127 + 1.2612j) | (0.1765 − 1.1997j) | (−0.7851 − 0.0607j) |
| 122 | (−0.3091 + 0.3983j) | (−0.1765 + 1.1997j) | (−0.7851 − 1.2271j) |
| 123 | (−0.3108 + 0.524j) | (−0.1765 − 1.1997j) | (−0.7851 − 1.4453j) |
| 124 | (−0.183 + 0.0551j) | (0.0588 + 1.204j) | (−0.7851 + 0.0601j) |
| 125 | (−0.0822 + 1.2574j) | (0.0588 − 1.204j) | (−0.7851 + 0.0601j) |
| 126 | (−0.1837 + 0.4026j) | (−0.0588 + 1.204j) | (−0.7851 + 1.228j) |
| 127 | (−0.1833 + 0.5306j) | (−0.0588 − 1.204j) | (−0.7851 + 1.4486j) |
| 128 | (0.4457 + 0.1663j) | (0.1844 + 0.0517j) | (0.3039 − 0.3051j) |
| 129 | (0.4021 + 0.9839j) | (0.1844 − 0.0517j) | (0.3039 − 0.3045j) |
| 130 | (0.4379 + 0.2808j) | (−0.1844 + 0.0517j) | (0.3039 − 0.7193j) |
| 131 | (0.4325 + 0.6762j) | (−0.1844 − 0.0517j) | (0.3039 − 0.7851j) |
| 132 | (0.0631 + 0.1645j) | (0.185 + 0.0518j) | (0.3039 + 0.3039j) |
| 133 | (0.0535 + 0.8976j) | (0.185 − 0.0518j) | (0.3039 + 0.3027j) |
| 134 | (0.0623 + 0.2853j) | (−0.185 + 0.0518j) | (0.3039 + 0.7189j) |
| 135 | (0.063 + 0.6686j) | (−0.185 − 0.0518j) | (0.3039 + 0.7866j) |
| 136 | (0.4544 + 0.1646j) | (0.1366 + 0.3818j) | (0.3039 − 0.4316j) |
| 137 | (0.4085 + 0.8717j) | (0.1366 − 0.3818j) | (0.3039 − 0.4374j) |
| 138 | (0.4495 + 0.2802j) | (−0.1366 + 0.3818j) | (0.3039 − 0.5905j) |
| 139 | (0.4239 + 0.7355j) | (−0.1366 − 0.3818j) | (0.3039 − 0.5662j) |
| 140 | (0.0616 + 0.1678j) | (0.1396 + 0.3793j) | (0.3039 + 0.4309j) |
| 141 | (0.0717 + 0.8232j) | (0.1396 − 0.3793j) | (0.3039 + 0.4375j) |
| 142 | (0.0601 + 0.2845j) | (−0.1396 + 0.3793j) | (0.3039 + 0.5905j) |
| 143 | (0.0643 + 0.7007j) | (−0.1396 − 0.3793j) | (0.3039 + 0.5676j) |
| 144 | (0.4433 + 0.1641j) | (1.0929 + 0.2663j) | (0.3039 − 0.1795j) |
| 145 | (0.4014 + 0.9946j) | (1.0929 − 0.2663j) | (0.3039 − 0.1792j) |
| 146 | (0.4407 + 0.2809j) | (−1.0929 + 0.2663j) | (0.3039 − 1.0559j) |
| 147 | (0.4318 + 0.6767j) | (−1.0929 − 0.2663j) | (0.3039 − 0.919j) |
| 148 | (0.0596 + 0.1661j) | (1.0591 + 0.3672j) | (0.3039 + 0.1794j) |
| 149 | (0.0534 + 0.8952j) | (1.0591 − 0.3672j) | (0.3039 + 0.1796j) |
| 150 | (0.0624 + 0.2838j) | (−1.0591 + 0.3672j) | (0.3039 + 1.0561j) |
| 151 | (0.0623 + 0.6658j) | (−1.0591 − 0.3672j) | (0.3039 + 0.9201j) |
| 152 | (0.4542 + 0.1627j) | (0.2721 + 0.9816j) | (0.3039 − 0.0609j) |
| 153 | (0.4078 + 0.8696j) | (0.2721 − 0.9816j) | (0.3039 − 0.0607j) |
| 154 | (0.453 + 0.2821j) | (−0.2721 + 0.9816j) | (0.3039 − 1.2271j) |
| 155 | (0.4271 + 0.7389j) | (−0.2721 − 0.9816j) | (0.3039 − 1.4453j) |
| 156 | (0.0592 + 0.1678j) | (0.3739 + 0.9631j) | (0.3039 + 0.0601j) |
| 157 | (0.0682 + 0.8215j) | (0.3739 − 0.9631j) | (0.3039 + 0.0601j) |
| 158 | (0.0599 + 0.2834j) | (−0.3739 + 0.9631j) | (0.3039 + 1.228j) |
| 159 | (0.0644 + 0.7j) | (−0.3739 − 0.9631j) | (0.3039 + 1.4486j) |

| Mapping | NN_QSL | NN_QSC | NN_RSC |
|---|---|---|---|
| 160 | (0.4431 + 0.0571j) | (0.064 + 0.0515j) | (0.3027 − 0.3051j) |
| 161 | (0.3957 + 1.1527j) | (0.064 − 0.0515j) | (0.3027 − 0.3045j) |
| 162 | (0.4383 + 0.3959j) | (−0.064 + 0.0515j) | (0.3027 − 0.7193j) |
| 163 | (0.4369 + 0.5469j) | (−0.064 − 0.0515j) | (0.3027 − 0.7851j) |
| 164 | (0.0585 + 0.0556j) | (0.0631 + 0.0515j) | (0.3027 + 0.3039j) |
| 165 | (0.0883 + 1.6505j) | (0.0631 − 0.0515j) | (0.3027 + 0.3027j) |
| 166 | (0.0615 + 0.4042j) | (−0.0631 + 0.0515j) | (0.3027 − 0.7189j) |
| 167 | (0.0631 + 0.5409j) | (−0.0631 − 0.0515j) | (0.3027 + 0.7866j) |
| 168 | (0.4538 + 0.0562j) | (0.0485 + 0.3857j) | (0.3027 − 0.4316j) |
| 169 | (0.3742 + 1.2962j) | (0.0485 − 0.3857j) | (0.3027 − 0.4374j) |
| 170 | (0.4493 + 0.3995j) | (−0.0485 + 0.3857j) | (0.3027 − 0.5905j) |
| 171 | (0.441 + 0.5283j) | (−0.0485 − 0.3857j) | (0.3027 − 0.5662j) |
| 172 | (0.0605 + 0.0567j) | (0.0466 + 0.3859j) | (0.3027 + 0.4309j) |
| 173 | (0.0749 + 1.4616j) | (0.0466 − 0.3859j) | (0.3027 + 0.4375j) |
| 174 | (0.0639 + 0.4059j) | (−0.0466 + 0.3859j) | (0.3027 − 0.5905j) |
| 175 | (0.0621 + 0.5316j) | (−0.0466 − 0.3859j) | (0.3027 + 0.5676j) |
| 176 | (0.4428 + 0.0576j) | (1.117 + 0.1611j) | (0.3027 − 0.1795j) |
| 177 | (0.3942 + 1.1194j) | (1.117 − 0.1611j) | (0.3027 − 0.1792j) |
| 178 | (0.4395 + 0.396j) | (−1.117 + 0.1611j) | (0.3027 − 1.0559j) |
| 179 | (0.4386 + 0.5472j) | (−1.117 − 0.1611j) | (0.3027 − 0.919j) |
| 180 | (0.0632 + 0.0565j) | (1.1289 + 0.0541j) | (0.3027 + 0.1794j) |
| 181 | (0.2742 + 1.6248j) | (1.1289 − 0.0541j) | (0.3027 + 0.1796j) |
| 182 | (0.0605 + 0.4048j) | (−1.1289 + 0.0541j) | (0.3027 + 1.0561j) |
| 183 | (0.062 + 0.5419j) | (−1.1289 − 0.0541j) | (0.3027 + 0.9201j) |
| 184 | (0.4557 + 0.0557j) | (0.1662 + 0.9932j) | (0.3027 − 0.0609j) |
| 185 | (0.3307 + 1.4037j) | (0.1662 − 0.9932j) | (0.3027 − 0.0607j) |
| 186 | (0.4473 + 0.3995j) | (−0.1662 + 0.9932j) | (0.3027 − 1.2271j) |
| 187 | (0.4414 + 0.5267j) | (−0.1662 − 0.9932j) | (0.3027 − 1.4453j) |
| 188 | (0.0626 + 0.0554j) | (0.0565 + 0.9992j) | (0.3027 + 0.0601j) |
| 189 | (0.2129 + 1.4638j) | (0.0565 − 0.9992j) | (0.3027 + 0.0601j) |
| 190 | (0.0631 + 0.4059j) | (−0.0565 + 0.9992j) | (0.3027 + 1.228j) |
| 191 | (0.0617 + 0.5321j) | (−0.0565 − 0.9992j) | (0.3027 + 1.4486j) |
| 192 | (0.3132 + 0.1639j) | (0.3195 + 0.0553j) | (0.7189 − 0.3051j) |
| 193 | (0.2618 + 0.9824j) | (0.3195 − 0.0553j) | (0.7189 − 0.3045j) |
| 194 | (0.3131 + 0.281j) | (−0.3195 + 0.0553j) | (0.7189 − 0.7193j) |
| 195 | (0.3103 + 0.6676j) | (−0.3195 − 0.0553j) | (0.7189 − 0.7851j) |
| 196 | (0.1815 + 0.1665j) | (0.3192 + 0.0552j) | (0.7189 + 0.3039j) |
| 197 | (0.1257 + 0.965j) | (0.3192 − 0.0552j) | (0.7189 + 0.3027j) |
| 198 | (0.1836 + 0.2838j) | (−0.3192 + 0.0552j) | (0.7189 + 0.7189j) |
| 199 | (0.1883 + 0.6668j) | (−0.3192 − 0.0552j) | (0.7189 + 0.7866j) |
| 200 | (0.312 + 0.1625j) | (0.1726 + 0.4754j) | (0.7189 − 0.4316j) |
| 201 | (0.2852 + 0.8597j) | (0.1726 − 0.4754j) | (0.7189 − 0.4374j) |
| 202 | (0.3108 + 0.2809j) | (−0.1726 + 0.4754j) | (0.7189 − 0.5905j) |
| 203 | (0.3047 + 0.7226j) | (−0.1726 − 0.4754j) | (0.7189 − 0.5662j) |
| 204 | (0.1829 + 0.1648j) | (0.1882 + 0.4624j) | (0.7189 + 0.4309j) |
| 205 | (0.178 + 0.8411j) | (0.1882 − 0.4624j) | (0.7189 + 0.4375j) |
| 206 | (0.1828 + 0.2832j) | (−0.1882 + 0.4624j) | (0.7189 + 0.5905j) |
| 207 | (0.1865 + 0.7073j) | (−0.1882 − 0.4624j) | (0.7189 + 0.5676j) |
| 208 | (0.3135 + 0.1635j) | (1.4104 + 0.3594j) | (0.7189 − 0.1795j) |
| 209 | (0.2594 + 0.982j) | (1.4104 − 0.3594j) | (0.7189 − 0.1792j) |
| 210 | (0.3133 + 0.2798j) | (−1.4104 + 0.3594j) | (0.7189 − 1.0559j) |
| 211 | (0.3112 + 0.6688j) | (−1.4104 − 0.3594j) | (0.7189 − 0.919j) |
| 212 | (0.1821 + 0.1627j) | (1.3645 + 0.4968j) | (0.7189 + 0.1794j) |
| 213 | (0.1269 + 0.9655j) | (1.3645 − 0.4968j) | (0.7189 + 0.1796j) |
| 214 | (0.1846 + 0.2836j) | (−1.3645 + 0.4968j) | (0.7189 + 1.0561j) |
| 215 | (0.1886 + 0.6651j) | (−1.3645 − 0.4968j) | (0.7189 + 0.9201j) |
| 216 | (0.3109 + 0.1627j) | (0.3164 + 1.315j) | (0.7189 − 0.0609j) |
| 217 | (0.2846 + 0.8585j) | (0.3164 − 1.315j) | (0.7189 − 0.0607j) |
| 218 | (0.3092 + 0.2805j) | (−0.3164 + 1.315j) | (0.7189 − 1.2271j) |
| 219 | (0.3047 + 0.7224j) | (−0.3164 − 1.315j) | (0.7189 − 1.4453j) |
| 220 | (0.1841 + 0.1645j) | (0.4451 + 1.2916j) | (0.7189 + 0.0601j) |
| 221 | (0.1766 + 0.8398j) | (0.4451 − 1.2916j) | (0.7189 + 0.0601j) |
| 222 | (0.1861 + 0.2834j) | (−0.4451 + 1.2916j) | (0.7189 + 1.228j) |
| 223 | (0.1861 + 0.7085j) | (−0.4451 − 1.2916j) | (0.7189 + 1.4486j) |
| 224 | (0.3139 + 0.0565j) | (0.421 + 0.0652j) | (0.7866 − 0.3051j) |
| 225 | (0.244 + 1.1191j) | (0.421 − 0.0652j) | (0.7866 − 0.3045j) |
| 226 | (0.3103 + 0.3997j) | (−0.421 + 0.0652j) | (0.7866 − 0.7193j) |
| 227 | (0.3129 + 0.5431j) | (−0.421 − 0.0652j) | (0.7866 − 0.7851j) |
| 228 | (0.1826 + 0.055j) | (0.4209 + 0.065j) | (0.7866 + 0.3039j) |
| 229 | (0.08 + 1.0978j) | (0.4209 − 0.065j) | (0.7866 + 0.3027j) |
| 230 | (0.1845 + 0.3999j) | (−0.4209 + 0.065j) | (0.7866 + 0.7189j) |
| 231 | (0.1848 + 0.5411j) | (−0.4209 − 0.065j) | (0.7866 + 0.7866j) |
| 232 | (0.3114 + 0.0559j) | (0.0738 + 0.5142j) | (0.7866 − 0.4316j) |
| 233 | (0.2295 + 1.2458j) | (0.0738 − 0.5142j) | (0.7866 − 0.4374j) |
| 234 | (0.3098 + 0.4037j) | (−0.0738 + 0.5142j) | (0.7866 − 0.5905j) |
| 235 | (0.3121 + 0.5282j) | (−0.0738 − 0.5142j) | (0.7866 − 0.5662j) |
| 236 | (0.1809 + 0.0553j) | (0.0509 + 0.5166j) | (0.7866 + 0.4309j) |
| 237 | (0.0743 + 1.289j) | (0.0509 − 0.5166j) | (0.7866 + 0.4375j) |
| 238 | (0.1838 + 0.4025j) | (−0.0509 + 0.5166j) | (0.7866 + 0.5905j) |
| 239 | (0.1844 + 0.531j) | (−0.0509 − 0.5166j) | (0.7866 + 0.5676j) |
| 240 | (0.3124 + 0.0574j) | (1.4413 + 0.2175j) | (0.7866 − 0.1795j) |
| 241 | (0.2377 + 1.1143j) | (1.4413 − 0.2175j) | (0.7866 − 0.1792j) |
| 242 | (0.3127 + 0.3984j) | (−1.4413 + 0.2175j) | (0.7866 − 1.0559j) |
| 243 | (0.3142 + 0.5418j) | (−1.4413 − 0.2175j) | (0.7866 − 0.919j) |
| 244 | (0.1843 + 0.0564j) | (1.4575 + 0.0727j) | (0.7866 + 0.1794j) |
| 245 | (0.0788 + 1.1019j) | (1.4575 − 0.0727j) | (0.7866 + 0.1796j) |
| 246 | (0.1841 + 0.4031j) | (−1.4575 + 0.0727j) | (0.7866 + 1.0561j) |
| 247 | (0.1849 + 0.543j) | (−1.4575 − 0.0727j) | (0.7866 + 0.9201j) |
| 248 | (0.311 + 0.0559j) | (0.1885 + 1.329j) | (0.7866 − 0.0609j) |
| 249 | (0.2161 + 1.2595j) | (0.1885 − 1.329j) | (0.7866 − 0.0607j) |
| 250 | (0.3124 + 0.4009j) | (−0.1885 + 1.329j) | (0.7866 − 1.2271j) |
| 251 | (0.3127 + 0.5274j) | (−0.1885 − 1.329j) | (0.7866 − 1.4453j) |
| 252 | (0.1827 + 0.0558j) | (0.0624 + 1.3354j) | (0.7866 + 0.0601j) |
| 253 | (0.0798 + 1.2563j) | (0.0624 − 1.3354j) | (0.7866 + 0.0601j) |
| 254 | (0.1836 + 0.4039j) | (−0.0624 + 1.3354j) | (0.7866 + 1.228j) |
| 255 | (0.1833 + 0.5285j) | (−0.0624 − 1.3354j) | (0.7866 + 1.4486j) |
| 256 | (−0.4463 − 0.1639j) | (0.1855 + 0.1634j) | (−0.4316 − 0.3051j) |
| 257 | (−0.4012 − 0.9844j) | (0.1855 − 0.1634j) | (−0.4316 − 0.3045j) |
| 258 | (−0.4402 − 0.2796j) | (−0.1855 + 0.1634j) | (−0.4316 − 0.7193j) |
| 259 | (−0.431 − 0.6768j) | (−0.1855 − 0.1634j) | (−0.4316 − 0.7851j) |
| 260 | (−0.0611 − 0.1653j) | (0.1855 + 0.1632j) | (−0.4316 + 0.3039j) |
| 261 | (−0.054 − 0.8956j) | (0.1855 − 0.1632j) | (−0.4316 + 0.3027j) |
| 262 | (−0.0593 − 0.2844j) | (−0.1855 + 0.1632j) | (−0.4316 − 0.7189j) |
| 263 | (−0.0637 − 0.6671j) | (−0.1855 − 0.1632j) | (−0.4316 − 0.7866j) |
| 264 | (−0.4571 − 0.1634j) | (0.1677 + 0.2795j) | (−0.4316 − 0.4316j) |
| 265 | (−0.4078 − 0.8694j) | (0.1677 − 0.2795j) | (−0.4316 − 0.4374j) |
| 266 | (−0.4542 − 0.2825j) | (−0.1677 + 0.2795j) | (−0.4316 − 0.5905j) |
| 267 | (−0.4268 − 0.7398j) | (−0.1677 − 0.2795j) | (−0.4316 − 0.5662j) |
| 268 | (−0.0615 − 0.1665j) | (0.1679 + 0.2806j) | (−0.4316 + 0.4309j) |
| 269 | (−0.0668 − 0.8218j) | (0.1679 − 0.2806j) | (−0.4316 + 0.4375j) |
| 270 | (−0.0618 − 0.2836j) | (−0.1679 + 0.2806j) | (−0.4316 − 0.5905j) |
| 271 | (−0.0659 − 0.7013j) | (−0.1679 − 0.2806j) | (−0.4316 + 0.5676j) |
| 272 | (−0.4426 − 0.1658j) | (1.04 + 0.6132j) | (−0.4316 − 0.1795j) |
| 273 | (−0.4045 − 0.991j) | (1.04 − 0.6132j) | (−0.4316 − 0.1792j) |
| 274 | (−0.4439 − 0.2793j) | (−1.04 + 0.6132j) | (−0.4316 − 1.0559j) |
| 275 | (−0.4312 − 0.6763j) | (−1.04 − 0.6132j) | (−0.4316 − 0.919j) |
| 276 | (−0.0619 − 0.1669j) | (1.0999 + 0.513j) | (−0.4316 + 0.1794j) |
| 277 | (−0.0516 − 0.8964j) | (1.0999 − 0.513j) | (−0.4316 + 0.1796j) |
| 278 | (−0.0606 − 0.2841j) | (−1.0999 + 0.513j) | (−0.4316 + 1.0561j) |
| 279 | (−0.0621 − 0.6653j) | (−1.0999 − 0.513j) | (−0.4316 + 0.9201j) |
| 280 | (−0.4562 − 0.1637j) | (0.6058 + 0.989j) | (−0.4316 − 0.0609j) |
| 281 | (−0.4091 − 0.8668j) | (0.6058 − 0.989j) | (−0.4316 − 0.0607j) |
| 282 | (−0.4518 − 0.2793j) | (−0.6058 + 0.989j) | (−0.4316 − 1.2271j) |
| 283 | (−0.4263 − 0.7353j) | (−0.6058 − 0.989j) | (−0.4316 − 1.4453j) |
| 284 | (−0.0616 − 0.1664j) | (0.5002 + 1.0297j) | (−0.4316 + 0.0601j) |
| 285 | (−0.0694 − 0.8212j) | (0.5002 − 1.0297j) | (−0.4316 + 0.0601j) |
| 286 | (−0.0621 − 0.2859j) | (−0.5002 + 1.0297j) | (−0.4316 + 1.228j) |
| 287 | (−0.0638 − 0.6996j) | (−0.5002 − 1.0297j) | (−0.4316 + 1.4486j) |
| 288 | (−0.4441 − 0.0564j) | (0.0642 + 0.1537j) | (−0.4374 − 0.3051j) |
| 289 | (−0.3921 − 1.1538j) | (0.0642 − 0.1537j) | (−0.4374 − 0.3045j) |
| 290 | (−0.4389 − 0.3984j) | (−0.0642 + 0.1537j) | (−0.4374 − 0.7193j) |
| 291 | (−0.4375 − 0.5492j) | (−0.0642 − 0.1537j) | (−0.4374 − 0.7851j) |
| 292 | (−0.0601 − 0.0565j) | (0.0641 + 0.1536j) | (−0.4374 + 0.3039j) |
| 293 | (−0.085 − 1.6521j) | (0.0641 − 0.1536j) | (−0.4374 + 0.3027j) |
| 294 | (−0.0621 − 0.4039j) | (−0.0641 + 0.1536j) | (−0.4374 − 0.7189j) |
| 295 | (−0.0628 − 0.5387j) | (−0.0641 − 0.1536j) | (−0.4374 − 0.7866j) |
| 296 | (−0.4565 − 0.0576j) | (0.0555 + 0.2577j) | (−0.4374 − 0.4316j) |
| 297 | (−0.3747 − 1.294j) | (0.0555 − 0.2577j) | (−0.4374 − 0.4374j) |
| 298 | (−0.4464 − 0.4017j) | (−0.0555 + 0.2577j) | (−0.4374 − 0.5905j) |
| 299 | (−0.4436 − 0.5288j) | (−0.0555 − 0.2577j) | (−0.4374 − 0.5662j) |
| 300 | (−0.061 − 0.0561j) | (0.0554 + 0.2578j) | (−0.4374 + 0.4309j) |
| 301 | (−0.0721 − 1.4593j) | (0.0554 − 0.2578j) | (−0.4374 + 0.4375j) |
| 302 | (−0.0618 − 0.4061j) | (−0.0554 + 0.2578j) | (−0.4374 − 0.5905j) |
| 303 | (−0.0635 − 0.5302j) | (−0.0554 − 0.2578j) | (−0.4374 + 0.5676j) |
| 304 | (−0.4456 − 0.0571j) | (0.9702 + 0.7075j) | (−0.4374 − 0.1795j) |
| 305 | (−0.3904 − 1.1162j) | (0.9702 − 0.7075j) | (−0.4374 − 0.1792j) |
| 306 | (−0.4383 − 0.3992j) | (−0.9702 + 0.7075j) | (−0.4374 − 1.0559j) |
| 307 | (−0.4379 − 0.5468j) | (−0.9702 − 0.7075j) | (−0.4374 − 0.919j) |
| 308 | (−0.062 − 0.0559j) | (0.8908 + 0.7938j) | (−0.4374 + 0.1794j) |
| 309 | (−0.2695 − 1.6295j) | (0.8908 − 0.7938j) | (−0.4374 + 0.1796j) |
| 310 | (−0.062 − 0.4037j) | (−0.8908 + 0.7938j) | (−0.4374 + 1.0561j) |
| 311 | (−0.0627 − 0.5416j) | (−0.8908 − 0.7938j) | (−0.4374 + 0.9201j) |

-continued

| Map-ping | NN_QSL | NN_QSC | NN_RSC |
|---|---|---|---|
| 312 | (−0.4568 − 0.0577j) | (0.7072 + 0.9358j) | (−0.4374 − 0.0609j) |
| 313 | (−0.3298 − 1.3989j) | (0.7072 − 0.9358j) | (−0.4374 − 0.0607j) |
| 314 | (−0.4467 − 0.3999j) | (−0.7072 + 0.9358j) | (−0.4374 − 1.2271j) |
| 315 | (−0.4404 − 0.5285j) | (−0.7072 − 0.9358j) | (−0.4374 − 1.4453j) |
| 316 | (−0.0612 − 0.0559j) | (0.8023 + 0.8711j) | (−0.4374 + 0.0601j) |
| 317 | (−0.2128 − 1.4708j) | (0.8023 − 0.8711j) | (−0.4374 + 0.0601j) |
| 318 | (−0.0618 − 0.4046j) | (−0.8023 + 0.8711j) | (−0.4374 + 1.228j) |
| 319 | (−0.0611 − 0.5307j) | (−0.8023 − 0.8711j) | (−0.4374 + 1.4486j) |
| 320 | (−0.3159 − 0.1616j) | (0.293 + 0.1628j) | (−0.5905 − 0.3051j) |
| 321 | (−0.2603 − 0.9838j) | (0.293 − 0.1628j) | (−0.5905 − 0.3045j) |
| 322 | (−0.3145 − 0.2812j) | (−0.293 + 0.1628j) | (−0.5905 − 0.7193j) |
| 323 | (−0.3105 − 0.6693j) | (−0.293 − 0.1628j) | (−0.5905 − 0.7851j) |
| 324 | (−0.1837 − 0.1651j) | (0.293 + 0.1625j) | (−0.5905 + 0.3039j) |
| 325 | (−0.1264 − 0.9659j) | (0.293 − 0.1625j) | (−0.5905 + 0.3027j) |
| 326 | (−0.1851 − 0.2838j) | (−0.293 + 0.1625j) | (−0.5905 + 0.7189j) |
| 327 | (−0.1865 − 0.6639j) | (−0.293 − 0.1625j) | (−0.5905 + 0.7866j) |
| 328 | (−0.3126 − 0.1634j) | (0.2875 + 0.373j) | (−0.5905 − 0.4316j) |
| 329 | (−0.2876 − 0.8595j) | (0.2875 − 0.373j) | (−0.5905 − 0.4374j) |
| 330 | (−0.3108 − 0.2794j) | (−0.2875 + 0.373j) | (−0.5905 − 0.5905j) |
| 331 | (−0.3051 − 0.7213j) | (−0.2875 − 0.373j) | (−0.5905 − 0.5662j) |
| 332 | (−0.1827 − 0.1672j) | (0.2837 + 0.3794j) | (−0.5905 + 0.4309j) |
| 333 | (−0.1796 − 0.8387j) | (0.2837 − 0.3794j) | (−0.5905 + 0.4375j) |
| 334 | (−0.1859 − 0.2832j) | (−0.2837 + 0.3794j) | (−0.5905 + 0.5905j) |
| 335 | (−0.1862 − 0.7084j) | (−0.2837 − 0.3794j) | (−0.5905 + 0.5676j) |
| 336 | (−0.3155 − 0.1627j) | (1.1297 + 0.6783j) | (−0.5905 − 0.1795j) |
| 337 | (−0.2619 − 0.9855j) | (1.1297 − 0.6783j) | (−0.5905 − 0.1792j) |
| 338 | (−0.3137 − 0.2821j) | (−1.1297 + 0.6783j) | (−0.5905 − 1.0559j) |
| 339 | (−0.3101 − 0.6678j) | (−1.1297 − 0.6783j) | (−0.5905 − 0.919j) |
| 340 | (−0.183 − 0.165j) | (1.1955 + 0.5675j) | (−0.5905 + 0.1794j) |
| 341 | (−0.1247 − 0.9674j) | (1.1955 − 0.5675j) | (−0.5905 + 0.1796j) |
| 342 | (−0.1856 − 0.281j) | (−1.1955 + 0.5675j) | (−0.5905 + 1.0561j) |
| 343 | (−0.1866 − 0.6624j) | (−1.1955 − 0.5675j) | (−0.5905 + 0.9201j) |
| 344 | (−0.3119 − 0.1637j) | (0.6492 + 1.0902j) | (−0.5905 − 0.0609j) |
| 345 | (−0.2868 − 0.8599j) | (0.6492 − 1.0902j) | (−0.5905 − 0.0607j) |
| 346 | (−0.3095 − 0.2803j) | (−0.6492 + 1.0902j) | (−0.5905 − 1.2271j) |
| 347 | (−0.3061 − 0.7215j) | (−0.6492 − 1.0902j) | (−0.5905 − 1.4453j) |
| 348 | (−0.1838 − 0.1657j) | (0.5334 + 1.1357j) | (−0.5905 + 0.0601j) |
| 349 | (−0.1802 − 0.8426j) | (0.5334 − 1.1357j) | (−0.5905 + 0.0601j) |
| 350 | (−0.1842 − 0.2806j) | (−0.5334 + 1.1357j) | (−0.5905 + 1.228j) |
| 351 | (−0.1884 − 0.7047j) | (−0.5334 − 1.1357j) | (−0.5905 + 1.4486j) |
| 352 | (−0.3157 − 0.0567j) | (0.4177 + 0.2045j) | (−0.5662 − 0.3051j) |
| 353 | (−0.2455 − 1.1165j) | (0.4177 − 0.2045j) | (−0.5662 − 0.3045j) |
| 354 | (−0.3114 − 0.3996j) | (−0.4177 + 0.2045j) | (−0.5662 − 0.7193j) |
| 355 | (−0.3127 − 0.5438j) | (−0.4177 − 0.2045j) | (−0.5662 − 0.7851j) |
| 356 | (−0.1847 − 0.0565j) | (0.4177 + 0.2052j) | (−0.5662 + 0.3039j) |
| 357 | (−0.0756 − 1.0986j) | (0.4177 − 0.2052j) | (−0.5662 + 0.3027j) |
| 358 | (−0.1839 − 0.4027j) | (−0.4177 + 0.2052j) | (−0.5662 + 0.7189j) |
| 359 | (−0.1865 − 0.5398j) | (−0.4177 − 0.2052j) | (−0.5662 + 0.7866j) |
| 360 | (−0.3144 − 0.0565j) | (0.3688 + 0.3255j) | (−0.5662 − 0.4316j) |
| 361 | (−0.2283 − 1.2495j) | (0.3688 − 0.3255j) | (−0.5662 − 0.4374j) |
| 362 | (−0.3095 − 0.4037j) | (−0.3688 + 0.3255j) | (−0.5662 − 0.5905j) |
| 363 | (−0.3107 − 0.5281j) | (−0.3688 − 0.3255j) | (−0.5662 − 0.5662j) |
| 364 | (−0.1848 − 0.0563j) | (0.3702 + 0.3233j) | (−0.5662 + 0.4309j) |
| 365 | (−0.0716 − 1.2893j) | (0.3702 − 0.3233j) | (−0.5662 + 0.4375j) |
| 366 | (−0.1831 − 0.4034j) | (−0.3702 + 0.3233j) | (−0.5662 + 0.5905j) |
| 367 | (−0.186 − 0.5317j) | (−0.3702 − 0.3233j) | (−0.5662 + 0.5676j) |
| 368 | (−0.3148 − 0.0572j) | (1.0512 + 0.7809j) | (−0.5662 − 0.1795j) |
| 369 | (−0.2394 − 1.1164j) | (1.0512 − 0.7809j) | (−0.5662 − 0.1792j) |
| 370 | (−0.3113 − 0.3991j) | (−1.0512 + 0.7809j) | (−0.5662 − 1.0559j) |
| 371 | (−0.3128 − 0.5448j) | (−1.0512 − 0.7809j) | (−0.5662 − 0.919j) |
| 372 | (−0.1837 − 0.0551j) | (0.9635 + 0.8762j) | (−0.5662 + 0.1794j) |
| 373 | (−0.078 − 1.1028j) | (0.9635 − 0.8762j) | (−0.5662 + 0.1796j) |
| 374 | (−0.1821 − 0.4041j) | (−0.9635 + 0.8762j) | (−0.5662 + 1.0561j) |
| 375 | (−0.1853 − 0.5397j) | (−0.9635 − 0.8762j) | (−0.5662 + 0.9201j) |
| 376 | (−0.3127 − 0.0567j) | (0.761 + 1.0318j) | (−0.5662 − 0.0609j) |
| 377 | (−0.2149 − 1.2591j) | (0.761 − 1.0318j) | (−0.5662 − 0.0607j) |
| 378 | (−0.3088 − 0.4004j) | (−0.761 + 1.0318j) | (−0.5662 − 1.2271j) |
| 379 | (−0.3116 − 0.5285j) | (−0.761 − 1.0318j) | (−0.5662 − 1.4453j) |
| 380 | (−0.1847 − 0.056j) | (0.8664 + 0.9602j) | (−0.5662 + 0.0601j) |
| 381 | (−0.0801 − 1.2579j) | (0.8664 − 0.9602j) | (−0.5662 + 0.0601j) |
| 382 | (−0.1853 − 0.4049j) | (−0.8664 + 0.9602j) | (−0.5662 + 1.228j) |
| 383 | (−0.1844 − 0.5298j) | (−0.8664 − 0.9602j) | (−0.5662 + 1.4486j) |
| 384 | (0.4425 − 0.1648j) | (0.1863 + 0.167j) | (0.4309 − 0.3051j) |
| 385 | (0.3988 − 0.9835j) | (0.1863 − 0.167j) | (0.4309 − 0.3045j) |
| 386 | (0.4399 − 0.2776j) | (−0.1863 + 0.167j) | (0.4309 − 0.7193j) |
| 387 | (0.4309 − 0.6751j) | (−0.1863 − 0.167j) | (0.4309 − 0.7851j) |
| 388 | (0.0607 − 0.1653j) | (0.1864 + 0.1668j) | (0.4309 + 0.3039j) |
| 389 | (0.0532 − 0.8943j) | (0.1864 − 0.1668j) | (0.4309 + 0.3027j) |
| 390 | (0.0621 − 0.2824j) | (−0.1864 + 0.1668j) | (0.4309 + 0.7189j) |
| 391 | (0.0614 − 0.6661j) | (−0.1864 − 0.1668j) | (0.4309 + 0.7866j) |
| 392 | (0.4541 − 0.1622j) | (0.179 + 0.2802j) | (0.4309 − 0.4316j) |
| 393 | (0.4095 − 0.8731j) | (0.179 − 0.2802j) | (0.4309 − 0.4374j) |
| 394 | (0.453 − 0.2786j) | (−0.179 + 0.2802j) | (0.4309 − 0.5905j) |
| 395 | (0.4263 − 0.7383j) | (−0.179 − 0.2802j) | (0.4309 − 0.5662j) |
| 396 | (0.0611 − 0.1662j) | (0.1791 + 0.2814j) | (0.4309 + 0.4309j) |
| 397 | (0.069 − 0.8242j) | (0.1791 − 0.2814j) | (0.4309 + 0.4375j) |
| 398 | (0.0599 − 0.2843j) | (−0.1791 + 0.2814j) | (0.4309 + 0.5905j) |
| 399 | (0.0649 − 0.701j) | (−0.1791 − 0.2814j) | (0.4309 + 0.5676j) |
| 400 | (0.4437 − 0.1663j) | (0.9608 + 0.5557j) | (0.4309 − 0.1795j) |
| 401 | (0.4033 − 0.9933j) | (0.9608 − 0.5557j) | (0.4309 − 0.1792j) |
| 402 | (0.4404 − 0.2821j) | (−0.9608 + 0.5557j) | (0.4309 − 1.0559j) |
| 403 | (0.4316 − 0.676j) | (−0.9608 − 0.5557j) | (0.4309 − 0.919j) |
| 404 | (0.0615 − 0.167j) | (1.0147 + 0.464j) | (0.4309 + 0.1794j) |
| 405 | (0.0533 − 0.8948j) | (1.0147 − 0.464j) | (0.4309 + 0.1796j) |
| 406 | (0.0612 − 0.2829j) | (−1.0147 + 0.464j) | (0.4309 + 1.0561j) |
| 407 | (0.063 − 0.6656j) | (−1.0147 − 0.464j) | (0.4309 + 0.9201j) |
| 408 | (0.4544 − 0.1652j) | (0.5685 + 0.8988j) | (0.4309 − 0.0609j) |
| 409 | (0.4086 − 0.8704j) | (0.5685 − 0.8988j) | (0.4309 − 0.0607j) |
| 410 | (0.4516 − 0.2784j) | (−0.5685 + 0.8988j) | (0.4309 − 1.2271j) |
| 411 | (0.4257 − 0.7376j) | (−0.5685 − 0.8988j) | (0.4309 − 1.4453j) |
| 412 | (0.0618 − 0.167j) | (0.4732 + 0.9359j) | (0.4309 + 0.0601j) |
| 413 | (0.0689 − 0.8256j) | (0.4732 − 0.9359j) | (0.4309 + 0.0601j) |
| 414 | (0.062 − 0.2833j) | (−0.4732 + 0.9359j) | (0.4309 + 1.228j) |
| 415 | (0.0667 − 0.6992j) | (−0.4732 − 0.9359j) | (0.4309 + 1.4486j) |
| 416 | (0.4439 − 0.0568j) | (0.0634 + 0.1536j) | (0.4375 − 0.3051j) |
| 417 | (0.3929 − 1.1546j) | (0.0634 − 0.1536j) | (0.4375 − 0.3045j) |
| 418 | (0.437 − 0.3961j) | (−0.0634 + 0.1536j) | (0.4375 − 0.7193j) |
| 419 | (0.4346 − 0.5457j) | (−0.0634 − 0.1536j) | (0.4375 − 0.7851j) |
| 420 | (0.0611 − 0.0605j) | (0.0632 + 0.1535j) | (0.4375 + 0.3039j) |
| 421 | (0.0892 − 1.6511j) | (0.0632 − 0.1535j) | (0.4375 + 0.3027j) |
| 422 | (0.0617 − 0.4037j) | (−0.0632 + 0.1535j) | (0.4375 + 0.7189j) |
| 423 | (0.0627 − 0.5417j) | (−0.0632 − 0.1535j) | (0.4375 + 0.7866j) |
| 424 | (0.457 − 0.0577j) | (0.0541 + 0.2567j) | (0.4375 − 0.4316j) |
| 425 | (0.3778 − 1.3029j) | (0.0541 − 0.2567j) | (0.4375 − 0.4374j) |
| 426 | (0.4473 − 0.3989j) | (−0.0541 + 0.2567j) | (0.4375 − 0.5905j) |
| 427 | (0.4419 − 0.5263j) | (−0.0541 − 0.2567j) | (0.4375 − 0.5662j) |
| 428 | (0.0614 − 0.0588j) | (0.054 + 0.2567j) | (0.4375 + 0.4309j) |
| 429 | (0.0775 − 1.4648j) | (0.054 − 0.2567j) | (0.4375 + 0.4375j) |
| 430 | (0.0629 − 0.4063j) | (−0.054 + 0.2567j) | (0.4375 + 0.5905j) |
| 431 | (0.063 − 0.5307j) | (−0.054 − 0.2567j) | (0.4375 + 0.5676j) |
| 432 | (0.444 − 0.054j) | (0.898 + 0.6419j) | (0.4375 − 0.1795j) |
| 433 | (0.394 − 1.1154j) | (0.898 − 0.6419j) | (0.4375 − 0.1792j) |
| 434 | (0.4385 − 0.397j) | (−0.898 + 0.6419j) | (0.4375 − 1.0559j) |
| 435 | (0.4378 − 0.5465j) | (−0.898 − 0.6419j) | (0.4375 − 0.919j) |
| 436 | (0.0602 − 0.0583j) | (0.8263 + 0.7216j) | (0.4375 + 0.1794j) |
| 437 | (0.2731 − 1.6277j) | (0.8263 − 0.7216j) | (0.4375 + 0.1796j) |
| 438 | (0.063 − 0.403j) | (−0.8263 + 0.7216j) | (0.4375 + 1.0561j) |
| 439 | (0.0619 − 0.5397j) | (−0.8263 − 0.7216j) | (0.4375 + 0.9201j) |
| 440 | (0.4554 − 0.0547j) | (0.6605 + 0.8504j) | (0.4375 − 0.0609j) |
| 441 | (0.3334 − 1.4054j) | (0.6605 − 0.8504j) | (0.4375 − 0.0607j) |
| 442 | (0.4498 − 0.3989j) | (−0.6605 + 0.8504j) | (0.4375 − 1.2271j) |
| 443 | (0.4417 − 0.5261j) | (−0.6605 − 0.8504j) | (0.4375 − 1.4453j) |
| 444 | (0.0616 − 0.0581j) | (0.7468 + 0.7914j) | (0.4375 + 0.0601j) |
| 445 | (0.2143 − 1.4736j) | (0.7468 − 0.7914j) | (0.4375 + 0.0601j) |
| 446 | (0.061 − 0.4046j) | (−0.7468 + 0.7914j) | (0.4375 + 1.228j) |
| 447 | (0.062 − 0.5304j) | (−0.7468 − 0.7914j) | (0.4375 + 1.4486j) |
| 448 | (0.3132 − 0.164j) | (0.2991 + 0.1736j) | (0.5905 − 0.3051j) |
| 449 | (0.2604 − 0.982j) | (0.2991 − 0.1736j) | (0.5905 − 0.3045j) |
| 450 | (0.3108 − 0.2809j) | (−0.2991 + 0.1736j) | (0.5905 − 0.7193j) |
| 451 | (0.3091 − 0.6673j) | (−0.2991 − 0.1736j) | (0.5905 − 0.7851j) |
| 452 | (0.1819 − 0.1665j) | (0.2992 + 0.1734j) | (0.5905 + 0.3039j) |
| 453 | (0.1263 − 0.9664j) | (0.2992 − 0.1734j) | (0.5905 + 0.3027j) |
| 454 | (0.1843 − 0.2836j) | (−0.2992 + 0.1734j) | (0.5905 + 0.7189j) |
| 455 | (0.1856 − 0.6618j) | (−0.2992 − 0.1734j) | (0.5905 + 0.7866j) |
| 456 | (0.3109 − 0.1655j) | (0.2758 + 0.3148j) | (0.5905 − 0.4316j) |
| 457 | (0.2837 − 0.8602j) | (0.2758 − 0.3148j) | (0.5905 − 0.4374j) |
| 458 | (0.3092 − 0.2814j) | (−0.2758 + 0.3148j) | (0.5905 − 0.5905j) |
| 459 | (0.3043 − 0.7214j) | (−0.2758 − 0.3148j) | (0.5905 − 0.5662j) |
| 460 | (0.1834 − 0.1644j) | (0.2746 + 0.3175j) | (0.5905 + 0.4309j) |
| 461 | (0.1797 − 0.8393j) | (0.2746 − 0.3175j) | (0.5905 + 0.4375j) |
| 462 | (0.1849 − 0.2814j) | (−0.2746 + 0.3175j) | (0.5905 + 0.5905j) |
| 463 | (0.1876 − 0.7068j) | (−0.2746 − 0.3175j) | (0.5905 + 0.5676j) |

-continued

| Mapping | NN_QSL | NN_QSC | NN_RSC |
|---|---|---|---|
| 464 | (0.3116 − 0.1642j) | (1.2314 + 0.7518j) | (0.5905 − 0.1795j) |
| 465 | (0.2604 − 0.9862j) | (1.2314 − 0.7518j) | (0.5905 − 0.1792j) |
| 466 | (0.3111 − 0.2808j) | (−1.2314 + 0.7518j) | (0.5905 − 1.0559j) |
| 467 | (0.3083 − 0.6661j) | (−1.2314 − 0.7518j) | (0.5905 − 0.919j) |
| 468 | (0.1835 − 0.1672j) | (1.3049 + 0.6281j) | (0.5905 + 0.1794j) |
| 469 | (0.126 − 0.9679j) | (1.3049 − 0.6281j) | (0.5905 + 0.1796j) |
| 470 | (0.1839 − 0.2808j) | (−1.3049 + 0.6281j) | (0.5905 + 1.0561j) |
| 471 | (0.1864 − 0.6628j) | (−1.3049 − 0.6281j) | (0.5905 + 0.9201j) |
| 472 | (0.3116 − 0.1632j) | (0.7007 + 1.2053j) | (0.5905 − 0.0609j) |
| 473 | (0.2836 − 0.8595j) | (0.7007 − 1.2053j) | (0.5905 − 0.0607j) |
| 474 | (0.3092 − 0.2809j) | (−0.7007 + 1.2053j) | (0.5905 − 1.2271j) |
| 475 | (0.3035 − 0.7203j) | (−0.7007 − 1.2053j) | (0.5905 − 1.4453j) |
| 476 | (0.1826 − 0.1665j) | (0.5738 + 1.2552j) | (0.5905 + 0.0601j) |
| 477 | (0.177 − 0.8415j) | (0.5738 − 1.2552j) | (0.5905 + 0.0601j) |
| 478 | (0.1829 − 0.2848j) | (−0.5738 + 1.2552j) | (0.5905 + 1.228j) |
| 479 | (0.1866 − 0.7062j) | (−0.5738 − 1.2552j) | (0.5905 + 1.4486j) |
| 480 | (0.3145 − 0.0575j) | (0.3883 + 0.198j) | (0.5676 − 0.3051j) |
| 481 | (0.2424 − 1.1134j) | (0.3883 − 0.198j) | (0.5676 − 0.3045j) |
| 482 | (0.312 − 0.3975j) | (−0.3883 + 0.198j) | (0.5676 − 0.7193j) |
| 483 | (0.3147 − 0.5415j) | (−0.3883 − 0.198j) | (0.5676 − 0.7851j) |
| 484 | (0.1796 − 0.0577j) | (0.3884 + 0.1984j) | (0.5676 + 0.3039j) |
| 485 | (0.0776 − 1.1022j) | (0.3884 − 0.1984j) | (0.5676 + 0.3027j) |
| 486 | (0.1846 − 0.4j) | (−0.3884 + 0.1984j) | (0.5676 + 0.7189j) |
| 487 | (0.1857 − 0.5404j) | (−0.3884 − 0.1984j) | (0.5676 + 0.7866j) |
| 488 | (0.3098 − 0.0574j) | (0.3488 + 0.3029j) | (0.5676 − 0.4316j) |
| 489 | (0.2299 − 1.2495j) | (0.3488 − 0.3029j) | (0.5676 − 0.4374j) |
| 490 | (0.3106 − 0.4026j) | (−0.3488 + 0.3029j) | (0.5676 − 0.5905j) |
| 491 | (0.3109 − 0.5257j) | (−0.3488 − 0.3029j) | (0.5676 − 0.5662j) |
| 492 | (0.1835 − 0.0579j) | (0.3495 + 0.302j) | (0.5676 + 0.4309j) |
| 493 | (0.0742 − 1.2921j) | (0.3495 − 0.302j) | (0.5676 + 0.4375j) |
| 494 | (0.1855 − 0.4017j) | (−0.3495 + 0.302j) | (0.5676 + 0.5905j) |
| 495 | (0.1829 − 0.5297j) | (−0.3495 − 0.302j) | (0.5676 + 0.5676j) |
| 496 | (0.3118 − 0.0592j) | (1.1443 + 0.8653j) | (0.5676 − 0.1795j) |
| 497 | (0.2395 − 1.1147j) | (1.1443 − 0.8653j) | (0.5676 − 0.1792j) |
| 498 | (0.3123 − 0.398j) | (−1.1443 + 0.8653j) | (0.5676 − 1.0559j) |
| 499 | (0.3136 − 0.5422j) | (−1.1443 − 0.8653j) | (0.5676 − 0.919j) |
| 500 | (0.1816 − 0.0607j) | (1.0475 + 0.9694j) | (0.5676 + 0.1794j) |
| 501 | (0.0773 − 1.1108j) | (1.0475 − 0.9694j) | (0.5676 + 0.1796j) |
| 502 | (0.185 − 0.3996j) | (−1.0475 + 0.9694j) | (0.5676 + 1.0561j) |
| 503 | (0.186 − 0.5408j) | (−1.0475 − 0.9694j) | (0.5676 + 0.9201j) |
| 504 | (0.3115 − 0.0555j) | (0.8236 + 1.1404j) | (0.5676 − 0.0609j) |
| 505 | (0.2196 − 1.2598j) | (0.8236 − 1.1404j) | (0.5676 − 0.0607j) |
| 506 | (0.3106 − 0.4051j) | (−0.8236 + 1.1404j) | (0.5676 − 1.2271j) |
| 507 | (0.3088 − 0.5263j) | (−0.8236 − 1.1404j) | (0.5676 − 1.4453j) |
| 508 | (0.1827 − 0.0583j) | (0.9399 + 1.062j) | (0.5676 + 0.0601j) |
| 509 | (0.0816 − 1.2601j) | (0.9399 − 1.062j) | (0.5676 + 0.0601j) |
| 510 | (0.1833 − 0.4008j) | (−0.9399 + 1.062j) | (0.5676 + 1.228j) |
| 511 | (0.1861 − 0.5291j) | (−0.9399 − 1.062j) | (0.5676 + 1.4486j) |
| 512 | (−0.6227 + 0.1645j) | (0.8321 + 0.193j) | (−0.1795 − 0.3051j) |
| 513 | (−0.5436 + 0.9862j) | (0.8321 − 0.193j) | (−0.1795 − 0.3045j) |
| 514 | (−0.6129 + 0.2814j) | (−0.8321 + 0.193j) | (−0.1795 − 0.7193j) |
| 515 | (−0.5663 + 0.6799j) | (−0.8321 − 0.193j) | (−0.1795 − 0.7851j) |
| 516 | (−1.2862 + 0.2201j) | (0.8151 + 0.2453j) | (−0.1795 + 0.3039j) |
| 517 | (−1.0365 + 0.9846j) | (0.8151 − 0.2453j) | (−0.1795 + 0.3027j) |
| 518 | (−1.2651 + 0.3694j) | (−0.8151 + 0.2453j) | (−0.1795 + 0.7189j) |
| 519 | (−1.1121 + 0.8407j) | (−0.8151 − 0.2453j) | (−0.1795 + 0.7866j) |
| 520 | (−0.5867 + 0.1624j) | (0.2429 + 0.7216j) | (−0.1795 − 0.4316j) |
| 521 | (−0.5516 + 0.8732j) | (0.2429 − 0.7216j) | (−0.1795 − 0.4374j) |
| 522 | (−0.5798 + 0.2789j) | (−0.2429 + 0.7216j) | (−0.1795 − 0.5905j) |
| 523 | (−0.5544 + 0.7452j) | (−0.2429 − 0.7216j) | (−0.1795 − 0.5662j) |
| 524 | (−1.7794 + 0.2913j) | (0.3191 + 0.6989j) | (−0.1795 + 0.4309j) |
| 525 | (−1.3142 + 1.3286j) | (0.3191 − 0.6989j) | (−0.1795 + 0.4375j) |
| 526 | (−1.7442 + 0.4947j) | (−0.3191 + 0.6989j) | (−0.1795 + 0.5905j) |
| 527 | (−1.4975 + 1.1188j) | (−0.3191 − 0.6989j) | (−0.1795 + 0.5676j) |
| 528 | (−0.6252 + 0.1641j) | (0.9202 + 0.2151j) | (−0.1795 − 0.1795j) |
| 529 | (−0.5423 + 0.9986j) | (0.9202 − 0.2151j) | (−0.1795 − 0.1792j) |
| 530 | (−0.6136 + 0.2813j) | (−0.9202 + 0.2151j) | (−0.1795 − 1.0559j) |
| 531 | (−0.5675 + 0.6818j) | (−0.9202 − 0.2151j) | (−0.1795 − 0.919j) |
| 532 | (−1.4072 + 0.2385j) | (0.8955 + 0.29j) | (−0.1795 + 0.1794j) |
| 533 | (−1.0931 + 1.0525j) | (0.8955 − 0.29j) | (−0.1795 + 0.1796j) |
| 534 | (−1.3798 + 0.3969j) | (−0.8955 + 0.29j) | (−0.1795 + 1.0561j) |
| 535 | (−1.2017 + 0.8794j) | (−0.8955 − 0.29j) | (−0.1795 + 0.9201j) |
| 536 | (−0.5868 + 0.1631j) | (0.2587 + 0.82j) | (−0.1795 − 0.0609j) |
| 537 | (−0.5538 + 0.8711j) | (0.2587 − 0.82j) | (−0.1795 − 0.0607j) |
| 538 | (−0.5818 + 0.2804j) | (−0.2587 + 0.82j) | (−0.1795 − 1.2271j) |
| 539 | (−0.5562 + 0.7436j) | (−0.2587 − 0.82j) | (−0.1795 − 1.4453j) |
| 540 | (−1.574 + 0.2573j) | (0.3448 + 0.7935j) | (−0.1795 + 0.0601j) |
| 541 | (−1.2295 + 1.1433j) | (0.3448 − 0.7935j) | (−0.1795 + 0.0601j) |
| 542 | (−1.544 + 0.4427j) | (−0.3448 + 0.7935j) | (−0.1795 + 1.228j) |
| 543 | (−1.3376 + 0.9743j) | (−0.3448 − 0.7935j) | (−0.1795 + 1.4486j) |
| 544 | (−0.628 + 0.0558j) | (0.8526 + 0.0967j) | (−0.1792 − 0.3051j) |
| 545 | (−0.5287 + 1.1843j) | (0.8526 − 0.0967j) | (−0.1792 − 0.3045j) |
| 546 | (−0.6062 + 0.4018j) | (−0.8526 + 0.0967j) | (−0.1792 − 0.7193j) |
| 547 | (−0.5817 + 0.5451j) | (−0.8526 − 0.0967j) | (−0.1792 − 0.7851j) |
| 548 | (−1.3006 + 0.0729j) | (0.8582 + 0.0486j) | (−0.1792 + 0.3039j) |
| 549 | (−0.1272 + 1.8556j) | (0.8582 − 0.0486j) | (−0.1792 + 0.3027j) |
| 550 | (−1.231 + 0.5136j) | (−0.8582 + 0.0486j) | (−0.1792 + 0.7189j) |
| 551 | (−1.1874 + 0.6662j) | (−0.8582 − 0.0486j) | (−0.1792 + 0.7866j) |
| 552 | (−0.5897 + 0.0577j) | (0.1472 + 0.7455j) | (−0.1792 − 0.4316j) |
| 553 | (−0.5169 + 1.3322j) | (0.1472 − 0.7455j) | (−0.1792 − 0.4374j) |
| 554 | (−0.5752 + 0.4027j) | (−0.1472 + 0.7455j) | (−0.1792 − 0.5905j) |
| 555 | (−0.5606 + 0.5245j) | (−0.1472 − 0.7455j) | (−0.1792 − 0.5662j) |
| 556 | (−1.7966 + 0.0968j) | (0.0513 + 0.7587j) | (−0.1792 + 0.4309j) |
| 557 | (−0.8231 + 1.7139j) | (0.0513 − 0.7587j) | (−0.1792 + 0.4375j) |
| 558 | (−1.6882 + 0.6974j) | (−0.0513 + 0.7587j) | (−0.1792 + 0.5905j) |
| 559 | (−1.6057 + 0.905j) | (−0.0513 − 0.7587j) | (−0.1792 + 0.5676j) |
| 560 | (−0.6265 + 0.0547j) | (0.9408 + 0.1226j) | (−0.1792 − 0.1795j) |
| 561 | (−0.5314 + 1.131j) | (0.9408 − 0.1226j) | (−0.1792 − 0.1792j) |
| 562 | (−0.6086 + 0.402j) | (−0.9408 + 0.1226j) | (−0.1792 − 1.0559j) |
| 563 | (−0.5832 + 0.5446j) | (−0.9408 − 0.1226j) | (−0.1792 − 0.919j) |
| 564 | (−1.4219 + 0.0793j) | (0.9496 + 0.047j) | (−0.1792 + 0.1794j) |
| 565 | (−0.3738 + 1.8028j) | (0.9496 − 0.047j) | (−0.1792 + 0.1796j) |
| 566 | (−1.3453 + 0.5519j) | (−0.9496 + 0.047j) | (−0.1792 + 1.0561j) |
| 567 | (−1.2785 + 0.7176j) | (−0.9496 − 0.047j) | (−0.1792 + 0.9201j) |
| 568 | (−0.5885 + 0.0554j) | (0.1603 + 0.8422j) | (−0.1792 − 0.0609j) |
| 569 | (−0.4892 + 1.4833j) | (0.1603 − 0.8422j) | (−0.1792 − 0.0607j) |
| 570 | (−0.5776 + 0.4018j) | (−0.1603 + 0.8422j) | (−0.1792 − 1.2271j) |
| 571 | (−0.5652 + 0.527j) | (−0.1603 − 0.8422j) | (−0.1792 − 1.4453j) |
| 572 | (−1.5881 + 0.0862j) | (0.0544 + 0.8559j) | (−0.1792 + 0.0601j) |
| 573 | (−0.5614 + 1.6802j) | (0.0544 − 0.8559j) | (−0.1792 + 0.0601j) |
| 574 | (−1.4975 + 0.6188j) | (−0.0544 + 0.8559j) | (−0.1792 + 1.228j) |
| 575 | (−1.4256 + 0.7973j) | (−0.0544 − 0.8559j) | (−0.1792 + 1.4486j) |
| 576 | (−0.7542 + 0.1663j) | (0.5835 + 0.145j) | (−1.0559 − 0.3051j) |
| 577 | (−0.6935 + 1.0034j) | (0.5835 − 0.145j) | (−1.0559 − 0.3045j) |
| 578 | (−0.7436 + 0.2856j) | (−0.5835 + 0.145j) | (−1.0559 − 0.7193j) |
| 579 | (−0.6843 + 0.6705j) | (−0.5835 − 0.145j) | (−1.0559 − 0.7851j) |
| 580 | (−1.1569 + 0.2004j) | (0.5837 + 0.1468j) | (−1.0559 + 0.3039j) |
| 581 | (−0.892 + 1.0205j) | (0.5837 − 0.1468j) | (−1.0559 + 0.3027j) |
| 582 | (−1.1324 + 0.3418j) | (−0.5837 + 0.1468j) | (−1.0559 + 0.7189j) |
| 583 | (−1.0142 + 0.7744j) | (−0.5837 − 0.1468j) | (−1.0559 + 0.7866j) |
| 584 | (−0.8411 + 0.1733j) | (0.2107 + 0.5776j) | (−1.0559 − 0.4316j) |
| 585 | (−0.704 + 0.8771j) | (0.2107 − 0.5776j) | (−1.0559 − 0.4374j) |
| 586 | (−0.8307 + 0.2961j) | (−0.2107 + 0.5776j) | (−1.0559 − 0.5905j) |
| 587 | (−0.7238 + 0.7219j) | (−0.2107 − 0.5776j) | (−1.0559 − 0.5662j) |
| 588 | (−0.9702 + 0.1841j) | (0.2541 + 0.5487j) | (−1.0559 + 0.4309j) |
| 589 | (−0.8433 + 0.8757j) | (0.2541 − 0.5487j) | (−1.0559 + 0.4375j) |
| 590 | (−0.9553 + 0.3136j) | (−0.2541 + 0.5487j) | (−1.0559 + 0.5905j) |
| 591 | (−0.8687 + 0.7403j) | (−0.2541 − 0.5487j) | (−1.0559 + 0.5676j) |
| 592 | (−0.7512 + 0.1657j) | (1.7239 + 0.449j) | (−1.0559 − 0.1795j) |
| 593 | (−0.6981 + 1.0166j) | (1.7239 − 0.449j) | (−1.0559 − 0.1792j) |
| 594 | (−0.7443 + 0.2868j) | (−1.7239 + 0.449j) | (−1.0559 − 1.0559j) |
| 595 | (−0.6877 + 0.6784j) | (−1.7239 − 0.449j) | (−1.0559 − 0.919j) |
| 596 | (−1.1052 + 0.197j) | (1.6668 + 0.6204j) | (−1.0559 + 0.1794j) |
| 597 | (−0.8631 + 1.0063j) | (1.6668 − 0.6204j) | (−1.0559 + 0.1796j) |
| 598 | (−1.0823 + 0.3312j) | (−1.6668 + 0.6204j) | (−1.0559 + 1.0561j) |
| 599 | (−0.9851 + 0.7489j) | (−1.6668 − 0.6204j) | (−1.0559 + 0.9201j) |
| 600 | (−0.8419 + 0.1741j) | (0.3776 + 1.6445j) | (−1.0559 − 0.0609j) |
| 601 | (−0.7023 + 0.8722j) | (0.3776 − 1.6445j) | (−1.0559 − 0.0607j) |
| 602 | (−0.8243 + 0.2959j) | (−0.3776 + 1.6445j) | (−1.0559 − 1.2271j) |
| 603 | (−0.7203 + 0.7251j) | (−0.3776 − 1.6445j) | (−1.0559 − 1.4453j) |
| 604 | (−0.9876 + 0.1862j) | (0.5319 + 1.6115j) | (−1.0559 + 0.0601j) |
| 605 | (−0.8441 + 0.8814j) | (0.5319 − 1.6115j) | (−1.0559 + 0.0601j) |
| 606 | (−0.9688 + 0.3144j) | (−0.5319 + 1.6115j) | (−1.0559 + 1.228j) |
| 607 | (−0.8788 + 0.7414j) | (−0.5319 − 1.6115j) | (−1.0559 + 1.4486j) |
| 608 | (−0.7574 + 0.0547j) | (0.5584 + 0.0608j) | (−0.919 − 0.3051j) |
| 609 | (−0.7036 + 1.1955j) | (0.5584 − 0.0608j) | (−0.919 − 0.3045j) |
| 610 | (−0.7332 + 0.4129j) | (−0.5584 + 0.0608j) | (−0.919 − 0.7193j) |
| 611 | (−0.7094 + 0.5524j) | (−0.5584 − 0.0608j) | (−0.919 − 0.7851j) |
| 612 | (−1.1685 + 0.0665j) | (0.5584 + 0.0594j) | (−0.919 + 0.3039j) |
| 613 | (−0.8661 + 1.1985j) | (0.5584 − 0.0594j) | (−0.919 + 0.3027j) |
| 614 | (−1.0999 + 0.4799j) | (−0.5584 + 0.0594j) | (−0.919 + 0.7189j) |
| 615 | (−1.0732 + 0.6266j) | (−0.5584 − 0.0594j) | (−0.919 + 0.7866j) |

| Mapping | NN_QSL | NN_QSC | NN_RSC |
|---|---|---|---|
| 616 | (−0.8522 + 0.0583j) | (0.113 + 0.621j) | (−0.919 − 0.4316j) |
| 617 | (−0.6738 + 1.331j) | (0.113 − 0.621j) | (−0.919 − 0.4374j) |
| 618 | (−0.8097 + 0.4242j) | (−0.113 + 0.621j) | (−0.919 − 0.5905j) |
| 619 | (−0.7853 + 0.5572j) | (−0.113 − 0.621j) | (−0.919 − 0.5662j) |
| 620 | (−0.9772 + 0.0605j) | (0.0488 + 0.6357j) | (−0.919 + 0.4309j) |
| 621 | (−1.0775 + 1.5207j) | (0.0488 − 0.6357j) | (−0.919 + 0.4375j) |
| 622 | (−0.9325 + 0.4453j) | (−0.0488 + 0.6357j) | (−0.919 + 0.5905j) |
| 623 | (−0.9066 + 0.5865j) | (−0.0488 − 0.6357j) | (−0.919 + 0.5676j) |
| 624 | (−0.7569 + 0.0541j) | (1.7619 + 0.2717j) | (−0.919 − 0.1795j) |
| 625 | (−0.68 + 1.1391j) | (1.7619 − 0.2717j) | (−0.919 − 0.1792j) |
| 626 | (−0.7355 + 0.4136j) | (−1.7619 + 0.2717j) | (−0.919 − 1.0559j) |
| 627 | (−0.7132 + 0.5556j) | (−1.7619 − 0.2717j) | (−0.919 − 0.919j) |
| 628 | (−1.1174 + 0.0638j) | (1.7821 + 0.0908j) | (−0.919 + 0.1794j) |
| 629 | (−0.9889 + 1.2725j) | (1.7821 − 0.0908j) | (−0.919 + 0.1796j) |
| 630 | (−1.0597 + 0.4682j) | (−1.7821 + 0.0908j) | (−0.919 + 1.0561j) |
| 631 | (−1.0311 + 0.616j) | (−1.7821 − 0.0908j) | (−0.919 + 0.9201j) |
| 632 | (−0.8497 + 0.0561j) | (0.2251 + 1.6619j) | (−0.919 − 0.0609j) |
| 633 | (−0.6858 + 1.4691j) | (0.2251 − 1.6619j) | (−0.919 − 0.0607j) |
| 634 | (−0.8029 + 0.424j) | (−0.2251 + 1.6619j) | (−0.919 − 1.2271j) |
| 635 | (−0.7825 + 0.5601j) | (−0.2251 − 1.6619j) | (−0.919 − 1.4453j) |
| 636 | (−0.9912 + 0.0613j) | (0.0747 + 1.6718j) | (−0.919 − 0.0601j) |
| 637 | (−0.8802 + 1.4402j) | (0.0747 − 1.6718j) | (−0.919 − 0.0601j) |
| 638 | (−0.944 + 0.446j) | (−0.0747 + 1.6718j) | (−0.919 + 1.228j) |
| 639 | (−0.9145 + 0.5877j) | (−0.0747 − 1.6718j) | (−0.919 + 1.4486j) |
| 640 | (0.6235 + 0.1649j) | (0.7504 + 0.1738j) | (0.1794 − 0.3051j) |
| 641 | (0.5445 + 0.9871j) | (0.7504 − 0.1738j) | (0.1794 − 0.3045j) |
| 642 | (0.6165 + 0.2839j) | (−0.7504 + 0.1738j) | (0.1794 − 0.7193j) |
| 643 | (0.5678 + 0.6808j) | (−0.7504 − 0.1738j) | (0.1794 − 0.7851j) |
| 644 | (1.2839 + 0.2269j) | (0.7429 + 0.2033j) | (0.1794 + 0.3039j) |
| 645 | (1.0357 + 0.9897j) | (0.7429 − 0.2033j) | (0.1794 + 0.3027j) |
| 646 | (1.264 + 0.3765j) | (−0.7429 + 0.2033j) | (0.1794 + 0.7189j) |
| 647 | (1.1137 + 0.8483j) | (−0.7429 − 0.2033j) | (0.1794 + 0.7866j) |
| 648 | (0.5856 + 0.1664j) | (0.2368 + 0.6902j) | (0.1794 − 0.4316j) |
| 649 | (0.5534 + 0.8718j) | (0.2368 − 0.6902j) | (0.1794 − 0.4374j) |
| 650 | (0.5822 + 0.2813j) | (−0.2368 + 0.6902j) | (0.1794 − 0.5905j) |
| 651 | (0.5561 + 0.7489j) | (−0.2368 − 0.6902j) | (0.1794 − 0.5662j) |
| 652 | (1.7789 + 0.3004j) | (0.3057 + 0.6584j) | (0.1794 + 0.4309j) |
| 653 | (1.3158 + 1.3361j) | (0.3057 − 0.6584j) | (0.1794 + 0.4375j) |
| 654 | (1.7471 + 0.5029j) | (−0.3057 + 0.6584j) | (0.1794 + 0.5905j) |
| 655 | (1.5019 + 1.1286j) | (−0.3057 − 0.6584j) | (0.1794 + 0.5676j) |
| 656 | (0.6222 + 0.1662j) | (1.0031 + 0.2389j) | (0.1794 − 0.1795j) |
| 657 | (0.5436 + 1.0014j) | (1.0031 − 0.2389j) | (0.1794 − 0.1792j) |
| 658 | (0.6183 + 0.2826j) | (−1.0031 + 0.2389j) | (0.1794 − 1.0559j) |
| 659 | (0.5658 + 0.6807j) | (−1.0031 − 0.2389j) | (0.1794 − 0.919j) |
| 660 | (1.4032 + 0.2435j) | (0.9725 + 0.3279j) | (0.1794 + 0.1794j) |
| 661 | (1.0963 + 1.0564j) | (0.9725 − 0.3279j) | (0.1794 + 0.1796j) |
| 662 | (1.383 + 0.4027j) | (−0.9725 + 0.3279j) | (0.1794 + 1.0561j) |
| 663 | (1.202 + 0.883j) | (−0.9725 − 0.3279j) | (0.1794 + 0.9201j) |
| 664 | (0.5828 + 0.1664j) | (0.2642 + 0.8819j) | (0.1794 − 0.0609j) |
| 665 | (0.5514 + 0.8708j) | (0.2642 − 0.8819j) | (0.1794 − 0.0607j) |
| 666 | (0.5814 + 0.2799j) | (−0.2642 + 0.8819j) | (0.1794 − 1.2271j) |
| 667 | (0.5548 + 0.746j) | (−0.2642 − 0.8819j) | (0.1794 − 1.4453j) |
| 668 | (1.5686 + 0.2684j) | (0.3578 + 0.8654j) | (0.1794 + 0.0601j) |
| 669 | (1.228 + 1.1483j) | (0.3578 − 0.8654j) | (0.1794 + 0.0601j) |
| 670 | (1.5442 + 0.4492j) | (−0.3578 + 0.8654j) | (0.1794 + 1.228j) |
| 671 | (1.3328 + 0.9769j) | (−0.3578 − 0.8654j) | (0.1794 + 1.4486j) |
| 672 | (0.6261 + 0.0567j) | (0.7641 + 0.0701j) | (0.1796 − 0.3051j) |
| 673 | (0.5291 + 1.1814j) | (0.7641 − 0.0701j) | (0.1796 − 0.3045j) |
| 674 | (0.609 + 0.4066j) | (−0.7641 + 0.0701j) | (0.1796 − 0.7193j) |
| 675 | (0.5827 + 0.5481j) | (−0.7641 − 0.0701j) | (0.1796 − 0.7851j) |
| 676 | (1.2988 + 0.0783j) | (0.7659 + 0.0487j) | (0.1796 + 0.3039j) |
| 677 | (0.1337 + 1.8634j) | (0.7659 − 0.0487j) | (0.1796 + 0.3027j) |
| 678 | (1.2328 + 0.5201j) | (−0.7659 + 0.0487j) | (0.1796 + 0.7189j) |
| 679 | (1.1891 + 0.671j) | (−0.7659 − 0.0487j) | (0.1796 + 0.7866j) |
| 680 | (0.5865 + 0.0563j) | (0.1431 + 0.7251j) | (0.1796 − 0.4316j) |
| 681 | (0.5176 + 1.3243j) | (0.1431 − 0.7251j) | (0.1796 − 0.4374j) |
| 682 | (0.5713 + 0.403j) | (−0.1431 + 0.7251j) | (0.1796 − 0.5905j) |
| 683 | (0.5633 + 0.5286j) | (−0.1431 − 0.7251j) | (0.1796 − 0.5662j) |
| 684 | (1.7888 + 0.1044j) | (0.0506 + 0.7433j) | (0.1796 + 0.4309j) |
| 685 | (0.829 + 1.7154j) | (0.0506 − 0.7433j) | (0.1796 + 0.4375j) |
| 686 | (1.6889 + 0.7064j) | (−0.0506 + 0.7433j) | (0.1796 + 0.5905j) |
| 687 | (1.6085 + 0.9071j) | (−0.0506 − 0.7433j) | (0.1796 + 0.5676j) |
| 688 | (0.626 + 0.0571j) | (1.0258 + 0.1432j) | (0.1796 − 0.1795j) |
| 689 | (0.5386 + 1.1329j) | (1.0258 − 0.1432j) | (0.1796 − 0.1792j) |
| 690 | (0.607 + 0.4048j) | (−1.0258 + 0.1432j) | (0.1796 − 1.0559j) |
| 691 | (0.5823 + 0.5452j) | (−1.0258 − 0.1432j) | (0.1796 − 0.919j) |
| 692 | (1.4175 + 0.0845j) | (1.0364 + 0.0494j) | (0.1796 + 0.1794j) |
| 693 | (0.3747 + 1.7968j) | (1.0364 − 0.0494j) | (0.1796 + 0.1796j) |
| 694 | (1.3445 + 0.5598j) | (−1.0364 + 0.0494j) | (0.1796 + 1.0561j) |
| 695 | (1.2785 + 0.7205j) | (−1.0364 − 0.0494j) | (0.1796 + 0.9201j) |
| 696 | (0.5876 + 0.0571j) | (0.1624 + 0.8923j) | (0.1796 − 0.0609j) |
| 697 | (0.4965 + 1.4819j) | (0.1624 − 0.8923j) | (0.1796 − 0.0607j) |
| 698 | (0.575 + 0.4038j) | (−0.1624 + 0.8923j) | (0.1796 − 1.2271j) |
| 699 | (0.5618 + 0.5281j) | (−0.1624 − 0.8923j) | (0.1796 − 1.4453j) |
| 700 | (1.5817 + 0.0942j) | (0.0553 + 0.8988j) | (0.1796 + 0.0601j) |
| 701 | (0.5631 + 1.679j) | (0.0553 − 0.8988j) | (0.1796 + 0.0601j) |
| 702 | (1.491 + 0.6223j) | (−0.0553 + 0.8988j) | (0.1796 + 1.228j) |
| 703 | (1.4216 + 0.7997j) | (−0.0553 − 0.8988j) | (0.1796 + 1.4486j) |
| 704 | (0.7485 + 0.1703j) | (0.6607 + 0.1535j) | (1.0561 − 0.3051j) |
| 705 | (0.6949 + 1.0025j) | (0.6607 − 0.1535j) | (1.0561 − 0.3045j) |
| 706 | (0.7435 + 0.2913j) | (−0.6607 + 0.1535j) | (1.0561 − 0.7193j) |
| 707 | (0.6888 + 0.6815j) | (−0.6607 − 0.1535j) | (1.0561 − 0.7851j) |
| 708 | (1.1533 + 0.2081j) | (0.6594 + 0.163j) | (1.0561 + 0.3039j) |
| 709 | (0.8978 + 1.0283j) | (0.6594 − 0.163j) | (1.0561 + 0.3027j) |
| 710 | (1.1333 + 0.3461j) | (−0.6594 + 0.163j) | (1.0561 + 0.7189j) |
| 711 | (1.0119 + 0.7766j) | (−0.6594 − 0.163j) | (1.0561 + 0.7866j) |
| 712 | (0.8414 + 0.1771j) | (0.2136 + 0.59j) | (1.0561 − 0.4316j) |
| 713 | (0.7032 + 0.8792j) | (0.2136 − 0.59j) | (1.0561 − 0.4374j) |
| 714 | (0.8286 + 0.2992j) | (−0.2136 + 0.59j) | (1.0561 − 0.5905j) |
| 715 | (0.7299 + 0.7291j) | (−0.2136 − 0.59j) | (1.0561 − 0.5662j) |
| 716 | (0.9611 + 0.1876j) | (0.2638 + 0.568j) | (1.0561 + 0.4309j) |
| 717 | (0.8455 + 0.8827j) | (0.2638 − 0.568j) | (1.0561 + 0.4375j) |
| 718 | (0.9556 + 0.3162j) | (−0.2638 + 0.568j) | (1.0561 + 0.5905j) |
| 719 | (0.8702 + 0.7449j) | (−0.2638 − 0.568j) | (1.0561 + 0.5676j) |
| 720 | (0.7511 + 0.1706j) | (1.5512 + 0.4002j) | (1.0561 − 0.1795j) |
| 721 | (0.6959 + 1.013j) | (1.5512 − 0.4002j) | (1.0561 − 0.1792j) |
| 722 | (0.7428 + 0.2911j) | (−1.5512 + 0.4002j) | (1.0561 − 1.0559j) |
| 723 | (0.6864 + 0.6795j) | (−1.5512 − 0.4002j) | (1.0561 − 0.919j) |
| 724 | (1.1016 + 0.2011j) | (1.5002 + 0.553j) | (1.0561 + 0.1794j) |
| 725 | (0.8637 + 1.0087j) | (1.5002 − 0.553j) | (1.0561 + 0.1796j) |
| 726 | (1.0881 + 0.3373j) | (−1.5002 + 0.553j) | (1.0561 + 1.0561j) |
| 727 | (0.9844 + 0.7545j) | (−1.5002 − 0.553j) | (1.0561 + 0.9201j) |
| 728 | (0.8387 + 0.1788j) | (0.3436 + 1.4636j) | (1.0561 − 0.0609j) |
| 729 | (0.7083 + 0.8765j) | (0.3436 − 1.4636j) | (1.0561 − 0.0607j) |
| 730 | (0.8235 + 0.2991j) | (−0.3436 + 1.4636j) | (1.0561 − 1.2271j) |
| 731 | (0.7284 + 0.7308j) | (−0.3436 − 1.4636j) | (1.0561 − 1.4453j) |
| 732 | (0.9821 + 0.1904j) | (0.4838 + 1.4363j) | (1.0561 + 0.0601j) |
| 733 | (0.8396 + 0.8832j) | (0.4838 − 1.4363j) | (1.0561 + 0.0601j) |
| 734 | (0.9681 + 0.3202j) | (−0.4838 + 1.4363j) | (1.0561 + 1.228j) |
| 735 | (0.8756 + 0.7423j) | (−0.4838 − 1.4363j) | (1.0561 + 1.4486j) |
| 736 | (0.7564 + 0.0581j) | (0.6607 + 0.0514j) | (0.9201 − 0.3051j) |
| 737 | (0.7053 + 1.1983j) | (0.6607 − 0.0514j) | (0.9201 − 0.3045j) |
| 738 | (0.7309 + 0.4158j) | (−0.6607 + 0.0514j) | (0.9201 − 0.7193j) |
| 739 | (0.7138 + 0.5587j) | (−0.6607 − 0.0514j) | (0.9201 − 0.7851j) |
| 740 | (1.1628 + 0.0706j) | (0.6602 + 0.0461j) | (0.9201 + 0.3039j) |
| 741 | (0.8686 + 1.2002j) | (0.6602 − 0.0461j) | (0.9201 + 0.3027j) |
| 742 | (1.0982 + 0.4839j) | (−0.6602 + 0.0461j) | (0.9201 + 0.7189j) |
| 743 | (1.0677 + 0.6266j) | (−0.6602 − 0.0461j) | (0.9201 + 0.7866j) |
| 744 | (0.8457 + 0.0608j) | (0.1171 + 0.6262j) | (0.9201 − 0.4316j) |
| 745 | (0.6732 + 1.335j) | (0.1171 − 0.6262j) | (0.9201 − 0.4374j) |
| 746 | (0.803 + 0.4271j) | (−0.1171 + 0.6262j) | (0.9201 − 0.5905j) |
| 747 | (0.7832 + 0.5618j) | (−0.1171 − 0.6262j) | (0.9201 − 0.5662j) |
| 748 | (0.9769 + 0.0649j) | (0.0496 + 0.6408j) | (0.9201 + 0.4309j) |
| 749 | (1.0787 + 1.5235j) | (0.0496 − 0.6408j) | (0.9201 + 0.4375j) |
| 750 | (0.9336 + 0.4458j) | (−0.0496 + 0.6408j) | (0.9201 + 0.5905j) |
| 751 | (0.9033 + 0.5861j) | (−0.0496 − 0.6408j) | (0.9201 + 0.5676j) |
| 752 | (0.756 + 0.0579j) | (1.5854 + 0.2423j) | (0.9201 − 0.1795j) |
| 753 | (0.6833 + 1.1387j) | (1.5854 − 0.2423j) | (0.9201 − 0.1792j) |
| 754 | (0.7302 + 0.4161j) | (−1.5854 + 0.2423j) | (0.9201 − 1.0559j) |
| 755 | (0.7097 + 0.5568j) | (−1.5854 − 0.2423j) | (0.9201 − 0.919j) |
| 756 | (1.1158 + 0.0685j) | (1.6031 + 0.0814j) | (0.9201 + 0.1794j) |
| 757 | (0.9888 + 1.2766j) | (1.6031 − 0.0814j) | (0.9201 + 0.1796j) |
| 758 | (1.0607 + 0.4725j) | (−1.6031 + 0.0814j) | (0.9201 + 1.0561j) |
| 759 | (1.0274 + 0.6189j) | (−1.6031 − 0.0814j) | (0.9201 + 0.9201j) |
| 760 | (0.8466 + 0.0606j) | (0.2051 + 1.4802j) | (0.9201 − 0.0609j) |
| 761 | (0.6926 + 1.4691j) | (0.2051 − 1.4802j) | (0.9201 − 0.0607j) |
| 762 | (0.8017 + 0.4262j) | (−0.2051 + 1.4802j) | (0.9201 − 1.2271j) |
| 763 | (0.7827 + 0.5603j) | (−0.2051 − 1.4802j) | (0.9201 − 1.4453j) |
| 764 | (0.9963 + 0.0648j) | (0.0679 + 1.4881j) | (0.9201 + 0.0601j) |
| 765 | (0.8816 + 1.4415j) | (0.0679 − 1.4881j) | (0.9201 + 0.0601j) |
| 766 | (0.9456 + 0.4497j) | (−0.0679 + 1.4881j) | (0.9201 + 1.228j) |
| 767 | (0.9113 + 0.5881j) | (−0.0679 − 1.4881j) | (0.9201 + 1.4486j) |

| Mapping | NN_QSL | NN_QSC | NN_RSC |
| --- | --- | --- | --- |
| 768 | (−0.6256 − 0.166j) | (0.7488 + 0.3906j) | (−0.0609 − 0.3051j) |
| 769 | (−0.5474 − 0.9834j) | (0.7488 − 0.3906j) | (−0.0609 − 0.3045j) |
| 770 | (−0.6184 − 0.2849j) | (−0.7488 + 0.3906j) | (−0.0609 − 0.7193j) |
| 771 | (−0.5681 − 0.6794j) | (−0.7488 − 0.3906j) | (−0.0609 − 0.7851j) |
| 772 | (−1.2913 − 0.2246j) | (0.7767 + 0.3382j) | (−0.0609 + 0.3039j) |
| 773 | (−1.035 − 0.9873j) | (0.7767 − 0.3382j) | (−0.0609 + 0.3027j) |
| 774 | (−1.2698 − 0.3685j) | (−0.7767 + 0.3382j) | (−0.0609 + 0.7189j) |
| 775 | (−1.1142 − 0.8464j) | (−0.7767 − 0.3382j) | (−0.0609 + 0.7866j) |
| 776 | (−0.5875 − 0.1646j) | (0.4634 + 0.6444j) | (−0.0609 − 0.4316j) |
| 777 | (−0.5563 − 0.8753j) | (0.4634 − 0.6444j) | (−0.0609 − 0.4374j) |
| 778 | (−0.583 − 0.2827j) | (−0.4634 + 0.6444j) | (−0.0609 − 0.5905j) |
| 779 | (−0.5579 − 0.7479j) | (−0.4634 − 0.6444j) | (−0.0609 − 0.5662j) |
| 780 | (−1.7885 − 0.2939j) | (0.4078 + 0.6678j) | (−0.0609 + 0.4309j) |
| 781 | (−1.3136 − 1.3361j) | (0.4078 − 0.6678j) | (−0.0609 + 0.4375j) |
| 782 | (−1.7635 − 0.4945j) | (−0.4078 + 0.6678j) | (−0.0609 + 0.5905j) |
| 783 | (−1.4937 − 1.1225j) | (−0.4078 − 0.6678j) | (−0.0609 + 0.5676j) |
| 784 | (−0.6267 − 0.1653j) | (0.8177 + 0.448j) | (−0.0609 − 0.1795j) |
| 785 | (−0.5464 − 1.0029j) | (0.8177 − 0.448j) | (−0.0609 − 0.1792j) |
| 786 | (−0.6193 − 0.2836j) | (−0.8177 + 0.448j) | (−0.0609 − 1.0559j) |
| 787 | (−0.5689 − 0.6802j) | (−0.8177 − 0.448j) | (−0.0609 − 0.919j) |
| 788 | (−1.4137 − 0.2389j) | (0.8572 + 0.3768j) | (−0.0609 + 0.1794j) |
| 789 | (−1.0985 − 1.058j) | (0.8572 − 0.3768j) | (−0.0609 + 0.1796j) |
| 790 | (−1.3895 − 0.3958j) | (−0.8572 + 0.3768j) | (−0.0609 + 1.0561j) |
| 791 | (−1.2108 − 0.8839j) | (−0.8572 − 0.3768j) | (−0.0609 + 0.9201j) |
| 792 | (−0.5871 − 0.1654j) | (0.5015 + 0.731j) | (−0.0609 − 0.0609j) |
| 793 | (−0.5561 − 0.8731j) | (0.5015 − 0.731j) | (−0.0609 − 0.0607j) |
| 794 | (−0.5811 − 0.2835j) | (−0.5015 + 0.731j) | (−0.0609 − 1.2271j) |
| 795 | (−0.5589 − 0.7479j) | (−0.5015 − 0.731j) | (−0.0609 − 1.4453j) |
| 796 | (−1.581 − 0.2621j) | (0.4301 + 0.7622j) | (−0.0609 + 0.0601j) |
| 797 | (−1.2327 − 1.1487j) | (0.4301 − 0.7622j) | (−0.0609 + 0.0601j) |
| 798 | (−1.5528 − 0.4392j) | (−0.4301 + 0.7622j) | (−0.0609 + 1.228j) |
| 799 | (−1.3336 − 0.9755j) | (−0.4301 − 0.7622j) | (−0.0609 + 1.4486j) |
| 800 | (−0.6283 − 0.057j) | (0.6917 + 0.4713j) | (−0.0607 − 0.3051j) |
| 801 | (−0.5295 − 1.1829j) | (0.6917 − 0.4713j) | (−0.0607 − 0.3045j) |
| 802 | (−0.6074 − 0.4048j) | (−0.6917 + 0.4713j) | (−0.0607 − 0.7193j) |
| 803 | (−0.583 − 0.5511j) | (−0.6917 − 0.4713j) | (−0.0607 − 0.7851j) |
| 804 | (−1.3003 − 0.0721j) | (0.6571 + 0.5102j) | (−0.0607 + 0.3039j) |
| 805 | (−0.1253 − 1.8671j) | (0.6571 − 0.5102j) | (−0.0607 + 0.3027j) |
| 806 | (−1.2376 − 0.5163j) | (−0.6571 + 0.5102j) | (−0.0607 + 0.7189j) |
| 807 | (−1.1975 − 0.6706j) | (−0.6571 − 0.5102j) | (−0.0607 + 0.7866j) |
| 808 | (−0.5886 − 0.057j) | (0.5438 + 0.5982j) | (−0.0607 − 0.4316j) |
| 809 | (−0.5136 − 1.3286j) | (0.5438 − 0.5982j) | (−0.0607 − 0.4374j) |
| 810 | (−0.5758 − 0.4065j) | (−0.5438 + 0.5982j) | (−0.0607 − 0.5905j) |
| 811 | (−0.5611 − 0.527j) | (−0.5438 − 0.5982j) | (−0.0607 − 0.5662j) |
| 812 | (−1.802 − 0.0992j) | (0.585 + 0.571j) | (−0.0607 + 0.4309j) |
| 813 | (−0.8263 − 1.7115j) | (0.585 − 0.571j) | (−0.0607 + 0.4375j) |
| 814 | (−1.7001 − 0.701j) | (−0.585 + 0.571j) | (−0.0607 + 0.5905j) |
| 815 | (−1.6146 − 0.9089j) | (−0.585 − 0.571j) | (−0.0607 + 0.5676j) |
| 816 | (−0.6294 − 0.0568j) | (0.7628 + 0.5255j) | (−0.0607 − 0.1795j) |
| 817 | (−0.5374 − 1.1319j) | (0.7628 − 0.5255j) | (−0.0607 − 0.1792j) |
| 818 | (−0.6086 − 0.4059j) | (−0.7628 + 0.5255j) | (−0.0607 − 1.0559j) |
| 819 | (−0.5828 − 0.5502j) | (−0.7628 − 0.5255j) | (−0.0607 − 0.919j) |
| 820 | (−1.4203 − 0.0815j) | (0.711 + 0.5843j) | (−0.0607 + 0.1794j) |
| 821 | (−0.3766 − 1.8088j) | (0.711 − 0.5843j) | (−0.0607 + 0.1796j) |
| 822 | (−1.3503 − 0.5573j) | (−0.711 + 0.5843j) | (−0.0607 + 1.0561j) |
| 823 | (−1.2881 − 0.7205j) | (−0.711 − 0.5843j) | (−0.0607 + 0.9201j) |
| 824 | (−0.5888 − 0.0581j) | (0.5802 + 0.6879j) | (−0.0607 − 0.0609j) |
| 825 | (−0.4902 − 1.4819j) | (0.5802 − 0.6879j) | (−0.0607 − 0.0607j) |
| 826 | (−0.5798 − 0.4071j) | (−0.5802 + 0.6879j) | (−0.0607 − 1.2271j) |
| 827 | (−0.565 − 0.5268j) | (−0.5802 − 0.6879j) | (−0.0607 − 1.4453j) |
| 828 | (−1.5922 − 0.0884j) | (0.6418 + 0.6455j) | (−0.0607 + 0.0601j) |
| 829 | (−0.5607 − 1.6779j) | (0.6418 − 0.6455j) | (−0.0607 + 0.0601j) |
| 830 | (−1.5069 − 0.6219j) | (−0.6418 + 0.6455j) | (−0.0607 + 1.228j) |
| 831 | (−1.4334 − 0.8025j) | (−0.6418 − 0.6455j) | (−0.0607 + 1.4486j) |
| 832 | (−0.7537 − 0.1707j) | (0.5574 + 0.2288j) | (−1.2271 − 0.3051j) |
| 833 | (−0.6934 − 1.0026j) | (0.5574 − 0.2288j) | (−1.2271 − 0.3045j) |
| 834 | (−0.7479 − 0.2934j) | (−0.5574 + 0.2288j) | (−1.2271 − 0.7193j) |
| 835 | (−0.6935 − 0.6815j) | (−0.5574 − 0.2288j) | (−1.2271 − 0.7851j) |
| 836 | (−1.1595 − 0.2059j) | (0.5589 + 0.2277j) | (−1.2271 + 0.3039j) |
| 837 | (−0.8948 − 1.0294j) | (0.5589 − 0.2277j) | (−1.2271 + 0.3027j) |
| 838 | (−1.1381 − 0.3446j) | (−0.5589 + 0.2277j) | (−1.2271 + 0.7189j) |
| 839 | (−1.0186 − 0.7744j) | (−0.5589 − 0.2277j) | (−1.2271 + 0.7866j) |
| 840 | (−0.8475 − 0.1783j) | (0.3498 + 0.4641j) | (−1.2271 − 0.4316j) |
| 841 | (−0.7045 − 0.8734j) | (0.3498 − 0.4641j) | (−1.2271 − 0.4374j) |
| 842 | (−0.8329 − 0.3009j) | (−0.3498 + 0.4641j) | (−1.2271 − 0.5905j) |
| 843 | (−0.7305 − 0.7316j) | (−0.3498 − 0.4641j) | (−1.2271 − 0.5662j) |
| 844 | (−0.971 − 0.1881j) | (0.336 + 0.4751j) | (−1.2271 + 0.4309j) |
| 845 | (−0.8488 − 0.8824j) | (0.336 − 0.4751j) | (−1.2271 + 0.4375j) |
| 846 | (−0.9554 − 0.3139j) | (−0.336 + 0.4751j) | (−1.2271 + 0.5905j) |
| 847 | (−0.872 − 0.7431j) | (−0.336 − 0.4751j) | (−1.2271 + 0.5676j) |
| 848 | (−0.7549 − 0.1699j) | (1.4992 + 0.9395j) | (−1.2271 − 0.1795j) |
| 849 | (−0.7024 − 1.0223j) | (1.4992 − 0.9395j) | (−1.2271 − 0.1792j) |
| 850 | (−0.7469 − 0.2895j) | (−1.4992 + 0.9395j) | (−1.2271 − 1.0559j) |
| 851 | (−0.689 − 0.6783j) | (−1.4992 − 0.9395j) | (−1.2271 − 0.919j) |
| 852 | (−1.1088 − 0.1984j) | (1.5913 + 0.785j) | (−1.2271 + 0.1794j) |
| 853 | (−0.8629 − 1.0112j) | (1.5913 − 0.785j) | (−1.2271 + 0.1796j) |
| 854 | (−1.0899 − 0.3349j) | (−1.5913 + 0.785j) | (−1.2271 + 1.0561j) |
| 855 | (−0.9908 − 0.7546j) | (−1.5913 − 0.785j) | (−1.2271 + 0.9201j) |
| 856 | (−0.8433 − 0.1773j) | (0.8423 + 1.5041j) | (−1.2271 − 0.0609j) |
| 857 | (−0.7058 − 0.8765j) | (0.8423 − 1.5041j) | (−1.2271 − 0.0607j) |
| 858 | (−0.8266 − 0.2979j) | (−0.8423 + 1.5041j) | (−1.2271 − 1.2271j) |
| 859 | (−0.73 − 0.7316j) | (−0.8423 − 1.5041j) | (−1.2271 − 1.4453j) |
| 860 | (−0.9927 − 0.1926j) | (0.6877 + 1.567j) | (−1.2271 + 0.0601j) |
| 861 | (−0.84 − 0.8821j) | (0.6877 − 1.567j) | (−1.2271 + 0.0601j) |
| 862 | (−0.9678 − 0.3174j) | (−0.6877 + 1.567j) | (−1.2271 + 1.228j) |
| 863 | (−0.8811 − 0.7424j) | (−0.6877 − 1.567j) | (−1.2271 + 1.4486j) |
| 864 | (−0.7615 − 0.0593j) | (0.5019 + 0.2772j) | (−1.4453 − 0.3051j) |
| 865 | (−0.7113 − 1.2017j) | (0.5019 − 0.2772j) | (−1.4453 − 0.3045j) |
| 866 | (−0.7358 − 0.4169j) | (−0.5019 + 0.2772j) | (−1.4453 − 0.7193j) |
| 867 | (−0.7111 − 0.5569j) | (−0.5019 − 0.2772j) | (−1.4453 − 0.7851j) |
| 868 | (−1.1714 − 0.0711j) | (0.5006 + 0.2783j) | (−1.4453 + 0.3039j) |
| 869 | (−0.8677 − 1.2003j) | (0.5006 − 0.2783j) | (−1.4453 + 0.3027j) |
| 870 | (−1.1082 − 0.4852j) | (−0.5006 + 0.2783j) | (−1.4453 + 0.7189j) |
| 871 | (−1.0697 − 0.6262j) | (−0.5006 − 0.2783j) | (−1.4453 + 0.7866j) |
| 872 | (−0.849 − 0.0622j) | (0.4263 + 0.391j) | (−1.4453 − 0.4316j) |
| 873 | (−0.6719 − 1.3322j) | (0.4263 − 0.391j) | (−1.4453 − 0.4374j) |
| 874 | (−0.8073 − 0.4268j) | (−0.4263 + 0.391j) | (−1.4453 − 0.5905j) |
| 875 | (−0.785 − 0.5627j) | (−0.4263 − 0.391j) | (−1.4453 − 0.5662j) |
| 876 | (−0.9819 − 0.0652j) | (0.4317 + 0.3838j) | (−1.4453 + 0.4309j) |
| 877 | (−1.082 − 1.5252j) | (0.4317 − 0.3838j) | (−1.4453 + 0.4375j) |
| 878 | (−0.9394 − 0.449j) | (−0.4317 + 0.3838j) | (−1.4453 + 0.5905j) |
| 879 | (−0.907 − 0.5883j) | (−0.4317 − 0.3838j) | (−1.4453 + 0.5676j) |
| 880 | (−0.759 − 0.0587j) | (1.3915 + 1.0821j) | (−1.4453 − 0.1795j) |
| 881 | (−0.6864 − 1.1427j) | (1.3915 − 1.0821j) | (−1.4453 − 0.1792j) |
| 882 | (−0.7315 − 0.4169j) | (−1.3915 + 1.0821j) | (−1.4453 − 1.0559j) |
| 883 | (−0.709 − 0.5576j) | (−1.3915 − 1.0821j) | (−1.4453 − 0.919j) |
| 884 | (−1.1186 − 0.0679j) | (1.2693 + 1.2108j) | (−1.4453 + 0.1794j) |
| 885 | (−0.9889 − 1.2742j) | (1.2693 − 1.2108j) | (−1.4453 + 0.1796j) |
| 886 | (−1.0622 − 0.4685j) | (−1.2693 + 1.2108j) | (−1.4453 + 1.0561j) |
| 887 | (−1.0334 − 0.6182j) | (−1.2693 − 1.2108j) | (−1.4453 + 0.9201j) |
| 888 | (−0.8496 − 0.0607j) | (0.9921 + 1.4233j) | (−1.4453 − 0.0609j) |
| 889 | (−0.6982 − 1.4703j) | (0.9921 − 1.4233j) | (−1.4453 − 0.0607j) |
| 890 | (−0.8022 − 0.4245j) | (−0.9921 + 1.4233j) | (−1.4453 − 1.2271j) |
| 891 | (−0.7856 − 0.563j) | (−0.9921 − 1.4233j) | (−1.4453 − 1.4453j) |
| 892 | (−0.997 − 0.0646j) | (1.1356 + 1.3257j) | (−1.4453 + 0.0601j) |
| 893 | (−0.8802 − 1.4371j) | (1.1356 − 1.3257j) | (−1.4453 + 0.0601j) |
| 894 | (−0.9454 − 0.4482j) | (−1.1356 + 1.3257j) | (−1.4453 + 1.228j) |
| 895 | (−0.9139 − 0.5896j) | (−1.1356 − 1.3257j) | (−1.4453 + 1.4486j) |
| 896 | (0.6243 − 0.165j) | (0.6883 + 0.3373j) | (0.0601 − 0.3051j) |
| 897 | (0.5469 − 0.985j) | (0.6883 − 0.3373j) | (0.0601 − 0.3045j) |
| 898 | (0.6164 − 0.2812j) | (−0.6883 + 0.3373j) | (0.0601 − 0.7193j) |
| 899 | (0.567 − 0.6809j) | (−0.6883 − 0.3373j) | (0.0601 − 0.7851j) |
| 900 | (1.2933 − 0.2212j) | (0.7047 + 0.3065j) | (0.0601 + 0.3039j) |
| 901 | (1.0332 − 0.9826j) | (0.7047 − 0.3065j) | (0.0601 + 0.3027j) |
| 902 | (1.2676 − 0.367j) | (−0.7047 + 0.3065j) | (0.0601 + 0.7189j) |
| 903 | (1.1144 − 0.843j) | (−0.7047 − 0.3065j) | (0.0601 + 0.7866j) |
| 904 | (0.5868 − 0.1642j) | (0.4317 + 0.5823j) | (0.0601 − 0.4316j) |
| 905 | (0.5543 − 0.8737j) | (0.4317 − 0.5823j) | (0.0601 − 0.4374j) |
| 906 | (0.5826 − 0.2806j) | (−0.4317 + 0.5823j) | (0.0601 − 0.5905j) |
| 907 | (0.559 − 0.7455j) | (−0.4317 − 0.5823j) | (0.0601 − 0.5662j) |
| 908 | (1.7864 − 0.2288j) | (0.3919 + 0.607j) | (0.0601 + 0.4309j) |
| 909 | (1.3108 − 1.3372j) | (0.3919 − 0.607j) | (0.0601 + 0.4375j) |
| 910 | (1.7507 − 0.4867j) | (−0.3919 + 0.607j) | (0.0601 + 0.5905j) |
| 911 | (1.4991 − 1.1213j) | (−0.3919 − 0.607j) | (0.0601 + 0.5676j) |
| 912 | (0.6234 − 0.165j) | (0.8852 + 0.4995j) | (0.0601 − 0.1795j) |
| 913 | (0.547 − 1.0016j) | (0.8852 − 0.4995j) | (0.0601 − 0.1792j) |
| 914 | (0.6178 − 0.2811j) | (−0.8852 + 0.4995j) | (0.0601 − 1.0559j) |
| 915 | (0.567 − 0.6783j) | (−0.8852 − 0.4995j) | (0.0601 − 0.919j) |
| 916 | (1.412 − 0.2345j) | (0.9323 + 0.4173j) | (0.0601 + 0.1794j) |
| 917 | (1.0937 − 1.0549j) | (0.9323 − 0.4173j) | (0.0601 + 0.1796j) |
| 918 | (1.3864 − 0.3933j) | (−0.9323 + 0.4173j) | (0.0601 + 1.0561j) |
| 919 | (1.2033 − 0.8786j) | (−0.9323 − 0.4173j) | (0.0601 + 0.9201j) |

-continued

| Mapping | NN_QSL | NN_QSC | NN_RSC |
|---|---|---|---|
| 920 | (0.5885 − 0.1642j) | (0.5331 + 0.8095j) | (0.0601 − 0.0609j) |
| 921 | (0.5545 − 0.8725j) | (0.5331 − 0.8095j) | (0.0601 − 0.0607j) |
| 922 | (0.5815 − 0.2807j) | (−0.5331 + 0.8095j) | (0.0601 − 1.2271j) |
| 923 | (0.5548 − 0.7451j) | (−0.5331 − 0.8095j) | (0.0601 − 1.4453j) |
| 924 | (1.5774 − 0.2573j) | (0.4495 + 0.8419j) | (0.0601 + 0.0601j) |
| 925 | (1.2284 − 1.1433j) | (0.4495 − 0.8419j) | (0.0601 + 0.0601j) |
| 926 | (1.5511 − 0.4361j) | (−0.4495 + 0.8419j) | (0.0601 + 1.228j) |
| 927 | (1.3354 − 0.9773j) | (−0.4495 − 0.8419j) | (0.0601 + 1.4486j) |
| 928 | (0.6283 − 0.0558j) | (0.6247 + 0.4193j) | (0.0601 − 0.3051j) |
| 929 | (0.5291 − 1.1819j) | (0.6247 − 0.4193j) | (0.0601 − 0.3045j) |
| 930 | (0.6051 − 0.402j) | (−0.6247 + 0.4193j) | (0.0601 − 0.7193j) |
| 931 | (0.5814 − 0.5448j) | (−0.6247 − 0.4193j) | (0.0601 − 0.7851j) |
| 932 | (1.2999 − 0.0712j) | (0.6061 + 0.4389j) | (0.0601 + 0.3039j) |
| 933 | (0.1369 − 1.8677j) | (0.6061 − 0.4389j) | (0.0601 + 0.3027j) |
| 934 | (1.2418 − 0.516j) | (−0.6061 + 0.4389j) | (0.0601 + 0.7189j) |
| 935 | (1.1902 − 0.6679j) | (−0.6061 − 0.4389j) | (0.0601 + 0.7866j) |
| 936 | (0.5873 − 0.0559j) | (0.511 + 0.5228j) | (0.0601 − 0.4316j) |
| 937 | (0.5173 − 1.3265j) | (0.511 − 0.5228j) | (0.0601 − 0.4374j) |
| 938 | (0.5751 − 0.4014j) | (−0.511 + 0.5228j) | (0.0601 − 0.5905j) |
| 939 | (0.5636 − 0.528j) | (−0.511 − 0.5228j) | (0.0601 − 0.5662j) |
| 940 | (1.7981 − 0.093j) | (0.5344 + 0.505j) | (0.0601 − 0.4309j) |
| 941 | (0.8308 − 1.7184j) | (0.5344 − 0.505j) | (0.0601 + 0.4375j) |
| 942 | (1.7005 − 0.6966j) | (−0.5344 + 0.505j) | (0.0601 + 0.5905j) |
| 943 | (1.6087 − 0.9062j) | (−0.5344 − 0.505j) | (0.0601 + 0.5676j) |
| 944 | (0.6268 − 0.0558j) | (0.8281 + 0.5806j) | (0.0601 − 0.1795j) |
| 945 | (0.5414 − 1.1347j) | (0.8281 − 0.5806j) | (0.0601 − 0.1792j) |
| 946 | (0.6059 − 0.4021j) | (−0.8281 + 0.5806j) | (0.0601 − 1.0559j) |
| 947 | (0.5805 − 0.547j) | (−0.8281 − 0.5806j) | (0.0601 − 0.919j) |
| 948 | (1.4178 − 0.0771j) | (0.7656 + 0.6506j) | (0.0601 − 0.1794j) |
| 949 | (0.3826 − 1.813j) | (0.7656 − 0.6506j) | (0.0601 + 0.1796j) |
| 950 | (1.3484 − 0.5553j) | (−0.7656 + 0.6506j) | (0.0601 + 1.0561j) |
| 951 | (1.2836 − 0.7204j) | (−0.7656 − 0.6506j) | (0.0601 + 0.9201j) |
| 952 | (0.5857 − 0.055j) | (0.6173 + 0.7664j) | (0.0601 − 0.0609j) |
| 953 | (0.4961 − 1.4846j) | (0.6173 − 0.7664j) | (0.0601 − 0.0607j) |
| 954 | (0.5773 − 0.4005j) | (−0.6173 + 0.7664j) | (0.0601 − 1.2271j) |
| 955 | (0.5643 − 0.5263j) | (−0.6173 − 0.7664j) | (0.0601 − 1.4453j) |
| 956 | (1.5788 − 0.0837j) | (0.6923 + 0.7149j) | (0.0601 + 0.0601j) |
| 957 | (0.5694 − 1.686j) | (0.6923 − 0.7149j) | (0.0601 + 0.0601j) |
| 958 | (1.4996 − 0.6152j) | (−0.6923 + 0.7149j) | (0.0601 + 1.228j) |
| 959 | (1.4303 − 0.8j) | (−0.6923 − 0.7149j) | (0.0601 + 1.4486j) |
| 960 | (0.7516 − 0.1684j) | (0.6194 + 0.279j) | (1.228 − 0.3051j) |
| 961 | (0.6934 − 0.9988j) | (0.6194 − 0.279j) | (1.228 − 0.3045j) |
| 962 | (0.7419 − 0.2872j) | (−0.6194 + 0.279j) | (1.228 − 0.7193j) |
| 963 | (0.6901 − 0.6786j) | (−0.6194 − 0.279j) | (1.228 − 0.7851j) |
| 964 | (1.1588 − 0.2042j) | (0.6253 + 0.2698j) | (1.228 + 0.3039j) |
| 965 | (0.9018 − 1.0284j) | (0.6253 − 0.2698j) | (1.228 + 0.3027j) |
| 966 | (1.135 − 0.3413j) | (−0.6253 + 0.2698j) | (1.228 + 0.7189j) |
| 967 | (1.0117 − 0.7674j) | (−0.6253 − 0.2698j) | (1.228 + 0.7866j) |
| 968 | (0.8433 − 0.1752j) | (0.3796 + 0.5044j) | (1.228 − 0.4316j) |
| 969 | (0.7021 − 0.8721j) | (0.3796 − 0.5044j) | (1.228 − 0.4374j) |
| 970 | (0.8268 − 0.2959j) | (−0.3796 + 0.5044j) | (1.228 − 0.5905j) |
| 971 | (0.7323 − 0.7298j) | (−0.3796 − 0.5044j) | (1.228 − 0.5662j) |
| 972 | (0.9716 − 0.1854j) | (0.3557 + 0.5188j) | (1.228 + 0.4309j) |
| 973 | (0.8465 − 0.8771j) | (0.3557 − 0.5188j) | (1.228 + 0.4375j) |
| 974 | (0.9546 − 0.3122j) | (−0.3557 + 0.5188j) | (1.228 + 0.5905j) |
| 975 | (0.8752 − 0.7432j) | (−0.3557 − 0.5188j) | (1.228 + 0.5676j) |
| 976 | (0.7521 − 0.1687j) | (1.3509 + 0.837j) | (1.228 − 0.1795j) |
| 977 | (0.6996 − 1.0164j) | (1.3509 − 0.837j) | (1.228 − 0.1792j) |
| 978 | (0.7454 − 0.2889j) | (−1.3509 + 0.837j) | (1.228 − 1.0559j) |
| 979 | (0.6881 − 0.6803j) | (−1.3509 − 0.837j) | (1.228 − 0.919j) |
| 980 | (1.1025 − 0.1974j) | (1.4337 + 0.6993j) | (1.228 + 0.1794j) |
| 981 | (0.8613 − 1.0075j) | (1.4337 − 0.6993j) | (1.228 + 0.1796j) |
| 982 | (1.0905 − 0.333j) | (−1.4337 + 0.6993j) | (1.228 + 1.0561j) |
| 983 | (0.9886 − 0.7498j) | (−1.4337 − 0.6993j) | (1.228 + 0.9201j) |
| 984 | (0.844 − 0.1753j) | (0.7641 + 1.3398j) | (1.228 − 0.0609j) |
| 985 | (0.7042 − 0.8704j) | (0.7641 − 1.3398j) | (1.228 − 0.0607j) |
| 986 | (0.8241 − 0.2959j) | (−0.7641 + 1.3398j) | (1.228 − 1.2271j) |
| 987 | (0.7293 − 0.7284j) | (−0.7641 − 1.3398j) | (1.228 − 1.4453j) |
| 988 | (0.9853 − 0.1875j) | (0.6248 + 1.3957j) | (1.228 + 0.0601j) |
| 989 | (0.8402 − 0.8791j) | (0.6248 − 1.3957j) | (1.228 + 0.0601j) |
| 990 | (0.9675 − 0.3141j) | (−0.6248 + 1.3957j) | (1.228 + 1.228j) |
| 991 | (0.8821 − 0.7432j) | (−0.6248 − 1.3957j) | (1.228 + 1.4486j) |
| 992 | (0.758 − 0.0568j) | (0.555 + 0.3523j) | (1.4486 − 0.3051j) |
| 993 | (0.7116 − 1.1997j) | (0.555 − 0.3523j) | (1.4486 − 0.3045j) |
| 994 | (0.7289 − 0.4142j) | (−0.555 + 0.3523j) | (1.4486 − 0.7193j) |
| 995 | (0.7109 − 0.5574j) | (−0.555 − 0.3523j) | (1.4486 − 0.7851j) |
| 996 | (1.1685 − 0.0674j) | (0.5483 + 0.357j) | (1.4486 + 0.3039j) |
| 997 | (0.8699 − 1.1981j) | (0.5483 − 0.357j) | (1.4486 + 0.3027j) |
| 998 | (1.1063 − 0.4788j) | (−0.5483 + 0.357j) | (1.4486 + 0.7189j) |
| 999 | (1.0665 − 0.6214j) | (−0.5483 − 0.357j) | (1.4486 + 0.7866j) |
| 1000 | (0.8509 − 0.0599j) | (0.4626 + 0.4325j) | (1.4486 − 0.4316j) |
| 1001 | (0.6789 − 1.3376j) | (0.4626 − 0.4325j) | (1.4486 − 0.4374j) |
| 1002 | (0.8082 − 0.4231j) | (−0.4626 + 0.4325j) | (1.4486 − 0.5905j) |
| 1003 | (0.7847 − 0.5571j) | (−0.4626 − 0.4325j) | (1.4486 − 0.5662j) |
| 1004 | (0.9808 − 0.0636j) | (0.4723 + 0.4235j) | (1.4486 + 0.4309j) |
| 1005 | (1.0845 − 1.525j) | (0.4723 − 0.4235j) | (1.4486 + 0.4375j) |
| 1006 | (0.935 − 0.4441j) | (−0.4723 + 0.4235j) | (1.4486 + 0.5905j) |
| 1007 | (0.9018 − 0.5822j) | (−0.4723 − 0.4235j) | (1.4486 + 0.5676j) |
| 1008 | (0.7563 − 0.0541j) | (1.2548 + 0.9637j) | (1.4486 − 0.1795j) |
| 1009 | (0.6846 − 1.137j) | (1.2548 − 0.9637j) | (1.4486 − 0.1792j) |
| 1010 | (0.732 − 0.4142j) | (−1.2548 + 0.9637j) | (1.4486 − 1.0559j) |
| 1011 | (0.7126 − 0.5538j) | (−1.2548 − 0.9637j) | (1.4486 − 0.919j) |
| 1012 | (1.1128 − 0.0658j) | (1.1465 + 1.0787j) | (1.4486 + 0.1794j) |
| 1013 | (0.9928 − 1.2762j) | (1.1465 − 1.0787j) | (1.4486 + 0.1796j) |
| 1014 | (1.0595 − 0.4669j) | (−1.1465 + 1.0787j) | (1.4486 + 1.0561j) |
| 1015 | (1.0277 − 0.6118j) | (−1.1465 − 1.0787j) | (1.4486 + 0.9201j) |
| 1016 | (0.8491 − 0.0588j) | (0.8992 + 1.2679j) | (1.4486 − 0.0609j) |
| 1017 | (0.6995 − 1.4755j) | (0.8992 − 1.2679j) | (1.4486 − 0.0607j) |
| 1018 | (0.8088 − 0.4246j) | (−0.8992 + 1.2679j) | (1.4486 − 1.2271j) |
| 1019 | (0.7788 − 0.5561j) | (−0.8992 − 1.2679j) | (1.4486 − 1.4453j) |
| 1020 | (0.9928 − 0.062j) | (1.0275 + 1.1809j) | (1.4486 + 0.0601j) |
| 1021 | (0.881 − 1.4348j) | (1.0275 − 1.1809j) | (1.4486 + 0.0601j) |
| 1022 | (0.9463 − 0.4454j) | (−1.0275 + 1.1809j) | (1.4486 + 1.228j) |
| 1023 | (0.9131 − 0.5855j) | (−1.0275 − 1.1809j) | (1.4486 + 1.4486j). |

6. The method of claim 2, wherein the mapping is, for one of a neural network subject to the QSL constraint (NN_QSL), a neural network subject to the QSC constraint (NN_QSC), or a neural network subject to the RSC constraint (NN RSC), according to:

| Mapping | NN_QSL | NN_QSC | NN_RSC |
|---|---|---|---|
| 0 | (0.0905 + 0.6153j) | (0.0412 + 0.8491j) | (1.0626 + 1.0626j) |
| 1 | (0.0726 + 0.5304j) | (0.0412 − 0.8491j) | (1.0626 − 0.3591j) |
| 2 | (−0.087 + 0.6142j) | (−0.0412 + 0.8491j) | (1.0626 + 1.1878j) |
| 3 | (−0.0705 + 0.5308j) | (−0.0412 − 0.8491j) | (1.0626 − 0.4301j) |
| 4 | (0.1512 + 0.6093j) | (0.2881 + 0.81j) | (1.0626 − 1.058j) |
| 5 | (0.1337 + 0.5247j) | (0.2881 − 0.81j) | (1.0626 − 0.7494j) |
| 6 | (−0.1463 + 0.6076j) | (−0.2881 + 0.81j) | (1.0626 − 1.1847j) |
| 7 | (−0.1323 + 0.5167j) | (−0.2881 − 0.81j) | (1.0626 − 0.6628j) |
| 8 | (0.1277 + 0.8468j) | (0.124 + 0.8429j) | (1.0626 + 0.7523j) |
| 9 | (0.03 + 0.2228j) | (0.124 − 0.8429j) | (1.0626 − 0.1607j) |
| 10 | (−0.1212 + 0.8513j) | (−0.124 + 0.8429j) | (1.0626 + 0.6629j) |
| 11 | (−0.0377 + 0.2278j) | (−0.124 − 0.8429j) | (1.0626 − 0.0944j) |
| 12 | (0.2087 + 0.8286j) | (0.2064 + 0.8301j) | (1.0626 + 0.3594j) |
| 13 | (0.0751 + 0.2278j) | (0.2064 − 0.8301j) | (1.0626 + 0.1597j) |
| 14 | (−0.2038 + 0.8338j) | (−0.2064 + 0.8301j) | (1.0626 + 0.4297j) |
| 15 | (−0.0805 + 0.2288j) | (−0.2064 − 0.8301j) | (1.0626 + 0.0937j) |

-continued

| Mapping | NN_QSL | NN_QSC | NN_RSC |
|---|---|---|---|
| 16 | (0.0329 + 0.6239j) | (0.0382 + 0.7703j) | (1.0626 + 0.9504j) |
| 17 | (0.0283 + 0.5464j) | (0.0382 − 0.7703j) | (1.0626 − 0.2918j) |
| 18 | (−0.0299 + 0.6233j) | (−0.0382 + 0.7703j) | (1.0626 + 1.3347j) |
| 19 | (−0.0246 + 0.5492j) | (−0.0382 − 0.7703j) | (1.0626 − 0.503j) |
| 20 | (0.2038 + 0.5925j) | (0.2647 + 0.7371j) | (1.0626 − 0.946j) |
| 21 | (0.1759 + 0.5208j) | (0.2647 − 0.7371j) | (1.0626 − 0.8449j) |
| 22 | (−0.2034 + 0.5935j) | (−0.2647 + 0.7371j) | (1.0626 − 1.331j) |
| 23 | (−0.1799 + 0.516j) | (−0.2647 − 0.7371j) | (1.0626 − 0.5804j) |
| 24 | (0.0438 + 0.8551j) | (0.1142 + 0.7653j) | (1.0626 + 0.8462j) |
| 25 | (0.0256 + 0.1565j) | (0.1142 − 0.7653j) | (1.0626 − 0.2242j) |
| 26 | (−0.0406 + 0.8549j) | (−0.1142 + 0.7653j) | (1.0626 + 0.5805j) |
| 27 | (−0.0358 + 0.1574j) | (−0.1142 − 0.7653j) | (1.0626 − 0.0332j) |
| 28 | (0.2873 + 0.8036j) | (0.1901 + 0.7546j) | (1.0626 + 0.2916j) |
| 29 | (0.0278 + 0.1041j) | (0.1901 − 0.7546j) | (1.0626 − 0.2239j) |
| 30 | (−0.283 + 0.8097j) | (−0.1901 + 0.7546j) | (1.0626 + 0.5035j) |
| 31 | (−0.0364 + 0.1031j) | (−0.1901 − 0.7546j) | (1.0626 + 0.0328j) |
| 32 | (0.0851 − 0.6146j) | (0.0335 + 0.6142j) | (−0.3591 + 1.0626j) |
| 33 | (0.0647 − 0.5301j) | (0.0335 − 0.6142j) | (−0.3591 − 0.3591j) |
| 34 | (−0.0932 − 0.6134j) | (−0.0335 + 0.6142j) | (−0.3591 + 1.1878j) |
| 35 | (−0.0764 − 0.5278j) | (−0.0335 − 0.6142j) | (−0.3591 − 0.4301j) |
| 36 | (0.1436 − 0.6061j) | (0.2243 + 0.5872j) | (−0.3591 − 1.058j) |
| 37 | (0.1253 − 0.5197j) | (0.2243 − 0.5872j) | (−0.3591 − 0.7494j) |
| 38 | (−0.1581 − 0.6059j) | (−0.2243 + 0.5872j) | (−0.3591 − 1.1847j) |
| 39 | (−0.1414 − 0.5141j) | (−0.2243 − 0.5872j) | (−0.3591 − 0.6628j) |
| 40 | (0.1171 − 0.8463j) | (0.0983 + 0.6107j) | (−0.3591 − 0.7523j) |
| 41 | (0.0244 − 0.2175j) | (0.0983 − 0.6107j) | (−0.3591 − 0.1607j) |
| 42 | (−0.1323 − 0.8443j) | (−0.0983 + 0.6107j) | (−0.3591 + 0.6629j) |
| 43 | (−0.0377 − 0.2194j) | (−0.0983 − 0.6107j) | (−0.3591 − 0.0944j) |
| 44 | (0.1984 − 0.8274j) | (0.162 + 0.6012j) | (−0.3591 + 0.3594j) |
| 45 | (0.0741 − 0.2254j) | (0.162 − 0.6012j) | (−0.3591 + 0.1597j) |
| 46 | (−0.2126 − 0.8267j) | (−0.162 + 0.6012j) | (−0.3591 + 0.4297j) |
| 47 | (−0.0802 − 0.2244j) | (−0.162 − 0.6012j) | (−0.3591 + 0.0937j) |
| 48 | (0.0258 − 0.621j) | (0.0352 + 0.6922j) | (−0.3591 + 0.9504j) |
| 49 | (0.0226 − 0.5432j) | (0.0352 − 0.6922j) | (−0.3591 − 0.2918j) |
| 50 | (−0.039 − 0.6218j) | (−0.0352 + 0.6922j) | (−0.3591 + 1.3347j) |
| 51 | (−0.034 − 0.544j) | (−0.0352 − 0.6922j) | (−0.3591 − 0.503j) |
| 52 | (0.1967 − 0.5901j) | (0.2428 + 0.6632j) | (−0.3591 − 0.946j) |
| 53 | (0.172 − 0.5162j) | (0.2428 − 0.6632j) | (−0.3591 − 0.8449j) |
| 54 | (−0.2091 − 0.5878j) | (−0.2428 + 0.6632j) | (−0.3591 − 1.331j) |
| 55 | (−0.1838 − 0.518j) | (−0.2428 − 0.6632j) | (−0.3591 − 0.5804j) |
| 56 | (0.0358 − 0.8517j) | (0.1057 + 0.6878j) | (−0.3591 + 0.8462j) |
| 57 | (0.0265 − 0.1552j) | (0.1057 − 0.6878j) | (−0.3591 − 0.2242j) |
| 58 | (−0.052 − 0.8529j) | (−0.1057 + 0.6878j) | (−0.3591 + 0.5805j) |
| 59 | (−0.0294 − 0.1497j) | (−0.1057 − 0.6878j) | (−0.3591 − 0.0332j) |
| 60 | (0.2811 − 0.799j) | (0.1754 + 0.6784j) | (−0.3591 + 0.2916j) |
| 61 | (0.0225 − 0.1034j) | (0.1754 − 0.6784j) | (−0.3591 − 0.2239j) |
| 62 | (−0.2913 − 0.8052j) | (−0.1754 + 0.6784j) | (−0.3591 + 0.5035j) |
| 63 | (−0.0353 − 0.1029j) | (−0.1754 − 0.6784j) | (−0.3591 + 0.0328j) |
| 64 | (0.6232 + 0.0923j) | (0.8497 + 0.0412j) | (1.1878 + 1.0626j) |
| 65 | (0.5459 + 0.0722j) | (0.8497 − 0.0412j) | (1.1878 − 0.3591j) |
| 66 | (−0.6279 + 0.0985j) | (−0.8497 + 0.0412j) | (1.1878 + 1.1878j) |
| 67 | (−0.5475 + 0.0765j) | (−0.8497 − 0.0412j) | (1.1878 − 0.4301j) |
| 68 | (0.6112 + 0.1529j) | (0.8102 + 0.2874j) | (1.1878 − 1.058j) |
| 69 | (0.5327 + 0.1345j) | (0.8102 − 0.2874j) | (1.1878 − 0.7494j) |
| 70 | (−0.6161 + 0.1549j) | (−0.8102 + 0.2874j) | (1.1878 − 1.1847j) |
| 71 | (−0.5353 + 0.1413j) | (−0.8102 − 0.2874j) | (1.1878 − 0.6628j) |
| 72 | (0.8437 + 0.1242j) | (0.8436 + 0.1238j) | (1.1878 − 0.7523j) |
| 73 | (0.2464 + 0.0312j) | (0.8436 − 0.1238j) | (1.1878 − 0.1607j) |
| 74 | (−0.8508 + 0.1338j) | (−0.8436 + 0.1238j) | (1.1878 + 0.6629j) |
| 75 | (−0.2532 + 0.0313j) | (−0.8436 − 0.1238j) | (1.1878 − 0.0944j) |
| 76 | (0.8236 + 0.2067j) | (0.8306 + 0.2059j) | (1.1878 + 0.3594j) |
| 77 | (0.2607 + 0.0719j) | (0.8306 − 0.2059j) | (1.1878 + 0.1597j) |
| 78 | (−0.8333 + 0.2169j) | (−0.8306 + 0.2059j) | (1.1878 + 0.4297j) |
| 79 | (−0.2658 + 0.0741j) | (−0.8306 − 0.2059j) | (1.1878 + 0.0937j) |
| 80 | (0.6317 + 0.0305j) | (0.771 + 0.0382j) | (1.1878 + 0.9504j) |
| 81 | (0.5553 + 0.0285j) | (0.771 − 0.0382j) | (1.1878 − 0.2918j) |
| 82 | (−0.637 + 0.0371j) | (−0.771 + 0.0382j) | (1.1878 + 1.3347j) |
| 83 | (−0.5621 + 0.0301j) | (−0.771 − 0.0382j) | (1.1878 − 0.503j) |
| 84 | (0.5893 + 0.2067j) | (0.7374 + 0.2643j) | (1.1878 − 0.946j) |
| 85 | (0.5227 + 0.185j) | (0.7374 − 0.2643j) | (1.1878 − 0.8449j) |
| 86 | (−0.5955 + 0.2141j) | (−0.7374 + 0.2643j) | (1.1878 − 1.331j) |
| 87 | (−0.5257 + 0.19j) | (−0.7374 − 0.2643j) | (1.1878 − 0.5804j) |
| 88 | (0.852 + 0.0424j) | (0.7656 + 0.1141j) | (1.1878 + 0.8462j) |
| 89 | (0.1783 + 0.0292j) | (0.7656 − 0.1141j) | (1.1878 − 0.2242j) |
| 90 | (−0.8597 + 0.0457j) | (−0.7656 + 0.1141j) | (1.1878 + 0.5805j) |
| 91 | (−0.1895 + 0.0298j) | (−0.7656 − 0.1141j) | (1.1878 − 0.0332j) |
| 92 | (0.7982 + 0.2906j) | (0.7545 + 0.1894j) | (1.1878 + 0.2916j) |

-continued

| Mapping | NN_QSL | NN_QSC | NN_RSC |
|---|---|---|---|
| 93 | (0.0291 + 0.03j) | (0.7545 − 0.1894j) | (1.1878 + 0.2239j) |
| 94 | (−0.8039 + 0.2975j) | (−0.7545 + 0.1894j) | (1.1878 + 0.5035j) |
| 95 | (−0.034 + 0.0331j) | (−0.7545 − 0.1894j) | (1.1878 + 0.0328j) |
| 96 | (0.6194 − 0.0972j) | (0.6147 + 0.0331j) | (−0.4301 + 1.0626j) |
| 97 | (0.5444 − 0.079j) | (0.6147 − 0.0331j) | (−0.4301 − 0.3591j) |
| 98 | (−0.6257 − 0.0906j) | (−0.6147 + 0.0331j) | (−0.4301 + 1.1878j) |
| 99 | (−0.5454 − 0.0701j) | (−0.6147 − 0.0331j) | (−0.4301 − 0.4301j) |
| 100 | (0.6084 − 0.152j) | (0.5872 + 0.2241j) | (−0.4301 − 1.058j) |
| 101 | (0.5262 − 0.1433j) | (0.5872 − 0.2241j) | (−0.4301 − 0.7494j) |
| 102 | (−0.6127 − 0.1516j) | (−0.5872 + 0.2241j) | (−0.4301 − 1.1847j) |
| 103 | (−0.5334 − 0.1337j) | (−0.5872 − 0.2241j) | (−0.4301 − 0.6628j) |
| 104 | (0.8457 − 0.1252j) | (0.6108 + 0.0978j) | (−0.4301 + 0.7523j) |
| 105 | (0.2492 − 0.0318j) | (0.6108 − 0.0978j) | (−0.4301 − 0.1607j) |
| 106 | (−0.8508 − 0.1251j) | (−0.6108 + 0.0978j) | (−0.4301 + 0.6629j) |
| 107 | (−0.2563 − 0.0301j) | (−0.6108 − 0.0978j) | (−0.4301 − 0.0944j) |
| 108 | (0.825 − 0.2124j) | (0.6016 + 0.1618j) | (−0.4301 + 0.3594j) |
| 109 | (0.263 − 0.0742j) | (0.6016 − 0.1618j) | (−0.4301 + 0.1597j) |
| 110 | (−0.8349 − 0.2082j) | (−0.6016 + 0.1618j) | (−0.4301 + 0.4297j) |
| 111 | (−0.2674 − 0.0732j) | (−0.6016 − 0.1618j) | (−0.4301 + 0.0937j) |
| 112 | (0.6291 − 0.0356j) | (0.6928 + 0.0352j) | (−0.4301 + 0.9504j) |
| 113 | (0.5543 − 0.0309j) | (0.6928 − 0.0352j) | (−0.4301 − 0.2918j) |
| 114 | (−0.6409 − 0.0308j) | (−0.6928 + 0.0352j) | (−0.4301 + 1.3347j) |
| 115 | (−0.5606 − 0.0274j) | (−0.6928 − 0.0352j) | (−0.4301 − 0.503j) |
| 116 | (0.5908 − 0.212j) | (0.6636 + 0.2429j) | (−0.4301 − 0.946j) |
| 117 | (0.5167 − 0.191j) | (0.6636 − 0.2429j) | (−0.4301 − 0.8449j) |
| 118 | (−0.5935 − 0.2049j) | (−0.6636 + 0.2429j) | (−0.4301 − 1.331j) |
| 119 | (−0.5246 − 0.1834j) | (−0.6636 − 0.2429j) | (−0.4301 − 0.5804j) |
| 120 | (0.8559 − 0.0494j) | (0.6879 + 0.1053j) | (−0.4301 + 0.8462j) |
| 121 | (0.1776 − 0.0275j) | (0.6879 − 0.1053j) | (−0.4301 − 0.2242j) |
| 122 | (−0.8623 − 0.0413j) | (−0.6879 + 0.1053j) | (−0.4301 + 0.5805j) |
| 123 | (−0.1851 − 0.0237j) | (−0.6879 − 0.1053j) | (−0.4301 − 0.0332j) |
| 124 | (0.7951 − 0.2921j) | (0.6786 + 0.1752j) | (−0.4301 + 0.2916j) |
| 125 | (0.0264 − 0.0314j) | (0.6786 − 0.1752j) | (−0.4301 + 0.2239j) |
| 126 | (−0.808 − 0.2898j) | (−0.6786 + 0.1752j) | (−0.4301 + 0.5035j) |
| 127 | (−0.0306 − 0.0312j) | (−0.6786 − 0.1752j) | (−0.4301 + 0.0328j) |
| 128 | (0.3676 + 0.5027j) | (0.045 + 0.9288j) | (−1.058 + 1.0626j) |
| 129 | (0.3226 + 0.4348j) | (0.045 − 0.9288j) | (−1.058 − 0.3591j) |
| 130 | (−0.3679 + 0.509j) | (−0.045 + 0.9288j) | (−1.058 + 1.1878j) |
| 131 | (−0.3184 + 0.44j) | (−0.045 − 0.9288j) | (−1.058 − 0.4301j) |
| 132 | (0.317 + 0.537j) | (0.3128 + 0.884j) | (−1.058 − 1.058j) |
| 133 | (0.2673 + 0.4727j) | (0.3128 − 0.884j) | (−1.058 − 0.7494j) |
| 134 | (−0.3152 + 0.5441j) | (−0.3128 + 0.884j) | (−1.058 − 1.1847j) |
| 135 | (−0.2634 + 0.4732j) | (−0.3128 − 0.884j) | (−1.058 − 0.6628j) |
| 136 | (0.506 + 0.6853j) | (0.1346 + 0.9215j) | (−1.058 + 0.7523j) |
| 137 | (0.1572 + 0.1746j) | (0.1346 − 0.9215j) | (−1.058 − 0.1607j) |
| 138 | (−0.5018 + 0.691j) | (−0.1346 + 0.9215j) | (−1.058 + 0.6629j) |
| 139 | (−0.1603 + 0.1732j) | (−0.1346 − 0.9215j) | (−1.058 − 0.0944j) |
| 140 | (0.4358 + 0.7315j) | (0.2242 + 0.9064j) | (−1.058 + 0.3594j) |
| 141 | (0.1294 + 0.2023j) | (0.2242 − 0.9064j) | (−1.058 + 0.1597j) |
| 142 | (−0.4324 + 0.7385j) | (−0.2242 + 0.9064j) | (−1.058 + 0.4297j) |
| 143 | (−0.1329 + 0.2047j) | (−0.2242 − 0.9064j) | (−1.058 + 0.0937j) |
| 144 | (0.4152 + 0.4649j) | (0.0488 + 1.0102j) | (−1.058 + 0.9504j) |
| 145 | (0.3631 + 0.4052j) | (0.0488 − 1.0102j) | (−1.058 − 0.2918j) |
| 146 | (−0.4097 + 0.467j) | (−0.0488 + 1.0102j) | (−1.058 + 1.3347j) |
| 147 | (−0.3601 + 0.4096j) | (−0.0488 − 1.0102j) | (−1.058 − 0.503j) |
| 148 | (0.2622 + 0.5707j) | (0.3391 + 0.9595j) | (−1.058 − 0.946j) |
| 149 | (0.2322 + 0.5018j) | (0.3391 − 0.9595j) | (−1.058 − 0.8449j) |
| 150 | (−0.2606 + 0.5676j) | (−0.3391 + 0.9595j) | (−1.058 − 1.331j) |
| 151 | (−0.2348 + 0.4978j) | (−0.3391 − 0.9595j) | (−1.058 − 0.5804j) |
| 152 | (0.5726 + 0.6333j) | (0.1466 + 1.0017j) | (−1.058 + 0.8462j) |
| 153 | (0.1106 + 0.1198j) | (0.1466 − 1.0017j) | (−1.058 − 0.2242j) |
| 154 | (−0.5682 + 0.6409j) | (−0.1466 + 1.0017j) | (−1.058 + 0.5805j) |
| 155 | (−0.1178 + 0.1189j) | (−0.1466 − 1.0017j) | (−1.058 − 0.0332j) |
| 156 | (0.363 + 0.7757j) | (0.2434 + 0.9852j) | (−1.058 + 0.2916j) |
| 157 | (0.0848 + 0.1073j) | (0.2434 − 0.9852j) | (−1.058 + 0.2239j) |
| 158 | (−0.362 + 0.7788j) | (−0.2434 + 0.9852j) | (−1.058 + 0.5035j) |
| 159 | (−0.0912 + 0.1086j) | (−0.2434 − 0.9852j) | (−1.058 + 0.0328j) |
| 160 | (0.3606 − 0.5047j) | (0.0793 + 1.6276j) | (−0.7494 + 1.0626j) |
| 161 | (0.3152 − 0.4353j) | (0.0793 − 1.6276j) | (−0.7494 − 0.3591j) |
| 162 | (−0.3685 − 0.5011j) | (−0.0793 + 1.6276j) | (−0.7494 + 1.1878j) |
| 163 | (−0.3289 − 0.4324j) | (−0.0793 − 1.6276j) | (−0.7494 − 0.4301j) |
| 164 | (0.3093 − 0.5357j) | (0.5459 + 1.5384j) | (−0.7494 − 1.058j) |
| 165 | (0.2589 − 0.4704j) | (0.5459 − 1.5384j) | (−0.7494 − 0.7494j) |
| 166 | (−0.3208 − 0.5383j) | (−0.5459 + 1.5384j) | (−0.7494 − 1.1847j) |
| 167 | (−0.2715 − 0.4696j) | (−0.5459 − 1.5384j) | (−0.7494 − 0.6628j) |
| 168 | (0.4948 − 0.6925j) | (0.2373 + 1.6128j) | (−0.7494 + 0.7523j) |
| 169 | (0.1516 − 0.1683j) | (0.2373 − 1.6128j) | (−0.7494 − 0.1607j) |

-continued

| Mapping | NN_QSL | NN_QSC | NN_RSC |
|---|---|---|---|
| 170 | (−0.5073 − 0.6829j) | (−0.2373 + 1.6128j) | (−0.7494 + 0.6629j) |
| 171 | (−0.1608 − 0.1692j) | (−0.2373 − 1.6128j) | (−0.7494 − 0.0944j) |
| 172 | (0.426 − 0.7356j) | (0.393 + 1.5827j) | (−0.7494 + 0.3594j) |
| 173 | (0.1227 − 0.2002j) | (0.393 − 1.5827j) | (−0.7494 + 0.1597j) |
| 174 | (−0.4387 − 0.7317j) | (−0.393 + 1.5827j) | (−0.7494 + 0.4297j) |
| 175 | (−0.1314 − 0.2024j) | (−0.393 − 1.5827j) | (−0.7494 + 0.0937j) |
| 176 | (0.4079 − 0.4685j) | (0.0728 + 1.4962j) | (−0.7494 + 0.9504j) |
| 177 | (0.3554 − 0.4091j) | (0.0728 − 1.4962j) | (−0.7494 − 0.2918j) |
| 178 | (−0.4179 − 0.4629j) | (−0.0728 + 1.4962j) | (−0.7494 + 1.3347j) |
| 179 | (−0.3691 − 0.4064j) | (−0.0728 − 1.4962j) | (−0.7494 − 0.503j) |
| 180 | (0.2559 − 0.5654j) | (0.5026 + 1.4144j) | (−0.7494 − 0.946j) |
| 181 | (0.2249 − 0.4937j) | (0.5026 − 1.4144j) | (−0.7494 − 0.8449j) |
| 182 | (−0.2654 − 0.5672j) | (−0.5026 + 1.4144j) | (−0.7494 − 1.331j) |
| 183 | (−0.2352 − 0.4942j) | (−0.5026 − 1.4144j) | (−0.7494 − 0.5804j) |
| 184 | (0.5621 − 0.637j) | (0.218 + 1.4825j) | (−0.7494 − 0.8462j) |
| 185 | (0.1105 − 0.1167j) | (0.218 − 1.4825j) | (−0.7494 − 0.2242j) |
| 186 | (−0.5709 − 0.633j) | (−0.218 + 1.4825j) | (−0.7494 − 0.5805j) |
| 187 | (−0.1167 − 0.1161j) | (−0.218 − 1.4825j) | (−0.7494 − 0.0332j) |
| 188 | (0.3523 − 0.7731j) | (0.3615 + 1.4551j) | (−0.7494 + 0.2916j) |
| 189 | (0.0869 − 0.107j) | (0.3615 − 1.4551j) | (−0.7494 − 0.2239j) |
| 190 | (−0.3709 − 0.7752j) | (−0.3615 + 1.4551j) | (−0.7494 + 0.5035j) |
| 191 | (−0.0873 − 0.1019j) | (−0.3615 − 1.4551j) | (−0.7494 + 0.0328j) |
| 192 | (0.5017 + 0.3733j) | (0.9295 + 0.0448j) | (−1.1847 + 1.0626j) |
| 193 | (0.433 + 0.3274j) | (0.9295 − 0.0448j) | (−1.1847 − 0.3591j) |
| 194 | (−0.4996 + 0.3766j) | (−0.9295 + 0.0448j) | (−1.1847 + 1.1878j) |
| 195 | (−0.4365 + 0.3322j) | (−0.9295 − 0.0448j) | (−1.1847 − 0.4301j) |
| 196 | (0.5383 + 0.3214j) | (0.8841 + 0.3122j) | (−1.1847 − 1.058j) |
| 197 | (0.4685 + 0.2775j) | (0.8841 − 0.3122j) | (−1.1847 − 0.7494j) |
| 198 | (−0.5348 + 0.3258j) | (−0.8841 + 0.3122j) | (−1.1847 − 1.1847j) |
| 199 | (−0.471 + 0.2765j) | (−0.8841 − 0.3122j) | (−1.1847 − 0.6628j) |
| 200 | (0.6824 + 0.5069j) | (0.9223 + 0.1344j) | (−1.1847 + 0.7523j) |
| 201 | (0.2041 + 0.1325j) | (0.9223 − 0.1344j) | (−1.1847 − 0.1607j) |
| 202 | (−0.6791 + 0.5175j) | (−0.9223 + 0.1344j) | (−1.1847 + 0.6629j) |
| 203 | (−0.2045 + 0.132j) | (−0.9223 − 0.1344j) | (−1.1847 − 0.0944j) |
| 204 | (0.731 + 0.4389j) | (0.9071 + 0.2239j) | (−1.1847 + 0.3594j) |
| 205 | (0.2367 + 0.1203j) | (0.9071 − 0.2239j) | (−1.1847 + 0.1597j) |
| 206 | (−0.7255 + 0.4463j) | (−0.9071 + 0.2239j) | (−1.1847 + 0.4297j) |
| 207 | (−0.237 + 0.1193j) | (−0.9071 − 0.2239j) | (−1.1847 + 0.0937j) |
| 208 | (0.4603 + 0.4175j) | (1.0112 + 0.0488j) | (−1.1847 + 0.9504j) |
| 209 | (0.4063 + 0.3693j) | (1.0112 − 0.0488j) | (−1.1847 − 0.2918j) |
| 210 | (−0.4607 + 0.4242j) | (−1.0112 + 0.0488j) | (−1.1847 + 1.3347j) |
| 211 | (−0.4028 + 0.3683j) | (−1.0112 − 0.0488j) | (−1.1847 − 0.503j) |
| 212 | (0.5655 + 0.2706j) | (0.9595 + 0.3387j) | (−1.1847 − 0.946j) |
| 213 | (0.4972 + 0.2352j) | (0.9595 − 0.3387j) | (−1.1847 − 0.8449j) |
| 214 | (−0.5663 + 0.2728j) | (−0.9595 + 0.3387j) | (−1.1847 − 1.331j) |
| 215 | (−0.4987 + 0.2352j) | (−0.9595 − 0.3387j) | (−1.1847 − 0.5804j) |
| 216 | (0.6282 + 0.5729j) | (1.0026 + 0.1464j) | (−1.1847 − 0.8462j) |
| 217 | (0.1461 + 0.0614j) | (1.0026 − 0.1464j) | (−1.1847 − 0.2242j) |
| 218 | (−0.629 + 0.5813j) | (−1.0026 + 0.1464j) | (−1.1847 − 0.5805j) |
| 219 | (−0.1499 + 0.0621j) | (−1.0026 − 0.1464j) | (−1.1847 − 0.0332j) |
| 220 | (0.7712 + 0.3678j) | (0.9858 + 0.2431j) | (−1.1847 + 0.2916j) |
| 221 | (0.0864 + 0.0375j) | (0.9858 − 0.2431j) | (−1.1847 − 0.2239j) |
| 222 | (−0.7709 + 0.3758j) | (−0.9858 + 0.2431j) | (−1.1847 + 0.5035j) |
| 223 | (−0.0946 + 0.037j) | (−0.9858 − 0.2431j) | (−1.1847 + 0.0328j) |
| 224 | (0.4907 − 0.3721j) | (1.6285 + 0.0791j) | (−0.6628 + 1.0626j) |
| 225 | (0.4272 − 0.327j) | (1.6285 − 0.0791j) | (−0.6628 − 0.3591j) |
| 226 | (−0.5032 − 0.3732j) | (−1.6285 + 0.0791j) | (−0.6628 + 1.1878j) |
| 227 | (−0.4385 − 0.3286j) | (−1.6285 − 0.0791j) | (−0.6628 − 0.4301j) |
| 228 | (0.5296 − 0.3255j) | (1.5386 + 0.5469j) | (−0.6628 − 1.058j) |
| 229 | (0.4632 − 0.2748j) | (1.5386 − 0.5469j) | (−0.6628 − 0.7494j) |
| 230 | (−0.5388 − 0.3189j) | (−1.5386 + 0.5469j) | (−0.6628 − 1.1847j) |
| 231 | (−0.4755 − 0.2712j) | (−1.5386 − 0.5469j) | (−0.6628 − 0.6628j) |
| 232 | (0.6754 − 0.519j) | (1.6131 + 0.237j) | (−0.6628 + 0.7523j) |
| 233 | (0.1995 − 0.1273j) | (1.6131 − 0.237j) | (−0.6628 − 0.1607j) |
| 234 | (−0.6842 − 0.5066j) | (−1.6131 + 0.237j) | (−0.6628 + 0.6629j) |
| 235 | (−0.2066 − 0.1312j) | (−1.6131 − 0.237j) | (−0.6628 − 0.0944j) |
| 236 | (0.7211 − 0.4468j) | (1.583 + 0.3934j) | (−0.6628 + 0.3594j) |
| 237 | (0.2335 − 0.1172j) | (1.583 − 0.3934j) | (−0.6628 + 0.1597j) |
| 238 | (−0.7312 − 0.4415j) | (−1.583 + 0.3934j) | (−0.6628 + 0.4297j) |
| 239 | (−0.2462 − 0.1171j) | (−1.583 − 0.3934j) | (−0.6628 + 0.0937j) |
| 240 | (0.4558 − 0.424j) | (1.4969 + 0.0726j) | (−0.6628 + 0.9504j) |
| 241 | (0.3981 − 0.3655j) | (1.4969 − 0.0726j) | (−0.6628 − 0.2918j) |
| 242 | (−0.4676 − 0.4191j) | (−1.4969 + 0.0726j) | (−0.6628 + 1.3347j) |
| 243 | (−0.4098 − 0.369j) | (−1.4969 − 0.0726j) | (−0.6628 − 0.503j) |
| 244 | (0.5637 − 0.2743j) | (1.4145 + 0.5032j) | (−0.6628 − 0.946j) |
| 245 | (0.4938 − 0.2386j) | (1.4145 − 0.5032j) | (−0.6628 − 0.8449j) |
| 246 | (−0.571 − 0.2635j) | (−1.4145 + 0.5032j) | (−0.6628 − 1.331j) |

-continued

| Mapping | NN_QSL | NN_QSC | NN_RSC |
|---|---|---|---|
| 247 | (−0.5007 − 0.2353j) | (−1.4145 − 0.5032j) | (−0.6628 − 0.5804j) |
| 248 | (0.6183 − 0.5836j) | (1.4829 + 0.2182j) | (−0.6628 + 0.8462j) |
| 249 | (0.1465 − 0.0602j) | (1.4829 − 0.2182j) | (−0.6628 − 0.2242j) |
| 250 | (−0.6288 − 0.5726j) | (−1.4829 + 0.2182j) | (−0.6628 + 0.5805j) |
| 251 | (−0.1548 − 0.0603j) | (−1.4829 − 0.2182j) | (−0.6628 − 0.0332j) |
| 252 | (0.763 − 0.3764j) | (1.4551 + 0.3617j) | (−0.6628 + 0.2916j) |
| 253 | (0.085 − 0.0339j) | (1.4551 − 0.3617j) | (−0.6628 + 0.2239j) |
| 254 | (−0.7748 − 0.3684j) | (−1.4551 + 0.3617j) | (−0.6628 + 0.5035j) |
| 255 | (−0.0927 − 0.0278j) | (−1.4551 − 0.3617j) | (−0.6628 + 0.0328j) |
| 256 | (0.1013 + 0.6984j) | (0.5869 + 0.6485j) | (0.7523 + 1.0626j) |
| 257 | (0.0558 + 0.4624j) | (0.5869 − 0.6485j) | (0.7523 − 0.3591j) |
| 258 | (−0.0963 + 0.7007j) | (−0.5869 + 0.6485j) | (0.7523 + 1.1878j) |
| 259 | (−0.0551 + 0.4603j) | (−0.5869 − 0.6485j) | (0.7523 − 0.4301j) |
| 260 | (0.169 + 0.6862j) | (0.3677 + 0.7819j) | (0.7523 − 1.058j) |
| 261 | (0.1232 + 0.4492j) | (0.3677 − 0.7819j) | (0.7523 − 0.7494j) |
| 262 | (−0.1643 + 0.6844j) | (−0.3677 + 0.7819j) | (0.7523 − 1.1847j) |
| 263 | (−0.1223 + 0.4513j) | (−0.3677 − 0.7819j) | (0.7523 − 0.6628j) |
| 264 | (0.1146 + 0.7745j) | (0.5188 + 0.7018j) | (0.7523 + 0.7523j) |
| 265 | (0.0303 + 0.2988j) | (0.5188 − 0.7018j) | (0.7523 − 0.1607j) |
| 266 | (−0.1078 + 0.7737j) | (−0.5188 + 0.7018j) | (0.7523 + 0.6629j) |
| 267 | (−0.0306 + 0.303j) | (−0.5188 − 0.7018j) | (0.7523 − 0.0944j) |
| 268 | (0.1878 + 0.7561j) | (0.445 + 0.7463j) | (0.7523 + 0.3594j) |
| 269 | (0.094 + 0.2936j) | (0.445 − 0.7463j) | (0.7523 + 0.1597j) |
| 270 | (−0.186 + 0.7586j) | (−0.445 + 0.7463j) | (0.7523 + 0.4297j) |
| 271 | (−0.0962 + 0.2893j) | (−0.445 − 0.7463j) | (0.7523 + 0.0937j) |
| 272 | (0.0361 + 0.7022j) | (0.5389 + 0.5945j) | (0.7523 + 0.9504j) |
| 273 | (0.0348 + 0.4317j) | (0.5389 − 0.5945j) | (0.7523 − 0.2918j) |
| 274 | (−0.0312 + 0.7j) | (−0.5389 + 0.5945j) | (0.7523 + 1.3347j) |
| 275 | (−0.0333 + 0.4266j) | (−0.5389 − 0.5945j) | (0.7523 − 0.503j) |
| 276 | (0.2349 + 0.6655j) | (0.338 + 0.7122j) | (0.7523 − 0.946j) |
| 277 | (0.1304 + 0.415j) | (0.338 − 0.7122j) | (0.7523 − 0.8449j) |
| 278 | (−0.2376 + 0.663j) | (−0.338 + 0.7122j) | (0.7523 − 1.331j) |
| 279 | (−0.1281 + 0.4148j) | (−0.338 − 0.7122j) | (0.7523 − 0.5804j) |
| 280 | (0.0396 + 0.7779j) | (0.4765 + 0.6415j) | (0.7523 + 0.8462j) |
| 281 | (0.0355 + 0.3627j) | (0.4765 − 0.6415j) | (0.7523 − 0.2242j) |
| 282 | (−0.0352 + 0.7793j) | (−0.4765 + 0.6415j) | (0.7523 + 0.5805j) |
| 283 | (−0.0391 + 0.361j) | (−0.4765 − 0.6415j) | (0.7523 − 0.0332j) |
| 284 | (0.2594 + 0.7335j) | (0.4091 + 0.6803j) | (0.7523 + 0.2916j) |
| 285 | (0.1071 + 0.3528j) | (0.4091 − 0.6803j) | (0.7523 + 0.2239j) |
| 286 | (−0.2581 + 0.7369j) | (−0.4091 + 0.6803j) | (0.7523 + 0.5035j) |
| 287 | (−0.1093 + 0.343j) | (−0.4091 − 0.6803j) | (0.7523 + 0.0328j) |
| 288 | (0.0953 − 0.6954j) | (0.4403 + 0.4792j) | (−0.1607 + 1.0626j) |
| 289 | (0.0473 − 0.4604j) | (0.4403 − 0.4792j) | (−0.1607 − 0.3591j) |
| 290 | (−0.1075 − 0.6946j) | (−0.4403 + 0.4792j) | (−0.1607 + 1.1878j) |
| 291 | (−0.0599 − 0.4574j) | (−0.4403 − 0.4792j) | (−0.1607 − 0.4301j) |
| 292 | (0.1584 − 0.6792j) | (0.2846 + 0.572j) | (−0.1607 − 1.058j) |
| 293 | (0.1198 − 0.4495j) | (0.2846 − 0.572j) | (−0.1607 − 0.7494j) |
| 294 | (−0.1731 − 0.6792j) | (−0.2846 + 0.572j) | (−0.1607 − 1.1847j) |
| 295 | (−0.1267 − 0.4471j) | (−0.2846 − 0.572j) | (−0.1607 − 0.6628j) |
| 296 | (0.1038 − 0.7681j) | (0.3971 + 0.5118j) | (−0.1607 + 0.7523j) |
| 297 | (0.0241 − 0.2945j) | (0.3971 − 0.5118j) | (−0.1607 − 0.1607j) |
| 298 | (−0.1222 − 0.7711j) | (−0.3971 + 0.5118j) | (−0.1607 + 0.6629j) |
| 299 | (−0.032 − 0.2934j) | (−0.3971 − 0.5118j) | (−0.1607 − 0.0944j) |
| 300 | (0.178 − 0.7553j) | (0.3409 + 0.5481j) | (−0.1607 + 0.3594j) |
| 301 | (0.085 − 0.2892j) | (0.3409 − 0.5481j) | (−0.1607 + 0.1597j) |
| 302 | (−0.1922 − 0.7587j) | (−0.3409 + 0.5481j) | (−0.1607 + 0.4297j) |
| 303 | (−0.0966 − 0.29j) | (−0.3409 − 0.5481j) | (−0.1607 + 0.0937j) |
| 304 | (0.0277 − 0.7029j) | (0.491 + 0.5389j) | (−0.1607 + 0.9504j) |
| 305 | (0.0289 − 0.426j) | (0.491 − 0.5389j) | (−0.1607 − 0.2918j) |
| 306 | (−0.038 − 0.702j) | (−0.491 + 0.5389j) | (−0.1607 + 1.3347j) |
| 307 | (−0.042 − 0.4295j) | (−0.491 − 0.5389j) | (−0.1607 − 0.503j) |
| 308 | (0.2234 − 0.6626j) | (0.3098 + 0.6428j) | (−0.1607 − 0.946j) |
| 309 | (0.1215 − 0.4077j) | (0.3098 − 0.6428j) | (−0.1607 − 0.8449j) |
| 310 | (−0.2387 − 0.6644j) | (−0.3098 + 0.6428j) | (−0.1607 − 1.331j) |
| 311 | (−0.1305 − 0.409j) | (−0.3098 − 0.6428j) | (−0.1607 − 0.5804j) |
| 312 | (0.0301 − 0.7807j) | (0.4363 + 0.5791j) | (−0.1607 + 0.8462j) |
| 313 | (0.0303 − 0.3591j) | (0.4363 − 0.5791j) | (−0.1607 − 0.2242j) |
| 314 | (−0.0465 − 0.7785j) | (−0.4363 + 0.5791j) | (−0.1607 + 0.5805j) |
| 315 | (−0.0456 − 0.3566j) | (−0.4363 − 0.5791j) | (−0.1607 − 0.0332j) |
| 316 | (0.2496 − 0.7328j) | (0.375 + 0.6138j) | (−0.1607 + 0.2916j) |
| 317 | (0.0994 − 0.3418j) | (0.375 − 0.6138j) | (−0.1607 + 0.2239j) |
| 318 | (−0.2667 − 0.7328j) | (−0.375 + 0.6138j) | (−0.1607 + 0.5035j) |
| 319 | (−0.1126 − 0.3464j) | (−0.375 − 0.6138j) | (−0.1607 + 0.0328j) |
| 320 | (0.6978 + 0.1033j) | (0.6485 + 0.5868j) | (0.6629 + 1.0626j) |
| 321 | (0.4746 + 0.0555j) | (0.6485 − 0.5868j) | (0.6629 − 0.3591j) |
| 322 | (−0.7054 + 0.1101j) | (−0.6485 + 0.5868j) | (0.6629 + 1.1878j) |
| 323 | (−0.4839 + 0.0617j) | (−0.6485 − 0.5868j) | (0.6629 − 0.4301j) |

-continued

| Mapping | NN_QSL | NN_QSC | NN_RSC |
|---|---|---|---|
| 324 | (0.684 + 0.1699j) | (0.782 + 0.3674j) | (0.6629 − 1.058j) |
| 325 | (0.4599 + 0.1257j) | (0.782 − 0.3674j) | (0.6629 − 0.7494j) |
| 326 | (−0.6846 + 0.1737j) | (−0.782 + 0.3674j) | (0.6629 − 1.1847j) |
| 327 | (−0.4678 + 0.1235j) | (−0.782 − 0.3674j) | (0.6629 − 0.6628j) |
| 328 | (0.7735 + 0.1152j) | (0.7016 + 0.5185j) | (0.6629 + 0.7523j) |
| 329 | (0.3319 + 0.0298j) | (0.7016 − 0.5185j) | (0.6629 − 0.1607j) |
| 330 | (−0.7747 + 0.1171j) | (−0.7016 + 0.5185j) | (0.6629 + 0.6629j) |
| 331 | (−0.3384 + 0.0336j) | (−0.7016 − 0.5185j) | (0.6629 − 0.0944j) |
| 332 | (0.7572 + 0.1878j) | (0.7462 + 0.445j) | (0.6629 + 0.3594j) |
| 333 | (0.3215 + 0.0853j) | (0.7462 − 0.445j) | (0.6629 + 0.1597j) |
| 334 | (−0.7581 + 0.1947j) | (−0.7462 + 0.445j) | (0.6629 + 0.4297j) |
| 335 | (−0.3301 + 0.0957j) | (−0.7462 − 0.445j) | (0.6629 + 0.0937j) |
| 336 | (0.7024 + 0.0345j) | (0.5943 + 0.5387j) | (0.6629 + 0.9504j) |
| 337 | (0.4548 + 0.033j) | (0.5943 − 0.5387j) | (0.6629 − 0.2918j) |
| 338 | (−0.711 + 0.0382j) | (−0.5943 + 0.5387j) | (0.6629 + 1.3347j) |
| 339 | (−0.459 + 0.0384j) | (−0.5943 − 0.5387j) | (0.6629 − 0.503j) |
| 340 | (0.661 + 0.2372j) | (0.7127 + 0.3377j) | (0.6629 − 0.946j) |
| 341 | (0.4304 + 0.1413j) | (0.7127 − 0.3377j) | (0.6629 − 0.8449j) |
| 342 | (−0.6658 + 0.2416j) | (−0.7127 + 0.3377j) | (0.6629 − 1.331j) |
| 343 | (−0.4375 + 0.139j) | (−0.7127 − 0.3377j) | (0.6629 − 0.5804j) |
| 344 | (0.7815 + 0.0351j) | (0.6416 + 0.4762j) | (0.6629 − 0.8462j) |
| 345 | (0.3845 + 0.0331j) | (0.6416 − 0.4762j) | (0.6629 − 0.2242j) |
| 346 | (−0.784 + 0.037j) | (−0.6416 + 0.4762j) | (0.6629 + 0.5805j) |
| 347 | (−0.3946 + 0.0376j) | (−0.6416 − 0.4762j) | (0.6629 − 0.0332j) |
| 348 | (0.7308 + 0.2641j) | (0.6805 + 0.4088j) | (0.6629 + 0.2916j) |
| 349 | (0.3662 + 0.1117j) | (0.6805 − 0.4088j) | (0.6629 + 0.2239j) |
| 350 | (−0.7321 + 0.2669j) | (−0.6805 + 0.4088j) | (0.6629 + 0.5035j) |
| 351 | (−0.3756 + 0.1152j) | (−0.6805 − 0.4088j) | (0.6629 + 0.0328j) |
| 352 | (0.6946 − 0.1047j) | (0.4788 + 0.4401j) | (−0.0944 + 1.0626j) |
| 353 | (0.472 − 0.0599j) | (0.4788 − 0.4401j) | (−0.0944 − 0.3591j) |
| 354 | (−0.707 − 0.1019j) | (−0.4788 + 0.4401j) | (−0.0944 + 1.1878j) |
| 355 | (−0.481 − 0.0578j) | (−0.4788 − 0.4401j) | (−0.0944 − 0.4301j) |
| 356 | (0.6803 − 0.1731j) | (0.5723 + 0.2842j) | (−0.0944 − 1.058j) |
| 357 | (0.4592 − 0.1234j) | (0.5723 − 0.2842j) | (−0.0944 − 0.7494j) |
| 358 | (−0.6945 − 0.1702j) | (−0.5723 + 0.2842j) | (−0.0944 − 1.1847j) |
| 359 | (−0.4666 − 0.1204j) | (−0.5723 − 0.2842j) | (−0.0944 − 0.6628j) |
| 360 | (0.7686 − 0.1174j) | (0.5126 + 0.3966j) | (−0.0944 + 0.7523j) |
| 361 | (0.3344 − 0.0345j) | (0.5126 − 0.3966j) | (−0.0944 − 0.1607j) |
| 362 | (−0.7795 − 0.1132j) | (−0.5126 + 0.3966j) | (−0.0944 + 0.6629j) |
| 363 | (−0.3338 − 0.0267j) | (−0.5126 − 0.3966j) | (−0.0944 − 0.0944j) |
| 364 | (0.7525 − 0.192j) | (0.5486 + 0.3406j) | (−0.0944 + 0.3594j) |
| 365 | (0.3214 − 0.0877j) | (0.5486 − 0.3406j) | (−0.0944 + 0.1597j) |
| 366 | (−0.7618 − 0.1884j) | (−0.5486 + 0.3406j) | (−0.0944 + 0.4297j) |
| 367 | (−0.327 − 0.0901j) | (−0.5486 − 0.3406j) | (−0.0944 + 0.0937j) |
| 368 | (0.7037 − 0.0376j) | (0.5388 + 0.491j) | (−0.0944 + 0.9504j) |
| 369 | (0.4509 − 0.0353j) | (0.5388 − 0.491j) | (−0.0944 − 0.2918j) |
| 370 | (−0.7125 − 0.0349j) | (−0.5388 + 0.491j) | (−0.0944 + 1.3347j) |
| 371 | (−0.4601 − 0.0338j) | (−0.5388 − 0.491j) | (−0.0944 − 0.503j) |
| 372 | (0.658 − 0.2415j) | (0.6432 + 0.3095j) | (−0.0944 − 0.946j) |
| 373 | (0.4253 − 0.138j) | (0.6432 − 0.3095j) | (−0.0944 − 0.8449j) |
| 374 | (−0.6673 − 0.2334j) | (−0.6432 + 0.3095j) | (−0.0944 − 1.331j) |
| 375 | (−0.4353 − 0.142j) | (−0.6432 − 0.3095j) | (−0.0944 − 0.5804j) |
| 376 | (0.7776 − 0.0416j) | (0.5792 + 0.4361j) | (−0.0944 − 0.8462j) |
| 377 | (0.3828 − 0.0336j) | (0.5792 − 0.4361j) | (−0.0944 − 0.2242j) |
| 378 | (−0.7872 − 0.0398j) | (−0.5792 + 0.4361j) | (−0.0944 + 0.5805j) |
| 379 | (−0.391 − 0.0341j) | (−0.5792 − 0.4361j) | (−0.0944 − 0.0332j) |
| 380 | (0.7242 − 0.2666j) | (0.6142 + 0.3748j) | (−0.0944 + 0.2916j) |
| 381 | (0.3657 − 0.108j) | (0.6142 − 0.3748j) | (−0.0944 + 0.2239j) |
| 382 | (−0.7381 − 0.2626j) | (−0.6142 + 0.3748j) | (−0.0944 + 0.5035j) |
| 383 | (−0.3728 − 0.111j) | (−0.6142 − 0.3748j) | (−0.0944 + 0.0328j) |
| 384 | (0.4153 + 0.5601j) | (0.6369 + 0.7034j) | (0.3594 + 1.0626j) |
| 385 | (0.2833 + 0.3791j) | (0.6369 − 0.7034j) | (0.3594 − 0.3591j) |
| 386 | (−0.4077 + 0.5667j) | (−0.6369 + 0.7034j) | (0.3594 + 1.1878j) |
| 387 | (−0.2787 + 0.3761j) | (−0.6369 − 0.7034j) | (0.3594 − 0.4301j) |
| 388 | (0.3594 + 0.6034j) | (0.3992 + 0.8521j) | (0.3594 − 1.058j) |
| 389 | (0.2226 + 0.4131j) | (0.3992 − 0.8521j) | (0.3594 − 0.7494j) |
| 390 | (−0.3546 + 0.6133j) | (−0.3992 + 0.8521j) | (0.3594 − 1.1847j) |
| 391 | (−0.2211 + 0.412j) | (−0.3992 − 0.8521j) | (0.3594 − 0.6628j) |
| 392 | (0.4609 + 0.6268j) | (0.5628 + 0.7625j) | (0.3594 + 0.7523j) |
| 393 | (0.2077 + 0.2388j) | (0.5628 − 0.7625j) | (0.3594 − 0.1607j) |
| 394 | (−0.4572 + 0.6304j) | (−0.5628 + 0.7625j) | (0.3594 + 0.6629j) |
| 395 | (−0.2071 + 0.2395j) | (−0.5628 − 0.7625j) | (0.3594 − 0.0944j) |
| 396 | (0.398 + 0.6663j) | (0.483 + 0.8118j) | (0.3594 + 0.3594j) |
| 397 | (0.1564 + 0.2707j) | (0.483 − 0.8118j) | (0.3594 + 0.1597j) |
| 398 | (−0.3919 + 0.6739j) | (−0.483 + 0.8118j) | (0.3594 + 0.4297j) |
| 399 | (−0.1588 + 0.2723j) | (−0.483 − 0.8118j) | (0.3594 + 0.0937j) |
| 400 | (0.4691 + 0.5203j) | (0.6889 + 0.7607j) | (0.3594 + 0.9504j) |

-continued

| Mapping | NN_QSL | NN_QSC | NN_RSC |
|---|---|---|---|
| 401 | (0.2908 + 0.3407j) | (0.6889 − 0.7607j) | (0.3594 − 0.2918j) |
| 402 | (−0.4657 + 0.5244j) | (−0.6889 + 0.7607j) | (0.3594 + 1.3347j) |
| 403 | (−0.288 + 0.3402j) | (−0.6889 − 0.7607j) | (0.3594 − 0.503j) |
| 404 | (0.2992 + 0.636j) | (0.4324 + 0.9241j) | (0.3594 − 0.946j) |
| 405 | (0.195 + 0.3956j) | (0.4324 − 0.9241j) | (0.3594 − 0.8449j) |
| 406 | (−0.292 + 0.6388j) | (−0.4324 + 0.9241j) | (0.3594 − 1.331j) |
| 407 | (−0.1945 + 0.3903j) | (−0.4324 − 0.9241j) | (0.3594 − 0.5804j) |
| 408 | (0.5189 + 0.5794j) | (0.6091 + 0.8245j) | (0.3594 + 0.8462j) |
| 409 | (0.2445 + 0.2905j) | (0.6091 − 0.8245j) | (0.3594 − 0.2242j) |
| 410 | (−0.5158 + 0.5817j) | (−0.6091 + 0.8245j) | (0.3594 + 0.5805j) |
| 411 | (−0.2461 + 0.2872j) | (−0.6091 − 0.8245j) | (0.3594 − 0.0332j) |
| 412 | (0.3348 + 0.7019j) | (0.5228 + 0.8795j) | (0.3594 + 0.2916j) |
| 413 | (0.1782 + 0.3285j) | (0.5228 − 0.8795j) | (0.3594 + 0.2239j) |
| 414 | (−0.327 + 0.7086j) | (−0.5228 + 0.8795j) | (0.3594 + 0.5035j) |
| 415 | (−0.1797 + 0.3239j) | (−0.5228 − 0.8795j) | (0.3594 + 0.0328j) |
| 416 | (0.4044 − 0.5663j) | (1.0985 + 1.2137j) | (0.1597 + 1.0626j) |
| 417 | (0.2784 − 0.3723j) | (1.0985 − 1.2137j) | (0.1597 − 0.3591j) |
| 418 | (−0.414 − 0.5661j) | (−1.0985 + 1.2137j) | (0.1597 + 1.1878j) |
| 419 | (−0.2855 − 0.3768j) | (−1.0985 − 1.2137j) | (0.1597 − 0.4301j) |
| 420 | (0.3464 − 0.6042j) | (0.6952 + 1.4795j) | (0.1597 − 1.058j) |
| 421 | (0.218 − 0.4068j) | (0.6952 − 1.4795j) | (0.1597 − 0.7494j) |
| 422 | (−0.3588 − 0.6031j) | (−0.6952 + 1.4795j) | (0.1597 − 1.1847j) |
| 423 | (−0.228 − 0.4086j) | (−0.6952 − 1.4795j) | (0.1597 − 0.6628j) |
| 424 | (0.4496 − 0.6241j) | (0.9727 + 1.316j) | (0.1597 + 0.7523j) |
| 425 | (0.1973 − 0.2358j) | (0.9727 − 1.316j) | (0.1597 − 0.1607j) |
| 426 | (−0.4618 − 0.6251j) | (−0.9727 + 1.316j) | (0.1597 + 0.6629j) |
| 427 | (−0.2074 − 0.2334j) | (−0.9727 − 1.316j) | (0.1597 − 0.0944j) |
| 428 | (0.3837 − 0.6687j) | (0.8374 + 1.4043j) | (0.1597 + 0.3594j) |
| 429 | (0.15 − 0.2654j) | (0.8374 − 1.4043j) | (0.1597 + 0.1597j) |
| 430 | (−0.3983 − 0.6688j) | (−0.8374 + 1.4043j) | (0.1597 + 0.4297j) |
| 431 | (−0.1577 − 0.2634j) | (−0.8374 − 1.4043j) | (0.1597 + 0.0937j) |
| 432 | (0.4584 − 0.523j) | (1.0103 + 1.1159j) | (0.1597 + 0.9504j) |
| 433 | (0.286 − 0.3374j) | (1.0103 − 1.1159j) | (0.1597 − 0.2918j) |
| 434 | (−0.4707 − 0.5192j) | (−1.0103 + 1.1159j) | (0.1597 + 1.3347j) |
| 435 | (−0.291 − 0.3391j) | (−1.0103 − 1.1159j) | (0.1597 − 0.503j) |
| 436 | (0.2872 − 0.6367j) | (0.6395 + 1.3601j) | (0.1597 − 0.946j) |
| 437 | (0.1885 − 0.3827j) | (0.6395 − 1.3601j) | (0.1597 − 0.8449j) |
| 438 | (−0.2972 − 0.6351j) | (−0.6395 + 1.3601j) | (0.1597 − 1.331j) |
| 439 | (−0.1996 − 0.3857j) | (−0.6395 − 1.3601j) | (0.1597 − 0.5804j) |
| 440 | (0.5098 − 0.5831j) | (0.8958 + 1.2097j) | (0.1597 + 0.8462j) |
| 441 | (0.2378 − 0.2832j) | (0.8958 − 1.2097j) | (0.1597 − 0.2242j) |
| 442 | (−0.5185 − 0.5724j) | (−0.8958 + 1.2097j) | (0.1597 + 0.5805j) |
| 443 | (−0.245 − 0.2864j) | (−0.8958 − 1.2097j) | (0.1597 − 0.0332j) |
| 444 | (0.3213 − 0.7036j) | (0.7706 + 1.2911j) | (0.1597 + 0.2916j) |
| 445 | (0.1694 − 0.3292j) | (0.7706 − 1.2911j) | (0.1597 + 0.2239j) |
| 446 | (−0.333 − 0.7005j) | (−0.7706 + 1.2911j) | (0.1597 + 0.5035j) |
| 447 | (−0.1813 − 0.3203j) | (−0.7706 − 1.2911j) | (0.1597 + 0.0328j) |
| 448 | (0.5565 + 0.4175j) | (0.7036 + 0.6365j) | (0.4297 + 1.0626j) |
| 449 | (0.3788 + 0.2851j) | (0.7036 − 0.6365j) | (0.4297 − 0.3591j) |
| 450 | (−0.559 + 0.4229j) | (−0.7036 + 0.6365j) | (0.4297 + 1.1878j) |
| 451 | (−0.3788 + 0.2891j) | (−0.7036 − 0.6365j) | (0.4297 − 0.4301j) |
| 452 | (0.5995 + 0.3619j) | (0.8522 + 0.3989j) | (0.4297 − 1.058j) |
| 453 | (0.41 + 0.2381j) | (0.8522 − 0.3989j) | (0.4297 − 0.7494j) |
| 454 | (−0.6012 + 0.3679j) | (−0.8522 + 0.3989j) | (0.4297 − 1.1847j) |
| 455 | (−0.4115 + 0.237j) | (−0.8522 − 0.3989j) | (0.4297 − 0.6628j) |
| 456 | (0.6205 + 0.4659j) | (0.7622 + 0.5621j) | (0.4297 + 0.7523j) |
| 457 | (0.2561 + 0.1988j) | (0.7622 − 0.5621j) | (0.4297 − 0.1607j) |
| 458 | (−0.6201 + 0.4704j) | (−0.7622 + 0.5621j) | (0.4297 + 0.6629j) |
| 459 | (−0.2602 + 0.2035j) | (−0.7622 − 0.5621j) | (0.4297 − 0.0944j) |
| 460 | (0.666 + 0.4j) | (0.8121 + 0.4829j) | (0.4297 + 0.3594j) |
| 461 | (0.2927 + 0.155j) | (0.8121 − 0.4829j) | (0.4297 + 0.1597j) |
| 462 | (−0.6627 + 0.4065j) | (−0.8121 + 0.4829j) | (0.4297 + 0.4297j) |
| 463 | (−0.2942 + 0.1577j) | (−0.8121 − 0.4829j) | (0.4297 + 0.0937j) |
| 464 | (0.52 + 0.4703j) | (0.761 + 0.6881j) | (0.4297 + 0.9504j) |
| 465 | (0.3402 + 0.2969j) | (0.761 − 0.6881j) | (0.4297 − 0.2918j) |
| 466 | (−0.5136 + 0.4742j) | (−0.761 + 0.6881j) | (0.4297 + 1.3347j) |
| 467 | (−0.3425 + 0.3006j) | (−0.761 − 0.6881j) | (0.4297 − 0.503j) |
| 468 | (0.6335 + 0.2992j) | (0.9243 + 0.4319j) | (0.4297 − 0.946j) |
| 469 | (0.404 + 0.2052j) | (0.9243 − 0.4319j) | (0.4297 − 0.8449j) |
| 470 | (−0.636 + 0.3079j) | (−0.9243 + 0.4319j) | (0.4297 − 1.331j) |
| 471 | (−0.407 + 0.2004j) | (−0.9243 − 0.4319j) | (0.4297 − 0.5804j) |
| 472 | (0.5761 + 0.5217j) | (0.8247 + 0.6086j) | (0.4297 + 0.8462j) |
| 473 | (0.2943 + 0.2471j) | (0.8247 − 0.6086j) | (0.4297 − 0.2242j) |
| 474 | (−0.5723 + 0.5251j) | (−0.8247 + 0.6086j) | (0.4297 + 0.5805j) |
| 475 | (−0.2985 + 0.2461j) | (−0.8247 − 0.6086j) | (0.4297 − 0.0332j) |
| 476 | (0.7045 + 0.336j) | (0.8793 + 0.5228j) | (0.4297 + 0.2916j) |
| 477 | (0.3384 + 0.174j) | (0.8793 − 0.5228j) | (0.4297 + 0.2239j) |

-continued

| Mapping | NN_QSL | NN_QSC | NN_RSC |
|---|---|---|---|
| 478 | (−0.7003 + 0.3413j) | (−0.8793 + 0.5228j) | (0.4297 + 0.5035j) |
| 479 | (−0.3426 + 0.1793j) | (−0.8793 − 0.5228j) | (0.4297 + 0.0328j) |
| 480 | (0.5483 − 0.4219j) | (1.2125 + 1.0979j) | (0.0937 + 1.0626j) |
| 481 | (0.3728 − 0.2866j) | (1.2125 − 1.0979j) | (0.0937 − 0.3591j) |
| 482 | (−0.5634 − 0.4175j) | (−1.2125 + 1.0979j) | (0.0937 + 1.1878j) |
| 483 | (−0.3815 − 0.2874j) | (−1.2125 − 1.0979j) | (0.0937 − 0.4301j) |
| 484 | (0.5909 − 0.3657j) | (1.4792 + 0.6961j) | (0.0937 − 1.058j) |
| 485 | (0.4019 − 0.2375j) | (1.4792 − 0.6961j) | (0.0937 − 0.7494j) |
| 486 | (−0.6034 − 0.3608j) | (−1.4792 + 0.6961j) | (0.0937 − 1.1847j) |
| 487 | (−0.4194 − 0.233j) | (−1.4792 − 0.6961j) | (0.0937 − 0.6628j) |
| 488 | (0.6129 − 0.4726j) | (1.3155 + 0.973j) | (0.0937 + 0.7523j) |
| 489 | (0.2535 − 0.1974j) | (1.3155 − 0.973j) | (0.0937 − 0.1607j) |
| 490 | (−0.6218 − 0.4643j) | (−1.3155 + 0.973j) | (0.0937 + 0.6629j) |
| 491 | (−0.2603 − 0.1987j) | (−1.3155 − 0.973j) | (0.0937 − 0.0944j) |
| 492 | (0.6588 − 0.4093j) | (1.4038 + 0.8377j) | (0.0937 + 0.3594j) |
| 493 | (0.2842 − 0.1506j) | (1.4038 − 0.8377j) | (0.0937 + 0.1597j) |
| 494 | (−0.6665 − 0.4036j) | (−1.4038 + 0.8377j) | (0.0937 + 0.4297j) |
| 495 | (−0.2976 − 0.1518j) | (−1.4038 − 0.8377j) | (0.0937 + 0.0937j) |
| 496 | (0.51 − 0.4746j) | (1.1144 + 1.0103j) | (0.0937 + 0.9504j) |
| 497 | (0.3347 − 0.2965j) | (1.1144 − 1.0103j) | (0.0937 − 0.2918j) |
| 498 | (−0.5148 − 0.4713j) | (−1.1144 + 1.0103j) | (0.0937 + 1.3347j) |
| 499 | (−0.3461 − 0.2979j) | (−1.1144 − 1.0103j) | (0.0937 − 0.503j) |
| 500 | (0.6272 − 0.3068j) | (1.3602 + 0.6395j) | (0.0937 − 0.946j) |
| 501 | (0.4006 − 0.2039j) | (1.3602 − 0.6395j) | (0.0937 − 0.8449j) |
| 502 | (−0.64 − 0.3011j) | (−1.3602 + 0.6395j) | (0.0937 − 1.331j) |
| 503 | (−0.4088 − 0.1967j) | (−1.3602 − 0.6395j) | (0.0937 − 0.5804j) |
| 504 | (0.5658 − 0.5287j) | (1.209 + 0.8956j) | (0.0937 + 0.8462j) |
| 505 | (0.2884 − 0.238j) | (1.209 − 0.8956j) | (0.0937 − 0.2242j) |
| 506 | (−0.5678 − 0.5205j) | (−1.209 + 0.8956j) | (0.0937 + 0.5805j) |
| 507 | (−0.2983 − 0.2402j) | (−1.209 − 0.8956j) | (0.0937 − 0.0332j) |
| 508 | (0.6931 − 0.3397j) | (1.2908 + 0.7709j) | (0.0937 + 0.2916j) |
| 509 | (0.3332 − 0.1749j) | (1.2908 − 0.7709j) | (0.0937 + 0.2239j) |
| 510 | (−0.7075 − 0.3341j) | (−1.2908 + 0.7709j) | (0.0937 + 0.5035j) |
| 511 | (−0.3454 − 0.176j) | (−1.2908 − 0.7709j) | (0.0937 + 0.0328j) |
| 512 | (0.1786 + 1.1724j) | (0.027 + 0.0611j) | (0.9504 + 1.0626j) |
| 513 | (0.1917 + 1.2732j) | (0.027 − 0.0611j) | (0.9504 − 0.3591j) |
| 514 | (−0.1693 + 1.1787j) | (−0.027 + 0.0611j) | (0.9504 + 1.1878j) |
| 515 | (−0.1855 + 1.2741j) | (−0.027 − 0.0611j) | (0.9504 − 0.4301j) |
| 516 | (0.2907 + 1.1433j) | (0.0317 + 0.262j) | (0.9504 − 1.058j) |
| 517 | (0.309 + 1.2499j) | (0.0317 − 0.262j) | (0.9504 − 0.7494j) |
| 518 | (−0.2863 + 1.1591j) | (−0.0317 + 0.262j) | (0.9504 − 1.1847j) |
| 519 | (−0.3086 + 1.25j) | (−0.0317 − 0.262j) | (0.9504 − 0.6628j) |
| 520 | (0.1416 + 0.9264j) | (0.043 + 0.1103j) | (0.9504 + 0.7523j) |
| 521 | (0.258 + 1.6315j) | (0.043 − 0.1103j) | (0.9504 − 0.1607j) |
| 522 | (−0.1358 + 0.9275j) | (−0.043 + 0.1103j) | (0.9504 + 0.6629j) |
| 523 | (−0.2411 + 1.6341j) | (−0.043 − 0.1103j) | (0.9504 − 0.0944j) |
| 524 | (0.2287 + 0.902j) | (0.025 + 0.1818j) | (0.9504 + 0.3594j) |
| 525 | (0.3934 + 1.4627j) | (0.025 − 0.1818j) | (0.9504 + 0.1597j) |
| 526 | (−0.2253 + 0.9122j) | (−0.025 + 0.1818j) | (0.9504 + 0.4297j) |
| 527 | (−0.3962 + 1.6036j) | (−0.025 − 0.1818j) | (0.9504 + 0.0937j) |
| 528 | (0.0567 + 1.1856j) | (0.0278 + 0.3759j) | (0.9504 + 0.9504j) |
| 529 | (0.0657 + 1.2858j) | (0.0278 − 0.3759j) | (0.9504 − 0.2918j) |
| 530 | (−0.0561 + 1.1863j) | (−0.0278 + 0.3759j) | (0.9504 + 1.3347j) |
| 531 | (−0.0624 + 1.286j) | (−0.0278 − 0.3759j) | (0.9504 − 0.503j) |
| 532 | (0.4094 + 1.1197j) | (0.0553 + 0.3141j) | (0.9504 − 0.946j) |
| 533 | (0.4903 + 1.3021j) | (0.0553 − 0.3141j) | (0.9504 − 0.8449j) |
| 534 | (−0.3997 + 1.1155j) | (−0.0553 + 0.3141j) | (0.9504 − 1.331j) |
| 535 | (−0.4291 + 1.2139j) | (−0.0553 − 0.3141j) | (0.9504 − 0.5804j) |
| 536 | (0.048 + 0.9321j) | (0.0722 + 0.3941j) | (0.9504 + 0.8462j) |
| 537 | (0.0854 + 1.6496j) | (0.0722 − 0.3941j) | (0.9504 − 0.2242j) |
| 538 | (−0.0436 + 0.9357j) | (−0.0722 + 0.3941j) | (0.9504 + 0.5805j) |
| 539 | (−0.077 + 1.65j) | (−0.0722 − 0.3941j) | (0.9504 − 0.0332j) |
| 540 | (0.3228 + 0.8843j) | (0.1151 + 0.3654j) | (0.9504 + 0.2916j) |
| 541 | (0.531 + 1.4186j) | (0.1151 − 0.3654j) | (0.9504 + 0.2239j) |
| 542 | (−0.3122 + 0.8829j) | (−0.1151 + 0.3654j) | (0.9504 + 0.5035j) |
| 543 | (−0.5528 + 1.5565j) | (−0.1151 − 0.3654j) | (0.9504 + 0.0328j) |
| 544 | (0.1657 − 1.171j) | (0.0317 + 0.5381j) | (−0.2918 + 1.0626j) |
| 545 | (0.1862 − 1.274j) | (0.0317 − 0.5381j) | (−0.2918 − 0.3591j) |
| 546 | (−0.1783 − 1.1678j) | (−0.0317 + 0.5381j) | (−0.2918 + 1.1878j) |
| 547 | (−0.1975 − 1.2723j) | (−0.0317 − 0.5381j) | (−0.2918 − 0.4301j) |
| 548 | (0.2774 − 1.1499j) | (0.2051 + 0.5107j) | (−0.2918 − 1.058j) |
| 549 | (0.2994 − 1.2522j) | (0.2051 − 0.5107j) | (−0.2918 − 0.7494j) |
| 550 | (−0.2937 − 1.1526j) | (−0.2051 + 0.5107j) | (−0.2918 − 1.1847j) |
| 551 | (−0.3184 − 1.2475j) | (−0.2051 − 0.5107j) | (−0.2918 − 0.6628j) |
| 552 | (0.1268 − 0.9247j) | (0.0921 + 0.5307j) | (−0.2918 + 0.7523j) |
| 553 | (0.2411 − 1.6341j) | (0.0921 − 0.5307j) | (−0.2918 − 0.1607j) |
| 554 | (−0.146 − 0.9209j) | (−0.0921 + 0.5307j) | (−0.2918 + 0.6629j) |

-continued

| Mapping | NN_QSL | NN_QSC | NN_RSC |
|---|---|---|---|
| 555 | (−0.2471 − 1.6332j) | (−0.0921 − 0.5307j) | (−0.2918 − 0.0944j) |
| 556 | (0.2174 − 0.9034j) | (0.1506 + 0.526j) | (−0.2918 + 0.3594j) |
| 557 | (0.4076 − 1.6007j) | (0.1506 − 0.526j) | (−0.2918 + 0.1597j) |
| 558 | (−0.2309 − 0.9025j) | (−0.1506 + 0.526j) | (−0.2918 + 0.4297j) |
| 559 | (−0.4053 − 1.6013j) | (−0.1506 − 0.526j) | (−0.2918 + 0.0937j) |
| 560 | (0.0491 − 1.1786j) | (0.0272 + 0.4642j) | (−0.2918 + 0.9504j) |
| 561 | (0.0566 − 1.2863j) | (0.0272 − 0.4642j) | (−0.2918 − 0.2918j) |
| 562 | (−0.0675 − 1.1846j) | (−0.0272 + 0.4642j) | (−0.2918 + 1.3347j) |
| 563 | (−0.0679 − 1.2857j) | (−0.0272 − 0.4642j) | (−0.2918 − 0.503j) |
| 564 | (0.3898 − 1.1113j) | (0.1897 + 0.4469j) | (−0.2918 − 0.946j) |
| 565 | (0.4225 − 1.2162j) | (0.1897 − 0.4469j) | (−0.2918 − 0.8449j) |
| 566 | (−0.409 − 1.1185j) | (−0.1897 + 0.4469j) | (−0.2918 − 1.331j) |
| 567 | (−0.439 − 1.2104j) | (−0.1897 − 0.4469j) | (−0.2918 − 0.5804j) |
| 568 | (0.035 − 0.9278j) | (0.0838 + 0.4552j) | (−0.2918 + 0.8462j) |
| 569 | (0.0826 − 1.6497j) | (0.0838 − 0.4552j) | (−0.2918 − 0.2242j) |
| 570 | (−0.0547 − 0.9275j) | (−0.0838 + 0.4552j) | (−0.2918 + 0.5805j) |
| 571 | (−0.0884 − 1.6494j) | (−0.0838 − 0.4552j) | (−0.2918 − 0.0332j) |
| 572 | (0.3 − 0.881j) | (0.1492 + 0.4302j) | (−0.2918 + 0.2916j) |
| 573 | (0.5598 − 1.554j) | (0.1492 − 0.4302j) | (−0.2918 + 0.2239j) |
| 574 | (−0.3188 − 0.8774j) | (−0.1492 + 0.4302j) | (−0.2918 + 0.5035j) |
| 575 | (−0.5712 − 1.5499j) | (−0.1492 − 0.4302j) | (−0.2918 + 0.0328j) |
| 576 | (1.1647 + 0.1694j) | (0.0534 + 0.0265j) | (1.3347 + 1.0626j) |
| 577 | (1.4993 + 0.2153j) | (0.0534 − 0.0265j) | (1.3347 − 0.3591j) |
| 578 | (−1.1674 + 0.1824j) | (−0.0534 + 0.0265j) | (1.3347 + 1.1878j) |
| 579 | (−1.2728 + 0.1939j) | (−0.0534 − 0.0265j) | (1.3347 − 0.4301j) |
| 580 | (1.1424 + 0.2787j) | (0.2607 + 0.0314j) | (1.3347 − 1.058j) |
| 581 | (1.4721 + 0.3567j) | (0.2607 − 0.0314j) | (1.3347 − 0.7494j) |
| 582 | (−1.1453 + 0.2988j) | (−0.2607 + 0.0314j) | (1.3347 − 1.1847j) |
| 583 | (−1.2465 + 0.3223j) | (−0.2607 − 0.0314j) | (1.3347 − 0.6628j) |
| 584 | (0.9202 + 0.1383j) | (0.1082 + 0.0417j) | (1.3347 + 0.7523j) |
| 585 | (1.6358 + 0.2295j) | (0.1082 − 0.0417j) | (1.3347 − 0.1607j) |
| 586 | (−0.9246 + 0.1443j) | (−0.1082 + 0.0417j) | (1.3347 + 0.6629j) |
| 587 | (−1.6335 + 0.2451j) | (−0.1082 − 0.0417j) | (1.3347 − 0.0944j) |
| 588 | (0.9042 + 0.2274j) | (0.1795 + 0.0247j) | (1.3347 + 0.3594j) |
| 589 | (1.6071 + 0.3817j) | (0.1795 − 0.0247j) | (1.3347 + 0.1597j) |
| 590 | (−0.9054 + 0.2344j) | (−0.1795 + 0.0247j) | (1.3347 + 0.4297j) |
| 591 | (−1.6014 + 0.4048j) | (−0.1795 − 0.0247j) | (1.3347 + 0.0937j) |
| 592 | (1.1743 + 0.0533j) | (0.3752 + 0.0277j) | (1.3347 + 0.9504j) |
| 593 | (1.5134 + 0.0631j) | (0.3752 − 0.0277j) | (1.3347 − 0.2918j) |
| 594 | (−1.1776 + 0.0638j) | (−0.3752 + 0.0277j) | (1.3347 + 1.3347j) |
| 595 | (−1.2856 + 0.0698j) | (−0.3752 − 0.0277j) | (1.3347 − 0.503j) |
| 596 | (1.1172 + 0.3913j) | (0.3134 + 0.0556j) | (1.3347 − 0.946j) |
| 597 | (1.4323 + 0.4929j) | (0.3134 − 0.0556j) | (1.3347 − 0.8449j) |
| 598 | (−1.1139 + 0.4116j) | (−0.3134 + 0.0556j) | (1.3347 − 1.331j) |
| 599 | (−1.209 + 0.4427j) | (−0.3134 − 0.0556j) | (1.3347 − 0.5804j) |
| 600 | (0.9317 + 0.0452j) | (0.3933 + 0.0716j) | (1.3347 + 0.8462j) |
| 601 | (1.6504 + 0.0689j) | (0.3933 − 0.0716j) | (1.3347 − 0.2242j) |
| 602 | (−0.9339 + 0.0509j) | (−0.3933 + 0.0716j) | (1.3347 + 0.5805j) |
| 603 | (−1.6494 + 0.0884j) | (−0.3933 − 0.0716j) | (1.3347 − 0.0332j) |
| 604 | (0.8748 + 0.3161j) | (0.365 + 0.1149j) | (1.3347 + 0.2916j) |
| 605 | (1.5636 + 0.5325j) | (0.365 − 0.1149j) | (1.3347 + 0.2239j) |
| 606 | (−0.8734 + 0.322j) | (−0.365 + 0.1149j) | (1.3347 + 0.5035j) |
| 607 | (−1.5514 + 0.5672j) | (−0.365 − 0.1149j) | (1.3347 + 0.0328j) |
| 608 | (1.1645 − 0.1744j) | (0.538 + 0.0316j) | (−0.503 + 1.0626j) |
| 609 | (1.498 − 0.2244j) | (0.538 − 0.0316j) | (−0.503 − 0.3591j) |
| 610 | (−1.1728 − 0.1765j) | (−0.538 + 0.0316j) | (−0.503 + 1.1878j) |
| 611 | (−1.2737 − 0.1879j) | (−0.538 − 0.0316j) | (−0.503 − 0.4301j) |
| 612 | (1.1384 − 0.2837j) | (0.5107 + 0.2047j) | (−0.503 − 1.058j) |
| 613 | (1.4708 − 0.3623j) | (0.5107 − 0.2047j) | (−0.503 − 0.7494j) |
| 614 | (−1.1494 − 0.2879j) | (−0.5107 + 0.2047j) | (−0.503 − 1.1847j) |
| 615 | (−1.2492 − 0.3118j) | (−0.5107 − 0.2047j) | (−0.503 − 0.6628j) |
| 616 | (0.9147 − 0.1392j) | (0.5312 + 0.0918j) | (−0.503 + 0.7523j) |
| 617 | (1.634 − 0.2415j) | (0.5312 − 0.0918j) | (−0.503 − 0.1607j) |
| 618 | (−0.9308 − 0.1394j) | (−0.5312 + 0.0918j) | (−0.503 + 0.6629j) |
| 619 | (−1.6357 − 0.2298j) | (−0.5312 − 0.0918j) | (−0.503 − 0.0944j) |
| 620 | (0.8961 − 0.2302j) | (0.5264 + 0.1505j) | (−0.503 + 0.3594j) |
| 621 | (1.6044 − 0.3927j) | (0.5264 − 0.1505j) | (−0.503 + 0.1597j) |
| 622 | (−0.9094 − 0.2263j) | (−0.5264 + 0.1505j) | (−0.503 + 0.4297j) |
| 623 | (−1.6046 − 0.3921j) | (−0.5264 − 0.1505j) | (−0.503 + 0.0937j) |
| 624 | (1.1802 − 0.0531j) | (0.464 + 0.0275j) | (−0.503 + 0.9504j) |
| 625 | (1.5126 − 0.0797j) | (0.464 − 0.0275j) | (−0.503 − 0.2918j) |
| 626 | (−1.1809 − 0.0568j) | (−0.464 + 0.0275j) | (−0.503 + 1.3347j) |
| 627 | (−1.2861 − 0.0597j) | (−0.464 − 0.0275j) | (−0.503 − 0.503j) |
| 628 | (1.1032 − 0.3996j) | (0.4471 + 0.1888j) | (−0.503 − 0.946j) |
| 629 | (1.4282 − 0.5046j) | (0.4471 − 0.1888j) | (−0.503 − 0.8449j) |
| 630 | (−1.1225 − 0.4008j) | (−0.4471 + 0.1888j) | (−0.503 − 1.331j) |
| 631 | (−1.2128 − 0.4322j) | (−0.4471 − 0.1888j) | (−0.503 − 0.5804j) |

-continued

| Mapping | NN_QSL | NN_QSC | NN_RSC |
|---|---|---|---|
| 632 | (0.928 − 0.0459j) | (0.4551 + 0.0837j) | (−0.503 + 0.8462j) |
| 633 | (1.6495 − 0.0876j) | (0.4551 − 0.0837j) | (−0.503 − 0.2242j) |
| 634 | (−0.9373 − 0.0446j) | (−0.4551 + 0.0837j) | (−0.503 + 0.5805j) |
| 635 | (−1.6498 − 0.0804j) | (−0.4551 − 0.0837j) | (−0.503 − 0.0332j) |
| 636 | (0.8685 − 0.3189j) | (0.4306 + 0.1487j) | (−0.503 + 0.2916j) |
| 637 | (1.5587 − 0.5466j) | (0.4306 − 0.1487j) | (−0.503 − 0.2239j) |
| 638 | (−0.8786 − 0.3163j) | (−0.4306 + 0.1487j) | (−0.503 + 0.5035j) |
| 639 | (−1.5586 − 0.547j) | (−0.4306 − 0.1487j) | (−0.503 − 0.0328j) |
| 640 | (0.7069 + 0.9425j) | (0.0575 + 1.1837j) | (−0.946 + 1.0626j) |
| 641 | (0.8322 + 1.115j) | (0.0575 − 1.1837j) | (−0.946 − 0.3591j) |
| 642 | (−0.698 + 0.952j) | (−0.0575 + 1.1837j) | (−0.946 + 1.1878j) |
| 643 | (−0.7634 + 1.0368j) | (−0.0575 − 1.1837j) | (−0.946 − 0.4301j) |
| 644 | (0.615 + 1.0184j) | (0.3973 + 1.121j) | (−0.946 − 1.058j) |
| 645 | (0.7224 + 1.1891j) | (0.3973 − 1.121j) | (−0.946 − 0.7494j) |
| 646 | (−0.6048 + 1.0285j) | (−0.3973 + 1.121j) | (−0.946 − 1.1847j) |
| 647 | (−0.653 + 1.1096j) | (−0.3973 − 1.121j) | (−0.946 − 0.6628j) |
| 648 | (0.5515 + 0.7486j) | (0.172 + 1.1733j) | (−0.946 − 0.7523j) |
| 649 | (0.9152 + 1.207j) | (0.172 − 1.1733j) | (−0.946 − 0.1607j) |
| 650 | (−0.5507 + 0.7546j) | (−0.172 + 1.1733j) | (−0.946 + 0.6629j) |
| 651 | (−0.9814 + 1.3286j) | (−0.172 − 1.1733j) | (−0.946 − 0.0944j) |
| 652 | (0.4755 + 0.8063j) | (0.2858 + 1.1531j) | (−0.946 − 0.3594j) |
| 653 | (0.7878 + 1.2937j) | (0.2858 − 1.1531j) | (−0.946 + 0.1597j) |
| 654 | (−0.4733 + 0.805j) | (−0.2858 + 1.1531j) | (−0.946 + 0.4297j) |
| 655 | (−0.8424 + 1.4208j) | (−0.2858 − 1.1531j) | (−0.946 − 0.0937j) |
| 656 | (0.7981 + 0.8749j) | (0.0532 + 1.0946j) | (−0.946 + 0.9504j) |
| 657 | (0.9342 + 1.0311j) | (0.0532 − 1.0946j) | (−0.946 − 0.2918j) |
| 658 | (−0.7956 + 0.8855j) | (−0.0532 + 1.0946j) | (−0.946 + 1.3347j) |
| 659 | (−0.8619 + 0.9565j) | (−0.0532 − 1.0946j) | (−0.946 − 0.503j) |
| 660 | (0.5126 + 1.0729j) | (0.367 + 1.0381j) | (−0.946 − 0.946j) |
| 661 | (0.6094 + 1.2508j) | (0.367 − 1.0381j) | (−0.946 − 0.8449j) |
| 662 | (−0.5018 + 1.0771j) | (−0.367 + 1.0381j) | (−0.946 − 1.331j) |
| 663 | (−0.5458 + 1.1661j) | (−0.367 − 1.0381j) | (−0.946 − 0.5804j) |
| 664 | (0.6234 + 0.6912j) | (0.159 + 1.0852j) | (−0.946 − 0.8462j) |
| 665 | (1.0257 + 1.1146j) | (0.159 − 1.0852j) | (−0.946 − 0.2242j) |
| 666 | (−0.6154 + 0.6921j) | (−0.159 + 1.0852j) | (−0.946 + 0.5805j) |
| 667 | (−1.1063 + 1.2266j) | (−0.159 − 1.0852j) | (−0.946 − 0.0332j) |
| 668 | (0.3995 + 0.8429j) | (0.264 + 1.067j) | (−0.946 + 0.2916j) |
| 669 | (0.6712 + 1.3579j) | (0.264 − 1.067j) | (−0.946 − 0.2239j) |
| 670 | (−0.3961 + 0.8456j) | (−0.264 + 1.067j) | (−0.946 + 0.5035j) |
| 671 | (−0.7021 + 1.4952j) | (−0.264 − 1.067j) | (−0.946 − 0.0328j) |
| 672 | (0.7008 − 0.9586j) | (0.0622 + 1.2787j) | (−0.8449 + 1.0626j) |
| 673 | (0.8267 − 1.1191j) | (0.0622 − 1.2787j) | (−0.8449 − 0.3591j) |
| 674 | (−0.7111 − 0.9504j) | (−0.0622 + 1.2787j) | (−0.8449 + 1.1878j) |
| 675 | (−0.767 − 1.0341j) | (−0.0622 − 1.2787j) | (−0.8449 − 0.4301j) |
| 676 | (0.6035 − 1.0258j) | (0.4301 + 1.2101j) | (−0.8449 − 1.058j) |
| 677 | (0.7162 − 1.1928j) | (0.4301 − 1.2101j) | (−0.8449 − 0.7494j) |
| 678 | (−0.6122 − 1.0147j) | (−0.4301 + 1.2101j) | (−0.8449 − 1.1847j) |
| 679 | (−0.6685 − 1.1004j) | (−0.4301 − 1.2101j) | (−0.8449 − 0.6628j) |
| 680 | (0.5477 − 0.7505j) | (0.1863 + 1.2674j) | (−0.8449 − 0.7523j) |
| 681 | (0.9065 − 1.2135j) | (0.1863 − 1.2674j) | (−0.8449 − 0.1607j) |
| 682 | (−0.5559 − 0.752j) | (−0.1863 + 1.2674j) | (−0.8449 + 0.6629j) |
| 683 | (−0.9899 − 1.3223j) | (−0.1863 − 1.2674j) | (−0.8449 − 0.0944j) |
| 684 | (0.4665 − 0.7984j) | (0.3092 + 1.2448j) | (−0.8449 − 0.3594j) |
| 685 | (0.7816 − 1.2975j) | (0.3092 − 1.2448j) | (−0.8449 + 0.1597j) |
| 686 | (−0.4862 − 0.8005j) | (−0.3092 + 1.2448j) | (−0.8449 + 0.4297j) |
| 687 | (−0.8591 − 1.4108j) | (−0.3092 − 1.2448j) | (−0.8449 − 0.0937j) |
| 688 | (0.7846 − 0.8762j) | (0.0672 + 1.3819j) | (−0.8449 + 0.9504j) |
| 689 | (0.9281 − 1.0365j) | (0.0672 − 1.3819j) | (−0.8449 − 0.2918j) |
| 690 | (−0.7992 − 0.8736j) | (−0.0672 + 1.3819j) | (−0.8449 + 1.3347j) |
| 691 | (−0.8668 − 0.952j) | (−0.0672 − 1.3819j) | (−0.8449 − 0.503j) |
| 692 | (0.4984 − 1.0659j) | (0.4648 + 1.307j) | (−0.8449 − 0.946j) |
| 693 | (0.5355 − 1.1709j) | (0.4648 − 1.307j) | (−0.8449 − 0.8449j) |
| 694 | (−0.513 − 1.071j) | (−0.4648 + 1.307j) | (−0.8449 − 1.331j) |
| 695 | (−0.5555 − 1.1615j) | (−0.4648 − 1.307j) | (−0.8449 − 0.5804j) |
| 696 | (0.6114 − 0.6943j) | (0.2016 + 1.3696j) | (−0.8449 − 0.8462j) |
| 697 | (1.0215 − 1.1184j) | (0.2016 − 1.3696j) | (−0.8449 − 0.2242j) |
| 698 | (−0.6263 − 0.6837j) | (−0.2016 + 1.3696j) | (−0.8449 + 0.5805j) |
| 699 | (−1.1178 − 1.2161j) | (−0.2016 − 1.3696j) | (−0.8449 − 0.0332j) |
| 700 | (0.3859 − 0.8401j) | (0.3344 + 1.3443j) | (−0.8449 + 0.2916j) |
| 701 | (0.6538 − 1.3664j) | (0.3344 − 1.3443j) | (−0.8449 − 0.2239j) |
| 702 | (−0.4012 − 0.8435j) | (−0.3344 − 1.3443j) | (−0.8449 + 0.5035j) |
| 703 | (−0.7165 − 1.4883j) | (−0.3344 − 1.3443j) | (−0.8449 − 0.0328j) |
| 704 | (0.9555 + 0.702j) | (1.1848 + 0.0575j) | (−1.331 + 1.0626j) |
| 705 | (1.2319 + 0.8814j) | (1.1848 − 0.0575j) | (−1.331 − 0.3591j) |
| 706 | (−0.9498 + 0.7129j) | (−1.1848 + 0.0575j) | (−1.331 + 1.1878j) |
| 707 | (−1.027 + 0.7766j) | (−1.1848 − 0.0575j) | (−1.331 − 0.4301j) |
| 708 | (1.0187 + 0.6027j) | (1.1213 + 0.3973j) | (−1.331 − 1.058j) |

-continued

| Mapping | NN_QSL | NN_QSC | NN_RSC |
|---|---|---|---|
| 709 | (1.315 + 0.7518j) | (1.1213 − 0.3973j) | (−1.331 − 0.7494j) |
| 710 | (−1.0083 + 0.6151j) | (−1.1213 + 0.3973j) | (−1.331 − 1.1847j) |
| 711 | (−1.1015 + 0.6666j) | (−1.1213 − 0.3973j) | (−1.331 − 0.6628j) |
| 712 | (0.7463 + 0.5537j) | (1.1742 + 0.1718j) | (−1.331 + 0.7523j) |
| 713 | (1.3417 + 0.9634j) | (1.1742 − 0.1718j) | (−1.331 − 0.1607j) |
| 714 | (−0.745 + 0.5654j) | (−1.1742 + 0.1718j) | (−1.331 + 0.6629j) |
| 715 | (−1.3284 + 0.9818j) | (−1.1742 − 0.1718j) | (−1.331 − 0.0944j) |
| 716 | (0.7927 + 0.4759j) | (1.1536 + 0.2855j) | (−1.331 + 0.3594j) |
| 717 | (1.4277 + 0.8308j) | (1.1536 − 0.2855j) | (−1.331 + 0.1597j) |
| 718 | (−0.7941 + 0.4894j) | (−1.1536 + 0.2855j) | (−1.331 + 0.4297j) |
| 719 | (−1.413 + 0.8554j) | (−1.1536 − 0.2855j) | (−1.331 + 0.0937j) |
| 720 | (0.8747 + 0.7861j) | (1.0956 + 0.053j) | (−1.331 + 0.9504j) |
| 721 | (1.1389 + 0.9987j) | (1.0956 − 0.053j) | (−1.331 − 0.2918j) |
| 722 | (−0.8696 + 0.7966j) | (−1.0956 + 0.053j) | (−1.331 + 1.3347j) |
| 723 | (−0.9505 + 0.8685j) | (−1.0956 − 0.053j) | (−1.331 − 0.503j) |
| 724 | (1.0692 + 0.5015j) | (1.0383 + 0.3669j) | (−1.331 − 0.946j) |
| 725 | (1.3757 + 0.6339j) | (1.0383 − 0.3669j) | (−1.331 − 0.8449j) |
| 726 | (−1.0658 + 0.5137j) | (−1.0383 + 0.3669j) | (−1.331 − 1.331j) |
| 727 | (−1.161 + 0.5566j) | (−1.0383 − 0.3669j) | (−1.331 − 0.5804j) |
| 728 | (0.687 + 0.6205j) | (1.0863 + 0.159j) | (−1.331 + 0.8462j) |
| 729 | (1.2372 + 1.0944j) | (1.0863 − 0.159j) | (−1.331 − 0.2242j) |
| 730 | (−0.6877 + 0.6333j) | (−1.0863 + 0.159j) | (−1.331 + 0.5805j) |
| 731 | (−1.2251 + 1.1079j) | (−1.0863 − 0.159j) | (−1.331 − 0.0332j) |
| 732 | (0.8436 + 0.3975j) | (1.0675 + 0.264j) | (−1.331 + 0.2916j) |
| 733 | (1.5011 + 0.6893j) | (1.0675 − 0.264j) | (−1.331 + 0.2239j) |
| 734 | (−0.8394 + 0.4073j) | (−1.0675 + 0.264j) | (−1.331 + 0.5035j) |
| 735 | (−1.4925 + 0.7078j) | (−1.0675 − 0.264j) | (−1.331 + 0.0328j) |
| 736 | (0.9443 − 0.7071j) | (1.2799 + 0.062j) | (−0.5804 − 1.0626j) |
| 737 | (1.2202 − 0.8975j) | (1.2799 − 0.062j) | (−0.5804 − 0.3591j) |
| 738 | (−0.9487 − 0.6996j) | (−1.2799 + 0.062j) | (−0.5804 − 1.1878j) |
| 739 | (−1.038 − 0.7618j) | (−1.2799 − 0.062j) | (−0.5804 − 0.4301j) |
| 740 | (1.0102 − 0.6086j) | (1.2103 + 0.4297j) | (−0.5804 − 1.058j) |
| 741 | (1.3042 − 0.7703j) | (1.2103 − 0.4297j) | (−0.5804 − 0.7494j) |
| 742 | (−1.0086 − 0.6001j) | (−1.2103 + 0.4297j) | (−0.5804 − 1.1847j) |
| 743 | (−1.1065 − 0.6583j) | (−1.2103 − 0.4297j) | (−0.5804 − 0.6628j) |
| 744 | (0.738 − 0.5612j) | (1.2684 + 0.186j) | (−0.5804 + 0.7523j) |
| 745 | (1.3385 − 0.968j) | (1.2684 − 0.186j) | (−0.5804 − 0.1607j) |
| 746 | (−0.7447 − 0.5564j) | (−1.2684 + 0.186j) | (−0.5804 + 0.6629j) |
| 747 | (−1.3369 − 0.9701j) | (−1.2684 − 0.186j) | (−0.5804 − 0.0944j) |
| 748 | (0.7897 − 0.4876j) | (1.2451 + 0.3089j) | (−0.5804 + 0.3594j) |
| 749 | (1.4243 − 0.8365j) | (1.2451 − 0.3089j) | (−0.5804 + 0.1597j) |
| 750 | (−0.7977 − 0.4802j) | (−1.2451 + 0.3089j) | (−0.5804 + 0.4297j) |
| 751 | (−1.4225 − 0.8396j) | (−1.2451 − 0.3089j) | (−0.5804 + 0.0937j) |
| 752 | (0.8677 − 0.793j) | (1.383 + 0.0678j) | (−0.5804 + 0.9504j) |
| 753 | (1.1351 − 1.003j) | (1.383 − 0.0678j) | (−0.5804 − 0.2918j) |
| 754 | (−0.8831 − 0.7952j) | (−1.383 + 0.0678j) | (−0.5804 + 1.3347j) |
| 755 | (−0.9571 − 0.8612j) | (−1.383 − 0.0678j) | (−0.5804 − 0.503j) |
| 756 | (1.0586 − 0.5052j) | (1.3072 + 0.465j) | (−0.5804 − 0.946j) |
| 757 | (1.3741 − 0.6374j) | (1.3072 − 0.465j) | (−0.5804 − 0.8449j) |
| 758 | (−1.0708 − 0.5059j) | (−1.3072 + 0.465j) | (−0.5804 − 1.331j) |
| 759 | (−1.1655 − 0.547j) | (−1.3072 − 0.465j) | (−0.5804 − 0.5804j) |
| 760 | (0.6789 − 0.6352j) | (1.3701 + 0.2024j) | (−0.5804 + 0.8462j) |
| 761 | (1.2379 − 1.0937j) | (1.3701 − 0.2024j) | (−0.5804 − 0.2242j) |
| 762 | (−0.6897 − 0.6256j) | (−1.3701 + 0.2024j) | (−0.5804 + 0.5805j) |
| 763 | (−1.2375 − 1.0941j) | (−1.3701 − 0.2024j) | (−0.5804 − 0.0332j) |
| 764 | (0.8306 − 0.3999j) | (1.3443 + 0.3352j) | (−0.5804 + 0.2916j) |
| 765 | (1.4995 − 0.6928j) | (1.3443 − 0.3352j) | (−0.5804 + 0.2239j) |
| 766 | (−0.844 − 0.4028j) | (−1.3443 + 0.3352j) | (−0.5804 + 0.5035j) |
| 767 | (−1.4993 − 0.6933j) | (−1.3443 − 0.3352j) | (−0.5804 + 0.0328j) |
| 768 | (0.1656 + 1.084j) | (0.1481 + 0.1893j) | (0.8462 + 1.0626j) |
| 769 | (0.2096 + 1.3754j) | (0.1481 − 0.1893j) | (0.8462 − 0.3591j) |
| 770 | (−0.1593 + 1.0928j) | (−0.1481 + 0.1893j) | (0.8462 + 1.1878j) |
| 771 | (−0.2008 + 1.3767j) | (−0.1481 − 0.1893j) | (0.8462 − 0.4301j) |
| 772 | (0.2771 + 1.0629j) | (0.0947 + 0.2322j) | (0.8462 − 1.058j) |
| 773 | (0.3461 + 1.3476j) | (0.0947 − 0.2322j) | (0.8462 − 0.7494j) |
| 774 | (−0.268 + 1.0658j) | (−0.0947 + 0.2322j) | (0.8462 − 1.1847j) |
| 775 | (−0.335 + 1.3504j) | (−0.0947 − 0.2322j) | (0.8462 − 0.6628j) |
| 776 | (0.1532 + 1.0087j) | (0.0996 + 0.1406j) | (0.8462 + 0.7523j) |
| 777 | (0.2329 + 1.4967j) | (0.0996 − 0.1406j) | (0.8462 − 0.1607j) |
| 778 | (−0.1438 + 1.0059j) | (−0.0996 + 0.1406j) | (0.8462 + 0.6629j) |
| 779 | (−0.222 + 1.4984j) | (−0.0996 − 0.1406j) | (0.8462 − 0.0944j) |
| 780 | (0.2497 + 0.9813j) | (0.0674 + 0.1859j) | (0.8462 + 0.3594j) |
| 781 | (0.4377 + 1.5927j) | (0.0674 − 0.1859j) | (0.8462 + 0.1597j) |
| 782 | (−0.243 + 0.9898j) | (−0.0674 + 0.1859j) | (0.8462 + 0.4297j) |
| 783 | (−0.3635 + 1.4705j) | (−0.0674 − 0.1859j) | (0.8462 + 0.0937j) |
| 784 | (0.0552 + 1.0973j) | (0.1858 + 0.2349j) | (0.8462 + 0.9504j) |
| 785 | (0.0692 + 1.3896j) | (0.1858 − 0.2349j) | (0.8462 − 0.2918j) |

-continued

| Mapping | NN_QSL | NN_QSC | NN_RSC |
|---|---|---|---|
| 786 | (−0.0533 + 1.1004j) | (−0.1858 + 0.2349j) | (0.8462 + 1.3347j) |
| 787 | (−0.0645 + 1.3898j) | (−0.1858 − 0.2349j) | (0.8462 − 0.503j) |
| 788 | (0.3786 + 1.0415j) | (0.1264 + 0.2775j) | (0.8462 − 0.946j) |
| 789 | (0.4427 + 1.209j) | (0.1264 − 0.2775j) | (0.8462 − 0.8449j) |
| 790 | (−0.366 + 1.0374j) | (−0.1264 + 0.2775j) | (0.8462 − 1.331j) |
| 791 | (−0.4614 + 1.3126j) | (−0.1264 − 0.2775j) | (0.8462 − 0.5804j) |
| 792 | (0.0518 + 1.0143j) | (0.2228 + 0.2756j) | (0.8462 + 0.8462j) |
| 793 | (0.0782 + 1.5127j) | (0.2228 − 0.2756j) | (0.8462 − 0.2242j) |
| 794 | (−0.046 + 1.0123j) | (−0.2228 + 0.2756j) | (0.8462 + 0.5805j) |
| 795 | (−0.0701 + 1.5131j) | (−0.2228 − 0.2756j) | (0.8462 − 0.0332j) |
| 796 | (0.3459 + 0.9602j) | (0.1646 + 0.3239j) | (0.8462 + 0.2916j) |
| 797 | (0.5834 + 1.5453j) | (0.1646 − 0.3239j) | (0.8462 + 0.2239j) |
| 798 | (−0.339 + 0.9602j) | (−0.1646 + 0.3239j) | (0.8462 + 0.5035j) |
| 799 | (−0.5068 + 1.4274j) | (−0.1646 − 0.3239j) | (0.8462 + 0.0328j) |
| 800 | (0.1542 − 1.0848j) | (0.3621 + 0.4078j) | (−0.2242 + 1.0626j) |
| 801 | (0.195 − 1.3776j) | (0.3621 − 0.4078j) | (−0.2242 − 0.3591j) |
| 802 | (−0.1692 − 1.0862j) | (−0.3621 + 0.4078j) | (−0.2242 + 1.1878j) |
| 803 | (−0.2105 − 1.3753j) | (−0.3621 − 0.4078j) | (−0.2242 − 0.4301j) |
| 804 | (0.2571 − 1.0604j) | (0.2671 + 0.4864j) | (−0.2242 − 1.058j) |
| 805 | (0.3269 − 1.3524j) | (0.2671 − 0.4864j) | (−0.2242 − 0.7494j) |
| 806 | (−0.2773 − 1.0626j) | (−0.2671 + 0.4864j) | (−0.2242 − 1.1847j) |
| 807 | (−0.3392 − 1.3493j) | (−0.2671 − 0.4864j) | (−0.2242 − 0.6628j) |
| 808 | (0.1408 − 0.9984j) | (0.3557 + 0.4498j) | (−0.2242 + 0.7523j) |
| 809 | (0.2184 − 1.4989j) | (0.3557 − 0.4498j) | (−0.2242 − 0.1607j) |
| 810 | (−0.1557 − 0.9979j) | (−0.3557 + 0.4498j) | (−0.2242 + 0.6629j) |
| 811 | (−0.2305 − 1.4971j) | (−0.3557 − 0.4498j) | (−0.2242 − 0.0944j) |
| 812 | (0.2392 − 0.984j) | (0.3098 + 0.4844j) | (−0.2242 + 0.3594j) |
| 813 | (0.3623 − 1.4708j) | (0.3098 − 0.4844j) | (−0.2242 + 0.1597j) |
| 814 | (−0.2536 − 0.981j) | (−0.3098 + 0.4844j) | (−0.2242 + 0.4297j) |
| 815 | (−0.3706 − 1.4687j) | (−0.3098 − 0.4844j) | (−0.2242 + 0.0937j) |
| 816 | (0.0449 − 1.0969j) | (0.3069 + 0.3625j) | (−0.2242 + 0.9504j) |
| 817 | (0.0641 − 1.3898j) | (0.3069 − 0.3625j) | (−0.2242 − 0.2918j) |
| 818 | (−0.0605 − 1.0926j) | (−0.3069 + 0.3625j) | (−0.2242 + 1.3347j) |
| 819 | (−0.0755 − 1.3893j) | (−0.3069 − 0.3625j) | (−0.2242 − 0.503j) |
| 820 | (0.3587 − 1.0333j) | (0.2448 + 0.4128j) | (−0.2242 − 0.946j) |
| 821 | (0.4569 − 1.3142j) | (0.2448 − 0.4128j) | (−0.2242 − 0.8449j) |
| 822 | (−0.378 − 1.0328j) | (−0.2448 + 0.4128j) | (−0.2242 − 1.331j) |
| 823 | (−0.4736 − 1.3082j) | (−0.2448 − 0.4128j) | (−0.2242 − 0.5804j) |
| 824 | (0.0429 − 1.0191j) | (0.2662 + 0.3202j) | (−0.2242 + 0.8462j) |
| 825 | (0.0686 − 1.5132j) | (0.2662 − 0.3202j) | (−0.2242 − 0.2242j) |
| 826 | (−0.0648 − 1.0092j) | (−0.2662 + 0.3202j) | (−0.2242 + 0.5805j) |
| 827 | (−0.0795 − 1.5126j) | (−0.2662 − 0.3202j) | (−0.2242 − 0.0332j) |
| 828 | (0.3307 − 0.9507j) | (0.2125 + 0.367j) | (−0.2242 + 0.2916j) |
| 829 | (0.5016 − 1.4293j) | (0.2125 − 0.367j) | (−0.2242 + 0.2239j) |
| 830 | (−0.3502 − 0.9508j) | (−0.2125 + 0.367j) | (−0.2242 + 0.5035j) |
| 831 | (−0.5177 − 1.4235j) | (−0.2125 − 0.367j) | (−0.2242 + 0.0328j) |
| 832 | (1.0784 + 0.1597j) | (0.1893 + 0.1475j) | (0.5805 + 1.0626j) |
| 833 | (1.2742 + 0.1847j) | (0.1893 − 0.1475j) | (0.5805 − 0.3591j) |
| 834 | (−1.0825 + 0.1662j) | (−0.1893 + 0.1475j) | (0.5805 + 1.1878j) |
| 835 | (−1.3752 + 0.2111j) | (−0.1893 − 0.1475j) | (0.5805 − 0.4301j) |
| 836 | (1.0563 + 0.2659j) | (0.2314 + 0.0941j) | (0.5805 − 1.058j) |
| 837 | (1.2502 + 0.3076j) | (0.2314 − 0.0941j) | (0.5805 − 0.7494j) |
| 838 | (−1.0638 + 0.2757j) | (−0.2314 + 0.0941j) | (0.5805 − 1.1847j) |
| 839 | (−1.3486 + 0.3422j) | (−0.2314 − 0.0941j) | (0.5805 − 0.6628j) |
| 840 | (0.9951 + 0.1479j) | (0.1398 + 0.0991j) | (0.5805 + 0.7523j) |
| 841 | (1.3773 + 0.1969j) | (0.1398 − 0.0991j) | (0.5805 − 0.1607j) |
| 842 | (−1.0058 + 0.1556j) | (−0.1398 + 0.0991j) | (0.5805 + 0.6629j) |
| 843 | (−1.4969 + 0.2316j) | (−0.1398 − 0.0991j) | (0.5805 − 0.0944j) |
| 844 | (0.9768 + 0.245j) | (0.1843 + 0.0666j) | (0.5805 + 0.3594j) |
| 845 | (1.3521 + 0.3281j) | (0.1843 − 0.0666j) | (0.5805 + 0.1597j) |
| 846 | (−0.9837 + 0.2569j) | (−0.1843 + 0.0666j) | (0.5805 + 0.4297j) |
| 847 | (−1.4666 + 0.3789j) | (−0.1843 − 0.0666j) | (0.5805 + 0.0937j) |
| 848 | (1.0838 + 0.0529j) | (0.2352 + 0.1848j) | (0.5805 + 0.9504j) |
| 849 | (1.2863 + 0.0567j) | (0.2352 − 0.1848j) | (0.5805 − 0.2918j) |
| 850 | (−1.0962 + 0.0587j) | (−0.2352 + 0.1848j) | (0.5805 + 1.3347j) |
| 851 | (−1.3895 + 0.0714j) | (−0.2352 − 0.1848j) | (0.5805 − 0.503j) |
| 852 | (1.0289 + 0.3656j) | (0.2771 + 0.1258j) | (0.5805 − 0.946j) |
| 853 | (1.2154 + 0.4249j) | (0.2771 − 0.1258j) | (0.5805 − 0.8449j) |
| 854 | (−1.0295 + 0.3802j) | (−0.2771 + 0.1258j) | (0.5805 − 1.331j) |
| 855 | (−1.3075 + 0.4757j) | (−0.2771 − 0.1258j) | (0.5805 − 0.5804j) |
| 856 | (1.006 + 0.0523j) | (0.2763 + 0.2225j) | (0.5805 + 0.8462j) |
| 857 | (1.39 + 0.0615j) | (0.2763 − 0.2225j) | (0.5805 − 0.2242j) |
| 858 | (−1.0152 + 0.0528j) | (−0.2763 + 0.2225j) | (0.5805 + 0.5805j) |
| 859 | (−1.5125 + 0.0817j) | (−0.2763 − 0.2225j) | (0.5805 − 0.0332j) |
| 860 | (0.9507 + 0.3372j) | (0.3242 + 0.1645j) | (0.5805 + 0.2916j) |
| 861 | (1.3152 + 0.454j) | (0.3242 − 0.1645j) | (0.5805 + 0.2239j) |
| 862 | (−0.9467 + 0.3511j) | (−0.3242 + 0.1645j) | (0.5805 + 0.5035j) |

-continued

| Mapping | NN_QSL | NN_QSC | NN_RSC |
|---|---|---|---|
| 863 | (−1.4226 + 0.5201j) | (−0.3242 − 0.1645j) | (0.5805 + 0.0328j) |
| 864 | (1.0752 − 0.1571j) | (0.4086 + 0.3619j) | (−0.0332 + 1.0626j) |
| 865 | (1.2735 − 0.1898j) | (0.4086 − 0.3619j) | (−0.0332 − 0.3591j) |
| 866 | (−1.0862 − 0.1623j) | (−0.4086 + 0.3619j) | (−0.0332 + 1.1878j) |
| 867 | (−1.3769 − 0.1999j) | (−0.4086 − 0.3619j) | (−0.0332 − 0.4301j) |
| 868 | (1.0539 − 0.2656j) | (0.4865 + 0.2669j) | (−0.0332 − 1.058j) |
| 869 | (1.2487 − 0.3136j) | (0.4865 − 0.2669j) | (−0.0332 − 0.7494j) |
| 870 | (−1.0604 − 0.2658j) | (−0.4865 + 0.2669j) | (−0.0332 − 1.1847j) |
| 871 | (−1.3511 − 0.3321j) | (−0.4865 − 0.2669j) | (−0.0332 − 0.6628j) |
| 872 | (0.988 − 0.1488j) | (0.4504 + 0.3557j) | (−0.0332 + 0.7523j) |
| 873 | (1.3763 − 0.2037j) | (0.4504 − 0.3557j) | (−0.0332 − 0.1607j) |
| 874 | (−1.0072 − 0.1479j) | (−0.4504 + 0.3557j) | (−0.0332 + 0.6629j) |
| 875 | (−1.4996 − 0.2134j) | (−0.4504 − 0.3557j) | (−0.0332 − 0.0944j) |
| 876 | (0.9724 − 0.247j) | (0.4847 + 0.3094j) | (−0.0332 + 0.3594j) |
| 877 | (1.3498 − 0.3374j) | (0.4847 − 0.3094j) | (−0.0332 − 0.1597j) |
| 878 | (−0.9882 − 0.2467j) | (−0.4847 + 0.3094j) | (−0.0332 + 0.4297j) |
| 879 | (−1.4708 − 0.3622j) | (−0.4847 − 0.3094j) | (−0.0332 + 0.0937j) |
| 880 | (1.089 − 0.0592j) | (0.363 + 0.3068j) | (−0.0332 + 0.9504j) |
| 881 | (1.2859 − 0.0654j) | (0.363 − 0.3068j) | (−0.0332 − 0.2918j) |
| 882 | (−1.093 − 0.0536j) | (−0.363 + 0.3068j) | (−0.0332 + 1.3347j) |
| 883 | (−1.3899 − 0.0633j) | (−0.363 − 0.3068j) | (−0.0332 − 0.503j) |
| 884 | (1.0253 − 0.3732j) | (0.4129 + 0.2445j) | (−0.0332 − 0.946j) |
| 885 | (1.2132 − 0.4312j) | (0.4129 − 0.2445j) | (−0.0332 − 0.8449j) |
| 886 | (−1.0408 − 0.3706j) | (−0.4129 + 0.2445j) | (−0.0332 − 1.331j) |
| 887 | (−1.3113 − 0.4649j) | (−0.4129 − 0.2445j) | (−0.0332 − 0.5804j) |
| 888 | (1.0092 − 0.0483j) | (0.3205 + 0.2657j) | (−0.0332 − 0.8462j) |
| 889 | (1.3895 − 0.0711j) | (0.3205 − 0.2657j) | (−0.0332 − 0.2242j) |
| 890 | (−1.0172 − 0.0485j) | (−0.3205 + 0.2657j) | (−0.0332 + 0.5805j) |
| 891 | (−1.5133 − 0.0646j) | (−0.3205 − 0.2657j) | (−0.0332 − 0.0332j) |
| 892 | (0.9458 − 0.3399j) | (0.3674 + 0.2122j) | (−0.0332 − 0.2916j) |
| 893 | (1.3103 − 0.4677j) | (0.3674 − 0.2122j) | (−0.0332 − 0.2239j) |
| 894 | (−0.9545 − 0.3424j) | (−0.3674 + 0.2122j) | (−0.0332 + 0.5035j) |
| 895 | (−1.4303 − 0.4985j) | (−0.3674 − 0.2122j) | (−0.0332 + 0.0328j) |
| 896 | (0.6532 + 0.8818j) | (0.8022 + 0.8857j) | (0.2916 + 1.0626j) |
| 897 | (0.7689 + 1.0327j) | (0.8022 − 0.8857j) | (0.2916 − 0.3591j) |
| 898 | (−0.6455 + 0.8871j) | (−0.8022 + 0.8857j) | (0.2916 + 1.1878j) |
| 899 | (−0.8234 + 1.1215j) | (−0.8022 − 0.8857j) | (0.2916 − 0.4301j) |
| 900 | (0.5646 + 0.9425j) | (0.506 + 1.0783j) | (0.2916 − 1.058j) |
| 901 | (0.6666 + 1.1015j) | (0.506 − 1.0783j) | (0.2916 − 0.7494j) |
| 902 | (−0.5563 + 0.9462j) | (−0.506 + 1.0783j) | (0.2916 − 1.1847j) |
| 903 | (−0.7067 + 1.1985j) | (−0.506 − 1.0783j) | (0.2916 − 0.6628j) |
| 904 | (0.6029 + 0.8146j) | (0.7104 + 0.9607j) | (0.2916 + 0.7523j) |
| 905 | (0.9883 + 1.3235j) | (0.7104 − 0.9607j) | (0.2916 − 0.1607j) |
| 906 | (−0.5945 + 0.8251j) | (−0.7104 + 0.9607j) | (0.2916 + 0.6629j) |
| 907 | (−0.8944 + 1.2224j) | (−0.7104 − 0.9607j) | (0.2916 − 0.0944j) |
| 908 | (0.5233 + 0.8676j) | (0.6108 + 1.0246j) | (0.2916 + 0.3594j) |
| 909 | (0.8662 + 1.4065j) | (0.6108 − 1.0246j) | (0.2916 − 0.1597j) |
| 910 | (−0.5133 + 0.8727j) | (−0.6108 + 1.0246j) | (0.2916 + 0.4297j) |
| 911 | (−0.7718 + 1.3033j) | (−0.6108 − 1.0246j) | (0.2916 + 0.0937j) |
| 912 | (0.7297 + 0.8077j) | (0.7434 + 0.8215j) | (0.2916 + 0.9504j) |
| 913 | (0.8724 + 0.9469j) | (0.7434 − 0.8215j) | (0.2916 − 0.2918j) |
| 914 | (−0.729 + 0.8128j) | (−0.7434 + 0.8215j) | (0.2916 + 1.3347j) |
| 915 | (−0.929 + 1.0357j) | (−0.7434 − 0.8215j) | (0.2916 − 0.503j) |
| 916 | (0.4763 + 0.9931j) | (0.4684 + 0.9992j) | (0.2916 − 0.946j) |
| 917 | (0.5541 + 1.1622j) | (0.4684 − 0.9992j) | (0.2916 − 0.8449j) |
| 918 | (−0.4616 + 0.9907j) | (−0.4684 + 0.9992j) | (0.2916 − 1.331j) |
| 919 | (−0.5872 + 1.2613j) | (−0.4684 − 0.9992j) | (0.2916 − 0.5804j) |
| 920 | (0.6768 + 0.7481j) | (0.6577 + 0.8905j) | (0.2916 + 0.8462j) |
| 921 | (1.1181 + 1.2159j) | (0.6577 − 0.8905j) | (0.2916 − 0.2242j) |
| 922 | (−0.6755 + 0.7585j) | (−0.6577 + 0.8905j) | (0.2916 + 0.5805j) |
| 923 | (−1.0129 + 1.1262j) | (−0.6577 − 0.8905j) | (0.2916 − 0.0332j) |
| 924 | (0.4387 + 0.9208j) | (0.5657 + 0.9496j) | (0.2916 + 0.2916j) |
| 925 | (0.7372 + 1.4782j) | (0.5657 − 0.9496j) | (0.2916 + 0.2239j) |
| 926 | (−0.4289 + 0.9212j) | (−0.5657 + 0.9496j) | (0.2916 + 0.5035j) |
| 927 | (−0.6488 + 1.3687j) | (−0.5657 − 0.9496j) | (0.2916 + 0.0328j) |
| 928 | (0.6479 − 0.882j) | (0.8652 + 0.9554j) | (0.2239 + 1.0626j) |
| 929 | (0.7639 − 1.0364j) | (0.8652 − 0.9554j) | (0.2239 − 0.3591j) |
| 930 | (−0.6553 − 0.8759j) | (−0.8652 + 0.9554j) | (0.2239 + 1.1878j) |
| 931 | (−0.8344 − 1.1133j) | (−0.8652 − 0.9554j) | (0.2239 − 0.4301j) |
| 932 | (0.5559 − 0.9472j) | (0.5472 + 1.1638j) | (0.2239 − 1.058j) |
| 933 | (0.6621 − 1.1042j) | (0.5472 − 1.1638j) | (0.2239 − 0.7494j) |
| 934 | (−0.5669 − 0.9389j) | (−0.5472 + 1.1638j) | (0.2239 − 1.1847j) |
| 935 | (−0.7239 − 1.1881j) | (−0.5472 − 1.1638j) | (0.2239 − 0.6628j) |
| 936 | (0.5907 − 0.8185j) | (0.7666 + 1.0364j) | (0.2239 + 0.7523j) |
| 937 | (0.9877 − 1.324j) | (0.7666 − 1.0364j) | (0.2239 − 0.1607j) |
| 938 | (−0.6059 − 0.8127j) | (−0.7666 + 1.0364j) | (0.2239 + 0.6629j) |
| 939 | (−0.9008 − 1.2178j) | (−0.7666 − 1.0364j) | (0.2239 − 0.0944j) |

-continued

| Mapping | NN_QSL | NN_QSC | NN_RSC |
| --- | --- | --- | --- |
| 940 | (0.5129 − 0.8711j) | (0.6592 + 1.1052j) | (0.2239 + 0.3594j) |
| 941 | (0.8612 − 1.4095j) | (0.6592 − 1.1052j) | (0.2239 + 0.1597j) |
| 942 | (−0.5256 − 0.8663j) | (−0.6592 + 1.1052j) | (0.2239 + 0.4297j) |
| 943 | (−0.7915 − 1.2915j) | (−0.6592 − 1.1052j) | (0.2239 + 0.0937j) |
| 944 | (0.7269 − 0.8184j) | (0.9339 + 1.0315j) | (0.2239 + 0.9504j) |
| 945 | (0.8653 − 0.9534j) | (0.9339 − 1.0315j) | (0.2239 − 0.2918j) |
| 946 | (−0.7372 − 0.807j) | (−0.9339 + 1.0315j) | (0.2239 + 1.3347j) |
| 947 | (−0.9334 − 1.0318j) | (−0.9339 − 1.0315j) | (0.2239 − 0.503j) |
| 948 | (0.4592 − 0.9935j) | (0.5914 + 1.2566j) | (0.2239 − 0.946j) |
| 949 | (0.5837 − 1.263j) | (0.5914 − 1.2566j) | (0.2239 − 0.8449j) |
| 950 | (−0.4801 − 0.9887j) | (−0.5914 + 1.2566j) | (0.2239 − 1.331j) |
| 951 | (−0.6002 − 1.2552j) | (−0.5914 − 1.2566j) | (0.2239 − 0.5804j) |
| 952 | (0.6671 − 0.7639j) | (0.8275 + 1.1188j) | (0.2239 + 0.8462j) |
| 953 | (1.1142 − 1.2194j) | (0.8275 − 1.1188j) | (0.2239 − 0.2242j) |
| 954 | (−0.6836 − 0.744j) | (−0.8275 + 1.1188j) | (0.2239 + 0.5805j) |
| 955 | (−1.0229 − 1.1172j) | (−0.8275 − 1.1188j) | (0.2239 − 0.0332j) |
| 956 | (0.4203 − 0.9175j) | (0.7127 + 1.193j) | (0.2239 + 0.2916j) |
| 957 | (0.7214 − 1.4859j) | (0.7127 − 1.193j) | (0.2239 + 0.2239j) |
| 958 | (−0.4409 − 0.9147j) | (−0.7127 + 1.193j) | (0.2239 + 0.5035j) |
| 959 | (−0.6634 − 1.3617j) | (−0.7127 − 1.193j) | (0.2239 + 0.0328j) |
| 960 | (0.8769 + 0.647j) | (0.8858 + 0.8019j) | (0.5035 + 1.0626j) |
| 961 | (1.0411 + 0.7574j) | (0.8858 − 0.8019j) | (0.5035 − 0.3591j) |
| 962 | (−0.8744 + 0.6624j) | (−0.8858 + 0.8019j) | (0.5035 + 1.1878j) |
| 963 | (−1.1172 + 0.8293j) | (−0.8858 − 0.8019j) | (0.5035 − 0.4301j) |
| 964 | (0.9383 + 0.5578j) | (1.0787 + 0.5061j) | (0.5035 − 1.058j) |
| 965 | (1.1115 + 0.6498j) | (1.0787 − 0.5061j) | (0.5035 − 0.7494j) |
| 966 | (−0.9375 + 0.5721j) | (−1.0787 + 0.5061j) | (0.5035 − 1.1847j) |
| 967 | (−1.1891 + 0.7224j) | (−1.0787 − 0.5061j) | (0.5035 − 0.6628j) |
| 968 | (0.814 + 0.5948j) | (0.9607 + 0.7095j) | (0.5035 − 0.7523j) |
| 969 | (1.1276 + 0.8151j) | (0.9607 − 0.7095j) | (0.5035 − 0.1607j) |
| 970 | (−0.8049 + 0.6104j) | (−0.9607 + 0.7095j) | (0.5035 + 0.6629j) |
| 971 | (−1.2139 + 0.906j) | (−0.9607 − 0.7095j) | (0.5035 − 0.0944j) |
| 972 | (0.8693 + 0.5177j) | (1.025 + 0.6104j) | (0.5035 + 0.3594j) |
| 973 | (1.2028 + 0.6993j) | (1.025 − 0.6104j) | (0.5035 + 0.1597j) |
| 974 | (−0.8649 + 0.528j) | (−1.025 + 0.6104j) | (0.5035 + 0.4297j) |
| 975 | (−1.2958 + 0.7845j) | (−1.025 − 0.6104j) | (0.5035 + 0.0937j) |
| 976 | (0.8089 + 0.7301j) | (0.8214 + 0.7431j) | (0.5035 + 0.9504j) |
| 977 | (0.9582 + 0.86j) | (0.8214 − 0.7431j) | (0.5035 − 0.2918j) |
| 978 | (−0.8061 + 0.7389j) | (−0.8214 + 0.7431j) | (0.5035 + 1.3347j) |
| 979 | (−1.0319 + 0.9333j) | (−0.8214 − 0.7431j) | (0.5035 − 0.503j) |
| 980 | (0.9923 + 0.4623j) | (0.9992 + 0.4681j) | (0.5035 − 0.946j) |
| 981 | (1.1683 + 0.541j) | (0.9992 − 0.4681j) | (0.5035 − 0.8449j) |
| 982 | (−0.9856 + 0.4757j) | (−0.9992 + 0.4681j) | (0.5035 − 1.331j) |
| 983 | (−1.2561 + 0.5982j) | (−0.9992 − 0.4681j) | (0.5035 − 0.5804j) |
| 984 | (0.7466 + 0.6777j) | (0.8906 + 0.6574j) | (0.5035 + 0.8462j) |
| 985 | (1.0453 + 0.9182j) | (0.8906 − 0.6574j) | (0.5035 − 0.2242j) |
| 986 | (−0.7472 + 0.6886j) | (−0.8906 + 0.6574j) | (0.5035 + 0.5805j) |
| 987 | (−1.1228 + 1.0167j) | (−0.8906 − 0.6574j) | (0.5035 − 0.0332j) |
| 988 | (0.9147 + 0.4298j) | (0.9499 + 0.5651j) | (0.5035 + 0.2916j) |
| 989 | (1.2633 + 0.5829j) | (0.9499 − 0.5651j) | (0.5035 + 0.2239j) |
| 990 | (−0.9119 + 0.4417j) | (−0.9499 + 0.5651j) | (0.5035 + 0.5035j) |
| 991 | (−1.3666 + 0.6533j) | (−0.9499 − 0.5651j) | (0.5035 + 0.0328j) |
| 992 | (0.8655 − 0.653j) | (0.9556 + 0.8647j) | (0.0328 + 1.0626j) |
| 993 | (1.0331 − 0.7683j) | (0.9556 − 0.8647j) | (0.0328 − 0.3591j) |
| 994 | (−0.8785 − 0.6522j) | (−0.9556 + 0.8647j) | (0.0328 + 1.1878j) |
| 995 | (−1.1227 − 0.8217j) | (−0.9556 − 0.8647j) | (0.0328 − 0.4301j) |
| 996 | (0.9319 − 0.5627j) | (1.1638 + 0.5473j) | (0.0328 − 1.058j) |
| 997 | (1.1045 − 0.6616j) | (1.1638 − 0.5473j) | (0.0328 − 0.7494j) |
| 998 | (−0.938 − 0.5631j) | (−1.1638 + 0.5473j) | (0.0328 − 1.1847j) |
| 999 | (−1.1945 − 0.7134j) | (−1.1638 − 0.5473j) | (0.0328 − 0.6628j) |
| 1000 | (0.8033 − 0.6019j) | (1.0357 + 0.7657j) | (0.0328 − 0.7523j) |
| 1001 | (1.1238 − 0.8203j) | (1.0357 − 0.7657j) | (0.0328 − 0.1607j) |
| 1002 | (−0.8138 − 0.6023j) | (−1.0357 + 0.7657j) | (0.0328 + 0.6629j) |
| 1003 | (−1.2205 − 0.8971j) | (−1.0357 − 0.7657j) | (0.0328 − 0.0944j) |
| 1004 | (0.8538 − 0.5249j) | (1.1055 + 0.6592j) | (0.0328 + 0.3594j) |
| 1005 | (1.1972 − 0.7089j) | (1.1055 − 0.6592j) | (0.0328 + 0.1597j) |
| 1006 | (−0.8684 − 0.5228j) | (−1.1055 + 0.6592j) | (0.0328 + 0.4297j) |
| 1007 | (−1.3042 − 0.7704j) | (−1.1055 − 0.6592j) | (0.0328 + 0.0937j) |
| 1008 | (0.8025 − 0.7331j) | (1.0309 + 0.9337j) | (0.0328 + 0.9504j) |
| 1009 | (0.9536 − 0.865j) | (1.0309 − 0.9337j) | (0.0328 − 0.2918j) |
| 1010 | (−0.8166 − 0.7338j) | (−1.0309 + 0.9337j) | (0.0328 + 1.3347j) |
| 1011 | (−1.0327 − 0.9324j) | (−1.0309 − 0.9337j) | (0.0328 − 0.503j) |
| 1012 | (0.9794 − 0.4689j) | (1.2567 + 0.5915j) | (0.0328 − 0.946j) |
| 1013 | (1.1627 − 0.5531j) | (1.2567 − 0.5915j) | (0.0328 − 0.8449j) |
| 1014 | (−0.9855 − 0.4624j) | (−1.2567 + 0.5915j) | (0.0328 − 1.331j) |
| 1015 | (−1.2569 − 0.5967j) | (−1.2567 − 0.5915j) | (0.0328 − 0.5804j) |
| 1016 | (0.7398 − 0.6807j) | (1.1183 + 0.8269j) | (0.0328 + 0.8462j) |

-continued

| Mapping | NN_QSL | NN_QSC | NN_RSC |
|---|---|---|---|
| 1017 | (1.0371 − 0.9274j) | (1.1183 − 0.8269j) | (0.0328 − 0.2242j) |
| 1018 | (−0.7514 − 0.6796j) | (−1.1183 + 0.8269j) | (0.0328 + 0.5805j) |
| 1019 | (−1.1271 − 1.0119j) | (−1.1183 − 0.8269j) | (0.0328 − 0.0332j) |
| 1020 | (0.905 − 0.437j) | (1.193 + 0.7123j) | (0.0328 + 0.2916j) |
| 1021 | (1.259 − 0.5921j) | (1.193 − 0.7123j) | (0.0328 + 0.2239j) |
| 1022 | (−0.9134 − 0.4372j) | (−1.193 + 0.7123j) | (0.0328 + 0.5035j) |
| 1023 | (−1.3709 − 0.6442j) | (−1.193 − 0.7123j) | (0.0328 + 0.0328j). |

7. An apparatus, comprising:
a transceiver configured to receive configuration information including a signal-to-noise ratio (SNR) and a code rate; and
a controller configured to map, based on the SNR, data bits to pre-defined in-phase and quadrature values,
wherein the in-phase and quadrature values denote points on a two-dimensional (2D) space such that optimality of bitwise mutual information is adapted based on the SNR.

8. The apparatus of claim 7, wherein the mapping is according to a constraint selected from one of quadrant symmetry Lagrangian (QSL), quadrant symmetry constraint (QSC), or rectangular structure constraint (RSC).

9. The apparatus of claim 8, wherein the mapping is, for the code rate r equal to one of ⅓ or 11/15, according to:

| Mapping | Code Rate, r = 1/3 | Code Rate, r = 11/15 |
|---|---|---|
| 0 | (−0.2097 + 0.3403j) | (0.4907 + 0.0364j) |
| 1 | (−0.8372 + 1.2398j) | (0.733 + 0.0826j) |
| 2 | (0.1936 + 0.3481j) | (1.4016 + 0.2667j) |
| 3 | (0.796 + 1.2854j) | (1.0335 + 0.1572j) |
| 4 | (−0.1939 + 0.3283j) | (−0.0631 − 0.4863j) |
| 5 | (−0.3343 + 1.4425j) | (−0.124 − 0.7262j) |
| 6 | (0.1786 + 0.3361j) | (−0.3216 − 1.3896j) |
| 7 | (0.2682 + 1.4537j) | (−0.209 − 1.0221j) |
| 8 | (−0.194 − 0.3509j) | (0.3853 − 0.1957j) |
| 9 | (−0.7978 − 1.2857j) | (0.7104 − 0.2442j) |
| 10 | (0.2062 − 0.3392j) | (1.4333 − 0.2849j) |
| 11 | (0.8574 − 1.2622j) | (1.0537 − 0.2444j) |
| 12 | (−0.1782 − 0.3381j) | (0.1741 − 0.3976j) |
| 13 | (−0.2735 − 1.461j) | (0.2082 − 0.7241j) |
| 14 | (0.1898 − 0.3298j) | (0.223 − 1.4431j) |
| 15 | (0.3312 − 1.4431j) | (0.1977 − 1.0622j) |
| 16 | (−0.3204 + 0.5482j) | (0.0638 + 0.4865j) |
| 17 | (−0.5788 + 0.9226j) | (0.1225 + 0.726j) |
| 18 | (0.298 + 0.5581j) | (0.335 + 1.386j) |
| 19 | (0.5472 + 0.945j) | (0.2155 + 1.0211j) |
| 20 | (−0.2534 + 0.5721j) | (−0.4897 − 0.0399j) |
| 21 | (−0.2862 + 1.0536j) | (−0.7342 − 0.0864j) |
| 22 | (0.2353 + 0.5805j) | (−1.4092 − 0.2568j) |
| 23 | (0.2491 + 1.0588j) | (−1.0349 − 0.1617j) |
| 24 | (−0.2988 − 0.5626j) | (−0.1738 + 0.3927j) |
| 25 | (−0.5412 − 0.9449j) | (−0.2608 + 0.7201j) |
| 26 | (0.317 − 0.5426j) | (−0.2136 + 1.4405j) |
| 27 | (0.5812 − 0.9185j) | (−0.191 + 1.0578j) |
| 28 | (−0.2322 − 0.5813j) | (−0.3854 + 0.1923j) |
| 29 | (−0.2367 − 1.0684j) | (−0.7125 + 0.2403j) |
| 30 | (0.2575 − 0.5657j) | (−1.4237 + 0.2957j) |
| 31 | (0.2906 − 1.0509j) | (−1.0473 + 0.2465j) |
| 32 | (−0.352 + 0.1938j) | (0.3653 + 0.1894j) |
| 33 | (−1.2881 + 0.8197j) | (0.6174 + 0.3805j) |
| 34 | (0.3433 + 0.209j) | (1.196 + 0.7683j) |
| 35 | (1.2595 + 0.8631j) | (0.8805 + 0.5471j) |
| 36 | (−0.3413 + 0.1757j) | (−0.2085 − 0.3501j) |
| 37 | (−1.4694 + 0.2835j) | (−0.4147 − 0.5984j) |
| 38 | (0.3344 + 0.1928j) | (−0.8177 − 1.1683j) |
| 39 | (1.4572 + 0.3276j) | (−0.5933 − 0.8561j) |
| 40 | (−0.3444 − 0.2082j) | (0.171 − 0.0231j) |
| 41 | (−1.251 − 0.8582j) | (0.6615 − 0.4969j) |
| 42 | (0.3506 − 0.192j) | (1.2448 − 0.8446j) |

-continued

| Mapping | Code Rate, r = 1/3 | Code Rate, r = 11/15 |
|---|---|---|
| 43 | (1.2861 − 0.7998j) | (0.9254 − 0.6516j) |
| 44 | (−0.3322 − 0.1903j) | (0.0127 − 0.1724j) |
| 45 | (−1.4674 − 0.3372j) | (0.4644 − 0.6824j) |
| 46 | (0.3391 − 0.1761j) | (0.7842 − 1.2815j) |
| 47 | (1.4689 − 0.2864j) | (0.606 − 0.9536j) |
| 48 | (−0.5618 + 0.2961j) | (0.2077 + 0.3502j) |
| 49 | (−0.9392 + 0.546j) | (0.4094 + 0.5995j) |
| 50 | (0.548 + 0.3187j) | (0.8246 + 1.1648j) |
| 51 | (0.9214 + 0.5806j) | (0.5941 + 0.8515j) |
| 52 | (−0.5842 + 0.23j) | (−0.3639 − 0.1896j) |
| 53 | (−1.0695 + 0.2436j) | (−0.6211 − 0.3821j) |
| 54 | (0.5732 + 0.2577j) | (−1.2031 − 0.7729j) |
| 55 | (1.0582 + 0.287j) | (−0.8821 − 0.5525j) |
| 56 | (−0.555 − 0.3223j) | (−0.014 + 0.1707j) |
| 57 | (−0.9227 − 0.5751j) | (−0.4624 + 0.6764j) |
| 58 | (0.5616 − 0.2961j) | (−0.7756 + 1.2841j) |
| 59 | (0.9424 − 0.54j) | (−0.5986 + 0.9545j) |
| 60 | (−0.5733 − 0.2549j) | (−0.172 + 0.0203j) |
| 61 | (−1.0611 − 0.28j) | (−0.6556 + 0.4954j) |
| 62 | (0.5797 − 0.2343j) | (−1.2347 + 0.8481j) |
| 63 | (1.0608 − 0.2502j) | (−0.9178 + 0.6516j). |

10. The apparatus of claim 8, wherein the mapping, for the code rate r equal to one of ⅔ or ⅘, is according to:

| Mapping | Code Rate, r = 2/3 | Code Rate, r = 4/5 |
|---|---|---|
| 0 | (−1.0309 − 1.2883j) | (−0.833 − 0.6718j) |
| 1 | (−0.8502 − 1.0541j) | (−0.466 − 1.4825j) |
| 2 | (−1.0467 + 1.2821j) | (−1.0369 − 0.6834j) |
| 3 | (−0.8606 + 1.0438j) | (−0.1292 − 1.5554j) |
| 4 | (−0.1474 − 1.6275j) | (0.8439 − 0.6544j) |
| 5 | (−0.1214 − 1.3269j) | (0.4833 − 1.4678j) |
| 6 | (−0.1645 + 1.6214j) | (1.0517 − 0.6729j) |
| 7 | (−0.1376 + 1.325j) | (0.156 − 1.5533j) |
| 8 | (−0.1555 − 0.262j) | (−0.8424 + 0.6547j) |
| 9 | (−0.2661 − 0.3671j) | (−0.4881 + 1.4648j) |
| 10 | (−0.155 + 0.2545j) | (−1.0446 + 0.6609j) |
| 11 | (−0.2732 + 0.3618j) | (−0.1531 + 1.5416j) |
| 12 | (−0.0753 − 0.275j) | (0.8318 + 0.6704j) |
| 13 | (−0.091 − 0.4666j) | (0.4579 + 1.484j) |
| 14 | (−0.078 + 0.2773j) | (1.0374 + 0.6824j) |
| 15 | (−0.0927 + 0.4624j) | (0.1222 + 1.5554j) |
| 16 | (−1.2646 − 1.06j) | (−0.8114 − 0.8501j) |
| 17 | (−1.0432 − 0.8725j) | (−0.7666 − 1.0495j) |
| 18 | (−1.2775 + 1.044j) | (−1.0158 − 0.8862j) |
| 19 | (−1.0548 + 0.8607j) | (−0.9539 − 1.1302j) |
| 20 | (−1.6439 − 0.1751j) | (0.8213 − 0.8365j) |
| 21 | (−1.3545 − 0.1443j) | (0.7791 − 1.0298j) |
| 22 | (−1.651 + 0.1517j) | (1.0312 − 0.8741j) |
| 23 | (−1.3531 + 0.1252j) | (0.9748 − 1.1142j) |
| 24 | (−0.1967 − 0.1087j) | (−0.8216 + 0.8328j) |
| 25 | (−0.3748 − 0.2021j) | (−0.7772 + 1.0261j) |
| 26 | (−0.1918 + 0.0992j) | (−1.0317 + 0.8669j) |
| 27 | (−0.3822 + 0.194j) | (−0.9709 + 1.1098j) |
| 28 | (−0.1197 − 0.0802j) | (0.8112 + 0.8548j) |
| 29 | (−0.4481 − 0.0819j) | (0.7651 + 1.0524j) |
| 30 | (−0.12 + 0.0763j) | (1.0165 + 0.8875j) |
| 31 | (−0.4437 + 0.0772j) | (0.9567 + 1.1338j) |
| 32 | (−0.7569 − 1.458j) | (−0.6551 − 0.6444j) |

-continued

| Mapping | Code Rate, r = 2/3 | Code Rate, r = 4/5 |
|---|---|---|
| 33 | (−0.627 − 1.1912j) | (−0.5403 − 1.2205j) |
| 34 | (−0.7746 + 1.4527j) | (−1.2652 − 0.6149j) |
| 35 | (−0.6386 + 1.1796j) | (−0.7555 − 1.3569j) |
| 36 | (−0.4559 − 1.5578j) | (0.6635 − 0.6314j) |
| 37 | (−0.3829 − 1.283j) | (0.5625 − 1.2117j) |
| 38 | (−0.4772 + 1.5703j) | (1.2766 − 0.5888j) |
| 39 | (−0.3963 + 1.277j) | (0.7747 − 1.3429j) |
| 40 | (−0.1525 − 0.2635j) | (−0.6639 + 0.6303j) |
| 41 | (−0.2593 − 0.3793j) | (−0.5648 + 1.2103j) |
| 42 | (−0.1547 + 0.2555j) | (−1.2769 + 0.5883j) |
| 43 | (−0.2609 + 0.3724j) | (−0.7756 + 1.3405j) |
| 44 | (−0.0769 − 0.2775j) | (0.6564 + 0.6447j) |
| 45 | (−0.1068 − 0.4558j) | (0.5407 + 1.215j) |
| 46 | (−0.0812 + 0.2744j) | (1.2701 + 0.6103j) |
| 47 | (−0.1137 + 0.4524j) | (0.747 + 1.3553j) |
| 48 | (−1.4505 − 0.7934j) | (−0.6293 − 0.8119j) |
| 49 | (−1.1915 − 0.6534j) | (−0.5831 − 1.0052j) |
| 50 | (−1.4599 + 0.7759j) | (−1.2756 − 0.8434j) |
| 51 | (−1.1996 + 0.6368j) | (−1.2068 − 1.11j) |
| 52 | (−1.5785 − 0.4933j) | (0.6368 − 0.7976j) |
| 53 | (−1.2964 − 0.4059j) | (0.5969 − 0.9978j) |
| 54 | (−1.5821 + 0.4758j) | (1.2987 − 0.8262j) |
| 55 | (−1.2979 + 0.3889j) | (1.2221 − 1.0854j) |
| 56 | (−0.1926 − 0.1051j) | (−0.6437 − 0.804j) |
| 57 | (−0.3861 − 0.1959j) | (−0.6002 − 0.9983j) |
| 58 | (−0.2046 + 0.1038j) | (−1.2932 − 0.8204j) |
| 59 | (−0.394 + 0.2j) | (−1.2228 + 1.0901j) |
| 60 | (−0.1165 − 0.0829j) | (0.6281 + 0.8169j) |
| 61 | (−0.4419 − 0.0868j) | (0.5847 + 1.0103j) |
| 62 | (−0.1181 + 0.0789j) | (1.2836 + 0.8439j) |
| 63 | (−0.4446 + 0.0838j) | (1.205 + 1.104j) |
| 64 | (1.044 − 1.2792j) | (−0.834 − 0.5001j) |
| 65 | (0.8595 − 1.0416j) | (−0.8212 − 0.0749j) |
| 66 | (1.0288 + 1.2916j) | (−1.0203 − 0.5063j) |
| 67 | (0.8507 + 1.0572j) | (−0.997 − 0.0718j) |
| 68 | (0.168 − 1.6223j) | (0.8488 − 0.4913j) |
| 69 | (0.1391 − 1.3292j) | (0.8268 − 0.0627j) |
| 70 | (0.1467 + 1.6274j) | (1.0382 − 0.4922j) |
| 71 | (0.1258 + 1.3281j) | (1.0046 − 0.0538j) |
| 72 | (0.1596 − 0.2514j) | (−0.8417 + 0.4859j) |
| 73 | (0.2775 − 0.3696j) | (−0.8241 + 0.0628j) |
| 74 | (0.1528 + 0.2603j) | (−1.0297 + 0.4872j) |
| 75 | (0.2684 + 0.3683j) | (−0.9937 + 0.0545j) |
| 76 | (0.0786 − 0.2741j) | (0.8344 + 0.5052j) |
| 77 | (0.0952 − 0.4566j) | (0.8255 + 0.0768j) |
| 78 | (0.0802 + 0.2772j) | (1.023 + 0.5086j) |
| 79 | (0.0933 + 0.4616j) | (0.996 + 0.0707j) |
| 80 | (1.2775 − 1.0482j) | (−0.8367 − 0.3491j) |
| 81 | (1.0545 − 0.8602j) | (−0.8306 − 0.2127j) |
| 82 | (1.2616 + 1.0617j) | (−1.0358 − 0.3495j) |
| 83 | (1.0381 + 0.8704j) | (−1.0319 − 0.1928j) |
| 84 | (1.6461 − 0.1553j) | (0.8423 − 0.3354j) |
| 85 | (1.3551 − 0.1273j) | (0.8375 − 0.2003j) |
| 86 | (1.6492 + 0.174j) | (1.0431 − 0.3346j) |
| 87 | (1.3493 + 0.1466j) | (1.0385 − 0.1789j) |
| 88 | (0.1982 − 0.1043j) | (−0.8433 + 0.3323j) |
| 89 | (0.3859 − 0.1988j) | (−0.8386 + 0.1982j) |
| 90 | (0.1948 + 0.1048j) | (−1.0436 + 0.3294j) |
| 91 | (0.3772 + 0.2009j) | (−1.0397 + 0.1798j) |
| 92 | (0.1226 − 0.08j) | (0.8388 + 0.3504j) |
| 93 | (0.4501 − 0.0802j) | (0.8329 + 0.2123j) |
| 94 | (0.1137 + 0.076j) | (1.0448 + 0.3499j) |
| 95 | (0.4515 + 0.0848j) | (1.0381 + 0.1965j) |
| 96 | (0.7693 − 1.4481j) | (−0.6673 − 0.4924j) |
| 97 | (0.6373 − 1.1841j) | (−0.6625 − 0.072j) |
| 98 | (0.7545 + 1.4609j) | (−1.4663 − 0.4376j) |
| 99 | (0.6254 + 1.1911j) | (−1.4811 − 0.1441j) |
| 100 | (0.4742 − 1.5629j) | (0.6726 − 0.4751j) |
| 101 | (0.3951 − 1.2742j) | (0.6643 − 0.0629j) |
| 102 | (0.4549 + 1.5735j) | (1.4775 − 0.4139j) |
| 103 | (0.3825 + 1.2824j) | (1.4891 − 0.127j) |
| 104 | (0.1616 − 0.2614j) | (−0.6704 + 0.4743j) |
| 105 | (0.2623 − 0.3739j) | (−0.6565 + 0.065j) |
| 106 | (0.1531 + 0.2616j) | (−1.4695 + 0.4071j) |
| 107 | (0.2555 + 0.3781j) | (−1.4837 + 0.1219j) |
| 108 | (0.0813 − 0.2736j) | (0.6645 + 0.4893j) |
| 109 | (0.1158 − 0.4563j) | (0.6641 + 0.0743j) |

-continued

| Mapping | Code Rate, r = 2/3 | Code Rate, r = 4/5 |
|---|---|---|
| 110 | (0.0803 + 0.2742j) | (1.4647 + 0.4351j) |
| 111 | (0.1097 + 0.4545j) | (1.4832 + 0.1473j) |
| 112 | (1.464 − 0.778j) | (−0.6648 − 0.3425j) |
| 113 | (1.2006 − 0.6389j) | (−0.6658 − 0.2057j) |
| 114 | (1.4524 + 0.7969j) | (−1.2418 − 0.3367j) |
| 115 | (1.189 + 0.6528j) | (−1.2427 − 0.1189j) |
| 116 | (1.5838 − 0.4742j) | (0.6711 − 0.3333j) |
| 117 | (1.3004 − 0.3897j) | (0.6683 − 0.1985j) |
| 118 | (1.581 + 0.4938j) | (1.2527 − 0.3187j) |
| 119 | (1.2996 + 0.408j) | (1.2424 − 0.0953j) |
| 120 | (0.1985 − 0.1041j) | (−0.6691 + 0.331j) |
| 121 | (0.3847 − 0.1915j) | (−0.6655 + 0.1958j) |
| 122 | (0.1946 + 0.1041j) | (−1.2532 + 0.3148j) |
| 123 | (0.3839 + 0.1962j) | (−1.2427 + 0.0971j) |
| 124 | (0.1191 − 0.0776j) | (0.6663 + 0.3461j) |
| 125 | (0.4508 − 0.0861j) | (0.6642 + 0.2081j) |
| 126 | (0.1167 + 0.0799j) | (1.2465 + 0.3391j) |
| 127 | (0.4443 + 0.0901j) | (1.2407 + 0.1196j) |
| 128 | (−0.6035 − 0.7372j) | (−0.3426 − 0.5924j) |
| 129 | (−0.7155 − 0.8765j) | (−0.2948 − 1.317j) |
| 130 | (−0.6096 + 0.728j) | (−0.1952 − 0.5751j) |
| 131 | (−0.722 + 0.8656j) | (−0.095 − 1.3018j) |
| 132 | (−0.0972 − 0.9395j) | (0.3513 − 0.5857j) |
| 133 | (−0.1068 − 1.1062j) | (0.3113 − 1.3081j) |
| 134 | (−0.1056 + 0.9375j) | (0.2063 − 0.5717j) |
| 135 | (−0.117 + 1.1098j) | (0.1108 − 1.3018j) |
| 136 | (−0.4901 − 0.6017j) | (−0.352 + 0.5866j) |
| 137 | (−0.3868 − 0.4884j) | (−0.3127 + 1.3081j) |
| 138 | (−0.4948 + 0.5952j) | (−0.2069 + 0.5749j) |
| 139 | (−0.389 + 0.4809j) | (−0.1122 + 1.2975j) |
| 140 | (−0.092 − 0.7733j) | (0.3472 + 0.5924j) |
| 141 | (−0.0898 − 0.6254j) | (0.2899 + 1.3204j) |
| 142 | (−0.1033 + 0.7706j) | (0.196 + 0.5779j) |
| 143 | (−0.099 + 0.6252j) | (0.0884 + 1.3025j) |
| 144 | (−0.7442 − 0.6004j) | (−0.3296 − 0.7415j) |
| 145 | (−0.8755 − 0.7254j) | (−0.2982 − 0.8937j) |
| 146 | (−0.7527 + 0.5925j) | (−0.1843 − 0.722j) |
| 147 | (−0.8812 + 0.7162j) | (−0.1784 − 0.8835j) |
| 148 | (−0.9662 − 0.1059j) | (0.3428 − 0.7309j) |
| 149 | (−1.1316 − 0.1181j) | (0.3163 − 0.8929j) |
| 150 | (−0.9633 + 0.0941j) | (0.1964 − 0.7202j) |
| 151 | (−1.1364 + 0.1062j) | (0.1902 − 0.8809j) |
| 152 | (−0.6278 − 0.4704j) | (−0.3444 + 0.7346j) |
| 153 | (−0.5174 − 0.3498j) | (−0.3167 + 0.8895j) |
| 154 | (−0.6352 + 0.4622j) | (−0.1963 + 0.7189j) |
| 155 | (−0.5174 + 0.3423j) | (−0.1927 + 0.8775j) |
| 156 | (−0.7918 − 0.1017j) | (0.328 + 0.7406j) |
| 157 | (−0.6303 − 0.101j) | (0.2989 + 0.8936j) |
| 158 | (−0.7784 + 0.0789j) | (0.1823 + 0.7228j) |
| 159 | (−0.6302 + 0.0919j) | (0.1725 + 0.8831j) |
| 160 | (−0.4587 − 0.8301j) | (−0.4947 − 0.6114j) |
| 161 | (−0.5311 − 0.9906j) | (−0.3248 − 1.1294j) |
| 162 | (−0.4685 + 0.821j) | (−0.061 − 0.566j) |
| 163 | (−0.5439 + 0.9794j) | (−0.0995 − 1.1051j) |
| 164 | (−0.2781 − 0.9041j) | (0.5007 − 0.6053j) |
| 165 | (−0.3272 − 1.0694j) | (0.3383 − 1.1214j) |
| 166 | (−0.287 + 0.9011j) | (0.0701 − 0.5642j) |
| 167 | (−0.3357 + 1.0624j) | (0.1164 − 1.0996j) |
| 168 | (−0.3952 − 0.6655j) | (−0.5035 + 0.6025j) |
| 169 | (−0.3406 − 0.5227j) | (−0.3414 + 1.1211j) |
| 170 | (−0.4004 + 0.6579j) | (−0.073 + 0.5639j) |
| 171 | (−0.344 + 0.5158j) | (−0.1216 + 1.1005j) |
| 172 | (−0.2179 − 0.7465j) | (0.4932 + 0.612j) |
| 173 | (−0.1619 − 0.613j) | (0.3197 + 1.1293j) |
| 174 | (−0.2257 + 0.7407j) | (0.0628 + 0.5591j) |
| 175 | (−0.1663 + 0.6071j) | (0.0984 + 1.0998j) |
| 176 | (−0.8432 − 0.4615j) | (−0.4759 − 0.7767j) |
| 177 | (−0.9992 − 0.5457j) | (−0.4226 − 0.961j) |
| 178 | (−0.8513 + 0.4563j) | (−0.0545 − 0.7211j) |
| 179 | (−1.0027 + 0.5337j) | (−0.0625 − 0.9204j) |
| 180 | (−0.9271 − 0.2802j) | (0.487 − 0.7678j) |
| 181 | (−1.0898 − 0.3382j) | (0.4409 − 0.9567j) |
| 182 | (−0.9279 + 0.2705j) | (0.0662 − 0.7211j) |
| 183 | (−1.0956 + 0.3271j) | (0.0766 − 0.9222j) |
| 184 | (−0.6893 − 0.3855j) | (−0.49 + 0.7663j) |
| 185 | (−0.5386 − 0.3113j) | (−0.439 + 0.9536j) |
| 186 | (−0.6925 + 0.3774j) | (−0.0673 + 0.7196j) |

| Mapping | Code Rate, r = 2/3 | Code Rate, r = 4/5 |
|---|---|---|
| 187 | (−0.5459 + 0.303j) | (−0.0782 + 0.9219j) |
| 188 | (−0.7697 − 0.2125j) | (0.4742 + 0.774j) |
| 189 | (−0.6195 − 0.1445j) | (0.4222 + 0.959j) |
| 190 | (−0.7733 + 0.2059j) | (0.0566 + 0.7256j) |
| 191 | (−0.6181 + 0.139j) | (0.0591 + 0.9217j) |
| 192 | (0.6147 − 0.7308j) | (−0.3488 − 0.4502j) |
| 193 | (0.7226 − 0.8647j) | (−0.3681 − 0.0663j) |
| 194 | (0.6019 + 0.737j) | (−0.2044 − 0.4357j) |
| 195 | (0.7121 + 0.8745j) | (−0.2162 − 0.0601j) |
| 196 | (0.1067 − 0.9378j) | (0.3578 − 0.4463j) |
| 197 | (0.1198 − 1.1044j) | (0.3589 − 0.0613j) |
| 198 | (0.0973 + 0.9358j) | (0.2127 − 0.4358j) |
| 199 | (0.1074 + 1.1064j) | (0.219 − 0.0588j) |
| 200 | (0.4999 − 0.5998j) | (−0.3584 + 0.4476j) |
| 201 | (0.3925 − 0.4818j) | (−0.3635 + 0.0628j) |
| 202 | (0.4906 + 0.6037j) | (−0.2118 + 0.4348j) |
| 203 | (0.3846 + 0.484j) | (−0.2172 + 0.0603j) |
| 204 | (0.1019 − 0.7708j) | (0.3513 + 0.4528j) |
| 205 | (0.0992 − 0.6236j) | (0.3634 + 0.0671j) |
| 206 | (0.0958 + 0.7708j) | (0.202 + 0.4379j) |
| 207 | (0.0927 + 0.6249j) | (0.2195 + 0.0627j) |
| 208 | (0.7555 − 0.5917j) | (−0.3572 − 0.3189j) |
| 209 | (0.8805 − 0.715j) | (−0.3645 − 0.1912j) |
| 210 | (0.7434 + 0.6016j) | (−0.2071 − 0.3094j) |
| 211 | (0.8701 + 0.7261j) | (−0.2152 − 0.1813j) |
| 212 | (0.9663 − 0.0933j) | (0.3612 − 0.3139j) |
| 213 | (1.1382 − 0.1046j) | (0.3637 − 0.1844j) |
| 214 | (0.9617 + 0.1077j) | (0.2159 − 0.3054j) |
| 215 | (1.1339 + 0.1207j) | (0.2181 − 0.1782j) |
| 216 | (0.6318 − 0.4615j) | (−0.3602 + 0.3131j) |
| 217 | (0.525 − 0.3414j) | (−0.361 + 0.1865j) |
| 218 | (0.6265 + 0.4726j) | (−0.2146 + 0.3078j) |
| 219 | (0.5164 + 0.3477j) | (−0.2214 + 0.187j) |
| 220 | (0.795 − 0.0914j) | (0.3586 + 0.3214j) |
| 221 | (0.6293 − 0.0901j) | (0.3616 + 0.1939j) |
| 222 | (0.7951 + 0.0982j) | (0.2086 + 0.3082j) |
| 223 | (0.6326 + 0.1012j) | (0.2147 + 0.1801j) |
| 224 | (0.4667 − 0.8203j) | (−0.4985 − 0.4678j) |
| 225 | (0.5406 − 0.9826j) | (−0.5089 − 0.0659j) |
| 226 | (0.4585 + 0.827j) | (−0.0658 − 0.4274j) |
| 227 | (0.5299 + 0.9888j) | (−0.0741 − 0.0613j) |
| 228 | (0.2871 − 0.902j) | (0.5103 − 0.4618j) |
| 229 | (0.3345 − 1.0594j) | (0.5132 − 0.0606j) |
| 230 | (0.2773 + 0.8994j) | (0.0681 − 0.4285j) |
| 231 | (0.3241 + 1.0686j) | (0.0758 − 0.0607j) |
| 232 | (0.4021 − 0.6614j) | (−0.5094 + 0.4606j) |
| 233 | (0.3489 − 0.5163j) | (−0.5092 + 0.0609j) |
| 234 | (0.3966 + 0.6663j) | (−0.073 + 0.4284j) |
| 235 | (0.3383 + 0.5148j) | (−0.068 + 0.0594j) |
| 236 | (0.2267 − 0.7435j) | (0.5029 + 0.4687j) |
| 237 | (0.1686 − 0.6051j) | (0.5118 + 0.0715j) |
| 238 | (0.217 + 0.7431j) | (0.0645 + 0.4234j) |
| 239 | (0.1593 + 0.6089j) | (0.075 + 0.0621j) |
| 240 | (0.8506 − 0.4537j) | (−0.5062 − 0.3344j) |
| 241 | (1.003 − 0.532j) | (−0.5069 − 0.2014j) |
| 242 | (0.8401 + 0.4644j) | (−0.0709 − 0.3015j) |
| 243 | (0.9958 + 0.5484j) | (−0.0716 − 0.1761j) |
| 244 | (0.9293 − 0.2696j) | (0.5109 − 0.3256j) |
| 245 | (1.0919 − 0.3262j) | (0.5134 − 0.1941j) |
| 246 | (0.9291 + 0.2847j) | (0.0739 − 0.3015j) |
| 247 | (1.0848 + 0.3413j) | (0.0733 − 0.1766j) |
| 248 | (0.6916 − 0.3755j) | (−0.5106 + 0.3233j) |
| 249 | (0.5505 − 0.305j) | (−0.5106 + 0.1935j) |
| 250 | (0.6919 + 0.3891j) | (−0.0733 + 0.2979j) |
| 251 | (0.5408 + 0.309j) | (−0.0729 + 0.1793j) |
| 252 | (0.7709 − 0.201j) | (0.5078 + 0.3338j) |
| 253 | (0.6217 − 0.139j) | (0.5098 + 0.2009j) |
| 254 | (0.7696 + 0.216j) | (0.0676 + 0.3007j) |
| 255 | (0.616 + 0.1473j) | (0.0729 + 0.1779j). |

11. The apparatus of claim 8, wherein the mapping is, for one of a neural network subject to the QSL constraint (NN_QSL), a neural network subject to the QSC constraint (NN_QSC), or a neural network subject to the RSC constraint (NN_RSC), according to:

| Mapping | NN_QSL | NN_QSC | NN_RSC |
|---|---|---|---|
| 0 | (−0.4436 + 0.1629j) | (0.1882 + 0.0524j) | (−0.3051 − 0.3051j) |
| 1 | (−0.3972 + 0.9864j) | (0.1882 − 0.0524j) | (−0.3051 − 0.3045j) |
| 2 | (−0.4398 + 0.2783j) | (−0.1882 + 0.0524j) | (−0.3051 − 0.7193j) |
| 3 | (−0.4297 + 0.6732j) | (−0.1882 − 0.0524j) | (−0.3051 − 0.7851j) |
| 4 | (−0.0602 + 0.1666j) | (0.1889 + 0.0525j) | (−0.3051 + 0.3039j) |
| 5 | (−0.0498 + 0.8944j) | (0.1889 − 0.0525j) | (−0.3051 + 0.3027j) |
| 6 | (−0.0583 + 0.283j) | (−0.1889 + 0.0525j) | (−0.3051 + 0.7189j) |
| 7 | (−0.0629 + 0.6689j) | (−0.1889 − 0.0525j) | (−0.3051 + 0.7866j) |
| 8 | (−0.4539 + 0.1628j) | (0.1383 + 0.3806j) | (−0.3051 − 0.4316j) |
| 9 | (−0.4065 + 0.8715j) | (0.1383 − 0.3806j) | (−0.3051 − 0.4374j) |
| 10 | (−0.4512 + 0.2785j) | (−0.1383 + 0.3806j) | (−0.3051 − 0.5905j) |
| 11 | (−0.4253 + 0.7369j) | (−0.1383 − 0.3806j) | (−0.3051 − 0.5662j) |
| 12 | (−0.0591 + 0.1668j) | (0.1413 + 0.3788j) | (−0.3051 + 0.4309j) |
| 13 | (−0.0678 + 0.8242j) | (0.1413 − 0.3788j) | (−0.3051 + 0.4375j) |
| 14 | (−0.0612 + 0.2851j) | (−0.1413 + 0.3788j) | (−0.3051 + 0.5905j) |
| 15 | (−0.063 + 0.7017j) | (−0.1413 − 0.3788j) | (−0.3051 + 0.5676j) |
| 16 | (−0.4427 + 0.1627j) | (1.1863 + 0.2942j) | (−0.3051 − 0.1795j) |
| 17 | (−0.4016 + 0.994j) | (1.1863 − 0.2942j) | (−0.3051 − 0.1792j) |
| 18 | (−0.4387 + 0.2802j) | (−1.1863 + 0.2942j) | (−0.3051 − 1.0559j) |
| 19 | (−0.4308 + 0.6764j) | (−1.1863 − 0.2942j) | (−0.3051 − 0.919j) |
| 20 | (−0.0611 + 0.1684j) | (1.149 + 0.406j) | (−0.3051 + 0.1794j) |
| 21 | (−0.0514 + 0.8961j) | (1.149 − 0.406j) | (−0.3051 + 0.1796j) |
| 22 | (−0.0619 + 0.284j) | (−1.149 + 0.406j) | (−0.3051 + 1.0561j) |
| 23 | (−0.0595 + 0.668j) | (−1.149 − 0.406j) | (−0.3051 + 0.9201j) |
| 24 | (−0.4556 + 0.162j) | (0.2812 + 1.0761j) | (−0.3051 − 0.0609j) |
| 25 | (−0.4051 + 0.8665j) | (0.2812 − 1.0761j) | (−0.3051 − 0.0607j) |
| 26 | (−0.4501 + 0.2784j) | (−0.2812 + 1.0761j) | (−0.3051 − 1.2271j) |
| 27 | (−0.4242 + 0.7339j) | (−0.2812 − 1.0761j) | (−0.3051 − 1.4453j) |
| 28 | (−0.0613 + 0.1682j) | (0.3918 + 1.0585j) | (−0.3051 + 0.0601j) |
| 29 | (−0.0681 + 0.8258j) | (0.3918 − 1.0585j) | (−0.3051 + 0.0601j) |
| 30 | (−0.0614 + 0.2838j) | (−0.3918 + 1.0585j) | (−0.3051 + 1.228j) |
| 31 | (−0.0642 + 0.7042j) | (−0.3918 − 1.0585j) | (−0.3051 + 1.4486j) |
| 32 | (−0.4433 + 0.0562j) | (0.0634 + 0.052j) | (−0.3045 − 0.3051j) |
| 33 | (−0.3879 + 1.1503j) | (0.0634 − 0.052j) | (−0.3045 − 0.3045j) |

-continued

| Mapping | NN_QSL | NN_QSC | NN_RSC |
|---|---|---|---|
| 34 | (−0.4381 + 0.3983j) | (−0.0634 + 0.052j) | (−0.3045 − 0.7193j) |
| 35 | (−0.4351 + 0.544j) | (−0.0634 − 0.052j) | (−0.3045 − 0.7851j) |
| 36 | (−0.0617 + 0.0568j) | (0.0626 + 0.052j) | (−0.3045 + 0.3039j) |
| 37 | (−0.0842 + 1.6424j) | (0.0626 − 0.052j) | (−0.3045 + 0.3027j) |
| 38 | (−0.0612 + 0.4045j) | (−0.0626 + 0.052j) | (−0.3045 + 0.7189j) |
| 39 | (−0.063 + 0.5411j) | (−0.0626 − 0.052j) | (−0.3045 + 0.7866j) |
| 40 | (−0.4568 + 0.0559j) | (0.0483 + 0.3828j) | (−0.3045 − 0.4316j) |
| 41 | (−0.3739 + 1.2957j) | (0.0483 − 0.3828j) | (−0.3045 − 0.4374j) |
| 42 | (−0.4457 + 0.3965j) | (−0.0483 + 0.3828j) | (−0.3045 − 0.5905j) |
| 43 | (−0.438 + 0.5248j) | (−0.0483 − 0.3828j) | (−0.3045 − 0.5662j) |
| 44 | (−0.0621 + 0.0574j) | (0.0465 + 0.383j) | (−0.3045 + 0.4309j) |
| 45 | (−0.0719 + 1.4634j) | (0.0465 − 0.383j) | (−0.3045 + 0.4375j) |
| 46 | (−0.0624 + 0.4067j) | (−0.0465 + 0.383j) | (−0.3045 + 0.5905j) |
| 47 | (−0.0623 + 0.5313j) | (−0.0465 − 0.383j) | (−0.3045 + 0.5676j) |
| 48 | (−0.4439 + 0.0559j) | (1.2119 + 0.1779j) | (−0.3045 − 0.1795j) |
| 49 | (−0.388 + 1.1192j) | (1.2119 − 0.1779j) | (−0.3045 − 0.1792j) |
| 50 | (−0.4354 + 0.3947j) | (−1.2119 + 0.1779j) | (−0.3045 − 1.0559j) |
| 51 | (−0.4355 + 0.5456j) | (−1.2119 − 0.1779j) | (−0.3045 − 0.919j) |
| 52 | (−0.0614 + 0.058j) | (1.2248 + 0.0595j) | (−0.3045 + 0.1794j) |
| 53 | (−0.266 + 1.6246j) | (1.2248 − 0.0595j) | (−0.3045 + 0.1796j) |
| 54 | (−0.0612 + 0.4046j) | (−1.2248 + 0.0595j) | (−0.3045 + 1.0561j) |
| 55 | (−0.0626 + 0.5408j) | (−1.2248 − 0.0595j) | (−0.3045 + 0.9201j) |
| 56 | (−0.4569 + 0.055j) | (0.1696 + 1.0853j) | (−0.3045 − 0.0609j) |
| 57 | (−0.3281 + 1.4063j) | (0.1696 − 1.0853j) | (−0.3045 − 0.0607j) |
| 58 | (−0.4444 + 0.3973j) | (−0.1696 + 1.0853j) | (−0.3045 − 1.2271j) |
| 59 | (−0.4386 + 0.5241j) | (−0.1696 − 1.0853j) | (−0.3045 − 1.4453j) |
| 60 | (−0.0617 + 0.0572j) | (0.057 + 1.0886j) | (−0.3045 + 0.0601j) |
| 61 | (−0.2102 + 1.4711j) | (0.057 − 1.0886j) | (−0.3045 + 0.0601j) |
| 62 | (−0.059 + 0.4039j) | (−0.057 + 1.0886j) | (−0.3045 + 1.228j) |
| 63 | (−0.0618 + 0.5322j) | (−0.057 − 1.0886j) | (−0.3045 + 1.4486j) |
| 64 | (−0.3132 + 0.1607j) | (0.3061 + 0.0563j) | (−0.7193 − 0.3051j) |
| 65 | (−0.2576 + 0.9857j) | (0.3061 − 0.0563j) | (−0.7193 − 0.3045j) |
| 66 | (−0.3106 + 0.2787j) | (−0.3061 + 0.0563j) | (−0.7193 − 0.7193j) |
| 67 | (−0.3064 + 0.6693j) | (−0.3061 − 0.0563j) | (−0.7193 − 0.7851j) |
| 68 | (−0.1824 + 0.166j) | (0.306 + 0.0563j) | (−0.7193 + 0.3039j) |
| 69 | (−0.1233 + 0.9671j) | (0.306 − 0.0563j) | (−0.7193 + 0.3027j) |
| 70 | (−0.1819 + 0.2796j) | (−0.306 + 0.0563j) | (−0.7193 + 0.7189j) |
| 71 | (−0.1851 + 0.6654j) | (−0.306 − 0.0563j) | (−0.7193 + 0.7866j) |
| 72 | (−0.3111 + 0.1624j) | (0.1843 + 0.4706j) | (−0.7193 − 0.4316j) |
| 73 | (−0.2822 + 0.8615j) | (0.1843 − 0.4706j) | (−0.7193 − 0.4374j) |
| 74 | (−0.3093 + 0.2794j) | (−0.1843 + 0.4706j) | (−0.7193 − 0.5905j) |
| 75 | (−0.3039 + 0.7217j) | (−0.1843 − 0.4706j) | (−0.7193 − 0.5662j) |
| 76 | (−0.1806 + 0.1652j) | (0.2033 + 0.4579j) | (−0.7193 + 0.4309j) |
| 77 | (−0.1752 + 0.8407j) | (0.2033 − 0.4579j) | (−0.7193 + 0.4375j) |
| 78 | (−0.185 + 0.2805j) | (−0.2033 + 0.4579j) | (−0.7193 + 0.5905j) |
| 79 | (−0.1838 + 0.7066j) | (−0.2033 − 0.4579j) | (−0.7193 + 0.5676j) |
| 80 | (−0.3135 + 0.1615j) | (1.291 + 0.3246j) | (−0.7193 − 0.1795j) |
| 81 | (−0.258 + 0.9839j) | (1.291 − 0.3246j) | (−0.7193 − 0.1792j) |
| 82 | (−0.3122 + 0.2776j) | (−1.291 + 0.3246j) | (−0.7193 − 1.0559j) |
| 83 | (−0.3101 + 0.6718j) | (−1.291 − 0.3246j) | (−0.7193 − 0.919j) |
| 84 | (−0.1822 + 0.1652j) | (1.2498 + 0.4482j) | (−0.7193 + 0.1794j) |
| 85 | (−0.1249 + 0.9632j) | (1.2498 − 0.4482j) | (−0.7193 + 0.1796j) |
| 86 | (−0.1832 + 0.2813j) | (−1.2498 + 0.4482j) | (−0.7193 + 1.0561j) |
| 87 | (−0.1845 + 0.6644j) | (−1.2498 − 0.4482j) | (−0.7193 + 0.9201j) |
| 88 | (−0.3089 + 0.1662j) | (0.2952 + 1.1878j) | (−0.7193 − 0.0609j) |
| 89 | (−0.2832 + 0.8595j) | (0.2952 − 1.1878j) | (−0.7193 − 0.0607j) |
| 90 | (−0.3096 + 0.2789j) | (−0.2952 + 1.1878j) | (−0.7193 − 1.2271j) |
| 91 | (−0.3021 + 0.7201j) | (−0.2952 − 1.1878j) | (−0.7193 − 1.4453j) |
| 92 | (−0.1826 + 0.164j) | (0.4147 + 1.1678j) | (−0.7193 + 0.0601j) |
| 93 | (−0.1764 + 0.8416j) | (0.4147 − 1.1678j) | (−0.7193 + 0.0601j) |
| 94 | (−0.1823 + 0.2813j) | (−0.4147 + 1.1678j) | (−0.7193 + 1.228j) |
| 95 | (−0.1847 + 0.7051j) | (−0.4147 − 1.1678j) | (−0.7193 + 1.4486j) |
| 96 | (−0.3148 + 0.0557j) | (0.4542 + 0.0691j) | (−0.7851 − 0.3051j) |
| 97 | (−0.2397 + 1.1183j) | (0.4542 − 0.0691j) | (−0.7851 − 0.3045j) |
| 98 | (−0.312 + 0.3976j) | (−0.4542 + 0.0691j) | (−0.7851 − 0.7193j) |
| 99 | (−0.3119 + 0.5402j) | (−0.4542 − 0.0691j) | (−0.7851 − 0.7851j) |
| 100 | (−0.1822 + 0.0543j) | (0.4539 + 0.069j) | (−0.7851 + 0.3039j) |
| 101 | (−0.0747 + 1.098j) | (0.4539 − 0.069j) | (−0.7851 + 0.3027j) |
| 102 | (−0.1814 + 0.3982j) | (−0.4539 + 0.069j) | (−0.7851 + 0.7189j) |
| 103 | (−0.1849 + 0.5416j) | (−0.4539 − 0.069j) | (−0.7851 + 0.7866j) |
| 104 | (−0.3132 + 0.0555j) | (0.0723 + 0.5171j) | (−0.7851 − 0.4316j) |
| 105 | (−0.2252 + 1.2542j) | (0.0723 − 0.5171j) | (−0.7851 − 0.4374j) |
| 106 | (−0.3079 + 0.3991j) | (−0.0723 + 0.5171j) | (−0.7851 − 0.5905j) |
| 107 | (−0.3118 + 0.5237j) | (−0.0723 − 0.5171j) | (−0.7851 − 0.5662j) |
| 108 | (−0.1825 + 0.0554j) | (0.0491 + 0.5202j) | (−0.7851 + 0.4309j) |
| 109 | (−0.0704 + 1.2881j) | (0.0491 − 0.5202j) | (−0.7851 + 0.4375j) |
| 110 | (−0.1825 + 0.4018j) | (−0.0491 + 0.5202j) | (−0.7851 + 0.5905j) |

-continued

| Mapping | NN_QSL | NN_QSC | NN_RSC |
|---|---|---|---|
| 111 | (−0.1827 + 0.5292j) | (−0.0491 − 0.5202j) | (−0.7851 + 0.5676j) |
| 112 | (−0.315 + 0.0547j) | (1.3191 + 0.1962j) | (−0.7851 − 0.1795j) |
| 113 | (−0.2356 + 1.1172j) | (1.3191 − 0.1962j) | (−0.7851 − 0.1792j) |
| 114 | (−0.3117 + 0.3978j) | (−1.3191 + 0.1962j) | (−0.7851 − 1.0559j) |
| 115 | (−0.3121 + 0.5414j) | (−1.3191 − 0.1962j) | (−0.7851 − 0.919j) |
| 116 | (−0.1835 + 0.0561j) | (1.3334 + 0.0658j) | (−0.7851 + 0.1794j) |
| 117 | (−0.0758 + 1.1042j) | (1.3334 − 0.0658j) | (−0.7851 + 0.1796j) |
| 118 | (−0.1826 + 0.3999j) | (−1.3334 + 0.0658j) | (−0.7851 + 1.0561j) |
| 119 | (−0.1849 + 0.5419j) | (−1.3334 − 0.0658j) | (−0.7851 + 0.9201j) |
| 120 | (−0.3141 + 0.056j) | (0.1765 + 1.1997j) | (−0.7851 − 0.0609j) |
| 121 | (−0.2127 + 1.2612j) | (0.1765 − 1.1997j) | (−0.7851 − 0.0607j) |
| 122 | (−0.3091 + 0.3983j) | (−0.1765 + 1.1997j) | (−0.7851 − 1.2271j) |
| 123 | (−0.3108 + 0.524j) | (−0.1765 − 1.1997j) | (−0.7851 − 1.4453j) |
| 124 | (−0.183 + 0.0551j) | (0.0588 + 1.204j) | (−0.7851 + 0.0601j) |
| 125 | (−0.0822 + 1.2574j) | (0.0588 − 1.204j) | (−0.7851 + 0.0601j) |
| 126 | (−0.1837 + 0.4026j) | (−0.0588 + 1.204j) | (−0.7851 + 1.228j) |
| 127 | (−0.1833 + 0.5306j) | (−0.0588 − 1.204j) | (−0.7851 + 1.4486j) |
| 128 | (0.4457 + 0.1663j) | (0.1844 + 0.0517j) | (0.3039 − 0.3051j) |
| 129 | (0.4021 + 0.9839j) | (0.1844 − 0.0517j) | (0.3039 − 0.3045j) |
| 130 | (0.4379 + 0.2808j) | (−0.1844 + 0.0517j) | (0.3039 − 0.7193j) |
| 131 | (0.4325 + 0.6762j) | (−0.1844 − 0.0517j) | (0.3039 − 0.7851j) |
| 132 | (0.0631 + 0.1645j) | (0.185 + 0.0518j) | (0.3039 + 0.3039j) |
| 133 | (0.0535 + 0.8976j) | (0.185 − 0.0518j) | (0.3039 + 0.3027j) |
| 134 | (0.0623 + 0.2853j) | (−0.185 + 0.0518j) | (0.3039 + 0.7189j) |
| 135 | (0.063 + 0.6686j) | (−0.185 − 0.0518j) | (0.3039 + 0.7866j) |
| 136 | (0.4544 + 0.1646j) | (0.1366 + 0.3818j) | (0.3039 − 0.4316j) |
| 137 | (0.4085 + 0.8717j) | (0.1366 − 0.3818j) | (0.3039 − 0.4374j) |
| 138 | (0.4495 + 0.2802j) | (−0.1366 + 0.3818j) | (0.3039 − 0.5905j) |
| 139 | (0.4239 + 0.7355j) | (−0.1366 − 0.3818j) | (0.3039 − 0.5662j) |
| 140 | (0.0616 + 0.1678j) | (0.1396 + 0.3793j) | (0.3039 + 0.4309j) |
| 141 | (0.0717 + 0.8232j) | (0.1396 − 0.3793j) | (0.3039 + 0.4375j) |
| 142 | (0.0601 + 0.2845j) | (−0.1396 + 0.3793j) | (0.3039 + 0.5905j) |
| 143 | (0.0643 + 0.7007j) | (−0.1396 − 0.3793j) | (0.3039 + 0.5676j) |
| 144 | (0.4433 + 0.1641j) | (1.0929 + 0.2663j) | (0.3039 − 0.1795j) |
| 145 | (0.4014 + 0.9946j) | (1.0929 − 0.2663j) | (0.3039 − 0.1792j) |
| 146 | (0.4407 + 0.2809j) | (−1.0929 + 0.2663j) | (0.3039 − 1.0559j) |
| 147 | (0.4318 + 0.6767j) | (−1.0929 − 0.2663j) | (0.3039 − 0.919j) |
| 148 | (0.0596 + 0.1661j) | (1.0591 + 0.3672j) | (0.3039 + 0.1794j) |
| 149 | (0.0534 + 0.8952j) | (1.0591 − 0.3672j) | (0.3039 + 0.1796j) |
| 150 | (0.0624 + 0.2838j) | (−1.0591 + 0.3672j) | (0.3039 + 1.0561j) |
| 151 | (0.0623 + 0.6658j) | (−1.0591 − 0.3672j) | (0.3039 + 0.9201j) |
| 152 | (0.4542 + 0.1627j) | (0.2721 + 0.9816j) | (0.3039 − 0.0609j) |
| 153 | (0.4078 + 0.8696j) | (0.2721 − 0.9816j) | (0.3039 − 0.0607j) |
| 154 | (0.453 + 0.2821j) | (−0.2721 + 0.9816j) | (0.3039 − 1.2271j) |
| 155 | (0.4271 + 0.7389j) | (−0.2721 − 0.9816j) | (0.3039 − 1.4453j) |
| 156 | (0.0592 + 0.1678j) | (0.3739 + 0.9631j) | (0.3039 + 0.0601j) |
| 157 | (0.0682 + 0.8215j) | (0.3739 − 0.9631j) | (0.3039 + 0.0601j) |
| 158 | (0.0599 + 0.2834j) | (−0.3739 + 0.9631j) | (0.3039 + 1.228j) |
| 159 | (0.0644 + 0.7j) | (−0.3739 − 0.9631j) | (0.3039 + 1.4486j) |
| 160 | (0.4431 + 0.0571j) | (0.064 + 0.0515j) | (0.3027 − 0.3051j) |
| 161 | (0.3957 + 1.1527j) | (0.064 − 0.0515j) | (0.3027 − 0.3045j) |
| 162 | (0.4383 + 0.3959j) | (−0.064 + 0.0515j) | (0.3027 − 0.7193j) |
| 163 | (0.4369 + 0.5469j) | (−0.064 − 0.0515j) | (0.3027 − 0.7851j) |
| 164 | (0.0585 + 0.0556j) | (0.0631 + 0.0515j) | (0.3027 + 0.3039j) |
| 165 | (0.0883 + 1.6505j) | (0.0631 − 0.0515j) | (0.3027 + 0.3027j) |
| 166 | (0.0615 + 0.4042j) | (−0.0631 + 0.0515j) | (0.3027 + 0.7189j) |
| 167 | (0.0631 + 0.5409j) | (−0.0631 − 0.0515j) | (0.3027 + 0.7866j) |
| 168 | (0.4538 + 0.0562j) | (0.0485 + 0.3857j) | (0.3027 − 0.4316j) |
| 169 | (0.3742 + 1.2962j) | (0.0485 − 0.3857j) | (0.3027 − 0.4374j) |
| 170 | (0.4493 + 0.3995j) | (−0.0485 + 0.3857j) | (0.3027 − 0.5905j) |
| 171 | (0.441 + 0.5283j) | (−0.0485 − 0.3857j) | (0.3027 − 0.5662j) |
| 172 | (0.0605 + 0.0567j) | (0.0466 + 0.3859j) | (0.3027 + 0.4309j) |
| 173 | (0.0749 + 1.4616j) | (0.0466 − 0.3859j) | (0.3027 + 0.4375j) |
| 174 | (0.0639 + 0.4059j) | (−0.0466 + 0.3859j) | (0.3027 + 0.5905j) |
| 175 | (0.0621 + 0.5316j) | (−0.0466 − 0.3859j) | (0.3027 + 0.5676j) |
| 176 | (0.4428 + 0.0576j) | (1.117 + 0.1611j) | (0.3027 − 0.1795j) |
| 177 | (0.3942 + 1.1194j) | (1.117 − 0.1611j) | (0.3027 − 0.1792j) |
| 178 | (0.4395 + 0.396j) | (−1.117 + 0.1611j) | (0.3027 − 1.0559j) |
| 179 | (0.4386 + 0.5472j) | (−1.117 − 0.1611j) | (0.3027 − 0.919j) |
| 180 | (0.0632 + 0.0565j) | (1.1289 + 0.0541j) | (0.3027 + 0.1794j) |
| 181 | (0.2742 + 1.6248j) | (1.1289 − 0.0541j) | (0.3027 + 0.1796j) |
| 182 | (0.0605 + 0.4048j) | (−1.1289 + 0.0541j) | (0.3027 + 1.0561j) |
| 183 | (0.062 + 0.5419j) | (−1.1289 − 0.0541j) | (0.3027 + 0.9201j) |
| 184 | (0.4557 + 0.0557j) | (0.1662 + 0.9932j) | (0.3027 − 0.0609j) |
| 185 | (0.3307 + 1.4037j) | (0.1662 − 0.9932j) | (0.3027 − 0.0607j) |
| 186 | (0.4473 + 0.3995j) | (−0.1662 + 0.9932j) | (0.3027 − 1.2271j) |
| 187 | (0.4414 + 0.5267j) | (−0.1662 − 0.9932j) | (0.3027 − 1.4453j) |

-continued

| Mapping | NN_QSL | NN_QSC | NN_RSC |
|---|---|---|---|
| 188 | (0.0626 + 0.0554j) | (0.0565 + 0.9992j) | (0.3027 + 0.0601j) |
| 189 | (0.2129 + 1.4638j) | (0.0565 − 0.9992j) | (0.3027 + 0.0601j) |
| 190 | (0.0631 + 0.4059j) | (−0.0565 + 0.9992j) | (0.3027 + 1.228j) |
| 191 | (0.0617 + 0.5321j) | (−0.0565 − 0.9992j) | (0.3027 + 1.4486j) |
| 192 | (0.3132 + 0.1639j) | (0.3195 + 0.0553j) | (0.7189 − 0.3051j) |
| 193 | (0.2618 + 0.9824j) | (0.3195 − 0.0553j) | (0.7189 − 0.3045j) |
| 194 | (0.3131 + 0.281j) | (−0.3195 + 0.0553j) | (0.7189 − 0.7193j) |
| 195 | (0.3103 + 0.6676j) | (−0.3195 − 0.0553j) | (0.7189 − 0.7851j) |
| 196 | (0.1815 + 0.1665j) | (0.3192 + 0.0552j) | (0.7189 + 0.3039j) |
| 197 | (0.1257 + 0.965j) | (0.3192 − 0.0552j) | (0.7189 + 0.3027j) |
| 198 | (0.1836 + 0.2838j) | (−0.3192 + 0.0552j) | (0.7189 + 0.7189j) |
| 199 | (0.1883 + 0.6668j) | (−0.3192 − 0.0552j) | (0.7189 + 0.7866j) |
| 200 | (0.312 + 0.1625j) | (0.1726 + 0.4754j) | (0.7189 − 0.4316j) |
| 201 | (0.2852 + 0.8597j) | (0.1726 − 0.4754j) | (0.7189 − 0.4374j) |
| 202 | (0.3108 + 0.2809j) | (−0.1726 + 0.4754j) | (0.7189 − 0.5905j) |
| 203 | (0.3047 + 0.7226j) | (−0.1726 − 0.4754j) | (0.7189 − 0.5662j) |
| 204 | (0.1829 + 0.1648j) | (0.1882 + 0.4624j) | (0.7189 + 0.4309j) |
| 205 | (0.178 + 0.8411j) | (0.1882 − 0.4624j) | (0.7189 + 0.4375j) |
| 206 | (0.1828 + 0.2832j) | (−0.1882 + 0.4624j) | (0.7189 + 0.5905j) |
| 207 | (0.1865 + 0.7073j) | (−0.1882 − 0.4624j) | (0.7189 + 0.5676j) |
| 208 | (0.3135 + 0.1635j) | (1.4104 + 0.3594j) | (0.7189 − 0.1795j) |
| 209 | (0.2594 + 0.982j) | (1.4104 − 0.3594j) | (0.7189 − 0.1792j) |
| 210 | (0.3133 + 0.2798j) | (−1.4104 + 0.3594j) | (0.7189 − 1.0559j) |
| 211 | (0.3112 + 0.6688j) | (−1.4104 − 0.3594j) | (0.7189 − 0.919j) |
| 212 | (0.1821 + 0.1627j) | (1.3645 + 0.4968j) | (0.7189 + 0.1794j) |
| 213 | (0.1269 + 0.9655j) | (1.3645 − 0.4968j) | (0.7189 + 0.1796j) |
| 214 | (0.1846 + 0.2836j) | (−1.3645 + 0.4968j) | (0.7189 + 1.0561j) |
| 215 | (0.1886 + 0.6651j) | (−1.3645 − 0.4968j) | (0.7189 + 0.9201j) |
| 216 | (0.3109 + 0.1627j) | (0.3164 + 1.315j) | (0.7189 − 0.0609j) |
| 217 | (0.2846 + 0.8585j) | (0.3164 − 1.315j) | (0.7189 − 0.0607j) |
| 218 | (0.3092 + 0.2805j) | (−0.3164 + 1.315j) | (0.7189 − 1.2271j) |
| 219 | (0.3047 + 0.7224j) | (−0.3164 − 1.315j) | (0.7189 − 1.4453j) |
| 220 | (0.1841 + 0.1645j) | (0.4451 + 1.2916j) | (0.7189 + 0.0601j) |
| 221 | (0.1766 + 0.8398j) | (0.4451 − 1.2916j) | (0.7189 + 0.0601j) |
| 222 | (0.1861 + 0.2834j) | (−0.4451 + 1.2916j) | (0.7189 + 1.228j) |
| 223 | (0.1861 + 0.7085j) | (−0.4451 − 1.2916j) | (0.7189 + 1.4486j) |
| 224 | (0.3139 + 0.0565j) | (0.421 + 0.0652j) | (0.7866 − 0.3051j) |
| 225 | (0.244 + 1.1191j) | (0.421 − 0.0652j) | (0.7866 − 0.3045j) |
| 226 | (0.3103 + 0.3997j) | (−0.421 + 0.0652j) | (0.7866 − 0.7193j) |
| 227 | (0.3129 + 0.5431j) | (−0.421 − 0.0652j) | (0.7866 − 0.7851j) |
| 228 | (0.1826 + 0.055j) | (0.4209 + 0.065j) | (0.7866 + 0.3039j) |
| 229 | (0.08 + 1.0978j) | (0.4209 − 0.065j) | (0.7866 + 0.3027j) |
| 230 | (0.1845 + 0.3999j) | (−0.4209 + 0.065j) | (0.7866 + 0.7189j) |
| 231 | (0.1848 + 0.5411j) | (−0.4209 − 0.065j) | (0.7866 + 0.7866j) |
| 232 | (0.3114 + 0.0559j) | (0.0738 + 0.5142j) | (0.7866 − 0.4316j) |
| 233 | (0.2295 + 1.2458j) | (0.0738 − 0.5142j) | (0.7866 − 0.4374j) |
| 234 | (0.3098 + 0.4037j) | (−0.0738 + 0.5142j) | (0.7866 − 0.5905j) |
| 235 | (0.3121 + 0.5282j) | (−0.0738 − 0.5142j) | (0.7866 − 0.5662j) |
| 236 | (0.1809 + 0.0553j) | (0.0509 + 0.5166j) | (0.7866 + 0.4309j) |
| 237 | (0.0743 + 1.289j) | (0.0509 − 0.5166j) | (0.7866 + 0.4375j) |
| 238 | (0.1838 + 0.4025j) | (−0.0509 + 0.5166j) | (0.7866 + 0.5905j) |
| 239 | (0.1844 + 0.531j) | (−0.0509 − 0.5166j) | (0.7866 + 0.5676j) |
| 240 | (0.3124 + 0.0574j) | (1.4413 + 0.2175j) | (0.7866 − 0.1795j) |
| 241 | (0.2377 + 1.1143j) | (1.4413 − 0.2175j) | (0.7866 − 0.1792j) |
| 242 | (0.3127 + 0.3984j) | (−1.4413 + 0.2175j) | (0.7866 − 1.0559j) |
| 243 | (0.3142 + 0.5418j) | (−1.4413 − 0.2175j) | (0.7866 − 0.919j) |
| 244 | (0.1843 + 0.0564j) | (1.4575 + 0.0727j) | (0.7866 + 0.1794j) |
| 245 | (0.0788 + 1.1019j) | (1.4575 − 0.0727j) | (0.7866 + 0.1796j) |
| 246 | (0.1841 + 0.4031j) | (−1.4575 + 0.0727j) | (0.7866 + 1.0561j) |
| 247 | (0.1849 + 0.543j) | (−1.4575 − 0.0727j) | (0.7866 + 0.9201j) |
| 248 | (0.311 + 0.0559j) | (0.1885 + 1.329j) | (0.7866 − 0.0609j) |
| 249 | (0.2161 + 1.2595j) | (0.1885 − 1.329j) | (0.7866 − 0.0607j) |
| 250 | (0.3124 + 0.4009j) | (−0.1885 + 1.329j) | (0.7866 − 1.2271j) |
| 251 | (0.3127 + 0.5274j) | (−0.1885 − 1.329j) | (0.7866 − 1.4453j) |
| 252 | (0.1827 + 0.0558j) | (0.0624 + 1.3354j) | (0.7866 + 0.0601j) |
| 253 | (0.0798 + 1.2563j) | (0.0624 − 1.3354j) | (0.7866 + 0.0601j) |
| 254 | (0.1836 + 0.4039j) | (−0.0624 + 1.3354j) | (0.7866 + 1.228j) |
| 255 | (0.1833 + 0.5285j) | (−0.0624 − 1.3354j) | (0.7866 + 1.4486j) |
| 256 | (−0.4463 − 0.1639j) | (0.1855 + 0.1634j) | (−0.4316 − 0.3051j) |
| 257 | (−0.4012 − 0.9844j) | (0.1855 − 0.1634j) | (−0.4316 − 0.3045j) |
| 258 | (−0.4402 − 0.2796j) | (−0.1855 + 0.1634j) | (−0.4316 − 0.7193j) |
| 259 | (−0.431 − 0.6768j) | (−0.1855 − 0.1634j) | (−0.4316 − 0.7851j) |
| 260 | (−0.0611 − 0.1653j) | (0.1855 + 0.1632j) | (−0.4316 + 0.3039j) |
| 261 | (−0.054 − 0.8956j) | (0.1855 − 0.1632j) | (−0.4316 + 0.3027j) |
| 262 | (−0.0593 − 0.2844j) | (−0.1855 + 0.1632j) | (−0.4316 + 0.7189j) |
| 263 | (−0.0637 − 0.6671j) | (−0.1855 − 0.1632j) | (−0.4316 + 0.7866j) |
| 264 | (−0.4571 − 0.1634j) | (0.1677 + 0.2795j) | (−0.4316 − 0.4316j) |

-continued

| Mapping | NN_QSL | NN_QSC | NN_RSC |
|---|---|---|---|
| 265 | (−0.4078 − 0.8694j) | (0.1677 − 0.2795j) | (−0.4316 − 0.4374j) |
| 266 | (−0.4542 − 0.2825j) | (−0.1677 + 0.2795j) | (−0.4316 − 0.5905j) |
| 267 | (−0.4268 − 0.7398j) | (−0.1677 − 0.2795j) | (−0.4316 − 0.5662j) |
| 268 | (−0.0615 − 0.1665j) | (0.1679 + 0.2806j) | (−0.4316 + 0.4309j) |
| 269 | (−0.0668 − 0.8218j) | (0.1679 − 0.2806j) | (−0.4316 + 0.4375j) |
| 270 | (−0.0618 − 0.2836j) | (−0.1679 + 0.2806j) | (−0.4316 + 0.5905j) |
| 271 | (−0.0659 − 0.7013j) | (−0.1679 − 0.2806j) | (−0.4316 + 0.5676j) |
| 272 | (−0.4426 − 0.1658j) | (1.04 + 0.6132j) | (−0.4316 − 0.1795j) |
| 273 | (−0.4045 − 0.991j) | (1.04 − 0.6132j) | (−0.4316 − 0.1792j) |
| 274 | (−0.4439 − 0.2793j) | (−1.04 + 0.6132j) | (−0.4316 − 1.0559j) |
| 275 | (−0.4312 − 0.6763j) | (−1.04 − 0.6132j) | (−0.4316 − 0.919j) |
| 276 | (−0.0619 − 0.1669j) | (1.0999 + 0.513j) | (−0.4316 − 0.1794j) |
| 277 | (−0.0516 − 0.8964j) | (1.0999 − 0.513j) | (−0.4316 − 0.1796j) |
| 278 | (−0.0606 − 0.2841j) | (−1.0999 + 0.513j) | (−0.4316 − 1.0561j) |
| 279 | (−0.0621 − 0.6653j) | (−1.0999 − 0.513j) | (−0.4316 − 0.9201j) |
| 280 | (−0.4562 − 0.1637j) | (0.6058 + 0.989j) | (−0.4316 − 0.0609j) |
| 281 | (−0.4091 − 0.8668j) | (0.6058 − 0.989j) | (−0.4316 − 0.0607j) |
| 282 | (−0.4518 − 0.2793j) | (−0.6058 + 0.989j) | (−0.4316 − 1.2271j) |
| 283 | (−0.4263 − 0.7353j) | (−0.6058 − 0.989j) | (−0.4316 − 1.4453j) |
| 284 | (−0.0616 − 0.1664j) | (0.5002 + 1.0297j) | (−0.4316 − 0.0601j) |
| 285 | (−0.0694 − 0.8212j) | (0.5002 − 1.0297j) | (−0.4316 − 0.0601j) |
| 286 | (−0.0621 − 0.2859j) | (−0.5002 + 1.0297j) | (−0.4316 − 1.228j) |
| 287 | (−0.0638 − 0.6996j) | (−0.5002 − 1.0297j) | (−0.4316 − 1.4486j) |
| 288 | (−0.4441 − 0.0564j) | (0.0642 + 0.1537j) | (−0.4374 − 0.3051j) |
| 289 | (−0.3921 − 1.1538j) | (0.0642 − 0.1537j) | (−0.4374 − 0.3045j) |
| 290 | (−0.4389 − 0.3984j) | (−0.0642 + 0.1537j) | (−0.4374 − 0.7193j) |
| 291 | (−0.4375 − 0.5492j) | (−0.0642 − 0.1537j) | (−0.4374 − 0.7851j) |
| 292 | (−0.0601 − 0.0565j) | (0.0641 + 0.1536j) | (−0.4374 − 0.3039j) |
| 293 | (−0.085 − 1.6521j) | (0.0641 − 0.1536j) | (−0.4374 − 0.3027j) |
| 294 | (−0.0621 − 0.4039j) | (−0.0641 + 0.1536j) | (−0.4374 − 0.7189j) |
| 295 | (−0.0628 − 0.5387j) | (−0.0641 − 0.1536j) | (−0.4374 − 0.7866j) |
| 296 | (−0.4565 − 0.0576j) | (0.0555 + 0.2577j) | (−0.4374 − 0.4316j) |
| 297 | (−0.3747 − 1.294j) | (0.0555 − 0.2577j) | (−0.4374 − 0.4374j) |
| 298 | (−0.4464 − 0.4017j) | (−0.0555 + 0.2577j) | (−0.4374 − 0.5905j) |
| 299 | (−0.4436 − 0.5288j) | (−0.0555 − 0.2577j) | (−0.4374 − 0.5662j) |
| 300 | (−0.061 − 0.0561j) | (0.0554 + 0.2578j) | (−0.4374 + 0.4309j) |
| 301 | (−0.0721 − 1.4593j) | (0.0554 − 0.2578j) | (−0.4374 + 0.4375j) |
| 302 | (−0.0618 − 0.4061j) | (−0.0554 + 0.2578j) | (−0.4374 + 0.5905j) |
| 303 | (−0.0635 − 0.5302j) | (−0.0554 − 0.2578j) | (−0.4374 + 0.5676j) |
| 304 | (−0.4456 − 0.0571j) | (0.9702 + 0.7075j) | (−0.4374 − 0.1795j) |
| 305 | (−0.3904 − 1.1162j) | (0.9702 − 0.7075j) | (−0.4374 − 0.1792j) |
| 306 | (−0.4383 − 0.3992j) | (−0.9702 + 0.7075j) | (−0.4374 − 1.0559j) |
| 307 | (−0.4379 − 0.5468j) | (−0.9702 − 0.7075j) | (−0.4374 − 0.919j) |
| 308 | (−0.062 − 0.0559j) | (0.8908 + 0.7938j) | (−0.4374 − 0.1794j) |
| 309 | (−0.2695 − 1.6295j) | (0.8908 − 0.7938j) | (−0.4374 − 0.1796j) |
| 310 | (−0.062 − 0.4037j) | (−0.8908 + 0.7938j) | (−0.4374 − 1.0561j) |
| 311 | (−0.0627 − 0.5416j) | (−0.8908 − 0.7938j) | (−0.4374 − 0.9201j) |
| 312 | (−0.4568 − 0.0577j) | (0.7072 + 0.9358j) | (−0.4374 − 0.0609j) |
| 313 | (−0.3298 − 1.3989j) | (0.7072 − 0.9358j) | (−0.4374 − 0.0607j) |
| 314 | (−0.4467 − 0.3999j) | (−0.7072 + 0.9358j) | (−0.4374 − 1.2271j) |
| 315 | (−0.4404 − 0.5285j) | (−0.7072 − 0.9358j) | (−0.4374 − 1.4453j) |
| 316 | (−0.0612 − 0.0559j) | (0.8023 + 0.8711j) | (−0.4374 − 0.0601j) |
| 317 | (−0.2128 − 1.4708j) | (0.8023 − 0.8711j) | (−0.4374 − 0.0601j) |
| 318 | (−0.0618 − 0.4046j) | (−0.8023 + 0.8711j) | (−0.4374 − 1.228j) |
| 319 | (−0.0611 − 0.5307j) | (−0.8023 − 0.8711j) | (−0.4374 − 1.4486j) |
| 320 | (−0.3159 − 0.1616j) | (0.293 + 0.1628j) | (−0.5905 − 0.3051j) |
| 321 | (−0.2603 − 0.9838j) | (0.293 − 0.1628j) | (−0.5905 − 0.3045j) |
| 322 | (−0.3145 − 0.2812j) | (−0.293 + 0.1628j) | (−0.5905 − 0.7193j) |
| 323 | (−0.3105 − 0.6693j) | (−0.293 − 0.1628j) | (−0.5905 − 0.7851j) |
| 324 | (−0.1837 − 0.1651j) | (0.293 + 0.1625j) | (−0.5905 − 0.3039j) |
| 325 | (−0.1264 − 0.9659j) | (0.293 − 0.1625j) | (−0.5905 − 0.3027j) |
| 326 | (−0.1851 − 0.2838j) | (−0.293 + 0.1625j) | (−0.5905 − 0.7189j) |
| 327 | (−0.1865 − 0.6639j) | (−0.293 − 0.1625j) | (−0.5905 − 0.7866j) |
| 328 | (−0.3126 − 0.1634j) | (0.2875 + 0.373j) | (−0.5905 − 0.4316j) |
| 329 | (−0.2876 − 0.8595j) | (0.2875 − 0.373j) | (−0.5905 − 0.4374j) |
| 330 | (−0.3108 − 0.2794j) | (−0.2875 + 0.373j) | (−0.5905 − 0.5905j) |
| 331 | (−0.3051 − 0.7213j) | (−0.2875 − 0.373j) | (−0.5905 − 0.5662j) |
| 332 | (−0.1827 − 0.1672j) | (0.2837 + 0.3794j) | (−0.5905 + 0.4309j) |
| 333 | (−0.1796 − 0.8387j) | (0.2837 − 0.3794j) | (−0.5905 + 0.4375j) |
| 334 | (−0.1859 − 0.2832j) | (−0.2837 + 0.3794j) | (−0.5905 + 0.5905j) |
| 335 | (−0.1862 − 0.7084j) | (−0.2837 − 0.3794j) | (−0.5905 + 0.5676j) |
| 336 | (−0.3155 − 0.1627j) | (1.1297 + 0.6783j) | (−0.5905 − 0.1795j) |
| 337 | (−0.2619 − 0.9855j) | (1.1297 − 0.6783j) | (−0.5905 − 0.1792j) |
| 338 | (−0.3137 − 0.2821j) | (−1.1297 + 0.6783j) | (−0.5905 − 1.0559j) |
| 339 | (−0.3101 − 0.6678j) | (−1.1297 − 0.6783j) | (−0.5905 − 0.919j) |
| 340 | (−0.183 − 0.165j) | (1.1955 + 0.5675j) | (−0.5905 − 0.1794j) |
| 341 | (−0.1247 − 0.9674j) | (1.1955 − 0.5675j) | (−0.5905 − 0.1796j) |

-continued

| Mapping | NN_QSL | NN_QSC | NN_RSC |
| --- | --- | --- | --- |
| 342 | (−0.1856 − 0.281j) | (−1.1955 + 0.5675j) | (−0.5905 + 1.0561j) |
| 343 | (−0.1866 − 0.6624j) | (−1.1955 − 0.5675j) | (−0.5905 + 0.9201j) |
| 344 | (−0.3119 − 0.1637j) | (0.6492 + 1.0902j) | (−0.5905 − 0.0609j) |
| 345 | (−0.2868 − 0.8599j) | (0.6492 − 1.0902j) | (−0.5905 − 0.0607j) |
| 346 | (−0.3095 − 0.2803j) | (−0.6492 + 1.0902j) | (−0.5905 − 1.2271j) |
| 347 | (−0.3061 − 0.7215j) | (−0.6492 − 1.0902j) | (−0.5905 − 1.4453j) |
| 348 | (−0.1838 − 0.1657j) | (0.5334 + 1.1357j) | (−0.5905 + 0.0601j) |
| 349 | (−0.1802 − 0.8426j) | (0.5334 − 1.1357j) | (−0.5905 + 0.0601j) |
| 350 | (−0.1842 − 0.2806j) | (−0.5334 + 1.1357j) | (−0.5905 + 1.228j) |
| 351 | (−0.1884 − 0.7047j) | (−0.5334 − 1.1357j) | (−0.5905 + 1.4486j) |
| 352 | (−0.3157 − 0.0567j) | (0.4177 + 0.2045j) | (−0.5662 − 0.3051j) |
| 353 | (−0.2455 − 1.1165j) | (0.4177 − 0.2045j) | (−0.5662 − 0.3045j) |
| 354 | (−0.3114 − 0.3996j) | (−0.4177 + 0.2045j) | (−0.5662 − 0.7193j) |
| 355 | (−0.3127 − 0.5438j) | (−0.4177 − 0.2045j) | (−0.5662 − 0.7851j) |
| 356 | (−0.1847 − 0.0565j) | (0.4177 + 0.2052j) | (−0.5662 + 0.3039j) |
| 357 | (−0.0756 − 1.0986j) | (0.4177 − 0.2052j) | (−0.5662 + 0.3027j) |
| 358 | (−0.1839 − 0.4027j) | (−0.4177 + 0.2052j) | (−0.5662 + 0.7189j) |
| 359 | (−0.1865 − 0.5398j) | (−0.4177 − 0.2052j) | (−0.5662 + 0.7866j) |
| 360 | (−0.3144 − 0.0565j) | (0.3688 + 0.3255j) | (−0.5662 − 0.4316j) |
| 361 | (−0.2283 − 1.2495j) | (0.3688 − 0.3255j) | (−0.5662 − 0.4374j) |
| 362 | (−0.3095 − 0.4037j) | (−0.3688 + 0.3255j) | (−0.5662 − 0.5905j) |
| 363 | (−0.3107 − 0.5281j) | (−0.3688 − 0.3255j) | (−0.5662 − 0.5662j) |
| 364 | (−0.1848 − 0.0563j) | (0.3702 + 0.3233j) | (−0.5662 + 0.4309j) |
| 365 | (−0.0716 − 1.2893j) | (0.3702 − 0.3233j) | (−0.5662 + 0.4375j) |
| 366 | (−0.1831 − 0.4034j) | (−0.3702 + 0.3233j) | (−0.5662 + 0.5905j) |
| 367 | (−0.186 − 0.5317j) | (−0.3702 − 0.3233j) | (−0.5662 + 0.5676j) |
| 368 | (−0.3148 − 0.0572j) | (1.0512 + 0.7809j) | (−0.5662 − 0.1795j) |
| 369 | (−0.2394 − 1.1164j) | (1.0512 − 0.7809j) | (−0.5662 − 0.1792j) |
| 370 | (−0.3113 − 0.3991j) | (−1.0512 + 0.7809j) | (−0.5662 − 1.0559j) |
| 371 | (−0.3128 − 0.5448j) | (−1.0512 − 0.7809j) | (−0.5662 − 0.919j) |
| 372 | (−0.1837 − 0.0551j) | (0.9635 + 0.8762j) | (−0.5662 + 0.1794j) |
| 373 | (−0.078 − 1.1028j) | (0.9635 − 0.8762j) | (−0.5662 + 0.1796j) |
| 374 | (−0.1821 − 0.4041j) | (−0.9635 + 0.8762j) | (−0.5662 + 1.0561j) |
| 375 | (−0.1853 − 0.5397j) | (−0.9635 − 0.8762j) | (−0.5662 + 0.9201j) |
| 376 | (−0.3127 − 0.0567j) | (0.761 + 1.0318j) | (−0.5662 − 0.0609j) |
| 377 | (−0.2149 − 1.2591j) | (0.761 − 1.0318j) | (−0.5662 − 0.0607j) |
| 378 | (−0.3088 − 0.4004j) | (−0.761 + 1.0318j) | (−0.5662 − 1.2271j) |
| 379 | (−0.3116 − 0.5285j) | (−0.761 − 1.0318j) | (−0.5662 − 1.4453j) |
| 380 | (−0.1847 − 0.056j) | (0.8664 + 0.9602j) | (−0.5662 + 0.0601j) |
| 381 | (−0.0801 − 1.2579j) | (0.8664 − 0.9602j) | (−0.5662 + 0.0601j) |
| 382 | (−0.1853 − 0.4049j) | (−0.8664 + 0.9602j) | (−0.5662 + 1.228j) |
| 383 | (−0.1844 − 0.5298j) | (−0.8664 − 0.9602j) | (−0.5662 + 1.4486j) |
| 384 | (0.4425 − 0.1648j) | (0.1863 + 0.167j) | (0.4309 − 0.3051j) |
| 385 | (0.3988 − 0.9835j) | (0.1863 − 0.167j) | (0.4309 − 0.3045j) |
| 386 | (0.4399 − 0.2776j) | (−0.1863 + 0.167j) | (0.4309 − 0.7193j) |
| 387 | (0.4309 − 0.6751j) | (−0.1863 − 0.167j) | (0.4309 − 0.7851j) |
| 388 | (0.0607 − 0.1653j) | (0.1864 + 0.1668j) | (0.4309 + 0.3039j) |
| 389 | (0.0532 − 0.8943j) | (0.1864 − 0.1668j) | (0.4309 + 0.3027j) |
| 390 | (0.0621 − 0.2824j) | (−0.1864 + 0.1668j) | (0.4309 + 0.7189j) |
| 391 | (0.0614 − 0.6661j) | (−0.1864 − 0.1668j) | (0.4309 + 0.7866j) |
| 392 | (0.4541 − 0.1622j) | (0.179 + 0.2802j) | (0.4309 − 0.4316j) |
| 393 | (0.4095 − 0.8731j) | (0.179 − 0.2802j) | (0.4309 − 0.4374j) |
| 394 | (0.453 − 0.2786j) | (−0.179 + 0.2802j) | (0.4309 − 0.5905j) |
| 395 | (0.4263 − 0.7383j) | (−0.179 − 0.2802j) | (0.4309 − 0.5662j) |
| 396 | (0.0611 − 0.1662j) | (0.1791 + 0.2814j) | (0.4309 + 0.4309j) |
| 397 | (0.069 − 0.8242j) | (0.1791 − 0.2814j) | (0.4309 + 0.4375j) |
| 398 | (0.0599 − 0.2843j) | (−0.1791 + 0.2814j) | (0.4309 + 0.5905j) |
| 399 | (0.0649 − 0.701j) | (−0.1791 − 0.2814j) | (0.4309 + 0.5676j) |
| 400 | (0.4437 − 0.1663j) | (0.9608 + 0.5557j) | (0.4309 − 0.1795j) |
| 401 | (0.4033 − 0.9933j) | (0.9608 − 0.5557j) | (0.4309 − 0.1792j) |
| 402 | (0.4404 − 0.2821j) | (−0.9608 + 0.5557j) | (0.4309 − 1.0559j) |
| 403 | (0.4316 − 0.676j) | (−0.9608 − 0.5557j) | (0.4309 − 0.919j) |
| 404 | (0.0615 − 0.167j) | (1.0147 + 0.464j) | (0.4309 + 0.1794j) |
| 405 | (0.0533 − 0.8948j) | (1.0147 − 0.464j) | (0.4309 + 0.1796j) |
| 406 | (0.0612 − 0.2829j) | (−1.0147 + 0.464j) | (0.4309 + 1.0561j) |
| 407 | (0.063 − 0.6656j) | (−1.0147 − 0.464j) | (0.4309 + 0.9201j) |
| 408 | (0.4544 − 0.1652j) | (0.5685 + 0.8988j) | (0.4309 − 0.0609j) |
| 409 | (0.4086 − 0.8704j) | (0.5685 − 0.8988j) | (0.4309 − 0.0607j) |
| 410 | (0.4516 − 0.2784j) | (−0.5685 + 0.8988j) | (0.4309 − 1.2271j) |
| 411 | (0.4257 − 0.7376j) | (−0.5685 − 0.8988j) | (0.4309 − 1.4453j) |
| 412 | (0.0618 − 0.167j) | (0.4732 + 0.9359j) | (0.4309 + 0.0601j) |
| 413 | (0.0689 − 0.8256j) | (0.4732 − 0.9359j) | (0.4309 + 0.0601j) |
| 414 | (0.062 − 0.2833j) | (−0.4732 + 0.9359j) | (0.4309 + 1.228j) |
| 415 | (0.0667 − 0.6992j) | (−0.4732 − 0.9359j) | (0.4309 + 1.4486j) |
| 416 | (0.4439 − 0.0568j) | (0.0634 + 0.1536j) | (0.4375 − 0.3051j) |
| 417 | (0.3929 − 1.1546j) | (0.0634 − 0.1536j) | (0.4375 − 0.3045j) |
| 418 | (0.437 − 0.3961j) | (−0.0634 + 0.1536j) | (0.4375 − 0.7193j) |

-continued

| Mapping | NN_QSL | NN_QSC | NN_RSC |
|---|---|---|---|
| 419 | (0.4346 − 0.5457j) | (−0.0634 − 0.1536j) | (0.4375 − 0.7851j) |
| 420 | (0.0611 − 0.0605j) | (0.0632 + 0.1535j) | (0.4375 + 0.3039j) |
| 421 | (0.0892 − 1.6511j) | (0.0632 − 0.1535j) | (0.4375 + 0.3027j) |
| 422 | (0.0617 − 0.4037j) | (−0.0632 + 0.1535j) | (0.4375 + 0.7189j) |
| 423 | (0.0627 − 0.5417j) | (−0.0632 − 0.1535j) | (0.4375 + 0.7866j) |
| 424 | (0.457 − 0.0577j) | (0.0541 + 0.2567j) | (0.4375 − 0.4316j) |
| 425 | (0.3778 − 1.3029j) | (0.0541 − 0.2567j) | (0.4375 − 0.4374j) |
| 426 | (0.4473 − 0.3989j) | (−0.0541 + 0.2567j) | (0.4375 − 0.5905j) |
| 427 | (0.4419 − 0.5263j) | (−0.0541 − 0.2567j) | (0.4375 − 0.5662j) |
| 428 | (0.0614 − 0.0588j) | (0.054 + 0.2567j) | (0.4375 + 0.4309j) |
| 429 | (0.0775 − 1.4648j) | (0.054 − 0.2567j) | (0.4375 + 0.4375j) |
| 430 | (0.0629 − 0.4063j) | (−0.054 + 0.2567j) | (0.4375 + 0.5905j) |
| 431 | (0.063 − 0.5307j) | (−0.054 − 0.2567j) | (0.4375 + 0.5676j) |
| 432 | (0.444 − 0.054j) | (0.898 + 0.6419j) | (0.4375 − 0.1795j) |
| 433 | (0.394 − 1.1154j) | (0.898 − 0.6419j) | (0.4375 − 0.1792j) |
| 434 | (0.4385 − 0.397j) | (−0.898 + 0.6419j) | (0.4375 − 1.0559j) |
| 435 | (0.4378 − 0.5465j) | (−0.898 − 0.6419j) | (0.4375 − 0.919j) |
| 436 | (0.0602 − 0.0583j) | (0.8263 + 0.7216j) | (0.4375 + 0.1794j) |
| 437 | (0.2731 − 1.6277j) | (0.8263 − 0.7216j) | (0.4375 + 0.1796j) |
| 438 | (0.063 − 0.403j) | (−0.8263 + 0.7216j) | (0.4375 + 1.0561j) |
| 439 | (0.0619 − 0.5397j) | (−0.8263 − 0.7216j) | (0.4375 + 0.9201j) |
| 440 | (0.4554 − 0.0547j) | (0.6605 + 0.8504j) | (0.4375 − 0.0609j) |
| 441 | (0.3334 − 1.4054j) | (0.6605 − 0.8504j) | (0.4375 − 0.0607j) |
| 442 | (0.4498 − 0.3989j) | (−0.6605 + 0.8504j) | (0.4375 − 1.2271j) |
| 443 | (0.4417 − 0.5261j) | (−0.6605 − 0.8504j) | (0.4375 − 1.4453j) |
| 444 | (0.0616 − 0.0581j) | (0.7468 + 0.7914j) | (0.4375 + 0.0601j) |
| 445 | (0.2143 − 1.4736j) | (0.7468 − 0.7914j) | (0.4375 + 0.0601j) |
| 446 | (0.061 − 0.4046j) | (−0.7468 + 0.7914j) | (0.4375 + 1.228j) |
| 447 | (0.062 − 0.5304j) | (−0.7468 − 0.7914j) | (0.4375 + 1.4486j) |
| 448 | (0.3132 − 0.164j) | (0.2991 + 0.1736j) | (0.5905 − 0.3051j) |
| 449 | (0.2604 − 0.982j) | (0.2991 − 0.1736j) | (0.5905 − 0.3045j) |
| 450 | (0.3108 − 0.2809j) | (−0.2991 + 0.1736j) | (0.5905 − 0.7193j) |
| 451 | (0.3091 − 0.6673j) | (−0.2991 − 0.1736j) | (0.5905 − 0.7851j) |
| 452 | (0.1819 − 0.1665j) | (0.2992 + 0.1734j) | (0.5905 + 0.3039j) |
| 453 | (0.1263 − 0.9664j) | (0.2992 − 0.1734j) | (0.5905 + 0.3027j) |
| 454 | (0.1843 − 0.2836j) | (−0.2992 + 0.1734j) | (0.5905 + 0.7189j) |
| 455 | (0.1856 − 0.6618j) | (−0.2992 − 0.1734j) | (0.5905 + 0.7866j) |
| 456 | (0.3109 − 0.1655j) | (0.2758 + 0.3148j) | (0.5905 − 0.4316j) |
| 457 | (0.2837 − 0.8602j) | (0.2758 − 0.3148j) | (0.5905 − 0.4374j) |
| 458 | (0.3092 − 0.2818j) | (−0.2758 + 0.3148j) | (0.5905 − 0.5905j) |
| 459 | (0.3043 − 0.7214j) | (−0.2758 − 0.3148j) | (0.5905 − 0.5662j) |
| 460 | (0.1834 − 0.1644j) | (0.2746 + 0.3175j) | (0.5905 + 0.4309j) |
| 461 | (0.1797 − 0.8393j) | (0.2746 − 0.3175j) | (0.5905 + 0.4375j) |
| 462 | (0.1849 − 0.2814j) | (−0.2746 + 0.3175j) | (0.5905 + 0.5905j) |
| 463 | (0.1876 − 0.7068j) | (−0.2746 − 0.3175j) | (0.5905 + 0.5676j) |
| 464 | (0.3116 − 0.1642j) | (1.2314 + 0.7518j) | (0.5905 − 0.1795j) |
| 465 | (0.2604 − 0.9862j) | (1.2314 − 0.7518j) | (0.5905 − 0.1792j) |
| 466 | (0.3111 − 0.2808j) | (−1.2314 + 0.7518j) | (0.5905 − 1.0559j) |
| 467 | (0.3083 − 0.6661j) | (−1.2314 − 0.7518j) | (0.5905 − 0.919j) |
| 468 | (0.1835 − 0.1672j) | (1.3049 + 0.6281j) | (0.5905 + 0.1794j) |
| 469 | (0.126 − 0.9679j) | (1.3049 − 0.6281j) | (0.5905 + 0.1796j) |
| 470 | (0.1839 − 0.2808j) | (−1.3049 + 0.6281j) | (0.5905 + 1.0561j) |
| 471 | (0.1864 − 0.6628j) | (−1.3049 − 0.6281j) | (0.5905 + 0.9201j) |
| 472 | (0.3116 − 0.1632j) | (0.7007 + 1.2053j) | (0.5905 − 0.0609j) |
| 473 | (0.2836 − 0.8595j) | (0.7007 − 1.2053j) | (0.5905 − 0.0607j) |
| 474 | (0.3092 − 0.2809j) | (−0.7007 + 1.2053j) | (0.5905 − 1.2271j) |
| 475 | (0.3035 − 0.7203j) | (−0.7007 − 1.2053j) | (0.5905 − 1.4453j) |
| 476 | (0.1826 − 0.1665j) | (0.5738 + 1.2552j) | (0.5905 + 0.0601j) |
| 477 | (0.177 − 0.8415j) | (0.5738 − 1.2552j) | (0.5905 + 0.0601j) |
| 478 | (0.1829 − 0.2848j) | (−0.5738 + 1.2552j) | (0.5905 + 1.228j) |
| 479 | (0.1866 − 0.7062j) | (−0.5738 − 1.2552j) | (0.5905 + 1.4486j) |
| 480 | (0.3145 − 0.0575j) | (0.3883 + 0.198j) | (0.5676 − 0.3051j) |
| 481 | (0.2424 − 1.1134j) | (0.3883 − 0.198j) | (0.5676 − 0.3045j) |
| 482 | (0.312 − 0.3975j) | (−0.3883 + 0.198j) | (0.5676 − 0.7193j) |
| 483 | (0.3147 − 0.5415j) | (−0.3883 − 0.198j) | (0.5676 − 0.7851j) |
| 484 | (0.1796 − 0.0577j) | (0.3884 + 0.1984j) | (0.5676 + 0.3039j) |
| 485 | (0.0776 − 1.1022j) | (0.3884 − 0.1984j) | (0.5676 + 0.3027j) |
| 486 | (0.1846 − 0.4j) | (−0.3884 + 0.1984j) | (0.5676 + 0.7189j) |
| 487 | (0.1857 − 0.5404j) | (−0.3884 − 0.1984j) | (0.5676 + 0.7866j) |
| 488 | (0.3098 − 0.0574j) | (0.3488 + 0.3029j) | (0.5676 − 0.4316j) |
| 489 | (0.2299 − 1.2495j) | (0.3488 − 0.3029j) | (0.5676 − 0.4374j) |
| 490 | (0.3106 − 0.4026j) | (−0.3488 + 0.3029j) | (0.5676 − 0.5905j) |
| 491 | (0.3109 − 0.5257j) | (−0.3488 − 0.3029j) | (0.5676 − 0.5662j) |
| 492 | (0.1835 − 0.0579j) | (0.3495 + 0.302j) | (0.5676 + 0.4309j) |
| 493 | (0.0742 − 1.2921j) | (0.3495 − 0.302j) | (0.5676 + 0.4375j) |
| 494 | (0.1855 − 0.4017j) | (−0.3495 + 0.302j) | (0.5676 + 0.5905j) |
| 495 | (0.1829 − 0.5297j) | (−0.3495 − 0.302j) | (0.5676 + 0.5676j) |

-continued

| Mapping | NN_QSL | NN_QSC | NN_RSC |
| --- | --- | --- | --- |
| 496 | (0.3118 − 0.0592j) | (1.1443 + 0.8653j) | (0.5676 − 0.1795j) |
| 497 | (0.2395 − 1.1147j) | (1.1443 − 0.8653j) | (0.5676 − 0.1792j) |
| 498 | (0.3123 − 0.398j) | (−1.1443 + 0.8653j) | (0.5676 − 1.0559j) |
| 499 | (0.3136 − 0.5422j) | (−1.1443 − 0.8653j) | (0.5676 − 0.919j) |
| 500 | (0.1816 − 0.0607j) | (1.0475 + 0.9694j) | (0.5676 + 0.1794j) |
| 501 | (0.0773 − 1.1108j) | (1.0475 − 0.9694j) | (0.5676 + 0.1796j) |
| 502 | (0.185 − 0.3996j) | (−1.0475 + 0.9694j) | (0.5676 + 1.0561j) |
| 503 | (0.186 − 0.5408j) | (−1.0475 − 0.9694j) | (0.5676 + 0.9201j) |
| 504 | (0.3115 − 0.0555j) | (0.8236 + 1.1404j) | (0.5676 − 0.0609j) |
| 505 | (0.2196 − 1.2598j) | (0.8236 − 1.1404j) | (0.5676 − 0.0607j) |
| 506 | (0.3106 − 0.4051j) | (−0.8236 + 1.1404j) | (0.5676 − 1.2271j) |
| 507 | (0.3088 − 0.5263j) | (−0.8236 − 1.1404j) | (0.5676 − 1.4453j) |
| 508 | (0.1827 − 0.0583j) | (0.9399 + 1.062j) | (0.5676 + 0.0601j) |
| 509 | (0.0816 − 1.2601j) | (0.9399 − 1.062j) | (0.5676 + 0.0601j) |
| 510 | (0.1833 − 0.4008j) | (−0.9399 + 1.062j) | (0.5676 + 1.228j) |
| 511 | (0.1861 − 0.5291j) | (−0.9399 − 1.062j) | (0.5676 + 1.4486j) |
| 512 | (−0.6227 + 0.1645j) | (0.8321 + 0.193j) | (−0.1795 − 0.3051j) |
| 513 | (−0.5436 + 0.9862j) | (0.8321 − 0.193j) | (−0.1795 − 0.3045j) |
| 514 | (−0.6129 + 0.2814j) | (−0.8321 + 0.193j) | (−0.1795 − 0.7193j) |
| 515 | (−0.5663 + 0.6799j) | (−0.8321 − 0.193j) | (−0.1795 − 0.7851j) |
| 516 | (−1.2862 + 0.2201j) | (0.8151 + 0.2453j) | (−0.1795 + 0.3039j) |
| 517 | (−1.0365 + 0.9846j) | (0.8151 − 0.2453j) | (−0.1795 + 0.3027j) |
| 518 | (−1.2651 + 0.3694j) | (−0.8151 + 0.2453j) | (−0.1795 + 0.7189j) |
| 519 | (−1.1121 + 0.8407j) | (−0.8151 − 0.2453j) | (−0.1795 + 0.7866j) |
| 520 | (−0.5867 + 0.1624j) | (0.2429 + 0.7216j) | (−0.1795 − 0.4316j) |
| 521 | (−0.5516 + 0.8732j) | (0.2429 − 0.7216j) | (−0.1795 − 0.4374j) |
| 522 | (−0.5798 + 0.2789j) | (−0.2429 + 0.7216j) | (−0.1795 − 0.5905j) |
| 523 | (−0.5544 + 0.7452j) | (−0.2429 − 0.7216j) | (−0.1795 − 0.5662j) |
| 524 | (−1.7794 + 0.2913j) | (0.3191 + 0.6989j) | (−0.1795 − 0.4309j) |
| 525 | (−1.3142 + 1.3286j) | (0.3191 − 0.6989j) | (−0.1795 − 0.4375j) |
| 526 | (−1.7442 + 0.4947j) | (−0.3191 + 0.6989j) | (−0.1795 − 0.5905j) |
| 527 | (−1.4975 + 1.1188j) | (−0.3191 − 0.6989j) | (−0.1795 − 0.5676j) |
| 528 | (−0.6252 + 0.1641j) | (0.9202 + 0.2151j) | (−0.1795 − 0.1795j) |
| 529 | (−0.5423 + 0.9986j) | (0.9202 − 0.2151j) | (−0.1795 − 0.1792j) |
| 530 | (−0.6136 + 0.2813j) | (−0.9202 + 0.2151j) | (−0.1795 − 1.0559j) |
| 531 | (−0.5675 + 0.6818j) | (−0.9202 − 0.2151j) | (−0.1795 − 0.919j) |
| 532 | (−1.4072 + 0.2385j) | (0.8955 + 0.29j) | (−0.1795 + 0.1794j) |
| 533 | (−1.0931 + 1.0525j) | (0.8955 − 0.29j) | (−0.1795 + 0.1796j) |
| 534 | (−1.3798 + 0.3969j) | (−0.8955 + 0.29j) | (−0.1795 + 1.0561j) |
| 535 | (−1.2017 + 0.8794j) | (−0.8955 − 0.29j) | (−0.1795 + 0.9201j) |
| 536 | (−0.5868 + 0.1631j) | (0.2587 + 0.82j) | (−0.1795 − 0.0609j) |
| 537 | (−0.5538 + 0.8711j) | (0.2587 − 0.82j) | (−0.1795 − 0.0607j) |
| 538 | (−0.5818 + 0.2804j) | (−0.2587 + 0.82j) | (−0.1795 − 1.2271j) |
| 539 | (−0.5562 + 0.7436j) | (−0.2587 − 0.82j) | (−0.1795 − 1.4453j) |
| 540 | (−1.574 + 0.2573j) | (0.3448 + 0.7935j) | (−0.1795 + 0.0601j) |
| 541 | (−1.2295 + 1.1433j) | (0.3448 − 0.7935j) | (−0.1795 + 0.0601j) |
| 542 | (−1.544 + 0.4427j) | (−0.3448 + 0.7935j) | (−0.1795 + 1.228j) |
| 543 | (−1.3376 + 0.9743j) | (−0.3448 − 0.7935j) | (−0.1795 + 1.4486j) |
| 544 | (−0.628 + 0.0558j) | (0.8526 + 0.0967j) | (−0.1792 − 0.3051j) |
| 545 | (−0.5287 + 1.1843j) | (0.8526 − 0.0967j) | (−0.1792 − 0.3045j) |
| 546 | (−0.6062 + 0.4018j) | (−0.8526 + 0.0967j) | (−0.1792 − 0.7193j) |
| 547 | (−0.5817 + 0.5451j) | (−0.8526 − 0.0967j) | (−0.1792 − 0.7851j) |
| 548 | (−1.3006 + 0.0729j) | (0.8582 + 0.0486j) | (−0.1792 + 0.3039j) |
| 549 | (−0.1272 + 1.8556j) | (0.8582 − 0.0486j) | (−0.1792 + 0.3027j) |
| 550 | (−1.231 + 0.5136j) | (−0.8582 + 0.0486j) | (−0.1792 + 0.7189j) |
| 551 | (−1.1874 + 0.6662j) | (−0.8582 − 0.0486j) | (−0.1792 + 0.7866j) |
| 552 | (−0.5897 + 0.0577j) | (0.1472 + 0.7455j) | (−0.1792 − 0.4316j) |
| 553 | (−0.5169 + 1.3322j) | (0.1472 − 0.7455j) | (−0.1792 − 0.4374j) |
| 554 | (−0.5752 + 0.4027j) | (−0.1472 + 0.7455j) | (−0.1792 − 0.5905j) |
| 555 | (−0.5606 + 0.5245j) | (−0.1472 − 0.7455j) | (−0.1792 − 0.5662j) |
| 556 | (−1.7966 + 0.0968j) | (0.0513 + 0.7587j) | (−0.1792 − 0.4309j) |
| 557 | (−0.8231 + 1.7139j) | (0.0513 − 0.7587j) | (−0.1792 − 0.4375j) |
| 558 | (−1.6882 + 0.6974j) | (−0.0513 + 0.7587j) | (−0.1792 − 0.5905j) |
| 559 | (−1.6057 + 0.905j) | (−0.0513 − 0.7587j) | (−0.1792 − 0.5676j) |
| 560 | (−0.6265 + 0.0547j) | (0.9408 + 0.1226j) | (−0.1792 − 0.1795j) |
| 561 | (−0.5314 + 1.131j) | (0.9408 − 0.1226j) | (−0.1792 − 0.1792j) |
| 562 | (−0.6086 + 0.402j) | (−0.9408 + 0.1226j) | (−0.1792 − 1.0559j) |
| 563 | (−0.5832 + 0.5446j) | (−0.9408 − 0.1226j) | (−0.1792 − 0.919j) |
| 564 | (−1.4219 + 0.0793j) | (0.9496 + 0.047j) | (−0.1792 + 0.1794j) |
| 565 | (−0.3738 + 1.8028j) | (0.9496 − 0.047j) | (−0.1792 + 0.1796j) |
| 566 | (−1.3453 + 0.5519j) | (−0.9496 + 0.047j) | (−0.1792 + 1.0561j) |
| 567 | (−1.2785 + 0.7176j) | (−0.9496 − 0.047j) | (−0.1792 + 0.9201j) |
| 568 | (−0.5885 + 0.0554j) | (0.1603 + 0.8422j) | (−0.1792 − 0.0609j) |
| 569 | (−0.4892 + 1.4833j) | (0.1603 − 0.8422j) | (−0.1792 − 0.0607j) |
| 570 | (−0.5776 + 0.4018j) | (−0.1603 + 0.8422j) | (−0.1792 − 1.2271j) |
| 571 | (−0.5652 + 0.527j) | (−0.1603 − 0.8422j) | (−0.1792 − 1.4453j) |
| 572 | (−1.5881 + 0.0862j) | (0.0544 + 0.8559j) | (−0.1792 + 0.0601j) |

-continued

| Mapping | NN_QSL | NN_QSC | NN_RSC |
|---|---|---|---|
| 573 | (−0.5614 + 1.6802j) | (0.0544 − 0.8559j) | (−0.1792 + 0.0601j) |
| 574 | (−1.4975 + 0.6188j) | (−0.0544 + 0.8559j) | (−0.1792 + 1.228j) |
| 575 | (−1.4256 + 0.7973j) | (−0.0544 − 0.8559j) | (−0.1792 + 1.4486j) |
| 576 | (−0.7542 + 0.1663j) | (0.5835 + 0.145j) | (−1.0559 − 0.3051j) |
| 577 | (−0.6935 + 1.0034j) | (0.5835 − 0.145j) | (−1.0559 − 0.3045j) |
| 578 | (−0.7436 + 0.2856j) | (−0.5835 + 0.145j) | (−1.0559 − 0.7193j) |
| 579 | (−0.6843 + 0.6705j) | (−0.5835 − 0.145j) | (−1.0559 − 0.7851j) |
| 580 | (−1.1569 + 0.2004j) | (0.5837 + 0.1468j) | (−1.0559 − 0.3039j) |
| 581 | (−0.892 + 1.0205j) | (0.5837 − 0.1468j) | (−1.0559 − 0.3027j) |
| 582 | (−1.1324 + 0.3418j) | (−0.5837 + 0.1468j) | (−1.0559 − 0.7189j) |
| 583 | (−1.0142 + 0.7744j) | (−0.5837 − 0.1468j) | (−1.0559 − 0.7866j) |
| 584 | (−0.8411 + 0.1733j) | (0.2107 + 0.5776j) | (−1.0559 − 0.4316j) |
| 585 | (−0.704 + 0.8771j) | (0.2107 − 0.5776j) | (−1.0559 − 0.4374j) |
| 586 | (−0.8307 + 0.2961j) | (−0.2107 + 0.5776j) | (−1.0559 − 0.5905j) |
| 587 | (−0.7238 + 0.7219j) | (−0.2107 − 0.5776j) | (−1.0559 − 0.5662j) |
| 588 | (−0.9702 + 0.1841j) | (0.2541 + 0.5487j) | (−1.0559 − 0.4309j) |
| 589 | (−0.8433 + 0.8757j) | (0.2541 − 0.5487j) | (−1.0559 − 0.4375j) |
| 590 | (−0.9553 + 0.3136j) | (−0.2541 + 0.5487j) | (−1.0559 − 0.5905j) |
| 591 | (−0.8687 + 0.7403j) | (−0.2541 − 0.5487j) | (−1.0559 − 0.5676j) |
| 592 | (−0.7512 + 0.1657j) | (1.7239 + 0.449j) | (−1.0559 − 0.1795j) |
| 593 | (−0.6981 + 1.0166j) | (1.7239 − 0.449j) | (−1.0559 − 0.1792j) |
| 594 | (−0.7443 + 0.2868j) | (−1.7239 + 0.449j) | (−1.0559 − 1.0559j) |
| 595 | (−0.6877 + 0.6784j) | (−1.7239 − 0.449j) | (−1.0559 − 0.919j) |
| 596 | (−1.1052 + 0.197j) | (1.6668 + 0.6204j) | (−1.0559 − 0.1794j) |
| 597 | (−0.8631 + 1.0063j) | (1.6668 − 0.6204j) | (−1.0559 − 0.1796j) |
| 598 | (−1.0823 + 0.3312j) | (−1.6668 + 0.6204j) | (−1.0559 − 1.0561j) |
| 599 | (−0.9851 + 0.7489j) | (−1.6668 − 0.6204j) | (−1.0559 − 0.9201j) |
| 600 | (−0.8419 + 0.1741j) | (0.3776 + 1.6445j) | (−1.0559 − 0.0609j) |
| 601 | (−0.7023 + 0.8722j) | (0.3776 − 1.6445j) | (−1.0559 − 0.0607j) |
| 602 | (−0.8243 + 0.2959j) | (−0.3776 + 1.6445j) | (−1.0559 − 1.2271j) |
| 603 | (−0.7203 + 0.7251j) | (−0.3776 − 1.6445j) | (−1.0559 − 1.4453j) |
| 604 | (−0.9876 + 0.1862j) | (0.5319 + 1.6115j) | (−1.0559 + 0.0601j) |
| 605 | (−0.8441 + 0.8814j) | (0.5319 − 1.6115j) | (−1.0559 − 0.0601j) |
| 606 | (−0.9688 + 0.3144j) | (−0.5319 + 1.6115j) | (−1.0559 − 1.228j) |
| 607 | (−0.8788 + 0.7414j) | (−0.5319 − 1.6115j) | (−1.0559 − 1.4486j) |
| 608 | (−0.7574 + 0.0547j) | (0.5584 + 0.0608j) | (−0.919 − 0.3051j) |
| 609 | (−0.7036 + 1.1955j) | (0.5584 − 0.0608j) | (−0.919 − 0.3045j) |
| 610 | (−0.7332 + 0.4129j) | (−0.5584 + 0.0608j) | (−0.919 − 0.7193j) |
| 611 | (−0.7094 + 0.5524j) | (−0.5584 − 0.0608j) | (−0.919 − 0.7851j) |
| 612 | (−1.1685 + 0.0665j) | (0.5584 + 0.0594j) | (−0.919 + 0.3039j) |
| 613 | (−0.8661 + 1.1985j) | (0.5584 − 0.0594j) | (−0.919 − 0.3027j) |
| 614 | (−1.0999 + 0.4799j) | (−0.5584 + 0.0594j) | (−0.919 + 0.7189j) |
| 615 | (−1.0732 + 0.6266j) | (−0.5584 − 0.0594j) | (−0.919 + 0.7866j) |
| 616 | (−0.8522 + 0.0583j) | (0.113 + 0.621j) | (−0.919 − 0.4316j) |
| 617 | (−0.6738 + 1.331j) | (0.113 − 0.621j) | (−0.919 − 0.4374j) |
| 618 | (−0.8097 + 0.4242j) | (−0.113 + 0.621j) | (−0.919 − 0.5905j) |
| 619 | (−0.7853 + 0.5572j) | (−0.113 − 0.621j) | (−0.919 − 0.5662j) |
| 620 | (−0.9772 + 0.0605j) | (0.0488 + 0.6357j) | (−0.919 + 0.4309j) |
| 621 | (−1.0775 + 1.5207j) | (0.0488 − 0.6357j) | (−0.919 − 0.4375j) |
| 622 | (−0.9325 + 0.4453j) | (−0.0488 + 0.6357j) | (−0.919 − 0.5905j) |
| 623 | (−0.9066 + 0.5865j) | (−0.0488 − 0.6357j) | (−0.919 − 0.5676j) |
| 624 | (−0.7569 + 0.0541j) | (1.7619 + 0.2717j) | (−0.919 − 0.1795j) |
| 625 | (−0.68 + 1.1391j) | (1.7619 − 0.2717j) | (−0.919 − 0.1792j) |
| 626 | (−0.7355 + 0.4136j) | (−1.7619 + 0.2717j) | (−0.919 − 1.0559j) |
| 627 | (−0.7132 + 0.5556j) | (−1.7619 − 0.2717j) | (−0.919 − 0.919j) |
| 628 | (−1.1174 + 0.0638j) | (1.7821 + 0.0908j) | (−0.919 + 0.1794j) |
| 629 | (−0.9889 + 1.2725j) | (1.7821 − 0.0908j) | (−0.919 − 0.1796j) |
| 630 | (−1.0597 + 0.4682j) | (−1.7821 + 0.0908j) | (−0.919 − 1.0561j) |
| 631 | (−1.0311 + 0.616j) | (−1.7821 − 0.0908j) | (−0.919 − 0.9201j) |
| 632 | (−0.8497 + 0.0561j) | (0.2251 + 1.6619j) | (−0.919 − 0.0609j) |
| 633 | (−0.6858 + 1.4691j) | (0.2251 − 1.6619j) | (−0.919 − 0.0607j) |
| 634 | (−0.8029 + 0.424j) | (−0.2251 + 1.6619j) | (−0.919 − 1.2271j) |
| 635 | (−0.7825 + 0.5601j) | (−0.2251 − 1.6619j) | (−0.919 − 1.4453j) |
| 636 | (−0.9912 + 0.0613j) | (0.0747 + 1.6718j) | (−0.919 + 0.0601j) |
| 637 | (−0.8802 + 1.4402j) | (0.0747 − 1.6718j) | (−0.919 + 0.0601j) |
| 638 | (−0.944 + 0.446j) | (−0.0747 + 1.6718j) | (−0.919 + 1.228j) |
| 639 | (−0.9145 + 0.5877j) | (−0.0747 − 1.6718j) | (−0.919 + 1.4486j) |
| 640 | (0.6235 + 0.1649j) | (0.7504 + 0.1738j) | (0.1794 − 0.3051j) |
| 641 | (0.5445 + 0.9871j) | (0.7504 − 0.1738j) | (0.1794 − 0.3045j) |
| 642 | (0.6165 + 0.2839j) | (−0.7504 + 0.1738j) | (0.1794 − 0.7193j) |
| 643 | (0.5678 + 0.6808j) | (−0.7504 − 0.1738j) | (0.1794 − 0.7851j) |
| 644 | (1.2839 + 0.2269j) | (0.7429 + 0.2033j) | (0.1794 − 0.3039j) |
| 645 | (1.0357 + 0.9897j) | (0.7429 − 0.2033j) | (0.1794 − 0.3027j) |
| 646 | (1.264 + 0.3765j) | (−0.7429 + 0.2033j) | (0.1794 − 0.7189j) |
| 647 | (1.1137 + 0.8483j) | (−0.7429 − 0.2033j) | (0.1794 − 0.7866j) |
| 648 | (0.5856 + 0.1664j) | (0.2368 + 0.6902j) | (0.1794 − 0.4316j) |
| 649 | (0.5534 + 0.8718j) | (0.2368 − 0.6902j) | (0.1794 − 0.4374j) |

-continued

| Mapping | NN_QSL | NN_QSC | NN_RSC |
|---|---|---|---|
| 650 | (0.5822 + 0.2813j) | (−0.2368 + 0.6902j) | (0.1794 − 0.5905j) |
| 651 | (0.5561 + 0.7489j) | (−0.2368 − 0.6902j) | (0.1794 − 0.5662j) |
| 652 | (1.7789 + 0.3004j) | (0.3057 + 0.6584j) | (0.1794 − 0.4309j) |
| 653 | (1.3158 + 1.3361j) | (0.3057 − 0.6584j) | (0.1794 + 0.4375j) |
| 654 | (1.7471 + 0.5029j) | (−0.3057 + 0.6584j) | (0.1794 − 0.5905j) |
| 655 | (1.5019 + 1.1286j) | (−0.3057 − 0.6584j) | (0.1794 + 0.5676j) |
| 656 | (0.6222 + 0.1662j) | (1.0031 + 0.2389j) | (0.1794 − 0.1795j) |
| 657 | (0.5436 + 1.0014j) | (1.0031 − 0.2389j) | (0.1794 − 0.1792j) |
| 658 | (0.6183 + 0.2826j) | (−1.0031 + 0.2389j) | (0.1794 − 1.0559j) |
| 659 | (0.5658 + 0.6807j) | (−1.0031 − 0.2389j) | (0.1794 − 0.919j) |
| 660 | (1.4032 + 0.2435j) | (0.9725 + 0.3279j) | (0.1794 + 0.1794j) |
| 661 | (1.0963 + 1.0564j) | (0.9725 − 0.3279j) | (0.1794 + 0.1796j) |
| 662 | (1.383 + 0.4027j) | (−0.9725 + 0.3279j) | (0.1794 + 1.0561j) |
| 663 | (1.202 + 0.883j) | (−0.9725 − 0.3279j) | (0.1794 + 0.9201j) |
| 664 | (0.5828 + 0.1664j) | (0.2642 + 0.8819j) | (0.1794 − 0.0609j) |
| 665 | (0.5514 + 0.8708j) | (0.2642 − 0.8819j) | (0.1794 − 0.0607j) |
| 666 | (0.5814 + 0.2799j) | (−0.2642 + 0.8819j) | (0.1794 − 1.2271j) |
| 667 | (0.5548 + 0.746j) | (−0.2642 − 0.8819j) | (0.1794 − 1.4453j) |
| 668 | (1.5686 + 0.2684j) | (0.3578 + 0.8654j) | (0.1794 + 0.0601j) |
| 669 | (1.228 + 1.1483j) | (0.3578 − 0.8654j) | (0.1794 + 0.0601j) |
| 670 | (1.5442 + 0.4492j) | (−0.3578 + 0.8654j) | (0.1794 + 1.228j) |
| 671 | (1.3328 + 0.9769j) | (−0.3578 − 0.8654j) | (0.1794 + 1.4486j) |
| 672 | (0.6261 + 0.0567j) | (0.7641 + 0.0701j) | (0.1796 − 0.3051j) |
| 673 | (0.5291 + 1.1814j) | (0.7641 − 0.0701j) | (0.1796 − 0.3045j) |
| 674 | (0.609 + 0.4066j) | (−0.7641 + 0.0701j) | (0.1796 − 0.7193j) |
| 675 | (0.5827 + 0.5481j) | (−0.7641 − 0.0701j) | (0.1796 − 0.7851j) |
| 676 | (1.2988 + 0.0783j) | (0.7659 + 0.0487j) | (0.1796 + 0.3039j) |
| 677 | (0.1337 + 1.8634j) | (0.7659 − 0.0487j) | (0.1796 + 0.3027j) |
| 678 | (1.2328 + 0.5201j) | (−0.7659 + 0.0487j) | (0.1796 + 0.7189j) |
| 679 | (1.1891 + 0.671j) | (−0.7659 − 0.0487j) | (0.1796 + 0.7866j) |
| 680 | (0.5865 + 0.0563j) | (0.1431 + 0.7251j) | (0.1796 − 0.4316j) |
| 681 | (0.5176 + 1.3243j) | (0.1431 − 0.7251j) | (0.1796 − 0.4374j) |
| 682 | (0.5713 + 0.403j) | (−0.1431 + 0.7251j) | (0.1796 − 0.5905j) |
| 683 | (0.5633 + 0.5286j) | (−0.1431 − 0.7251j) | (0.1796 − 0.5662j) |
| 684 | (1.7888 + 0.1044j) | (0.0506 + 0.7433j) | (0.1796 + 0.4309j) |
| 685 | (0.829 + 1.7154j) | (0.0506 − 0.7433j) | (0.1796 + 0.4375j) |
| 686 | (1.6889 + 0.7064j) | (−0.0506 + 0.7433j) | (0.1796 + 0.5905j) |
| 687 | (1.6085 + 0.9071j) | (−0.0506 − 0.7433j) | (0.1796 + 0.5676j) |
| 688 | (0.626 + 0.0571j) | (1.0258 + 0.1432j) | (0.1796 − 0.1795j) |
| 689 | (0.5386 + 1.1329j) | (1.0258 − 0.1432j) | (0.1796 − 0.1792j) |
| 690 | (0.607 + 0.4048j) | (−1.0258 + 0.1432j) | (0.1796 − 1.0559j) |
| 691 | (0.5823 + 0.5452j) | (−1.0258 − 0.1432j) | (0.1796 − 0.919j) |
| 692 | (1.4175 + 0.0845j) | (1.0364 + 0.0494j) | (0.1796 + 0.1794j) |
| 693 | (0.3747 + 1.7968j) | (1.0364 − 0.0494j) | (0.1796 + 0.1796j) |
| 694 | (1.3445 + 0.5598j) | (−1.0364 + 0.0494j) | (0.1796 + 1.0561j) |
| 695 | (1.2785 + 0.7205j) | (−1.0364 − 0.0494j) | (0.1796 + 0.9201j) |
| 696 | (0.5876 + 0.0571j) | (0.1624 + 0.8923j) | (0.1796 − 0.0609j) |
| 697 | (0.4965 + 1.4819j) | (0.1624 − 0.8923j) | (0.1796 − 0.0607j) |
| 698 | (0.575 + 0.4038j) | (−0.1624 + 0.8923j) | (0.1796 − 1.2271j) |
| 699 | (0.5618 + 0.5281j) | (−0.1624 − 0.8923j) | (0.1796 − 1.4453j) |
| 700 | (1.5817 + 0.0942j) | (0.0553 + 0.8988j) | (0.1796 + 0.0601j) |
| 701 | (0.5631 + 1.679j) | (0.0553 − 0.8988j) | (0.1796 + 0.0601j) |
| 702 | (1.491 + 0.6223j) | (−0.0553 + 0.8988j) | (0.1796 + 1.228j) |
| 703 | (1.4216 + 0.7997j) | (−0.0553 − 0.8988j) | (0.1796 + 1.4486j) |
| 704 | (0.7485 + 0.1703j) | (0.6607 + 0.1535j) | (1.0561 − 0.3051j) |
| 705 | (0.6949 + 1.0025j) | (0.6607 − 0.1535j) | (1.0561 − 0.3045j) |
| 706 | (0.7435 + 0.2913j) | (−0.6607 + 0.1535j) | (1.0561 − 0.7193j) |
| 707 | (0.6888 + 0.6815j) | (−0.6607 − 0.1535j) | (1.0561 − 0.7851j) |
| 708 | (1.1533 + 0.2081j) | (0.6594 + 0.163j) | (1.0561 + 0.3039j) |
| 709 | (0.8978 + 1.0283j) | (0.6594 − 0.163j) | (1.0561 + 0.3027j) |
| 710 | (1.1333 + 0.3461j) | (−0.6594 + 0.163j) | (1.0561 + 0.7189j) |
| 711 | (1.0119 + 0.7766j) | (−0.6594 − 0.163j) | (1.0561 + 0.7866j) |
| 712 | (0.8414 + 0.1771j) | (0.2136 + 0.59j) | (1.0561 − 0.4316j) |
| 713 | (0.7032 + 0.8792j) | (0.2136 − 0.59j) | (1.0561 − 0.4374j) |
| 714 | (0.8286 + 0.2992j) | (−0.2136 + 0.59j) | (1.0561 − 0.5905j) |
| 715 | (0.7299 + 0.7291j) | (−0.2136 − 0.59j) | (1.0561 − 0.5662j) |
| 716 | (0.9611 + 0.1876j) | (0.2638 + 0.568j) | (1.0561 + 0.4309j) |
| 717 | (0.8455 + 0.8827j) | (0.2638 − 0.568j) | (1.0561 + 0.4375j) |
| 718 | (0.9556 + 0.3162j) | (−0.2638 + 0.568j) | (1.0561 − 0.5905j) |
| 719 | (0.8702 + 0.7449j) | (−0.2638 − 0.568j) | (1.0561 + 0.5676j) |
| 720 | (0.7511 + 0.1706j) | (1.5512 + 0.4002j) | (1.0561 − 0.1795j) |
| 721 | (0.6959 + 1.013j) | (1.5512 − 0.4002j) | (1.0561 − 0.1792j) |
| 722 | (0.7428 + 0.2911j) | (−1.5512 + 0.4002j) | (1.0561 − 1.0559j) |
| 723 | (0.6864 + 0.6795j) | (−1.5512 − 0.4002j) | (1.0561 − 0.919j) |
| 724 | (1.1016 + 0.2011j) | (1.5002 + 0.553j) | (1.0561 + 0.1794j) |
| 725 | (0.8637 + 1.0087j) | (1.5002 − 0.553j) | (1.0561 + 0.1796j) |
| 726 | (1.0881 + 0.3373j) | (−1.5002 + 0.553j) | (1.0561 + 1.0561j) |

-continued

| Mapping | NN_QSL | NN_QSC | NN_RSC |
|---|---|---|---|
| 727 | (0.9844 + 0.7545j) | (−1.5002 − 0.553j) | (1.0561 + 0.9201j) |
| 728 | (0.8387 + 0.1788j) | (0.3436 + 1.4636j) | (1.0561 − 0.0609j) |
| 729 | (0.7083 + 0.8765j) | (0.3436 − 1.4636j) | (1.0561 − 0.0607j) |
| 730 | (0.8235 + 0.2991j) | (−0.3436 + 1.4636j) | (1.0561 − 1.2271j) |
| 731 | (0.7284 + 0.7308j) | (−0.3436 − 1.4636j) | (1.0561 − 1.4453j) |
| 732 | (0.9821 + 0.1904j) | (0.4838 + 1.4363j) | (1.0561 + 0.0601j) |
| 733 | (0.8396 + 0.8832j) | (0.4838 − 1.4363j) | (1.0561 + 0.0601j) |
| 734 | (0.9681 + 0.3202j) | (−0.4838 + 1.4363j) | (1.0561 + 1.228j) |
| 735 | (0.8756 + 0.7423j) | (−0.4838 − 1.4363j) | (1.0561 + 1.4486j) |
| 736 | (0.7564 + 0.0581j) | (0.6607 + 0.0514j) | (0.9201 − 0.3051j) |
| 737 | (0.7053 + 1.1983j) | (0.6607 − 0.0514j) | (0.9201 − 0.3045j) |
| 738 | (0.7309 + 0.4158j) | (−0.6607 + 0.0514j) | (0.9201 − 0.7193j) |
| 739 | (0.7138 + 0.5587j) | (−0.6607 − 0.0514j) | (0.9201 − 0.7851j) |
| 740 | (1.1628 + 0.0706j) | (0.6602 + 0.0461j) | (0.9201 + 0.3039j) |
| 741 | (0.8686 + 1.2002j) | (0.6602 − 0.0461j) | (0.9201 + 0.3027j) |
| 742 | (1.0982 + 0.4839j) | (−0.6602 + 0.0461j) | (0.9201 + 0.7189j) |
| 743 | (1.0677 + 0.6266j) | (−0.6602 − 0.0461j) | (0.9201 + 0.7866j) |
| 744 | (0.8457 + 0.0608j) | (0.1171 + 0.6262j) | (0.9201 − 0.4316j) |
| 745 | (0.6732 + 1.335j) | (0.1171 − 0.6262j) | (0.9201 − 0.4374j) |
| 746 | (0.803 + 0.4271j) | (−0.1171 + 0.6262j) | (0.9201 − 0.5905j) |
| 747 | (0.7832 + 0.5618j) | (−0.1171 − 0.6262j) | (0.9201 − 0.5662j) |
| 748 | (0.9769 + 0.0649j) | (0.0496 + 0.6408j) | (0.9201 + 0.4309j) |
| 749 | (1.0787 + 1.5235j) | (0.0496 − 0.6408j) | (0.9201 + 0.4375j) |
| 750 | (0.9336 + 0.4458j) | (−0.0496 + 0.6408j) | (0.9201 + 0.5905j) |
| 751 | (0.9033 + 0.5861j) | (−0.0496 − 0.6408j) | (0.9201 + 0.5676j) |
| 752 | (0.756 + 0.0579j) | (1.5854 + 0.2423j) | (0.9201 − 0.1795j) |
| 753 | (0.6833 + 1.1387j) | (1.5854 − 0.2423j) | (0.9201 − 0.1792j) |
| 754 | (0.7302 + 0.4161j) | (−1.5854 + 0.2423j) | (0.9201 − 1.0559j) |
| 755 | (0.7097 + 0.5568j) | (−1.5854 − 0.2423j) | (0.9201 − 0.919j) |
| 756 | (1.1158 + 0.0685j) | (1.6031 + 0.0814j) | (0.9201 + 0.1794j) |
| 757 | (0.9888 + 1.2766j) | (1.6031 − 0.0814j) | (0.9201 + 0.1796j) |
| 758 | (1.0607 + 0.4725j) | (−1.6031 + 0.0814j) | (0.9201 + 1.0561j) |
| 759 | (1.0274 + 0.6189j) | (−1.6031 − 0.0814j) | (0.9201 + 0.9201j) |
| 760 | (0.8466 + 0.0606j) | (0.2051 + 1.4802j) | (0.9201 − 0.0609j) |
| 761 | (0.6926 + 1.4691j) | (0.2051 − 1.4802j) | (0.9201 − 0.0607j) |
| 762 | (0.8017 + 0.4262j) | (−0.2051 + 1.4802j) | (0.9201 − 1.2271j) |
| 763 | (0.7827 + 0.5603j) | (−0.2051 − 1.4802j) | (0.9201 − 1.4453j) |
| 764 | (0.9963 + 0.0648j) | (0.0679 + 1.4881j) | (0.9201 + 0.0601j) |
| 765 | (0.8816 + 1.4415j) | (0.0679 − 1.4881j) | (0.9201 + 0.0601j) |
| 766 | (0.9456 + 0.4497j) | (−0.0679 + 1.4881j) | (0.9201 + 1.228j) |
| 767 | (0.9113 + 0.5881j) | (−0.0679 − 1.4881j) | (0.9201 + 1.4486j) |
| 768 | (−0.6256 − 0.166j) | (0.7488 + 0.3906j) | (−0.0609 − 0.3051j) |
| 769 | (−0.5474 − 0.9834j) | (0.7488 − 0.3906j) | (−0.0609 − 0.3045j) |
| 770 | (−0.6184 − 0.2849j) | (−0.7488 + 0.3906j) | (−0.0609 − 0.7193j) |
| 771 | (−0.5681 − 0.6794j) | (−0.7488 − 0.3906j) | (−0.0609 − 0.7851j) |
| 772 | (−1.2913 − 0.2246j) | (0.7767 + 0.3382j) | (−0.0609 + 0.3039j) |
| 773 | (−1.035 − 0.9873j) | (0.7767 − 0.3382j) | (−0.0609 + 0.3027j) |
| 774 | (−1.2698 − 0.3685j) | (−0.7767 + 0.3382j) | (−0.0609 + 0.7189j) |
| 775 | (−1.1142 − 0.8464j) | (−0.7767 − 0.3382j) | (−0.0609 + 0.7866j) |
| 776 | (−0.5875 − 0.1646j) | (0.4634 + 0.6444j) | (−0.0609 − 0.4316j) |
| 777 | (−0.5563 − 0.8753j) | (0.4634 − 0.6444j) | (−0.0609 − 0.4374j) |
| 778 | (−0.583 − 0.2827j) | (−0.4634 + 0.6444j) | (−0.0609 − 0.5905j) |
| 779 | (−0.5579 − 0.7479j) | (−0.4634 − 0.6444j) | (−0.0609 − 0.5662j) |
| 780 | (−1.7885 − 0.2939j) | (0.4078 + 0.6678j) | (−0.0609 − 0.4309j) |
| 781 | (−1.3136 − 1.3361j) | (0.4078 − 0.6678j) | (−0.0609 − 0.4375j) |
| 782 | (−1.7635 − 0.4945j) | (−0.4078 + 0.6678j) | (−0.0609 − 0.5905j) |
| 783 | (−1.4937 − 1.1225j) | (−0.4078 − 0.6678j) | (−0.0609 − 0.5676j) |
| 784 | (−0.6267 − 0.1653j) | (0.8177 + 0.448j) | (−0.0609 − 0.1795j) |
| 785 | (−0.5464 − 1.0029j) | (0.8177 − 0.448j) | (−0.0609 − 0.1792j) |
| 786 | (−0.6193 − 0.2836j) | (−0.8177 + 0.448j) | (−0.0609 − 1.0559j) |
| 787 | (−0.5689 − 0.6802j) | (−0.8177 − 0.448j) | (−0.0609 − 0.919j) |
| 788 | (−1.4137 − 0.2389j) | (0.8572 + 0.3768j) | (−0.0609 + 0.1794j) |
| 789 | (−1.0985 − 1.058j) | (0.8572 − 0.3768j) | (−0.0609 + 0.1796j) |
| 790 | (−1.3895 − 0.3958j) | (−0.8572 + 0.3768j) | (−0.0609 + 1.0561j) |
| 791 | (−1.2108 − 0.8839j) | (−0.8572 − 0.3768j) | (−0.0609 + 0.9201j) |
| 792 | (−0.5871 − 0.1654j) | (0.5015 + 0.731j) | (−0.0609 − 0.0609j) |
| 793 | (−0.5561 − 0.8731j) | (0.5015 − 0.731j) | (−0.0609 − 0.0607j) |
| 794 | (−0.5811 − 0.2835j) | (−0.5015 + 0.731j) | (−0.0609 − 1.2271j) |
| 795 | (−0.5589 − 0.7479j) | (−0.5015 − 0.731j) | (−0.0609 − 1.4453j) |
| 796 | (−1.581 − 0.2621j) | (0.4301 + 0.7622j) | (−0.0609 + 0.0601j) |
| 797 | (−1.2327 − 1.1487j) | (0.4301 − 0.7622j) | (−0.0609 + 0.0601j) |
| 798 | (−1.5528 − 0.4392j) | (−0.4301 + 0.7622j) | (−0.0609 + 1.228j) |
| 799 | (−1.3336 − 0.9755j) | (−0.4301 − 0.7622j) | (−0.0609 + 1.4486j) |
| 800 | (−0.6283 − 0.057j) | (0.6917 + 0.4713j) | (−0.0607 − 0.3051j) |
| 801 | (−0.5295 − 1.1829j) | (0.6917 − 0.4713j) | (−0.0607 − 0.3045j) |
| 802 | (−0.6074 − 0.4048j) | (−0.6917 + 0.4713j) | (−0.0607 − 0.7193j) |
| 803 | (−0.583 − 0.5511j) | (−0.6917 − 0.4713j) | (−0.0607 − 0.7851j) |

-continued

| Mapping | NN_QSL | NN_QSC | NN_RSC |
| --- | --- | --- | --- |
| 804 | (−1.3003 − 0.0721j) | (0.6571 + 0.5102j) | (−0.0607 + 0.3039j) |
| 805 | (−0.1253 − 1.8671j) | (0.6571 − 0.5102j) | (−0.0607 + 0.3027j) |
| 806 | (−1.2376 − 0.5163j) | (−0.6571 + 0.5102j) | (−0.0607 + 0.7189j) |
| 807 | (−1.1975 − 0.6706j) | (−0.6571 − 0.5102j) | (−0.0607 + 0.7866j) |
| 808 | (−0.5886 − 0.057j) | (0.5438 + 0.5982j) | (−0.0607 − 0.4316j) |
| 809 | (−0.5136 − 1.3286j) | (0.5438 − 0.5982j) | (−0.0607 − 0.4374j) |
| 810 | (−0.5758 − 0.4065j) | (−0.5438 + 0.5982j) | (−0.0607 − 0.5905j) |
| 811 | (−0.5611 − 0.527j) | (−0.5438 − 0.5982j) | (−0.0607 − 0.5662j) |
| 812 | (−1.802 − 0.0992j) | (0.585 + 0.571j) | (−0.0607 − 0.4309j) |
| 813 | (−0.8263 − 1.7115j) | (0.585 − 0.571j) | (−0.0607 − 0.4375j) |
| 814 | (−1.7001 − 0.701j) | (−0.585 + 0.571j) | (−0.0607 − 0.5905j) |
| 815 | (−1.6146 − 0.9089j) | (−0.585 − 0.571j) | (−0.0607 − 0.5676j) |
| 816 | (−0.6294 − 0.0568j) | (0.7628 + 0.5255j) | (−0.0607 − 0.1795j) |
| 817 | (−0.5374 − 1.1319j) | (0.7628 − 0.5255j) | (−0.0607 − 0.1792j) |
| 818 | (−0.6086 − 0.4059j) | (−0.7628 + 0.5255j) | (−0.0607 − 1.0559j) |
| 819 | (−0.5828 − 0.5502j) | (−0.7628 − 0.5255j) | (−0.0607 − 0.919j) |
| 820 | (−1.4203 − 0.0815j) | (0.711 + 0.5843j) | (−0.0607 − 0.1794j) |
| 821 | (−0.3766 − 1.8088j) | (0.711 − 0.5843j) | (−0.0607 − 0.1796j) |
| 822 | (−1.3503 − 0.5573j) | (−0.711 + 0.5843j) | (−0.0607 − 1.0561j) |
| 823 | (−1.2881 − 0.7205j) | (−0.711 − 0.5843j) | (−0.0607 − 0.9201j) |
| 824 | (−0.5888 − 0.0581j) | (0.5802 + 0.6879j) | (−0.0607 − 0.0609j) |
| 825 | (−0.4902 − 1.4819j) | (0.5802 − 0.6879j) | (−0.0607 − 0.0607j) |
| 826 | (−0.5798 − 0.4071j) | (−0.5802 + 0.6879j) | (−0.0607 − 1.2271j) |
| 827 | (−0.565 − 0.5268j) | (−0.5802 − 0.6879j) | (−0.0607 − 1.4453j) |
| 828 | (−1.5922 − 0.0884j) | (0.6418 + 0.6455j) | (−0.0607 − 0.0601j) |
| 829 | (−0.5607 − 1.6779j) | (0.6418 − 0.6455j) | (−0.0607 − 0.0601j) |
| 830 | (−1.5069 − 0.6219j) | (−0.6418 + 0.6455j) | (−0.0607 − 1.228j) |
| 831 | (−1.4334 − 0.8025j) | (−0.6418 − 0.6455j) | (−0.0607 − 1.4486j) |
| 832 | (−0.7537 − 0.1707j) | (0.5574 + 0.2288j) | (−1.2271 − 0.3051j) |
| 833 | (−0.6934 − 1.0026j) | (0.5574 − 0.2288j) | (−1.2271 − 0.3045j) |
| 834 | (−0.7479 − 0.2934j) | (−0.5574 + 0.2288j) | (−1.2271 − 0.7193j) |
| 835 | (−0.6935 − 0.6815j) | (−0.5574 − 0.2288j) | (−1.2271 − 0.7851j) |
| 836 | (−1.1595 − 0.2059j) | (0.5589 + 0.2277j) | (−1.2271 − 0.3039j) |
| 837 | (−0.8948 − 1.0294j) | (0.5589 − 0.2277j) | (−1.2271 − 0.3027j) |
| 838 | (−1.1381 − 0.3446j) | (−0.5589 + 0.2277j) | (−1.2271 − 0.7189j) |
| 839 | (−1.0186 − 0.7744j) | (−0.5589 − 0.2277j) | (−1.2271 − 0.7866j) |
| 840 | (−0.8475 − 0.1783j) | (0.3498 + 0.4641j) | (−1.2271 − 0.4316j) |
| 841 | (−0.7045 − 0.8734j) | (0.3498 − 0.4641j) | (−1.2271 − 0.4374j) |
| 842 | (−0.8329 − 0.3009j) | (−0.3498 + 0.4641j) | (−1.2271 − 0.5905j) |
| 843 | (−0.7305 − 0.7316j) | (−0.3498 − 0.4641j) | (−1.2271 − 0.5662j) |
| 844 | (−0.971 − 0.1881j) | (0.336 + 0.4751j) | (−1.2271 − 0.4309j) |
| 845 | (−0.8488 − 0.8824j) | (0.336 − 0.4751j) | (−1.2271 − 0.4375j) |
| 846 | (−0.9554 − 0.3139j) | (−0.336 + 0.4751j) | (−1.2271 − 0.5905j) |
| 847 | (−0.872 − 0.7431j) | (−0.336 − 0.4751j) | (−1.2271 − 0.5676j) |
| 848 | (−0.7549 − 0.1699j) | (1.4992 + 0.9395j) | (−1.2271 − 0.1795j) |
| 849 | (−0.7024 − 1.0223j) | (1.4992 − 0.9395j) | (−1.2271 − 0.1792j) |
| 850 | (−0.7469 − 0.2895j) | (−1.4992 + 0.9395j) | (−1.2271 − 1.0559j) |
| 851 | (−0.689 − 0.6783j) | (−1.4992 − 0.9395j) | (−1.2271 − 0.919j) |
| 852 | (−1.1088 − 0.1984j) | (1.5913 + 0.785j) | (−1.2271 − 0.1794j) |
| 853 | (−0.8629 − 1.0112j) | (1.5913 − 0.785j) | (−1.2271 − 0.1796j) |
| 854 | (−1.0899 − 0.3349j) | (−1.5913 + 0.785j) | (−1.2271 − 1.0561j) |
| 855 | (−0.9908 − 0.7546j) | (−1.5913 − 0.785j) | (−1.2271 − 0.9201j) |
| 856 | (−0.8433 − 0.1773j) | (0.8423 + 1.5041j) | (−1.2271 − 0.0609j) |
| 857 | (−0.7058 − 0.8765j) | (0.8423 − 1.5041j) | (−1.2271 − 0.0607j) |
| 858 | (−0.8266 − 0.2979j) | (−0.8423 + 1.5041j) | (−1.2271 − 1.2271j) |
| 859 | (−0.73 − 0.7316j) | (−0.8423 − 1.5041j) | (−1.2271 − 1.4453j) |
| 860 | (−0.9927 − 0.1926j) | (0.6877 + 1.567j) | (−1.2271 − 0.0601j) |
| 861 | (−0.84 − 0.8821j) | (0.6877 − 1.567j) | (−1.2271 − 0.0601j) |
| 862 | (−0.9678 − 0.3174j) | (−0.6877 + 1.567j) | (−1.2271 − 1.228j) |
| 863 | (−0.8811 − 0.7424j) | (−0.6877 − 1.567j) | (−1.2271 − 1.4486j) |
| 864 | (−0.7615 − 0.0593j) | (0.5019 + 0.2772j) | (−1.4453 − 0.3051j) |
| 865 | (−0.7113 − 1.2017j) | (0.5019 − 0.2772j) | (−1.4453 − 0.3045j) |
| 866 | (−0.7358 − 0.4169j) | (−0.5019 + 0.2772j) | (−1.4453 − 0.7193j) |
| 867 | (−0.7111 − 0.5569j) | (−0.5019 − 0.2772j) | (−1.4453 − 0.7851j) |
| 868 | (−1.1714 − 0.0711j) | (0.5006 + 0.2783j) | (−1.4453 − 0.3039j) |
| 869 | (−0.8677 − 1.2003j) | (0.5006 − 0.2783j) | (−1.4453 − 0.3027j) |
| 870 | (−1.1082 − 0.4852j) | (−0.5006 + 0.2783j) | (−1.4453 − 0.7189j) |
| 871 | (−1.0697 − 0.6262j) | (−0.5006 − 0.2783j) | (−1.4453 − 0.7866j) |
| 872 | (−0.849 − 0.0622j) | (0.4263 + 0.391j) | (−1.4453 − 0.4316j) |
| 873 | (−0.6719 − 1.3322j) | (0.4263 − 0.391j) | (−1.4453 − 0.4374j) |
| 874 | (−0.8073 − 0.4268j) | (−0.4263 + 0.391j) | (−1.4453 − 0.5905j) |
| 875 | (−0.785 − 0.5627j) | (−0.4263 − 0.391j) | (−1.4453 − 0.5662j) |
| 876 | (−0.9819 − 0.0652j) | (0.4317 + 0.3838j) | (−1.4453 − 0.4309j) |
| 877 | (−1.082 − 1.5252j) | (0.4317 − 0.3838j) | (−1.4453 − 0.4375j) |
| 878 | (−0.9394 − 0.449j) | (−0.4317 + 0.3838j) | (−1.4453 − 0.5905j) |
| 879 | (−0.907 − 0.5883j) | (−0.4317 − 0.3838j) | (−1.4453 − 0.5676j) |
| 880 | (−0.759 − 0.0587j) | (1.3915 + 1.0821j) | (−1.4453 − 0.1795j) |

-continued

| Mapping | NN_QSL | NN_QSC | NN_RSC |
|---|---|---|---|
| 881 | (−0.6864 − 1.1427j) | (1.3915 − 1.0821j) | (−1.4453 − 0.1792j) |
| 882 | (−0.7315 − 0.4169j) | (−1.3915 + 1.0821j) | (−1.4453 − 1.0559j) |
| 883 | (−0.709 − 0.5576j) | (−1.3915 − 1.0821j) | (−1.4453 − 0.919j) |
| 884 | (−1.1186 − 0.0679j) | (1.2693 + 1.2108j) | (−1.4453 + 0.1794j) |
| 885 | (−0.9889 − 1.2742j) | (1.2693 − 1.2108j) | (−1.4453 + 0.1796j) |
| 886 | (−1.0622 − 0.4685j) | (−1.2693 + 1.2108j) | (−1.4453 + 1.0561j) |
| 887 | (−1.0334 − 0.6182j) | (−1.2693 − 1.2108j) | (−1.4453 + 0.9201j) |
| 888 | (−0.8496 − 0.0607j) | (0.9921 + 1.4233j) | (−1.4453 − 0.0609j) |
| 889 | (−0.6982 − 1.4703j) | (0.9921 − 1.4233j) | (−1.4453 − 0.0607j) |
| 890 | (−0.8022 − 0.4245j) | (−0.9921 + 1.4233j) | (−1.4453 − 1.2271j) |
| 891 | (−0.7856 − 0.563j) | (−0.9921 − 1.4233j) | (−1.4453 − 1.4453j) |
| 892 | (−0.997 − 0.0646j) | (1.1356 + 1.3257j) | (−1.4453 + 0.0601j) |
| 893 | (−0.8802 − 1.4371j) | (1.1356 − 1.3257j) | (−1.4453 + 0.0601j) |
| 894 | (−0.9454 − 0.4482j) | (−1.1356 + 1.3257j) | (−1.4453 + 1.228j) |
| 895 | (−0.9139 − 0.5896j) | (−1.1356 − 1.3257j) | (−1.4453 + 1.4486j) |
| 896 | (0.6243 − 0.165j) | (0.6883 + 0.3373j) | (0.0601 − 0.3051j) |
| 897 | (0.5469 − 0.985j) | (0.6883 − 0.3373j) | (0.0601 − 0.3045j) |
| 898 | (0.6164 − 0.2812j) | (−0.6883 + 0.3373j) | (0.0601 − 0.7193j) |
| 899 | (0.567 − 0.6809j) | (−0.6883 − 0.3373j) | (0.0601 − 0.7851j) |
| 900 | (1.2933 − 0.2212j) | (0.7047 + 0.3065j) | (0.0601 + 0.3039j) |
| 901 | (1.0332 − 0.9826j) | (0.7047 − 0.3065j) | (0.0601 + 0.3027j) |
| 902 | (1.2676 − 0.367j) | (−0.7047 + 0.3065j) | (0.0601 + 0.7189j) |
| 903 | (1.1144 − 0.843j) | (−0.7047 − 0.3065j) | (0.0601 + 0.7866j) |
| 904 | (0.5868 − 0.1642j) | (0.4317 + 0.5823j) | (0.0601 − 0.4316j) |
| 905 | (0.5543 − 0.8737j) | (0.4317 − 0.5823j) | (0.0601 − 0.4374j) |
| 906 | (0.5826 − 0.2806j) | (−0.4317 + 0.5823j) | (0.0601 − 0.5905j) |
| 907 | (0.559 − 0.7455j) | (−0.4317 − 0.5823j) | (0.0601 − 0.5662j) |
| 908 | (1.7864 − 0.2881j) | (0.3919 + 0.607j) | (0.0601 + 0.4309j) |
| 909 | (1.3108 − 1.3372j) | (0.3919 − 0.607j) | (0.0601 + 0.4375j) |
| 910 | (1.7507 − 0.4867j) | (−0.3919 + 0.607j) | (0.0601 + 0.5905j) |
| 911 | (1.4991 − 1.1213j) | (−0.3919 − 0.607j) | (0.0601 + 0.5676j) |
| 912 | (0.6234 − 0.165j) | (0.8852 + 0.4995j) | (0.0601 − 0.1795j) |
| 913 | (0.547 − 1.0016j) | (0.8852 − 0.4995j) | (0.0601 − 0.1792j) |
| 914 | (0.6178 − 0.2811j) | (−0.8852 + 0.4995j) | (0.0601 − 1.0559j) |
| 915 | (0.567 − 0.6783j) | (−0.8852 − 0.4995j) | (0.0601 − 0.919j) |
| 916 | (1.412 − 0.2345j) | (0.9323 + 0.4173j) | (0.0601 + 0.1794j) |
| 917 | (1.0937 − 1.0549j) | (0.9323 − 0.4173j) | (0.0601 + 0.1796j) |
| 918 | (1.3864 − 0.3933j) | (−0.9323 + 0.4173j) | (0.0601 + 1.0561j) |
| 919 | (1.2033 − 0.8786j) | (−0.9323 − 0.4173j) | (0.0601 + 0.9201j) |
| 920 | (0.5885 − 0.1642j) | (0.5331 + 0.8095j) | (0.0601 − 0.0609j) |
| 921 | (0.5545 − 0.8725j) | (0.5331 − 0.8095j) | (0.0601 − 0.0607j) |
| 922 | (0.5815 − 0.2807j) | (−0.5331 + 0.8095j) | (0.0601 − 1.2271j) |
| 923 | (0.5548 − 0.7451j) | (−0.5331 − 0.8095j) | (0.0601 − 1.4453j) |
| 924 | (1.5774 − 0.2573j) | (0.4495 + 0.8419j) | (0.0601 + 0.0601j) |
| 925 | (1.2284 − 1.1433j) | (0.4495 − 0.8419j) | (0.0601 + 0.0601j) |
| 926 | (1.5511 − 0.4361j) | (−0.4495 + 0.8419j) | (0.0601 + 1.228j) |
| 927 | (1.3354 − 0.9773j) | (−0.4495 − 0.8419j) | (0.0601 + 1.4486j) |
| 928 | (0.6283 − 0.0558j) | (0.6247 + 0.4193j) | (0.0601 − 0.3051j) |
| 929 | (0.5291 − 1.1819j) | (0.6247 − 0.4193j) | (0.0601 − 0.3045j) |
| 930 | (0.6051 − 0.402j) | (−0.6247 + 0.4193j) | (0.0601 − 0.7193j) |
| 931 | (0.5814 − 0.5448j) | (−0.6247 − 0.4193j) | (0.0601 − 0.7851j) |
| 932 | (1.2999 − 0.0712j) | (0.6061 + 0.4389j) | (0.0601 + 0.3039j) |
| 933 | (0.1369 − 1.8677j) | (0.6061 − 0.4389j) | (0.0601 + 0.3027j) |
| 934 | (1.2418 − 0.516j) | (−0.6061 + 0.4389j) | (0.0601 + 0.7189j) |
| 935 | (1.1902 − 0.6679j) | (−0.6061 − 0.4389j) | (0.0601 + 0.7866j) |
| 936 | (0.5873 − 0.0559j) | (0.511 + 0.5228j) | (0.0601 − 0.4316j) |
| 937 | (0.5173 − 1.3265j) | (0.511 − 0.5228j) | (0.0601 − 0.4374j) |
| 938 | (0.5751 − 0.4014j) | (−0.511 + 0.5228j) | (0.0601 − 0.5905j) |
| 939 | (0.5636 − 0.528j) | (−0.511 − 0.5228j) | (0.0601 − 0.5662j) |
| 940 | (1.7981 − 0.093j) | (0.5344 + 0.505j) | (0.0601 + 0.4309j) |
| 941 | (0.8308 − 1.7184j) | (0.5344 − 0.505j) | (0.0601 + 0.4375j) |
| 942 | (1.7005 − 0.6966j) | (−0.5344 + 0.505j) | (0.0601 + 0.5905j) |
| 943 | (1.6087 − 0.9062j) | (−0.5344 − 0.505j) | (0.0601 + 0.5676j) |
| 944 | (0.6268 − 0.0558j) | (0.8281 + 0.5806j) | (0.0601 − 0.1795j) |
| 945 | (0.5414 − 1.1347j) | (0.8281 − 0.5806j) | (0.0601 − 0.1792j) |
| 946 | (0.6059 − 0.4021j) | (−0.8281 + 0.5806j) | (0.0601 − 1.0559j) |
| 947 | (0.5805 − 0.547j) | (−0.8281 − 0.5806j) | (0.0601 − 0.919j) |
| 948 | (1.4178 − 0.0771j) | (0.7656 + 0.6506j) | (0.0601 + 0.1794j) |
| 949 | (0.3826 − 1.813j) | (0.7656 − 0.6506j) | (0.0601 + 0.1796j) |
| 950 | (1.3484 − 0.5553j) | (−0.7656 + 0.6506j) | (0.0601 + 1.0561j) |
| 951 | (1.2836 − 0.7204j) | (−0.7656 − 0.6506j) | (0.0601 + 0.9201j) |
| 952 | (0.5857 − 0.055j) | (0.6173 + 0.7664j) | (0.0601 − 0.0609j) |
| 953 | (0.4961 − 1.4846j) | (0.6173 − 0.7664j) | (0.0601 − 0.0607j) |
| 954 | (0.5773 − 0.4005j) | (−0.6173 + 0.7664j) | (0.0601 − 1.2271j) |
| 955 | (0.5643 − 0.5263j) | (−0.6173 − 0.7664j) | (0.0601 − 1.4453j) |
| 956 | (1.5788 − 0.0837j) | (0.6923 + 0.7149j) | (0.0601 + 0.0601j) |
| 957 | (0.5694 − 1.686j) | (0.6923 − 0.7149j) | (0.0601 + 0.0601j) |

-continued

| Mapping | NN_QSL | NN_QSC | NN_RSC |
| --- | --- | --- | --- |
| 958 | (1.4996 − 0.6152j) | (−0.6923 + 0.7149j) | (0.0601 + 1.228j) |
| 959 | (1.4303 − 0.8j) | (−0.6923 − 0.7149j) | (0.0601 + 1.4486j) |
| 960 | (0.7516 − 0.1684j) | (0.6194 + 0.279j) | (1.228 − 0.3051j) |
| 961 | (0.6934 − 0.9988j) | (0.6194 − 0.279j) | (1.228 − 0.3045j) |
| 962 | (0.7419 − 0.2872j) | (−0.6194 + 0.279j) | (1.228 − 0.7193j) |
| 963 | (0.6901 − 0.6786j) | (−0.6194 − 0.279j) | (1.228 − 0.7851j) |
| 964 | (1.1588 − 0.2042j) | (0.6253 + 0.2698j) | (1.228 + 0.3039j) |
| 965 | (0.9018 − 1.0284j) | (0.6253 − 0.2698j) | (1.228 + 0.3027j) |
| 966 | (1.135 − 0.3413j) | (−0.6253 + 0.2698j) | (1.228 + 0.7189j) |
| 967 | (1.0117 − 0.7674j) | (−0.6253 − 0.2698j) | (1.228 + 0.7866j) |
| 968 | (0.8433 − 0.1752j) | (0.3796 + 0.5044j) | (1.228 − 0.4316j) |
| 969 | (0.7021 − 0.8721j) | (0.3796 − 0.5044j) | (1.228 − 0.4374j) |
| 970 | (0.8268 − 0.2959j) | (−0.3796 + 0.5044j) | (1.228 − 0.5905j) |
| 971 | (0.7323 − 0.7298j) | (−0.3796 − 0.5044j) | (1.228 − 0.5662j) |
| 972 | (0.9716 − 0.1854j) | (0.3557 + 0.5188j) | (1.228 + 0.4309j) |
| 973 | (0.8465 − 0.8771j) | (0.3557 − 0.5188j) | (1.228 + 0.4375j) |
| 974 | (0.9546 − 0.3122j) | (−0.3557 + 0.5188j) | (1.228 + 0.5905j) |
| 975 | (0.8752 − 0.7432j) | (−0.3557 − 0.5188j) | (1.228 + 0.5676j) |
| 976 | (0.7521 − 0.1687j) | (1.3509 + 0.837j) | (1.228 − 0.1795j) |
| 977 | (0.6996 − 1.0164j) | (1.3509 − 0.837j) | (1.228 − 0.1792j) |
| 978 | (0.7454 − 0.2889j) | (−1.3509 + 0.837j) | (1.228 − 1.0559j) |
| 979 | (0.6881 − 0.6803j) | (−1.3509 − 0.837j) | (1.228 − 0.919j) |
| 980 | (1.1025 − 0.1974j) | (1.4337 + 0.6993j) | (1.228 + 0.1794j) |
| 981 | (0.8613 − 1.0075j) | (1.4337 − 0.6993j) | (1.228 + 0.1796j) |
| 982 | (1.0905 − 0.333j) | (−1.4337 + 0.6993j) | (1.228 + 1.0561j) |
| 983 | (0.9886 − 0.7498j) | (−1.4337 − 0.6993j) | (1.228 + 0.9201j) |
| 984 | (0.844 − 0.1753j) | (0.7641 + 1.3398j) | (1.228 − 0.0609j) |
| 985 | (0.7042 − 0.8704j) | (0.7641 − 1.3398j) | (1.228 − 0.0607j) |
| 986 | (0.8241 − 0.2959j) | (−0.7641 + 1.3398j) | (1.228 − 1.2271j) |
| 987 | (0.7293 − 0.7284j) | (−0.7641 − 1.3398j) | (1.228 − 1.4453j) |
| 988 | (0.9853 − 0.1875j) | (0.6248 + 1.3957j) | (1.228 + 0.0601j) |
| 989 | (0.8402 − 0.8791j) | (0.6248 − 1.3957j) | (1.228 + 0.0601j) |
| 990 | (0.9675 − 0.3141j) | (−0.6248 + 1.3957j) | (1.228 + 1.228j) |
| 991 | (0.8821 − 0.7432j) | (−0.6248 − 1.3957j) | (1.228 + 1.4486j) |
| 992 | (0.758 − 0.0568j) | (0.555 + 0.3523j) | (1.4486 − 0.3051j) |
| 993 | (0.7116 − 1.1997j) | (0.555 − 0.3523j) | (1.4486 − 0.3045j) |
| 994 | (0.7289 − 0.4142j) | (−0.555 + 0.3523j) | (1.4486 − 0.7193j) |
| 995 | (0.7109 − 0.5574j) | (−0.555 − 0.3523j) | (1.4486 − 0.7851j) |
| 996 | (1.1685 − 0.0674j) | (0.5483 + 0.357j) | (1.4486 + 0.3039j) |
| 997 | (0.8699 − 1.1981j) | (0.5483 − 0.357j) | (1.4486 + 0.3027j) |
| 998 | (1.1063 − 0.4788j) | (−0.5483 + 0.357j) | (1.4486 + 0.7189j) |
| 999 | (1.0665 − 0.6214j) | (−0.5483 − 0.357j) | (1.4486 + 0.7866j) |
| 1000 | (0.8509 − 0.0599j) | (0.4626 + 0.4325j) | (1.4486 − 0.4316j) |
| 1001 | (0.6789 − 1.3376j) | (0.4626 − 0.4325j) | (1.4486 − 0.4374j) |
| 1002 | (0.8082 − 0.4231j) | (−0.4626 + 0.4325j) | (1.4486 − 0.5905j) |
| 1003 | (0.7847 − 0.5571j) | (−0.4626 − 0.4325j) | (1.4486 − 0.5662j) |
| 1004 | (0.9808 − 0.0636j) | (0.4723 + 0.4235j) | (1.4486 + 0.4309j) |
| 1005 | (1.0845 − 1.525j) | (0.4723 − 0.4235j) | (1.4486 + 0.4375j) |
| 1006 | (0.935 − 0.4441j) | (−0.4723 + 0.4235j) | (1.4486 + 0.5905j) |
| 1007 | (0.9018 − 0.5822j) | (−0.4723 − 0.4235j) | (1.4486 + 0.5676j) |
| 1008 | (0.7563 − 0.0541j) | (1.2548 + 0.9637j) | (1.4486 − 0.1795j) |
| 1009 | (0.6846 − 1.137j) | (1.2548 − 0.9637j) | (1.4486 − 0.1792j) |
| 1010 | (0.732 − 0.4142j) | (−1.2548 + 0.9637j) | (1.4486 − 1.0559j) |
| 1011 | (0.7126 − 0.5538j) | (−1.2548 − 0.9637j) | (1.4486 − 0.919j) |
| 1012 | (1.1128 − 0.0658j) | (1.1465 + 1.0787j) | (1.4486 + 0.1794j) |
| 1013 | (0.9928 − 1.2762j) | (1.1465 − 1.0787j) | (1.4486 + 0.1796j) |
| 1014 | (1.0595 − 0.4669j) | (−1.1465 + 1.0787j) | (1.4486 + 1.0561j) |
| 1015 | (1.0277 − 0.6118j) | (−1.1465 − 1.0787j) | (1.4486 + 0.9201j) |
| 1016 | (0.8491 − 0.0588j) | (0.8992 + 1.2679j) | (1.4486 − 0.0609j) |
| 1017 | (0.6995 − 1.4755j) | (0.8992 − 1.2679j) | (1.4486 − 0.0607j) |
| 1018 | (0.8088 − 0.4246j) | (−0.8992 + 1.2679j) | (1.4486 − 1.2271j) |
| 1019 | (0.7788 − 0.5561j) | (−0.8992 − 1.2679j) | (1.4486 − 1.4453j) |
| 1020 | (0.9928 − 0.062j) | (1.0275 + 1.1809j) | (1.4486 + 0.0601j) |
| 1021 | (0.881 − 1.4348j) | (1.0275 − 1.1809j) | (1.4486 + 0.0601j) |
| 1022 | (0.9463 − 0.4454j) | (−1.0275 + 1.1809j) | (1.4486 + 1.228j) |
| 1023 | (0.9131 − 0.5855j) | (−1.0275 − 1.1809j) | (1.4486 + 1.4486j). |

12. The apparatus of claim 8, wherein the mapping is, for one of a neural network subject to the QSL constraint (NN_QSL), a neural network subject to the QSC constraint (NN_QSC), or a neural network subject to the RSC constraint (NN_RSC), according to:

| Mapping | NN_QSL | NN_QSC | NN_RSC |
|---|---|---|---|
| 0 | (0.0905 + 0.6153j) | (0.0412 + 0.8491j) | (1.0626 + 1.0626j) |
| 1 | (0.0726 + 0.5304j) | (0.0412 − 0.8491j) | (1.0626 − 0.3591j) |
| 2 | (−0.087 + 0.6142j) | (−0.0412 + 0.8491j) | (1.0626 + 1.1878j) |
| 3 | (−0.0705 + 0.5308j) | (−0.0412 − 0.8491j) | (1.0626 − 0.4301j) |
| 4 | (0.1512 + 0.6093j) | (0.2881 + 0.81j) | (1.0626 − 1.058j) |
| 5 | (0.1337 + 0.5247j) | (0.2881 − 0.81j) | (1.0626 − 0.7494j) |
| 6 | (−0.1463 + 0.6076j) | (−0.2881 + 0.81j) | (1.0626 − 1.1847j) |
| 7 | (−0.1323 + 0.5167j) | (−0.2881 − 0.81j) | (1.0626 − 0.6628j) |
| 8 | (0.1277 + 0.8468j) | (0.124 + 0.8429j) | (1.0626 + 0.7523j) |
| 9 | (0.03 + 0.2228j) | (0.124 − 0.8429j) | (1.0626 − 0.1607j) |
| 10 | (−0.1212 + 0.8513j) | (−0.124 + 0.8429j) | (1.0626 + 0.6629j) |
| 11 | (−0.0377 + 0.2278j) | (−0.124 − 0.8429j) | (1.0626 − 0.0944j) |
| 12 | (0.2087 + 0.8286j) | (0.2064 + 0.8301j) | (1.0626 + 0.3594j) |
| 13 | (0.0751 + 0.2278j) | (0.2064 − 0.8301j) | (1.0626 + 0.1597j) |
| 14 | (−0.2038 + 0.8338j) | (−0.2064 + 0.8301j) | (1.0626 + 0.4297j) |
| 15 | (−0.0805 + 0.2288j) | (−0.2064 − 0.8301j) | (1.0626 + 0.0937j) |
| 16 | (0.0329 + 0.6239j) | (0.0382 + 0.7703j) | (1.0626 + 0.9504j) |
| 17 | (0.0283 + 0.5464j) | (0.0382 − 0.7703j) | (1.0626 − 0.2918j) |
| 18 | (−0.0299 + 0.6233j) | (−0.0382 + 0.7703j) | (1.0626 + 1.3347j) |
| 19 | (−0.0246 + 0.5492j) | (−0.0382 − 0.7703j) | (1.0626 − 0.503j) |
| 20 | (0.2038 + 0.5925j) | (0.2647 + 0.7371j) | (1.0626 − 0.946j) |
| 21 | (0.1759 + 0.5208j) | (0.2647 − 0.7371j) | (1.0626 − 0.8449j) |
| 22 | (−0.2034 + 0.5935j) | (−0.2647 + 0.7371j) | (1.0626 − 1.331j) |
| 23 | (−0.1799 + 0.516j) | (−0.2647 − 0.7371j) | (1.0626 − 0.5804j) |
| 24 | (0.0438 + 0.8551j) | (0.1142 + 0.7653j) | (1.0626 + 0.8462j) |
| 25 | (0.0256 + 0.1565j) | (0.1142 − 0.7653j) | (1.0626 − 0.2242j) |
| 26 | (−0.0406 + 0.8549j) | (−0.1142 + 0.7653j) | (1.0626 + 0.5805j) |
| 27 | (−0.0358 + 0.1574j) | (−0.1142 − 0.7653j) | (1.0626 − 0.0332j) |
| 28 | (0.2873 + 0.8036j) | (0.1901 + 0.7546j) | (1.0626 + 0.2916j) |
| 29 | (0.0278 + 0.1041j) | (0.1901 − 0.7546j) | (1.0626 + 0.2239j) |
| 30 | (−0.283 + 0.8097j) | (−0.1901 + 0.7546j) | (1.0626 + 0.5035j) |
| 31 | (−0.0364 + 0.1031j) | (−0.1901 − 0.7546j) | (1.0626 + 0.0328j) |
| 32 | (0.0851 − 0.6146j) | (0.0335 − 0.6142j) | (−0.3591 + 1.0626j) |
| 33 | (0.0647 − 0.5301j) | (0.0335 − 0.6142j) | (−0.3591 − 0.3591j) |
| 34 | (−0.0932 − 0.6134j) | (−0.0335 + 0.6142j) | (−0.3591 + 1.1878j) |
| 35 | (−0.0764 − 0.5278j) | (−0.0335 − 0.6142j) | (−0.3591 − 0.4301j) |
| 36 | (0.1436 − 0.6061j) | (0.2243 + 0.5872j) | (−0.3591 − 1.058j) |
| 37 | (0.1253 − 0.5197j) | (0.2243 − 0.5872j) | (−0.3591 − 0.7494j) |
| 38 | (−0.1581 − 0.6059j) | (−0.2243 + 0.5872j) | (−0.3591 − 1.1847j) |
| 39 | (−0.1414 − 0.5141j) | (−0.2243 − 0.5872j) | (−0.3591 − 0.6628j) |
| 40 | (0.1171 − 0.8463j) | (0.0983 + 0.6107j) | (−0.3591 + 0.7523j) |
| 41 | (0.0244 − 0.2175j) | (0.0983 − 0.6107j) | (−0.3591 − 0.1607j) |
| 42 | (−0.1323 − 0.8443j) | (−0.0983 + 0.6107j) | (−0.3591 + 0.6629j) |
| 43 | (−0.0377 − 0.2194j) | (−0.0983 − 0.6107j) | (−0.3591 − 0.0944j) |
| 44 | (0.1984 − 0.8274j) | (0.162 + 0.6012j) | (−0.3591 + 0.3594j) |
| 45 | (0.0741 − 0.2254j) | (0.162 − 0.6012j) | (−0.3591 + 0.1597j) |
| 46 | (−0.2126 − 0.8267j) | (−0.162 + 0.6012j) | (−0.3591 + 0.4297j) |
| 47 | (−0.0802 − 0.2244j) | (−0.162 − 0.6012j) | (−0.3591 + 0.0937j) |
| 48 | (0.0258 − 0.621j) | (0.0352 + 0.6922j) | (−0.3591 + 0.9504j) |
| 49 | (0.0226 − 0.5432j) | (0.0352 − 0.6922j) | (−0.3591 − 0.2918j) |
| 50 | (−0.039 − 0.6218j) | (−0.0352 + 0.6922j) | (−0.3591 + 1.3347j) |
| 51 | (−0.034 − 0.544j) | (−0.0352 − 0.6922j) | (−0.3591 − 0.503j) |
| 52 | (0.1967 − 0.5901j) | (0.2428 + 0.6632j) | (−0.3591 − 0.946j) |
| 53 | (0.172 − 0.5162j) | (0.2428 − 0.6632j) | (−0.3591 − 0.8449j) |
| 54 | (−0.2091 − 0.5878j) | (−0.2428 + 0.6632j) | (−0.3591 − 1.331j) |
| 55 | (−0.1838 − 0.518j) | (−0.2428 − 0.6632j) | (−0.3591 − 0.5804j) |
| 56 | (0.0358 − 0.8517j) | (0.1057 + 0.6878j) | (−0.3591 + 0.8462j) |
| 57 | (0.0265 − 0.1552j) | (0.1057 − 0.6878j) | (−0.3591 − 0.2242j) |
| 58 | (−0.052 − 0.8529j) | (−0.1057 + 0.6878j) | (−0.3591 + 0.5805j) |
| 59 | (−0.0294 − 0.1497j) | (−0.1057 − 0.6878j) | (−0.3591 − 0.0332j) |
| 60 | (0.2811 − 0.799j) | (0.1754 + 0.6784j) | (−0.3591 + 0.2916j) |
| 61 | (0.0225 − 0.1034j) | (0.1754 − 0.6784j) | (−0.3591 + 0.2239j) |
| 62 | (−0.2913 − 0.8052j) | (−0.1754 + 0.6784j) | (−0.3591 + 0.5035j) |
| 63 | (−0.0353 − 0.1029j) | (−0.1754 − 0.6784j) | (−0.3591 + 0.0328j) |
| 64 | (0.6232 + 0.0923j) | (0.8497 + 0.0412j) | (1.1878 + 1.0626j) |
| 65 | (0.5459 + 0.0722j) | (0.8497 − 0.0412j) | (1.1878 − 0.3591j) |
| 66 | (−0.6279 + 0.0985j) | (−0.8497 + 0.0412j) | (1.1878 + 1.1878j) |
| 67 | (−0.5475 + 0.0765j) | (−0.8497 − 0.0412j) | (1.1878 − 0.4301j) |
| 68 | (0.6112 + 0.1529j) | (0.8102 + 0.2874j) | (1.1878 − 1.058j) |
| 69 | (0.5327 + 0.1345j) | (0.8102 − 0.2874j) | (1.1878 − 0.7494j) |
| 70 | (−0.6161 + 0.1549j) | (−0.8102 + 0.2874j) | (1.1878 − 1.1847j) |
| 71 | (−0.5353 + 0.1413j) | (−0.8102 − 0.2874j) | (1.1878 − 0.6628j) |
| 72 | (0.8437 + 0.1242j) | (0.8436 + 0.1238j) | (1.1878 + 0.7523j) |
| 73 | (0.2464 + 0.0312j) | (0.8436 − 0.1238j) | (1.1878 − 0.1607j) |
| 74 | (−0.8508 + 0.1338j) | (−0.8436 + 0.1238j) | (1.1878 + 0.6629j) |
| 75 | (−0.2532 + 0.0313j) | (−0.8436 − 0.1238j) | (1.1878 − 0.0944j) |
| 76 | (0.8236 + 0.2067j) | (0.8306 + 0.2059j) | (1.1878 + 0.3594j) |
| 77 | (0.2607 + 0.0719j) | (0.8306 − 0.2059j) | (1.1878 + 0.1597j) |
| 78 | (−0.8333 + 0.2169j) | (−0.8306 + 0.2059j) | (1.1878 + 0.4297j) |
| 79 | (−0.2658 + 0.0741j) | (−0.8306 − 0.2059j) | (1.1878 + 0.0937j) |
| 80 | (0.6317 + 0.0305j) | (0.771 + 0.0382j) | (1.1878 + 0.9504j) |
| 81 | (0.5553 + 0.0285j) | (0.771 − 0.0382j) | (1.1878 − 0.2918j) |
| 82 | (−0.637 + 0.0371j) | (−0.771 + 0.0382j) | (1.1878 + 1.3347j) |
| 83 | (−0.5621 + 0.0301j) | (−0.771 − 0.0382j) | (1.1878 − 0.503j) |
| 84 | (0.5893 + 0.2067j) | (0.7374 + 0.2643j) | (1.1878 − 0.946j) |
| 85 | (0.5227 + 0.185j) | (0.7374 − 0.2643j) | (1.1878 − 0.8449j) |
| 86 | (−0.5955 + 0.2141j) | (−0.7374 + 0.2643j) | (1.1878 − 1.331j) |
| 87 | (−0.5257 + 0.19j) | (−0.7374 − 0.2643j) | (1.1878 − 0.5804j) |
| 88 | (0.852 + 0.0424j) | (0.7656 + 0.1141j) | (1.1878 + 0.8462j) |
| 89 | (0.1783 + 0.0292j) | (0.7656 − 0.1141j) | (1.1878 − 0.2242j) |
| 90 | (−0.8597 + 0.0457j) | (−0.7656 + 0.1141j) | (1.1878 + 0.5805j) |
| 91 | (−0.1895 + 0.0298j) | (−0.7656 − 0.1141j) | (1.1878 − 0.0332j) |
| 92 | (0.7982 + 0.2906j) | (0.7545 + 0.1894j) | (1.1878 + 0.2916j) |
| 93 | (0.0291 + 0.03j) | (0.7545 − 0.1894j) | (1.1878 + 0.2239j) |
| 94 | (−0.8039 + 0.2975j) | (−0.7545 + 0.1894j) | (1.1878 + 0.5035j) |
| 95 | (−0.034 + 0.0331j) | (−0.7545 − 0.1894j) | (1.1878 + 0.0328j) |
| 96 | (0.6194 − 0.0972j) | (0.6147 + 0.0331j) | (−0.4301 + 1.0626j) |
| 97 | (0.5444 − 0.079j) | (0.6147 − 0.0331j) | (−0.4301 − 0.3591j) |
| 98 | (−0.6257 − 0.0906j) | (−0.6147 + 0.0331j) | (−0.4301 + 1.1878j) |
| 99 | (−0.5454 − 0.0701j) | (−0.6147 − 0.0331j) | (−0.4301 − 0.4301j) |
| 100 | (0.6084 − 0.152j) | (0.5872 + 0.2241j) | (−0.4301 − 1.058j) |
| 101 | (0.5262 − 0.1433j) | (0.5872 − 0.2241j) | (−0.4301 − 0.7494j) |
| 102 | (−0.6127 − 0.1516j) | (−0.5872 + 0.2241j) | (−0.4301 − 1.1847j) |
| 103 | (−0.5334 − 0.1337j) | (−0.5872 − 0.2241j) | (−0.4301 − 0.6628j) |
| 104 | (0.8457 − 0.1252j) | (0.6108 + 0.0978j) | (−0.4301 + 0.7523j) |
| 105 | (0.2492 − 0.0318j) | (0.6108 − 0.0978j) | (−0.4301 − 0.1607j) |
| 106 | (−0.8508 − 0.1251j) | (−0.6108 + 0.0978j) | (−0.4301 + 0.6629j) |
| 107 | (−0.2563 − 0.0301j) | (−0.6108 − 0.0978j) | (−0.4301 − 0.0944j) |
| 108 | (0.825 − 0.2124j) | (0.6016 + 0.1618j) | (−0.4301 + 0.3594j) |
| 109 | (0.263 − 0.0742j) | (0.6016 − 0.1618j) | (−0.4301 + 0.1597j) |
| 110 | (−0.8349 − 0.2082j) | (−0.6016 + 0.1618j) | (−0.4301 + 0.4297j) |
| 111 | (−0.2674 − 0.0732j) | (−0.6016 − 0.1618j) | (−0.4301 + 0.0937j) |
| 112 | (0.6291 − 0.0356j) | (0.6928 + 0.0352j) | (−0.4301 + 0.9504j) |
| 113 | (0.5543 − 0.0309j) | (0.6928 − 0.0352j) | (−0.4301 − 0.2918j) |
| 114 | (−0.6409 − 0.0308j) | (−0.6928 + 0.0352j) | (−0.4301 + 1.3347j) |
| 115 | (−0.5606 − 0.0274j) | (−0.6928 − 0.0352j) | (−0.4301 − 0.503j) |
| 116 | (0.5908 − 0.212j) | (0.6636 + 0.2429j) | (−0.4301 − 0.946j) |
| 117 | (0.5167 − 0.191j) | (0.6636 − 0.2429j) | (−0.4301 − 0.8449j) |
| 118 | (−0.5935 − 0.2049j) | (−0.6636 + 0.2429j) | (−0.4301 − 1.331j) |
| 119 | (−0.5246 − 0.1834j) | (−0.6636 − 0.2429j) | (−0.4301 − 0.5804j) |
| 120 | (0.8559 − 0.0494j) | (0.6879 + 0.1053j) | (−0.4301 + 0.8462j) |
| 121 | (0.1776 − 0.0275j) | (0.6879 − 0.1053j) | (−0.4301 − 0.2242j) |
| 122 | (−0.8623 − 0.0413j) | (−0.6879 + 0.1053j) | (−0.4301 + 0.5805j) |
| 123 | (−0.1851 − 0.0237j) | (−0.6879 − 0.1053j) | (−0.4301 − 0.0332j) |
| 124 | (0.7951 − 0.2921j) | (0.6786 + 0.1752j) | (−0.4301 + 0.2916j) |
| 125 | (0.0264 − 0.0314j) | (0.6786 − 0.1752j) | (−0.4301 + 0.2239j) |
| 126 | (−0.808 − 0.2898j) | (−0.6786 + 0.1752j) | (−0.4301 + 0.5035j) |
| 127 | (−0.0306 − 0.0312j) | (−0.6786 − 0.1752j) | (−0.4301 + 0.0328j) |
| 128 | (0.3676 + 0.5027j) | (0.045 + 0.9288j) | (−1.058 + 1.0626j) |
| 129 | (0.3226 + 0.4348j) | (0.045 − 0.9288j) | (−1.058 − 0.3591j) |
| 130 | (−0.3679 + 0.509j) | (−0.045 + 0.9288j) | (−1.058 + 1.1878j) |
| 131 | (−0.3184 + 0.44j) | (−0.045 − 0.9288j) | (−1.058 − 0.4301j) |
| 132 | (0.317 + 0.537j) | (0.3128 + 0.884j) | (−1.058 − 1.058j) |
| 133 | (0.2673 + 0.4727j) | (0.3128 − 0.884j) | (−1.058 − 0.7494j) |
| 134 | (−0.3152 + 0.5441j) | (−0.3128 + 0.884j) | (−1.058 − 1.1847j) |
| 135 | (−0.2634 + 0.4732j) | (−0.3128 − 0.884j) | (−1.058 − 0.6628j) |
| 136 | (0.506 + 0.6853j) | (0.1346 + 0.9215j) | (−1.058 + 0.7523j) |
| 137 | (0.1572 + 0.1746j) | (0.1346 − 0.9215j) | (−1.058 − 0.1607j) |
| 138 | (−0.5018 + 0.691j) | (−0.1346 + 0.9215j) | (−1.058 + 0.6629j) |
| 139 | (−0.1603 + 0.1732j) | (−0.1346 − 0.9215j) | (−1.058 − 0.0944j) |
| 140 | (0.4358 + 0.7315j) | (0.2242 + 0.9064j) | (−1.058 + 0.3594j) |
| 141 | (0.1294 + 0.2023j) | (0.2242 − 0.9064j) | (−1.058 + 0.1597j) |
| 142 | (−0.4324 + 0.7385j) | (−0.2242 + 0.9064j) | (−1.058 + 0.4297j) |
| 143 | (−0.1329 + 0.2047j) | (−0.2242 − 0.9064j) | (−1.058 + 0.0937j) |
| 144 | (0.4152 + 0.4649j) | (0.0488 + 1.0102j) | (−1.058 + 0.9504j) |
| 145 | (0.3631 + 0.4052j) | (0.0488 − 1.0102j) | (−1.058 − 0.2918j) |
| 146 | (−0.4097 + 0.467j) | (−0.0488 + 1.0102j) | (−1.058 + 1.3347j) |

-continued

| Mapping | NN_QSL | NN_QSC | NN_RSC |
|---|---|---|---|
| 147 | (−0.3601 + 0.4096j) | (−0.0488 − 1.0102j) | (−1.058 − 0.503j) |
| 148 | (0.2622 + 0.5707j) | (0.3391 + 0.9595j) | (−1.058 − 0.946j) |
| 149 | (0.2322 + 0.5018j) | (0.3391 − 0.9595j) | (−1.058 − 0.8449j) |
| 150 | (−0.2606 + 0.5676j) | (−0.3391 + 0.9595j) | (−1.058 − 1.331j) |
| 151 | (−0.2348 + 0.4978j) | (−0.3391 − 0.9595j) | (−1.058 − 0.5804j) |
| 152 | (0.5726 + 0.6333j) | (0.1466 + 1.0017j) | (−1.058 + 0.8462j) |
| 153 | (0.1106 + 0.1198j) | (0.1466 − 1.0017j) | (−1.058 − 0.2242j) |
| 154 | (−0.5682 + 0.6409j) | (−0.1466 + 1.0017j) | (−1.058 + 0.5805j) |
| 155 | (−0.1178 + 0.1189j) | (−0.1466 − 1.0017j) | (−1.058 − 0.0332j) |
| 156 | (0.363 + 0.7757j) | (0.2434 + 0.9852j) | (−1.058 + 0.2916j) |
| 157 | (0.0848 + 0.1073j) | (0.2434 − 0.9852j) | (−1.058 + 0.2239j) |
| 158 | (−0.362 + 0.7788j) | (−0.2434 + 0.9852j) | (−1.058 + 0.5035j) |
| 159 | (−0.0912 + 0.1086j) | (−0.2434 − 0.9852j) | (−1.058 + 0.0328j) |
| 160 | (0.3606 − 0.5047j) | (0.0793 + 1.6276j) | (−0.7494 + 1.0626j) |
| 161 | (0.3152 − 0.4353j) | (0.0793 − 1.6276j) | (−0.7494 − 0.3591j) |
| 162 | (−0.3685 − 0.5011j) | (−0.0793 + 1.6276j) | (−0.7494 + 1.1878j) |
| 163 | (−0.3289 − 0.4324j) | (−0.0793 − 1.6276j) | (−0.7494 − 0.4301j) |
| 164 | (0.3093 − 0.5357j) | (0.5459 + 1.5384j) | (−0.7494 − 1.058j) |
| 165 | (0.2589 − 0.4704j) | (0.5459 − 1.5384j) | (−0.7494 − 0.7494j) |
| 166 | (−0.3208 − 0.5383j) | (−0.5459 + 1.5384j) | (−0.7494 − 1.1847j) |
| 167 | (−0.2715 − 0.4696j) | (−0.5459 − 1.5384j) | (−0.7494 − 0.6628j) |
| 168 | (0.4948 − 0.6925j) | (0.2373 + 1.6128j) | (−0.7494 + 0.7523j) |
| 169 | (0.1516 − 0.1683j) | (0.2373 − 1.6128j) | (−0.7494 − 0.1607j) |
| 170 | (−0.5073 − 0.6829j) | (−0.2373 + 1.6128j) | (−0.7494 + 0.6629j) |
| 171 | (−0.1608 − 0.1692j) | (−0.2373 − 1.6128j) | (−0.7494 − 0.0944j) |
| 172 | (0.426 − 0.7356j) | (0.393 + 1.5827j) | (−0.7494 + 0.3594j) |
| 173 | (0.1227 − 0.2002j) | (0.393 − 1.5827j) | (−0.7494 + 0.1597j) |
| 174 | (−0.4387 − 0.7317j) | (−0.393 + 1.5827j) | (−0.7494 − 0.4297j) |
| 175 | (−0.1314 − 0.2024j) | (−0.393 − 1.5827j) | (−0.7494 + 0.0937j) |
| 176 | (0.4079 − 0.4685j) | (0.0728 + 1.4962j) | (−0.7494 + 0.9504j) |
| 177 | (0.3554 − 0.4091j) | (0.0728 − 1.4962j) | (−0.7494 − 0.2918j) |
| 178 | (−0.4179 − 0.4629j) | (−0.0728 + 1.4962j) | (−0.7494 + 1.3347j) |
| 179 | (−0.3691 − 0.4064j) | (−0.0728 − 1.4962j) | (−0.7494 − 0.503j) |
| 180 | (0.2559 − 0.5654j) | (0.5026 + 1.4144j) | (−0.7494 − 0.946j) |
| 181 | (0.2249 − 0.4937j) | (0.5026 − 1.4144j) | (−0.7494 − 0.8449j) |
| 182 | (−0.2654 − 0.5672j) | (−0.5026 + 1.4144j) | (−0.7494 − 1.331j) |
| 183 | (−0.2352 − 0.4942j) | (−0.5026 − 1.4144j) | (−0.7494 − 0.5804j) |
| 184 | (0.5621 − 0.637j) | (0.218 + 1.4825j) | (−0.7494 + 0.8462j) |
| 185 | (0.1105 − 0.1167j) | (0.218 − 1.4825j) | (−0.7494 − 0.2242j) |
| 186 | (−0.5709 − 0.633j) | (−0.218 + 1.4825j) | (−0.7494 + 0.5805j) |
| 187 | (−0.1167 − 0.1161j) | (−0.218 − 1.4825j) | (−0.7494 − 0.0332j) |
| 188 | (0.3523 − 0.7731j) | (0.3615 + 1.4551j) | (−0.7494 + 0.2916j) |
| 189 | (0.0869 − 0.107j) | (0.3615 − 1.4551j) | (−0.7494 + 0.2239j) |
| 190 | (−0.3709 − 0.7752j) | (−0.3615 + 1.4551j) | (−0.7494 + 0.5035j) |
| 191 | (−0.0873 − 0.1019j) | (−0.3615 − 1.4551j) | (−0.7494 + 0.0328j) |
| 192 | (0.5017 + 0.3733j) | (0.9295 + 0.0448j) | (−1.1847 + 1.0626j) |
| 193 | (0.433 + 0.3274j) | (0.9295 − 0.0448j) | (−1.1847 − 0.3591j) |
| 194 | (−0.4996 + 0.3766j) | (−0.9295 + 0.0448j) | (−1.1847 + 1.1878j) |
| 195 | (−0.4365 + 0.3322j) | (−0.9295 − 0.0448j) | (−1.1847 − 0.4301j) |
| 196 | (0.5383 + 0.3214j) | (0.8841 + 0.3122j) | (−1.1847 − 1.058j) |
| 197 | (0.4685 + 0.2775j) | (0.8841 − 0.3122j) | (−1.1847 − 0.7494j) |
| 198 | (−0.5348 + 0.3258j) | (−0.8841 + 0.3122j) | (−1.1847 − 1.1847j) |
| 199 | (−0.471 + 0.2765j) | (−0.8841 − 0.3122j) | (−1.1847 − 0.6628j) |
| 200 | (0.6824 + 0.5069j) | (0.9223 + 0.1344j) | (−1.1847 + 0.7523j) |
| 201 | (0.2041 + 0.1325j) | (0.9223 − 0.1344j) | (−1.1847 − 0.1607j) |
| 202 | (−0.6791 + 0.5175j) | (−0.9223 + 0.1344j) | (−1.1847 + 0.6629j) |
| 203 | (−0.2045 + 0.132j) | (−0.9223 − 0.1344j) | (−1.1847 − 0.0944j) |
| 204 | (0.731 + 0.4389j) | (0.9071 + 0.2239j) | (−1.1847 + 0.3594j) |
| 205 | (0.2367 + 0.1203j) | (0.9071 − 0.2239j) | (−1.1847 + 0.1597j) |
| 206 | (−0.7255 + 0.4463j) | (−0.9071 + 0.2239j) | (−1.1847 − 0.4297j) |
| 207 | (−0.237 + 0.1193j) | (−0.9071 − 0.2239j) | (−1.1847 + 0.0937j) |
| 208 | (0.4603 + 0.4175j) | (1.0112 + 0.0488j) | (−1.1847 + 0.9504j) |
| 209 | (0.4063 + 0.3693j) | (1.0112 − 0.0488j) | (−1.1847 − 0.2918j) |
| 210 | (−0.4607 + 0.4242j) | (−1.0112 + 0.0488j) | (−1.1847 + 1.3347j) |
| 211 | (−0.4028 + 0.3683j) | (−1.0112 − 0.0488j) | (−1.1847 − 0.503j) |
| 212 | (0.5655 + 0.2706j) | (0.9595 + 0.3387j) | (−1.1847 − 0.946j) |
| 213 | (0.4972 + 0.2352j) | (0.9595 − 0.3387j) | (−1.1847 − 0.8449j) |
| 214 | (−0.5663 + 0.2728j) | (−0.9595 + 0.3387j) | (−1.1847 − 1.331j) |
| 215 | (−0.4987 + 0.2352j) | (−0.9595 − 0.3387j) | (−1.1847 − 0.5804j) |
| 216 | (0.6282 + 0.5729j) | (1.0026 + 0.1464j) | (−1.1847 + 0.8462j) |
| 217 | (0.1461 + 0.0614j) | (1.0026 − 0.1464j) | (−1.1847 − 0.2242j) |
| 218 | (−0.629 + 0.5813j) | (−1.0026 + 0.1464j) | (−1.1847 + 0.5805j) |
| 219 | (−0.1499 + 0.0621j) | (−1.0026 − 0.1464j) | (−1.1847 − 0.0332j) |
| 220 | (0.7712 + 0.3678j) | (0.9858 + 0.2431j) | (−1.1847 + 0.2916j) |
| 221 | (0.0864 + 0.0375j) | (0.9858 − 0.2431j) | (−1.1847 + 0.2239j) |
| 222 | (−0.7709 + 0.3758j) | (−0.9858 + 0.2431j) | (−1.1847 + 0.5035j) |
| 223 | (−0.0946 + 0.037j) | (−0.9858 − 0.2431j) | (−1.1847 + 0.0328j) |
| 224 | (0.4907 − 0.3721j) | (1.6285 + 0.0791j) | (−0.6628 + 1.0626j) |
| 225 | (0.4272 − 0.327j) | (1.6285 − 0.0791j) | (−0.6628 − 0.3591j) |
| 226 | (−0.5032 − 0.3732j) | (−1.6285 + 0.0791j) | (−0.6628 + 1.1878j) |
| 227 | (−0.4385 − 0.3286j) | (−1.6285 − 0.0791j) | (−0.6628 − 0.4301j) |
| 228 | (0.5296 − 0.3255j) | (1.5386 + 0.5469j) | (−0.6628 − 1.058j) |
| 229 | (0.4632 − 0.2748j) | (1.5386 − 0.5469j) | (−0.6628 − 0.7494j) |
| 230 | (−0.5388 − 0.3189j) | (−1.5386 + 0.5469j) | (−0.6628 − 1.1847j) |
| 231 | (−0.4755 − 0.2712j) | (−1.5386 − 0.5469j) | (−0.6628 − 0.6628j) |
| 232 | (0.6754 − 0.519j) | (1.6131 + 0.237j) | (−0.6628 + 0.7523j) |
| 233 | (0.1995 − 0.1273j) | (1.6131 − 0.237j) | (−0.6628 − 0.1607j) |
| 234 | (−0.6842 − 0.5066j) | (−1.6131 + 0.237j) | (−0.6628 + 0.6629j) |
| 235 | (−0.2066 − 0.1312j) | (−1.6131 − 0.237j) | (−0.6628 − 0.0944j) |
| 236 | (0.7211 − 0.4468j) | (1.583 + 0.3934j) | (−0.6628 + 0.3594j) |
| 237 | (0.2335 − 0.1172j) | (1.583 − 0.3934j) | (−0.6628 + 0.1597j) |
| 238 | (−0.7312 − 0.4415j) | (−1.583 + 0.3934j) | (−0.6628 − 0.4297j) |
| 239 | (−0.2462 − 0.1171j) | (−1.583 − 0.3934j) | (−0.6628 + 0.0937j) |
| 240 | (0.4558 − 0.424j) | (1.4969 + 0.0726j) | (−0.6628 + 0.9504j) |
| 241 | (0.3981 − 0.3655j) | (1.4969 − 0.0726j) | (−0.6628 − 0.2918j) |
| 242 | (−0.4676 − 0.4191j) | (−1.4969 + 0.0726j) | (−0.6628 + 1.3347j) |
| 243 | (−0.4098 − 0.369j) | (−1.4969 − 0.0726j) | (−0.6628 − 0.503j) |
| 244 | (0.5637 − 0.2743j) | (1.4145 + 0.5032j) | (−0.6628 − 0.946j) |
| 245 | (0.4938 − 0.2386j) | (1.4145 − 0.5032j) | (−0.6628 − 0.8449j) |
| 246 | (−0.571 − 0.2635j) | (−1.4145 + 0.5032j) | (−0.6628 − 1.331j) |
| 247 | (−0.5007 − 0.2353j) | (−1.4145 − 0.5032j) | (−0.6628 − 0.5804j) |
| 248 | (0.6183 − 0.5836j) | (1.4829 + 0.2182j) | (−0.6628 + 0.8462j) |
| 249 | (0.1465 − 0.0602j) | (1.4829 − 0.2182j) | (−0.6628 − 0.2242j) |
| 250 | (−0.6288 − 0.5726j) | (−1.4829 + 0.2182j) | (−0.6628 + 0.5805j) |
| 251 | (−0.1548 − 0.0603j) | (−1.4829 − 0.2182j) | (−0.6628 − 0.0332j) |
| 252 | (0.763 − 0.3764j) | (1.4551 + 0.3617j) | (−0.6628 + 0.2916j) |
| 253 | (0.085 − 0.0339j) | (1.4551 − 0.3617j) | (−0.6628 + 0.2239j) |
| 254 | (−0.7748 − 0.3684j) | (−1.4551 + 0.3617j) | (−0.6628 + 0.5035j) |
| 255 | (−0.0927 − 0.0278j) | (−1.4551 − 0.3617j) | (−0.6628 + 0.0328j) |
| 256 | (0.1013 + 0.6984j) | (0.5869 + 0.6485j) | (0.7523 + 1.0626j) |
| 257 | (0.0558 + 0.4624j) | (0.5869 − 0.6485j) | (0.7523 − 0.3591j) |
| 258 | (−0.0963 + 0.7007j) | (−0.5869 + 0.6485j) | (0.7523 + 1.1878j) |
| 259 | (−0.0551 + 0.4603j) | (−0.5869 − 0.6485j) | (0.7523 − 0.4301j) |
| 260 | (0.169 + 0.6862j) | (0.3677 + 0.7819j) | (0.7523 − 1.058j) |
| 261 | (0.1232 + 0.4492j) | (0.3677 − 0.7819j) | (0.7523 − 0.7494j) |
| 262 | (−0.1643 + 0.6844j) | (−0.3677 + 0.7819j) | (0.7523 − 1.1847j) |
| 263 | (−0.1223 + 0.4513j) | (−0.3677 − 0.7819j) | (0.7523 − 0.6628j) |
| 264 | (0.1146 + 0.7745j) | (0.5188 + 0.7018j) | (0.7523 + 0.7523j) |
| 265 | (0.0303 + 0.2988j) | (0.5188 − 0.7018j) | (0.7523 − 0.1607j) |
| 266 | (−0.1078 + 0.7737j) | (−0.5188 + 0.7018j) | (0.7523 + 0.6629j) |
| 267 | (−0.0306 + 0.303j) | (−0.5188 − 0.7018j) | (0.7523 − 0.0944j) |
| 268 | (0.1878 + 0.7561j) | (0.445 + 0.7463j) | (0.7523 + 0.3594j) |
| 269 | (0.094 + 0.2936j) | (0.445 − 0.7463j) | (0.7523 + 0.1597j) |
| 270 | (−0.186 + 0.7586j) | (−0.445 + 0.7463j) | (0.7523 − 0.4297j) |
| 271 | (−0.0962 + 0.2893j) | (−0.445 − 0.7463j) | (0.7523 + 0.0937j) |
| 272 | (0.0361 + 0.7022j) | (0.5389 + 0.5945j) | (0.7523 + 0.9504j) |
| 273 | (0.0348 + 0.4317j) | (0.5389 − 0.5945j) | (0.7523 − 0.2918j) |
| 274 | (−0.0312 + 0.7j) | (−0.5389 + 0.5945j) | (0.7523 + 1.3347j) |
| 275 | (−0.0333 + 0.4266j) | (−0.5389 − 0.5945j) | (0.7523 − 0.503j) |
| 276 | (0.2349 + 0.6655j) | (0.338 + 0.7122j) | (0.7523 − 0.946j) |
| 277 | (0.1304 + 0.415j) | (0.338 − 0.7122j) | (0.7523 − 0.8449j) |
| 278 | (−0.2376 + 0.663j) | (−0.338 + 0.7122j) | (0.7523 − 1.331j) |
| 279 | (−0.1281 + 0.4148j) | (−0.338 − 0.7122j) | (0.7523 − 0.5804j) |
| 280 | (0.0396 + 0.7779j) | (0.4765 + 0.6415j) | (0.7523 + 0.8462j) |
| 281 | (0.0355 + 0.3627j) | (0.4765 − 0.6415j) | (0.7523 − 0.2242j) |
| 282 | (−0.0352 + 0.7793j) | (−0.4765 + 0.6415j) | (0.7523 + 0.5805j) |
| 283 | (−0.0391 + 0.361j) | (−0.4765 − 0.6415j) | (0.7523 − 0.0332j) |
| 284 | (0.2594 + 0.7335j) | (0.4091 + 0.6803j) | (0.7523 + 0.2916j) |
| 285 | (0.1071 + 0.3528j) | (0.4091 − 0.6803j) | (0.7523 + 0.2239j) |
| 286 | (−0.2581 + 0.7369j) | (−0.4091 + 0.6803j) | (0.7523 + 0.5035j) |
| 287 | (−0.1093 + 0.343j) | (−0.4091 − 0.6803j) | (0.7523 + 0.0328j) |
| 288 | (0.0953 − 0.6954j) | (0.4403 + 0.4792j) | (−0.1607 + 1.0626j) |
| 289 | (0.0473 − 0.4604j) | (0.4403 − 0.4792j) | (−0.1607 − 0.3591j) |
| 290 | (−0.1075 − 0.6946j) | (−0.4403 + 0.4792j) | (−0.1607 + 1.1878j) |
| 291 | (−0.0599 − 0.4574j) | (−0.4403 − 0.4792j) | (−0.1607 − 0.4301j) |
| 292 | (0.1584 − 0.6792j) | (0.2846 + 0.572j) | (−0.1607 − 1.058j) |
| 293 | (0.1198 − 0.4495j) | (0.2846 − 0.572j) | (−0.1607 − 0.7494j) |
| 294 | (−0.1731 − 0.6792j) | (−0.2846 + 0.572j) | (−0.1607 − 1.1847j) |
| 295 | (−0.1267 − 0.4471j) | (−0.2846 − 0.572j) | (−0.1607 − 0.6628j) |
| 296 | (0.1038 − 0.7681j) | (0.3971 + 0.5118j) | (−0.1607 + 0.7523j) |
| 297 | (0.0241 − 0.2945j) | (0.3971 − 0.5118j) | (−0.1607 − 0.1607j) |
| 298 | (−0.1222 − 0.7711j) | (−0.3971 + 0.5118j) | (−0.1607 + 0.6629j) |

| Mapping | NN_QSL | NN_QSC | NN_RSC |
| --- | --- | --- | --- |
| 299 | (−0.032 − 0.2934j) | (−0.3971 − 0.5118j) | (−0.1607 − 0.0944j) |
| 300 | (0.178 − 0.7553j) | (0.3409 + 0.5481j) | (−0.1607 + 0.3594j) |
| 301 | (0.085 − 0.2892j) | (0.3409 − 0.5481j) | (−0.1607 + 0.1597j) |
| 302 | (−0.1922 − 0.7587j) | (−0.3409 + 0.5481j) | (−0.1607 + 0.4297j) |
| 303 | (−0.0966 − 0.29j) | (−0.3409 − 0.5481j) | (−0.1607 + 0.0937j) |
| 304 | (0.0277 − 0.7029j) | (0.491 + 0.5389j) | (−0.1607 + 0.9504j) |
| 305 | (0.0289 − 0.426j) | (0.491 − 0.5389j) | (−0.1607 − 0.2918j) |
| 306 | (−0.038 − 0.702j) | (−0.491 + 0.5389j) | (−0.1607 + 1.3347j) |
| 307 | (−0.042 − 0.4295j) | (−0.491 − 0.5389j) | (−0.1607 − 0.503j) |
| 308 | (0.2234 − 0.6626j) | (0.3098 + 0.6428j) | (−0.1607 − 0.946j) |
| 309 | (0.1215 − 0.4077j) | (0.3098 − 0.6428j) | (−0.1607 − 0.8449j) |
| 310 | (−0.2387 − 0.6644j) | (−0.3098 + 0.6428j) | (−0.1607 − 1.331j) |
| 311 | (−0.1305 − 0.409j) | (−0.3098 − 0.6428j) | (−0.1607 − 0.5804j) |
| 312 | (0.0301 − 0.7807j) | (0.4363 + 0.5791j) | (−0.1607 + 0.8462j) |
| 313 | (0.0303 − 0.3591j) | (0.4363 − 0.5791j) | (−0.1607 − 0.2242j) |
| 314 | (−0.0465 − 0.7785j) | (−0.4363 + 0.5791j) | (−0.1607 + 0.5805j) |
| 315 | (−0.0456 − 0.3566j) | (−0.4363 − 0.5791j) | (−0.1607 − 0.0332j) |
| 316 | (0.2496 − 0.7328j) | (0.375 + 0.6138j) | (−0.1607 + 0.2916j) |
| 317 | (0.0994 − 0.3418j) | (0.375 − 0.6138j) | (−0.1607 + 0.2239j) |
| 318 | (−0.2667 − 0.7328j) | (−0.375 + 0.6138j) | (−0.1607 + 0.5035j) |
| 319 | (−0.1126 − 0.3464j) | (−0.375 − 0.6138j) | (−0.1607 + 0.0328j) |
| 320 | (0.6978 + 0.1033j) | (0.6485 + 0.5868j) | (0.6629 + 1.0626j) |
| 321 | (0.4746 + 0.0555j) | (0.6485 + 0.5868j) | (0.6629 − 0.3591j) |
| 322 | (−0.7054 + 0.1101j) | (−0.6485 + 0.5868j) | (0.6629 + 1.1878j) |
| 323 | (−0.4839 + 0.0617j) | (−0.6485 − 0.5868j) | (0.6629 − 0.4301j) |
| 324 | (0.684 + 0.1699j) | (0.782 + 0.3674j) | (0.6629 − 1.058j) |
| 325 | (0.4599 + 0.1257j) | (0.782 − 0.3674j) | (0.6629 − 0.7494j) |
| 326 | (−0.6846 + 0.1737j) | (−0.782 + 0.3674j) | (0.6629 − 1.1847j) |
| 327 | (−0.4678 + 0.1235j) | (−0.782 − 0.3674j) | (0.6629 − 0.6628j) |
| 328 | (0.7735 + 0.1152j) | (0.7016 + 0.5185j) | (0.6629 + 0.7523j) |
| 329 | (0.3319 + 0.0298j) | (0.7016 − 0.5185j) | (0.6629 − 0.1607j) |
| 330 | (−0.7747 + 0.1171j) | (−0.7016 + 0.5185j) | (0.6629 + 0.6629j) |
| 331 | (−0.3384 + 0.0336j) | (−0.7016 − 0.5185j) | (0.6629 − 0.0944j) |
| 332 | (0.7572 + 0.1878j) | (0.7462 + 0.445j) | (0.6629 + 0.3594j) |
| 333 | (0.3215 + 0.0853j) | (0.7462 − 0.445j) | (0.6629 + 0.1597j) |
| 334 | (−0.7581 + 0.1947j) | (−0.7462 + 0.445j) | (0.6629 + 0.4297j) |
| 335 | (−0.3301 + 0.0957j) | (−0.7462 − 0.445j) | (0.6629 + 0.0937j) |
| 336 | (0.7024 + 0.0345j) | (0.5943 + 0.5387j) | (0.6629 + 0.9504j) |
| 337 | (0.4548 + 0.033j) | (0.5943 − 0.5387j) | (0.6629 − 0.2918j) |
| 338 | (−0.711 + 0.0382j) | (−0.5943 + 0.5387j) | (0.6629 + 1.3347j) |
| 339 | (−0.459 + 0.0384j) | (−0.5943 − 0.5387j) | (0.6629 − 0.503j) |
| 340 | (0.661 + 0.2372j) | (0.7127 + 0.3377j) | (0.6629 − 0.946j) |
| 341 | (0.4304 + 0.1413j) | (0.7127 − 0.3377j) | (0.6629 − 0.8449j) |
| 342 | (−0.6658 + 0.2416j) | (−0.7127 + 0.3377j) | (0.6629 − 1.331j) |
| 343 | (−0.4375 + 0.139j) | (−0.7127 − 0.3377j) | (0.6629 − 0.5804j) |
| 344 | (0.7815 + 0.0351j) | (0.6416 + 0.4762j) | (0.6629 + 0.8462j) |
| 345 | (0.3845 + 0.0331j) | (0.6416 − 0.4762j) | (0.6629 − 0.2242j) |
| 346 | (−0.784 + 0.037j) | (−0.6416 + 0.4762j) | (0.6629 + 0.5805j) |
| 347 | (−0.3946 + 0.0376j) | (−0.6416 − 0.4762j) | (0.6629 − 0.0332j) |
| 348 | (0.7308 + 0.2641j) | (0.6805 + 0.4088j) | (0.6629 + 0.2916j) |
| 349 | (0.3662 + 0.1117j) | (0.6805 − 0.4088j) | (0.6629 + 0.2239j) |
| 350 | (−0.7321 + 0.2669j) | (−0.6805 + 0.4088j) | (0.6629 + 0.5035j) |
| 351 | (−0.3756 + 0.1152j) | (−0.6805 − 0.4088j) | (0.6629 + 0.0328j) |
| 352 | (0.6946 − 0.1047j) | (0.4788 + 0.4401j) | (−0.0944 + 1.0626j) |
| 353 | (0.472 − 0.0599j) | (0.4788 − 0.4401j) | (−0.0944 − 0.3591j) |
| 354 | (−0.707 − 0.1019j) | (−0.4788 + 0.4401j) | (−0.0944 + 1.1878j) |
| 355 | (−0.481 − 0.0578j) | (−0.4788 − 0.4401j) | (−0.0944 − 0.4301j) |
| 356 | (0.6803 − 0.1731j) | (0.5723 + 0.2842j) | (−0.0944 − 1.058j) |
| 357 | (0.4592 − 0.1234j) | (0.5723 − 0.2842j) | (−0.0944 − 0.7494j) |
| 358 | (−0.6945 − 0.1702j) | (−0.5723 + 0.2842j) | (−0.0944 − 1.1847j) |
| 359 | (−0.4666 − 0.1204j) | (−0.5723 − 0.2842j) | (−0.0944 − 0.6628j) |
| 360 | (0.7686 − 0.1174j) | (0.5126 + 0.3966j) | (−0.0944 + 0.7523j) |
| 361 | (0.3344 − 0.0345j) | (0.5126 − 0.3966j) | (−0.0944 − 0.1607j) |
| 362 | (−0.7795 − 0.1132j) | (−0.5126 + 0.3966j) | (−0.0944 + 0.6629j) |
| 363 | (−0.3338 − 0.0267j) | (−0.5126 − 0.3966j) | (−0.0944 − 0.0944j) |
| 364 | (0.7525 − 0.192j) | (0.5486 + 0.3406j) | (−0.0944 + 0.3594j) |
| 365 | (0.3214 − 0.0877j) | (0.5486 − 0.3406j) | (−0.0944 + 0.1597j) |
| 366 | (−0.7618 − 0.1884j) | (−0.5486 + 0.3406j) | (−0.0944 + 0.4297j) |
| 367 | (−0.327 − 0.0901j) | (−0.5486 − 0.3406j) | (−0.0944 + 0.0937j) |
| 368 | (0.7037 − 0.0376j) | (0.5388 + 0.491j) | (−0.0944 + 0.9504j) |
| 369 | (0.4509 − 0.0353j) | (0.5388 − 0.491j) | (−0.0944 − 0.2918j) |
| 370 | (−0.7125 − 0.0349j) | (−0.5388 + 0.491j) | (−0.0944 + 1.3347j) |
| 371 | (−0.4601 − 0.0338j) | (−0.5388 − 0.491j) | (−0.0944 − 0.503j) |
| 372 | (0.658 − 0.2415j) | (0.6432 + 0.3095j) | (−0.0944 − 0.946j) |
| 373 | (0.4253 − 0.138j) | (0.6432 + 0.3095j) | (−0.0944 − 0.8449j) |
| 374 | (−0.6673 − 0.2334j) | (−0.6432 + 0.3095j) | (−0.0944 − 1.331j) |
| 375 | (−0.4353 − 0.142j) | (−0.6432 − 0.3095j) | (−0.0944 − 0.5804j) |
| 376 | (0.7776 − 0.0416j) | (0.5792 + 0.4361j) | (−0.0944 + 0.8462j) |
| 377 | (0.3828 − 0.0336j) | (0.5792 − 0.4361j) | (−0.0944 − 0.2242j) |
| 378 | (−0.7872 − 0.0398j) | (−0.5792 − 0.4361j) | (−0.0944 − 0.5805j) |
| 379 | (−0.391 − 0.0341j) | (−0.5792 − 0.4361j) | (−0.0944 − 0.0332j) |
| 380 | (0.7242 − 0.2666j) | (0.6142 + 0.3748j) | (−0.0944 + 0.2916j) |
| 381 | (0.3657 − 0.108j) | (0.6142 − 0.3748j) | (−0.0944 + 0.2239j) |
| 382 | (−0.7381 − 0.2626j) | (−0.6142 + 0.3748j) | (−0.0944 + 0.5035j) |
| 383 | (−0.3728 − 0.111j) | (−0.6142 − 0.3748j) | (−0.0944 + 0.0328j) |
| 384 | (0.4153 + 0.5601j) | (0.6369 + 0.7034j) | (0.3594 + 1.0626j) |
| 385 | (0.2833 + 0.3791j) | (0.6369 − 0.7034j) | (0.3594 − 0.3591j) |
| 386 | (−0.4077 + 0.5667j) | (−0.6369 + 0.7034j) | (0.3594 + 1.1878j) |
| 387 | (−0.2787 + 0.3761j) | (−0.6369 − 0.7034j) | (0.3594 − 0.4301j) |
| 388 | (0.3594 + 0.6034j) | (0.3992 + 0.8521j) | (0.3594 − 1.058j) |
| 389 | (0.2226 + 0.4131j) | (0.3992 − 0.8521j) | (0.3594 − 0.7494j) |
| 390 | (−0.3546 + 0.6133j) | (−0.3992 + 0.8521j) | (0.3594 − 1.1847j) |
| 391 | (−0.2211 + 0.412j) | (−0.3992 − 0.8521j) | (0.3594 − 0.6628j) |
| 392 | (0.4609 + 0.6268j) | (0.5628 + 0.7625j) | (0.3594 + 0.7523j) |
| 393 | (0.2077 + 0.2388j) | (0.5628 − 0.7625j) | (0.3594 − 0.1607j) |
| 394 | (−0.4572 + 0.6304j) | (−0.5628 + 0.7625j) | (0.3594 + 0.6629j) |
| 395 | (−0.2071 + 0.2395j) | (−0.5628 − 0.7625j) | (0.3594 − 0.0944j) |
| 396 | (0.398 + 0.6663j) | (0.483 + 0.8118j) | (0.3594 + 0.3594j) |
| 397 | (0.1564 + 0.2707j) | (0.483 − 0.8118j) | (0.3594 + 0.1597j) |
| 398 | (−0.3919 + 0.6739j) | (−0.483 + 0.8118j) | (0.3594 + 0.4297j) |
| 399 | (−0.1588 + 0.2723j) | (−0.483 − 0.8118j) | (0.3594 + 0.0937j) |
| 400 | (0.4691 + 0.5203j) | (0.6889 + 0.7607j) | (0.3594 + 0.9504j) |
| 401 | (0.2908 + 0.3407j) | (0.6889 − 0.7607j) | (0.3594 − 0.2918j) |
| 402 | (−0.4657 + 0.5244j) | (−0.6889 + 0.7607j) | (0.3594 + 1.3347j) |
| 403 | (−0.288 + 0.3402j) | (−0.6889 − 0.7607j) | (0.3594 − 0.503j) |
| 404 | (0.2992 + 0.636j) | (0.4324 + 0.9241j) | (0.3594 − 0.946j) |
| 405 | (0.195 + 0.3956j) | (0.4324 − 0.9241j) | (0.3594 − 0.8449j) |
| 406 | (−0.292 + 0.6388j) | (−0.4324 + 0.9241j) | (0.3594 − 1.331j) |
| 407 | (−0.1945 + 0.3903j) | (−0.4324 − 0.9241j) | (0.3594 − 0.5804j) |
| 408 | (0.5189 + 0.5794j) | (0.6091 + 0.8245j) | (0.3594 + 0.8462j) |
| 409 | (0.2445 + 0.2905j) | (0.6091 − 0.8245j) | (0.3594 − 0.2242j) |
| 410 | (−0.5158 + 0.5817j) | (−0.6091 + 0.8245j) | (0.3594 + 0.5805j) |
| 411 | (−0.2461 + 0.2872j) | (−0.6091 − 0.8245j) | (0.3594 − 0.0332j) |
| 412 | (0.3348 + 0.7019j) | (0.5228 + 0.8795j) | (0.3594 + 0.2916j) |
| 413 | (0.1782 + 0.3285j) | (0.5228 − 0.8795j) | (0.3594 + 0.2239j) |
| 414 | (−0.327 + 0.7086j) | (−0.5228 + 0.8795j) | (0.3594 + 0.5035j) |
| 415 | (−0.1797 + 0.3239j) | (−0.5228 − 0.8795j) | (0.3594 + 0.0328j) |
| 416 | (0.4044 − 0.5663j) | (1.0985 + 1.2137j) | (0.1597 + 1.0626j) |
| 417 | (0.2784 − 0.3723j) | (1.0985 − 1.2137j) | (0.1597 − 0.3591j) |
| 418 | (−0.414 − 0.5661j) | (−1.0985 + 1.2137j) | (0.1597 + 1.1878j) |
| 419 | (−0.2855 − 0.3768j) | (−1.0985 − 1.2137j) | (0.1597 − 0.4301j) |
| 420 | (0.3464 − 0.6042j) | (0.6952 + 1.4795j) | (0.1597 − 1.058j) |
| 421 | (0.218 − 0.4068j) | (0.6952 − 1.4795j) | (0.1597 − 0.7494j) |
| 422 | (−0.3588 − 0.6031j) | (−0.6952 + 1.4795j) | (0.1597 − 1.1847j) |
| 423 | (−0.228 − 0.4086j) | (−0.6952 − 1.4795j) | (0.1597 − 0.6628j) |
| 424 | (0.4496 − 0.6241j) | (0.9727 + 1.316j) | (0.1597 + 0.7523j) |
| 425 | (0.1973 − 0.2358j) | (0.9727 − 1.316j) | (0.1597 − 0.1607j) |
| 426 | (−0.4618 − 0.6251j) | (−0.9727 + 1.316j) | (0.1597 + 0.6629j) |
| 427 | (−0.2074 − 0.2334j) | (−0.9727 − 1.316j) | (0.1597 − 0.0944j) |
| 428 | (0.3837 − 0.6687j) | (0.8374 + 1.4043j) | (0.1597 + 0.3594j) |
| 429 | (0.15 − 0.2654j) | (0.8374 − 1.4043j) | (0.1597 + 0.1597j) |
| 430 | (−0.3983 − 0.6688j) | (−0.8374 + 1.4043j) | (0.1597 + 0.4297j) |
| 431 | (−0.1577 − 0.2634j) | (−0.8374 − 1.4043j) | (0.1597 + 0.0937j) |
| 432 | (0.4584 − 0.523j) | (1.0103 + 1.1159j) | (0.1597 + 0.9504j) |
| 433 | (0.286 − 0.3374j) | (1.0103 − 1.1159j) | (0.1597 − 0.2918j) |
| 434 | (−0.4707 − 0.5192j) | (−1.0103 + 1.1159j) | (0.1597 + 1.3347j) |
| 435 | (−0.291 − 0.3391j) | (−1.0103 − 1.1159j) | (0.1597 − 0.503j) |
| 436 | (0.2872 − 0.6367j) | (0.6395 + 1.3601j) | (0.1597 − 0.946j) |
| 437 | (0.1885 − 0.3827j) | (0.6395 − 1.3601j) | (0.1597 − 0.8449j) |
| 438 | (−0.2972 − 0.6351j) | (−0.6395 + 1.3601j) | (0.1597 − 1.331j) |
| 439 | (−0.1996 − 0.3857j) | (−0.6395 − 1.3601j) | (0.1597 − 0.5804j) |
| 440 | (0.5098 − 0.5831j) | (0.8958 + 1.2097j) | (0.1597 + 0.8462j) |
| 441 | (0.2378 − 0.2832j) | (0.8958 − 1.2097j) | (0.1597 − 0.2242j) |
| 442 | (−0.5185 − 0.5724j) | (−0.8958 + 1.2097j) | (0.1597 + 0.5805j) |
| 443 | (−0.245 − 0.2864j) | (−0.8958 − 1.2097j) | (0.1597 − 0.0332j) |
| 444 | (0.3213 − 0.7036j) | (0.7706 + 1.2911j) | (0.1597 + 0.2916j) |
| 445 | (0.1694 − 0.3292j) | (0.7706 − 1.2911j) | (0.1597 + 0.2239j) |
| 446 | (−0.333 − 0.7005j) | (−0.7706 + 1.2911j) | (0.1597 + 0.5035j) |
| 447 | (−0.1813 − 0.3203j) | (−0.7706 − 1.2911j) | (0.1597 + 0.0328j) |
| 448 | (0.5565 + 0.4175j) | (0.7036 + 0.6365j) | (0.4297 + 1.0626j) |
| 449 | (0.3788 + 0.2851j) | (0.7036 − 0.6365j) | (0.4297 − 0.3591j) |
| 450 | (−0.559 + 0.4229j) | (−0.7036 + 0.6365j) | (0.4297 + 1.1878j) |

| Mapping | NN_QSL | NN_QSC | NN_RSC |
|---|---|---|---|
| 451 | (−0.3788 + 0.2891j) | (−0.7036 − 0.6365j) | (0.4297 − 0.4301j) |
| 452 | (0.5995 + 0.3619j) | (0.8522 + 0.3989j) | (0.4297 − 1.058j) |
| 453 | (0.41 + 0.2381j) | (0.8522 − 0.3989j) | (0.4297 − 0.7494j) |
| 454 | (−0.6012 + 0.3679j) | (−0.8522 + 0.3989j) | (0.4297 − 1.1847j) |
| 455 | (−0.4115 + 0.237j) | (−0.8522 − 0.3989j) | (0.4297 − 0.6628j) |
| 456 | (0.6205 + 0.4659j) | (0.7622 + 0.5621j) | (0.4297 + 0.7523j) |
| 457 | (0.2561 + 0.1988j) | (0.7622 − 0.5621j) | (0.4297 − 0.1607j) |
| 458 | (−0.6201 + 0.4704j) | (−0.7622 + 0.5621j) | (0.4297 + 0.6629j) |
| 459 | (−0.2602 + 0.2035j) | (−0.7622 − 0.5621j) | (0.4297 − 0.0944j) |
| 460 | (0.666 + 0.4j) | (0.8121 + 0.4829j) | (0.4297 + 0.3594j) |
| 461 | (0.2927 + 0.155j) | (0.8121 − 0.4829j) | (0.4297 + 0.1597j) |
| 462 | (−0.6627 + 0.4065j) | (−0.8121 + 0.4829j) | (0.4297 + 0.4297j) |
| 463 | (−0.2942 + 0.1577j) | (−0.8121 − 0.4829j) | (0.4297 + 0.0937j) |
| 464 | (0.52 + 0.4703j) | (0.761 + 0.6881j) | (0.4297 + 0.9504j) |
| 465 | (0.3402 + 0.2969j) | (0.761 − 0.6881j) | (0.4297 − 0.2918j) |
| 466 | (−0.5136 + 0.4742j) | (−0.761 + 0.6881j) | (0.4297 + 1.3347j) |
| 467 | (−0.3425 + 0.3006j) | (−0.761 − 0.6881j) | (0.4297 − 0.503j) |
| 468 | (0.6335 + 0.2992j) | (0.9243 + 0.4319j) | (0.4297 − 0.946j) |
| 469 | (0.404 + 0.2052j) | (0.9243 − 0.4319j) | (0.4297 − 0.8449j) |
| 470 | (−0.636 + 0.3079j) | (−0.9243 + 0.4319j) | (0.4297 − 1.331j) |
| 471 | (−0.407 + 0.2004j) | (−0.9243 − 0.4319j) | (0.4297 − 0.5804j) |
| 472 | (0.5761 + 0.5217j) | (0.8247 + 0.6086j) | (0.4297 + 0.8462j) |
| 473 | (0.2943 + 0.2471j) | (0.8247 − 0.6086j) | (0.4297 − 0.2242j) |
| 474 | (−0.5723 + 0.5251j) | (−0.8247 + 0.6086j) | (0.4297 + 0.5805j) |
| 475 | (−0.2985 + 0.2461j) | (−0.8247 − 0.6086j) | (0.4297 − 0.0332j) |
| 476 | (0.7045 + 0.336j) | (0.8793 + 0.5228j) | (0.4297 + 0.2916j) |
| 477 | (0.3384 + 0.174j) | (0.8793 − 0.5228j) | (0.4297 − 0.2239j) |
| 478 | (−0.7003 + 0.3413j) | (−0.8793 + 0.5228j) | (0.4297 + 0.5035j) |
| 479 | (−0.3426 + 0.1793j) | (−0.8793 − 0.5228j) | (0.4297 + 0.0328j) |
| 480 | (0.5483 − 0.4219j) | (1.2125 + 1.0979j) | (0.0937 + 1.0626j) |
| 481 | (0.3728 − 0.2866j) | (1.2125 − 1.0979j) | (0.0937 − 0.3591j) |
| 482 | (−0.5634 − 0.4175j) | (−1.2125 + 1.0979j) | (0.0937 + 1.1878j) |
| 483 | (−0.3815 − 0.2874j) | (−1.2125 − 1.0979j) | (0.0937 − 0.4301j) |
| 484 | (0.5909 − 0.3657j) | (1.4792 + 0.6961j) | (0.0937 − 1.058j) |
| 485 | (0.4019 − 0.2375j) | (1.4792 − 0.6961j) | (0.0937 − 0.7494j) |
| 486 | (−0.6034 − 0.3608j) | (−1.4792 + 0.6961j) | (0.0937 − 1.1847j) |
| 487 | (−0.4194 − 0.233j) | (−1.4792 − 0.6961j) | (0.0937 − 0.6628j) |
| 488 | (0.6129 − 0.4726j) | (1.3155 + 0.973j) | (0.0937 + 0.7523j) |
| 489 | (0.2535 − 0.1974j) | (1.3155 − 0.973j) | (0.0937 − 0.1607j) |
| 490 | (−0.6218 − 0.4643j) | (−1.3155 + 0.973j) | (0.0937 + 0.6629j) |
| 491 | (−0.2603 − 0.1987j) | (−1.3155 − 0.973j) | (0.0937 − 0.0944j) |
| 492 | (0.6588 − 0.4093j) | (1.4038 + 0.8377j) | (0.0937 + 0.3594j) |
| 493 | (0.2842 − 0.1506j) | (1.4038 − 0.8377j) | (0.0937 + 0.1597j) |
| 494 | (−0.6665 − 0.4036j) | (−1.4038 + 0.8377j) | (0.0937 + 0.4297j) |
| 495 | (−0.2976 − 0.1518j) | (−1.4038 − 0.8377j) | (0.0937 + 0.0937j) |
| 496 | (0.51 − 0.4746j) | (1.1144 + 1.0103j) | (0.0937 + 0.9504j) |
| 497 | (0.3347 − 0.2965j) | (1.1144 − 1.0103j) | (0.0937 − 0.2918j) |
| 498 | (−0.5148 − 0.4713j) | (−1.1144 + 1.0103j) | (0.0937 + 1.3347j) |
| 499 | (−0.3461 − 0.2979j) | (−1.1144 − 1.0103j) | (0.0937 − 0.503j) |
| 500 | (0.6272 − 0.3068j) | (1.3602 + 0.6395j) | (0.0937 − 0.946j) |
| 501 | (0.4006 − 0.2039j) | (1.3602 − 0.6395j) | (0.0937 − 0.8449j) |
| 502 | (−0.64 − 0.3011j) | (−1.3602 + 0.6395j) | (0.0937 − 1.331j) |
| 503 | (−0.4088 − 0.1967j) | (−1.3602 − 0.6395j) | (0.0937 − 0.5804j) |
| 504 | (0.5658 − 0.5287j) | (1.209 + 0.8956j) | (0.0937 + 0.8462j) |
| 505 | (0.2884 − 0.238j) | (1.209 − 0.8956j) | (0.0937 − 0.2242j) |
| 506 | (−0.5678 − 0.5205j) | (−1.209 + 0.8956j) | (0.0937 + 0.5805j) |
| 507 | (−0.2983 − 0.2402j) | (−1.209 − 0.8956j) | (0.0937 − 0.0332j) |
| 508 | (0.6931 − 0.3397j) | (1.2908 + 0.7709j) | (0.0937 + 0.2916j) |
| 509 | (0.3332 − 0.1749j) | (1.2908 − 0.7709j) | (0.0937 − 0.2239j) |
| 510 | (−0.7075 − 0.3341j) | (−1.2908 + 0.7709j) | (0.0937 + 0.5035j) |
| 511 | (−0.3454 − 0.176j) | (−1.2908 − 0.7709j) | (0.0937 + 0.0328j) |
| 512 | (0.1786 + 1.1724j) | (0.027 + 0.0611j) | (0.9504 + 1.0626j) |
| 513 | (0.1917 + 1.2732j) | (0.027 − 0.0611j) | (0.9504 − 0.3591j) |
| 514 | (−0.1693 + 1.1787j) | (−0.027 + 0.0611j) | (0.9504 + 1.1878j) |
| 515 | (−0.1855 + 1.2741j) | (−0.027 − 0.0611j) | (0.9504 − 0.4301j) |
| 516 | (0.2907 + 1.1433j) | (0.0317 + 0.262j) | (0.9504 − 1.058j) |
| 517 | (0.309 + 1.2499j) | (0.0317 − 0.262j) | (0.9504 − 0.7494j) |
| 518 | (−0.2863 + 1.1591j) | (−0.0317 + 0.262j) | (0.9504 − 1.1847j) |
| 519 | (−0.3086 + 1.25j) | (−0.0317 − 0.262j) | (0.9504 − 0.6628j) |
| 520 | (0.1416 + 0.9264j) | (0.043 + 0.1103j) | (0.9504 + 0.7523j) |
| 521 | (0.258 + 1.6315j) | (0.043 − 0.1103j) | (0.9504 − 0.1607j) |
| 522 | (−0.1358 + 0.9275j) | (−0.043 + 0.1103j) | (0.9504 + 0.6629j) |
| 523 | (−0.2411 + 1.6341j) | (−0.043 − 0.1103j) | (0.9504 − 0.0944j) |
| 524 | (0.2287 + 0.902j) | (0.025 + 0.1818j) | (0.9504 + 0.3594j) |
| 525 | (0.3934 + 1.4627j) | (0.025 − 0.1818j) | (0.9504 + 0.1597j) |
| 526 | (−0.2253 + 0.9122j) | (−0.025 + 0.1818j) | (0.9504 + 0.4297j) |
| 527 | (−0.3962 + 1.6036j) | (−0.025 − 0.1818j) | (0.9504 + 0.0937j) |
| 528 | (0.0567 + 1.1856j) | (0.0278 + 0.3759j) | (0.9504 + 0.9504j) |
| 529 | (0.0657 + 1.2858j) | (0.0278 − 0.3759j) | (0.9504 − 0.2918j) |
| 530 | (−0.0561 + 1.1863j) | (−0.0278 + 0.3759j) | (0.9504 + 1.3347j) |
| 531 | (−0.0624 + 1.286j) | (−0.0278 − 0.3759j) | (0.9504 − 0.503j) |
| 532 | (0.4094 + 1.1197j) | (0.0553 + 0.3141j) | (0.9504 − 0.946j) |
| 533 | (0.4903 + 1.3021j) | (0.0553 − 0.3141j) | (0.9504 − 0.8449j) |
| 534 | (−0.3997 + 1.1155j) | (−0.0553 + 0.3141j) | (0.9504 − 1.331j) |
| 535 | (−0.4291 + 1.2139j) | (−0.0553 − 0.3141j) | (0.9504 − 0.5804j) |
| 536 | (0.048 + 0.9321j) | (0.0722 + 0.3941j) | (0.9504 + 0.8462j) |
| 537 | (0.0854 + 1.6496j) | (0.0722 − 0.3941j) | (0.9504 − 0.2242j) |
| 538 | (−0.0436 + 0.9357j) | (−0.0722 + 0.3941j) | (0.9504 + 0.5805j) |
| 539 | (−0.077 + 1.65j) | (−0.0722 − 0.3941j) | (0.9504 − 0.0332j) |
| 540 | (0.3228 + 0.8843j) | (0.1151 + 0.3654j) | (0.9504 + 0.2916j) |
| 541 | (0.531 + 1.4186j) | (0.1151 − 0.3654j) | (0.9504 − 0.2239j) |
| 542 | (−0.3122 + 0.8829j) | (−0.1151 + 0.3654j) | (0.9504 + 0.5035j) |
| 543 | (−0.5528 + 1.5565j) | (−0.1151 − 0.3654j) | (0.9504 + 0.0328j) |
| 544 | (0.1657 − 1.171j) | (0.0317 + 0.5381j) | (−0.2918 + 1.0626j) |
| 545 | (0.1862 − 1.274j) | (0.0317 − 0.5381j) | (−0.2918 − 0.3591j) |
| 546 | (−0.1783 − 1.1678j) | (−0.0317 + 0.5381j) | (−0.2918 + 1.1878j) |
| 547 | (−0.1975 − 1.2723j) | (−0.0317 − 0.5381j) | (−0.2918 − 0.4301j) |
| 548 | (0.2774 − 1.1499j) | (0.2051 + 0.5107j) | (−0.2918 − 1.058j) |
| 549 | (0.2994 − 1.2522j) | (0.2051 − 0.5107j) | (−0.2918 − 0.7494j) |
| 550 | (−0.2937 − 1.1526j) | (−0.2051 + 0.5107j) | (−0.2918 − 1.1847j) |
| 551 | (−0.3184 − 1.2475j) | (−0.2051 − 0.5107j) | (−0.2918 − 0.6628j) |
| 552 | (0.1268 − 0.9247j) | (0.0921 + 0.5307j) | (−0.2918 + 0.7523j) |
| 553 | (0.2411 − 1.6341j) | (0.0921 − 0.5307j) | (−0.2918 − 0.1607j) |
| 554 | (−0.146 − 0.9209j) | (−0.0921 + 0.5307j) | (−0.2918 + 0.6629j) |
| 555 | (−0.2471 − 1.6332j) | (−0.0921 − 0.5307j) | (−0.2918 − 0.0944j) |
| 556 | (0.2174 − 0.9034j) | (0.1506 + 0.526j) | (−0.2918 + 0.3594j) |
| 557 | (0.4076 − 1.607j) | (0.1506 − 0.526j) | (−0.2918 + 0.1597j) |
| 558 | (−0.2309 − 0.9025j) | (−0.1506 + 0.526j) | (−0.2918 + 0.4297j) |
| 559 | (−0.4053 − 1.6013j) | (−0.1506 − 0.526j) | (−0.2918 + 0.0937j) |
| 560 | (0.0491 − 1.1786j) | (0.0272 + 0.4642j) | (−0.2918 + 0.9504j) |
| 561 | (0.0566 − 1.2863j) | (0.0272 − 0.4642j) | (−0.2918 − 0.2918j) |
| 562 | (−0.0675 − 1.1846j) | (−0.0272 + 0.4642j) | (−0.2918 + 1.3347j) |
| 563 | (−0.0679 − 1.2857j) | (−0.0272 − 0.4642j) | (−0.2918 − 0.503j) |
| 564 | (0.3898 − 1.1113j) | (0.1897 + 0.4469j) | (−0.2918 − 0.946j) |
| 565 | (0.4225 − 1.2162j) | (0.1897 − 0.4469j) | (−0.2918 − 0.8449j) |
| 566 | (−0.409 − 1.1185j) | (−0.1897 + 0.4469j) | (−0.2918 − 1.331j) |
| 567 | (−0.439 − 1.2104j) | (−0.1897 − 0.4469j) | (−0.2918 − 0.5804j) |
| 568 | (0.035 − 0.9278j) | (0.0838 + 0.4552j) | (−0.2918 + 0.8462j) |
| 569 | (0.0826 − 1.6497j) | (0.0838 − 0.4552j) | (−0.2918 − 0.2242j) |
| 570 | (−0.0547 − 0.9275j) | (−0.0838 + 0.4552j) | (−0.2918 + 0.5805j) |
| 571 | (−0.0884 − 1.6494j) | (−0.0838 − 0.4552j) | (−0.2918 − 0.0332j) |
| 572 | (0.3 − 0.881j) | (0.1492 + 0.4302j) | (−0.2918 + 0.2916j) |
| 573 | (0.5598 − 1.554j) | (0.1492 − 0.4302j) | (−0.2918 + 0.2239j) |
| 574 | (−0.3188 − 0.8774j) | (−0.1492 + 0.4302j) | (−0.2918 + 0.5035j) |
| 575 | (−0.5712 − 1.5499j) | (−0.1492 − 0.4302j) | (−0.2918 + 0.0328j) |
| 576 | (1.1647 + 0.1694j) | (0.0534 + 0.0265j) | (1.3347 + 1.0626j) |
| 577 | (1.4993 + 0.2153j) | (0.0534 − 0.0265j) | (1.3347 − 0.3591j) |
| 578 | (−1.1674 + 0.1824j) | (−0.0534 + 0.0265j) | (1.3347 + 1.1878j) |
| 579 | (−1.2728 + 0.1939j) | (−0.0534 − 0.0265j) | (1.3347 − 0.4301j) |
| 580 | (1.1424 + 0.2787j) | (0.2607 + 0.0314j) | (1.3347 − 1.058j) |
| 581 | (1.4721 + 0.3567j) | (0.2607 − 0.0314j) | (1.3347 − 0.7494j) |
| 582 | (−1.1453 + 0.2988j) | (−0.2607 + 0.0314j) | (1.3347 − 1.1847j) |
| 583 | (−1.2465 + 0.3223j) | (−0.2607 − 0.0314j) | (1.3347 − 0.6628j) |
| 584 | (0.9202 + 0.1383j) | (0.1082 + 0.0417j) | (1.3347 + 0.7523j) |
| 585 | (1.6358 + 0.2295j) | (0.1082 − 0.0417j) | (1.3347 − 0.1607j) |
| 586 | (−0.9246 + 0.1443j) | (−0.1082 + 0.0417j) | (1.3347 + 0.6629j) |
| 587 | (−1.6335 + 0.2451j) | (−0.1082 − 0.0417j) | (1.3347 − 0.0944j) |
| 588 | (0.9042 + 0.2274j) | (0.1795 + 0.0247j) | (1.3347 + 0.3594j) |
| 589 | (1.6071 + 0.3817j) | (0.1795 − 0.0247j) | (1.3347 + 0.1597j) |
| 590 | (−0.9054 + 0.2344j) | (−0.1795 + 0.0247j) | (1.3347 + 0.4297j) |
| 591 | (−1.6014 + 0.4048j) | (−0.1795 − 0.0247j) | (1.3347 + 0.0937j) |
| 592 | (1.1743 + 0.0533j) | (0.3752 + 0.0277j) | (1.3347 + 0.9504j) |
| 593 | (1.5134 + 0.0631j) | (0.3752 − 0.0277j) | (1.3347 − 0.2918j) |
| 594 | (−1.1776 + 0.0638j) | (−0.3752 + 0.0277j) | (1.3347 + 1.3347j) |
| 595 | (−1.2856 + 0.0698j) | (−0.3752 − 0.0277j) | (1.3347 − 0.503j) |
| 596 | (1.1172 + 0.3913j) | (0.3134 + 0.0556j) | (1.3347 − 0.946j) |
| 597 | (1.4323 + 0.4929j) | (0.3134 − 0.0556j) | (1.3347 − 0.8449j) |
| 598 | (−1.1139 + 0.4116j) | (−0.3134 + 0.0556j) | (1.3347 − 1.331j) |
| 599 | (−1.209 + 0.4427j) | (−0.3134 − 0.0556j) | (1.3347 − 0.5804j) |
| 600 | (0.9317 + 0.0452j) | (0.3933 + 0.0716j) | (1.3347 + 0.8462j) |
| 601 | (1.6504 + 0.0689j) | (0.3933 − 0.0716j) | (1.3347 − 0.2242j) |
| 602 | (−0.9339 + 0.0509j) | (−0.3933 + 0.0716j) | (1.3347 + 0.5805j) |

| Mapping | NN_QSL | NN_QSC | NN_RSC |
| --- | --- | --- | --- |
| 603 | (−1.6494 + 0.0884j) | (−0.3933 − 0.0716j) | (1.3347 − 0.0332j) |
| 604 | (0.8748 + 0.3161j) | (0.365 + 0.1149j) | (1.3347 + 0.2916j) |
| 605 | (1.5636 + 0.5325j) | (0.365 − 0.1149j) | (1.3347 + 0.2239j) |
| 606 | (−0.8734 + 0.322j) | (−0.365 + 0.1149j) | (1.3347 + 0.5035j) |
| 607 | (−1.5514 + 0.5672j) | (−0.365 − 0.1149j) | (1.3347 + 0.0328j) |
| 608 | (1.1645 − 0.1744j) | (0.538 + 0.0316j) | (−0.503 + 1.0626j) |
| 609 | (1.498 − 0.2244j) | (0.538 − 0.0316j) | (−0.503 − 0.3591j) |
| 610 | (−1.1728 − 0.1765j) | (−0.538 + 0.0316j) | (−0.503 + 1.1878j) |
| 611 | (−1.2737 − 0.1879j) | (−0.538 − 0.0316j) | (−0.503 − 0.4301j) |
| 612 | (1.1384 − 0.2837j) | (0.5107 + 0.2047j) | (−0.503 − 1.058j) |
| 613 | (1.4708 − 0.3623j) | (0.5107 − 0.2047j) | (−0.503 − 0.7494j) |
| 614 | (−1.1494 − 0.2879j) | (−0.5107 + 0.2047j) | (−0.503 − 1.1847j) |
| 615 | (−1.2492 − 0.3118j) | (−0.5107 − 0.2047j) | (−0.503 − 0.6628j) |
| 616 | (0.9147 − 0.1392j) | (0.5312 + 0.0918j) | (−0.503 + 0.7523j) |
| 617 | (1.634 − 0.2415j) | (0.5312 − 0.0918j) | (−0.503 − 0.1607j) |
| 618 | (−0.9308 − 0.1394j) | (−0.5312 + 0.0918j) | (−0.503 + 0.6629j) |
| 619 | (−1.6357 − 0.2298j) | (−0.5312 − 0.0918j) | (−0.503 − 0.0944j) |
| 620 | (0.8961 − 0.2302j) | (0.5264 + 0.1505j) | (−0.503 + 0.3594j) |
| 621 | (1.6044 − 0.3927j) | (0.5264 − 0.1505j) | (−0.503 + 0.1597j) |
| 622 | (−0.9094 − 0.2263j) | (−0.5264 + 0.1505j) | (−0.503 − 0.4297j) |
| 623 | (−1.6046 − 0.3921j) | (−0.5264 − 0.1505j) | (−0.503 + 0.0937j) |
| 624 | (1.1802 − 0.0531j) | (0.464 + 0.0275j) | (−0.503 + 0.9504j) |
| 625 | (1.5126 − 0.0797j) | (0.464 − 0.0275j) | (−0.503 − 0.2918j) |
| 626 | (−1.1809 − 0.0568j) | (−0.464 + 0.0275j) | (−0.503 + 1.3347j) |
| 627 | (−1.2861 − 0.0597j) | (−0.464 − 0.0275j) | (−0.503 − 0.503j) |
| 628 | (1.1032 − 0.3996j) | (0.4471 + 0.1888j) | (−0.503 − 0.946j) |
| 629 | (1.4282 − 0.5046j) | (0.4471 − 0.1888j) | (−0.503 − 0.8449j) |
| 630 | (−1.1225 − 0.4008j) | (−0.4471 + 0.1888j) | (−0.503 − 1.331j) |
| 631 | (−1.2128 − 0.4322j) | (−0.4471 − 0.1888j) | (−0.503 − 0.5804j) |
| 632 | (0.928 − 0.0459j) | (0.4551 + 0.0837j) | (−0.503 + 0.8462j) |
| 633 | (1.6495 − 0.0876j) | (0.4551 − 0.0837j) | (−0.503 − 0.2242j) |
| 634 | (−0.9373 − 0.0446j) | (−0.4551 + 0.0837j) | (−0.503 + 0.5805j) |
| 635 | (−1.6498 − 0.0804j) | (−0.4551 − 0.0837j) | (−0.503 − 0.0332j) |
| 636 | (0.8685 − 0.3189j) | (0.4306 + 0.1487j) | (−0.503 + 0.2916j) |
| 637 | (1.5587 − 0.5466j) | (0.4306 − 0.1487j) | (−0.503 − 0.2239j) |
| 638 | (−0.8786 − 0.3163j) | (−0.4306 + 0.1487j) | (−0.503 − 0.5035j) |
| 639 | (−1.5586 − 0.547j) | (−0.4306 − 0.1487j) | (−0.503 − 0.0328j) |
| 640 | (0.7069 + 0.9425j) | (0.0575 + 1.1837j) | (−0.946 + 1.0626j) |
| 641 | (0.8322 + 1.115j) | (0.0575 − 1.1837j) | (−0.946 − 0.3591j) |
| 642 | (−0.698 + 0.952j) | (−0.0575 + 1.1837j) | (−0.946 + 1.1878j) |
| 643 | (−0.7634 + 1.0368j) | (−0.0575 − 1.1837j) | (−0.946 − 0.4301j) |
| 644 | (0.615 + 1.0184j) | (0.3973 + 1.121j) | (−0.946 − 1.058j) |
| 645 | (0.7224 + 1.1891j) | (0.3973 − 1.121j) | (−0.946 − 0.7494j) |
| 646 | (−0.6048 + 1.0285j) | (−0.3973 + 1.121j) | (−0.946 − 1.1847j) |
| 647 | (−0.653 + 1.1096j) | (−0.3973 − 1.121j) | (−0.946 − 0.6628j) |
| 648 | (0.5515 + 0.7486j) | (0.172 + 1.1733j) | (−0.946 + 0.7523j) |
| 649 | (0.9152 + 1.207j) | (0.172 − 1.1733j) | (−0.946 − 0.1607j) |
| 650 | (−0.5507 + 0.7546j) | (−0.172 + 1.1733j) | (−0.946 + 0.6629j) |
| 651 | (−0.9814 + 1.3286j) | (−0.172 − 1.1733j) | (−0.946 − 0.0944j) |
| 652 | (0.4755 + 0.8063j) | (0.2858 + 1.1531j) | (−0.946 + 0.3594j) |
| 653 | (0.7878 + 1.2937j) | (0.2858 − 1.1531j) | (−0.946 + 0.1597j) |
| 654 | (−0.4733 + 0.805j) | (−0.2858 + 1.1531j) | (−0.946 − 0.4297j) |
| 655 | (−0.8424 + 1.4208j) | (−0.2858 − 1.1531j) | (−0.946 + 0.0937j) |
| 656 | (0.7981 + 0.8749j) | (0.0532 + 1.0946j) | (−0.946 + 0.9504j) |
| 657 | (0.9342 + 1.0311j) | (0.0532 − 1.0946j) | (−0.946 − 0.2918j) |
| 658 | (−0.7956 + 0.8855j) | (−0.0532 + 1.0946j) | (−0.946 + 1.3347j) |
| 659 | (−0.8619 + 0.9565j) | (−0.0532 − 1.0946j) | (−0.946 − 0.503j) |
| 660 | (0.5126 + 1.0729j) | (0.367 + 1.0381j) | (−0.946 − 0.946j) |
| 661 | (0.6094 + 1.2508j) | (0.367 − 1.0381j) | (−0.946 − 0.8449j) |
| 662 | (−0.5018 + 1.0771j) | (−0.367 + 1.0381j) | (−0.946 − 1.331j) |
| 663 | (−0.5458 + 1.1661j) | (−0.367 − 1.0381j) | (−0.946 − 0.5804j) |
| 664 | (0.6234 + 0.6912j) | (0.159 + 1.0852j) | (−0.946 + 0.8462j) |
| 665 | (1.0257 + 1.1146j) | (0.159 − 1.0852j) | (−0.946 − 0.2242j) |
| 666 | (−0.6154 + 0.6921j) | (−0.159 + 1.0852j) | (−0.946 + 0.5805j) |
| 667 | (−1.1063 + 1.2266j) | (−0.159 − 1.0852j) | (−0.946 − 0.0332j) |
| 668 | (0.3995 + 0.8429j) | (0.264 + 1.067j) | (−0.946 + 0.2916j) |
| 669 | (0.6712 + 1.3579j) | (0.264 − 1.067j) | (−0.946 − 0.2239j) |
| 670 | (−0.3961 + 0.8456j) | (−0.264 + 1.067j) | (−0.946 − 0.5035j) |
| 671 | (−0.7021 + 1.4952j) | (−0.264 − 1.067j) | (−0.946 − 0.0328j) |
| 672 | (0.7008 − 0.9586j) | (0.0622 + 1.2787j) | (−0.8449 + 1.0626j) |
| 673 | (0.8267 − 1.1191j) | (0.0622 − 1.2787j) | (−0.8449 − 0.3591j) |
| 674 | (−0.7111 − 0.9504j) | (−0.0622 + 1.2787j) | (−0.8449 + 1.1878j) |
| 675 | (−0.767 − 1.0341j) | (−0.0622 − 1.2787j) | (−0.8449 − 0.4301j) |
| 676 | (0.6035 − 1.0258j) | (0.4301 + 1.2101j) | (−0.8449 − 1.058j) |
| 677 | (0.7162 − 1.1928j) | (0.4301 − 1.2101j) | (−0.8449 − 0.7494j) |
| 678 | (−0.6122 − 1.0147j) | (−0.4301 + 1.2101j) | (−0.8449 − 1.1847j) |
| 679 | (−0.6685 − 1.1004j) | (−0.4301 − 1.2101j) | (−0.8449 − 0.6628j) |
| 680 | (0.5477 − 0.7505j) | (0.1863 + 1.2674j) | (−0.8449 + 0.7523j) |
| 681 | (0.9065 − 1.2135j) | (0.1863 − 1.2674j) | (−0.8449 − 0.1607j) |
| 682 | (−0.5559 − 0.752j) | (−0.1863 + 1.2674j) | (−0.8449 + 0.6629j) |
| 683 | (−0.9899 − 1.3223j) | (−0.1863 − 1.2674j) | (−0.8449 − 0.0944j) |
| 684 | (0.4665 − 0.7984j) | (0.3092 + 1.2448j) | (−0.8449 + 0.3594j) |
| 685 | (0.7816 − 1.2975j) | (0.3092 − 1.2448j) | (−0.8449 + 0.1597j) |
| 686 | (−0.4862 − 0.8005j) | (−0.3092 + 1.2448j) | (−0.8449 − 0.4297j) |
| 687 | (−0.8591 − 1.4108j) | (−0.3092 − 1.2448j) | (−0.8449 + 0.0937j) |
| 688 | (0.7846 − 0.8762j) | (0.0672 + 1.3819j) | (−0.8449 + 0.9504j) |
| 689 | (0.9281 − 1.0365j) | (0.0672 − 1.3819j) | (−0.8449 − 0.2918j) |
| 690 | (−0.7992 − 0.8736j) | (−0.0672 + 1.3819j) | (−0.8449 + 1.3347j) |
| 69 | (−0.8668 − 0.952j) | (−0.0672 − 1.3819j) | (−0.8449 − 0.503j) |
| 692 | (0.4984 − 1.0659j) | (0.4648 + 1.307j) | (−0.8449 − 0.946j) |
| 693 | (0.5355 − 1.1709j) | (0.4648 − 1.307j) | (−0.8449 − 0.8449j) |
| 694 | (−0.513 − 1.071j) | (−0.4648 + 1.307j) | (−0.8449 − 1.331j) |
| 695 | (−0.5555 − 1.1615j) | (−0.4648 − 1.307j) | (−0.8449 − 0.5804j) |
| 696 | (0.6114 − 0.6943j) | (0.2016 + 1.3696j) | (−0.8449 + 0.8462j) |
| 697 | (1.0215 − 1.1184j) | (0.2016 − 1.3696j) | (−0.8449 − 0.2242j) |
| 698 | (−0.6263 − 0.6837j) | (−0.2016 + 1.3696j) | (−0.8449 + 0.5805j) |
| 699 | (−1.1178 − 1.2161j) | (−0.2016 − 1.3696j) | (−0.8449 − 0.0332j) |
| 700 | (0.3859 − 0.8401j) | (0.3344 + 1.3443j) | (−0.8449 + 0.2916j) |
| 701 | (0.6538 − 1.3664j) | (0.3344 − 1.3443j) | (−0.8449 − 0.2239j) |
| 702 | (−0.4012 − 0.8435j) | (−0.3344 + 1.3443j) | (−0.8449 − 0.5035j) |
| 703 | (−0.7165 − 1.4883j) | (−0.3344 − 1.3443j) | (−0.8449 − 0.0328j) |
| 704 | (0.9555 + 0.702j) | (1.1848 + 0.0575j) | (−1.331 + 1.0626j) |
| 705 | (1.2319 + 0.8814j) | (1.1848 − 0.0575j) | (−1.331 − 0.3591j) |
| 706 | (−0.9498 + 0.7129j) | (−1.1848 + 0.0575j) | (−1.331 + 1.1878j) |
| 707 | (−1.027 + 0.7766j) | (−1.1848 − 0.0575j) | (−1.331 − 0.4301j) |
| 708 | (1.0187 + 0.6027j) | (1.1213 + 0.3973j) | (−1.331 − 1.058j) |
| 709 | (1.315 + 0.7518j) | (1.1213 − 0.3973j) | (−1.331 − 0.7494j) |
| 710 | (−1.0083 + 0.6151j) | (−1.1213 + 0.3973j) | (−1.331 − 1.1847j) |
| 711 | (−1.1015 + 0.6666j) | (−1.1213 − 0.3973j) | (−1.331 − 0.6628j) |
| 712 | (0.7463 + 0.5537j) | (1.1742 + 0.1718j) | (−1.331 + 0.7523j) |
| 713 | (1.3417 + 0.9634j) | (1.1742 − 0.1718j) | (−1.331 − 0.1607j) |
| 714 | (−0.745 + 0.5654j) | (−1.1742 + 0.1718j) | (−1.331 + 0.6629j) |
| 715 | (−1.3284 + 0.9818j) | (−1.1742 − 0.1718j) | (−1.331 − 0.0944j) |
| 716 | (0.7927 + 0.4759j) | (1.1536 + 0.2855j) | (−1.331 + 0.3594j) |
| 717 | (1.4277 + 0.8308j) | (1.1536 − 0.2855j) | (−1.331 + 0.1597j) |
| 718 | (−0.7941 + 0.4894j) | (−1.1536 + 0.2855j) | (−1.331 − 0.4297j) |
| 719 | (−1.413 + 0.8554j) | (−1.1536 − 0.2855j) | (−1.331 + 0.0937j) |
| 720 | (0.8747 + 0.7861j) | (1.0956 + 0.053j) | (−1.331 + 0.9504j) |
| 721 | (1.1389 + 0.9987j) | (1.0956 − 0.053j) | (−1.331 − 0.2918j) |
| 722 | (−0.8696 + 0.7966j) | (−1.0956 + 0.053j) | (−1.331 + 1.3347j) |
| 723 | (−0.9505 + 0.8685j) | (−1.0956 − 0.053j) | (−1.331 − 0.503j) |
| 724 | (1.0692 + 0.5015j) | (1.0383 + 0.3669j) | (−1.331 − 0.946j) |
| 725 | (1.3757 + 0.6339j) | (1.0383 − 0.3669j) | (−1.331 − 0.8449j) |
| 726 | (−1.0658 + 0.5137j) | (−1.0383 + 0.3669j) | (−1.331 − 1.331j) |
| 727 | (−1.161 + 0.5566j) | (−1.0383 − 0.3669j) | (−1.331 − 0.5804j) |
| 728 | (0.687 + 0.6205j) | (1.0863 + 0.159j) | (−1.331 + 0.8462j) |
| 729 | (1.2372 + 1.0944j) | (1.0863 − 0.159j) | (−1.331 − 0.2242j) |
| 730 | (−0.6877 + 0.6289j) | (−1.0863 + 0.159j) | (−1.331 + 0.5805j) |
| 731 | (−1.2251 + 1.1079j) | (−1.0863 − 0.159j) | (−1.331 − 0.0332j) |
| 732 | (0.8436 + 0.3975j) | (1.0675 + 0.264j) | (−1.331 + 0.2916j) |
| 733 | (1.5011 + 0.6893j) | (1.0675 − 0.264j) | (−1.331 − 0.2239j) |
| 734 | (−0.8394 + 0.4073j) | (−1.0675 + 0.264j) | (−1.331 − 0.5035j) |
| 735 | (−1.4925 + 0.7078j) | (−1.0675 − 0.264j) | (−1.331 − 0.0328j) |
| 736 | (0.9443 − 0.7071j) | (1.2799 + 0.062j) | (−0.5804 + 1.0626j) |
| 737 | (1.2202 − 0.8975j) | (1.2799 − 0.062j) | (−0.5804 − 0.3591j) |
| 738 | (−0.9487 − 0.6996j) | (−1.2799 + 0.062j) | (−0.5804 + 1.1878j) |
| 739 | (−1.038 − 0.7618j) | (−1.2799 − 0.062j) | (−0.5804 − 0.4301j) |
| 740 | (1.0102 − 0.6086j) | (1.2103 + 0.4297j) | (−0.5804 − 1.058j) |
| 741 | (1.3042 − 0.7703j) | (1.2103 − 0.4297j) | (−0.5804 − 0.7494j) |
| 742 | (−1.0086 − 0.6001j) | (−1.2103 + 0.4297j) | (−0.5804 − 1.1847j) |
| 743 | (−1.1065 − 0.6583j) | (−1.2103 − 0.4297j) | (−0.5804 − 0.6628j) |
| 744 | (0.738 − 0.5612j) | (1.2684 + 0.186j) | (−0.5804 + 0.7523j) |
| 745 | (1.3385 − 0.968j) | (1.2684 − 0.186j) | (−0.5804 − 0.1607j) |
| 746 | (−0.7447 − 0.5564j) | (−1.2684 + 0.186j) | (−0.5804 + 0.6629j) |
| 747 | (−1.3369 − 0.9701j) | (−1.2684 − 0.186j) | (−0.5804 − 0.0944j) |
| 748 | (0.7897 − 0.4876j) | (1.2451 + 0.3089j) | (−0.5804 + 0.3594j) |
| 749 | (1.4243 − 0.8365j) | (1.2451 − 0.3089j) | (−0.5804 + 0.1597j) |
| 750 | (−0.7977 − 0.4802j) | (−1.2451 + 0.3089j) | (−0.5804 − 0.4297j) |
| 751 | (−1.4225 − 0.8396j) | (−1.2451 − 0.3089j) | (−0.5804 + 0.0937j) |
| 752 | (0.8677 − 0.793j) | (1.383 + 0.0678j) | (−0.5804 + 0.9504j) |
| 753 | (1.1351 − 1.003j) | (1.383 − 0.0678j) | (−0.5804 − 0.2918j) |
| 754 | (−0.8831 − 0.7952j) | (−1.383 + 0.0678j) | (−0.5804 + 1.3347j) |

-continued

| Mapping | NN_QSL | NN_QSC | NN_RSC |
| --- | --- | --- | --- |
| 755 | (−0.9571 − 0.8612j) | (−1.383 − 0.0678j) | (−0.5804 − 0.503j) |
| 756 | (1.0586 − 0.5052j) | (1.3072 + 0.465j) | (−0.5804 − 0.946j) |
| 757 | (1.3741 − 0.6374j) | (1.3072 + 0.465j) | (−0.5804 − 0.8449j) |
| 758 | (−1.0708 − 0.5059j) | (−1.3072 + 0.465j) | (−0.5804 − 1.331j) |
| 759 | (−1.1655 − 0.547j) | (−1.3072 − 0.465j) | (−0.5804 − 0.5804j) |
| 760 | (0.6789 − 0.6352j) | (1.3701 + 0.2024j) | (−0.5804 + 0.8462j) |
| 761 | (1.2379 − 1.0937j) | (1.3701 − 0.2024j) | (−0.5804 − 0.2242j) |
| 762 | (−0.6897 − 0.6256j) | (−1.3701 + 0.2024j) | (−0.5804 + 0.5805j) |
| 763 | (−1.2375 − 1.0941j) | (−1.3701 − 0.2024j) | (−0.5804 − 0.0332j) |
| 764 | (0.8306 − 0.3999j) | (1.3443 + 0.3352j) | (−0.5804 + 0.2916j) |
| 765 | (1.4995 − 0.6928j) | (1.3443 − 0.3352j) | (−0.5804 − 0.2239j) |
| 766 | (−0.844 − 0.4028j) | (−1.3443 + 0.3352j) | (−0.5804 + 0.5035j) |
| 767 | (−1.4993 − 0.6933j) | (−1.3443 − 0.3352j) | (−0.5804 + 0.0328j) |
| 768 | (0.1656 + 1.084j) | (0.1481 + 0.1893j) | (0.8462 + 1.0626j) |
| 769 | (0.2096 + 1.3754j) | (0.1481 − 0.1893j) | (0.8462 − 0.3591j) |
| 770 | (−0.1593 + 1.0928j) | (−0.1481 + 0.1893j) | (0.8462 + 1.1878j) |
| 771 | (−0.2008 + 1.3767j) | (−0.1481 − 0.1893j) | (0.8462 − 0.4301j) |
| 772 | (0.2771 + 1.0629j) | (0.0947 + 0.2322j) | (0.8462 − 1.058j) |
| 773 | (0.3461 + 1.3476j) | (0.0947 − 0.2322j) | (0.8462 − 0.7494j) |
| 774 | (−0.268 + 1.0658j) | (−0.0947 + 0.2322j) | (0.8462 − 1.1847j) |
| 775 | (−0.335 + 1.3504j) | (−0.0947 − 0.2322j) | (0.8462 − 0.6628j) |
| 776 | (0.1532 + 1.0087j) | (0.0996 + 0.1406j) | (0.8462 + 0.7523j) |
| 777 | (0.2329 + 1.4967j) | (0.0996 − 0.1406j) | (0.8462 − 0.1607j) |
| 778 | (−0.1438 + 1.0059j) | (−0.0996 + 0.1406j) | (0.8462 + 0.6629j) |
| 779 | (−0.222 + 1.4984j) | (−0.0996 − 0.1406j) | (0.8462 − 0.0944j) |
| 780 | (0.2497 + 0.9813j) | (0.0674 + 0.1859j) | (0.8462 + 0.3594j) |
| 781 | (0.4377 + 1.5927j) | (0.0674 − 0.1859j) | (0.8462 + 0.1597j) |
| 782 | (−0.243 + 0.9898j) | (−0.0674 + 0.1859j) | (0.8462 + 0.4297j) |
| 783 | (−0.3635 + 1.4705j) | (−0.0674 − 0.1859j) | (0.8462 + 0.0937j) |
| 784 | (0.0552 + 1.0973j) | (0.1858 + 0.2349j) | (0.8462 + 0.9504j) |
| 785 | (0.0692 + 1.3896j) | (0.1858 − 0.2349j) | (0.8462 − 0.2918j) |
| 786 | (−0.0533 + 1.1004j) | (−0.1858 + 0.2349j) | (0.8462 + 1.3347j) |
| 787 | (−0.0645 + 1.3898j) | (−0.1858 − 0.2349j) | (0.8462 − 0.503j) |
| 788 | (0.3786 + 1.0415j) | (0.1264 + 0.2775j) | (0.8462 − 0.946j) |
| 789 | (0.4427 + 1.209j) | (0.1264 − 0.2775j) | (0.8462 − 0.8449j) |
| 790 | (−0.366 + 1.0374j) | (−0.1264 + 0.2775j) | (0.8462 − 1.331j) |
| 791 | (−0.4614 + 1.3126j) | (−0.1264 − 0.2775j) | (0.8462 − 0.5804j) |
| 792 | (0.0518 + 1.0143j) | (0.2228 + 0.2756j) | (0.8462 + 0.8462j) |
| 793 | (0.0782 + 1.5127j) | (0.2228 − 0.2756j) | (0.8462 − 0.2242j) |
| 794 | (−0.046 + 1.0123j) | (−0.2228 + 0.2756j) | (0.8462 + 0.5805j) |
| 795 | (−0.0701 + 1.5131j) | (−0.2228 − 0.2756j) | (0.8462 − 0.0332j) |
| 796 | (0.3459 + 0.9602j) | (0.1646 + 0.3239j) | (0.8462 + 0.2916j) |
| 797 | (0.5834 + 1.5453j) | (0.1646 − 0.3239j) | (0.8462 + 0.2239j) |
| 798 | (−0.339 + 0.9602j) | (−0.1646 + 0.3239j) | (0.8462 + 0.5035j) |
| 799 | (−0.5068 + 1.4274j) | (−0.1646 − 0.3239j) | (0.8462 + 0.0328j) |
| 800 | (0.1542 − 1.0848j) | (0.3621 + 0.4078j) | (−0.2242 + 1.0626j) |
| 801 | (0.195 − 1.3776j) | (0.3621 − 0.4078j) | (−0.2242 − 0.3591j) |
| 802 | (−0.1692 − 1.0862j) | (−0.3621 + 0.4078j) | (−0.2242 + 1.1878j) |
| 803 | (−0.2105 − 1.3753j) | (−0.3621 − 0.4078j) | (−0.2242 − 0.4301j) |
| 804 | (0.2571 − 1.0604j) | (0.2671 + 0.4864j) | (−0.2242 − 1.058j) |
| 805 | (0.3269 − 1.3524j) | (0.2671 − 0.4864j) | (−0.2242 − 0.7494j) |
| 806 | (−0.2773 − 1.0626j) | (−0.2671 + 0.4864j) | (−0.2242 − 1.1847j) |
| 807 | (−0.3392 − 1.3493j) | (−0.2671 − 0.4864j) | (−0.2242 − 0.6628j) |
| 808 | (0.1408 − 0.9984j) | (0.3557 + 0.4498j) | (−0.2242 + 0.7523j) |
| 809 | (0.2184 − 1.4989j) | (0.3557 − 0.4498j) | (−0.2242 − 0.1607j) |
| 810 | (−0.1557 − 0.9979j) | (−0.3557 + 0.4498j) | (−0.2242 + 0.6629j) |
| 811 | (−0.2305 − 1.4971j) | (−0.3557 − 0.4498j) | (−0.2242 − 0.0944j) |
| 812 | (0.2392 − 0.984j) | (0.3098 + 0.4844j) | (−0.2242 + 0.3594j) |
| 813 | (0.3623 − 1.4708j) | (0.3098 − 0.4844j) | (−0.2242 + 0.1597j) |
| 814 | (−0.2536 − 0.981j) | (−0.3098 + 0.4844j) | (−0.2242 + 0.4297j) |
| 815 | (−0.3706 − 1.4687j) | (−0.3098 − 0.4844j) | (−0.2242 + 0.0937j) |
| 816 | (0.0449 − 1.0969j) | (0.3069 + 0.3625j) | (−0.2242 + 0.9504j) |
| 817 | (0.0641 − 1.3898j) | (0.3069 − 0.3625j) | (−0.2242 − 0.2918j) |
| 818 | (−0.0605 − 1.0926j) | (−0.3069 + 0.3625j) | (−0.2242 + 1.3347j) |
| 819 | (−0.0755 − 1.3893j) | (−0.3069 − 0.3625j) | (−0.2242 − 0.503j) |
| 820 | (0.3587 − 1.0333j) | (0.2448 + 0.4128j) | (−0.2242 − 0.946j) |
| 821 | (0.4569 − 1.3142j) | (0.2448 − 0.4128j) | (−0.2242 − 0.8449j) |
| 822 | (−0.378 − 1.0328j) | (−0.2448 + 0.4128j) | (−0.2242 − 1.331j) |
| 823 | (−0.4736 − 1.3082j) | (−0.2448 − 0.4128j) | (−0.2242 − 0.5804j) |
| 824 | (0.0429 − 1.0191j) | (0.2662 + 0.3202j) | (−0.2242 + 0.8462j) |
| 825 | (0.0686 − 1.5132j) | (0.2662 − 0.3202j) | (−0.2242 − 0.2242j) |
| 826 | (−0.0648 − 1.0092j) | (−0.2662 + 0.3202j) | (−0.2242 + 0.5805j) |
| 827 | (−0.0795 − 1.5126j) | (−0.2662 − 0.3202j) | (−0.2242 − 0.0332j) |
| 828 | (0.3307 − 0.9507j) | (0.2125 + 0.367j) | (−0.2242 + 0.2916j) |
| 829 | (0.5016 − 1.4293j) | (0.2125 − 0.367j) | (−0.2242 + 0.2239j) |
| 830 | (−0.3502 − 0.9508j) | (−0.2125 + 0.367j) | (−0.2242 + 0.5035j) |
| 831 | (−0.5177 − 1.4235j) | (−0.2125 − 0.367j) | (−0.2242 + 0.0328j) |
| 832 | (1.0784 + 0.1597j) | (0.1893 + 0.1475j) | (0.5805 + 1.0626j) |
| 833 | (1.2742 + 0.1847j) | (0.1893 − 0.1475j) | (0.5805 − 0.3591j) |
| 834 | (−1.0825 + 0.1662j) | (−0.1893 + 0.1475j) | (0.5805 + 1.1878j) |
| 835 | (−1.3752 + 0.2111j) | (−0.1893 − 0.1475j) | (0.5805 − 0.4301j) |
| 836 | (1.0563 + 0.2659j) | (0.2314 + 0.0941j) | (0.5805 − 1.058j) |
| 837 | (1.2502 + 0.3076j) | (0.2314 − 0.0941j) | (0.5805 − 0.7494j) |
| 838 | (−1.0638 + 0.2757j) | (−0.2314 + 0.0941j) | (0.5805 − 1.1847j) |
| 839 | (−1.3486 + 0.3422j) | (−0.2314 − 0.0941j) | (0.5805 − 0.6628j) |
| 840 | (0.9951 + 0.1479j) | (0.1398 + 0.0991j) | (0.5805 + 0.7523j) |
| 841 | (1.3773 + 0.1969j) | (0.1398 − 0.0991j) | (0.5805 − 0.1607j) |
| 842 | (−1.0058 + 0.1556j) | (−0.1398 + 0.0991j) | (0.5805 + 0.6629j) |
| 843 | (−1.4969 + 0.2316j) | (−0.1398 − 0.0991j) | (0.5805 − 0.0944j) |
| 844 | (0.9768 + 0.245j) | (0.1843 + 0.0666j) | (0.5805 + 0.3594j) |
| 845 | (1.3521 + 0.3281j) | (0.1843 − 0.0666j) | (0.5805 + 0.1597j) |
| 846 | (−0.9837 + 0.2569j) | (−0.1843 + 0.0666j) | (0.5805 + 0.4297j) |
| 847 | (−1.4666 + 0.3789j) | (−0.1843 − 0.0666j) | (0.5805 + 0.0937j) |
| 848 | (1.0838 + 0.0529j) | (0.2352 + 0.1848j) | (0.5805 + 0.9504j) |
| 849 | (1.2863 + 0.0567j) | (0.2352 − 0.1848j) | (0.5805 − 0.2918j) |
| 850 | (−1.0962 + 0.0587j) | (−0.2352 + 0.1848j) | (0.5805 + 1.3347j) |
| 851 | (−1.3895 + 0.0714j) | (−0.2352 − 0.1848j) | (0.5805 − 0.503j) |
| 852 | (1.0289 + 0.3656j) | (0.2771 + 0.1258j) | (0.5805 − 0.946j) |
| 853 | (1.2154 + 0.4249j) | (0.2771 − 0.1258j) | (0.5805 − 0.8449j) |
| 854 | (−1.0295 + 0.3802j) | (−0.2771 + 0.1258j) | (0.5805 − 1.331j) |
| 855 | (−1.3075 + 0.4757j) | (−0.2771 − 0.1258j) | (0.5805 − 0.5804j) |
| 856 | (1.006 + 0.0523j) | (0.2763 + 0.2225j) | (0.5805 + 0.8462j) |
| 857 | (1.39 + 0.0615j) | (0.2763 − 0.2225j) | (0.5805 − 0.2242j) |
| 858 | (−1.0152 + 0.0528j) | (−0.2763 + 0.2225j) | (0.5805 + 0.5805j) |
| 859 | (−1.5125 + 0.0817j) | (−0.2763 − 0.2225j) | (0.5805 − 0.0332j) |
| 860 | (0.9507 + 0.3372j) | (0.3242 + 0.1645j) | (0.5805 + 0.2916j) |
| 861 | (1.3152 + 0.454j) | (0.3242 − 0.1645j) | (0.5805 + 0.2239j) |
| 862 | (−0.9467 + 0.3511j) | (−0.3242 + 0.1645j) | (0.5805 + 0.5035j) |
| 863 | (−1.4226 + 0.5201j) | (−0.3242 − 0.1645j) | (0.5805 + 0.0328j) |
| 864 | (1.0752 − 0.1571j) | (0.4086 + 0.3619j) | (−0.0332 + 1.0626j) |
| 865 | (1.2735 − 0.1898j) | (0.4086 − 0.3619j) | (−0.0332 − 0.3591j) |
| 866 | (−1.0862 − 0.1623j) | (−0.4086 + 0.3619j) | (−0.0332 + 1.1878j) |
| 867 | (−1.3769 − 0.1999j) | (−0.4086 − 0.3619j) | (−0.0332 − 0.4301j) |
| 868 | (1.0539 − 0.2656j) | (0.4865 + 0.2669j) | (−0.0332 − 1.058j) |
| 869 | (1.2487 − 0.3136j) | (0.4865 − 0.2669j) | (−0.0332 − 0.7494j) |
| 870 | (−1.0604 − 0.2658j) | (−0.4865 + 0.2669j) | (−0.0332 − 1.1847j) |
| 871 | (−1.3511 − 0.3321j) | (−0.4865 − 0.2669j) | (−0.0332 − 0.6628j) |
| 872 | (0.988 − 0.1488j) | (0.4504 + 0.3557j) | (−0.0332 + 0.7523j) |
| 873 | (1.3763 − 0.2037j) | (0.4504 − 0.3557j) | (−0.0332 − 0.1607j) |
| 874 | (−1.0072 − 0.1479j) | (−0.4504 + 0.3557j) | (−0.0332 + 0.6629j) |
| 875 | (−1.4996 − 0.2134j) | (−0.4504 − 0.3557j) | (−0.0332 − 0.0944j) |
| 876 | (0.9724 − 0.247j) | (0.4847 + 0.3094j) | (−0.0332 + 0.3594j) |
| 877 | (1.3498 − 0.3374j) | (0.4847 − 0.3094j) | (−0.0332 + 0.1597j) |
| 878 | (−0.9882 − 0.2467j) | (−0.4847 + 0.3094j) | (−0.0332 + 0.4297j) |
| 879 | (−1.4708 − 0.3622j) | (−0.4847 − 0.3094j) | (−0.0332 + 0.0937j) |
| 880 | (1.089 − 0.0592j) | (0.363 + 0.3068j) | (−0.0332 + 0.9504j) |
| 881 | (1.2859 − 0.0654j) | (0.363 − 0.3068j) | (−0.0332 − 0.2918j) |
| 882 | (−1.093 − 0.0536j) | (−0.363 + 0.3068j) | (−0.0332 + 1.3347j) |
| 883 | (−1.3899 − 0.0633j) | (−0.363 − 0.3068j) | (−0.0332 − 0.503j) |
| 884 | (1.0253 − 0.3732j) | (0.4129 + 0.2445j) | (−0.0332 − 0.946j) |
| 885 | (1.2132 − 0.4312j) | (0.4129 − 0.2445j) | (−0.0332 − 0.8449j) |
| 886 | (−1.0408 − 0.3706j) | (−0.4129 + 0.2445j) | (−0.0332 − 1.331j) |
| 887 | (−1.3113 − 0.4649j) | (−0.4129 − 0.2445j) | (−0.0332 − 0.5804j) |
| 888 | (1.0092 − 0.0483j) | (0.3205 + 0.2657j) | (−0.0332 + 0.8462j) |
| 889 | (1.3895 − 0.0711j) | (0.3205 − 0.2657j) | (−0.0332 − 0.2242j) |
| 890 | (−1.0172 − 0.0485j) | (−0.3205 + 0.2657j) | (−0.0332 + 0.5805j) |
| 891 | (−1.5133 − 0.0646j) | (−0.3205 − 0.2657j) | (−0.0332 − 0.0332j) |
| 892 | (0.9458 − 0.3399j) | (0.3674 + 0.2122j) | (−0.0332 + 0.2916j) |
| 893 | (1.3103 − 0.4677j) | (0.3674 − 0.2122j) | (−0.0332 + 0.2239j) |
| 894 | (−0.9545 − 0.3424j) | (−0.3674 + 0.2122j) | (−0.0332 + 0.5035j) |
| 895 | (−1.4303 − 0.4985j) | (−0.3674 − 0.2122j) | (−0.0332 + 0.0328j) |
| 896 | (0.6532 + 0.8818j) | (0.8022 + 0.8857j) | (0.2916 + 1.0626j) |
| 897 | (0.7689 + 1.0327j) | (0.8022 − 0.8857j) | (0.2916 − 0.3591j) |
| 898 | (−0.6455 + 0.8871j) | (−0.8022 + 0.8857j) | (0.2916 + 1.1878j) |
| 899 | (−0.8234 + 1.1215j) | (−0.8022 − 0.8857j) | (0.2916 − 0.4301j) |
| 900 | (0.5646 + 0.9425j) | (0.506 + 1.0783j) | (0.2916 − 1.058j) |
| 901 | (0.6666 + 1.1015j) | (0.506 − 1.0783j) | (0.2916 − 0.7494j) |
| 902 | (−0.5563 + 0.9462j) | (−0.506 + 1.0783j) | (0.2916 − 1.1847j) |
| 903 | (−0.7067 + 1.1985j) | (−0.506 − 1.0783j) | (0.2916 − 0.6628j) |
| 904 | (0.6029 + 0.8146j) | (0.7104 + 0.9607j) | (0.2916 + 0.7523j) |
| 905 | (0.9883 + 1.3235j) | (0.7104 − 0.9607j) | (0.2916 − 0.1607j) |
| 906 | (−0.5945 + 0.8251j) | (−0.7104 + 0.9607j) | (0.2916 + 0.6629j) |

| Mapping | NN_QSL | NN_QSC | NN_RSC |
|---|---|---|---|
| 907 | (−0.8944 + 1.2224j) | (−0.7104 − 0.9607j) | (0.2916 − 0.0944j) |
| 908 | (0.5233 + 0.8676j) | (0.6108 + 1.0246j) | (0.2916 + 0.3594j) |
| 909 | (0.8662 + 1.4065j) | (0.6108 − 1.0246j) | (0.2916 + 0.1597j) |
| 910 | (−0.5133 + 0.8727j) | (−0.6108 + 1.0246j) | (0.2916 + 0.4297j) |
| 911 | (−0.7718 + 1.3033j) | (−0.6108 − 1.0246j) | (0.2916 + 0.0937j) |
| 912 | (0.7297 + 0.8077j) | (0.7434 + 0.8215j) | (0.2916 + 0.9504j) |
| 913 | (0.8724 + 0.9469j) | (0.7434 − 0.8215j) | (0.2916 − 0.2918j) |
| 914 | (−0.729 + 0.8128j) | (−0.7434 + 0.8215j) | (0.2916 + 1.3347j) |
| 915 | (−0.929 + 1.0357j) | (−0.7434 − 0.8215j) | (0.2916 − 0.503j) |
| 916 | (0.4763 + 0.9931j) | (0.4684 + 0.9992j) | (0.2916 − 0.946j) |
| 917 | (0.5541 + 1.1622j) | (0.4684 − 0.9992j) | (0.2916 − 0.8449j) |
| 918 | (−0.4616 + 0.9907j) | (−0.4684 + 0.9992j) | (0.2916 − 1.331j) |
| 919 | (−0.5872 + 1.2613j) | (−0.4684 − 0.9992j) | (0.2916 − 0.5804j) |
| 920 | (0.6768 + 0.7481j) | (0.6577 + 0.8905j) | (0.2916 + 0.8462j) |
| 921 | (1.1181 + 1.2159j) | (0.6577 − 0.8905j) | (0.2916 − 0.2242j) |
| 922 | (−0.6755 + 0.7585j) | (−0.6577 + 0.8905j) | (0.2916 + 0.5805j) |
| 923 | (−1.0129 + 1.1262j) | (−0.6577 − 0.8905j) | (0.2916 − 0.0332j) |
| 924 | (0.4387 + 0.9208j) | (0.5657 + 0.9496j) | (0.2916 + 0.2916j) |
| 925 | (0.7372 + 1.4782j) | (0.5657 − 0.9496j) | (0.2916 + 0.2239j) |
| 926 | (−0.4289 + 0.9212j) | (−0.5657 + 0.9496j) | (0.2916 + 0.5035j) |
| 927 | (−0.6488 + 1.3687j) | (−0.5657 − 0.9496j) | (0.2916 + 0.0328j) |
| 928 | (0.6479 − 0.882j) | (0.8652 + 0.9554j) | (0.2239 + 1.0626j) |
| 929 | (0.7639 − 1.0364j) | (0.8652 − 0.9554j) | (0.2239 − 0.3591j) |
| 930 | (−0.6553 − 0.8759j) | (−0.8652 + 0.9554j) | (0.2239 + 1.1878j) |
| 931 | (−0.8344 − 1.1133j) | (−0.8652 − 0.9554j) | (0.2239 − 0.4301j) |
| 932 | (0.5559 − 0.9472j) | (0.5472 + 1.1638j) | (0.2239 − 1.058j) |
| 933 | (0.6621 − 1.1042j) | (0.5472 − 1.1638j) | (0.2239 − 0.7494j) |
| 934 | (−0.5669 − 0.9389j) | (−0.5472 + 1.1638j) | (0.2239 − 1.1847j) |
| 935 | (−0.7239 − 1.1881j) | (−0.5472 − 1.1638j) | (0.2239 − 0.6628j) |
| 936 | (0.5907 − 0.8185j) | (0.7666 + 1.0364j) | (0.2239 + 0.7523j) |
| 937 | (0.9877 − 1.324j) | (0.7666 − 1.0364j) | (0.2239 − 0.1607j) |
| 938 | (−0.6059 − 0.8127j) | (−0.7666 + 1.0364j) | (0.2239 + 0.6629j) |
| 939 | (−0.9008 − 1.2178j) | (−0.7666 − 1.0364j) | (0.2239 − 0.0944j) |
| 940 | (0.5129 − 0.8711j) | (0.6592 + 1.1052j) | (0.2239 + 0.3594j) |
| 941 | (0.8612 − 1.4095j) | (0.6592 − 1.1052j) | (0.2239 + 0.1597j) |
| 942 | (−0.5256 − 0.8663j) | (−0.6592 + 1.1052j) | (0.2239 + 0.4297j) |
| 943 | (−0.7915 − 1.2915j) | (−0.6592 − 1.1052j) | (0.2239 + 0.0937j) |
| 944 | (0.7269 − 0.8184j) | (0.9339 + 1.0315j) | (0.2239 + 0.9504j) |
| 945 | (0.8653 − 0.9534j) | (0.9339 − 1.0315j) | (0.2239 − 0.2918j) |
| 946 | (−0.7372 − 0.807j) | (−0.9339 + 1.0315j) | (0.2239 + 1.3347j) |
| 947 | (−0.9334 − 1.0318j) | (−0.9339 − 1.0315j) | (0.2239 − 0.503j) |
| 948 | (0.4592 − 0.9935j) | (0.5914 + 1.2566j) | (0.2239 − 0.946j) |
| 949 | (0.5837 − 1.263j) | (0.5914 − 1.2566j) | (0.2239 − 0.8449j) |
| 950 | (−0.4801 − 0.9887j) | (−0.5914 + 1.2566j) | (0.2239 − 1.331j) |
| 951 | (−0.6002 − 1.2552j) | (−0.5914 − 1.2566j) | (0.2239 − 0.5804j) |
| 952 | (0.6671 − 0.7639j) | (0.8275 + 1.1188j) | (0.2239 + 0.8462j) |
| 953 | (1.1142 − 1.2194j) | (0.8275 − 1.1188j) | (0.2239 − 0.2242j) |
| 954 | (−0.6836 − 0.744j) | (−0.8275 + 1.1188j) | (0.2239 + 0.5805j) |
| 955 | (−1.0229 − 1.1172j) | (−0.8275 − 1.1188j) | (0.2239 − 0.0332j) |
| 956 | (0.4203 − 0.9175j) | (0.7127 + 1.193j) | (0.2239 + 0.2916j) |
| 957 | (0.7214 − 1.4859j) | (0.7127 − 1.193j) | (0.2239 + 0.2239j) |
| 958 | (−0.4409 − 0.9147j) | (−0.7127 + 1.193j) | (0.2239 + 0.5035j) |
| 959 | (−0.6634 − 1.3617j) | (−0.7127 − 1.193j) | (0.2239 + 0.0328j) |
| 960 | (0.8769 + 0.647j) | (0.8858 + 0.8019j) | (0.5035 + 1.0626j) |
| 961 | (1.0411 + 0.7574j) | (0.8858 − 0.8019j) | (0.5035 − 0.3591j) |
| 962 | (−0.8744 + 0.6624j) | (−0.8858 + 0.8019j) | (0.5035 + 1.1878j) |
| 963 | (−1.1172 + 0.8293j) | (−0.8858 − 0.8019j) | (0.5035 − 0.4301j) |
| 964 | (0.9383 + 0.5578j) | (1.0787 + 0.5061j) | (0.5035 − 1.058j) |
| 965 | (1.1115 + 0.6498j) | (1.0787 − 0.5061j) | (0.5035 − 0.7494j) |
| 966 | (−0.9375 + 0.5721j) | (−1.0787 + 0.5061j) | (0.5035 − 1.1847j) |
| 967 | (−1.1891 + 0.7224j) | (−1.0787 − 0.5061j) | (0.5035 − 0.6628j) |
| 968 | (0.814 + 0.5948j) | (0.9607 + 0.7095j) | (0.5035 + 0.7523j) |
| 969 | (1.1276 + 0.8151j) | (0.9607 − 0.7095j) | (0.5035 − 0.1607j) |
| 970 | (−0.8049 + 0.6104j) | (−0.9607 + 0.7095j) | (0.5035 + 0.6629j) |
| 971 | (−1.2139 + 0.906j) | (−0.9607 − 0.7095j) | (0.5035 − 0.0944j) |
| 972 | (0.8693 + 0.5177j) | (1.025 + 0.6104j) | (0.5035 + 0.3594j) |
| 973 | (1.2028 + 0.6993j) | (1.025 − 0.6104j) | (0.5035 + 0.1597j) |
| 974 | (−0.8649 + 0.528j) | (−1.025 + 0.6104j) | (0.5035 + 0.4297j) |
| 975 | (−1.2958 + 0.7845j) | (−1.025 − 0.6104j) | (0.5035 + 0.0937j) |
| 976 | (0.8089 + 0.7301j) | (0.8214 + 0.7431j) | (0.5035 + 0.9504j) |
| 977 | (0.9582 + 0.86j) | (0.8214 − 0.7431j) | (0.5035 − 0.2918j) |
| 978 | (−0.8061 + 0.7389j) | (−0.8214 + 0.7431j) | (0.5035 + 1.3347j) |
| 979 | (−1.0319 + 0.9333j) | (−0.8214 − 0.7431j) | (0.5035 − 0.503j) |
| 980 | (0.9923 + 0.4623j) | (0.9992 + 0.4681j) | (0.5035 − 0.946j) |
| 981 | (1.1683 + 0.541j) | (0.9992 − 0.4681j) | (0.5035 − 0.8449j) |
| 982 | (−0.9856 + 0.4757j) | (−0.9992 + 0.4681j) | (0.5035 − 1.331j) |
| 983 | (−1.2561 + 0.5982j) | (−0.9992 − 0.4681j) | (0.5035 − 0.5804j) |
| 984 | (0.7466 + 0.6777j) | (0.8906 + 0.6574j) | (0.5035 + 0.8462j) |
| 985 | (1.0453 + 0.9182j) | (0.8906 − 0.6574j) | (0.5035 − 0.2242j) |
| 986 | (−0.7472 + 0.6886j) | (−0.8906 + 0.6574j) | (0.5035 + 0.5805j) |
| 987 | (−1.1228 + 1.0167j) | (−0.8906 − 0.6574j) | (0.5035 − 0.0332j) |
| 988 | (0.9147 + 0.4298j) | (0.9499 + 0.5651j) | (0.5035 + 0.2916j) |
| 989 | (1.2633 + 0.5829j) | (0.9499 − 0.5651j) | (0.5035 − 0.2239j) |
| 990 | (−0.9119 + 0.4417j) | (−0.9499 + 0.5651j) | (0.5035 + 0.5035j) |
| 991 | (−1.3666 + 0.6533j) | (−0.9499 − 0.5651j) | (0.5035 + 0.0328j) |
| 992 | (0.8655 − 0.653j) | (0.9556 + 0.8647j) | (0.0328 + 1.0626j) |
| 993 | (1.0331 − 0.7683j) | (0.9556 − 0.8647j) | (0.0328 − 0.3591j) |
| 994 | (−0.8785 − 0.6522j) | (−0.9556 + 0.8647j) | (0.0328 + 1.1878j) |
| 995 | (−1.1227 − 0.8217j) | (−0.9556 − 0.8647j) | (0.0328 − 0.4301j) |
| 996 | (0.9319 − 0.5627j) | (1.1638 + 0.5473j) | (0.0328 − 1.058j) |
| 997 | (1.1045 − 0.6616j) | (1.1638 − 0.5473j) | (0.0328 − 0.7494j) |
| 998 | (−0.938 − 0.5631j) | (−1.1638 + 0.5473j) | (0.0328 − 1.1847j) |
| 999 | (−1.1945 − 0.7134j) | (−1.1638 − 0.5473j) | (0.0328 − 0.6628j) |
| 1000 | (0.8033 − 0.6019j) | (1.0357 + 0.7657j) | (0.0328 + 0.7523j) |
| 1001 | (1.1238 − 0.8203j) | (1.0357 − 0.7657j) | (0.0328 − 0.1607j) |
| 1002 | (−0.8138 − 0.6023j) | (−1.0357 + 0.7657j) | (0.0328 + 0.6629j) |
| 1003 | (−1.2205 − 0.8971j) | (−1.0357 − 0.7657j) | (0.0328 − 0.0944j) |
| 1004 | (0.8538 − 0.5249j) | (1.1055 + 0.6592j) | (0.0328 + 0.3594j) |
| 1005 | (1.1972 − 0.7089j) | (1.1055 − 0.6592j) | (0.0328 + 0.1597j) |
| 1006 | (−0.8684 − 0.5228j) | (−1.1055 + 0.6592j) | (0.0328 + 0.4297j) |
| 1007 | (−1.3042 − 0.7704j) | (−1.1055 − 0.6592j) | (0.0328 + 0.0937j) |
| 1008 | (0.8025 − 0.7331j) | (1.0309 + 0.9337j) | (0.0328 + 0.9504j) |
| 1009 | (0.9536 − 0.865j) | (1.0309 − 0.9337j) | (0.0328 − 0.2918j) |
| 1010 | (−0.8166 − 0.7338j) | (−1.0309 + 0.9337j) | (0.0328 + 1.3347j) |
| 1011 | (−1.0327 − 0.9324j) | (−1.0309 − 0.9337j) | (0.0328 − 0.503j) |
| 1012 | (0.9794 − 0.4689j) | (1.2567 + 0.5915j) | (0.0328 − 0.946j) |
| 1013 | (1.1627 − 0.5531j) | (1.2567 − 0.5915j) | (0.0328 − 0.8449j) |
| 1014 | (−0.9855 − 0.4624j) | (−1.2567 + 0.5915j) | (0.0328 − 1.331j) |
| 1015 | (−1.2569 − 0.5967j) | (−1.2567 − 0.5915j) | (0.0328 − 0.5804j) |
| 1016 | (0.7398 − 0.6807j) | (1.1183 + 0.8269j) | (0.0328 + 0.8462j) |
| 1017 | (1.0371 − 0.9274j) | (1.1183 − 0.8269j) | (0.0328 − 0.2242j) |
| 1018 | (−0.7514 − 0.6796j) | (−1.1183 + 0.8269j) | (0.0328 + 0.5805j) |
| 1019 | (−1.1271 − 1.0119j) | (−1.1183 − 0.8269j) | (0.0328 − 0.0332j) |
| 1020 | (0.905 − 0.437j) | (1.193 + 0.7123j) | (0.0328 + 0.2916j) |
| 1021 | (1.259 − 0.5921j) | (1.193 − 0.7123j) | (0.0328 + 0.2239j) |
| 1022 | (−0.9134 − 0.4372j) | (−1.193 + 0.7123j) | (0.0328 + 0.5035j) |
| 1023 | (−1.3709 − 0.6442j) | (−1.193 − 0.7123j) | (0.0328 + 0.0328j) |

13. A method, comprising:
   determining configuration information including a signal-to-noise ratio (SNR) and a code rate for use in mapping, based on the SNR, data bits to pre-defined in-phase and quadrature values; and
   transmitting the configuration information,
   wherein the in-phase and quadrature values denote points on a two-dimensional (2D)) space such that optimality of bitwise mutual information is adapted based on the SNR.

14. The method of claim 13, wherein the mapping is according to a constraint selected from one of quadrant symmetry Lagrangian (QSL), quadrant symmetry constraint (QSC), or rectangular structure constraint (RSC).

15. The method of claim 14, wherein the mapping is, for the code rate r equal to one of ⅓ or ¹¹⁄₁₅, according to:

| Mapping | Code Rate, r = 1/3 | Code Rate, r = 11/15 |
|---|---|---|
| 0 | (−0.2097 + 0.3403j) | (0.4907 + 0.0364j) |
| 1 | (−0.8372 + 1.2398j) | (0.733 + 0.0826j) |
| 2 | (0.1936 + 0.3481j) | (1.4016 + 0.2667j) |
| 3 | (0.796 + 1.2854j) | (1.0335 + 0.1572j) |
| 4 | (−0.1939 + 0.3283j) | (−0.0631 − 0.4863j) |
| 5 | (−0.3343 + 1.4425j) | (−0.124 − 0.7262j) |
| 6 | (0.1786 + 0.3361j) | (−0.3216 − 1.3896j) |
| 7 | (0.2682 + 1.4537j) | (−0.209 − 1.0221j) |

-continued

| Mapping | Code Rate, r = 1/3 | Code Rate, r = 11/15 |
|---|---|---|
| 8 | (−0.194 − 0.3509j) | (0.3853 − 0.1957j) |
| 9 | (−0.7978 − 1.2857j) | (0.7104 − 0.2442j) |
| 10 | (0.2062 − 0.3392j) | (1.4333 − 0.2849j) |
| 11 | (0.8574 − 1.2622j) | (1.0537 − 0.2444j) |
| 12 | (−0.1782 − 0.3381j) | (0.1741 − 0.3976j) |
| 13 | (−0.2735 − 1.461j) | (0.2082 − 0.7241j) |
| 14 | (0.1898 − 0.3298j) | (0.223 − 1.4431j) |
| 15 | (0.3312 − 1.4431j) | (0.1977 − 1.0622j) |
| 16 | (−0.3204 + 0.5482j) | (0.0638 + 0.4865j) |
| 17 | (−0.5788 + 0.9226j) | (0.1225 + 0.726j) |
| 18 | (0.298 + 0.5581j) | (0.335 + 1.386j) |
| 19 | (0.5472 + 0.945j) | (0.2155 + 1.0211j) |
| 20 | (−0.2534 + 0.5721j) | (−0.4897 − 0.0399j) |
| 21 | (−0.2862 + 1.0536j) | (−0.7342 − 0.0864j) |
| 22 | (0.2353 + 0.5805j) | (−1.4092 − 0.2568j) |
| 23 | (0.2491 + 1.0588j) | (−1.0349 − 0.1617j) |
| 24 | (−0.2988 − 0.5626j) | (−0.1738 + 0.3927j) |
| 25 | (−0.5412 − 0.9449j) | (−0.2068 + 0.7201j) |
| 26 | (0.317 − 0.5426j) | (−0.2136 + 1.4405j) |
| 27 | (0.5812 − 0.9185j) | (−0.191 + 1.0578j) |
| 28 | (−0.2322 − 0.5813j) | (−0.3854 + 0.1923j) |
| 29 | (−0.2367 − 1.0684j) | (−0.7125 + 0.2403j) |
| 30 | (0.2575 − 0.5657j) | (−1.4237 + 0.2957j) |
| 31 | (0.2906 − 1.0509j) | (−1.0473 + 0.2465j) |
| 32 | (−0.352 + 0.1938j) | (0.3653 + 0.1894j) |
| 33 | (−1.2881 + 0.8197j) | (0.6174 + 0.3805j) |
| 34 | (0.3433 + 0.209j) | (1.196 + 0.7683j) |
| 35 | (1.2595 + 0.8631j) | (0.8805 + 0.5471j) |
| 36 | (−0.3413 + 0.1757j) | (−0.2085 − 0.3501j) |
| 37 | (−1.4694 + 0.2835j) | (−0.4147 − 0.5984j) |
| 38 | (0.3344 + 0.1928j) | (−0.8177 − 1.1683j) |
| 39 | (1.4572 + 0.3276j) | (−0.5933 − 0.8561j) |
| 40 | (−0.3444 − 0.2082j) | (0.171 − 0.0231j) |
| 41 | (−1.251 − 0.8582j) | (0.6615 − 0.4969j) |
| 42 | (0.3506 − 0.192j) | (1.2448 − 0.8446j) |
| 43 | (1.2861 − 0.7998j) | (0.9254 − 0.6516j) |
| 44 | (−0.3322 − 0.1903j) | (0.0127 − 0.1724j) |
| 45 | (−1.4674 − 0.3372j) | (0.4644 − 0.6824j) |
| 46 | (0.3391 − 0.1761j) | (0.7842 − 1.2815j) |
| 47 | (1.4689 − 0.2864j) | (0.606 − 0.9536j) |
| 48 | (−0.5618 + 0.2961j) | (0.2077 + 0.3502j) |
| 49 | (−0.9392 + 0.546j) | (0.4094 + 0.5995j) |
| 50 | (0.548 + 0.3187j) | (0.8246 + 1.1648j) |
| 51 | (0.9214 + 0.5806j) | (0.5941 + 0.8515j) |
| 52 | (−0.5842 + 0.23j) | (−0.3639 − 0.1896j) |
| 53 | (−1.0695 + 0.2436j) | (−0.6211 − 0.3821j) |
| 54 | (0.5732 + 0.2577j) | (−1.2031 − 0.7729j) |
| 55 | (1.0582 + 0.287j) | (−0.8821 − 0.5525j) |
| 56 | (−0.555 − 0.3223j) | (−0.014 + 0.1707j) |
| 57 | (−0.9227 − 0.5751j) | (−0.4624 + 0.6764j) |
| 58 | (0.5616 − 0.2961j) | (−0.7756 + 1.2841j) |
| 59 | (0.9424 − 0.54j) | (−0.5986 + 0.9545j) |
| 60 | (−0.5733 − 0.2549j) | (−0.172 + 0.0203j) |
| 61 | (−1.0611 − 0.28j) | (−0.6556 + 0.4954j) |
| 62 | (0.5797 − 0.2343j) | (−1.2347 + 0.8481j) |
| 63 | (1.0608 − 0.2502j) | (−0.9178 + 0.6516j). |

16. The method of claim 14, wherein the mapping, for the code rate r equal to one of ⅔ or ⅘, is according to:

| Mapping | Code Rate, r = 2/3 | Code Rate, r = 4/5 |
|---|---|---|
| 0 | (−1.0309 − 1.2883j) | (−0.833 − 0.6718j) |
| 1 | (−0.8502 − 1.0541j) | (−0.466 − 1.4825j) |
| 2 | (−1.0467 + 1.2821j) | (−1.0369 − 0.6834j) |
| 3 | (−0.8606 + 1.0438j) | (−0.1292 − 1.5554j) |
| 4 | (−0.1474 − 1.6275j) | (0.8439 − 0.6544j) |
| 5 | (−0.1214 − 1.3269j) | (0.4833 − 1.4678j) |
| 6 | (−0.1645 + 1.6214j) | (1.0517 − 0.6729j) |
| 7 | (−0.1376 + 1.325j) | (0.156 − 1.5533j) |
| 8 | (−0.1555 − 0.262j) | (−0.8424 − 0.6547j) |
| 9 | (−0.2661 − 0.3671j) | (−0.4881 + 1.4648j) |
| 10 | (−0.155 + 0.2545j) | (−1.0446 + 0.6609j) |
| 11 | (−0.2732 + 0.3618j) | (−0.1531 + 1.5416j) |
| 12 | (−0.0753 − 0.275j) | (0.8318 + 0.6704j) |
| 13 | (−0.091 − 0.4666j) | (0.4579 + 1.484j) |
| 14 | (−0.078 + 0.2773j) | (1.0374 + 0.6824j) |
| 15 | (−0.0927 + 0.4628j) | (0.1222 + 1.5554j) |
| 16 | (−1.2646 − 1.06j) | (−0.8114 − 0.8501j) |
| 17 | (−1.0432 − 0.8725j) | (−0.7666 − 1.0495j) |
| 18 | (−1.2775 + 1.044j) | (−1.0158 − 0.8862j) |
| 19 | (−1.0548 + 0.8607j) | (−0.9539 − 1.1302j) |
| 20 | (−1.6439 − 0.1751j) | (0.8213 − 0.8365j) |
| 21 | (−1.3545 − 0.1443j) | (0.7791 − 1.0298j) |
| 22 | (−1.651 + 0.1517j) | (1.0312 − 0.8741j) |
| 23 | (−1.3531 + 0.1252j) | (0.9748 − 1.1142j) |
| 24 | (−0.1967 − 0.1087j) | (−0.8216 − 0.8328j) |
| 25 | (−0.3748 − 0.2021j) | (−0.7772 − 1.0261j) |
| 26 | (−0.1918 + 0.0992j) | (−1.0317 + 0.8669j) |
| 27 | (−0.3822 + 0.194j) | (−0.9709 + 1.1098j) |
| 28 | (−0.1197 − 0.0802j) | (0.8112 + 0.8548j) |
| 29 | (−0.4481 − 0.0819j) | (0.7651 + 1.0524j) |
| 30 | (−0.12 + 0.0763j) | (1.0165 + 0.8875j) |
| 31 | (−0.4437 + 0.0772j) | (0.9567 + 1.1338j) |
| 32 | (−0.7569 − 1.458j) | (−0.6551 − 0.6444j) |
| 33 | (−0.627 − 1.1912j) | (−0.5403 − 1.2205j) |
| 34 | (−0.7746 + 1.4527j) | (−1.2652 − 0.6149j) |
| 35 | (−0.6386 + 1.1796j) | (−0.7555 − 1.3569j) |
| 36 | (−0.4559 − 1.5578j) | (0.6635 − 0.6314j) |
| 37 | (−0.3829 − 1.283j) | (0.5625 − 1.2117j) |
| 38 | (−0.4772 + 1.5703j) | (1.2766 − 0.5888j) |
| 39 | (−0.3963 + 1.277j) | (0.7747 − 1.3429j) |
| 40 | (−0.1525 − 0.2635j) | (−0.6639 + 0.6303j) |
| 41 | (−0.2593 − 0.3793j) | (−0.5648 + 1.2103j) |
| 42 | (−0.1547 + 0.2555j) | (−1.2769 + 0.5883j) |
| 43 | (−0.2609 + 0.3724j) | (−0.7756 + 1.3405j) |
| 44 | (−0.0769 − 0.2775j) | (0.6564 + 0.6447j) |
| 45 | (−0.1068 − 0.4558j) | (0.5407 + 1.215j) |
| 46 | (−0.0812 + 0.2744j) | (1.2701 + 0.6103j) |
| 47 | (−0.1137 + 0.4524j) | (0.747 + 1.3553j) |
| 48 | (−1.4505 − 0.7934j) | (−0.6293 − 0.8119j) |
| 49 | (−1.1915 − 0.6534j) | (−0.5831 − 1.0052j) |
| 50 | (−1.4599 + 0.7759j) | (−1.2756 − 0.8434j) |
| 51 | (−1.1996 + 0.6368j) | (−1.2068 − 1.11j) |
| 52 | (−1.5785 − 0.4933j) | (0.6368 − 0.7976j) |
| 53 | (−1.2964 − 0.4059j) | (0.5969 − 0.9978j) |
| 54 | (−1.5821 + 0.4758j) | (1.2987 − 0.8262j) |
| 55 | (−1.2979 + 0.3889j) | (1.2221 − 1.0854j) |
| 56 | (−0.1926 − 0.1051j) | (−0.6437 + 0.804j) |
| 57 | (−0.3861 − 0.1959j) | (−0.6002 + 0.9983j) |
| 58 | (−0.2046 + 0.1038j) | (−1.2932 + 0.8204j) |
| 59 | (−0.394 + 0.2j) | (−1.2228 + 1.0901j) |
| 60 | (−0.1165 − 0.0829j) | (0.6281 + 0.8169j) |
| 61 | (−0.4419 − 0.0868j) | (0.5847 + 1.0103j) |
| 62 | (−0.1181 − 0.0789j) | (1.2836 + 0.8439j) |
| 63 | (−0.4446 + 0.0838j) | (1.205 + 1.104j) |
| 64 | (1.044 − 1.2792j) | (−0.834 − 0.5001j) |
| 65 | (0.8595 − 1.0416j) | (−0.8212 − 0.0749j) |
| 66 | (1.0288 + 1.2916j) | (−1.0203 − 0.5063j) |
| 67 | (0.8507 + 1.0572j) | (−0.997 − 0.0718j) |
| 68 | (0.168 − 1.6223j) | (0.8488 − 0.4913j) |
| 69 | (0.1391 − 1.3292j) | (0.8268 − 0.0627j) |
| 70 | (0.1467 + 1.6274j) | (1.0382 − 0.4922j) |
| 71 | (0.1258 + 1.3281j) | (1.0046 − 0.0538j) |
| 72 | (0.1596 − 0.2514j) | (−0.8417 + 0.4859j) |
| 73 | (0.2775 − 0.3696j) | (−0.8241 + 0.0628j) |
| 74 | (0.1528 + 0.2603j) | (−1.0297 + 0.4872j) |
| 75 | (0.2684 + 0.3683j) | (−0.9937 + 0.0545j) |
| 76 | (0.0786 − 0.2741j) | (0.8344 + 0.5052j) |
| 77 | (0.0952 − 0.4566j) | (0.8255 + 0.0768j) |
| 78 | (0.0802 + 0.2772j) | (1.023 + 0.5086j) |
| 79 | (0.0933 + 0.4616j) | (0.996 + 0.0707j) |
| 80 | (1.2775 − 1.0482j) | (−0.8367 − 0.3491j) |
| 81 | (1.0545 − 0.8602j) | (−0.8306 − 0.2127j) |
| 82 | (1.2616 + 1.0617j) | (−1.0358 − 0.3495j) |
| 83 | (1.0381 + 0.8704j) | (−1.0319 − 0.1928j) |
| 84 | (1.6461 − 0.1553j) | (0.8423 − 0.3354j) |
| 85 | (1.3551 − 0.1273j) | (0.8375 − 0.2003j) |
| 86 | (1.6492 + 0.174j) | (1.0431 − 0.3346j) |
| 87 | (1.3493 + 0.1466j) | (1.0385 − 0.1789j) |
| 88 | (0.1982 − 0.1043j) | (−0.8433 + 0.3323j) |
| 89 | (0.3859 − 0.1988j) | (−0.8386 + 0.1982j) |

| Mapping | Code Rate, r = 2/3 | Code Rate, r = 4/5 | Mapping | Code Rate, r = 2/3 | Code Rate, r = 4/5 |
| --- | --- | --- | --- | --- | --- |
| 90 | (0.1948 + 0.1048j) | (−1.0436 + 0.3294j) | 167 | (−0.3357 + 1.0624j) | (0.1164 − 1.0996j) |
| 91 | (0.3772 + 0.2009j) | (−1.0397 + 0.1798j) | 168 | (−0.3952 − 0.6655j) | (−0.5035 + 0.6025j) |
| 92 | (0.1226 − 0.08j) | (0.8388 + 0.3504j) | 169 | (−0.3406 − 0.5227j) | (−0.3414 + 1.1211j) |
| 93 | (0.4501 − 0.0802j) | (0.8329 + 0.2123j) | 170 | (−0.4004 + 0.6579j) | (−0.073 + 0.5639j) |
| 94 | (0.1137 + 0.076j) | (1.0448 + 0.3499j) | 171 | (−0.344 + 0.5158j) | (−0.1216 + 1.1005j) |
| 95 | (0.4515 + 0.0848j) | (1.0381 + 0.1965j) | 172 | (−0.2179 − 0.7465j) | (0.4932 + 0.612j) |
| 96 | (0.7693 − 1.4481j) | (−0.6673 − 0.4924j) | 173 | (−0.1619 − 0.613j) | (0.3197 + 1.1293j) |
| 97 | (0.6373 − 1.1841j) | (−0.6625 − 0.072j) | 174 | (−0.2257 + 0.7407j) | (0.0628 + 0.5591j) |
| 98 | (0.7545 + 1.4609j) | (−1.4663 − 0.4376j) | 175 | (−0.1663 + 0.6071j) | (0.0984 + 1.0998j) |
| 99 | (0.6254 + 1.1911j) | (−1.4811 − 0.1441j) | 176 | (−0.8432 − 0.4615j) | (−0.4759 − 0.7767j) |
| 100 | (0.4742 − 1.5629j) | (0.6726 − 0.4751j) | 177 | (−0.9992 − 0.5457j) | (−0.4226 − 0.961j) |
| 101 | (0.3951 − 1.2742j) | (0.6643 − 0.0629j) | 178 | (−0.8513 + 0.4563j) | (−0.0545 − 0.7211j) |
| 102 | (0.4549 + 1.5735j) | (1.4775 − 0.4139j) | 179 | (−1.0027 + 0.5337j) | (−0.0625 − 0.9204j) |
| 103 | (0.3825 + 1.2824j) | (1.4891 − 0.127j) | 180 | (−0.9271 − 0.2802j) | (0.487 − 0.7678j) |
| 104 | (0.1616 − 0.2614j) | (−0.6704 + 0.4743j) | 181 | (−1.0898 − 0.3382j) | (0.4409 − 0.9567j) |
| 105 | (0.2623 − 0.3739j) | (−0.6565 + 0.065j) | 182 | (−0.9279 + 0.2705j) | (0.0662 − 0.7211j) |
| 106 | (0.1531 + 0.2616j) | (−1.4695 + 0.4071j) | 183 | (−1.0956 + 0.3271j) | (0.0766 − 0.9222j) |
| 107 | (0.2555 + 0.3781j) | (−1.4837 + 0.1219j) | 184 | (−0.6893 − 0.3855j) | (−0.49 + 0.7663j) |
| 108 | (0.0813 − 0.2736j) | (0.6645 + 0.4893j) | 185 | (−0.5386 − 0.3113j) | (−0.439 + 0.9536j) |
| 109 | (0.1158 − 0.4563j) | (0.6641 + 0.0743j) | 186 | (−0.6925 + 0.3774j) | (−0.0673 + 0.7196j) |
| 110 | (0.0803 + 0.2742j) | (1.4647 + 0.4351j) | 187 | (−0.5459 + 0.303j) | (−0.0782 + 0.9219j) |
| 111 | (0.1097 + 0.4545j) | (1.4832 + 0.1473j) | 188 | (−0.7697 − 0.2125j) | (0.4742 + 0.774j) |
| 112 | (1.464 − 0.778j) | (−0.6648 − 0.3425j) | 189 | (−0.6195 − 0.1445j) | (0.4222 + 0.959j) |
| 113 | (1.2006 − 0.6389j) | (−0.6658 − 0.2057j) | 190 | (−0.7733 + 0.2059j) | (0.0566 + 0.7256j) |
| 114 | (1.4524 + 0.7969j) | (−1.2418 − 0.3367j) | 191 | (−0.6181 + 0.139j) | (0.0591 + 0.9217j) |
| 115 | (1.189 + 0.6528j) | (−1.2427 − 0.1189j) | 192 | (0.6147 − 0.7308j) | (−0.3488 − 0.4502j) |
| 116 | (1.5838 − 0.4742j) | (0.6711 − 0.3333j) | 193 | (0.7226 − 0.8647j) | (−0.3681 − 0.0663j) |
| 117 | (1.3004 − 0.3897j) | (0.6683 − 0.1985j) | 194 | (0.6019 + 0.737j) | (−0.2044 − 0.4357j) |
| 118 | (1.581 + 0.4938j) | (1.2527 − 0.3187j) | 195 | (0.7121 + 0.8745j) | (−0.2162 − 0.0601j) |
| 119 | (1.2996 + 0.408j) | (1.2424 − 0.0953j) | 196 | (0.1067 − 0.9378j) | (0.3578 − 0.4463j) |
| 120 | (0.1985 − 0.1041j) | (−0.6691 + 0.331j) | 197 | (0.1198 − 1.1044j) | (0.3589 − 0.0613j) |
| 121 | (0.3847 − 0.1915j) | (−0.6655 + 0.1958j) | 198 | (0.0973 + 0.9358j) | (0.2127 − 0.4358j) |
| 122 | (0.1946 + 0.1041j) | (−1.2532 + 0.3148j) | 199 | (0.1074 + 1.1064j) | (0.219 − 0.0588j) |
| 123 | (0.3839 + 0.1962j) | (−1.2427 + 0.0971j) | 200 | (0.4999 − 0.5998j) | (−0.3584 − 0.4476j) |
| 124 | (0.1191 − 0.0776j) | (0.6663 + 0.3461j) | 201 | (0.3925 − 0.4818j) | (−0.3635 − 0.0628j) |
| 125 | (0.4508 − 0.0861j) | (0.6642 + 0.2081j) | 202 | (0.4906 + 0.6037j) | (−0.2118 − 0.4348j) |
| 126 | (0.1167 + 0.0799j) | (1.2465 + 0.3391j) | 203 | (0.3846 + 0.484j) | (−0.2172 − 0.0603j) |
| 127 | (0.4443 + 0.0901j) | (1.2407 + 0.1196j) | 204 | (0.1019 − 0.7708j) | (0.3513 + 0.4528j) |
| 128 | (−0.6035 − 0.7372j) | (−0.3426 − 0.5924j) | 205 | (0.0992 − 0.6236j) | (0.3634 + 0.0671j) |
| 129 | (−0.7155 − 0.8765j) | (−0.2948 − 1.317j) | 206 | (0.0958 + 0.7708j) | (0.202 + 0.4379j) |
| 130 | (−0.6096 + 0.728j) | (−0.1952 − 0.5751j) | 207 | (0.0927 + 0.6249j) | (0.2195 + 0.0627j) |
| 131 | (−0.722 + 0.8656j) | (−0.095 − 1.3018j) | 208 | (0.7555 − 0.5917j) | (−0.3572 − 0.3189j) |
| 132 | (−0.0972 − 0.9395j) | (0.3513 − 0.5857j) | 209 | (0.8805 − 0.715j) | (−0.3645 − 0.1912j) |
| 133 | (−0.1068 − 1.1062j) | (0.3113 − 1.3081j) | 210 | (0.7434 + 0.6016j) | (−0.2071 − 0.3094j) |
| 134 | (−0.1056 + 0.9375j) | (0.2063 − 0.5717j) | 211 | (0.8701 + 0.7261j) | (−0.2152 − 0.1813j) |
| 135 | (−0.117 + 1.1098j) | (0.1108 − 1.3018j) | 212 | (0.9663 − 0.0933j) | (0.3612 − 0.3139j) |
| 136 | (−0.4901 − 0.6017j) | (−0.352 + 0.5866j) | 213 | (1.1382 − 0.1046j) | (0.3637 − 0.1844j) |
| 137 | (−0.3868 − 0.4884j) | (−0.3127 + 1.3081j) | 214 | (0.9617 + 0.1077j) | (0.2159 − 0.3054j) |
| 138 | (−0.4948 + 0.5952j) | (−0.2069 + 0.5749j) | 215 | (1.1339 + 0.1207j) | (0.2181 − 0.1782j) |
| 139 | (−0.389 + 0.4809j) | (−0.1122 + 1.2975j) | 216 | (0.6318 − 0.4615j) | (−0.3602 − 0.3131j) |
| 140 | (−0.092 − 0.7733j) | (0.3472 + 0.5924j) | 217 | (0.525 − 0.3414j) | (−0.361 + 0.1865j) |
| 141 | (−0.0898 − 0.6254j) | (0.2899 + 1.3204j) | 218 | (0.6265 + 0.4726j) | (−0.2146 + 0.3078j) |
| 142 | (−0.1033 + 0.7706j) | (0.196 + 0.5779j) | 219 | (0.5164 + 0.3477j) | (−0.2214 + 0.187j) |
| 143 | (−0.099 + 0.6252j) | (0.0884 + 1.3025j) | 220 | (0.795 − 0.0914j) | (0.3586 + 0.3214j) |
| 144 | (−0.7442 − 0.6004j) | (−0.3296 − 0.7415j) | 221 | (0.6293 − 0.0901j) | (0.3616 + 0.1939j) |
| 145 | (−0.8755 − 0.7254j) | (−0.2982 − 0.8937j) | 222 | (0.7951 + 0.0982j) | (0.2086 + 0.3082j) |
| 146 | (−0.7527 + 0.5925j) | (−0.1843 − 0.722j) | 223 | (0.6326 + 0.1012j) | (0.2147 + 0.1801j) |
| 147 | (−0.8812 + 0.7162j) | (−0.1784 − 0.8835j) | 224 | (0.4667 − 0.8203j) | (−0.4985 − 0.4678j) |
| 148 | (−0.9662 − 0.1059j) | (0.3428 − 0.7309j) | 225 | (0.5406 − 0.9826j) | (−0.5089 − 0.0659j) |
| 149 | (−1.1316 − 0.1181j) | (0.3163 − 0.8929j) | 226 | (0.4585 + 0.827j) | (−0.0658 − 0.4274j) |
| 150 | (−0.9633 + 0.0941j) | (0.1964 − 0.7202j) | 227 | (0.5299 + 0.9888j) | (−0.0741 − 0.0613j) |
| 151 | (−1.1364 + 0.1062j) | (0.1902 − 0.8809j) | 228 | (0.2871 − 0.902j) | (0.5103 − 0.4618j) |
| 152 | (−0.6278 − 0.4704j) | (−0.3444 + 0.7346j) | 229 | (0.3345 − 1.0594j) | (0.5132 − 0.0606j) |
| 153 | (−0.5174 − 0.3498j) | (−0.3167 + 0.8895j) | 230 | (0.2773 + 0.8994j) | (0.0681 − 0.4285j) |
| 154 | (−0.6352 + 0.4622j) | (−0.1963 + 0.7189j) | 231 | (0.3241 + 1.0686j) | (0.0758 − 0.0607j) |
| 155 | (−0.5174 + 0.3423j) | (−0.1927 + 0.8775j) | 232 | (0.4021 − 0.6614j) | (−0.5094 − 0.4606j) |
| 156 | (−0.7918 − 0.1017j) | (0.328 + 0.7406j) | 233 | (0.3489 − 0.5163j) | (−0.5092 − 0.0609j) |
| 157 | (−0.6303 − 0.101j) | (0.2989 + 0.8936j) | 234 | (0.3966 − 0.6663j) | (−0.073 + 0.4284j) |
| 158 | (−0.7784 + 0.0789j) | (0.1823 + 0.7228j) | 235 | (0.3383 + 0.5148j) | (−0.068 + 0.0594j) |
| 159 | (−0.6302 + 0.0919j) | (0.1725 + 0.8831j) | 236 | (0.2267 − 0.7435j) | (0.5029 + 0.4687j) |
| 160 | (−0.4587 − 0.8301j) | (−0.4947 − 0.6114j) | 237 | (0.1686 − 0.6051j) | (0.5118 + 0.0715j) |
| 161 | (−0.5311 − 0.9906j) | (−0.3248 − 1.1294j) | 238 | (0.217 − 0.7431j) | (0.0645 + 0.4234j) |
| 162 | (−0.4685 + 0.821j) | (−0.061 − 0.566j) | 239 | (0.1593 + 0.6089j) | (0.075 + 0.0621j) |
| 163 | (−0.5439 + 0.9794j) | (−0.0995 − 1.1051j) | 240 | (0.8506 − 0.4537j) | (−0.5062 − 0.3344j) |
| 164 | (−0.2781 − 0.9041j) | (0.5007 − 0.6053j) | 241 | (1.003 − 0.532j) | (−0.5069 − 0.2014j) |
| 165 | (−0.3272 − 1.0694j) | (0.3383 − 1.1214j) | 242 | (0.8401 + 0.4644j) | (−0.0709 − 0.3015j) |
| 166 | (−0.287 + 0.9011j) | (0.0701 − 0.5642j) | 243 | (0.9958 + 0.5484j) | (−0.0716 − 0.1761j) |

| Mapping | Code Rate, r = 2/3 | Code Rate, r = 4/5 |
|---|---|---|
| 244 | (0.9293 − 0.2696j) | (0.5109 − 0.3256j) |
| 245 | (1.0919 − 0.3262j) | (0.5134 − 0.1941j) |
| 246 | (0.9291 + 0.2847j) | (0.0739 − 0.3015j) |
| 247 | (1.0848 + 0.3413j) | (0.0733 − 0.1766j) |
| 248 | (0.6916 − 0.3755j) | (−0.5106 + 0.3233j) |
| 249 | (0.5505 − 0.305j) | (−0.5106 + 0.1935j) |
| 250 | (0.6919 + 0.3891j) | (−0.0733 + 0.2979j) |
| 251 | (0.5408 + 0.309j) | (−0.0729 + 0.1793j) |
| 252 | (0.7709 − 0.201j) | (0.5078 + 0.3338j) |
| 253 | (0.6217 − 0.139j) | (0.5098 + 0.2009j) |
| 254 | (0.7696 + 0.216j) | (0.0676 + 0.3007j) |
| 255 | (0.616 + 0.1473j) | (0.0729 + 0.1779j). |

17. The method of claim 14, wherein the mapping is, for one of a neural network subject to the QSL constraint (NN_QSL), a neural network subject to the QSC constraint (NN_QSC), or a neural network subject to the RSC constraint (NN_RSC), according to:

| Mapping | NN_QSL | NN_QSC | NN_RSC |
|---|---|---|---|
| 0 | (−0.4436 + 0.1629j) | (0.1882 + 0.0524j) | (−0.3051 − 0.3051j) |
| 1 | (−0.3972 + 0.9864j) | (0.1882 − 0.0524j) | (−0.3051 − 0.3045j) |
| 2 | (−0.4398 + 0.2783j) | (−0.1882 + 0.0524j) | (−0.3051 − 0.7193j) |
| 3 | (−0.4297 + 0.6732j) | (−0.1882 − 0.0524j) | (−0.3051 − 0.7851j) |
| 4 | (−0.0602 + 0.1666j) | (0.1889 + 0.0525j) | (−0.3051 + 0.3039j) |
| 5 | (−0.0498 + 0.8944j) | (0.1889 − 0.0525j) | (−0.3051 + 0.3027j) |
| 6 | (−0.0583 + 0.283j) | (−0.1889 + 0.0525j) | (−0.3051 + 0.7189j) |
| 7 | (−0.0629 + 0.6689j) | (−0.1889 − 0.0525j) | (−0.3051 + 0.7866j) |
| 8 | (−0.4539 + 0.1628j) | (0.1383 + 0.3806j) | (−0.3051 − 0.4316j) |
| 9 | (−0.4065 + 0.8715j) | (0.1383 − 0.3806j) | (−0.3051 − 0.4374j) |
| 10 | (−0.4512 + 0.2785j) | (−0.1383 + 0.3806j) | (−0.3051 − 0.5905j) |
| 11 | (−0.4253 + 0.7369j) | (−0.1383 − 0.3806j) | (−0.3051 − 0.5662j) |
| 12 | (−0.0591 + 0.1668j) | (0.1413 + 0.3788j) | (−0.3051 + 0.4309j) |
| 13 | (−0.0678 + 0.8242j) | (0.1413 − 0.3788j) | (−0.3051 + 0.4375j) |
| 14 | (−0.0612 + 0.2851j) | (−0.1413 + 0.3788j) | (−0.3051 + 0.5905j) |
| 15 | (−0.063 + 0.7017j) | (−0.1413 − 0.3788j) | (−0.3051 + 0.5676j) |
| 16 | (−0.4427 + 0.1627j) | (1.1863 + 0.2942j) | (−0.3051 − 0.1795j) |
| 17 | (−0.4016 + 0.994j) | (1.1863 − 0.2942j) | (−0.3051 − 0.1792j) |
| 18 | (−0.4387 + 0.2802j) | (−1.1863 + 0.2942j) | (−0.3051 − 1.0559j) |
| 19 | (−0.4308 + 0.6764j) | (−1.1863 − 0.2942j) | (−0.3051 − 0.919j) |
| 20 | (−0.0611 + 0.1684j) | (1.149 + 0.406j) | (−0.3051 + 0.1794j) |
| 21 | (−0.0514 + 0.8961j) | (1.149 − 0.406j) | (−0.3051 + 0.1796j) |
| 22 | (−0.0619 + 0.284j) | (−1.149 + 0.406j) | (−0.3051 + 1.0561j) |
| 23 | (−0.0595 + 0.668j) | (−1.149 − 0.406j) | (−0.3051 + 0.9201j) |
| 24 | (−0.4556 + 0.162j) | (0.2812 + 1.0761j) | (−0.3051 − 0.0609j) |
| 25 | (−0.4051 + 0.8665j) | (0.2812 − 1.0761j) | (−0.3051 − 0.0607j) |
| 26 | (−0.4501 + 0.2784j) | (−0.2812 + 1.0761j) | (−0.3051 − 1.2271j) |
| 27 | (−0.4242 + 0.7339j) | (−0.2812 − 1.0761j) | (−0.3051 − 1.4453j) |
| 28 | (−0.0613 + 0.1682j) | (0.3918 + 1.0585j) | (−0.3051 + 0.0601j) |
| 29 | (−0.0681 + 0.8258j) | (0.3918 − 1.0585j) | (−0.3051 + 0.0601j) |
| 30 | (−0.0614 + 0.2838j) | (−0.3918 + 1.0585j) | (−0.3051 + 1.228j) |
| 31 | (−0.0642 + 0.7042j) | (−0.3918 − 1.0585j) | (−0.3051 + 1.4486j) |
| 32 | (−0.4433 + 0.0562j) | (0.0634 + 0.052j) | (−0.3045 − 0.3051j) |
| 33 | (−0.3879 + 1.1503j) | (0.0634 − 0.052j) | (−0.3045 − 0.3045j) |
| 34 | (−0.4381 + 0.3983j) | (−0.0634 + 0.052j) | (−0.3045 − 0.7193j) |
| 35 | (−0.4351 + 0.544j) | (−0.0634 − 0.052j) | (−0.3045 − 0.7851j) |
| 36 | (−0.0617 + 0.0568j) | (0.0626 + 0.052j) | (−0.3045 + 0.3039j) |
| 37 | (−0.0842 + 1.6424j) | (0.0626 − 0.052j) | (−0.3045 + 0.3027j) |
| 38 | (−0.0612 + 0.4045j) | (−0.0626 + 0.052j) | (−0.3045 + 0.7189j) |
| 39 | (−0.063 + 0.5411j) | (−0.0626 − 0.052j) | (−0.3045 + 0.7866j) |
| 40 | (−0.4568 + 0.0559j) | (0.0483 + 0.3828j) | (−0.3045 − 0.4316j) |
| 41 | (−0.3739 + 1.2957j) | (0.0483 − 0.3828j) | (−0.3045 − 0.4374j) |
| 42 | (−0.4457 + 0.3965j) | (−0.0483 + 0.3828j) | (−0.3045 − 0.5905j) |
| 43 | (−0.438 + 0.5248j) | (−0.0483 − 0.3828j) | (−0.3045 − 0.5662j) |
| 44 | (−0.0621 + 0.0574j) | (0.0465 + 0.383j) | (−0.3045 + 0.4309j) |
| 45 | (−0.0719 + 1.4634j) | (0.0465 − 0.383j) | (−0.3045 + 0.4375j) |
| 46 | (−0.0624 + 0.4067j) | (−0.0465 + 0.383j) | (−0.3045 + 0.5905j) |
| 47 | (−0.0623 + 0.5313j) | (−0.0465 − 0.383j) | (−0.3045 + 0.5676j) |
| 48 | (−0.4439 + 0.0559j) | (1.2119 + 0.1779j) | (−0.3045 − 0.1795j) |
| 49 | (−0.388 + 1.1192j) | (1.2119 − 0.1779j) | (−0.3045 − 0.1792j) |
| 50 | (−0.4354 + 0.3947j) | (−1.2119 + 0.1779j) | (−0.3045 − 1.0559j) |
| 51 | (−0.4355 + 0.5456j) | (−1.2119 − 0.1779j) | (−0.3045 − 0.919j) |
| 52 | (−0.0614 + 0.058j) | (1.2248 + 0.0595j) | (−0.3045 + 0.1794j) |
| 53 | (−0.266 + 1.6246j) | (1.2248 − 0.0595j) | (−0.3045 + 0.1796j) |
| 54 | (−0.0612 + 0.4046j) | (−1.2248 + 0.0595j) | (−0.3045 + 1.0561j) |
| 55 | (−0.0626 + 0.5408j) | (−1.2248 − 0.0595j) | (−0.3045 + 0.9201j) |
| 56 | (−0.4569 + 0.055j) | (0.1696 + 1.0853j) | (−0.3045 − 0.0609j) |
| 57 | (−0.3281 + 1.4063j) | (0.1696 − 1.0853j) | (−0.3045 − 0.0607j) |
| 58 | (−0.4444 + 0.3973j) | (−0.1696 + 1.0853j) | (−0.3045 − 1.2271j) |
| 59 | (−0.4386 + 0.5241j) | (−0.1696 − 1.0853j) | (−0.3045 − 1.4453j) |
| 60 | (−0.0617 + 0.0572j) | (0.057 + 1.0886j) | (−0.3045 + 0.0601j) |
| 61 | (−0.2102 + 1.4711j) | (0.057 − 1.0886j) | (−0.3045 + 0.0601j) |

-continued

| Mapping | NN_QSL | NN_QSC | NN_RSC |
|---|---|---|---|
| 62 | (−0.059 + 0.4039j) | (−0.057 + 1.0886j) | (−0.3045 + 1.228j) |
| 63 | (−0.0618 + 0.5322j) | (−0.057 − 1.0886j) | (−0.3045 + 1.4486j) |
| 64 | (−0.3132 + 0.1607j) | (0.3061 + 0.0563j) | (−0.7193 − 0.3051j) |
| 65 | (−0.2576 + 0.9857j) | (0.3061 − 0.0563j) | (−0.7193 − 0.3045j) |
| 66 | (−0.3106 + 0.2787j) | (−0.3061 + 0.0563j) | (−0.7193 − 0.7193j) |
| 67 | (−0.3064 + 0.6693j) | (−0.3061 − 0.0563j) | (−0.7193 − 0.7851j) |
| 68 | (−0.1824 + 0.166j) | (0.306 + 0.0563j) | (−0.7193 + 0.3039j) |
| 69 | (−0.1233 + 0.9671j) | (0.306 − 0.0563j) | (−0.7193 + 0.3027j) |
| 70 | (−0.1819 + 0.2796j) | (−0.306 + 0.0563j) | (−0.7193 + 0.7189j) |
| 71 | (−0.1851 + 0.6654j) | (−0.306 − 0.0563j) | (−0.7193 + 0.7866j) |
| 72 | (−0.3111 + 0.1624j) | (0.1843 + 0.4706j) | (−0.7193 − 0.4316j) |
| 73 | (−0.2822 + 0.8615j) | (0.1843 − 0.4706j) | (−0.7193 − 0.4374j) |
| 74 | (−0.3093 + 0.2794j) | (−0.1843 + 0.4706j) | (−0.7193 − 0.5905j) |
| 75 | (−0.3039 + 0.7217j) | (−0.1843 − 0.4706j) | (−0.7193 − 0.5662j) |
| 76 | (−0.1806 + 0.1652j) | (0.2033 + 0.4579j) | (−0.7193 + 0.4309j) |
| 77 | (−0.1752 + 0.8407j) | (0.2033 − 0.4579j) | (−0.7193 + 0.4375j) |
| 78 | (−0.185 + 0.2805j) | (−0.2033 + 0.4579j) | (−0.7193 + 0.5905j) |
| 79 | (−0.1838 + 0.7066j) | (−0.2033 − 0.4579j) | (−0.7193 + 0.5676j) |
| 80 | (−0.3135 + 0.1615j) | (1.291 + 0.3246j) | (−0.7193 − 0.1795j) |
| 81 | (−0.258 + 0.9839j) | (1.291 − 0.3246j) | (−0.7193 − 0.1792j) |
| 82 | (−0.3122 + 0.2776j) | (−1.291 + 0.3246j) | (−0.7193 − 1.0559j) |
| 83 | (−0.3101 + 0.6718j) | (−1.291 − 0.3246j) | (−0.7193 − 0.919j) |
| 84 | (−0.1822 + 0.1652j) | (1.2498 + 0.4482j) | (−0.7193 + 0.1794j) |
| 85 | (−0.1249 + 0.9632j) | (1.2498 − 0.4482j) | (−0.7193 + 0.1796j) |
| 86 | (−0.1832 + 0.2813j) | (−1.2498 + 0.4482j) | (−0.7193 + 1.0561j) |
| 87 | (−0.1845 + 0.6644j) | (−1.2498 − 0.4482j) | (−0.7193 + 0.9201j) |
| 88 | (−0.3089 + 0.1662j) | (0.2952 + 1.1878j) | (−0.7193 − 0.0609j) |
| 89 | (−0.2832 + 0.8595j) | (0.2952 − 1.1878j) | (−0.7193 − 0.0607j) |
| 90 | (−0.3096 + 0.2789j) | (−0.2952 + 1.1878j) | (−0.7193 − 1.2271j) |
| 91 | (−0.3021 + 0.7201j) | (−0.2952 − 1.1878j) | (−0.7193 − 1.4453j) |
| 92 | (−0.1826 + 0.164j) | (0.4147 + 1.1678j) | (−0.7193 + 0.0601j) |
| 93 | (−0.1764 + 0.8416j) | (0.4147 − 1.1678j) | (−0.7193 + 0.0601j) |
| 94 | (−0.1823 + 0.2813j) | (−0.4147 + 1.1678j) | (−0.7193 + 1.228j) |
| 95 | (−0.1847 + 0.7051j) | (−0.4147 − 1.1678j) | (−0.7193 + 1.4486j) |
| 96 | (−0.3148 + 0.0557j) | (0.4542 + 0.0691j) | (−0.7851 − 0.3051j) |
| 97 | (−0.2397 + 1.1183j) | (0.4542 − 0.0691j) | (−0.7851 − 0.3045j) |
| 98 | (−0.312 + 0.3976j) | (−0.4542 + 0.0691j) | (−0.7851 − 0.7193j) |
| 99 | (−0.3119 + 0.5402j) | (−0.4542 − 0.0691j) | (−0.7851 − 0.7851j) |
| 100 | (−0.1822 + 0.0543j) | (0.4539 + 0.069j) | (−0.7851 + 0.3039j) |
| 101 | (−0.0747 + 1.098j) | (0.4539 − 0.069j) | (−0.7851 + 0.3027j) |
| 102 | (−0.1814 + 0.3982j) | (−0.4539 + 0.069j) | (−0.7851 + 0.7189j) |
| 103 | (−0.1849 + 0.5416j) | (−0.4539 − 0.069j) | (−0.7851 + 0.7866j) |
| 104 | (−0.3132 + 0.0555j) | (0.0723 + 0.5171j) | (−0.7851 − 0.4316j) |
| 105 | (−0.2252 + 1.2542j) | (0.0723 − 0.5171j) | (−0.7851 − 0.4374j) |
| 106 | (−0.3079 + 0.3991j) | (−0.0723 + 0.5171j) | (−0.7851 − 0.5905j) |
| 107 | (−0.3118 + 0.5237j) | (−0.0723 − 0.5171j) | (−0.7851 − 0.5662j) |
| 108 | (−0.1825 + 0.0554j) | (0.0491 + 0.5202j) | (−0.7851 + 0.4309j) |
| 109 | (−0.0704 + 1.2881j) | (0.0491 − 0.5202j) | (−0.7851 + 0.4375j) |
| 110 | (−0.1825 + 0.4018j) | (−0.0491 + 0.5202j) | (−0.7851 + 0.5905j) |
| 111 | (−0.1827 + 0.5292j) | (−0.0491 − 0.5202j) | (−0.7851 + 0.5676j) |
| 112 | (−0.315 + 0.0547j) | (1.3191 + 0.1962j) | (−0.7851 − 0.1795j) |
| 113 | (−0.2356 + 1.1172j) | (1.3191 − 0.1962j) | (−0.7851 − 0.1792j) |
| 114 | (−0.3117 + 0.3978j) | (−1.3191 + 0.1962j) | (−0.7851 − 1.0559j) |
| 115 | (−0.3121 + 0.5414j) | (−1.3191 − 0.1962j) | (−0.7851 − 0.919j) |
| 116 | (−0.1835 + 0.0561j) | (1.3334 + 0.0658j) | (−0.7851 + 0.1794j) |
| 117 | (−0.0758 + 1.1042j) | (1.3334 − 0.0658j) | (−0.7851 + 0.1796j) |
| 118 | (−0.1826 + 0.3999j) | (−1.3334 + 0.0658j) | (−0.7851 + 1.0561j) |
| 119 | (−0.1849 + 0.5419j) | (−1.3334 − 0.0658j) | (−0.7851 + 0.9201j) |
| 120 | (−0.3141 + 0.056j) | (0.1765 + 1.1997j) | (−0.7851 − 0.0609j) |
| 121 | (−0.2127 + 1.2612j) | (0.1765 − 1.1997j) | (−0.7851 − 0.0607j) |
| 122 | (−0.3091 + 0.3983j) | (−0.1765 + 1.1997j) | (−0.7851 − 1.2271j) |
| 123 | (−0.3108 + 0.524j) | (−0.1765 − 1.1997j) | (−0.7851 − 1.4453j) |
| 124 | (−0.183 + 0.0551j) | (0.0588 + 1.204j) | (−0.7851 + 0.0601j) |
| 125 | (−0.0822 + 1.2574j) | (0.0588 − 1.204j) | (−0.7851 + 0.0601j) |
| 126 | (−0.1837 + 0.4026j) | (−0.0588 + 1.204j) | (−0.7851 + 1.228j) |
| 127 | (−0.1833 + 0.5306j) | (−0.0588 − 1.204j) | (−0.7851 + 1.4486j) |
| 128 | (0.4457 + 0.1663j) | (0.1844 + 0.0517j) | (0.3039 − 0.3051j) |
| 129 | (0.4021 + 0.9839j) | (0.1844 − 0.0517j) | (0.3039 − 0.3045j) |
| 130 | (0.4379 + 0.2808j) | (−0.1844 + 0.0517j) | (0.3039 − 0.7193j) |
| 131 | (0.4325 + 0.6762j) | (−0.1844 − 0.0517j) | (0.3039 − 0.7851j) |
| 132 | (0.0631 + 0.1645j) | (0.185 + 0.0518j) | (0.3039 + 0.3039j) |
| 133 | (0.0535 + 0.8976j) | (0.185 − 0.0518j) | (0.3039 + 0.3027j) |
| 134 | (0.0623 + 0.2853j) | (−0.185 + 0.0518j) | (0.3039 + 0.7189j) |
| 135 | (0.063 + 0.6686j) | (−0.185 − 0.0518j) | (0.3039 + 0.7866j) |
| 136 | (0.4544 + 0.1646j) | (0.1366 + 0.3818j) | (0.3039 − 0.4316j) |
| 137 | (0.4085 + 0.8717j) | (0.1366 − 0.3818j) | (0.3039 − 0.4374j) |
| 138 | (0.4495 + 0.2802j) | (−0.1366 + 0.3818j) | (0.3039 − 0.5905j) |

-continued

| Mapping | NN_QSL | NN_QSC | NN_RSC |
|---|---|---|---|
| 139 | (0.4239 + 0.7355j) | (−0.1366 − 0.3818j) | (0.3039 − 0.5662j) |
| 140 | (0.0616 + 0.1678j) | (0.1396 + 0.3793j) | (0.3039 + 0.4309j) |
| 141 | (0.0717 + 0.8232j) | (0.1396 − 0.3793j) | (0.3039 + 0.4375j) |
| 142 | (0.0601 + 0.2845j) | (−0.1396 + 0.3793j) | (0.3039 + 0.5905j) |
| 143 | (0.0643 + 0.7007j) | (−0.1396 − 0.3793j) | (0.3039 + 0.5676j) |
| 144 | (0.4433 + 0.1641j) | (1.0929 + 0.2663j) | (0.3039 − 0.1795j) |
| 145 | (0.4014 + 0.9946j) | (1.0929 − 0.2663j) | (0.3039 − 0.1792j) |
| 146 | (0.4407 + 0.2809j) | (−1.0929 + 0.2663j) | (0.3039 − 1.0559j) |
| 147 | (0.4318 + 0.6767j) | (−1.0929 − 0.2663j) | (0.3039 − 0.919j) |
| 148 | (0.0596 + 0.1661j) | (1.0591 + 0.3672j) | (0.3039 + 0.1794j) |
| 149 | (0.0534 + 0.8952j) | (1.0591 − 0.3672j) | (0.3039 + 0.1796j) |
| 150 | (0.0624 + 0.2838j) | (−1.0591 + 0.3672j) | (0.3039 + 1.0561j) |
| 151 | (0.0623 + 0.6658j) | (−1.0591 − 0.3672j) | (0.3039 + 0.9201j) |
| 152 | (0.4542 + 0.1627j) | (0.2721 + 0.9816j) | (0.3039 − 0.0609j) |
| 153 | (0.4078 + 0.8696j) | (0.2721 − 0.9816j) | (0.3039 − 0.0607j) |
| 154 | (0.453 + 0.2821j) | (−0.2721 + 0.9816j) | (0.3039 − 1.2271j) |
| 155 | (0.4271 + 0.7389j) | (−0.2721 − 0.9816j) | (0.3039 − 1.4453j) |
| 156 | (0.0592 + 0.1678j) | (0.3739 + 0.9631j) | (0.3039 + 0.0601j) |
| 157 | (0.0682 + 0.8215j) | (0.3739 − 0.9631j) | (0.3039 + 0.0601j) |
| 158 | (0.0599 + 0.2834j) | (−0.3739 + 0.9631j) | (0.3039 + 1.228j) |
| 159 | (0.0644 + 0.7j) | (−0.3739 − 0.9631j) | (0.3039 + 1.4486j) |
| 160 | (0.4431 + 0.0571j) | (0.064 + 0.0515j) | (0.3027 − 0.3051j) |
| 161 | (0.3957 + 1.1527j) | (0.064 − 0.0515j) | (0.3027 − 0.3045j) |
| 162 | (0.4383 + 0.3959j) | (−0.064 + 0.0515j) | (0.3027 − 0.7193j) |
| 163 | (0.4369 + 0.5469j) | (−0.064 − 0.0515j) | (0.3027 − 0.7851j) |
| 164 | (0.0585 + 0.0556j) | (0.0631 + 0.0515j) | (0.3027 + 0.3039j) |
| 165 | (0.0883 + 1.6505j) | (0.0631 − 0.0515j) | (0.3027 + 0.3027j) |
| 166 | (0.0615 + 0.4042j) | (−0.0631 + 0.0515j) | (0.3027 + 0.7189j) |
| 167 | (0.0631 + 0.5409j) | (−0.0631 − 0.0515j) | (0.3027 + 0.7866j) |
| 168 | (0.4538 + 0.0562j) | (0.0485 + 0.3857j) | (0.3027 − 0.4316j) |
| 169 | (0.3742 + 1.2962j) | (0.0485 − 0.3857j) | (0.3027 − 0.4374j) |
| 170 | (0.4493 + 0.3995j) | (−0.0485 + 0.3857j) | (0.3027 − 0.5905j) |
| 171 | (0.441 + 0.5283j) | (−0.0485 − 0.3857j) | (0.3027 − 0.5662j) |
| 172 | (0.0605 + 0.0567j) | (0.0466 + 0.3859j) | (0.3027 + 0.4309j) |
| 173 | (0.0749 + 1.4616j) | (0.0466 − 0.3859j) | (0.3027 + 0.4375j) |
| 174 | (0.0639 + 0.4059j) | (−0.0466 + 0.3859j) | (0.3027 + 0.5905j) |
| 175 | (0.0621 + 0.5316j) | (−0.0466 − 0.3859j) | (0.3027 + 0.5676j) |
| 176 | (0.4428 + 0.0576j) | (1.117 + 0.1611j) | (0.3027 − 0.1795j) |
| 177 | (0.3942 + 1.1194j) | (1.117 − 0.1611j) | (0.3027 − 0.1792j) |
| 178 | (0.4395 + 0.396j) | (−1.117 + 0.1611j) | (0.3027 − 1.0559j) |
| 179 | (0.4386 + 0.5472j) | (−1.117 − 0.1611j) | (0.3027 − 0.919j) |
| 180 | (0.0632 + 0.0565j) | (1.1289 + 0.0541j) | (0.3027 + 0.1794j) |
| 181 | (0.2742 + 1.6248j) | (1.1289 − 0.0541j) | (0.3027 + 0.1796j) |
| 182 | (0.0605 + 0.4048j) | (−1.1289 + 0.0541j) | (0.3027 + 1.0561j) |
| 183 | (0.062 + 0.5419j) | (−1.1289 − 0.0541j) | (0.3027 + 0.9201j) |
| 184 | (0.4557 + 0.0557j) | (0.1662 + 0.9932j) | (0.3027 − 0.0609j) |
| 185 | (0.3307 + 1.4037j) | (0.1662 − 0.9932j) | (0.3027 − 0.0607j) |
| 186 | (0.4473 + 0.3995j) | (−0.1662 + 0.9932j) | (0.3027 − 1.2271j) |
| 187 | (0.4414 + 0.5267j) | (−0.1662 − 0.9932j) | (0.3027 − 1.4453j) |
| 188 | (0.0626 + 0.0554j) | (0.0565 + 0.9992j) | (0.3027 + 0.0601j) |
| 189 | (0.2129 + 1.4638j) | (0.0565 − 0.9992j) | (0.3027 + 0.0601j) |
| 190 | (0.0631 + 0.4059j) | (−0.0565 + 0.9992j) | (0.3027 + 1.228j) |
| 191 | (0.0617 + 0.5321j) | (−0.0565 − 0.9992j) | (0.3027 + 1.4486j) |
| 192 | (0.3132 + 0.1639j) | (0.3195 + 0.0553j) | (0.7189 − 0.3051j) |
| 193 | (0.2618 + 0.9824j) | (0.3195 − 0.0553j) | (0.7189 − 0.3045j) |
| 194 | (0.3131 + 0.281j) | (−0.3195 + 0.0553j) | (0.7189 − 0.7193j) |
| 195 | (0.3103 + 0.6676j) | (−0.3195 − 0.0553j) | (0.7189 − 0.7851j) |
| 196 | (0.1815 + 0.1665j) | (0.3192 + 0.0552j) | (0.7189 + 0.3039j) |
| 197 | (0.1257 + 0.965j) | (0.3192 − 0.0552j) | (0.7189 + 0.3027j) |
| 198 | (0.1836 + 0.2838j) | (−0.3192 + 0.0552j) | (0.7189 + 0.7189j) |
| 199 | (0.1883 + 0.6668j) | (−0.3192 − 0.0552j) | (0.7189 + 0.7866j) |
| 200 | (0.312 + 0.1625j) | (0.1726 + 0.4754j) | (0.7189 − 0.4316j) |
| 201 | (0.2852 + 0.8597j) | (0.1726 − 0.4754j) | (0.7189 − 0.4374j) |
| 202 | (0.3108 + 0.2809j) | (−0.1726 + 0.4754j) | (0.7189 − 0.5905j) |
| 203 | (0.3047 + 0.7226j) | (−0.1726 − 0.4754j) | (0.7189 − 0.5662j) |
| 204 | (0.1829 + 0.1648j) | (0.1882 + 0.4624j) | (0.7189 + 0.4309j) |
| 205 | (0.178 + 0.8411j) | (0.1882 − 0.4624j) | (0.7189 + 0.4375j) |
| 206 | (0.1828 + 0.2832j) | (−0.1882 + 0.4624j) | (0.7189 + 0.5905j) |
| 207 | (0.1865 + 0.7073j) | (−0.1882 − 0.4624j) | (0.7189 + 0.5676j) |
| 208 | (0.3135 + 0.1635j) | (1.4104 + 0.3594j) | (0.7189 − 0.1795j) |
| 209 | (0.2594 + 0.982j) | (1.4104 − 0.3594j) | (0.7189 − 0.1792j) |
| 210 | (0.3133 + 0.2798j) | (−1.4104 + 0.3594j) | (0.7189 − 1.0559j) |
| 211 | (0.3112 + 0.6688j) | (−1.4104 − 0.3594j) | (0.7189 − 0.919j) |
| 212 | (0.1821 + 0.1627j) | (1.3645 + 0.4968j) | (0.7189 + 0.1794j) |
| 213 | (0.1269 + 0.9655j) | (1.3645 − 0.4968j) | (0.7189 + 0.1796j) |
| 214 | (0.1846 + 0.2836j) | (−1.3645 + 0.4968j) | (0.7189 + 1.0561j) |
| 215 | (0.1886 + 0.6651j) | (−1.3645 − 0.4968j) | (0.7189 + 0.9201j) |

-continued

| Mapping | NN_QSL | NN_QSC | NN_RSC |
|---|---|---|---|
| 216 | (0.3109 + 0.1627j) | (0.3164 + 1.315j) | (0.7189 − 0.0609j) |
| 217 | (0.2846 + 0.8585j) | (0.3164 − 1.315j) | (0.7189 − 0.0607j) |
| 218 | (0.3092 + 0.2805j) | (−0.3164 + 1.315j) | (0.7189 − 1.2271j) |
| 219 | (0.3047 + 0.7224j) | (−0.3164 − 1.315j) | (0.7189 − 1.4453j) |
| 220 | (0.1841 + 0.1645j) | (0.4451 + 1.2916j) | (0.7189 + 0.0601j) |
| 221 | (0.1766 + 0.8398j) | (0.4451 − 1.2916j) | (0.7189 + 0.0601j) |
| 222 | (0.1861 + 0.2834j) | (−0.4451 + 1.2916j) | (0.7189 + 1.228j) |
| 223 | (0.1861 + 0.7085j) | (−0.4451 − 1.2916j) | (0.7189 + 1.4486j) |
| 224 | (0.3139 + 0.0565j) | (0.421 + 0.0652j) | (0.7866 − 0.3051j) |
| 225 | (0.244 + 1.1191j) | (0.421 − 0.0652j) | (0.7866 − 0.3045j) |
| 226 | (0.3103 + 0.3997j) | (−0.421 + 0.0652j) | (0.7866 − 0.7193j) |
| 227 | (0.3129 + 0.5431j) | (−0.421 − 0.0652j) | (0.7866 − 0.7851j) |
| 228 | (0.1826 + 0.055j) | (0.4209 + 0.065j) | (0.7866 + 0.3039j) |
| 229 | (0.08 + 1.0978j) | (0.4209 − 0.065j) | (0.7866 + 0.3027j) |
| 230 | (0.1845 + 0.3999j) | (−0.4209 + 0.065j) | (0.7866 + 0.7189j) |
| 231 | (0.1848 + 0.5411j) | (−0.4209 − 0.065j) | (0.7866 + 0.7866j) |
| 232 | (0.3114 + 0.0559j) | (0.0738 + 0.5142j) | (0.7866 − 0.4316j) |
| 233 | (0.2295 + 1.2458j) | (0.0738 − 0.5142j) | (0.7866 − 0.4374j) |
| 234 | (0.3098 + 0.4037j) | (−0.0738 + 0.5142j) | (0.7866 − 0.5905j) |
| 235 | (0.3121 + 0.5282j) | (−0.0738 − 0.5142j) | (0.7866 − 0.5662j) |
| 236 | (0.1809 + 0.0553j) | (0.0509 + 0.5166j) | (0.7866 + 0.4309j) |
| 237 | (0.0743 + 1.289j) | (0.0509 − 0.5166j) | (0.7866 + 0.4375j) |
| 238 | (0.1838 + 0.4025j) | (−0.0509 + 0.5166j) | (0.7866 + 0.5905j) |
| 239 | (0.1844 + 0.531j) | (−0.0509 − 0.5166j) | (0.7866 + 0.5676j) |
| 240 | (0.3124 + 0.0574j) | (1.4413 + 0.2175j) | (0.7866 − 0.1795j) |
| 241 | (0.2377 + 1.1143j) | (1.4413 − 0.2175j) | (0.7866 − 0.1792j) |
| 242 | (0.3127 + 0.3984j) | (−1.4413 + 0.2175j) | (0.7866 − 1.0559j) |
| 243 | (0.3142 + 0.5418j) | (−1.4413 − 0.2175j) | (0.7866 − 0.919j) |
| 244 | (0.1843 + 0.0564j) | (1.4575 + 0.0727j) | (0.7866 + 0.1794j) |
| 245 | (0.0788 + 1.1019j) | (1.4575 − 0.0727j) | (0.7866 + 0.1796j) |
| 246 | (0.1841 + 0.4031j) | (−1.4575 + 0.0727j) | (0.7866 + 1.0561j) |
| 247 | (0.1849 + 0.543j) | (−1.4575 − 0.0727j) | (0.7866 + 0.9201j) |
| 248 | (0.311 + 0.0559j) | (0.1885 + 1.329j) | (0.7866 − 0.0609j) |
| 249 | (0.2161 + 1.2595j) | (0.1885 − 1.329j) | (0.7866 − 0.0607j) |
| 250 | (0.3124 + 0.4009j) | (−0.1885 + 1.329j) | (0.7866 − 1.2271j) |
| 251 | (0.3127 + 0.5274j) | (−0.1885 − 1.329j) | (0.7866 − 1.4453j) |
| 252 | (0.1827 + 0.0558j) | (0.0624 + 1.3354j) | (0.7866 + 0.0601j) |
| 253 | (0.0798 + 1.2563j) | (0.0624 − 1.3354j) | (0.7866 + 0.0601j) |
| 254 | (0.1836 + 0.4039j) | (−0.0624 + 1.3354j) | (0.7866 + 1.228j) |
| 255 | (0.1833 + 0.5285j) | (−0.0624 − 1.3354j) | (0.7866 + 1.4486j) |
| 256 | (−0.4463 − 0.1639j) | (0.1855 + 0.1634j) | (−0.4316 − 0.3051j) |
| 257 | (−0.4012 − 0.9844j) | (0.1855 − 0.1634j) | (−0.4316 − 0.3045j) |
| 258 | (−0.4402 − 0.2796j) | (−0.1855 + 0.1634j) | (−0.4316 − 0.7193j) |
| 259 | (−0.431 − 0.6768j) | (−0.1855 − 0.1634j) | (−0.4316 − 0.7851j) |
| 260 | (−0.0611 − 0.1653j) | (0.1855 + 0.1632j) | (−0.4316 + 0.3039j) |
| 261 | (−0.054 − 0.8956j) | (0.1855 − 0.1632j) | (−0.4316 + 0.3027j) |
| 262 | (−0.0593 − 0.2844j) | (−0.1855 + 0.1632j) | (−0.4316 + 0.7189j) |
| 263 | (−0.0637 − 0.6671j) | (−0.1855 − 0.1632j) | (−0.4316 + 0.7866j) |
| 264 | (−0.4571 − 0.1634j) | (0.1677 + 0.2795j) | (−0.4316 − 0.4316j) |
| 265 | (−0.4078 − 0.8694j) | (0.1677 − 0.2795j) | (−0.4316 − 0.4374j) |
| 266 | (−0.4542 − 0.2825j) | (−0.1677 + 0.2795j) | (−0.4316 − 0.5905j) |
| 267 | (−0.4268 − 0.7398j) | (−0.1677 − 0.2795j) | (−0.4316 − 0.5662j) |
| 268 | (−0.0615 − 0.1665j) | (0.1679 + 0.2806j) | (−0.4316 + 0.4309j) |
| 269 | (−0.0668 − 0.8218j) | (0.1679 − 0.2806j) | (−0.4316 + 0.4375j) |
| 270 | (−0.0618 − 0.2836j) | (−0.1679 + 0.2806j) | (−0.4316 + 0.5905j) |
| 271 | (−0.0659 − 0.7013j) | (−0.1679 − 0.2806j) | (−0.4316 + 0.5676j) |
| 272 | (−0.4426 − 0.1658j) | (1.04 + 0.6132j) | (−0.4316 − 0.1795j) |
| 273 | (−0.4045 − 0.991j) | (1.04 − 0.6132j) | (−0.4316 − 0.1792j) |
| 274 | (−0.4439 − 0.2793j) | (−1.04 + 0.6132j) | (−0.4316 − 1.0559j) |
| 275 | (−0.4312 − 0.6763j) | (−1.04 − 0.6132j) | (−0.4316 − 0.919j) |
| 276 | (−0.0619 − 0.1669j) | (1.0999 + 0.513j) | (−0.4316 + 0.1794j) |
| 277 | (−0.0516 − 0.8964j) | (1.0999 − 0.513j) | (−0.4316 + 0.1796j) |
| 278 | (−0.0606 − 0.2841j) | (−1.0999 + 0.513j) | (−0.4316 + 1.0561j) |
| 279 | (−0.0621 − 0.6653j) | (−1.0999 − 0.513j) | (−0.4316 + 0.9201j) |
| 280 | (−0.4562 − 0.1637j) | (0.6058 + 0.989j) | (−0.4316 − 0.0609j) |
| 281 | (−0.4091 − 0.8668j) | (0.6058 − 0.989j) | (−0.4316 − 0.0607j) |
| 282 | (−0.4518 − 0.2793j) | (−0.6058 + 0.989j) | (−0.4316 − 1.2271j) |
| 283 | (−0.4263 − 0.7353j) | (−0.6058 − 0.989j) | (−0.4316 − 1.4453j) |
| 284 | (−0.0616 − 0.1664j) | (0.5002 + 1.0297j) | (−0.4316 + 0.0601j) |
| 285 | (−0.0694 − 0.8212j) | (0.5002 − 1.0297j) | (−0.4316 + 0.0601j) |
| 286 | (−0.0621 − 0.2859j) | (−0.5002 + 1.0297j) | (−0.4316 + 1.228j) |
| 287 | (−0.0638 − 0.6996j) | (−0.5002 − 1.0297j) | (−0.4316 + 1.4486j) |
| 288 | (−0.4441 − 0.0564j) | (0.0642 + 0.1537j) | (−0.4374 − 0.3051j) |
| 289 | (−0.3921 − 1.1538j) | (0.0642 − 0.1537j) | (−0.4374 − 0.3045j) |
| 290 | (−0.4389 − 0.3984j) | (−0.0642 + 0.1537j) | (−0.4374 − 0.7193j) |
| 291 | (−0.4375 − 0.5492j) | (−0.0642 − 0.1537j) | (−0.4374 − 0.7851j) |
| 292 | (−0.0601 − 0.0565j) | (0.0641 + 0.1536j) | (−0.4374 + 0.3039j) |

-continued

| Mapping | NN_QSL | NN_QSC | NN_RSC |
|---|---|---|---|
| 293 | (−0.085 − 1.6521j) | (0.0641 − 0.1536j) | (−0.4374 + 0.3027j) |
| 294 | (−0.0621 − 0.4039j) | (−0.0641 + 0.1536j) | (−0.4374 + 0.7189j) |
| 295 | (−0.0628 − 0.5387j) | (−0.0641 − 0.1536j) | (−0.4374 + 0.7866j) |
| 296 | (−0.4565 − 0.0576j) | (0.0555 + 0.2577j) | (−0.4374 − 0.4316j) |
| 297 | (−0.3747 − 1.294j) | (0.0555 − 0.2577j) | (−0.4374 − 0.4374j) |
| 298 | (−0.4464 − 0.4017j) | (−0.0555 + 0.2577j) | (−0.4374 − 0.5905j) |
| 299 | (−0.4436 − 0.5288j) | (−0.0555 − 0.2577j) | (−0.4374 − 0.5662j) |
| 300 | (−0.061 − 0.0561j) | (0.0554 + 0.2578j) | (−0.4374 + 0.4309j) |
| 301 | (−0.0721 − 1.4593j) | (0.0554 − 0.2578j) | (−0.4374 + 0.4375j) |
| 302 | (−0.0618 − 0.4061j) | (−0.0554 + 0.2578j) | (−0.4374 + 0.5905j) |
| 303 | (−0.0635 − 0.5302j) | (−0.0554 − 0.2578j) | (−0.4374 + 0.5676j) |
| 304 | (−0.4456 − 0.0571j) | (0.9702 + 0.7075j) | (−0.4374 − 0.1795j) |
| 305 | (−0.3904 − 1.1162j) | (0.9702 − 0.7075j) | (−0.4374 − 0.1792j) |
| 306 | (−0.4383 − 0.3992j) | (−0.9702 + 0.7075j) | (−0.4374 − 1.0559j) |
| 307 | (−0.4379 − 0.5468j) | (−0.9702 − 0.7075j) | (−0.4374 − 0.919j) |
| 308 | (−0.062 − 0.0559j) | (0.8908 + 0.7938j) | (−0.4374 + 0.1794j) |
| 309 | (−0.2695 − 1.6295j) | (0.8908 − 0.7938j) | (−0.4374 + 0.1796j) |
| 310 | (−0.062 − 0.4037j) | (−0.8908 + 0.7938j) | (−0.4374 + 1.0561j) |
| 311 | (−0.0627 − 0.5416j) | (−0.8908 − 0.7938j) | (−0.4374 + 0.9201j) |
| 312 | (−0.4568 − 0.0577j) | (0.7072 + 0.9358j) | (−0.4374 − 0.0609j) |
| 313 | (−0.3298 − 1.3989j) | (0.7072 − 0.9358j) | (−0.4374 − 0.0607j) |
| 314 | (−0.4467 − 0.3999j) | (−0.7072 + 0.9358j) | (−0.4374 − 1.2271j) |
| 315 | (−0.4404 − 0.5285j) | (−0.7072 − 0.9358j) | (−0.4374 − 1.4453j) |
| 316 | (−0.0612 − 0.0559j) | (0.8023 + 0.8711j) | (−0.4374 + 0.0601j) |
| 317 | (−0.2128 − 1.4708j) | (0.8023 − 0.8711j) | (−0.4374 + 0.0601j) |
| 318 | (−0.0618 − 0.4046j) | (−0.8023 + 0.8711j) | (−0.4374 + 1.228j) |
| 319 | (−0.0611 − 0.5307j) | (−0.8023 − 0.8711j) | (−0.4374 + 1.4486j) |
| 320 | (−0.3159 − 0.1616j) | (0.293 + 0.1628j) | (−0.5905 − 0.3051j) |
| 321 | (−0.2603 − 0.9838j) | (0.293 − 0.1628j) | (−0.5905 − 0.3045j) |
| 322 | (−0.3145 − 0.2812j) | (−0.293 + 0.1628j) | (−0.5905 − 0.7193j) |
| 323 | (−0.3105 − 0.6693j) | (−0.293 − 0.1628j) | (−0.5905 − 0.7851j) |
| 324 | (−0.1837 − 0.1651j) | (0.293 + 0.1625j) | (−0.5905 − 0.3039j) |
| 325 | (−0.1264 − 0.9659j) | (0.293 − 0.1625j) | (−0.5905 + 0.3027j) |
| 326 | (−0.1851 − 0.2838j) | (−0.293 + 0.1625j) | (−0.5905 + 0.7189j) |
| 327 | (−0.1865 − 0.6639j) | (−0.293 − 0.1625j) | (−0.5905 + 0.7866j) |
| 328 | (−0.3126 − 0.1634j) | (0.2875 + 0.373j) | (−0.5905 − 0.4316j) |
| 329 | (−0.2876 − 0.8595j) | (0.2875 − 0.373j) | (−0.5905 − 0.4374j) |
| 330 | (−0.3108 − 0.2794j) | (−0.2875 + 0.373j) | (−0.5905 − 0.5905j) |
| 331 | (−0.3051 − 0.7213j) | (−0.2875 − 0.373j) | (−0.5905 − 0.5662j) |
| 332 | (−0.1827 − 0.1672j) | (0.2837 + 0.3794j) | (−0.5905 + 0.4309j) |
| 333 | (−0.1796 − 0.8387j) | (0.2837 − 0.3794j) | (−0.5905 + 0.4375j) |
| 334 | (−0.1859 − 0.2832j) | (−0.2837 + 0.3794j) | (−0.5905 + 0.5905j) |
| 335 | (−0.1862 − 0.7084j) | (−0.2837 − 0.3794j) | (−0.5905 + 0.5676j) |
| 336 | (−0.3155 − 0.1627j) | (1.1297 + 0.6783j) | (−0.5905 − 0.1795j) |
| 337 | (−0.2619 − 0.9855j) | (1.1297 − 0.6783j) | (−0.5905 − 0.1792j) |
| 338 | (−0.3137 − 0.2821j) | (−1.1297 + 0.6783j) | (−0.5905 − 1.0559j) |
| 339 | (−0.3101 − 0.6678j) | (−1.1297 − 0.6783j) | (−0.5905 − 0.919j) |
| 340 | (−0.183 − 0.165j) | (1.1955 + 0.5675j) | (−0.5905 + 0.1794j) |
| 341 | (−0.1247 − 0.9674j) | (1.1955 − 0.5675j) | (−0.5905 + 0.1796j) |
| 342 | (−0.1856 − 0.281j) | (−1.1955 + 0.5675j) | (−0.5905 + 1.0561j) |
| 343 | (−0.1866 − 0.6624j) | (−1.1955 − 0.5675j) | (−0.5905 + 0.9201j) |
| 344 | (−0.3119 − 0.1637j) | (0.6492 + 1.0902j) | (−0.5905 − 0.0609j) |
| 345 | (−0.2868 − 0.8599j) | (0.6492 − 1.0902j) | (−0.5905 − 0.0607j) |
| 346 | (−0.3095 − 0.2803j) | (−0.6492 + 1.0902j) | (−0.5905 − 1.2271j) |
| 347 | (−0.3061 − 0.7215j) | (−0.6492 − 1.0902j) | (−0.5905 − 1.4453j) |
| 348 | (−0.1838 − 0.1657j) | (0.5334 + 1.1357j) | (−0.5905 + 0.0601j) |
| 349 | (−0.1802 − 0.8426j) | (0.5334 − 1.1357j) | (−0.5905 + 0.0601j) |
| 350 | (−0.1842 − 0.2806j) | (−0.5334 + 1.1357j) | (−0.5905 + 1.228j) |
| 351 | (−0.1884 − 0.7047j) | (−0.5334 − 1.1357j) | (−0.5905 + 1.4486j) |
| 352 | (−0.3157 − 0.0567j) | (0.4177 + 0.2045j) | (−0.5662 − 0.3051j) |
| 353 | (−0.2455 − 1.1165j) | (0.4177 − 0.2045j) | (−0.5662 − 0.3045j) |
| 354 | (−0.3114 − 0.3996j) | (−0.4177 + 0.2045j) | (−0.5662 − 0.7193j) |
| 355 | (−0.3127 − 0.5438j) | (−0.4177 − 0.2045j) | (−0.5662 − 0.7851j) |
| 356 | (−0.1847 − 0.0565j) | (0.4177 + 0.2052j) | (−0.5662 + 0.3039j) |
| 357 | (−0.0756 − 1.0986j) | (0.4177 − 0.2052j) | (−0.5662 + 0.3027j) |
| 358 | (−0.1839 − 0.4027j) | (−0.4177 + 0.2052j) | (−0.5662 + 0.7189j) |
| 359 | (−0.1865 − 0.5398j) | (−0.4177 − 0.2052j) | (−0.5662 + 0.7866j) |
| 360 | (−0.3144 − 0.0565j) | (0.3688 + 0.3255j) | (−0.5662 − 0.4316j) |
| 361 | (−0.2283 − 1.2495j) | (0.3688 − 0.3255j) | (−0.5662 − 0.4374j) |
| 362 | (−0.3095 − 0.4037j) | (−0.3688 + 0.3255j) | (−0.5662 − 0.5905j) |
| 363 | (−0.3107 − 0.5281j) | (−0.3688 − 0.3255j) | (−0.5662 − 0.5662j) |
| 364 | (−0.1848 − 0.0563j) | (0.3702 + 0.3233j) | (−0.5662 + 0.4309j) |
| 365 | (−0.0716 − 1.2893j) | (0.3702 − 0.3233j) | (−0.5662 + 0.4375j) |
| 366 | (−0.1831 − 0.4034j) | (−0.3702 + 0.3233j) | (−0.5662 + 0.5905j) |
| 367 | (−0.186 − 0.5317j) | (−0.3702 − 0.3233j) | (−0.5662 + 0.5676j) |
| 368 | (−0.3148 − 0.0572j) | (1.0512 + 0.7809j) | (−0.5662 − 0.1795j) |
| 369 | (−0.2394 − 1.1164j) | (1.0512 − 0.7809j) | (−0.5662 − 0.1792j) |

-continued

| Mapping | NN_QSL | NN_QSC | NN_RSC |
|---|---|---|---|
| 370 | (−0.3113 − 0.3991j) | (−1.0512 + 0.7809j) | (−0.5662 − 1.0559j) |
| 371 | (−0.3128 − 0.5448j) | (−1.0512 − 0.7809j) | (−0.5662 − 0.919j) |
| 372 | (−0.1837 − 0.0551j) | (0.9635 + 0.8762j) | (−0.5662 + 0.1794j) |
| 373 | (−0.078 − 1.1028j) | (0.9635 − 0.8762j) | (−0.5662 + 0.1796j) |
| 374 | (−0.1821 − 0.4041j) | (−0.9635 + 0.8762j) | (−0.5662 + 1.0561j) |
| 375 | (−0.1853 − 0.5397j) | (−0.9635 − 0.8762j) | (−0.5662 + 0.9201j) |
| 376 | (−0.3127 − 0.0567j) | (0.761 + 1.0318j) | (−0.5662 − 0.0609j) |
| 377 | (−0.2149 − 1.2591j) | (0.761 − 1.0318j) | (−0.5662 − 0.0607j) |
| 378 | (−0.3088 − 0.4004j) | (−0.761 + 1.0318j) | (−0.5662 − 1.2271j) |
| 379 | (−0.3116 − 0.5285j) | (−0.761 − 1.0318j) | (−0.5662 − 1.4453j) |
| 380 | (−0.1847 − 0.056j) | (0.8664 + 0.9602j) | (−0.5662 + 0.0601j) |
| 381 | (−0.0801 − 1.2579j) | (0.8664 − 0.9602j) | (−0.5662 + 0.0601j) |
| 382 | (−0.1853 − 0.4049j) | (−0.8664 + 0.9602j) | (−0.5662 + 1.228j) |
| 383 | (−0.1844 − 0.5298j) | (−0.8664 − 0.9602j) | (−0.5662 + 1.4486j) |
| 384 | (0.4425 − 0.1648j) | (0.1863 + 0.167j) | (0.4309 − 0.3051j) |
| 385 | (0.3988 − 0.9835j) | (0.1863 − 0.167j) | (0.4309 − 0.3045j) |
| 386 | (0.4399 − 0.2776j) | (−0.1863 + 0.167j) | (0.4309 − 0.7193j) |
| 387 | (0.4309 − 0.6751j) | (−0.1863 − 0.167j) | (0.4309 − 0.7851j) |
| 388 | (0.0607 − 0.1653j) | (0.1864 + 0.1668j) | (0.4309 + 0.3039j) |
| 389 | (0.0532 − 0.8943j) | (0.1864 − 0.1668j) | (0.4309 + 0.3027j) |
| 390 | (0.0621 − 0.2824j) | (−0.1864 + 0.1668j) | (0.4309 + 0.7189j) |
| 391 | (0.0614 − 0.6661j) | (−0.1864 − 0.1668j) | (0.4309 + 0.7866j) |
| 392 | (0.4541 − 0.1622j) | (0.179 + 0.2802j) | (0.4309 − 0.4316j) |
| 393 | (0.4095 − 0.8731j) | (0.179 − 0.2802j) | (0.4309 − 0.4374j) |
| 394 | (0.453 − 0.2786j) | (−0.179 + 0.2802j) | (0.4309 − 0.5905j) |
| 395 | (0.4263 − 0.7383j) | (−0.179 − 0.2802j) | (0.4309 − 0.5662j) |
| 396 | (0.0611 − 0.1662j) | (0.1791 + 0.2814j) | (0.4309 + 0.4309j) |
| 397 | (0.069 − 0.8242j) | (0.1791 − 0.2814j) | (0.4309 + 0.4375j) |
| 398 | (0.0599 − 0.2843j) | (−0.1791 + 0.2814j) | (0.4309 + 0.5905j) |
| 399 | (0.0649 − 0.701j) | (−0.1791 − 0.2814j) | (0.4309 + 0.5676j) |
| 400 | (0.4437 − 0.1663j) | (0.9608 + 0.5557j) | (0.4309 − 0.1795j) |
| 401 | (0.4033 − 0.9933j) | (0.9608 − 0.5557j) | (0.4309 − 0.1792j) |
| 402 | (0.4404 − 0.2821j) | (−0.9608 + 0.5557j) | (0.4309 − 1.0559j) |
| 403 | (0.4316 − 0.676j) | (−0.9608 − 0.5557j) | (0.4309 − 0.919j) |
| 404 | (0.0615 − 0.167j) | (1.0147 + 0.464j) | (0.4309 + 0.1794j) |
| 405 | (0.0533 − 0.8948j) | (1.0147 − 0.464j) | (0.4309 + 0.1796j) |
| 406 | (0.0612 − 0.2829j) | (−1.0147 + 0.464j) | (0.4309 + 1.0561j) |
| 407 | (0.063 − 0.6656j) | (−1.0147 − 0.464j) | (0.4309 + 0.9201j) |
| 408 | (0.4544 − 0.1652j) | (0.5685 + 0.8988j) | (0.4309 − 0.0609j) |
| 409 | (0.4086 − 0.8704j) | (0.5685 − 0.8988j) | (0.4309 − 0.0607j) |
| 410 | (0.4516 − 0.2784j) | (−0.5685 + 0.8988j) | (0.4309 − 1.2271j) |
| 411 | (0.4257 − 0.7376j) | (−0.5685 − 0.8988j) | (0.4309 − 1.4453j) |
| 412 | (0.0618 − 0.167j) | (0.4732 + 0.9359j) | (0.4309 + 0.0601j) |
| 413 | (0.0689 − 0.8256j) | (0.4732 − 0.9359j) | (0.4309 + 0.0601j) |
| 414 | (0.062 − 0.2833j) | (−0.4732 + 0.9359j) | (0.4309 + 1.228j) |
| 415 | (0.0667 − 0.6992j) | (−0.4732 − 0.9359j) | (0.4309 + 1.4486j) |
| 416 | (0.4439 − 0.0568j) | (0.0634 + 0.1536j) | (0.4375 − 0.3051j) |
| 417 | (0.3929 − 1.1546j) | (0.0634 − 0.1536j) | (0.4375 − 0.3045j) |
| 418 | (0.437 − 0.3961j) | (−0.0634 + 0.1536j) | (0.4375 − 0.7193j) |
| 419 | (0.4346 − 0.5457j) | (−0.0634 − 0.1536j) | (0.4375 − 0.7851j) |
| 420 | (0.0611 − 0.0605j) | (0.0632 + 0.1535j) | (0.4375 + 0.3039j) |
| 421 | (0.0892 − 1.6511j) | (0.0632 − 0.1535j) | (0.4375 + 0.3027j) |
| 422 | (0.0617 − 0.4037j) | (−0.0632 + 0.1535j) | (0.4375 + 0.7189j) |
| 423 | (0.0627 − 0.5417j) | (−0.0632 − 0.1535j) | (0.4375 + 0.7866j) |
| 424 | (0.457 − 0.0577j) | (0.0541 + 0.2567j) | (0.4375 − 0.4316j) |
| 425 | (0.3778 − 1.3029j) | (0.0541 − 0.2567j) | (0.4375 − 0.4374j) |
| 426 | (0.4473 − 0.3989j) | (−0.0541 + 0.2567j) | (0.4375 − 0.5905j) |
| 427 | (0.4419 − 0.5263j) | (−0.0541 − 0.2567j) | (0.4375 − 0.5662j) |
| 428 | (0.0614 − 0.0588j) | (0.054 + 0.2567j) | (0.4375 + 0.4309j) |
| 429 | (0.0775 − 1.4648j) | (0.054 − 0.2567j) | (0.4375 + 0.4375j) |
| 430 | (0.0629 − 0.4063j) | (−0.054 + 0.2567j) | (0.4375 + 0.5905j) |
| 431 | (0.063 − 0.5307j) | (−0.054 − 0.2567j) | (0.4375 + 0.5676j) |
| 432 | (0.444 − 0.054j) | (0.898 + 0.6419j) | (0.4375 − 0.1795j) |
| 433 | (0.394 − 1.1154j) | (0.898 − 0.6419j) | (0.4375 − 0.1792j) |
| 434 | (0.4385 − 0.397j) | (−0.898 + 0.6419j) | (0.4375 − 1.0559j) |
| 435 | (0.4378 − 0.5465j) | (−0.898 − 0.6419j) | (0.4375 − 0.919j) |
| 436 | (0.0602 − 0.0583j) | (0.8263 + 0.7216j) | (0.4375 + 0.1794j) |
| 437 | (0.2731 − 1.6277j) | (0.8263 − 0.7216j) | (0.4375 + 0.1796j) |
| 438 | (0.063 − 0.403j) | (−0.8263 + 0.7216j) | (0.4375 + 1.0561j) |
| 439 | (0.0619 − 0.5397j) | (−0.8263 − 0.7216j) | (0.4375 + 0.9201j) |
| 440 | (0.4554 − 0.0547j) | (0.6605 + 0.8504j) | (0.4375 − 0.0609j) |
| 441 | (0.3334 − 1.4054j) | (0.6605 − 0.8504j) | (0.4375 − 0.0607j) |
| 442 | (0.4498 − 0.3989j) | (−0.6605 + 0.8504j) | (0.4375 − 1.2271j) |
| 443 | (0.4417 − 0.5261j) | (−0.6605 − 0.8504j) | (0.4375 − 1.4453j) |
| 444 | (0.0616 − 0.0581j) | (0.7468 + 0.7914j) | (0.4375 + 0.0601j) |
| 445 | (0.2143 − 1.4736j) | (0.7468 − 0.7914j) | (0.4375 + 0.0601j) |
| 446 | (0.061 − 0.4046j) | (−0.7468 + 0.7914j) | (0.4375 + 1.228j) |

-continued

| Mapping | NN_QSL | NN_QSC | NN_RSC |
|---|---|---|---|
| 447 | (0.062 − 0.5304j) | (−0.7468 − 0.7914j) | (0.4375 + 1.4486j) |
| 448 | (0.3132 − 0.164j) | (0.2991 + 0.1736j) | (0.5905 − 0.3051j) |
| 449 | (0.2604 − 0.982j) | (0.2991 − 0.1736j) | (0.5905 − 0.3045j) |
| 450 | (0.3108 − 0.2809j) | (−0.2991 + 0.1736j) | (0.5905 − 0.7193j) |
| 451 | (0.3091 − 0.6673j) | (−0.2991 − 0.1736j) | (0.5905 − 0.7851j) |
| 452 | (0.1819 − 0.1665j) | (0.2992 + 0.1734j) | (0.5905 + 0.3039j) |
| 453 | (0.1263 − 0.9664j) | (0.2992 − 0.1734j) | (0.5905 + 0.3027j) |
| 454 | (0.1843 − 0.2836j) | (−0.2992 + 0.1734j) | (0.5905 + 0.7189j) |
| 455 | (0.1856 − 0.6618j) | (−0.2992 − 0.1734j) | (0.5905 + 0.7866j) |
| 456 | (0.3109 − 0.1655j) | (0.2758 + 0.3148j) | (0.5905 − 0.4316j) |
| 457 | (0.2837 − 0.8602j) | (0.2758 − 0.3148j) | (0.5905 − 0.4374j) |
| 458 | (0.3092 − 0.2818j) | (−0.2758 + 0.3148j) | (0.5905 − 0.5905j) |
| 459 | (0.3043 − 0.7214j) | (−0.2758 − 0.3148j) | (0.5905 − 0.5662j) |
| 460 | (0.1834 − 0.1644j) | (0.2746 + 0.3175j) | (0.5905 + 0.4309j) |
| 461 | (0.1797 − 0.8393j) | (0.2746 − 0.3175j) | (0.5905 + 0.4375j) |
| 462 | (0.1849 − 0.2814j) | (−0.2746 + 0.3175j) | (0.5905 + 0.5905j) |
| 463 | (0.1876 − 0.7068j) | (−0.2746 − 0.3175j) | (0.5905 + 0.5676j) |
| 464 | (0.3116 − 0.1642j) | (1.2314 + 0.7518j) | (0.5905 − 0.1795j) |
| 465 | (0.2604 − 0.9862j) | (1.2314 − 0.7518j) | (0.5905 − 0.1792j) |
| 466 | (0.3111 − 0.2808j) | (−1.2314 + 0.7518j) | (0.5905 − 1.0559j) |
| 467 | (0.3083 − 0.6661j) | (−1.2314 − 0.7518j) | (0.5905 − 0.919j) |
| 468 | (0.1835 − 0.1672j) | (1.3049 + 0.6281j) | (0.5905 + 0.1794j) |
| 469 | (0.126 − 0.9679j) | (1.3049 − 0.6281j) | (0.5905 + 0.1796j) |
| 470 | (0.1839 − 0.2808j) | (−1.3049 + 0.6281j) | (0.5905 + 1.0561j) |
| 471 | (0.1864 − 0.6628j) | (−1.3049 − 0.6281j) | (0.5905 + 0.9201j) |
| 472 | (0.3116 − 0.1632j) | (0.7007 + 1.2053j) | (0.5905 − 0.0609j) |
| 473 | (0.2836 − 0.8595j) | (0.7007 − 1.2053j) | (0.5905 − 0.0607j) |
| 474 | (0.3092 − 0.2809j) | (−0.7007 + 1.2053j) | (0.5905 − 1.2271j) |
| 475 | (0.3035 − 0.7203j) | (−0.7007 − 1.2053j) | (0.5905 − 1.4453j) |
| 476 | (0.1826 − 0.1665j) | (0.5738 + 1.2552j) | (0.5905 + 0.0601j) |
| 477 | (0.177 − 0.8415j) | (0.5738 − 1.2552j) | (0.5905 + 0.0601j) |
| 478 | (0.1829 − 0.2848j) | (−0.5738 + 1.2552j) | (0.5905 + 1.228j) |
| 479 | (0.1866 − 0.7062j) | (−0.5738 − 1.2552j) | (0.5905 + 1.4486j) |
| 480 | (0.3145 − 0.0575j) | (0.3883 + 0.198j) | (0.5676 − 0.3051j) |
| 481 | (0.2424 − 1.1134j) | (0.3883 − 0.198j) | (0.5676 − 0.3045j) |
| 482 | (0.312 − 0.3975j) | (−0.3883 + 0.198j) | (0.5676 − 0.7193j) |
| 483 | (0.3147 − 0.5415j) | (−0.3883 − 0.198j) | (0.5676 − 0.7851j) |
| 484 | (0.1796 − 0.0577j) | (0.3884 + 0.1984j) | (0.5676 + 0.3039j) |
| 485 | (0.0776 − 1.1022j) | (0.3884 − 0.1984j) | (0.5676 + 0.3027j) |
| 486 | (0.1846 − 0.4j) | (−0.3884 + 0.1984j) | (0.5676 + 0.7189j) |
| 487 | (0.1857 − 0.5404j) | (−0.3884 − 0.1984j) | (0.5676 + 0.7866j) |
| 488 | (0.3098 − 0.0574j) | (0.3488 + 0.3029j) | (0.5676 − 0.4316j) |
| 489 | (0.2299 − 1.2495j) | (0.3488 − 0.3029j) | (0.5676 − 0.4374j) |
| 490 | (0.3106 − 0.4026j) | (−0.3488 + 0.3029j) | (0.5676 − 0.5905j) |
| 491 | (0.3109 − 0.5257j) | (−0.3488 − 0.3029j) | (0.5676 − 0.5662j) |
| 492 | (0.1835 − 0.0579j) | (0.3495 + 0.302j) | (0.5676 + 0.4309j) |
| 493 | (0.0742 − 1.2921j) | (0.3495 − 0.302j) | (0.5676 + 0.4375j) |
| 494 | (0.1855 − 0.4017j) | (−0.3495 + 0.302j) | (0.5676 + 0.5905j) |
| 495 | (0.1829 − 0.5297j) | (−0.3495 − 0.302j) | (0.5676 + 0.5676j) |
| 496 | (0.3118 − 0.0592j) | (1.1443 + 0.8653j) | (0.5676 − 0.1795j) |
| 497 | (0.2395 − 1.1147j) | (1.1443 − 0.8653j) | (0.5676 − 0.1792j) |
| 498 | (0.3123 − 0.398j) | (−1.1443 + 0.8653j) | (0.5676 − 1.0559j) |
| 499 | (0.3136 − 0.5422j) | (−1.1443 − 0.8653j) | (0.5676 − 0.919j) |
| 500 | (0.1816 − 0.0607j) | (1.0475 + 0.9694j) | (0.5676 + 0.1794j) |
| 501 | (0.0773 − 1.1108j) | (1.0475 − 0.9694j) | (0.5676 + 0.1796j) |
| 502 | (0.185 − 0.3996j) | (−1.0475 + 0.9694j) | (0.5676 + 1.0561j) |
| 503 | (0.186 − 0.5408j) | (−1.0475 − 0.9694j) | (0.5676 + 0.9201j) |
| 504 | (0.3115 − 0.0555j) | (0.8236 + 1.1404j) | (0.5676 − 0.0609j) |
| 505 | (0.2196 − 1.2598j) | (0.8236 − 1.1404j) | (0.5676 − 0.0607j) |
| 506 | (0.3106 − 0.4051j) | (−0.8236 + 1.1404j) | (0.5676 − 1.2271j) |
| 507 | (0.3088 − 0.5263j) | (−0.8236 − 1.1404j) | (0.5676 − 1.4453j) |
| 508 | (0.1827 − 0.0583j) | (0.9399 + 1.062j) | (0.5676 + 0.0601j) |
| 509 | (0.0816 − 1.2601j) | (0.9399 − 1.062j) | (0.5676 + 0.0601j) |
| 510 | (0.1833 − 0.4008j) | (−0.9399 + 1.062j) | (0.5676 + 1.228j) |
| 511 | (0.1861 − 0.5291j) | (−0.9399 − 1.062j) | (0.5676 + 1.4486j) |
| 512 | (−0.6227 + 0.1645j) | (0.8321 + 0.193j) | (−0.1795 − 0.3051j) |
| 513 | (−0.5436 + 0.9862j) | (0.8321 − 0.193j) | (−0.1795 − 0.3045j) |
| 514 | (−0.6129 + 0.2814j) | (−0.8321 + 0.193j) | (−0.1795 − 0.7193j) |
| 515 | (−0.5663 + 0.6799j) | (−0.8321 − 0.193j) | (−0.1795 − 0.7851j) |
| 516 | (−1.2862 + 0.2201j) | (0.8151 + 0.2453j) | (−0.1795 + 0.3039j) |
| 517 | (−1.0365 + 0.9846j) | (0.8151 − 0.2453j) | (−0.1795 + 0.3027j) |
| 518 | (−1.2651 + 0.3694j) | (−0.8151 + 0.2453j) | (−0.1795 + 0.7189j) |
| 519 | (−1.1121 + 0.8407j) | (−0.8151 − 0.2453j) | (−0.1795 + 0.7866j) |
| 520 | (−0.5867 + 0.1624j) | (0.2429 + 0.7216j) | (−0.1795 − 0.4316j) |
| 521 | (−0.5516 + 0.8732j) | (0.2429 − 0.7216j) | (−0.1795 − 0.4374j) |
| 522 | (−0.5798 + 0.2789j) | (−0.2429 + 0.7216j) | (−0.1795 − 0.5905j) |
| 523 | (−0.5544 + 0.7452j) | (−0.2429 − 0.7216j) | (−0.1795 − 0.5662j) |

-continued

| Mapping | NN_QSL | NN_QSC | NN_RSC |
| --- | --- | --- | --- |
| 524 | (−1.7794 + 0.2913j) | (0.3191 + 0.6989j) | (−0.1795 + 0.4309j) |
| 525 | (−1.3142 + 1.3286j) | (0.3191 − 0.6989j) | (−0.1795 + 0.4375j) |
| 526 | (−1.7442 + 0.4947j) | (−0.3191 + 0.6989j) | (−0.1795 + 0.5905j) |
| 527 | (−1.4975 + 1.1188j) | (−0.3191 − 0.6989j) | (−0.1795 + 0.5676j) |
| 528 | (−0.6252 + 0.1641j) | (0.9202 + 0.2151j) | (−0.1795 − 0.1795j) |
| 529 | (−0.5423 + 0.9986j) | (0.9202 − 0.2151j) | (−0.1795 − 0.1792j) |
| 530 | (−0.6136 + 0.2813j) | (−0.9202 + 0.2151j) | (−0.1795 − 1.0559j) |
| 531 | (−0.5675 + 0.6818j) | (−0.9202 − 0.2151j) | (−0.1795 − 0.919j) |
| 532 | (−1.4072 + 0.2385j) | (0.8955 + 0.29j) | (−0.1795 + 0.1794j) |
| 533 | (−1.0931 + 1.0525j) | (0.8955 − 0.29j) | (−0.1795 + 0.1796j) |
| 534 | (−1.3798 + 0.3969j) | (−0.8955 + 0.29j) | (−0.1795 + 1.0561j) |
| 535 | (−1.2017 + 0.8794j) | (−0.8955 − 0.29j) | (−0.1795 + 0.9201j) |
| 536 | (−0.5868 + 0.1631j) | (0.2587 + 0.82j) | (−0.1795 − 0.0609j) |
| 537 | (−0.5538 + 0.8711j) | (0.2587 − 0.82j) | (−0.1795 − 0.0607j) |
| 538 | (−0.5818 + 0.2804j) | (−0.2587 + 0.82j) | (−0.1795 − 1.2271j) |
| 539 | (−0.5562 + 0.7436j) | (−0.2587 − 0.82j) | (−0.1795 − 1.4453j) |
| 540 | (−1.574 + 0.2573j) | (0.3448 + 0.7935j) | (−0.1795 + 0.0601j) |
| 541 | (−1.2295 + 1.1433j) | (0.3448 − 0.7935j) | (−0.1795 + 0.0601j) |
| 542 | (−1.544 + 0.4427j) | (−0.3448 + 0.7935j) | (−0.1795 + 1.228j) |
| 543 | (−1.3376 + 0.9743j) | (−0.3448 − 0.7935j) | (−0.1795 + 1.4486j) |
| 544 | (−0.628 + 0.0558j) | (0.8526 + 0.0967j) | (−0.1792 − 0.3051j) |
| 545 | (−0.5287 + 1.1843j) | (0.8526 − 0.0967j) | (−0.1792 − 0.3045j) |
| 546 | (−0.6062 + 0.4018j) | (−0.8526 + 0.0967j) | (−0.1792 − 0.7193j) |
| 547 | (−0.5817 + 0.5451j) | (−0.8526 − 0.0967j) | (−0.1792 − 0.7851j) |
| 548 | (−1.3006 + 0.0729j) | (0.8582 + 0.0486j) | (−0.1792 + 0.3039j) |
| 549 | (−0.1272 + 1.8556j) | (0.8582 − 0.0486j) | (−0.1792 + 0.3027j) |
| 550 | (−1.231 + 0.5136j) | (−0.8582 + 0.0486j) | (−0.1792 + 0.7189j) |
| 551 | (−1.1874 + 0.6662j) | (−0.8582 − 0.0486j) | (−0.1792 + 0.7866j) |
| 552 | (−0.5897 + 0.0577j) | (0.1472 + 0.7455j) | (−0.1792 − 0.4316j) |
| 553 | (−0.5169 + 1.3322j) | (0.1472 − 0.7455j) | (−0.1792 − 0.4374j) |
| 554 | (−0.5752 + 0.4027j) | (−0.1472 + 0.7455j) | (−0.1792 − 0.5905j) |
| 555 | (−0.5606 + 0.5245j) | (−0.1472 − 0.7455j) | (−0.1792 − 0.5662j) |
| 556 | (−1.7966 + 0.0968j) | (0.0513 + 0.7587j) | (−0.1792 + 0.4309j) |
| 557 | (−0.8231 + 1.7139j) | (0.0513 − 0.7587j) | (−0.1792 + 0.4375j) |
| 558 | (−1.6882 + 0.6974j) | (−0.0513 + 0.7587j) | (−0.1792 + 0.5905j) |
| 559 | (−1.6057 + 0.905j) | (−0.0513 − 0.7587j) | (−0.1792 + 0.5676j) |
| 560 | (−0.6265 + 0.0547j) | (0.9408 + 0.1226j) | (−0.1792 − 0.1795j) |
| 561 | (−0.5314 + 1.131j) | (0.9408 − 0.1226j) | (−0.1792 − 0.1792j) |
| 562 | (−0.6086 + 0.402j) | (−0.9408 + 0.1226j) | (−0.1792 − 1.0559j) |
| 563 | (−0.5832 + 0.5446j) | (−0.9408 − 0.1226j) | (−0.1792 − 0.919j) |
| 564 | (−1.4219 + 0.0793j) | (0.9496 + 0.047j) | (−0.1792 + 0.1794j) |
| 565 | (−0.3738 + 1.8028j) | (0.9496 − 0.047j) | (−0.1792 + 0.1796j) |
| 566 | (−1.3453 + 0.5519j) | (−0.9496 + 0.047j) | (−0.1792 + 1.0561j) |
| 567 | (−1.2785 + 0.7176j) | (−0.9496 − 0.047j) | (−0.1792 + 0.9201j) |
| 568 | (−0.5885 + 0.0554j) | (0.1603 + 0.8422j) | (−0.1792 − 0.0609j) |
| 569 | (−0.4892 + 1.4833j) | (0.1603 − 0.8422j) | (−0.1792 − 0.0607j) |
| 570 | (−0.5776 + 0.4018j) | (−0.1603 + 0.8422j) | (−0.1792 − 1.2271j) |
| 571 | (−0.5652 + 0.527j) | (−0.1603 − 0.8422j) | (−0.1792 − 1.4453j) |
| 572 | (−1.5881 + 0.0862j) | (0.0544 + 0.8559j) | (−0.1792 + 0.0601j) |
| 573 | (−0.5614 + 1.6802j) | (0.0544 − 0.8559j) | (−0.1792 + 0.0601j) |
| 574 | (−1.4975 + 0.6188j) | (−0.0544 + 0.8559j) | (−0.1792 + 1.228j) |
| 575 | (−1.4256 + 0.7973j) | (−0.0544 − 0.8559j) | (−0.1792 + 1.4486j) |
| 576 | (−0.7542 + 0.1663j) | (0.5835 + 0.145j) | (−1.0559 − 0.3051j) |
| 577 | (−0.6935 + 1.0034j) | (0.5835 − 0.145j) | (−1.0559 − 0.3045j) |
| 578 | (−0.7436 + 0.2856j) | (−0.5835 + 0.145j) | (−1.0559 − 0.7193j) |
| 579 | (−0.6843 + 0.6705j) | (−0.5835 − 0.145j) | (−1.0559 − 0.7851j) |
| 580 | (−1.1569 + 0.2004j) | (0.5837 + 0.1468j) | (−1.0559 + 0.3039j) |
| 581 | (−0.892 + 1.0205j) | (0.5837 − 0.1468j) | (−1.0559 + 0.3027j) |
| 582 | (−1.1324 + 0.3418j) | (−0.5837 + 0.1468j) | (−1.0559 + 0.7189j) |
| 583 | (−1.0142 + 0.7744j) | (−0.5837 − 0.1468j) | (−1.0559 + 0.7866j) |
| 584 | (−0.8411 + 0.1733j) | (0.2107 + 0.5776j) | (−1.0559 − 0.4316j) |
| 585 | (−0.704 + 0.8771j) | (0.2107 − 0.5776j) | (−1.0559 − 0.4374j) |
| 586 | (−0.8307 + 0.2961j) | (−0.2107 + 0.5776j) | (−1.0559 − 0.5905j) |
| 587 | (−0.7238 + 0.7219j) | (−0.2107 − 0.5776j) | (−1.0559 − 0.5662j) |
| 588 | (−0.9702 + 0.1841j) | (0.2541 + 0.5487j) | (−1.0559 + 0.4309j) |
| 589 | (−0.8433 + 0.8757j) | (0.2541 − 0.5487j) | (−1.0559 + 0.4375j) |
| 590 | (−0.9553 + 0.3136j) | (−0.2541 + 0.5487j) | (−1.0559 + 0.5905j) |
| 591 | (−0.8687 + 0.7403j) | (−0.2541 − 0.5487j) | (−1.0559 + 0.5676j) |
| 592 | (−0.7512 + 0.1657j) | (1.7239 + 0.449j) | (−1.0559 − 0.1795j) |
| 593 | (−0.6981 + 1.0166j) | (1.7239 − 0.449j) | (−1.0559 − 0.1792j) |
| 594 | (−0.7443 + 0.2868j) | (−1.7239 + 0.449j) | (−1.0559 − 1.0559j) |
| 595 | (−0.6877 + 0.6784j) | (−1.7239 − 0.449j) | (−1.0559 − 0.919j) |
| 596 | (−1.1052 + 0.197j) | (1.6668 + 0.6204j) | (−1.0559 + 0.1794j) |
| 597 | (−0.8631 + 1.0063j) | (1.6668 − 0.6204j) | (−1.0559 + 0.1796j) |
| 598 | (−1.0823 + 0.3312j) | (−1.6668 + 0.6204j) | (−1.0559 + 1.0561j) |
| 599 | (−0.9851 + 0.7489j) | (−1.6668 − 0.6204j) | (−1.0559 + 0.9201j) |
| 600 | (−0.8419 + 0.1741j) | (0.3776 + 1.6445j) | (−1.0559 − 0.0609j) |

-continued

| Mapping | NN_QSL | NN_QSC | NN_RSC |
|---|---|---|---|
| 601 | (−0.7023 + 0.8722j) | (0.3776 − 1.6445j) | (−1.0559 − 0.0607j) |
| 602 | (−0.8243 + 0.2959j) | (−0.3776 + 1.6445j) | (−1.0559 − 1.2271j) |
| 603 | (−0.7203 + 0.7251j) | (−0.3776 − 1.6445j) | (−1.0559 − 1.4453j) |
| 604 | (−0.9876 + 0.1862j) | (0.5319 + 1.6115j) | (−1.0559 + 0.0601j) |
| 605 | (−0.8441 + 0.8814j) | (0.5319 − 1.6115j) | (−1.0559 + 0.0601j) |
| 606 | (−0.9688 + 0.3144j) | (−0.5319 + 1.6115j) | (−1.0559 + 1.228j) |
| 607 | (−0.8788 + 0.7414j) | (−0.5319 − 1.6115j) | (−1.0559 + 1.4486j) |
| 608 | (−0.7574 + 0.0547j) | (0.5584 + 0.0608j) | (−0.919 − 0.3051j) |
| 609 | (−0.7036 + 1.1955j) | (0.5584 − 0.0608j) | (−0.919 − 0.3045j) |
| 610 | (−0.7332 + 0.4129j) | (−0.5584 + 0.0608j) | (−0.919 − 0.7193j) |
| 611 | (−0.7094 + 0.5524j) | (−0.5584 − 0.0608j) | (−0.919 − 0.7851j) |
| 612 | (−1.1685 + 0.0665j) | (0.5584 + 0.0594j) | (−0.919 + 0.3039j) |
| 613 | (−0.8661 + 1.1985j) | (0.5584 − 0.0594j) | (−0.919 + 0.3027j) |
| 614 | (−1.0999 + 0.4799j) | (−0.5584 + 0.0594j) | (−0.919 + 0.7189j) |
| 615 | (−1.0732 + 0.6266j) | (−0.5584 − 0.0594j) | (−0.919 + 0.7866j) |
| 616 | (−0.8522 + 0.0583j) | (0.113 + 0.621j) | (−0.919 − 0.4316j) |
| 617 | (−0.6738 + 1.331j) | (0.113 − 0.621j) | (−0.919 − 0.4374j) |
| 618 | (−0.8097 + 0.4242j) | (−0.113 + 0.621j) | (−0.919 − 0.5905j) |
| 619 | (−0.7853 + 0.5572j) | (−0.113 − 0.621j) | (−0.919 − 0.5662j) |
| 620 | (−0.9772 + 0.0605j) | (0.0488 + 0.6357j) | (−0.919 + 0.4309j) |
| 621 | (−1.0775 + 1.5207j) | (0.0488 − 0.6357j) | (−0.919 + 0.4375j) |
| 622 | (−0.9325 + 0.4453j) | (−0.0488 + 0.6357j) | (−0.919 + 0.5905j) |
| 623 | (−0.9066 + 0.5865j) | (−0.0488 − 0.6357j) | (−0.919 + 0.5676j) |
| 624 | (−0.7569 + 0.0541j) | (1.7619 + 0.2717j) | (−0.919 − 0.1795j) |
| 625 | (−0.68 + 1.1391j) | (1.7619 − 0.2717j) | (−0.919 − 0.1792j) |
| 626 | (−0.7355 + 0.4136j) | (−1.7619 + 0.2717j) | (−0.919 − 1.0559j) |
| 627 | (−0.7132 + 0.5556j) | (−1.7619 − 0.2717j) | (−0.919 − 0.919j) |
| 628 | (−1.1174 + 0.0638j) | (1.7821 + 0.0908j) | (−0.919 + 0.1794j) |
| 629 | (−0.9889 + 1.2725j) | (1.7821 − 0.0908j) | (−0.919 + 0.1796j) |
| 630 | (−1.0597 + 0.4682j) | (−1.7821 + 0.0908j) | (−0.919 + 1.0561j) |
| 631 | (−1.0311 + 0.616j) | (−1.7821 − 0.0908j) | (−0.919 + 0.9201j) |
| 632 | (−0.8497 + 0.0561j) | (0.2251 + 1.6619j) | (−0.919 − 0.0609j) |
| 633 | (−0.6858 + 1.4691j) | (0.2251 − 1.6619j) | (−0.919 − 0.0607j) |
| 634 | (−0.8029 + 0.424j) | (−0.2251 + 1.6619j) | (−0.919 − 1.2271j) |
| 635 | (−0.7825 + 0.5601j) | (−0.2251 − 1.6619j) | (−0.919 − 1.4453j) |
| 636 | (−0.9912 + 0.0613j) | (0.0747 + 1.6718j) | (−0.919 + 0.0601j) |
| 637 | (−0.8802 + 1.4402j) | (0.0747 − 1.6718j) | (−0.919 + 0.0601j) |
| 638 | (−0.944 + 0.446j) | (−0.0747 + 1.6718j) | (−0.919 + 1.228j) |
| 639 | (−0.9145 + 0.5877j) | (−0.0747 − 1.6718j) | (−0.919 + 1.4486j) |
| 640 | (0.6235 + 0.1649j) | (0.7504 + 0.1738j) | (0.1794 − 0.3051j) |
| 641 | (0.5445 + 0.9871j) | (0.7504 − 0.1738j) | (0.1794 − 0.3045j) |
| 642 | (0.6165 + 0.2839j) | (−0.7504 + 0.1738j) | (0.1794 − 0.7193j) |
| 643 | (0.5678 + 0.6808j) | (−0.7504 − 0.1738j) | (0.1794 − 0.7851j) |
| 644 | (1.2839 + 0.2269j) | (0.7429 + 0.2033j) | (0.1794 + 0.3039j) |
| 645 | (1.0357 + 0.9897j) | (0.7429 − 0.2033j) | (0.1794 + 0.3027j) |
| 646 | (1.264 + 0.3765j) | (−0.7429 + 0.2033j) | (0.1794 + 0.7189j) |
| 647 | (1.1137 + 0.8483j) | (−0.7429 − 0.2033j) | (0.1794 + 0.7866j) |
| 648 | (0.5856 + 0.1664j) | (0.2368 + 0.6902j) | (0.1794 − 0.4316j) |
| 649 | (0.5534 + 0.8718j) | (0.2368 − 0.6902j) | (0.1794 − 0.4374j) |
| 650 | (0.5822 + 0.2813j) | (−0.2368 + 0.6902j) | (0.1794 − 0.5905j) |
| 651 | (0.5561 + 0.7489j) | (−0.2368 − 0.6902j) | (0.1794 − 0.5662j) |
| 652 | (1.7789 + 0.3004j) | (0.3057 + 0.6584j) | (0.1794 + 0.4309j) |
| 653 | (1.3158 + 1.3361j) | (0.3057 − 0.6584j) | (0.1794 + 0.4375j) |
| 654 | (1.7471 + 0.5029j) | (−0.3057 + 0.6584j) | (0.1794 + 0.5905j) |
| 655 | (1.5019 + 1.1286j) | (−0.3057 − 0.6584j) | (0.1794 + 0.5676j) |
| 656 | (0.6222 + 0.1662j) | (1.0031 + 0.2389j) | (0.1794 − 0.1795j) |
| 657 | (0.5436 + 1.0014j) | (1.0031 − 0.2389j) | (0.1794 − 0.1792j) |
| 658 | (0.6183 + 0.2826j) | (−1.0031 + 0.2389j) | (0.1794 − 1.0559j) |
| 659 | (0.5658 + 0.6807j) | (−1.0031 − 0.2389j) | (0.1794 − 0.919j) |
| 660 | (1.4032 + 0.2435j) | (0.9725 + 0.3279j) | (0.1794 + 0.1794j) |
| 661 | (1.0963 + 1.0564j) | (0.9725 − 0.3279j) | (0.1794 + 0.1796j) |
| 662 | (1.383 + 0.4027j) | (−0.9725 + 0.3279j) | (0.1794 + 1.0561j) |
| 663 | (1.202 + 0.883j) | (−0.9725 − 0.3279j) | (0.1794 + 0.9201j) |
| 664 | (0.5828 + 0.1664j) | (0.2642 + 0.8819j) | (0.1794 − 0.0609j) |
| 665 | (0.5514 + 0.8708j) | (0.2642 − 0.8819j) | (0.1794 − 0.0607j) |
| 666 | (0.5814 + 0.2799j) | (−0.2642 + 0.8819j) | (0.1794 − 1.2271j) |
| 667 | (0.5548 + 0.746j) | (−0.2642 − 0.8819j) | (0.1794 − 1.4453j) |
| 668 | (1.5686 + 0.2684j) | (0.3578 + 0.8654j) | (0.1794 + 0.0601j) |
| 669 | (1.228 + 1.1483j) | (0.3578 − 0.8654j) | (0.1794 + 0.0601j) |
| 670 | (1.5442 + 0.4492j) | (−0.3578 + 0.8654j) | (0.1794 + 1.228j) |
| 671 | (1.3328 + 0.9769j) | (−0.3578 − 0.8654j) | (0.1794 + 1.4486j) |
| 672 | (0.6261 + 0.0567j) | (0.7641 + 0.0701j) | (0.1796 − 0.3051j) |
| 673 | (0.5291 + 1.1814j) | (0.7641 − 0.0701j) | (0.1796 − 0.3045j) |
| 674 | (0.609 + 0.4066j) | (−0.7641 + 0.0701j) | (0.1796 − 0.7193j) |
| 675 | (0.5827 + 0.5481j) | (−0.7641 − 0.0701j) | (0.1796 − 0.7851j) |
| 676 | (1.2988 + 0.0783j) | (0.7659 + 0.0487j) | (0.1796 + 0.3039j) |
| 677 | (0.1337 + 1.8634j) | (0.7659 − 0.0487j) | (0.1796 + 0.3027j) |

-continued

| Mapping | NN_QSL | NN_QSC | NN_RSC |
|---|---|---|---|
| 678 | (1.2328 + 0.5201j) | (−0.7659 + 0.0487j) | (0.1796 + 0.7189j) |
| 679 | (1.1891 + 0.671j) | (−0.7659 − 0.0487j) | (0.1796 + 0.7866j) |
| 680 | (0.5865 + 0.0563j) | (0.1431 + 0.7251j) | (0.1796 − 0.4316j) |
| 681 | (0.5176 + 1.3243j) | (0.1431 − 0.7251j) | (0.1796 − 0.4374j) |
| 682 | (0.5713 + 0.403j) | (−0.1431 + 0.7251j) | (0.1796 − 0.5905j) |
| 683 | (0.5633 + 0.5286j) | (−0.1431 − 0.7251j) | (0.1796 − 0.5662j) |
| 684 | (1.7888 + 0.1044j) | (0.0506 + 0.7433j) | (0.1796 + 0.4309j) |
| 685 | (0.829 + 1.7154j) | (0.0506 − 0.7433j) | (0.1796 + 0.4375j) |
| 686 | (1.6889 + 0.7064j) | (−0.0506 + 0.7433j) | (0.1796 + 0.5905j) |
| 687 | (1.6085 + 0.9071j) | (−0.0506 − 0.7433j) | (0.1796 + 0.5676j) |
| 688 | (0.626 + 0.0571j) | (1.0258 + 0.1432j) | (0.1796 − 0.1795j) |
| 689 | (0.5386 + 1.1329j) | (1.0258 − 0.1432j) | (0.1796 − 0.1792j) |
| 690 | (0.607 + 0.4048j) | (−1.0258 + 0.1432j) | (0.1796 − 1.0559j) |
| 691 | (0.5823 + 0.5452j) | (−1.0258 − 0.1432j) | (0.1796 − 0.919j) |
| 692 | (1.4175 + 0.0845j) | (1.0364 + 0.0494j) | (0.1796 + 0.1794j) |
| 693 | (0.3747 + 1.7968j) | (1.0364 − 0.0494j) | (0.1796 + 0.1796j) |
| 694 | (1.3445 + 0.5598j) | (−1.0364 + 0.0494j) | (0.1796 + 1.0561j) |
| 695 | (1.2785 + 0.7205j) | (−1.0364 − 0.0494j) | (0.1796 + 0.9201j) |
| 696 | (0.5876 + 0.0571j) | (0.1624 + 0.8923j) | (0.1796 − 0.0609j) |
| 697 | (0.4965 + 1.4819j) | (0.1624 − 0.8923j) | (0.1796 − 0.0607j) |
| 698 | (0.575 + 0.4038j) | (−0.1624 + 0.8923j) | (0.1796 − 1.2271j) |
| 699 | (0.5618 + 0.5281j) | (−0.1624 − 0.8923j) | (0.1796 − 1.4453j) |
| 700 | (1.5817 + 0.0942j) | (0.0553 + 0.8988j) | (0.1796 + 0.0601j) |
| 701 | (0.5631 + 1.679j) | (0.0553 − 0.8988j) | (0.1796 + 0.0601j) |
| 702 | (1.491 + 0.6223j) | (−0.0553 + 0.8988j) | (0.1796 + 1.228j) |
| 703 | (1.4216 + 0.7997j) | (−0.0553 − 0.8988j) | (0.1796 + 1.4486j) |
| 704 | (0.7485 + 0.1703j) | (0.6607 + 0.1535j) | (1.0561 − 0.3051j) |
| 705 | (0.6949 + 1.0025j) | (0.6607 − 0.1535j) | (1.0561 − 0.3045j) |
| 706 | (0.7435 + 0.2913j) | (−0.6607 + 0.1535j) | (1.0561 − 0.7193j) |
| 707 | (0.6888 + 0.6815j) | (−0.6607 − 0.1535j) | (1.0561 − 0.7851j) |
| 708 | (1.1533 + 0.2081j) | (0.6594 + 0.163j) | (1.0561 + 0.3039j) |
| 709 | (0.8978 + 1.0283j) | (0.6594 − 0.163j) | (1.0561 + 0.3027j) |
| 710 | (1.1333 + 0.3461j) | (−0.6594 + 0.163j) | (1.0561 + 0.7189j) |
| 711 | (1.0119 + 0.7766j) | (−0.6594 − 0.163j) | (1.0561 + 0.7866j) |
| 712 | (0.8414 + 0.1771j) | (0.2136 + 0.59j) | (1.0561 − 0.4316j) |
| 713 | (0.7032 + 0.8792j) | (0.2136 − 0.59j) | (1.0561 − 0.4374j) |
| 714 | (0.8286 + 0.2992j) | (−0.2136 + 0.59j) | (1.0561 − 0.5905j) |
| 715 | (0.7299 + 0.7291j) | (−0.2136 − 0.59j) | (1.0561 − 0.5662j) |
| 716 | (0.9611 + 0.1876j) | (0.2638 + 0.568j) | (1.0561 + 0.4309j) |
| 717 | (0.8455 + 0.8827j) | (0.2638 − 0.568j) | (1.0561 + 0.4375j) |
| 718 | (0.9556 + 0.3162j) | (−0.2638 + 0.568j) | (1.0561 + 0.5905j) |
| 719 | (0.8702 + 0.7449j) | (−0.2638 − 0.568j) | (1.0561 + 0.5676j) |
| 720 | (0.7511 + 0.1706j) | (1.5512 + 0.4002j) | (1.0561 − 0.1795j) |
| 721 | (0.6959 + 1.013j) | (1.5512 − 0.4002j) | (1.0561 − 0.1792j) |
| 722 | (0.7428 + 0.2911j) | (−1.5512 + 0.4002j) | (1.0561 − 1.0559j) |
| 723 | (0.6864 + 0.6795j) | (−1.5512 − 0.4002j) | (1.0561 − 0.919j) |
| 724 | (1.1016 + 0.2011j) | (1.5002 + 0.553j) | (1.0561 + 0.1794j) |
| 725 | (0.8637 + 1.0087j) | (1.5002 − 0.553j) | (1.0561 + 0.1796j) |
| 726 | (1.0881 + 0.3373j) | (−1.5002 + 0.553j) | (1.0561 + 1.0561j) |
| 727 | (0.9844 + 0.7545j) | (−1.5002 − 0.553j) | (1.0561 + 0.9201j) |
| 728 | (0.8387 + 0.1788j) | (0.3436 + 1.4636j) | (1.0561 − 0.0609j) |
| 729 | (0.7083 + 0.8765j) | (0.3436 − 1.4636j) | (1.0561 − 0.0607j) |
| 730 | (0.8235 + 0.2991j) | (−0.3436 + 1.4636j) | (1.0561 − 1.2271j) |
| 731 | (0.7284 + 0.7308j) | (−0.3436 − 1.4636j) | (1.0561 − 1.4453j) |
| 732 | (0.9821 + 0.1904j) | (0.4838 + 1.4363j) | (1.0561 + 0.0601j) |
| 733 | (0.8396 + 0.8832j) | (0.4838 − 1.4363j) | (1.0561 + 0.0601j) |
| 734 | (0.9681 + 0.3202j) | (−0.4838 + 1.4363j) | (1.0561 + 1.228j) |
| 735 | (0.8756 + 0.7423j) | (−0.4838 − 1.4363j) | (1.0561 + 1.4486j) |
| 736 | (0.7564 + 0.0581j) | (0.6607 + 0.0514j) | (0.9201 − 0.3051j) |
| 737 | (0.7053 + 1.1983j) | (0.6607 − 0.0514j) | (0.9201 − 0.3045j) |
| 738 | (0.7309 + 0.4158j) | (−0.6607 + 0.0514j) | (0.9201 − 0.7193j) |
| 739 | (0.7138 + 0.5587j) | (−0.6607 − 0.0514j) | (0.9201 − 0.7851j) |
| 740 | (1.1628 + 0.0706j) | (0.6602 + 0.0461j) | (0.9201 + 0.3039j) |
| 741 | (0.8686 + 1.2002j) | (0.6602 − 0.0461j) | (0.9201 + 0.3027j) |
| 742 | (1.0982 + 0.4839j) | (−0.6602 + 0.0461j) | (0.9201 + 0.7189j) |
| 743 | (1.0677 + 0.6266j) | (−0.6602 − 0.0461j) | (0.9201 + 0.7866j) |
| 744 | (0.8457 + 0.0608j) | (0.1171 + 0.6262j) | (0.9201 − 0.4316j) |
| 745 | (0.6732 + 1.335j) | (0.1171 − 0.6262j) | (0.9201 − 0.4374j) |
| 746 | (0.803 + 0.4271j) | (−0.1171 + 0.6262j) | (0.9201 − 0.5905j) |
| 747 | (0.7832 + 0.5618j) | (−0.1171 − 0.6262j) | (0.9201 − 0.5662j) |
| 748 | (0.9769 + 0.0649j) | (0.0496 + 0.6408j) | (0.9201 + 0.4309j) |
| 749 | (1.0787 + 1.5235j) | (0.0496 − 0.6408j) | (0.9201 + 0.4375j) |
| 750 | (0.9336 + 0.4458j) | (−0.0496 + 0.6408j) | (0.9201 + 0.5905j) |
| 751 | (0.9033 + 0.5861j) | (−0.0496 − 0.6408j) | (0.9201 + 0.5676j) |
| 752 | (0.756 + 0.0579j) | (1.5854 + 0.2423j) | (0.9201 − 0.1795j) |
| 753 | (0.6833 + 1.1387j) | (1.5854 − 0.2423j) | (0.9201 − 0.1792j) |
| 754 | (0.7302 + 0.4161j) | (−1.5854 + 0.2423j) | (0.9201 − 1.0559j) |

-continued

| Mapping | NN_QSL | NN_QSC | NN_RSC |
|---|---|---|---|
| 755 | (0.7097 + 0.5568j) | (−1.5854 − 0.2423j) | (0.9201 − 0.919j) |
| 756 | (1.1158 + 0.0685j) | (1.6031 + 0.0814j) | (0.9201 + 0.1794j) |
| 757 | (0.9888 + 1.2766j) | (1.6031 − 0.0814j) | (0.9201 + 0.1796j) |
| 758 | (1.0607 + 0.4725j) | (−1.6031 + 0.0814j) | (0.9201 + 1.0561j) |
| 759 | (1.0274 + 0.6189j) | (−1.6031 − 0.0814j) | (0.9201 + 0.9201j) |
| 760 | (0.8466 + 0.0606j) | (0.2051 + 1.4802j) | (0.9201 − 0.0609j) |
| 761 | (0.6926 + 1.4691j) | (0.2051 − 1.4802j) | (0.9201 − 0.0607j) |
| 762 | (0.8017 + 0.4262j) | (−0.2051 + 1.4802j) | (0.9201 − 1.2271j) |
| 763 | (0.7827 + 0.5603j) | (−0.2051 − 1.4802j) | (0.9201 − 1.4453j) |
| 764 | (0.9963 + 0.0648j) | (0.0679 + 1.4881j) | (0.9201 + 0.0601j) |
| 765 | (0.8816 + 1.4415j) | (0.0679 − 1.4881j) | (0.9201 + 0.0601j) |
| 766 | (0.9456 + 0.4497j) | (−0.0679 + 1.4881j) | (0.9201 + 1.228j) |
| 767 | (0.9113 + 0.5881j) | (−0.0679 − 1.4881j) | (0.9201 + 1.4486j) |
| 768 | (−0.6256 − 0.166j) | (0.7488 + 0.3906j) | (−0.0609 − 0.3051j) |
| 769 | (−0.5474 − 0.9834j) | (0.7488 − 0.3906j) | (−0.0609 − 0.3045j) |
| 770 | (−0.6184 − 0.2849j) | (−0.7488 + 0.3906j) | (−0.0609 − 0.7193j) |
| 771 | (−0.5681 − 0.6794j) | (−0.7488 − 0.3906j) | (−0.0609 − 0.7851j) |
| 772 | (−1.2913 − 0.2246j) | (0.7767 + 0.3382j) | (−0.0609 + 0.3039j) |
| 773 | (−1.035 − 0.9873j) | (0.7767 − 0.3382j) | (−0.0609 + 0.3027j) |
| 774 | (−1.2698 − 0.3685j) | (−0.7767 + 0.3382j) | (−0.0609 + 0.7189j) |
| 775 | (−1.1142 − 0.8464j) | (−0.7767 − 0.3382j) | (−0.0609 + 0.7866j) |
| 776 | (−0.5875 − 0.1646j) | (0.4634 + 0.6444j) | (−0.0609 − 0.4316j) |
| 777 | (−0.5563 − 0.8753j) | (0.4634 − 0.6444j) | (−0.0609 − 0.4374j) |
| 778 | (−0.583 − 0.2827j) | (−0.4634 + 0.6444j) | (−0.0609 − 0.5905j) |
| 779 | (−0.5579 − 0.7479j) | (−0.4634 − 0.6444j) | (−0.0609 − 0.5662j) |
| 780 | (−1.7885 − 0.2939j) | (0.4078 + 0.6678j) | (−0.0609 + 0.4309j) |
| 781 | (−1.3136 − 1.3361j) | (0.4078 − 0.6678j) | (−0.0609 + 0.4375j) |
| 782 | (−1.7635 − 0.4945j) | (−0.4078 + 0.6678j) | (−0.0609 + 0.5905j) |
| 783 | (−1.4937 − 1.1225j) | (−0.4078 − 0.6678j) | (−0.0609 + 0.5676j) |
| 784 | (−0.6267 − 0.1653j) | (0.8177 + 0.448j) | (−0.0609 − 0.1795j) |
| 785 | (−0.5464 − 1.0029j) | (0.8177 − 0.448j) | (−0.0609 − 0.1792j) |
| 786 | (−0.6193 − 0.2836j) | (−0.8177 + 0.448j) | (−0.0609 − 1.0559j) |
| 787 | (−0.5689 − 0.6802j) | (−0.8177 − 0.448j) | (−0.0609 − 0.919j) |
| 788 | (−1.4137 − 0.2389j) | (0.8572 + 0.3768j) | (−0.0609 + 0.1794j) |
| 789 | (−1.0985 − 1.058j) | (0.8572 − 0.3768j) | (−0.0609 + 0.1796j) |
| 790 | (−1.3895 − 0.3958j) | (−0.8572 + 0.3768j) | (−0.0609 + 1.0561j) |
| 791 | (−1.2108 − 0.8839j) | (−0.8572 − 0.3768j) | (−0.0609 + 0.9201j) |
| 792 | (−0.5871 − 0.1654j) | (0.5015 + 0.731j) | (−0.0609 − 0.0609j) |
| 793 | (−0.5561 − 0.8731j) | (0.5015 − 0.731j) | (−0.0609 − 0.0607j) |
| 794 | (−0.5811 − 0.2835j) | (−0.5015 + 0.731j) | (−0.0609 − 1.2271j) |
| 795 | (−0.5589 − 0.7479j) | (−0.5015 − 0.731j) | (−0.0609 − 1.4453j) |
| 796 | (−1.581 − 0.2621j) | (0.4301 + 0.7622j) | (−0.0609 + 0.0601j) |
| 797 | (−1.2327 − 1.1487j) | (0.4301 − 0.7622j) | (−0.0609 + 0.0601j) |
| 798 | (−1.5528 − 0.4392j) | (−0.4301 + 0.7622j) | (−0.0609 + 1.228j) |
| 799 | (−1.3336 − 0.9755j) | (−0.4301 − 0.7622j) | (−0.0609 + 1.4486j) |
| 800 | (−0.6283 − 0.057j) | (0.6917 + 0.4713j) | (−0.0607 − 0.3051j) |
| 801 | (−0.5295 − 1.1829j) | (0.6917 − 0.4713j) | (−0.0607 − 0.3045j) |
| 802 | (−0.6074 − 0.4048j) | (−0.6917 + 0.4713j) | (−0.0607 − 0.7193j) |
| 803 | (−0.583 − 0.5511j) | (−0.6917 − 0.4713j) | (−0.0607 − 0.7851j) |
| 804 | (−1.3003 − 0.0721j) | (0.6571 + 0.5102j) | (−0.0607 + 0.3039j) |
| 805 | (−0.1253 − 1.8671j) | (0.6571 − 0.5102j) | (−0.0607 + 0.3027j) |
| 806 | (−1.2376 − 0.5163j) | (−0.6571 + 0.5102j) | (−0.0607 + 0.7189j) |
| 807 | (−1.1975 − 0.6706j) | (−0.6571 − 0.5102j) | (−0.0607 + 0.7866j) |
| 808 | (−0.5886 − 0.057j) | (0.5438 + 0.5982j) | (−0.0607 − 0.4316j) |
| 809 | (−0.5136 − 1.3286j) | (0.5438 − 0.5982j) | (−0.0607 − 0.4374j) |
| 810 | (−0.5758 − 0.4065j) | (−0.5438 + 0.5982j) | (−0.0607 − 0.5905j) |
| 811 | (−0.5611 − 0.527j) | (−0.5438 − 0.5982j) | (−0.0607 − 0.5662j) |
| 812 | (−1.802 − 0.0992j) | (0.585 + 0.571j) | (−0.0607 + 0.4309j) |
| 813 | (−0.8263 − 1.7115j) | (0.585 − 0.571j) | (−0.0607 + 0.4375j) |
| 814 | (−1.7001 − 0.701j) | (−0.585 + 0.571j) | (−0.0607 + 0.5905j) |
| 815 | (−1.6146 − 0.9089j) | (−0.585 − 0.571j) | (−0.0607 + 0.5676j) |
| 816 | (−0.6294 − 0.0568j) | (0.7628 + 0.5255j) | (−0.0607 − 0.1795j) |
| 817 | (−0.5374 − 1.1319j) | (0.7628 − 0.5255j) | (−0.0607 − 0.1792j) |
| 818 | (−0.6086 − 0.4059j) | (−0.7628 + 0.5255j) | (−0.0607 − 1.0559j) |
| 819 | (−0.5828 − 0.5502j) | (−0.7628 − 0.5255j) | (−0.0607 − 0.919j) |
| 820 | (−1.4203 − 0.0815j) | (0.711 + 0.5843j) | (−0.0607 + 0.1794j) |
| 821 | (−0.3766 − 1.8088j) | (0.711 − 0.5843j) | (−0.0607 + 0.1796j) |
| 822 | (−1.3503 − 0.5573j) | (−0.711 + 0.5843j) | (−0.0607 + 1.0561j) |
| 823 | (−1.2881 − 0.7205j) | (−0.711 − 0.5843j) | (−0.0607 + 0.9201j) |
| 824 | (−0.5888 − 0.0581j) | (0.5802 + 0.6879j) | (−0.0607 − 0.0609j) |
| 825 | (−0.4902 − 1.4819j) | (0.5802 − 0.6879j) | (−0.0607 − 0.0607j) |
| 826 | (−0.5798 − 0.4071j) | (−0.5802 + 0.6879j) | (−0.0607 − 1.2271j) |
| 827 | (−0.565 − 0.5268j) | (−0.5802 − 0.6879j) | (−0.0607 − 1.4453j) |
| 828 | (−1.5922 − 0.0884j) | (0.6418 + 0.6455j) | (−0.0607 + 0.0601j) |
| 829 | (−0.5607 − 1.6779j) | (0.6418 − 0.6455j) | (−0.0607 + 0.0601j) |
| 830 | (−1.5069 − 0.6219j) | (−0.6418 + 0.6455j) | (−0.0607 + 1.228j) |
| 831 | (−1.4334 − 0.8025j) | (−0.6418 − 0.6455j) | (−0.0607 + 1.4486j) |

-continued

| Mapping | NN_QSL | NN_QSC | NN_RSC |
|---|---|---|---|
| 832 | (−0.7537 − 0.1707j) | (0.5574 + 0.2288j) | (−1.2271 − 0.3051j) |
| 833 | (−0.6934 − 1.0026j) | (0.5574 − 0.2288j) | (−1.2271 − 0.3045j) |
| 834 | (−0.7479 − 0.2934j) | (−0.5574 + 0.2288j) | (−1.2271 − 0.7193j) |
| 835 | (−0.6935 − 0.6815j) | (−0.5574 − 0.2288j) | (−1.2271 − 0.7851j) |
| 836 | (−1.1595 − 0.2059j) | (0.5589 + 0.2277j) | (−1.2271 + 0.3039j) |
| 837 | (−0.8948 − 1.0294j) | (0.5589 − 0.2277j) | (−1.2271 + 0.3027j) |
| 838 | (−1.1381 − 0.3446j) | (−0.5589 + 0.2277j) | (−1.2271 + 0.7189j) |
| 839 | (−1.0186 − 0.7744j) | (−0.5589 − 0.2277j) | (−1.2271 + 0.7866j) |
| 840 | (−0.8475 − 0.1783j) | (0.3498 + 0.4641j) | (−1.2271 − 0.4316j) |
| 841 | (−0.7045 − 0.8734j) | (0.3498 − 0.4641j) | (−1.2271 − 0.4374j) |
| 842 | (−0.8329 − 0.3009j) | (−0.3498 + 0.4641j) | (−1.2271 − 0.5905j) |
| 843 | (−0.7305 − 0.7316j) | (−0.3498 − 0.4641j) | (−1.2271 − 0.5662j) |
| 844 | (−0.971 − 0.1881j) | (0.336 + 0.4751j) | (−1.2271 + 0.4309j) |
| 845 | (−0.8488 − 0.8824j) | (0.336 − 0.4751j) | (−1.2271 + 0.4375j) |
| 846 | (−0.9554 − 0.3139j) | (−0.336 + 0.4751j) | (−1.2271 + 0.5905j) |
| 847 | (−0.872 − 0.7431j) | (−0.336 − 0.4751j) | (−1.2271 + 0.5676j) |
| 848 | (−0.7549 − 0.1699j) | (1.4992 + 0.9395j) | (−1.2271 − 0.1795j) |
| 849 | (−0.7024 − 1.0223j) | (1.4992 − 0.9395j) | (−1.2271 − 0.1792j) |
| 850 | (−0.7469 − 0.2895j) | (−1.4992 + 0.9395j) | (−1.2271 − 1.0559j) |
| 851 | (−0.689 − 0.6783j) | (−1.4992 − 0.9395j) | (−1.2271 − 0.919j) |
| 852 | (−1.1088 − 0.1984j) | (1.5913 + 0.785j) | (−1.2271 + 0.1794j) |
| 853 | (−0.8629 − 1.0112j) | (1.5913 − 0.785j) | (−1.2271 + 0.1796j) |
| 854 | (−1.0899 − 0.3349j) | (−1.5913 + 0.785j) | (−1.2271 + 1.0561j) |
| 855 | (−0.9908 − 0.7546j) | (−1.5913 − 0.785j) | (−1.2271 + 0.9201j) |
| 856 | (−0.8433 − 0.1773j) | (0.8423 + 1.5041j) | (−1.2271 − 0.0609j) |
| 857 | (−0.7058 − 0.8765j) | (0.8423 − 1.5041j) | (−1.2271 − 0.0607j) |
| 858 | (−0.8266 − 0.2979j) | (−0.8423 + 1.5041j) | (−1.2271 − 1.2271j) |
| 859 | (−0.73 − 0.7316j) | (−0.8423 − 1.5041j) | (−1.2271 − 1.4453j) |
| 860 | (−0.9927 − 0.1926j) | (0.6877 + 1.567j) | (−1.2271 + 0.0601j) |
| 861 | (−0.84 − 0.8821j) | (0.6877 − 1.567j) | (−1.2271 + 0.0601j) |
| 862 | (−0.9678 − 0.3174j) | (−0.6877 + 1.567j) | (−1.2271 + 1.228j) |
| 863 | (−0.8811 − 0.7424j) | (−0.6877 − 1.567j) | (−1.2271 + 1.4486j) |
| 864 | (−0.7615 − 0.0593j) | (0.5019 + 0.2772j) | (−1.4453 − 0.3051j) |
| 865 | (−0.7113 − 1.2017j) | (0.5019 − 0.2772j) | (−1.4453 − 0.3045j) |
| 866 | (−0.7358 − 0.4169j) | (−0.5019 + 0.2772j) | (−1.4453 − 0.7193j) |
| 867 | (−0.7111 − 0.5569j) | (−0.5019 − 0.2772j) | (−1.4453 − 0.7851j) |
| 868 | (−1.1714 − 0.0711j) | (0.5006 + 0.2783j) | (−1.4453 + 0.3039j) |
| 869 | (−0.8677 − 1.2003j) | (0.5006 − 0.2783j) | (−1.4453 + 0.3027j) |
| 870 | (−1.1082 − 0.4852j) | (−0.5006 + 0.2783j) | (−1.4453 + 0.7189j) |
| 871 | (−1.0697 − 0.6262j) | (−0.5006 − 0.2783j) | (−1.4453 + 0.7866j) |
| 872 | (−0.849 − 0.0622j) | (0.4263 + 0.391j) | (−1.4453 − 0.4316j) |
| 873 | (−0.6719 − 1.3322j) | (0.4263 − 0.391j) | (−1.4453 − 0.4374j) |
| 874 | (−0.8073 − 0.4268j) | (−0.4263 + 0.391j) | (−1.4453 − 0.5905j) |
| 875 | (−0.785 − 0.5627j) | (−0.4263 − 0.391j) | (−1.4453 − 0.5662j) |
| 876 | (−0.9819 − 0.0652j) | (0.4317 + 0.3838j) | (−1.4453 + 0.4309j) |
| 877 | (−1.082 − 1.5252j) | (0.4317 − 0.3838j) | (−1.4453 + 0.4375j) |
| 878 | (−0.9394 − 0.449j) | (−0.4317 + 0.3838j) | (−1.4453 + 0.5905j) |
| 879 | (−0.907 − 0.5883j) | (−0.4317 − 0.3838j) | (−1.4453 + 0.5676j) |
| 880 | (−0.759 − 0.0587j) | (1.3915 + 1.0821j) | (−1.4453 − 0.1795j) |
| 881 | (−0.6864 − 1.1427j) | (1.3915 − 1.0821j) | (−1.4453 − 0.1792j) |
| 882 | (−0.7315 − 0.4169j) | (−1.3915 + 1.0821j) | (−1.4453 − 1.0559j) |
| 883 | (−0.709 − 0.5576j) | (−1.3915 − 1.0821j) | (−1.4453 − 0.919j) |
| 884 | (−1.1186 − 0.0679j) | (1.2693 + 1.2108j) | (−1.4453 + 0.1794j) |
| 885 | (−0.9889 − 1.2742j) | (1.2693 − 1.2108j) | (−1.4453 + 0.1796j) |
| 886 | (−1.0622 − 0.4685j) | (−1.2693 + 1.2108j) | (−1.4453 + 1.0561j) |
| 887 | (−1.0334 − 0.6182j) | (−1.2693 − 1.2108j) | (−1.4453 + 0.9201j) |
| 888 | (−0.8496 − 0.0607j) | (0.9921 + 1.4233j) | (−1.4453 − 0.0609j) |
| 889 | (−0.6982 − 1.4703j) | (0.9921 − 1.4233j) | (−1.4453 − 0.0607j) |
| 890 | (−0.8022 − 0.4245j) | (−0.9921 + 1.4233j) | (−1.4453 − 1.2271j) |
| 891 | (−0.7856 − 0.563j) | (−0.9921 − 1.4233j) | (−1.4453 − 1.4453j) |
| 892 | (−0.997 − 0.0646j) | (1.1356 + 1.3257j) | (−1.4453 + 0.0601j) |
| 893 | (−0.8802 − 1.4371j) | (1.1356 − 1.3257j) | (−1.4453 + 0.0601j) |
| 894 | (−0.9454 − 0.4482j) | (−1.1356 + 1.3257j) | (−1.4453 + 1.228j) |
| 895 | (−0.9139 − 0.5896j) | (−1.1356 − 1.3257j) | (−1.4453 + 1.4486j) |
| 896 | (0.6243 − 0.165j) | (0.6883 + 0.3373j) | (0.0601 − 0.3051j) |
| 897 | (0.5469 − 0.985j) | (0.6883 − 0.3373j) | (0.0601 − 0.3045j) |
| 898 | (0.6164 − 0.2812j) | (−0.6883 + 0.3373j) | (0.0601 − 0.7193j) |
| 899 | (0.567 − 0.6809j) | (−0.6883 − 0.3373j) | (0.0601 − 0.7851j) |
| 900 | (1.2933 − 0.2212j) | (0.7047 + 0.3065j) | (0.0601 + 0.3039j) |
| 901 | (1.0332 − 0.9826j) | (0.7047 − 0.3065j) | (0.0601 + 0.3027j) |
| 902 | (1.2676 − 0.367j) | (−0.7047 + 0.3065j) | (0.0601 + 0.7189j) |
| 903 | (1.1144 − 0.843j) | (−0.7047 − 0.3065j) | (0.0601 + 0.7866j) |
| 904 | (0.5868 − 0.1642j) | (0.4317 + 0.5823j) | (0.0601 − 0.4316j) |
| 905 | (0.5543 − 0.8737j) | (0.4317 − 0.5823j) | (0.0601 − 0.4374j) |
| 906 | (0.5826 − 0.2806j) | (−0.4317 + 0.5823j) | (0.0601 − 0.5905j) |
| 907 | (0.559 − 0.7455j) | (−0.4317 − 0.5823j) | (0.0601 − 0.5662j) |
| 908 | (1.7864 − 0.2881j) | (0.3919 + 0.607j) | (0.0601 + 0.4309j) |

-continued

| Mapping | NN_QSL | NN_QSC | NN_RSC |
|---|---|---|---|
| 909 | (1.3108 − 1.3372j) | (0.3919 − 0.607j) | (0.0601 + 0.4375j) |
| 910 | (1.7507 − 0.4867j) | (−0.3919 + 0.607j) | (0.0601 + 0.5905j) |
| 911 | (1.4991 − 1.1213j) | (−0.3919 − 0.607j) | (0.0601 + 0.5676j) |
| 912 | (0.6234 − 0.165j) | (0.8852 + 0.4995j) | (0.0601 − 0.1795j) |
| 913 | (0.547 − 1.0016j) | (0.8852 − 0.4995j) | (0.0601 − 0.1792j) |
| 914 | (0.6178 − 0.2811j) | (−0.8852 + 0.4995j) | (0.0601 − 1.0559j) |
| 915 | (0.567 − 0.6783j) | (−0.8852 − 0.4995j) | (0.0601 − 0.919j) |
| 916 | (1.412 − 0.2345j) | (0.9323 + 0.4173j) | (0.0601 + 0.1794j) |
| 917 | (1.0937 − 1.0549j) | (0.9323 − 0.4173j) | (0.0601 + 0.1796j) |
| 918 | (1.3864 − 0.3933j) | (−0.9323 + 0.4173j) | (0.0601 + 1.0561j) |
| 919 | (1.2033 − 0.8786j) | (−0.9323 − 0.4173j) | (0.0601 + 0.9201j) |
| 920 | (0.5885 − 0.1642j) | (0.5331 + 0.8095j) | (0.0601 − 0.0609j) |
| 921 | (0.5545 − 0.8725j) | (0.5331 − 0.8095j) | (0.0601 − 0.0607j) |
| 922 | (0.5815 − 0.2807j) | (−0.5331 + 0.8095j) | (0.0601 − 1.2271j) |
| 923 | (0.5548 − 0.7451j) | (−0.5331 − 0.8095j) | (0.0601 − 1.4453j) |
| 924 | (1.5774 − 0.2573j) | (0.4495 + 0.8419j) | (0.0601 + 0.0601j) |
| 925 | (1.2284 − 1.1433j) | (0.4495 − 0.8419j) | (0.0601 + 0.0601j) |
| 926 | (1.5511 − 0.4361j) | (−0.4495 + 0.8419j) | (0.0601 + 1.228j) |
| 927 | (1.3354 − 0.9773j) | (−0.4495 − 0.8419j) | (0.0601 + 1.4486j) |
| 928 | (0.6283 − 0.0558j) | (0.6247 + 0.4193j) | (0.0601 − 0.3051j) |
| 929 | (0.5291 − 1.1819j) | (0.6247 − 0.4193j) | (0.0601 − 0.3045j) |
| 930 | (0.6051 − 0.402j) | (−0.6247 + 0.4193j) | (0.0601 − 0.7193j) |
| 931 | (0.5814 − 0.5448j) | (−0.6247 − 0.4193j) | (0.0601 − 0.7851j) |
| 932 | (1.2999 − 0.0712j) | (0.6061 + 0.4389j) | (0.0601 + 0.3039j) |
| 933 | (0.1369 − 1.8677j) | (0.6061 − 0.4389j) | (0.0601 + 0.3027j) |
| 934 | (1.2418 − 0.516j) | (−0.6061 + 0.4389j) | (0.0601 + 0.7189j) |
| 935 | (1.1902 − 0.6679j) | (−0.6061 − 0.4389j) | (0.0601 + 0.7866j) |
| 936 | (0.5873 − 0.0559j) | (0.511 + 0.5228j) | (0.0601 − 0.4316j) |
| 937 | (0.5173 − 1.3265j) | (0.511 − 0.5228j) | (0.0601 − 0.4374j) |
| 938 | (0.5751 − 0.4014j) | (−0.511 + 0.5228j) | (0.0601 − 0.5905j) |
| 939 | (0.5636 − 0.528j) | (−0.511 − 0.5228j) | (0.0601 − 0.5662j) |
| 940 | (1.7981 − 0.093j) | (0.5344 + 0.505j) | (0.0601 + 0.4309j) |
| 941 | (0.8308 − 1.7184j) | (0.5344 − 0.505j) | (0.0601 + 0.4375j) |
| 942 | (1.7005 − 0.6966j) | (−0.5344 + 0.505j) | (0.0601 + 0.5905j) |
| 943 | (1.6087 − 0.9062j) | (−0.5344 − 0.505j) | (0.0601 + 0.5676j) |
| 944 | (0.6268 − 0.0558j) | (0.8281 + 0.5806j) | (0.0601 − 0.1795j) |
| 945 | (0.5414 − 1.1347j) | (0.8281 − 0.5806j) | (0.0601 − 0.1792j) |
| 946 | (0.6059 − 0.4021j) | (−0.8281 + 0.5806j) | (0.0601 − 1.0559j) |
| 947 | (0.5805 − 0.547j) | (−0.8281 − 0.5806j) | (0.0601 − 0.919j) |
| 948 | (1.4178 − 0.0771j) | (0.7656 + 0.6506j) | (0.0601 + 0.1794j) |
| 949 | (0.3826 − 1.813j) | (0.7656 − 0.6506j) | (0.0601 + 0.1796j) |
| 950 | (1.3484 − 0.5553j) | (−0.7656 + 0.6506j) | (0.0601 + 1.0561j) |
| 951 | (1.2836 − 0.7204j) | (−0.7656 − 0.6506j) | (0.0601 + 0.9201j) |
| 952 | (0.5857 − 0.055j) | (0.6173 + 0.7664j) | (0.0601 − 0.0609j) |
| 953 | (0.4961 − 1.4846j) | (0.6173 − 0.7664j) | (0.0601 − 0.0607j) |
| 954 | (0.5773 − 0.4005j) | (−0.6173 + 0.7664j) | (0.0601 − 1.2271j) |
| 955 | (0.5643 − 0.5263j) | (−0.6173 − 0.7664j) | (0.0601 − 1.4453j) |
| 956 | (1.5788 − 0.0837j) | (0.6923 + 0.7149j) | (0.0601 + 0.0601j) |
| 957 | (0.5694 − 1.686j) | (0.6923 − 0.7149j) | (0.0601 + 0.0601j) |
| 958 | (1.4996 − 0.6152j) | (−0.6923 + 0.7149j) | (0.0601 + 1.228j) |
| 959 | (1.4303 − 0.8j) | (−0.6923 − 0.7149j) | (0.0601 + 1.4486j) |
| 960 | (0.7516 − 0.1684j) | (0.6194 + 0.279j) | (1.228 − 0.3051j) |
| 961 | (0.6934 − 0.9988j) | (0.6194 − 0.279j) | (1.228 − 0.3045j) |
| 962 | (0.7419 − 0.2872j) | (−0.6194 + 0.279j) | (1.228 − 0.7193j) |
| 963 | (0.6901 − 0.6786j) | (−0.6194 − 0.279j) | (1.228 − 0.7851j) |
| 964 | (1.1588 − 0.2042j) | (0.6253 + 0.2698j) | (1.228 + 0.3039j) |
| 965 | (0.9018 − 1.0284j) | (0.6253 − 0.2698j) | (1.228 + 0.3027j) |
| 966 | (1.135 − 0.3413j) | (−0.6253 + 0.2698j) | (1.228 + 0.7189j) |
| 967 | (1.0117 − 0.7674j) | (−0.6253 − 0.2698j) | (1.228 + 0.7866j) |
| 968 | (0.8433 − 0.1752j) | (0.3796 + 0.5044j) | (1.228 − 0.4316j) |
| 969 | (0.7021 − 0.8721j) | (0.3796 − 0.5044j) | (1.228 − 0.4374j) |
| 970 | (0.8268 − 0.2959j) | (−0.3796 + 0.5044j) | (1.228 − 0.5905j) |
| 971 | (0.7323 − 0.7298j) | (−0.3796 − 0.5044j) | (1.228 − 0.5662j) |
| 972 | (0.9716 − 0.1854j) | (0.3557 + 0.5188j) | (1.228 + 0.4309j) |
| 973 | (0.8465 − 0.8771j) | (0.3557 − 0.5188j) | (1.228 + 0.4375j) |
| 974 | (0.9546 − 0.3122j) | (−0.3557 + 0.5188j) | (1.228 + 0.5905j) |
| 975 | (0.8752 − 0.7432j) | (−0.3557 − 0.5188j) | (1.228 + 0.5676j) |
| 976 | (0.7521 − 0.1687j) | (1.3509 + 0.837j) | (1.228 − 0.1795j) |
| 977 | (0.6996 − 1.0164j) | (1.3509 − 0.837j) | (1.228 − 0.1792j) |
| 978 | (0.7454 − 0.2889j) | (−1.3509 + 0.837j) | (1.228 − 1.0559j) |
| 979 | (0.6881 − 0.6803j) | (−1.3509 − 0.837j) | (1.228 − 0.919j) |
| 980 | (1.1025 − 0.1974j) | (1.4337 + 0.6993j) | (1.228 + 0.1794j) |
| 981 | (0.8613 − 1.0075j) | (1.4337 − 0.6993j) | (1.228 + 0.1796j) |
| 982 | (1.0905 − 0.333j) | (−1.4337 + 0.6993j) | (1.228 + 1.0561j) |
| 983 | (0.9886 − 0.7498j) | (−1.4337 − 0.6993j) | (1.228 + 0.9201j) |
| 984 | (0.844 − 0.1753j) | (0.7641 + 1.3398j) | (1.228 − 0.0609j) |
| 985 | (0.7042 − 0.8704j) | (0.7641 − 1.3398j) | (1.228 − 0.0607j) |

-continued

| Mapping | NN_QSL | NN_QSC | NN_RSC |
|---|---|---|---|
| 986 | (0.8241 − 0.2959j) | (−0.7641 + 1.3398j) | (1.228 − 1.2271j) |
| 987 | (0.7293 − 0.7284j) | (−0.7641 − 1.3398j) | (1.228 − 1.4453j) |
| 988 | (0.9853 − 0.1875j) | (0.6248 + 1.3957j) | (1.228 + 0.0601j) |
| 989 | (0.8402 − 0.8791j) | (0.6248 − 1.3957j) | (1.228 − 0.0601j) |
| 990 | (0.9675 − 0.3141j) | (−0.6248 + 1.3957j) | (1.228 + 1.228j) |
| 991 | (0.8821 − 0.7432j) | (−0.6248 − 1.3957j) | (1.228 + 1.4486j) |
| 992 | (0.758 − 0.0568j) | (0.555 + 0.3523j) | (1.4486 − 0.3051j) |
| 993 | (0.7116 − 1.1997j) | (0.555 − 0.3523j) | (1.4486 − 0.3045j) |
| 994 | (0.7289 − 0.4142j) | (−0.555 + 0.3523j) | (1.4486 − 0.7193j) |
| 995 | (0.7109 − 0.5574j) | (−0.555 − 0.3523j) | (1.4486 − 0.7851j) |
| 996 | (1.1685 − 0.0674j) | (0.5483 + 0.357j) | (1.4486 + 0.3039j) |
| 997 | (0.8699 − 1.1981j) | (0.5483 − 0.357j) | (1.4486 + 0.3027j) |
| 998 | (1.1063 − 0.4788j) | (−0.5483 + 0.357j) | (1.4486 + 0.7189j) |
| 999 | (1.0665 − 0.6214j) | (−0.5483 − 0.357j) | (1.4486 + 0.7866j) |
| 1000 | (0.8509 − 0.0599j) | (0.4626 + 0.4325j) | (1.4486 − 0.4316j) |
| 1001 | (0.6789 − 1.3376j) | (0.4626 − 0.4325j) | (1.4486 − 0.4374j) |
| 1002 | (0.8082 − 0.4231j) | (−0.4626 + 0.4325j) | (1.4486 − 0.5905j) |
| 1003 | (0.7847 − 0.5571j) | (−0.4626 − 0.4325j) | (1.4486 − 0.5662j) |
| 1004 | (0.9808 − 0.0636j) | (0.4723 + 0.4235j) | (1.4486 + 0.4309j) |
| 1005 | (1.0845 − 1.525j) | (0.4723 − 0.4235j) | (1.4486 + 0.4375j) |
| 1006 | (0.935 − 0.4441j) | (−0.4723 + 0.4235j) | (1.4486 + 0.5905j) |
| 1007 | (0.9018 − 0.5822j) | (−0.4723 − 0.4235j) | (1.4486 + 0.5676j) |
| 1008 | (0.7563 − 0.0541j) | (1.2548 + 0.9637j) | (1.4486 − 0.1795j) |
| 1009 | (0.6846 − 1.137j) | (1.2548 − 0.9637j) | (1.4486 − 0.1792j) |
| 1010 | (0.732 − 0.4142j) | (−1.2548 + 0.9637j) | (1.4486 − 1.0559j) |
| 1011 | (0.7126 − 0.5538j) | (−1.2548 − 0.9637j) | (1.4486 − 0.919j) |
| 1012 | (1.1128 − 0.0658j) | (1.1465 + 1.0787j) | (1.4486 + 0.1794j) |
| 1013 | (0.9928 − 1.2762j) | (1.1465 − 1.0787j) | (1.4486 + 0.1796j) |
| 1014 | (1.0595 − 0.4669j) | (−1.1465 + 1.0787j) | (1.4486 + 1.0561j) |
| 1015 | (1.0277 − 0.6118j) | (−1.1465 − 1.0787j) | (1.4486 + 0.9201j) |
| 1016 | (0.8491 − 0.0588j) | (0.8992 + 1.2679j) | (1.4486 − 0.0609j) |
| 1017 | (0.6995 − 1.4755j) | (0.8992 − 1.2679j) | (1.4486 − 0.0607j) |
| 1018 | (0.8088 − 0.4246j) | (−0.8992 + 1.2679j) | (1.4486 − 1.2271j) |
| 1019 | (0.7788 − 0.5561j) | (−0.8992 − 1.2679j) | (1.4486 − 1.4453j) |
| 1020 | (0.9928 − 0.062j) | (1.0275 + 1.1809j) | (1.4486 + 0.0601j) |
| 1021 | (0.881 − 1.4348j) | (1.0275 − 1.1809j) | (1.4486 − 0.0601j) |
| 1022 | (0.9463 − 0.4454j) | (−1.0275 + 1.1809j) | (1.4486 + 1.228j) |
| 1023 | (0.9131 − 0.5855j) | (−1.0275 − 1.1809j) | (1.4486 + 1.4486j). |

18. The method of claim 14, wherein the mapping is, for one of a neural network subject to the QSL constraint (NN_QSL), a neural network subject to the QSC constraint (NN_QSC), or a neural network subject to the RSC constraint (NN_RSC), according to:

| Mapping | NN_QSL | NN_QSC | NN_RSC |
|---|---|---|---|
| 0 | (0.0905 + 0.6153j) | (0.0412 + 0.8491j) | (1.0626 + 1.0626j) |
| 1 | (0.0726 + 0.5304j) | (0.0412 − 0.8491j) | (1.0626 − 0.3591j) |
| 2 | (−0.087 + 0.6142j) | (−0.0412 + 0.8491j) | (1.0626 + 1.1878j) |
| 3 | (−0.0705 + 0.5308j) | (−0.0412 − 0.8491j) | (1.0626 − 0.4301j) |
| 4 | (0.1512 + 0.6093j) | (0.2881 + 0.81j) | (1.0626 − 1.058j) |
| 5 | (0.1337 + 0.5247j) | (0.2881 − 0.81j) | (1.0626 − 0.7494j) |
| 6 | (−0.1463 + 0.6076j) | (−0.2881 + 0.81j) | (1.0626 − 1.1847j) |
| 7 | (−0.1323 + 0.5167j) | (−0.2881 − 0.81j) | (1.0626 − 0.6628j) |
| 8 | (0.1277 + 0.8468j) | (0.124 + 0.8429j) | (1.0626 + 0.7523j) |
| 9 | (0.03 + 0.2228j) | (0.124 − 0.8429j) | (1.0626 − 0.1607j) |
| 10 | (−0.1212 + 0.8513j) | (−0.124 + 0.8429j) | (1.0626 + 0.6629j) |
| 11 | (−0.0377 + 0.2278j) | (−0.124 − 0.8429j) | (1.0626 − 0.0944j) |
| 12 | (0.2087 + 0.8286j) | (0.2064 + 0.8301j) | (1.0626 + 0.3594j) |
| 13 | (0.0751 + 0.2278j) | (0.2064 − 0.8301j) | (1.0626 + 0.1597j) |
| 14 | (−0.2038 + 0.8338j) | (−0.2064 + 0.8301j) | (1.0626 + 0.4297j) |
| 15 | (−0.0805 + 0.2288j) | (−0.2064 − 0.8301j) | (1.0626 + 0.0937j) |
| 16 | (0.0329 + 0.6239j) | (0.0382 + 0.7703j) | (1.0626 + 0.9504j) |
| 17 | (0.0283 + 0.5464j) | (0.0382 − 0.7703j) | (1.0626 − 0.2918j) |
| 18 | (−0.0299 + 0.6233j) | (−0.0382 + 0.7703j) | (1.0626 + 1.3347j) |
| 19 | (−0.0246 + 0.5492j) | (−0.0382 − 0.7703j) | (1.0626 − 0.503j) |
| 20 | (0.2038 + 0.5925j) | (0.2647 + 0.7371j) | (1.0626 − 0.946j) |
| 21 | (0.1759 + 0.5208j) | (0.2647 − 0.7371j) | (1.0626 − 0.8449j) |
| 22 | (−0.2034 + 0.5935j) | (−0.2647 + 0.7371j) | (1.0626 − 1.331j) |
| 23 | (−0.1799 + 0.516j) | (−0.2647 − 0.7371j) | (1.0626 − 0.5804j) |
| 24 | (0.0438 + 0.8551j) | (0.1142 + 0.7653j) | (1.0626 + 0.8462j) |
| 25 | (0.0256 + 0.1565j) | (0.1142 − 0.7653j) | (1.0626 − 0.2242j) |
| 26 | (−0.0406 + 0.8549j) | (−0.1142 + 0.7653j) | (1.0626 + 0.5805j) |

-continued

| Mapping | NN_QSL | NN_QSC | NN_RSC |
|---|---|---|---|
| 27 | (−0.0358 + 0.1574j) | (−0.1142 − 0.7653j) | (1.0626 − 0.0332j) |
| 28 | (0.2873 + 0.8036j) | (0.1901 + 0.7546j) | (1.0626 + 0.2916j) |
| 29 | (0.0278 + 0.1041j) | (0.1901 − 0.7546j) | (1.0626 + 0.2239j) |
| 30 | (−0.283 + 0.8097j) | (−0.1901 + 0.7546j) | (1.0626 + 0.5035j) |
| 31 | (−0.0364 + 0.1031j) | (−0.1901 − 0.7546j) | (1.0626 + 0.0328j) |
| 32 | (0.0851 − 0.6146j) | (0.0335 + 0.6142j) | (−0.3591 + 1.0626j) |
| 33 | (0.0647 − 0.5301j) | (0.0335 − 0.6142j) | (−0.3591 − 0.3591j) |
| 34 | (−0.0932 − 0.6134j) | (−0.0335 + 0.6142j) | (−0.3591 + 1.1878j) |
| 35 | (−0.0764 − 0.5278j) | (−0.0335 − 0.6142j) | (−0.3591 − 0.4301j) |
| 36 | (0.1436 − 0.6061j) | (0.2243 + 0.5872j) | (−0.3591 − 1.058j) |
| 37 | (0.1253 − 0.5197j) | (0.2243 − 0.5872j) | (−0.3591 − 0.7494j) |
| 38 | (−0.1581 − 0.6059j) | (−0.2243 + 0.5872j) | (−0.3591 − 1.1847j) |
| 39 | (−0.1414 − 0.5141j) | (−0.2243 − 0.5872j) | (−0.3591 − 0.6628j) |
| 40 | (0.1171 − 0.8463j) | (0.0983 + 0.6107j) | (−0.3591 + 0.7523j) |
| 41 | (0.0244 − 0.2175j) | (0.0983 − 0.6107j) | (−0.3591 − 0.1607j) |
| 42 | (−0.1323 − 0.8443j) | (−0.0983 + 0.6107j) | (−0.3591 + 0.6629j) |
| 43 | (−0.0377 − 0.2194j) | (−0.0983 − 0.6107j) | (−0.3591 − 0.0944j) |
| 44 | (0.1984 − 0.8274j) | (0.162 + 0.6012j) | (−0.3591 + 0.3594j) |
| 45 | (0.0741 − 0.2254j) | (0.162 − 0.6012j) | (−0.3591 + 0.1597j) |
| 46 | (−0.2126 − 0.8267j) | (−0.162 + 0.6012j) | (−0.3591 − 0.4297j) |
| 47 | (−0.0802 − 0.2244j) | (−0.162 − 0.6012j) | (−0.3591 + 0.0937j) |
| 48 | (0.0258 − 0.621j) | (0.0352 + 0.6922j) | (−0.3591 + 0.9504j) |
| 49 | (0.0226 − 0.5432j) | (0.0352 − 0.6922j) | (−0.3591 − 0.2918j) |
| 50 | (−0.039 − 0.6218j) | (−0.0352 + 0.6922j) | (−0.3591 + 1.3347j) |
| 51 | (−0.034 − 0.544j) | (−0.0352 − 0.6922j) | (−0.3591 − 0.503j) |
| 52 | (0.1967 − 0.5901j) | (0.2428 + 0.6632j) | (−0.3591 − 0.946j) |
| 53 | (0.172 − 0.5162j) | (0.2428 − 0.6632j) | (−0.3591 − 0.8449j) |
| 54 | (−0.2091 − 0.5878j) | (−0.2428 + 0.6632j) | (−0.3591 − 1.331j) |
| 55 | (−0.1838 − 0.518j) | (−0.2428 − 0.6632j) | (−0.3591 − 0.5804j) |
| 56 | (0.0358 − 0.8517j) | (0.1057 + 0.6878j) | (−0.3591 + 0.8462j) |
| 57 | (0.0265 − 0.1552j) | (0.1057 − 0.6878j) | (−0.3591 − 0.2242j) |
| 58 | (−0.052 − 0.8529j) | (−0.1057 + 0.6878j) | (−0.3591 + 0.5805j) |
| 59 | (−0.0294 − 0.1497j) | (−0.1057 − 0.6878j) | (−0.3591 − 0.0332j) |
| 60 | (0.2811 − 0.799j) | (0.1754 + 0.6784j) | (−0.3591 + 0.2916j) |
| 61 | (0.0225 − 0.1034j) | (0.1754 − 0.6784j) | (−0.3591 + 0.2239j) |
| 62 | (−0.2913 − 0.8052j) | (−0.1754 + 0.6784j) | (−0.3591 + 0.5035j) |
| 63 | (−0.0353 − 0.1029j) | (−0.1754 − 0.6784j) | (−0.3591 + 0.0328j) |
| 64 | (0.6232 + 0.0923j) | (0.8497 + 0.0412j) | (1.1878 + 1.0626j) |
| 65 | (0.5459 + 0.0722j) | (0.8497 − 0.0412j) | (1.1878 − 0.3591j) |
| 66 | (−0.6279 + 0.0985j) | (−0.8497 + 0.0412j) | (1.1878 + 1.1878j) |
| 67 | (−0.5475 + 0.0765j) | (−0.8497 − 0.0412j) | (1.1878 − 0.4301j) |
| 68 | (0.6112 + 0.1529j) | (0.8102 + 0.2874j) | (1.1878 − 1.058j) |
| 69 | (0.5327 + 0.1345j) | (0.8102 − 0.2874j) | (1.1878 − 0.7494j) |
| 70 | (−0.6161 + 0.1549j) | (−0.8102 + 0.2874j) | (1.1878 − 1.1847j) |
| 71 | (−0.5353 + 0.1413j) | (−0.8102 − 0.2874j) | (1.1878 − 0.6628j) |
| 72 | (0.8437 + 0.1242j) | (0.8436 + 0.1238j) | (1.1878 + 0.7523j) |
| 73 | (0.2464 + 0.0312j) | (0.8436 − 0.1238j) | (1.1878 − 0.1607j) |
| 74 | (−0.8508 + 0.1338j) | (−0.8436 + 0.1238j) | (1.1878 + 0.6629j) |
| 75 | (−0.2532 + 0.0313j) | (−0.8436 − 0.1238j) | (1.1878 − 0.0944j) |
| 76 | (0.8236 + 0.2067j) | (0.8306 + 0.2059j) | (1.1878 + 0.3594j) |
| 77 | (0.2607 + 0.0719j) | (0.8306 − 0.2059j) | (1.1878 + 0.1597j) |
| 78 | (−0.8333 + 0.2169j) | (−0.8306 + 0.2059j) | (1.1878 + 0.4297j) |
| 79 | (−0.2658 + 0.0741j) | (−0.8306 − 0.2059j) | (1.1878 + 0.0937j) |
| 80 | (0.6317 + 0.0305j) | (0.771 + 0.0382j) | (1.1878 + 0.9504j) |
| 81 | (0.5553 + 0.0285j) | (0.771 − 0.0382j) | (1.1878 − 0.2918j) |
| 82 | (−0.637 + 0.0371j) | (−0.771 + 0.0382j) | (1.1878 + 1.3347j) |
| 83 | (−0.5621 + 0.0301j) | (−0.771 − 0.0382j) | (1.1878 − 0.503j) |
| 84 | (0.5893 + 0.2067j) | (0.7374 + 0.2643j) | (1.1878 − 0.946j) |
| 85 | (0.5227 + 0.185j) | (0.7374 − 0.2643j) | (1.1878 − 0.8449j) |
| 86 | (−0.5955 + 0.2141j) | (−0.7374 + 0.2643j) | (1.1878 − 1.331j) |
| 87 | (−0.5257 + 0.19j) | (−0.7374 − 0.2643j) | (1.1878 − 0.5804j) |
| 88 | (0.852 + 0.0424j) | (0.7656 + 0.1141j) | (1.1878 + 0.8462j) |
| 89 | (0.1783 + 0.0292j) | (0.7656 − 0.1141j) | (1.1878 − 0.2242j) |
| 90 | (−0.8597 + 0.0457j) | (−0.7656 + 0.1141j) | (1.1878 + 0.5805j) |
| 91 | (−0.1895 + 0.0298j) | (−0.7656 − 0.1141j) | (1.1878 − 0.0332j) |
| 92 | (0.7982 + 0.2906j) | (0.7545 + 0.1894j) | (1.1878 + 0.2916j) |
| 93 | (0.0291 + 0.03j) | (0.7545 − 0.1894j) | (1.1878 + 0.2239j) |
| 94 | (−0.8039 + 0.2975j) | (−0.7545 + 0.1894j) | (1.1878 + 0.5035j) |
| 95 | (−0.034 + 0.0331j) | (−0.7545 − 0.1894j) | (1.1878 + 0.0328j) |
| 96 | (0.6194 − 0.0972j) | (0.6147 + 0.0331j) | (−0.4301 + 1.0626j) |
| 97 | (0.5444 − 0.079j) | (0.6147 − 0.0331j) | (−0.4301 − 0.3591j) |
| 98 | (−0.6257 − 0.0906j) | (−0.6147 + 0.0331j) | (−0.4301 + 1.1878j) |
| 99 | (−0.5454 − 0.0701j) | (−0.6147 − 0.0331j) | (−0.4301 − 0.4301j) |
| 100 | (0.6084 − 0.152j) | (0.5872 + 0.2241j) | (−0.4301 − 1.058j) |
| 101 | (0.5262 − 0.1433j) | (0.5872 − 0.2241j) | (−0.4301 − 0.7494j) |
| 102 | (−0.6127 − 0.1516j) | (−0.5872 + 0.2241j) | (−0.4301 − 1.1847j) |
| 103 | (−0.5334 − 0.1337j) | (−0.5872 − 0.2241j) | (−0.4301 − 0.6628j) |

-continued

| Mapping | NN_QSL | NN_QSC | NN_RSC |
|---|---|---|---|
| 104 | (0.8457 − 0.1252j) | (0.6108 + 0.0978j) | (−0.4301 + 0.7523j) |
| 105 | (0.2492 − 0.0318j) | (0.6108 − 0.0978j) | (−0.4301 − 0.1607j) |
| 106 | (−0.8508 − 0.1251j) | (−0.6108 + 0.0978j) | (−0.4301 + 0.6629j) |
| 107 | (−0.2563 − 0.0301j) | (−0.6108 − 0.0978j) | (−0.4301 − 0.0944j) |
| 108 | (0.825 − 0.2124j) | (0.6016 + 0.1618j) | (−0.4301 + 0.3594j) |
| 109 | (0.263 − 0.0742j) | (0.6016 − 0.1618j) | (−0.4301 + 0.1597j) |
| 110 | (−0.8349 − 0.2082j) | (−0.6016 + 0.1618j) | (−0.4301 + 0.4297j) |
| 111 | (−0.2674 − 0.0732j) | (−0.6016 − 0.1618j) | (−0.4301 + 0.0937j) |
| 112 | (0.6291 − 0.0356j) | (0.6928 + 0.0352j) | (−0.4301 + 0.9504j) |
| 113 | (0.5543 − 0.0309j) | (0.6928 − 0.0352j) | (−0.4301 − 0.2918j) |
| 114 | (−0.6409 − 0.0308j) | (−0.6928 + 0.0352j) | (−0.4301 + 1.3347j) |
| 115 | (−0.5606 − 0.0274j) | (−0.6928 − 0.0352j) | (−0.4301 − 0.503j) |
| 116 | (0.5908 − 0.212j) | (0.6636 + 0.2429j) | (−0.4301 − 0.946j) |
| 117 | (0.5167 − 0.191j) | (0.6636 − 0.2429j) | (−0.4301 − 0.8449j) |
| 118 | (−0.5935 − 0.2049j) | (−0.6636 + 0.2429j) | (−0.4301 − 1.331j) |
| 119 | (−0.5246 − 0.1834j) | (−0.6636 − 0.2429j) | (−0.4301 − 0.5804j) |
| 120 | (0.8559 − 0.0494j) | (0.6879 + 0.1053j) | (−0.4301 + 0.8462j) |
| 121 | (0.1776 − 0.0275j) | (0.6879 − 0.1053j) | (−0.4301 − 0.2242j) |
| 122 | (−0.8623 − 0.0413j) | (−0.6879 + 0.1053j) | (−0.4301 + 0.5805j) |
| 123 | (−0.1851 − 0.0237j) | (−0.6879 − 0.1053j) | (−0.4301 − 0.0332j) |
| 124 | (0.7951 − 0.2921j) | (0.6786 + 0.1752j) | (−0.4301 + 0.2916j) |
| 125 | (0.0264 − 0.0314j) | (0.6786 − 0.1752j) | (−0.4301 + 0.2239j) |
| 126 | (−0.808 − 0.2898j) | (−0.6786 + 0.1752j) | (−0.4301 + 0.5035j) |
| 127 | (−0.0306 − 0.0312j) | (−0.6786 − 0.1752j) | (−0.4301 + 0.0328j) |
| 128 | (0.3676 + 0.5027j) | (0.045 + 0.9288j) | (−1.058 + 1.0626j) |
| 129 | (0.3226 + 0.4348j) | (0.045 − 0.9288j) | (−1.058 − 0.3591j) |
| 130 | (−0.3679 + 0.509j) | (−0.045 + 0.9288j) | (−1.058 + 1.1878j) |
| 131 | (−0.3184 + 0.44j) | (−0.045 − 0.9288j) | (−1.058 − 0.4301j) |
| 132 | (0.317 + 0.537j) | (0.3128 + 0.884j) | (−1.058 − 1.058j) |
| 133 | (0.2673 + 0.4727j) | (0.3128 − 0.884j) | (−1.058 − 0.7494j) |
| 134 | (−0.3152 + 0.5441j) | (−0.3128 + 0.884j) | (−1.058 − 1.1847j) |
| 135 | (−0.2634 + 0.4732j) | (−0.3128 − 0.884j) | (−1.058 − 0.6628j) |
| 136 | (0.506 + 0.6853j) | (0.1346 + 0.9215j) | (−1.058 − 0.7523j) |
| 137 | (0.1572 + 0.1746j) | (0.1346 − 0.9215j) | (−1.058 − 0.1607j) |
| 138 | (−0.5018 + 0.691j) | (−0.1346 + 0.9215j) | (−1.058 + 0.6629j) |
| 139 | (−0.1603 + 0.1732j) | (−0.1346 − 0.9215j) | (−1.058 − 0.0944j) |
| 140 | (0.4358 + 0.7315j) | (0.2242 + 0.9064j) | (−1.058 + 0.3594j) |
| 141 | (0.1294 + 0.2023j) | (0.2242 − 0.9064j) | (−1.058 + 0.1597j) |
| 142 | (−0.4324 + 0.7385j) | (−0.2242 + 0.9064j) | (−1.058 + 0.4297j) |
| 143 | (−0.1329 + 0.2047j) | (−0.2242 − 0.9064j) | (−1.058 + 0.0937j) |
| 144 | (0.4152 + 0.4649j) | (0.0488 + 1.0102j) | (−1.058 + 0.9504j) |
| 145 | (0.3631 + 0.4052j) | (0.0488 − 1.0102j) | (−1.058 − 0.2918j) |
| 146 | (−0.4097 + 0.467j) | (−0.0488 + 1.0102j) | (−1.058 + 1.3347j) |
| 147 | (−0.3601 + 0.4096j) | (−0.0488 − 1.0102j) | (−1.058 − 0.503j) |
| 148 | (0.2622 + 0.5707j) | (0.3391 + 0.9595j) | (−1.058 − 0.946j) |
| 149 | (0.2322 + 0.5018j) | (0.3391 − 0.9595j) | (−1.058 − 0.8449j) |
| 150 | (−0.2606 + 0.5676j) | (−0.3391 + 0.9595j) | (−1.058 − 1.331j) |
| 151 | (−0.2348 + 0.4978j) | (−0.3391 − 0.9595j) | (−1.058 − 0.5804j) |
| 152 | (0.5726 + 0.6333j) | (0.1466 + 1.0017j) | (−1.058 + 0.8462j) |
| 153 | (0.1106 + 0.1198j) | (0.1466 − 1.0017j) | (−1.058 − 0.2242j) |
| 154 | (−0.5682 + 0.6409j) | (−0.1466 + 1.0017j) | (−1.058 + 0.5805j) |
| 155 | (−0.1178 + 0.1189j) | (−0.1466 − 1.0017j) | (−1.058 − 0.0332j) |
| 156 | (0.363 + 0.7757j) | (0.2434 + 0.9852j) | (−1.058 + 0.2916j) |
| 157 | (0.0848 + 0.1073j) | (0.2434 − 0.9852j) | (−1.058 + 0.2239j) |
| 158 | (−0.362 + 0.7788j) | (−0.2434 + 0.9852j) | (−1.058 + 0.5035j) |
| 159 | (−0.0912 + 0.1086j) | (−0.2434 − 0.9852j) | (−1.058 + 0.0328j) |
| 160 | (0.3606 + 0.5047j) | (0.0793 + 1.6276j) | (−0.7494 + 1.0626j) |
| 161 | (0.3152 + 0.4353j) | (0.0793 − 1.6276j) | (−0.7494 − 0.3591j) |
| 162 | (−0.3685 + 0.5011j) | (−0.0793 + 1.6276j) | (−0.7494 + 1.1878j) |
| 163 | (−0.3289 + 0.4324j) | (−0.0793 − 1.6276j) | (−0.7494 − 0.4301j) |
| 164 | (0.3093 + 0.5357j) | (0.5459 + 1.5384j) | (−0.7494 − 1.058j) |
| 165 | (0.2589 + 0.4704j) | (0.5459 − 1.5384j) | (−0.7494 − 0.7494j) |
| 166 | (−0.3208 + 0.5383j) | (−0.5459 + 1.5384j) | (−0.7494 − 1.1847j) |
| 167 | (−0.2715 + 0.4696j) | (−0.5459 − 1.5384j) | (−0.7494 − 0.6628j) |
| 168 | (0.4948 + 0.6925j) | (0.2373 + 1.6128j) | (−0.7494 + 0.7523j) |
| 169 | (0.1516 + 0.1683j) | (0.2373 − 1.6128j) | (−0.7494 − 0.1607j) |
| 170 | (−0.5073 + 0.6829j) | (−0.2373 + 1.6128j) | (−0.7494 + 0.6629j) |
| 171 | (−0.1608 + 0.1692j) | (−0.2373 − 1.6128j) | (−0.7494 − 0.0944j) |
| 172 | (0.426 + 0.7356j) | (0.393 + 1.5827j) | (−0.7494 + 0.3594j) |
| 173 | (0.1227 + 0.2002j) | (0.393 − 1.5827j) | (−0.7494 + 0.1597j) |
| 174 | (−0.4387 + 0.7317j) | (−0.393 + 1.5827j) | (−0.7494 + 0.4297j) |
| 175 | (−0.1314 + 0.2024j) | (−0.393 − 1.5827j) | (−0.7494 + 0.0937j) |
| 176 | (0.4079 + 0.4685j) | (0.0728 + 1.4962j) | (−0.7494 + 0.9504j) |
| 177 | (0.3554 + 0.4091j) | (0.0728 − 1.4962j) | (−0.7494 − 0.2918j) |
| 178 | (−0.4179 + 0.4629j) | (−0.0728 + 1.4962j) | (−0.7494 + 1.3347j) |
| 179 | (−0.3691 + 0.4064j) | (−0.0728 − 1.4962j) | (−0.7494 − 0.503j) |
| 180 | (0.2559 + 0.5654j) | (0.5026 + 1.4144j) | (−0.7494 − 0.946j) |

-continued

| Mapping | NN_QSL | NN_QSC | NN_RSC |
|---|---|---|---|
| 181 | (0.2249 − 0.4937j) | (0.5026 − 1.4144j) | (−0.7494 − 0.8449j) |
| 182 | (−0.2654 − 0.5672j) | (−0.5026 + 1.4144j) | (−0.7494 − 1.331j) |
| 183 | (−0.2352 − 0.4942j) | (−0.5026 − 1.4144j) | (−0.7494 − 0.5804j) |
| 184 | (0.5621 − 0.637j) | (0.218 + 1.4825j) | (−0.7494 + 0.8462j) |
| 185 | (0.1105 − 0.1167j) | (0.218 − 1.4825j) | (−0.7494 − 0.2242j) |
| 186 | (−0.5709 − 0.633j) | (−0.218 + 1.4825j) | (−0.7494 + 0.5805j) |
| 187 | (−0.1167 − 0.1161j) | (−0.218 − 1.4825j) | (−0.7494 − 0.0332j) |
| 188 | (0.3523 − 0.7731j) | (0.3615 + 1.4551j) | (−0.7494 + 0.2916j) |
| 189 | (0.0869 − 0.107j) | (0.3615 − 1.4551j) | (−0.7494 + 0.2239j) |
| 190 | (−0.3709 − 0.7752j) | (−0.3615 + 1.4551j) | (−0.7494 + 0.5035j) |
| 191 | (−0.0873 − 0.1019j) | (−0.3615 − 1.4551j) | (−0.7494 + 0.0328j) |
| 192 | (0.5017 + 0.3733j) | (0.9295 + 0.0448j) | (−1.1847 + 1.0626j) |
| 193 | (0.433 + 0.3274j) | (0.9295 − 0.0448j) | (−1.1847 − 0.3591j) |
| 194 | (−0.4996 + 0.3766j) | (−0.9295 + 0.0448j) | (−1.1847 + 1.1878j) |
| 195 | (−0.4365 + 0.3322j) | (−0.9295 − 0.0448j) | (−1.1847 − 0.4301j) |
| 196 | (0.5383 + 0.3214j) | (0.8841 + 0.3122j) | (−1.1847 − 1.058j) |
| 197 | (0.4685 + 0.2775j) | (0.8841 − 0.3122j) | (−1.1847 − 0.7494j) |
| 198 | (−0.5348 + 0.3258j) | (−0.8841 + 0.3122j) | (−1.1847 − 1.1847j) |
| 199 | (−0.471 + 0.2765j) | (−0.8841 − 0.3122j) | (−1.1847 − 0.6628j) |
| 200 | (0.6824 + 0.5069j) | (0.9223 + 0.1344j) | (−1.1847 + 0.7523j) |
| 201 | (0.2041 + 0.1325j) | (0.9223 − 0.1344j) | (−1.1847 − 0.1607j) |
| 202 | (−0.6791 + 0.5175j) | (−0.9223 + 0.1344j) | (−1.1847 + 0.6629j) |
| 203 | (−0.2045 + 0.132j) | (−0.9223 − 0.1344j) | (−1.1847 − 0.0944j) |
| 204 | (0.731 + 0.4389j) | (0.9071 + 0.2239j) | (−1.1847 + 0.3594j) |
| 205 | (0.2367 + 0.1203j) | (0.9071 − 0.2239j) | (−1.1847 + 0.1597j) |
| 206 | (−0.7255 + 0.4463j) | (−0.9071 + 0.2239j) | (−1.1847 + 0.4297j) |
| 207 | (−0.237 + 0.1193j) | (−0.9071 − 0.2239j) | (−1.1847 + 0.0937j) |
| 208 | (0.4603 + 0.4175j) | (1.0112 + 0.0488j) | (−1.1847 + 0.9504j) |
| 209 | (0.4063 + 0.3693j) | (1.0112 − 0.0488j) | (−1.1847 − 0.2918j) |
| 210 | (−0.4607 + 0.4242j) | (−1.0112 + 0.0488j) | (−1.1847 + 1.3347j) |
| 211 | (−0.4028 + 0.3683j) | (−1.0112 − 0.0488j) | (−1.1847 − 0.503j) |
| 212 | (0.5655 + 0.2706j) | (0.9595 + 0.3387j) | (−1.1847 − 0.946j) |
| 213 | (0.4972 + 0.2352j) | (0.9595 − 0.3387j) | (−1.1847 − 0.8449j) |
| 214 | (−0.5663 + 0.2728j) | (−0.9595 + 0.3387j) | (−1.1847 − 1.331j) |
| 215 | (−0.4987 + 0.2352j) | (−0.9595 − 0.3387j) | (−1.1847 − 0.5804j) |
| 216 | (0.6282 + 0.5729j) | (1.0026 + 0.1464j) | (−1.1847 + 0.8462j) |
| 217 | (0.1461 + 0.0614j) | (1.0026 − 0.1464j) | (−1.1847 − 0.2242j) |
| 218 | (−0.629 + 0.5813j) | (−1.0026 + 0.1464j) | (−1.1847 + 0.5805j) |
| 219 | (−0.1499 + 0.0621j) | (−1.0026 − 0.1464j) | (−1.1847 − 0.0332j) |
| 220 | (0.7712 + 0.3678j) | (0.9858 + 0.2431j) | (−1.1847 + 0.2916j) |
| 221 | (0.0864 + 0.0375j) | (0.9858 − 0.2431j) | (−1.1847 + 0.2239j) |
| 222 | (−0.7709 + 0.3758j) | (−0.9858 + 0.2431j) | (−1.1847 + 0.5035j) |
| 223 | (−0.0946 + 0.037j) | (−0.9858 − 0.2431j) | (−1.1847 + 0.0328j) |
| 224 | (0.4907 − 0.3721j) | (1.6285 + 0.0791j) | (−0.6628 + 1.0626j) |
| 225 | (0.4272 − 0.327j) | (1.6285 − 0.0791j) | (−0.6628 − 0.3591j) |
| 226 | (−0.5032 − 0.3732j) | (−1.6285 + 0.0791j) | (−0.6628 + 1.1878j) |
| 227 | (−0.4385 − 0.3286j) | (−1.6285 − 0.0791j) | (−0.6628 − 0.4301j) |
| 228 | (0.5296 − 0.3255j) | (1.5386 + 0.5469j) | (−0.6628 − 1.058j) |
| 229 | (0.4632 − 0.2748j) | (1.5386 − 0.5469j) | (−0.6628 − 0.7494j) |
| 230 | (−0.5388 − 0.3189j) | (−1.5386 + 0.5469j) | (−0.6628 − 1.1847j) |
| 231 | (−0.4755 − 0.2712j) | (−1.5386 − 0.5469j) | (−0.6628 − 0.6628j) |
| 232 | (0.6754 − 0.519j) | (1.6131 + 0.237j) | (−0.6628 + 0.7523j) |
| 233 | (0.1995 − 0.1273j) | (1.6131 − 0.237j) | (−0.6628 − 0.1607j) |
| 234 | (−0.6842 − 0.5066j) | (−1.6131 + 0.237j) | (−0.6628 + 0.6629j) |
| 235 | (−0.2066 − 0.1312j) | (−1.6131 − 0.237j) | (−0.6628 − 0.0944j) |
| 236 | (0.7211 − 0.4468j) | (1.583 + 0.3934j) | (−0.6628 + 0.3594j) |
| 237 | (0.2335 − 0.1172j) | (1.583 − 0.3934j) | (−0.6628 + 0.1597j) |
| 238 | (−0.7312 − 0.4415j) | (−1.583 + 0.3934j) | (−0.6628 + 0.4297j) |
| 239 | (−0.2462 − 0.1171j) | (−1.583 − 0.3934j) | (−0.6628 + 0.0937j) |
| 240 | (0.4558 − 0.424j) | (1.4969 + 0.0726j) | (−0.6628 + 0.9504j) |
| 241 | (0.3981 − 0.3655j) | (1.4969 − 0.0726j) | (−0.6628 − 0.2918j) |
| 242 | (−0.4676 − 0.4191j) | (−1.4969 + 0.0726j) | (−0.6628 + 1.3347j) |
| 243 | (−0.4098 − 0.369j) | (−1.4969 − 0.0726j) | (−0.6628 − 0.503j) |
| 244 | (0.5637 − 0.2743j) | (1.4145 + 0.5032j) | (−0.6628 − 0.946j) |
| 245 | (0.4938 − 0.2386j) | (1.4145 − 0.5032j) | (−0.6628 − 0.8449j) |
| 246 | (−0.571 − 0.2635j) | (−1.4145 + 0.5032j) | (−0.6628 − 1.331j) |
| 247 | (−0.5007 − 0.2353j) | (−1.4145 − 0.5032j) | (−0.6628 − 0.5804j) |
| 248 | (0.6183 − 0.5836j) | (1.4829 + 0.2182j) | (−0.6628 + 0.8462j) |
| 249 | (0.1465 − 0.0602j) | (1.4829 − 0.2182j) | (−0.6628 − 0.2242j) |
| 250 | (−0.6288 − 0.5726j) | (−1.4829 + 0.2182j) | (−0.6628 + 0.5805j) |
| 251 | (−0.1548 − 0.0603j) | (−1.4829 − 0.2182j) | (−0.6628 − 0.0332j) |
| 252 | (0.763 − 0.3764j) | (1.4551 + 0.3617j) | (−0.6628 + 0.2916j) |
| 253 | (0.085 − 0.0339j) | (1.4551 − 0.3617j) | (−0.6628 + 0.2239j) |
| 254 | (−0.7748 − 0.3684j) | (−1.4551 + 0.3617j) | (−0.6628 + 0.5035j) |
| 255 | (−0.0927 − 0.0278j) | (−1.4551 − 0.3617j) | (−0.6628 + 0.0328j) |
| 256 | (0.1013 + 0.6984j) | (0.5869 + 0.6485j) | (0.7523 + 1.0626j) |
| 257 | (0.0558 + 0.4624j) | (0.5869 − 0.6485j) | (0.7523 − 0.3591j) |

-continued

| Mapping | NN_QSL | NN_QSC | NN_RSC |
|---|---|---|---|
| 258 | (−0.0963 + 0.7007j) | (−0.5869 + 0.6485j) | (0.7523 + 1.1878j) |
| 259 | (−0.0551 + 0.4603j) | (−0.5869 − 0.6485j) | (0.7523 − 0.4301j) |
| 260 | (0.169 + 0.6862j) | (0.3677 + 0.7819j) | (0.7523 − 1.058j) |
| 261 | (0.1232 + 0.4492j) | (0.3677 − 0.7819j) | (0.7523 − 0.7494j) |
| 262 | (−0.1643 + 0.6844j) | (−0.3677 + 0.7819j) | (0.7523 − 1.1847j) |
| 263 | (−0.1223 + 0.4513j) | (−0.3677 − 0.7819j) | (0.7523 − 0.6628j) |
| 264 | (0.1146 + 0.7745j) | (0.5188 + 0.7018j) | (0.7523 − 0.7523j) |
| 265 | (0.0303 + 0.2988j) | (0.5188 − 0.7018j) | (0.7523 − 0.1607j) |
| 266 | (−0.1078 + 0.7737j) | (−0.5188 + 0.7018j) | (0.7523 + 0.6629j) |
| 267 | (−0.0306 + 0.303j) | (−0.5188 − 0.7018j) | (0.7523 − 0.0944j) |
| 268 | (0.1878 + 0.7561j) | (0.445 + 0.7463j) | (0.7523 + 0.3594j) |
| 269 | (0.094 + 0.2936j) | (0.445 − 0.7463j) | (0.7523 + 0.1597j) |
| 270 | (−0.186 + 0.7586j) | (−0.445 + 0.7463j) | (0.7523 + 0.4297j) |
| 271 | (−0.0962 + 0.2893j) | (−0.445 − 0.7463j) | (0.7523 + 0.0937j) |
| 272 | (0.0361 + 0.7022j) | (0.5389 + 0.5945j) | (0.7523 + 0.9504j) |
| 273 | (0.0348 + 0.4317j) | (0.5389 − 0.5945j) | (0.7523 − 0.2918j) |
| 274 | (−0.0312 + 0.7j) | (−0.5389 + 0.5945j) | (0.7523 + 1.3347j) |
| 275 | (−0.0333 + 0.4266j) | (−0.5389 − 0.5945j) | (0.7523 − 0.503j) |
| 276 | (0.2349 + 0.6655j) | (0.338 + 0.7122j) | (0.7523 − 0.946j) |
| 277 | (0.1304 + 0.415j) | (0.338 − 0.7122j) | (0.7523 − 0.8449j) |
| 278 | (−0.2376 + 0.663j) | (−0.338 + 0.7122j) | (0.7523 − 1.331j) |
| 279 | (−0.1281 + 0.4148j) | (−0.338 − 0.7122j) | (0.7523 − 0.5804j) |
| 280 | (0.0396 + 0.7779j) | (0.4765 + 0.6415j) | (0.7523 + 0.8462j) |
| 281 | (0.0355 + 0.3627j) | (0.4765 − 0.6415j) | (0.7523 − 0.2242j) |
| 282 | (−0.0352 + 0.7793j) | (−0.4765 + 0.6415j) | (0.7523 + 0.5805j) |
| 283 | (−0.0391 + 0.361j) | (−0.4765 − 0.6415j) | (0.7523 − 0.0332j) |
| 284 | (0.2594 + 0.7335j) | (0.4091 + 0.6803j) | (0.7523 + 0.2916j) |
| 285 | (0.1071 + 0.3528j) | (0.4091 − 0.6803j) | (0.7523 + 0.2239j) |
| 286 | (−0.2581 + 0.7369j) | (−0.4091 + 0.6803j) | (0.7523 + 0.5035j) |
| 287 | (−0.1093 + 0.343j) | (−0.4091 − 0.6803j) | (0.7523 + 0.0328j) |
| 288 | (0.0953 − 0.6954j) | (0.4403 + 0.4792j) | (−0.1607 + 1.0626j) |
| 289 | (0.0473 − 0.4604j) | (0.4403 − 0.4792j) | (−0.1607 − 0.3591j) |
| 290 | (−0.1075 − 0.6946j) | (−0.4403 + 0.4792j) | (−0.1607 + 1.1878j) |
| 291 | (−0.0599 − 0.4574j) | (−0.4403 − 0.4792j) | (−0.1607 − 0.4301j) |
| 292 | (0.1584 − 0.6792j) | (0.2846 + 0.572j) | (−0.1607 − 1.058j) |
| 293 | (0.1198 − 0.4495j) | (0.2846 − 0.572j) | (−0.1607 − 0.7494j) |
| 294 | (−0.1731 − 0.6792j) | (−0.2846 + 0.572j) | (−0.1607 − 1.1847j) |
| 295 | (−0.1267 − 0.4471j) | (−0.2846 − 0.572j) | (−0.1607 − 0.6628j) |
| 296 | (0.1038 − 0.7681j) | (0.3971 + 0.5118j) | (−0.1607 + 0.7523j) |
| 297 | (0.0241 − 0.2945j) | (0.3971 − 0.5118j) | (−0.1607 − 0.1607j) |
| 298 | (−0.1222 − 0.7711j) | (−0.3971 + 0.5118j) | (−0.1607 + 0.6629j) |
| 299 | (−0.032 − 0.2934j) | (−0.3971 − 0.5118j) | (−0.1607 − 0.0944j) |
| 300 | (0.178 − 0.7553j) | (0.3409 + 0.5481j) | (−0.1607 + 0.3594j) |
| 301 | (0.085 − 0.2892j) | (0.3409 − 0.5481j) | (−0.1607 + 0.1597j) |
| 302 | (−0.1922 − 0.7587j) | (−0.3409 + 0.5481j) | (−0.1607 + 0.4297j) |
| 303 | (−0.0966 − 0.29j) | (−0.3409 − 0.5481j) | (−0.1607 + 0.0937j) |
| 304 | (0.0277 − 0.7029j) | (0.491 + 0.5389j) | (−0.1607 + 0.9504j) |
| 305 | (0.0289 − 0.426j) | (0.491 − 0.5389j) | (−0.1607 − 0.2918j) |
| 306 | (−0.038 − 0.702j) | (−0.491 + 0.5389j) | (−0.1607 + 1.3347j) |
| 307 | (−0.042 − 0.4295j) | (−0.491 − 0.5389j) | (−0.1607 − 0.503j) |
| 308 | (0.2234 − 0.6626j) | (0.3098 + 0.6428j) | (−0.1607 − 0.946j) |
| 309 | (0.1215 − 0.4077j) | (0.3098 − 0.6428j) | (−0.1607 − 0.8449j) |
| 310 | (−0.2387 − 0.6644j) | (−0.3098 + 0.6428j) | (−0.1607 − 1.331j) |
| 311 | (−0.1305 − 0.409j) | (−0.3098 − 0.6428j) | (−0.1607 − 0.5804j) |
| 312 | (0.0301 − 0.7807j) | (0.4363 + 0.5791j) | (−0.1607 + 0.8462j) |
| 313 | (0.0303 − 0.3591j) | (0.4363 − 0.5791j) | (−0.1607 − 0.2242j) |
| 314 | (−0.0465 − 0.7785j) | (−0.4363 + 0.5791j) | (−0.1607 + 0.5805j) |
| 315 | (−0.0456 − 0.3566j) | (−0.4363 − 0.5791j) | (−0.1607 − 0.0332j) |
| 316 | (0.2496 − 0.7328j) | (0.375 + 0.6138j) | (−0.1607 + 0.2916j) |
| 317 | (0.0994 − 0.3418j) | (0.375 − 0.6138j) | (−0.1607 + 0.2239j) |
| 318 | (−0.2667 − 0.7328j) | (−0.375 + 0.6138j) | (−0.1607 + 0.5035j) |
| 319 | (−0.1126 − 0.3464j) | (−0.375 − 0.6138j) | (−0.1607 + 0.0328j) |
| 320 | (0.6978 + 0.1033j) | (0.6485 + 0.5868j) | (0.6629 + 1.0626j) |
| 321 | (0.4746 + 0.0555j) | (0.6485 − 0.5868j) | (0.6629 − 0.3591j) |
| 322 | (−0.7054 + 0.1101j) | (−0.6485 + 0.5868j) | (0.6629 + 1.1878j) |
| 323 | (−0.4839 + 0.0617j) | (−0.6485 − 0.5868j) | (0.6629 − 0.4301j) |
| 324 | (0.684 + 0.1699j) | (0.782 + 0.3674j) | (0.6629 − 1.058j) |
| 325 | (0.4599 + 0.1257j) | (0.782 − 0.3674j) | (0.6629 − 0.7494j) |
| 326 | (−0.6846 + 0.1737j) | (−0.782 + 0.3674j) | (0.6629 − 1.1847j) |
| 327 | (−0.4678 + 0.1235j) | (−0.782 − 0.3674j) | (0.6629 − 0.6628j) |
| 328 | (0.7735 + 0.1152j) | (0.7016 + 0.5185j) | (0.6629 + 0.7523j) |
| 329 | (0.3319 + 0.0298j) | (0.7016 − 0.5185j) | (0.6629 − 0.1607j) |
| 330 | (−0.7747 + 0.1171j) | (−0.7016 + 0.5185j) | (0.6629 + 0.6629j) |
| 331 | (−0.3384 + 0.0336j) | (−0.7016 − 0.5185j) | (0.6629 − 0.0944j) |
| 332 | (0.7572 + 0.1878j) | (0.7462 + 0.445j) | (0.6629 + 0.3594j) |
| 333 | (0.3215 + 0.0853j) | (0.7462 − 0.445j) | (0.6629 + 0.1597j) |
| 334 | (−0.7581 + 0.1947j) | (−0.7462 + 0.445j) | (0.6629 + 0.4297j) |

-continued

| Mapping | NN_QSL | NN_QSC | NN_RSC |
|---|---|---|---|
| 335 | (−0.3301 + 0.0957j) | (−0.7462 − 0.445j) | (0.6629 + 0.0937j) |
| 336 | (0.7024 + 0.0345j) | (0.5943 + 0.5387j) | (0.6629 + 0.9504j) |
| 337 | (0.4548 + 0.033j) | (0.5943 − 0.5387j) | (0.6629 − 0.2918j) |
| 338 | (−0.711 + 0.0382j) | (−0.5943 + 0.5387j) | (0.6629 + 1.3347j) |
| 339 | (−0.459 + 0.0384j) | (−0.5943 − 0.5387j) | (0.6629 − 0.503j) |
| 340 | (0.661 + 0.2372j) | (0.7127 + 0.3377j) | (0.6629 − 0.946j) |
| 341 | (0.4304 + 0.1413j) | (0.7127 − 0.3377j) | (0.6629 − 0.8449j) |
| 342 | (−0.6658 + 0.2416j) | (−0.7127 + 0.3377j) | (0.6629 − 1.331j) |
| 343 | (−0.4375 + 0.139j) | (−0.7127 − 0.3377j) | (0.6629 − 0.5804j) |
| 344 | (0.7815 + 0.0351j) | (0.6416 + 0.4762j) | (0.6629 + 0.8462j) |
| 345 | (0.3845 + 0.0331j) | (0.6416 − 0.4762j) | (0.6629 − 0.2242j) |
| 346 | (−0.784 + 0.037j) | (−0.6416 + 0.4762j) | (0.6629 + 0.5805j) |
| 347 | (−0.3946 + 0.0376j) | (−0.6416 − 0.4762j) | (0.6629 − 0.0332j) |
| 348 | (0.7308 + 0.2641j) | (0.6805 + 0.4088j) | (0.6629 + 0.2916j) |
| 349 | (0.3662 + 0.1117j) | (0.6805 − 0.4088j) | (0.6629 + 0.2239j) |
| 350 | (−0.7321 + 0.2669j) | (−0.6805 + 0.4088j) | (0.6629 + 0.5035j) |
| 351 | (−0.3756 + 0.1152j) | (−0.6805 − 0.4088j) | (0.6629 + 0.0328j) |
| 352 | (0.6946 − 0.1047j) | (0.4788 + 0.4401j) | (−0.0944 + 1.0626j) |
| 353 | (0.472 − 0.0599j) | (0.4788 − 0.4401j) | (−0.0944 − 0.3591j) |
| 354 | (−0.707 − 0.1019j) | (−0.4788 + 0.4401j) | (−0.0944 + 1.1878j) |
| 355 | (−0.481 − 0.0578j) | (−0.4788 − 0.4401j) | (−0.0944 − 0.4301j) |
| 356 | (0.6803 − 0.1731j) | (0.5723 + 0.2842j) | (−0.0944 − 1.058j) |
| 357 | (0.4592 − 0.1234j) | (0.5723 − 0.2842j) | (−0.0944 − 0.7494j) |
| 358 | (−0.6945 − 0.1702j) | (−0.5723 + 0.2842j) | (−0.0944 − 1.1847j) |
| 359 | (−0.4666 − 0.1204j) | (−0.5723 − 0.2842j) | (−0.0944 − 0.6628j) |
| 360 | (0.7686 − 0.1174j) | (0.5126 + 0.3966j) | (−0.0944 + 0.7523j) |
| 361 | (0.3344 − 0.0345j) | (0.5126 − 0.3966j) | (−0.0944 − 0.1607j) |
| 362 | (−0.7795 − 0.1132j) | (−0.5126 + 0.3966j) | (−0.0944 + 0.6629j) |
| 363 | (−0.3338 − 0.0267j) | (−0.5126 − 0.3966j) | (−0.0944 − 0.0944j) |
| 364 | (0.7525 − 0.192j) | (0.5486 + 0.3406j) | (−0.0944 + 0.3594j) |
| 365 | (0.3214 − 0.0877j) | (0.5486 − 0.3406j) | (−0.0944 + 0.1597j) |
| 366 | (−0.7618 − 0.1884j) | (−0.5486 + 0.3406j) | (−0.0944 + 0.4297j) |
| 367 | (−0.327 − 0.0901j) | (−0.5486 − 0.3406j) | (−0.0944 + 0.0937j) |
| 368 | (0.7037 − 0.0376j) | (0.5388 + 0.491j) | (−0.0944 + 0.9504j) |
| 369 | (0.4509 − 0.0353j) | (0.5388 − 0.491j) | (−0.0944 − 0.2918j) |
| 370 | (−0.7125 − 0.0349j) | (−0.5388 + 0.491j) | (−0.0944 + 1.3347j) |
| 371 | (−0.4601 − 0.0338j) | (−0.5388 − 0.491j) | (−0.0944 − 0.503j) |
| 372 | (0.658 − 0.2415j) | (0.6432 + 0.3095j) | (−0.0944 − 0.946j) |
| 373 | (0.4253 − 0.138j) | (0.6432 − 0.3095j) | (−0.0944 − 0.8449j) |
| 374 | (−0.6673 − 0.2334j) | (−0.6432 + 0.3095j) | (−0.0944 − 1.331j) |
| 375 | (−0.4353 − 0.142j) | (−0.6432 − 0.3095j) | (−0.0944 − 0.5804j) |
| 376 | (0.7776 − 0.0416j) | (0.5792 + 0.4361j) | (−0.0944 + 0.8462j) |
| 377 | (0.3828 − 0.0336j) | (0.5792 − 0.4361j) | (−0.0944 − 0.2242j) |
| 378 | (−0.7872 − 0.0398j) | (−0.5792 + 0.4361j) | (−0.0944 + 0.5805j) |
| 379 | (−0.391 − 0.0341j) | (−0.5792 − 0.4361j) | (−0.0944 − 0.0332j) |
| 380 | (0.7242 − 0.2666j) | (0.6142 + 0.3748j) | (−0.0944 + 0.2916j) |
| 381 | (0.3657 − 0.108j) | (0.6142 − 0.3748j) | (−0.0944 + 0.2239j) |
| 382 | (−0.7381 − 0.2626j) | (−0.6142 + 0.3748j) | (−0.0944 + 0.5035j) |
| 383 | (−0.3728 − 0.111j) | (−0.6142 − 0.3748j) | (−0.0944 + 0.0328j) |
| 384 | (0.4153 + 0.5601j) | (0.6369 + 0.7034j) | (0.3594 + 1.0626j) |
| 385 | (0.2833 + 0.3791j) | (0.6369 − 0.7034j) | (0.3594 − 0.3591j) |
| 386 | (−0.4077 + 0.5667j) | (−0.6369 + 0.7034j) | (0.3594 + 1.1878j) |
| 387 | (−0.2787 + 0.3761j) | (−0.6369 − 0.7034j) | (0.3594 − 0.4301j) |
| 388 | (0.3594 + 0.6034j) | (0.3992 + 0.8521j) | (0.3594 − 1.058j) |
| 389 | (0.2226 + 0.4131j) | (0.3992 − 0.8521j) | (0.3594 − 0.7494j) |
| 390 | (−0.3546 + 0.6133j) | (−0.3992 + 0.8521j) | (0.3594 − 1.1847j) |
| 391 | (−0.2211 + 0.412j) | (−0.3992 − 0.8521j) | (0.3594 − 0.6628j) |
| 392 | (0.4609 + 0.6268j) | (0.5628 + 0.7625j) | (0.3594 + 0.7523j) |
| 393 | (0.2077 + 0.2388j) | (0.5628 − 0.7625j) | (0.3594 − 0.1607j) |
| 394 | (−0.4572 + 0.6304j) | (−0.5628 + 0.7625j) | (0.3594 + 0.6629j) |
| 395 | (−0.2071 + 0.2395j) | (−0.5628 − 0.7625j) | (0.3594 − 0.0944j) |
| 396 | (0.398 + 0.6663j) | (0.483 + 0.8118j) | (0.3594 + 0.3594j) |
| 397 | (0.1564 + 0.2707j) | (0.483 − 0.8118j) | (0.3594 + 0.1597j) |
| 398 | (−0.3919 + 0.6739j) | (−0.483 + 0.8118j) | (0.3594 + 0.4297j) |
| 399 | (−0.1588 + 0.2723j) | (−0.483 − 0.8118j) | (0.3594 + 0.0937j) |
| 400 | (0.4691 + 0.5203j) | (0.6889 + 0.7607j) | (0.3594 + 0.9504j) |
| 401 | (0.2908 + 0.3407j) | (0.6889 − 0.7607j) | (0.3594 − 0.2918j) |
| 402 | (−0.4657 + 0.5244j) | (−0.6889 + 0.7607j) | (0.3594 + 1.3347j) |
| 403 | (−0.288 + 0.3402j) | (−0.6889 − 0.7607j) | (0.3594 − 0.503j) |
| 404 | (0.2992 + 0.636j) | (0.4324 + 0.9241j) | (0.3594 − 0.946j) |
| 405 | (0.195 + 0.3956j) | (0.4324 − 0.9241j) | (0.3594 − 0.8449j) |
| 406 | (−0.292 + 0.6388j) | (−0.4324 + 0.9241j) | (0.3594 − 1.331j) |
| 407 | (−0.1945 + 0.3903j) | (−0.4324 − 0.9241j) | (0.3594 − 0.5804j) |
| 408 | (0.5189 + 0.5794j) | (0.6091 + 0.8245j) | (0.3594 + 0.8462j) |
| 409 | (0.2445 + 0.2905j) | (0.6091 − 0.8245j) | (0.3594 − 0.2242j) |
| 410 | (−0.5158 + 0.5817j) | (−0.6091 + 0.8245j) | (0.3594 + 0.5805j) |
| 411 | (−0.2461 + 0.2872j) | (−0.6091 − 0.8245j) | (0.3594 − 0.0332j) |

-continued

| Mapping | NN_QSL | NN_QSC | NN_RSC |
|---|---|---|---|
| 412 | (0.3348 + 0.7019j) | (0.5228 + 0.8795j) | (0.3594 + 0.2916j) |
| 413 | (0.1782 + 0.3285j) | (0.5228 − 0.8795j) | (0.3594 + 0.2239j) |
| 414 | (−0.327 + 0.7086j) | (−0.5228 + 0.8795j) | (0.3594 + 0.5035j) |
| 415 | (−0.1797 + 0.3239j) | (−0.5228 − 0.8795j) | (0.3594 + 0.0328j) |
| 416 | (0.4044 − 0.5663j) | (1.0985 + 1.2137j) | (0.1597 + 1.0626j) |
| 417 | (0.2784 − 0.3723j) | (1.0985 − 1.2137j) | (0.1597 − 0.3591j) |
| 418 | (−0.414 − 0.5661j) | (−1.0985 + 1.2137j) | (0.1597 + 1.1878j) |
| 419 | (−0.2855 − 0.3768j) | (−1.0985 − 1.2137j) | (0.1597 − 0.4301j) |
| 420 | (0.3464 − 0.6042j) | (0.6952 + 1.4795j) | (0.1597 − 1.058j) |
| 421 | (0.218 − 0.4068j) | (0.6952 − 1.4795j) | (0.1597 − 0.7494j) |
| 422 | (−0.3588 − 0.6031j) | (−0.6952 + 1.4795j) | (0.1597 − 1.1847j) |
| 423 | (−0.228 − 0.4086j) | (−0.6952 − 1.4795j) | (0.1597 − 0.6628j) |
| 424 | (0.4496 − 0.6241j) | (0.9727 + 1.316j) | (0.1597 + 0.7523j) |
| 425 | (0.1973 − 0.2358j) | (0.9727 − 1.316j) | (0.1597 − 0.1607j) |
| 426 | (−0.4618 − 0.6251j) | (−0.9727 + 1.316j) | (0.1597 + 0.6629j) |
| 427 | (−0.2074 − 0.2334j) | (−0.9727 − 1.316j) | (0.1597 − 0.0944j) |
| 428 | (0.3837 − 0.6687j) | (0.8374 + 1.4043j) | (0.1597 + 0.3594j) |
| 429 | (0.15 − 0.2654j) | (0.8374 − 1.4043j) | (0.1597 + 0.1597j) |
| 430 | (−0.3983 − 0.6688j) | (−0.8374 + 1.4043j) | (0.1597 + 0.4297j) |
| 431 | (−0.1577 − 0.2634j) | (−0.8374 − 1.4043j) | (0.1597 + 0.0937j) |
| 432 | (0.4584 − 0.523j) | (1.0103 + 1.1159j) | (0.1597 + 0.9504j) |
| 433 | (0.286 − 0.3374j) | (1.0103 − 1.1159j) | (0.1597 − 0.2918j) |
| 434 | (−0.4707 − 0.5192j) | (−1.0103 + 1.1159j) | (0.1597 + 1.3347j) |
| 435 | (−0.291 − 0.3391j) | (−1.0103 − 1.1159j) | (0.1597 − 0.503j) |
| 436 | (0.2872 − 0.6367j) | (0.6395 + 1.3601j) | (0.1597 − 0.946j) |
| 437 | (0.1885 − 0.3827j) | (0.6395 − 1.3601j) | (0.1597 − 0.8449j) |
| 438 | (−0.2972 − 0.6351j) | (−0.6395 + 1.3601j) | (0.1597 − 1.331j) |
| 439 | (−0.1996 − 0.3857j) | (−0.6395 − 1.3601j) | (0.1597 − 0.5804j) |
| 440 | (0.5098 − 0.5831j) | (0.8958 + 1.2097j) | (0.1597 + 0.8462j) |
| 441 | (0.2378 − 0.2832j) | (0.8958 − 1.2097j) | (0.1597 − 0.2242j) |
| 442 | (−0.5185 − 0.5724j) | (−0.8958 + 1.2097j) | (0.1597 + 0.5805j) |
| 443 | (−0.245 − 0.2864j) | (−0.8958 − 1.2097j) | (0.1597 − 0.0332j) |
| 444 | (0.3213 − 0.7036j) | (0.7706 + 1.2911j) | (0.1597 + 0.2916j) |
| 445 | (0.1694 − 0.3292j) | (0.7706 − 1.2911j) | (0.1597 + 0.2239j) |
| 446 | (−0.333 − 0.7005j) | (−0.7706 + 1.2911j) | (0.1597 + 0.5035j) |
| 447 | (−0.1813 − 0.3203j) | (−0.7706 − 1.2911j) | (0.1597 + 0.0328j) |
| 448 | (0.5565 + 0.4175j) | (0.7036 + 0.6365j) | (0.4297 + 1.0626j) |
| 449 | (0.3788 + 0.2851j) | (0.7036 − 0.6365j) | (0.4297 − 0.3591j) |
| 450 | (−0.559 + 0.4229j) | (−0.7036 + 0.6365j) | (0.4297 + 1.1878j) |
| 451 | (−0.3788 + 0.2891j) | (−0.7036 − 0.6365j) | (0.4297 − 0.4301j) |
| 452 | (0.5995 + 0.3619j) | (0.8522 + 0.3989j) | (0.4297 − 1.058j) |
| 453 | (0.41 + 0.2381j) | (0.8522 − 0.3989j) | (0.4297 − 0.7494j) |
| 454 | (−0.6012 + 0.3679j) | (−0.8522 + 0.3989j) | (0.4297 − 1.1847j) |
| 455 | (−0.4115 + 0.237j) | (−0.8522 − 0.3989j) | (0.4297 − 0.6628j) |
| 456 | (0.6205 + 0.4659j) | (0.7622 + 0.5621j) | (0.4297 + 0.7523j) |
| 457 | (0.2561 + 0.1988j) | (0.7622 − 0.5621j) | (0.4297 − 0.1607j) |
| 458 | (−0.6201 + 0.4704j) | (−0.7622 + 0.5621j) | (0.4297 + 0.6629j) |
| 459 | (−0.2602 + 0.2035j) | (−0.7622 − 0.5621j) | (0.4297 − 0.0944j) |
| 460 | (0.666 + 0.4j) | (0.8121 + 0.4829j) | (0.4297 + 0.3594j) |
| 461 | (0.2927 + 0.155j) | (0.8121 − 0.4829j) | (0.4297 + 0.1597j) |
| 462 | (−0.6627 + 0.4065j) | (−0.8121 + 0.4829j) | (0.4297 + 0.4297j) |
| 463 | (−0.2942 + 0.1577j) | (−0.8121 − 0.4829j) | (0.4297 + 0.0937j) |
| 464 | (0.52 + 0.4703j) | (0.761 + 0.6881j) | (0.4297 + 0.9504j) |
| 465 | (0.3402 + 0.2969j) | (0.761 − 0.6881j) | (0.4297 − 0.2918j) |
| 466 | (−0.5136 + 0.4742j) | (−0.761 + 0.6881j) | (0.4297 + 1.3347j) |
| 467 | (−0.3425 + 0.3006j) | (−0.761 − 0.6881j) | (0.4297 − 0.503j) |
| 468 | (0.6335 + 0.2992j) | (0.9243 + 0.4319j) | (0.4297 − 0.946j) |
| 469 | (0.404 + 0.2052j) | (0.9243 − 0.4319j) | (0.4297 − 0.8449j) |
| 470 | (−0.636 + 0.3079j) | (−0.9243 + 0.4319j) | (0.4297 − 1.331j) |
| 471 | (−0.407 + 0.2004j) | (−0.9243 − 0.4319j) | (0.4297 − 0.5804j) |
| 472 | (0.5761 + 0.5217j) | (0.8247 + 0.6086j) | (0.4297 + 0.8462j) |
| 473 | (0.2943 + 0.2471j) | (0.8247 − 0.6086j) | (0.4297 − 0.2242j) |
| 474 | (−0.5723 + 0.5251j) | (−0.8247 + 0.6086j) | (0.4297 + 0.5805j) |
| 475 | (−0.2985 + 0.2461j) | (−0.8247 − 0.6086j) | (0.4297 − 0.0332j) |
| 476 | (0.7045 + 0.336j) | (0.8793 + 0.5228j) | (0.4297 + 0.2916j) |
| 477 | (0.3384 + 0.174j) | (0.8793 − 0.5228j) | (0.4297 + 0.2239j) |
| 478 | (−0.7003 + 0.3413j) | (−0.8793 + 0.5228j) | (0.4297 + 0.5035j) |
| 479 | (−0.3426 + 0.1793j) | (−0.8793 − 0.5228j) | (0.4297 + 0.0328j) |
| 480 | (0.5483 − 0.4219j) | (1.2125 + 1.0979j) | (0.0937 + 1.0626j) |
| 481 | (0.3728 − 0.2866j) | (1.2125 − 1.0979j) | (0.0937 − 0.3591j) |
| 482 | (−0.5634 − 0.4175j) | (−1.2125 + 1.0979j) | (0.0937 + 1.1878j) |
| 483 | (−0.3815 − 0.2874j) | (−1.2125 − 1.0979j) | (0.0937 − 0.4301j) |
| 484 | (0.5909 − 0.3657j) | (1.4792 + 0.6961j) | (0.0937 − 1.058j) |
| 485 | (0.4019 − 0.2375j) | (1.4792 − 0.6961j) | (0.0937 − 0.7494j) |
| 486 | (−0.6034 − 0.3608j) | (−1.4792 + 0.6961j) | (0.0937 − 1.1847j) |
| 487 | (−0.4194 − 0.233j) | (−1.4792 − 0.6961j) | (0.0937 − 0.6628j) |
| 488 | (0.6129 − 0.4726j) | (1.3155 + 0.973j) | (0.0937 + 0.7523j) |

-continued

| Mapping | NN_QSL | NN_QSC | NN_RSC |
|---|---|---|---|
| 489 | (0.2535 − 0.1974j) | (1.3155 − 0.973j) | (0.0937 − 0.1607j) |
| 490 | (−0.6218 − 0.4643j) | (−1.3155 + 0.973j) | (0.0937 + 0.6629j) |
| 491 | (−0.2603 − 0.1987j) | (−1.3155 − 0.973j) | (0.0937 − 0.0944j) |
| 492 | (0.6588 − 0.4093j) | (1.4038 + 0.8377j) | (0.0937 + 0.3594j) |
| 493 | (0.2842 − 0.1506j) | (1.4038 − 0.8377j) | (0.0937 + 0.1597j) |
| 494 | (−0.6665 − 0.4036j) | (−1.4038 + 0.8377j) | (0.0937 + 0.4297j) |
| 495 | (−0.2976 − 0.1518j) | (−1.4038 − 0.8377j) | (0.0937 + 0.0937j) |
| 496 | (0.51 − 0.4746j) | (1.1144 + 1.0103j) | (0.0937 + 0.9504j) |
| 497 | (0.3347 − 0.2965j) | (1.1144 − 1.0103j) | (0.0937 − 0.2918j) |
| 498 | (−0.5148 − 0.4713j) | (−1.1144 + 1.0103j) | (0.0937 + 1.3347j) |
| 499 | (−0.3461 − 0.2979j) | (−1.1144 − 1.0103j) | (0.0937 − 0.503j) |
| 500 | (0.6272 − 0.3068j) | (1.3602 + 0.6395j) | (0.0937 − 0.946j) |
| 501 | (0.4006 − 0.2039j) | (1.3602 − 0.6395j) | (0.0937 − 0.8449j) |
| 502 | (−0.64 − 0.3011j) | (−1.3602 + 0.6395j) | (0.0937 − 1.331j) |
| 503 | (−0.4088 − 0.1967j) | (−1.3602 − 0.6395j) | (0.0937 − 0.5804j) |
| 504 | (0.5658 − 0.5287j) | (1.209 + 0.8956j) | (0.0937 + 0.8462j) |
| 505 | (0.2884 − 0.238j) | (1.209 − 0.8956j) | (0.0937 − 0.2242j) |
| 506 | (−0.5678 − 0.5205j) | (−1.209 + 0.8956j) | (0.0937 + 0.5805j) |
| 507 | (−0.2983 − 0.2402j) | (−1.209 − 0.8956j) | (0.0937 − 0.0332j) |
| 508 | (0.6931 − 0.3397j) | (1.2908 + 0.7709j) | (0.0937 + 0.2916j) |
| 509 | (0.3332 − 0.1749j) | (1.2908 − 0.7709j) | (0.0937 − 0.2239j) |
| 510 | (−0.7075 − 0.3341j) | (−1.2908 + 0.7709j) | (0.0937 + 0.5035j) |
| 511 | (−0.3454 − 0.176j) | (−1.2908 − 0.7709j) | (0.0937 + 0.0328j) |
| 512 | (0.1786 + 1.1724j) | (0.027 + 0.0611j) | (0.9504 + 1.0626j) |
| 513 | (0.1917 + 1.2732j) | (0.027 − 0.0611j) | (0.9504 − 0.3591j) |
| 514 | (−0.1693 + 1.1787j) | (−0.027 + 0.0611j) | (0.9504 + 1.1878j) |
| 515 | (−0.1855 + 1.2741j) | (−0.027 − 0.0611j) | (0.9504 − 0.4301j) |
| 516 | (0.2907 + 1.1433j) | (0.0317 + 0.262j) | (0.9504 − 1.058j) |
| 517 | (0.309 + 1.2499j) | (0.0317 − 0.262j) | (0.9504 − 0.7494j) |
| 518 | (−0.2863 + 1.1591j) | (−0.0317 + 0.262j) | (0.9504 − 1.1847j) |
| 519 | (−0.3086 + 1.25j) | (−0.0317 − 0.262j) | (0.9504 − 0.6628j) |
| 520 | (0.1416 + 0.9264j) | (0.043 + 0.1103j) | (0.9504 − 0.7523j) |
| 521 | (0.258 + 1.6315j) | (0.043 − 0.1103j) | (0.9504 − 0.1607j) |
| 522 | (−0.1358 + 0.9275j) | (−0.043 + 0.1103j) | (0.9504 + 0.6629j) |
| 523 | (−0.2411 + 1.6341j) | (−0.043 − 0.1103j) | (0.9504 − 0.0944j) |
| 524 | (0.2287 + 0.902j) | (0.025 + 0.1818j) | (0.9504 + 0.3594j) |
| 525 | (0.3934 + 1.4627j) | (0.025 − 0.1818j) | (0.9504 + 0.1597j) |
| 526 | (−0.2253 + 0.9122j) | (−0.025 + 0.1818j) | (0.9504 + 0.4297j) |
| 527 | (−0.3962 + 1.6036j) | (−0.025 − 0.1818j) | (0.9504 + 0.0937j) |
| 528 | (0.0567 + 1.1856j) | (0.0278 + 0.3759j) | (0.9504 + 0.9504j) |
| 529 | (0.0657 + 1.2858j) | (0.0278 − 0.3759j) | (0.9504 − 0.2918j) |
| 530 | (−0.0561 + 1.1863j) | (−0.0278 + 0.3759j) | (0.9504 + 1.3347j) |
| 531 | (−0.0624 + 1.286j) | (−0.0278 − 0.3759j) | (0.9504 − 0.503j) |
| 532 | (0.4094 + 1.1197j) | (0.0553 + 0.3141j) | (0.9504 − 0.946j) |
| 533 | (0.4903 + 1.3021j) | (0.0553 − 0.3141j) | (0.9504 − 0.8449j) |
| 534 | (−0.3997 + 1.1155j) | (−0.0553 + 0.3141j) | (0.9504 − 1.331j) |
| 535 | (−0.4291 + 1.2139j) | (−0.0553 − 0.3141j) | (0.9504 − 0.5804j) |
| 536 | (0.048 + 0.9321j) | (0.0722 + 0.3941j) | (0.9504 + 0.8462j) |
| 537 | (0.0854 + 1.6496j) | (0.0722 − 0.3941j) | (0.9504 − 0.2242j) |
| 538 | (−0.0436 + 0.9357j) | (−0.0722 + 0.3941j) | (0.9504 + 0.5805j) |
| 539 | (−0.077 + 1.65j) | (−0.0722 − 0.3941j) | (0.9504 − 0.0332j) |
| 540 | (0.3228 + 0.8843j) | (0.1151 + 0.3654j) | (0.9504 + 0.2916j) |
| 541 | (0.531 + 1.4186j) | (0.1151 − 0.3654j) | (0.9504 − 0.2239j) |
| 542 | (−0.3122 + 0.8829j) | (−0.1151 + 0.3654j) | (0.9504 + 0.5035j) |
| 543 | (−0.5528 + 1.5565j) | (−0.1151 − 0.3654j) | (0.9504 + 0.0328j) |
| 544 | (0.1657 − 1.171j) | (0.0317 + 0.5381j) | (−0.2918 + 1.0626j) |
| 545 | (0.1862 − 1.274j) | (0.0317 − 0.5381j) | (−0.2918 − 0.3591j) |
| 546 | (−0.1783 − 1.1678j) | (−0.0317 + 0.5381j) | (−0.2918 + 1.1878j) |
| 547 | (−0.1975 − 1.2723j) | (−0.0317 − 0.5381j) | (−0.2918 − 0.4301j) |
| 548 | (0.2774 − 1.1499j) | (0.2051 + 0.5107j) | (−0.2918 − 1.058j) |
| 549 | (0.2994 − 1.2522j) | (0.2051 − 0.5107j) | (−0.2918 − 0.7494j) |
| 550 | (−0.2937 − 1.1526j) | (−0.2051 + 0.5107j) | (−0.2918 − 1.1847j) |
| 551 | (−0.3184 − 1.2475j) | (−0.2051 − 0.5107j) | (−0.2918 − 0.6628j) |
| 552 | (0.1268 − 0.9247j) | (0.0921 + 0.5307j) | (−0.2918 + 0.7523j) |
| 553 | (0.2411 − 1.6341j) | (0.0921 − 0.5307j) | (−0.2918 − 0.1607j) |
| 554 | (−0.146 − 0.9209j) | (−0.0921 + 0.5307j) | (−0.2918 + 0.6629j) |
| 555 | (−0.2471 − 1.6332j) | (−0.0921 − 0.5307j) | (−0.2918 − 0.0944j) |
| 556 | (0.2174 − 0.9034j) | (0.1506 + 0.526j) | (−0.2918 + 0.3594j) |
| 557 | (0.4076 − 1.6007j) | (0.1506 − 0.526j) | (−0.2918 + 0.1597j) |
| 558 | (−0.2309 − 0.9025j) | (−0.1506 + 0.526j) | (−0.2918 + 0.4297j) |
| 559 | (−0.4053 − 1.6013j) | (−0.1506 − 0.526j) | (−0.2918 + 0.0937j) |
| 560 | (0.0491 − 1.1786j) | (0.0272 + 0.4642j) | (−0.2918 + 0.9504j) |
| 561 | (0.0566 − 1.2863j) | (0.0272 − 0.4642j) | (−0.2918 − 0.2918j) |
| 562 | (−0.0675 − 1.1846j) | (−0.0272 + 0.4642j) | (−0.2918 + 1.3347j) |
| 563 | (−0.0679 − 1.2857j) | (−0.0272 − 0.4642j) | (−0.2918 − 0.503j) |
| 564 | (0.3898 − 1.1113j) | (0.1897 + 0.4469j) | (−0.2918 − 0.946j) |
| 565 | (0.4225 − 1.2162j) | (0.1897 − 0.4469j) | (−0.2918 − 0.8449j) |

-continued

| Mapping | NN_QSL | NN_QSC | NN_RSC |
|---|---|---|---|
| 566 | (−0.409 − 1.1185j) | (−0.1897 + 0.4469j) | (−0.2918 − 1.331j) |
| 567 | (−0.439 − 1.2104j) | (−0.1897 − 0.4469j) | (−0.2918 − 0.5804j) |
| 568 | (0.035 − 0.9278j) | (0.0838 + 0.4552j) | (−0.2918 + 0.8462j) |
| 569 | (0.0826 − 1.6497j) | (0.0838 − 0.4552j) | (−0.2918 − 0.2242j) |
| 570 | (−0.0547 − 0.9275j) | (−0.0838 + 0.4552j) | (−0.2918 + 0.5805j) |
| 571 | (−0.0884 − 1.6494j) | (−0.0838 − 0.4552j) | (−0.2918 − 0.0332j) |
| 572 | (0.3 − 0.881j) | (0.1492 + 0.4302j) | (−0.2918 + 0.2916j) |
| 573 | (0.5598 − 1.554j) | (0.1492 − 0.4302j) | (−0.2918 − 0.2239j) |
| 574 | (−0.3188 − 0.8774j) | (−0.1492 + 0.4302j) | (−0.2918 + 0.5035j) |
| 575 | (−0.5712 − 1.5499j) | (−0.1492 − 0.4302j) | (−0.2918 + 0.0328j) |
| 576 | (1.1647 + 0.1694j) | (0.0534 + 0.0265j) | (1.3347 + 1.0626j) |
| 577 | (1.4993 + 0.2153j) | (0.0534 − 0.0265j) | (1.3347 − 0.3591j) |
| 578 | (−1.1674 + 0.1824j) | (−0.0534 + 0.0265j) | (1.3347 + 1.1878j) |
| 579 | (−1.2728 + 0.1939j) | (−0.0534 − 0.0265j) | (1.3347 − 0.4301j) |
| 580 | (1.1424 + 0.2787j) | (0.2607 + 0.0314j) | (1.3347 − 1.058j) |
| 581 | (1.4721 + 0.3567j) | (0.2607 − 0.0314j) | (1.3347 − 0.7494j) |
| 582 | (−1.1453 + 0.2988j) | (−0.2607 + 0.0314j) | (1.3347 − 1.1847j) |
| 583 | (−1.2465 + 0.3223j) | (−0.2607 − 0.0314j) | (1.3347 − 0.6628j) |
| 584 | (0.9202 + 0.1383j) | (0.1082 + 0.0417j) | (1.3347 + 0.7523j) |
| 585 | (1.6358 + 0.2295j) | (0.1082 − 0.0417j) | (1.3347 − 0.1607j) |
| 586 | (−0.9246 + 0.1443j) | (−0.1082 + 0.0417j) | (1.3347 + 0.6629j) |
| 587 | (−1.6335 + 0.2451j) | (−0.1082 − 0.0417j) | (1.3347 − 0.0944j) |
| 588 | (0.9042 + 0.2274j) | (0.1795 + 0.0247j) | (1.3347 + 0.3594j) |
| 589 | (1.6071 + 0.3817j) | (0.1795 − 0.0247j) | (1.3347 + 0.1597j) |
| 590 | (−0.9054 + 0.2344j) | (−0.1795 + 0.0247j) | (1.3347 + 0.4297j) |
| 591 | (−1.6014 + 0.4048j) | (−0.1795 − 0.0247j) | (1.3347 + 0.0937j) |
| 592 | (1.1743 + 0.0533j) | (0.3752 + 0.0277j) | (1.3347 + 0.9504j) |
| 593 | (1.5134 + 0.0631j) | (0.3752 − 0.0277j) | (1.3347 − 0.2918j) |
| 594 | (−1.1776 + 0.0638j) | (−0.3752 + 0.0277j) | (1.3347 + 1.3347j) |
| 595 | (−1.2856 + 0.0698j) | (−0.3752 − 0.0277j) | (1.3347 − 0.503j) |
| 596 | (1.1172 + 0.3913j) | (0.3134 + 0.0556j) | (1.3347 − 0.946j) |
| 597 | (1.4323 + 0.4929j) | (0.3134 − 0.0556j) | (1.3347 − 0.8449j) |
| 598 | (−1.1139 + 0.4116j) | (−0.3134 + 0.0556j) | (1.3347 − 1.331j) |
| 599 | (−1.209 + 0.4427j) | (−0.3134 − 0.0556j) | (1.3347 − 0.5804j) |
| 600 | (0.9317 + 0.0452j) | (0.3933 + 0.0716j) | (1.3347 + 0.8462j) |
| 601 | (1.6504 + 0.0689j) | (0.3933 − 0.0716j) | (1.3347 − 0.2242j) |
| 602 | (−0.9339 + 0.0509j) | (−0.3933 + 0.0716j) | (1.3347 + 0.5805j) |
| 603 | (−1.6494 + 0.0884j) | (−0.3933 − 0.0716j) | (1.3347 − 0.0332j) |
| 604 | (0.8748 + 0.3161j) | (0.365 + 0.1149j) | (1.3347 + 0.2916j) |
| 605 | (1.5636 + 0.5325j) | (0.365 − 0.1149j) | (1.3347 − 0.2239j) |
| 606 | (−0.8734 + 0.322j) | (−0.365 + 0.1149j) | (1.3347 + 0.5035j) |
| 607 | (−1.5514 + 0.5672j) | (−0.365 − 0.1149j) | (1.3347 + 0.0328j) |
| 608 | (1.1645 − 0.1744j) | (0.538 + 0.0316j) | (−0.503 + 1.0626j) |
| 609 | (1.498 − 0.2244j) | (0.538 − 0.0316j) | (−0.503 − 0.3591j) |
| 610 | (−1.1728 − 0.1765j) | (−0.538 + 0.0316j) | (−0.503 + 1.1878j) |
| 611 | (−1.2737 − 0.1879j) | (−0.538 − 0.0316j) | (−0.503 − 0.4301j) |
| 612 | (1.1384 − 0.2837j) | (0.5107 + 0.2047j) | (−0.503 − 1.058j) |
| 613 | (1.4708 − 0.3623j) | (0.5107 − 0.2047j) | (−0.503 − 0.7494j) |
| 614 | (−1.1494 − 0.2879j) | (−0.5107 + 0.2047j) | (−0.503 − 1.1847j) |
| 615 | (−1.2492 − 0.3118j) | (−0.5107 − 0.2047j) | (−0.503 − 0.6628j) |
| 616 | (0.9147 − 0.1392j) | (0.5312 + 0.0918j) | (−0.503 + 0.7523j) |
| 617 | (1.634 − 0.2415j) | (0.5312 − 0.0918j) | (−0.503 − 0.1607j) |
| 618 | (−0.9308 − 0.1394j) | (−0.5312 + 0.0918j) | (−0.503 + 0.6629j) |
| 619 | (−1.6357 − 0.2298j) | (−0.5312 − 0.0918j) | (−0.503 − 0.0944j) |
| 620 | (0.8961 − 0.2302j) | (0.5264 + 0.1505j) | (−0.503 + 0.3594j) |
| 621 | (1.6044 − 0.3927j) | (0.5264 − 0.1505j) | (−0.503 + 0.1597j) |
| 622 | (−0.9094 − 0.2263j) | (−0.5264 + 0.1505j) | (−0.503 + 0.4297j) |
| 623 | (−1.6046 − 0.3921j) | (−0.5264 − 0.1505j) | (−0.503 + 0.0937j) |
| 624 | (1.1802 − 0.0531j) | (0.464 + 0.0275j) | (−0.503 + 0.9504j) |
| 625 | (1.5126 − 0.0797j) | (0.464 − 0.0275j) | (−0.503 − 0.2918j) |
| 626 | (−1.1809 − 0.0568j) | (−0.464 + 0.0275j) | (−0.503 + 1.3347j) |
| 627 | (−1.2861 − 0.0597j) | (−0.464 − 0.0275j) | (−0.503 − 0.503j) |
| 628 | (1.1032 − 0.3996j) | (0.4471 + 0.1888j) | (−0.503 − 0.946j) |
| 629 | (1.4282 − 0.5046j) | (0.4471 − 0.1888j) | (−0.503 − 0.8449j) |
| 630 | (−1.1225 − 0.4008j) | (−0.4471 + 0.1888j) | (−0.503 − 1.331j) |
| 631 | (−1.2128 − 0.4322j) | (−0.4471 − 0.1888j) | (−0.503 − 0.5804j) |
| 632 | (0.928 − 0.0459j) | (0.4551 + 0.0837j) | (−0.503 + 0.8462j) |
| 633 | (1.6495 − 0.0876j) | (0.4551 − 0.0837j) | (−0.503 − 0.2242j) |
| 634 | (−0.9373 − 0.0446j) | (−0.4551 + 0.0837j) | (−0.503 + 0.5805j) |
| 635 | (−1.6498 − 0.0804j) | (−0.4551 − 0.0837j) | (−0.503 − 0.0332j) |
| 636 | (0.8685 − 0.3189j) | (0.4306 + 0.1487j) | (−0.503 + 0.2916j) |
| 637 | (1.5587 − 0.5466j) | (0.4306 − 0.1487j) | (−0.503 + 0.2239j) |
| 638 | (−0.8786 − 0.3163j) | (−0.4306 + 0.1487j) | (−0.503 + 0.5035j) |
| 639 | (−1.5586 − 0.547j) | (−0.4306 − 0.1487j) | (−0.503 + 0.0328j) |
| 640 | (0.7069 + 0.9425j) | (0.0575 + 1.1837j) | (−0.946 + 1.0626j) |
| 641 | (0.8322 + 1.115j) | (0.0575 − 1.1837j) | (−0.946 − 0.3591j) |
| 642 | (−0.698 + 0.952j) | (−0.0575 + 1.1837j) | (−0.946 + 1.1878j) |

-continued

| Mapping | NN_QSL | NN_QSC | NN_RSC |
|---|---|---|---|
| 643 | (−0.7634 + 1.0368j) | (−0.0575 − 1.1837j) | (−0.946 − 0.4301j) |
| 644 | (0.615 + 1.0184j) | (0.3973 + 1.121j) | (−0.946 − 1.058j) |
| 645 | (0.7224 + 1.1891j) | (0.3973 − 1.121j) | (−0.946 − 0.7494j) |
| 646 | (−0.6048 + 1.0285j) | (−0.3973 + 1.121j) | (−0.946 − 1.1847j) |
| 647 | (−0.653 + 1.1096j) | (−0.3973 − 1.121j) | (−0.946 − 0.6628j) |
| 648 | (0.5515 + 0.7486j) | (0.172 + 1.1733j) | (−0.946 + 0.7523j) |
| 649 | (0.9152 + 1.207j) | (0.172 − 1.1733j) | (−0.946 − 0.1607j) |
| 650 | (−0.5507 + 0.7546j) | (−0.172 + 1.1733j) | (−0.946 + 0.6629j) |
| 651 | (−0.9814 + 1.3286j) | (−0.172 − 1.1733j) | (−0.946 − 0.0944j) |
| 652 | (0.4755 + 0.8063j) | (0.2858 + 1.1531j) | (−0.946 + 0.3594j) |
| 653 | (0.7878 + 1.2937j) | (0.2858 − 1.1531j) | (−0.946 + 0.1597j) |
| 654 | (−0.4733 + 0.805j) | (−0.2858 + 1.1531j) | (−0.946 + 0.4297j) |
| 655 | (−0.8424 + 1.4208j) | (−0.2858 − 1.1531j) | (−0.946 + 0.0937j) |
| 656 | (0.7981 + 0.8749j) | (0.0532 + 1.0946j) | (−0.946 + 0.9504j) |
| 657 | (0.9342 + 1.0311j) | (0.0532 − 1.0946j) | (−0.946 − 0.2918j) |
| 658 | (−0.7956 + 0.8855j) | (−0.0532 + 1.0946j) | (−0.946 + 1.3347j) |
| 659 | (−0.8619 + 0.9565j) | (−0.0532 − 1.0946j) | (−0.946 − 0.503j) |
| 660 | (0.5126 + 1.0729j) | (0.367 + 1.0381j) | (−0.946 − 0.946j) |
| 661 | (0.6094 + 1.2508j) | (0.367 − 1.0381j) | (−0.946 − 0.8449j) |
| 662 | (−0.5018 + 1.0771j) | (−0.367 + 1.0381j) | (−0.946 − 1.331j) |
| 663 | (−0.5458 + 1.1661j) | (−0.367 − 1.0381j) | (−0.946 − 0.5804j) |
| 664 | (0.6234 + 0.6912j) | (0.159 + 1.0852j) | (−0.946 + 0.8462j) |
| 665 | (1.0257 + 1.1146j) | (0.159 − 1.0852j) | (−0.946 − 0.2242j) |
| 666 | (−0.6154 + 0.6921j) | (−0.159 + 1.0852j) | (−0.946 + 0.5805j) |
| 667 | (−1.1063 + 1.2266j) | (−0.159 − 1.0852j) | (−0.946 − 0.0332j) |
| 668 | (0.3995 + 0.8429j) | (0.264 + 1.067j) | (−0.946 + 0.2916j) |
| 669 | (0.6712 + 1.3579j) | (0.264 − 1.067j) | (−0.946 + 0.2239j) |
| 670 | (−0.3961 + 0.8456j) | (−0.264 + 1.067j) | (−0.946 + 0.5035j) |
| 671 | (−0.7021 + 1.4952j) | (−0.264 − 1.067j) | (−0.946 + 0.0328j) |
| 672 | (0.7008 − 0.9586j) | (0.0622 + 1.2787j) | (−0.8449 + 1.0626j) |
| 673 | (0.8267 − 1.1191j) | (0.0622 − 1.2787j) | (−0.8449 − 0.3591j) |
| 674 | (−0.7111 − 0.9504j) | (−0.0622 + 1.2787j) | (−0.8449 + 1.1878j) |
| 675 | (−0.767 − 1.0341j) | (−0.0622 − 1.2787j) | (−0.8449 − 0.4301j) |
| 676 | (0.6035 − 1.0258j) | (0.4301 + 1.2101j) | (−0.8449 − 1.058j) |
| 677 | (0.7162 − 1.1928j) | (0.4301 − 1.2101j) | (−0.8449 − 0.7494j) |
| 678 | (−0.6122 − 1.0147j) | (−0.4301 + 1.2101j) | (−0.8449 − 1.1847j) |
| 679 | (−0.6685 − 1.1004j) | (−0.4301 − 1.2101j) | (−0.8449 − 0.6628j) |
| 680 | (0.5477 − 0.7505j) | (0.1863 + 1.2674j) | (−0.8449 + 0.7523j) |
| 681 | (0.9065 − 1.2135j) | (0.1863 − 1.2674j) | (−0.8449 − 0.1607j) |
| 682 | (−0.5559 − 0.752j) | (−0.1863 + 1.2674j) | (−0.8449 + 0.6629j) |
| 683 | (−0.9899 − 1.3223j) | (−0.1863 − 1.2674j) | (−0.8449 − 0.0944j) |
| 684 | (0.4665 − 0.7984j) | (0.3092 + 1.2448j) | (−0.8449 + 0.3594j) |
| 685 | (0.7816 − 1.2975j) | (0.3092 − 1.2448j) | (−0.8449 + 0.1597j) |
| 686 | (−0.4862 − 0.8005j) | (−0.3092 + 1.2448j) | (−0.8449 + 0.4297j) |
| 687 | (−0.8591 − 1.4108j) | (−0.3092 − 1.2448j) | (−0.8449 + 0.0937j) |
| 688 | (0.7846 − 0.8762j) | (0.0672 + 1.3819j) | (−0.8449 + 0.9504j) |
| 689 | (0.9281 − 1.0365j) | (0.0672 − 1.3819j) | (−0.8449 − 0.2918j) |
| 690 | (−0.7992 − 0.8736j) | (−0.0672 + 1.3819j) | (−0.8449 + 1.3347j) |
| 691 | (−0.8668 − 0.952j) | (−0.0672 − 1.3819j) | (−0.8449 − 0.503j) |
| 692 | (0.4984 − 1.0659j) | (0.4648 + 1.307j) | (−0.8449 − 0.946j) |
| 693 | (0.5355 − 1.1709j) | (0.4648 − 1.307j) | (−0.8449 − 0.8449j) |
| 694 | (−0.513 − 1.071j) | (−0.4648 + 1.307j) | (−0.8449 − 1.331j) |
| 695 | (−0.5555 − 1.1615j) | (−0.4648 − 1.307j) | (−0.8449 − 0.5804j) |
| 696 | (0.6114 − 0.6943j) | (0.2016 + 1.3696j) | (−0.8449 + 0.8462j) |
| 697 | (1.0215 − 1.1184j) | (0.2016 − 1.3696j) | (−0.8449 − 0.2242j) |
| 698 | (−0.6263 − 0.6837j) | (−0.2016 + 1.3696j) | (−0.8449 + 0.5805j) |
| 699 | (−1.1178 − 1.2161j) | (−0.2016 − 1.3696j) | (−0.8449 − 0.0332j) |
| 700 | (0.3859 − 0.8401j) | (0.3344 + 1.3443j) | (−0.8449 + 0.2916j) |
| 701 | (0.6538 − 1.3664j) | (0.3344 − 1.3443j) | (−0.8449 + 0.2239j) |
| 702 | (−0.4012 − 0.8435j) | (−0.3344 + 1.3443j) | (−0.8449 + 0.5035j) |
| 703 | (−0.7165 − 1.4883j) | (−0.3344 − 1.3443j) | (−0.8449 + 0.0328j) |
| 704 | (0.9555 + 0.702j) | (1.1848 + 0.0575j) | (−1.331 + 1.0626j) |
| 705 | (1.2319 + 0.8814j) | (1.1848 − 0.0575j) | (−1.331 − 0.3591j) |
| 706 | (−0.9498 + 0.7129j) | (−1.1848 + 0.0575j) | (−1.331 + 1.1878j) |
| 707 | (−1.027 + 0.7766j) | (−1.1848 − 0.0575j) | (−1.331 − 0.4301j) |
| 708 | (1.0187 + 0.6027j) | (1.1213 + 0.3973j) | (−1.331 − 1.058j) |
| 709 | (1.315 + 0.7518j) | (1.1213 − 0.3973j) | (−1.331 − 0.7494j) |
| 710 | (−1.0083 + 0.6151j) | (−1.1213 + 0.3973j) | (−1.331 − 1.1847j) |
| 711 | (−1.1015 + 0.6666j) | (−1.1213 − 0.3973j) | (−1.331 − 0.6628j) |
| 712 | (0.7463 + 0.5537j) | (1.1742 + 0.1718j) | (−1.331 + 0.7523j) |
| 713 | (1.3417 + 0.9634j) | (1.1742 − 0.1718j) | (−1.331 − 0.1607j) |
| 714 | (−0.745 + 0.5654j) | (−1.1742 + 0.1718j) | (−1.331 + 0.6629j) |
| 715 | (−1.3284 + 0.9818j) | (−1.1742 − 0.1718j) | (−1.331 − 0.0944j) |
| 716 | (0.7927 + 0.4759j) | (1.1536 + 0.2855j) | (−1.331 + 0.3594j) |
| 717 | (1.4277 + 0.8308j) | (1.1536 − 0.2855j) | (−1.331 + 0.1597j) |
| 718 | (−0.7941 + 0.4894j) | (−1.1536 + 0.2855j) | (−1.331 + 0.4297j) |
| 719 | (−1.413 + 0.8554j) | (−1.1536 − 0.2855j) | (−1.331 + 0.0937j) |

-continued

| Mapping | NN_QSL | NN_QSC | NN_RSC |
|---|---|---|---|
| 720 | (0.8747 + 0.7861j) | (1.0956 + 0.053j) | (−1.331 + 0.9504j) |
| 721 | (1.1389 + 0.9987j) | (1.0956 − 0.053j) | (−1.331 − 0.2918j) |
| 722 | (−0.8696 + 0.7966j) | (−1.0956 + 0.053j) | (−1.331 + 1.3347j) |
| 723 | (−0.9505 + 0.8685j) | (−1.0956 − 0.053j) | (−1.331 − 0.503j) |
| 724 | (1.0692 + 0.5015j) | (1.0383 + 0.3669j) | (−1.331 − 0.946j) |
| 725 | (1.3757 + 0.6339j) | (1.0383 − 0.3669j) | (−1.331 − 0.8449j) |
| 726 | (−1.0658 + 0.5137j) | (−1.0383 + 0.3669j) | (−1.331 − 1.331j) |
| 727 | (−1.161 + 0.5566j) | (−1.0383 − 0.3669j) | (−1.331 − 0.5804j) |
| 728 | (0.687 + 0.6205j) | (1.0863 + 0.159j) | (−1.331 + 0.8462j) |
| 729 | (1.2372 + 1.0944j) | (1.0863 − 0.159j) | (−1.331 − 0.2242j) |
| 730 | (−0.6877 + 0.6333j) | (−1.0863 + 0.159j) | (−1.331 + 0.5805j) |
| 731 | (−1.2251 + 1.1079j) | (−1.0863 − 0.159j) | (−1.331 − 0.0332j) |
| 732 | (0.8436 + 0.3975j) | (1.0675 + 0.264j) | (−1.331 + 0.2916j) |
| 733 | (1.5011 + 0.6893j) | (1.0675 − 0.264j) | (−1.331 + 0.2239j) |
| 734 | (−0.8394 + 0.4073j) | (−1.0675 + 0.264j) | (−1.331 + 0.5035j) |
| 735 | (−1.4925 + 0.7078j) | (−1.0675 − 0.264j) | (−1.331 + 0.0328j) |
| 736 | (0.9443 − 0.7071j) | (1.2799 + 0.062j) | (−0.5804 + 1.0626j) |
| 737 | (1.2202 − 0.8975j) | (1.2799 − 0.062j) | (−0.5804 − 0.3591j) |
| 738 | (−0.9487 − 0.6996j) | (−1.2799 + 0.062j) | (−0.5804 + 1.1878j) |
| 739 | (−1.038 − 0.7618j) | (−1.2799 − 0.062j) | (−0.5804 − 0.4301j) |
| 740 | (1.0102 − 0.6086j) | (1.2103 + 0.4297j) | (−0.5804 − 1.058j) |
| 741 | (1.3042 − 0.7703j) | (1.2103 − 0.4297j) | (−0.5804 − 0.7494j) |
| 742 | (−1.0086 − 0.6001j) | (−1.2103 + 0.4297j) | (−0.5804 − 1.1847j) |
| 743 | (−1.1065 − 0.6583j) | (−1.2103 − 0.4297j) | (−0.5804 − 0.6628j) |
| 744 | (0.738 − 0.5612j) | (1.2684 + 0.186j) | (−0.5804 + 0.7523j) |
| 745 | (1.3385 − 0.968j) | (1.2684 − 0.186j) | (−0.5804 − 0.1607j) |
| 746 | (−0.7447 − 0.5564j) | (−1.2684 + 0.186j) | (−0.5804 + 0.6629j) |
| 747 | (−1.3369 − 0.9701j) | (−1.2684 − 0.186j) | (−0.5804 − 0.0944j) |
| 748 | (0.7897 − 0.4876j) | (1.2451 + 0.3089j) | (−0.5804 − 0.3594j) |
| 749 | (1.4243 − 0.8365j) | (1.2451 − 0.3089j) | (−0.5804 + 0.1597j) |
| 750 | (−0.7977 − 0.4802j) | (−1.2451 + 0.3089j) | (−0.5804 + 0.4297j) |
| 751 | (−1.4225 − 0.8396j) | (−1.2451 − 0.3089j) | (−0.5804 + 0.0937j) |
| 752 | (0.8677 − 0.793j) | (1.383 + 0.0678j) | (−0.5804 + 0.9504j) |
| 753 | (1.1351 − 1.003j) | (1.383 − 0.0678j) | (−0.5804 − 0.2918j) |
| 754 | (−0.8831 − 0.7952j) | (−1.383 + 0.0678j) | (−0.5804 + 1.3347j) |
| 755 | (−0.9571 − 0.8612j) | (−1.383 − 0.0678j) | (−0.5804 − 0.503j) |
| 756 | (1.0586 − 0.5052j) | (1.3072 + 0.465j) | (−0.5804 − 0.946j) |
| 757 | (1.3741 − 0.6374j) | (1.3072 − 0.465j) | (−0.5804 − 0.8449j) |
| 758 | (−1.0708 − 0.5059j) | (−1.3072 + 0.465j) | (−0.5804 − 1.331j) |
| 759 | (−1.1655 − 0.547j) | (−1.3072 − 0.465j) | (−0.5804 − 0.5804j) |
| 760 | (0.6789 − 0.6352j) | (1.3701 + 0.2024j) | (−0.5804 + 0.8462j) |
| 761 | (1.2379 − 1.0937j) | (1.3701 − 0.2024j) | (−0.5804 − 0.2242j) |
| 762 | (−0.6897 − 0.6256j) | (−1.3701 + 0.2024j) | (−0.5804 + 0.5805j) |
| 763 | (−1.2375 − 1.0941j) | (−1.3701 − 0.2024j) | (−0.5804 − 0.0332j) |
| 764 | (0.8306 − 0.3999j) | (1.3443 + 0.3352j) | (−0.5804 + 0.2916j) |
| 765 | (1.4995 − 0.6928j) | (1.3443 − 0.3352j) | (−0.5804 + 0.2239j) |
| 766 | (−0.844 − 0.4028j) | (−1.3443 + 0.3352j) | (−0.5804 + 0.5035j) |
| 767 | (−1.4993 − 0.6933j) | (−1.3443 − 0.3352j) | (−0.5804 + 0.0328j) |
| 768 | (0.1656 + 1.084j) | (0.1481 + 0.1893j) | (0.8462 + 1.0626j) |
| 769 | (0.2096 + 1.3754j) | (0.1481 − 0.1893j) | (0.8462 − 0.3591j) |
| 770 | (−0.1593 + 1.0928j) | (−0.1481 + 0.1893j) | (0.8462 + 1.1878j) |
| 771 | (−0.2008 + 1.3767j) | (−0.1481 − 0.1893j) | (0.8462 − 0.4301j) |
| 772 | (0.2771 + 1.0629j) | (0.0947 + 0.2322j) | (0.8462 − 1.058j) |
| 773 | (0.3461 + 1.3476j) | (0.0947 − 0.2322j) | (0.8462 − 0.7494j) |
| 774 | (−0.268 + 1.0658j) | (−0.0947 + 0.2322j) | (0.8462 − 1.1847j) |
| 775 | (−0.335 + 1.3504j) | (−0.0947 − 0.2322j) | (0.8462 − 0.6628j) |
| 776 | (0.1532 + 1.0087j) | (0.0996 + 0.1406j) | (0.8462 + 0.7523j) |
| 777 | (0.2329 + 1.4967j) | (0.0996 − 0.1406j) | (0.8462 − 0.1607j) |
| 778 | (−0.1438 + 1.0059j) | (−0.0996 + 0.1406j) | (0.8462 + 0.6629j) |
| 779 | (−0.222 + 1.4984j) | (−0.0996 − 0.1406j) | (0.8462 − 0.0944j) |
| 780 | (0.2497 + 0.9813j) | (0.0674 + 0.1859j) | (0.8462 + 0.3594j) |
| 781 | (0.4377 + 1.5927j) | (0.0674 − 0.1859j) | (0.8462 + 0.1597j) |
| 782 | (−0.243 + 0.9898j) | (−0.0674 + 0.1859j) | (0.8462 + 0.4297j) |
| 783 | (−0.3635 + 1.4705j) | (−0.0674 − 0.1859j) | (0.8462 + 0.0937j) |
| 784 | (0.0552 + 1.0973j) | (0.1858 + 0.2349j) | (0.8462 + 0.9504j) |
| 785 | (0.0692 + 1.3896j) | (0.1858 − 0.2349j) | (0.8462 − 0.2918j) |
| 786 | (−0.0533 + 1.1004j) | (−0.1858 + 0.2349j) | (0.8462 + 1.3347j) |
| 787 | (−0.0645 + 1.3898j) | (−0.1858 − 0.2349j) | (0.8462 − 0.503j) |
| 788 | (0.3786 + 1.0415j) | (0.1264 + 0.2775j) | (0.8462 − 0.946j) |
| 789 | (0.4427 + 1.209j) | (0.1264 − 0.2775j) | (0.8462 − 0.8449j) |
| 790 | (−0.366 + 1.0374j) | (−0.1264 + 0.2775j) | (0.8462 − 1.331j) |
| 791 | (−0.4614 + 1.3126j) | (−0.1264 − 0.2775j) | (0.8462 − 0.5804j) |
| 792 | (0.0518 + 1.0143j) | (0.2228 + 0.2756j) | (0.8462 + 0.8462j) |
| 793 | (0.0782 + 1.5127j) | (0.2228 − 0.2756j) | (0.8462 − 0.2242j) |
| 794 | (−0.046 + 1.0123j) | (−0.2228 + 0.2756j) | (0.8462 + 0.5805j) |
| 795 | (−0.0701 + 1.5131j) | (−0.2228 − 0.2756j) | (0.8462 − 0.0332j) |
| 796 | (0.3459 + 0.9602j) | (0.1646 + 0.3239j) | (0.8462 + 0.2916j) |

-continued

| Mapping | NN_QSL | NN_QSC | NN_RSC |
|---|---|---|---|
| 797 | (0.5834 + 1.5453j) | (0.1646 − 0.3239j) | (0.8462 + 0.2239j) |
| 798 | (−0.339 + 0.9602j) | (−0.1646 + 0.3239j) | (0.8462 + 0.5035j) |
| 799 | (−0.5068 + 1.4274j) | (−0.1646 − 0.3239j) | (0.8462 + 0.0328j) |
| 800 | (0.1542 − 1.0848j) | (0.3621 + 0.4078j) | (−0.2242 + 1.0626j) |
| 801 | (0.195 − 1.3776j) | (0.3621 − 0.4078j) | (−0.2242 − 0.3591j) |
| 802 | (−0.1692 − 1.0862j) | (−0.3621 + 0.4078j) | (−0.2242 + 1.1878j) |
| 803 | (−0.2105 − 1.3753j) | (−0.3621 − 0.4078j) | (−0.2242 − 0.4301j) |
| 804 | (0.2571 − 1.0604j) | (0.2671 + 0.4864j) | (−0.2242 − 1.058j) |
| 805 | (0.3269 − 1.3524j) | (0.2671 − 0.4864j) | (−0.2242 − 0.7494j) |
| 806 | (−0.2773 − 1.0626j) | (−0.2671 + 0.4864j) | (−0.2242 − 1.1847j) |
| 807 | (−0.3392 − 1.3493j) | (−0.2671 − 0.4864j) | (−0.2242 − 0.6628j) |
| 808 | (0.1408 − 0.9984j) | (0.3557 + 0.4498j) | (−0.2242 + 0.7523j) |
| 809 | (0.2184 − 1.4989j) | (0.3557 − 0.4498j) | (−0.2242 − 0.1607j) |
| 810 | (−0.1557 − 0.9979j) | (−0.3557 + 0.4498j) | (−0.2242 + 0.6629j) |
| 811 | (−0.2305 − 1.4971j) | (−0.3557 − 0.4498j) | (−0.2242 − 0.0944j) |
| 812 | (0.2392 − 0.984j) | (0.3098 + 0.4844j) | (−0.2242 + 0.3594j) |
| 813 | (0.3623 − 1.4708j) | (0.3098 − 0.4844j) | (−0.2242 + 0.1597j) |
| 814 | (−0.2536 − 0.981j) | (−0.3098 + 0.4844j) | (−0.2242 + 0.4297j) |
| 815 | (−0.3706 − 1.4687j) | (−0.3098 − 0.4844j) | (−0.2242 + 0.0937j) |
| 816 | (0.0449 − 1.0969j) | (0.3069 + 0.3625j) | (−0.2242 + 0.9504j) |
| 817 | (0.0641 − 1.3898j) | (0.3069 − 0.3625j) | (−0.2242 − 0.2918j) |
| 818 | (−0.0605 − 1.0926j) | (−0.3069 + 0.3625j) | (−0.2242 + 1.3347j) |
| 819 | (−0.0755 − 1.3893j) | (−0.3069 − 0.3625j) | (−0.2242 − 0.503j) |
| 820 | (0.3587 − 1.0333j) | (0.2448 + 0.4128j) | (−0.2242 − 0.946j) |
| 821 | (0.4569 − 1.3142j) | (0.2448 − 0.4128j) | (−0.2242 − 0.8449j) |
| 822 | (−0.378 − 1.0328j) | (−0.2448 + 0.4128j) | (−0.2242 − 1.331j) |
| 823 | (−0.4736 − 1.3082j) | (−0.2448 − 0.4128j) | (−0.2242 − 0.5804j) |
| 824 | (0.0429 − 1.0191j) | (0.2662 + 0.3202j) | (−0.2242 + 0.8462j) |
| 825 | (0.0686 − 1.5132j) | (0.2662 − 0.3202j) | (−0.2242 − 0.2242j) |
| 826 | (−0.0648 − 1.0092j) | (−0.2662 + 0.3202j) | (−0.2242 + 0.5805j) |
| 827 | (−0.0795 − 1.5126j) | (−0.2662 − 0.3202j) | (−0.2242 − 0.0332j) |
| 828 | (0.3307 − 0.9507j) | (0.2125 + 0.367j) | (−0.2242 + 0.2916j) |
| 829 | (0.5016 − 1.4293j) | (0.2125 − 0.367j) | (−0.2242 − 0.2239j) |
| 830 | (−0.3502 − 0.9508j) | (−0.2125 + 0.367j) | (−0.2242 + 0.5035j) |
| 831 | (−0.5177 − 1.4235j) | (−0.2125 − 0.367j) | (−0.2242 + 0.0328j) |
| 832 | (1.0784 + 0.1597j) | (0.1893 + 0.1475j) | (0.5805 + 1.0626j) |
| 833 | (1.2742 + 0.1847j) | (0.1893 − 0.1475j) | (0.5805 − 0.3591j) |
| 834 | (−1.0825 + 0.1662j) | (−0.1893 + 0.1475j) | (0.5805 + 1.1878j) |
| 835 | (−1.3752 + 0.2111j) | (−0.1893 − 0.1475j) | (0.5805 − 0.4301j) |
| 836 | (1.0563 + 0.2659j) | (0.2314 + 0.0941j) | (0.5805 − 1.058j) |
| 837 | (1.2502 + 0.3076j) | (0.2314 − 0.0941j) | (0.5805 − 0.7494j) |
| 838 | (−1.0638 + 0.2757j) | (−0.2314 + 0.0941j) | (0.5805 − 1.1847j) |
| 839 | (−1.3486 + 0.3422j) | (−0.2314 − 0.0941j) | (0.5805 − 0.6628j) |
| 840 | (0.9951 + 0.1479j) | (0.1398 + 0.0991j) | (0.5805 + 0.7523j) |
| 841 | (1.3773 + 0.1969j) | (0.1398 − 0.0991j) | (0.5805 − 0.1607j) |
| 842 | (−1.0058 + 0.1556j) | (−0.1398 + 0.0991j) | (0.5805 + 0.6629j) |
| 843 | (−1.4969 + 0.2316j) | (−0.1398 − 0.0991j) | (0.5805 − 0.0944j) |
| 844 | (0.9768 + 0.245j) | (0.1843 + 0.0666j) | (0.5805 + 0.3594j) |
| 845 | (1.3521 + 0.3281j) | (0.1843 − 0.0666j) | (0.5805 + 0.1597j) |
| 846 | (−0.9837 + 0.2569j) | (−0.1843 + 0.0666j) | (0.5805 + 0.4297j) |
| 847 | (−1.4666 + 0.3789j) | (−0.1843 − 0.0666j) | (0.5805 + 0.0937j) |
| 848 | (1.0838 + 0.0529j) | (0.2352 + 0.1848j) | (0.5805 + 0.9504j) |
| 849 | (1.2863 + 0.0567j) | (0.2352 − 0.1848j) | (0.5805 − 0.2918j) |
| 850 | (−1.0962 + 0.0587j) | (−0.2352 + 0.1848j) | (0.5805 + 1.3347j) |
| 851 | (−1.3895 + 0.0714j) | (−0.2352 − 0.1848j) | (0.5805 − 0.503j) |
| 852 | (1.0289 + 0.3656j) | (0.2771 + 0.1258j) | (0.5805 − 0.946j) |
| 853 | (1.2154 + 0.4249j) | (0.2771 − 0.1258j) | (0.5805 − 0.8449j) |
| 854 | (−1.0295 + 0.3802j) | (−0.2771 + 0.1258j) | (0.5805 − 1.331j) |
| 855 | (−1.3075 + 0.4757j) | (−0.2771 − 0.1258j) | (0.5805 − 0.5804j) |
| 856 | (1.006 + 0.0523j) | (0.2763 + 0.2225j) | (0.5805 + 0.8462j) |
| 857 | (1.39 + 0.0615j) | (0.2763 − 0.2225j) | (0.5805 − 0.2242j) |
| 858 | (−1.0152 + 0.0528j) | (−0.2763 + 0.2225j) | (0.5805 + 0.5805j) |
| 859 | (−1.5125 + 0.0817j) | (−0.2763 − 0.2225j) | (0.5805 − 0.0332j) |
| 860 | (0.9507 + 0.3372j) | (0.3242 + 0.1645j) | (0.5805 + 0.2916j) |
| 861 | (1.3152 + 0.454j) | (0.3242 − 0.1645j) | (0.5805 + 0.2239j) |
| 862 | (−0.9467 + 0.3511j) | (−0.3242 + 0.1645j) | (0.5805 + 0.5035j) |
| 863 | (−1.4226 + 0.5201j) | (−0.3242 − 0.1645j) | (0.5805 + 0.0328j) |
| 864 | (1.0752 − 0.1571j) | (0.4086 + 0.3619j) | (−0.0332 + 1.0626j) |
| 865 | (1.2735 − 0.1898j) | (0.4086 − 0.3619j) | (−0.0332 − 0.3591j) |
| 866 | (−1.0862 − 0.1623j) | (−0.4086 + 0.3619j) | (−0.0332 + 1.1878j) |
| 867 | (−1.3769 − 0.1999j) | (−0.4086 − 0.3619j) | (−0.0332 − 0.4301j) |
| 868 | (1.0539 − 0.2656j) | (0.4865 + 0.2669j) | (−0.0332 − 1.058j) |
| 869 | (1.2487 − 0.3136j) | (0.4865 − 0.2669j) | (−0.0332 − 0.7494j) |
| 870 | (−1.0604 − 0.2658j) | (−0.4865 + 0.2669j) | (−0.0332 − 1.1847j) |
| 871 | (−1.3511 − 0.3321j) | (−0.4865 − 0.2669j) | (−0.0332 − 0.6628j) |
| 872 | (0.988 − 0.1488j) | (0.4504 + 0.3557j) | (−0.0332 + 0.7523j) |
| 873 | (1.3763 − 0.2037j) | (0.4504 − 0.3557j) | (−0.0332 − 0.1607j) |

-continued

| Mapping | NN_QSL | NN_QSC | NN_RSC |
|---|---|---|---|
| 874 | (−1.0072 − 0.1479j) | (−0.4504 + 0.3557j) | (−0.0332 + 0.6629j) |
| 875 | (−1.4996 − 0.2134j) | (−0.4504 − 0.3557j) | (−0.0332 − 0.0944j) |
| 876 | (0.9724 − 0.247j) | (0.4847 + 0.3094j) | (−0.0332 + 0.3594j) |
| 877 | (1.3498 − 0.3374j) | (0.4847 − 0.3094j) | (−0.0332 + 0.1597j) |
| 878 | (−0.9882 − 0.2467j) | (−0.4847 + 0.3094j) | (−0.0332 + 0.4297j) |
| 879 | (−1.4708 − 0.3622j) | (−0.4847 − 0.3094j) | (−0.0332 + 0.0937j) |
| 880 | (1.089 − 0.0592j) | (0.363 + 0.3068j) | (−0.0332 + 0.9504j) |
| 881 | (1.2859 − 0.0654j) | (0.363 − 0.3068j) | (−0.0332 − 0.2918j) |
| 882 | (−1.093 − 0.0536j) | (−0.363 + 0.3068j) | (−0.0332 + 1.3347j) |
| 883 | (−1.3899 − 0.0633j) | (−0.363 − 0.3068j) | (−0.0332 − 0.503j) |
| 884 | (1.0253 − 0.3732j) | (0.4129 + 0.2445j) | (−0.0332 − 0.946j) |
| 885 | (1.2132 − 0.4312j) | (0.4129 − 0.2445j) | (−0.0332 − 0.8449j) |
| 886 | (−1.0408 − 0.3706j) | (−0.4129 + 0.2445j) | (−0.0332 − 1.331j) |
| 887 | (−1.3113 − 0.4649j) | (−0.4129 − 0.2445j) | (−0.0332 − 0.5804j) |
| 888 | (1.0092 − 0.0483j) | (0.3205 + 0.2657j) | (−0.0332 + 0.8462j) |
| 889 | (1.3895 − 0.0711j) | (0.3205 − 0.2657j) | (−0.0332 − 0.2242j) |
| 890 | (−1.0172 − 0.0485j) | (−0.3205 + 0.2657j) | (−0.0332 + 0.5805j) |
| 891 | (−1.5133 − 0.0646j) | (−0.3205 − 0.2657j) | (−0.0332 − 0.0332j) |
| 892 | (0.9458 − 0.3399j) | (0.3674 + 0.2122j) | (−0.0332 + 0.2916j) |
| 893 | (1.3103 − 0.4677j) | (0.3674 − 0.2122j) | (−0.0332 + 0.2239j) |
| 894 | (−0.9545 − 0.3424j) | (−0.3674 + 0.2122j) | (−0.0332 + 0.5035j) |
| 895 | (−1.4303 − 0.4985j) | (−0.3674 − 0.2122j) | (−0.0332 + 0.0328j) |
| 896 | (0.6532 + 0.8818j) | (0.8022 + 0.8857j) | (0.2916 + 1.0626j) |
| 897 | (0.7689 + 1.0327j) | (0.8022 − 0.8857j) | (0.2916 − 0.3591j) |
| 898 | (−0.6455 + 0.8871j) | (−0.8022 + 0.8857j) | (0.2916 + 1.1878j) |
| 899 | (−0.8234 + 1.1215j) | (−0.8022 − 0.8857j) | (0.2916 − 0.4301j) |
| 900 | (0.5646 + 0.9425j) | (0.506 + 1.0783j) | (0.2916 − 1.058j) |
| 901 | (0.6666 + 1.1015j) | (0.506 − 1.0783j) | (0.2916 − 0.7494j) |
| 902 | (−0.5563 + 0.9462j) | (−0.506 + 1.0783j) | (0.2916 − 1.1847j) |
| 903 | (−0.7067 + 1.1985j) | (−0.506 − 1.0783j) | (0.2916 − 0.6628j) |
| 904 | (0.6029 + 0.8146j) | (0.7104 + 0.9607j) | (0.2916 + 0.7523j) |
| 905 | (0.9883 + 1.3235j) | (0.7104 − 0.9607j) | (0.2916 − 0.1607j) |
| 906 | (−0.5945 + 0.8251j) | (−0.7104 + 0.9607j) | (0.2916 + 0.6629j) |
| 907 | (−0.8944 + 1.2224j) | (−0.7104 − 0.9607j) | (0.2916 − 0.0944j) |
| 908 | (0.5233 + 0.8676j) | (0.6108 + 1.0246j) | (0.2916 + 0.3594j) |
| 909 | (0.8662 + 1.4065j) | (0.6108 − 1.0246j) | (0.2916 + 0.1597j) |
| 910 | (−0.5133 + 0.8727j) | (−0.6108 + 1.0246j) | (0.2916 + 0.4297j) |
| 911 | (−0.7718 + 1.3033j) | (−0.6108 − 1.0246j) | (0.2916 + 0.0937j) |
| 912 | (0.7297 + 0.8077j) | (0.7434 + 0.8215j) | (0.2916 + 0.9504j) |
| 913 | (0.8724 + 0.9469j) | (0.7434 − 0.8215j) | (0.2916 − 0.2918j) |
| 914 | (−0.729 + 0.8128j) | (−0.7434 + 0.8215j) | (0.2916 + 1.3347j) |
| 915 | (−0.929 + 1.0357j) | (−0.7434 − 0.8215j) | (0.2916 − 0.503j) |
| 916 | (0.4763 + 0.9931j) | (0.4684 + 0.9992j) | (0.2916 − 0.946j) |
| 917 | (0.5541 + 1.1622j) | (0.4684 − 0.9992j) | (0.2916 − 0.8449j) |
| 918 | (−0.4616 + 0.9907j) | (−0.4684 + 0.9992j) | (0.2916 − 1.331j) |
| 919 | (−0.5872 + 1.2613j) | (−0.4684 − 0.9992j) | (0.2916 − 0.5804j) |
| 920 | (0.6768 + 0.7481j) | (0.6577 + 0.8905j) | (0.2916 + 0.8462j) |
| 921 | (1.1181 + 1.2159j) | (0.6577 − 0.8905j) | (0.2916 − 0.2242j) |
| 922 | (−0.6755 + 0.7585j) | (−0.6577 + 0.8905j) | (0.2916 + 0.5805j) |
| 923 | (−1.0129 + 1.1262j) | (−0.6577 − 0.8905j) | (0.2916 − 0.0332j) |
| 924 | (0.4387 + 0.9208j) | (0.5657 + 0.9496j) | (0.2916 + 0.2916j) |
| 925 | (0.7372 + 1.4782j) | (0.5657 − 0.9496j) | (0.2916 + 0.2239j) |
| 926 | (−0.4289 + 0.9212j) | (−0.5657 + 0.9496j) | (0.2916 + 0.5035j) |
| 927 | (−0.6488 + 1.3687j) | (−0.5657 − 0.9496j) | (0.2916 + 0.0328j) |
| 928 | (0.6479 − 0.882j) | (0.8652 + 0.9554j) | (0.2239 + 1.0626j) |
| 929 | (0.7639 − 1.0364j) | (0.8652 − 0.9554j) | (0.2239 − 0.3591j) |
| 930 | (−0.6553 − 0.8759j) | (−0.8652 + 0.9554j) | (0.2239 + 1.1878j) |
| 931 | (−0.8344 − 1.1133j) | (−0.8652 − 0.9554j) | (0.2239 − 0.4301j) |
| 932 | (0.5559 − 0.9472j) | (0.5472 + 1.1638j) | (0.2239 − 1.058j) |
| 933 | (0.6621 − 1.1042j) | (0.5472 − 1.1638j) | (0.2239 − 0.7494j) |
| 934 | (−0.5669 − 0.9389j) | (−0.5472 + 1.1638j) | (0.2239 − 1.1847j) |
| 935 | (−0.7239 − 1.1881j) | (−0.5472 − 1.1638j) | (0.2239 − 0.6628j) |
| 936 | (0.5907 − 0.8185j) | (0.7666 + 1.0364j) | (0.2239 + 0.7523j) |
| 937 | (0.9877 − 1.324j) | (0.7666 − 1.0364j) | (0.2239 − 0.1607j) |
| 938 | (−0.6059 − 0.8127j) | (−0.7666 + 1.0364j) | (0.2239 + 0.6629j) |
| 939 | (−0.9008 − 1.2178j) | (−0.7666 − 1.0364j) | (0.2239 − 0.0944j) |
| 940 | (0.5129 − 0.8711j) | (0.6592 + 1.1052j) | (0.2239 + 0.3594j) |
| 941 | (0.8612 − 1.4095j) | (0.6592 − 1.1052j) | (0.2239 + 0.1597j) |
| 942 | (−0.5256 − 0.8663j) | (−0.6592 + 1.1052j) | (0.2239 + 0.4297j) |
| 943 | (−0.7915 − 1.2915j) | (−0.6592 − 1.1052j) | (0.2239 + 0.0937j) |
| 944 | (0.7269 − 0.8184j) | (0.9339 + 1.0315j) | (0.2239 + 0.9504j) |
| 945 | (0.8653 − 0.9534j) | (0.9339 − 1.0315j) | (0.2239 − 0.2918j) |
| 946 | (−0.7372 − 0.807j) | (−0.9339 + 1.0315j) | (0.2239 + 1.3347j) |
| 947 | (−0.9334 − 1.0318j) | (−0.9339 − 1.0315j) | (0.2239 − 0.503j) |
| 948 | (0.4592 − 0.9935j) | (0.5914 + 1.2566j) | (0.2239 − 0.946j) |
| 949 | (0.5837 − 1.263j) | (0.5914 − 1.2566j) | (0.2239 − 0.8449j) |
| 950 | (−0.4801 − 0.9887j) | (−0.5914 + 1.2566j) | (0.2239 − 1.331j) |

-continued

| Mapping | NN_QSL | NN_QSC | NN_RSC |
| --- | --- | --- | --- |
| 951 | (−0.6002 − 1.2552j) | (−0.5914 − 1.2566j) | (0.2239 − 0.5804j) |
| 952 | (0.6671 − 0.7639j) | (0.8275 + 1.1188j) | (0.2239 + 0.8462j) |
| 953 | (1.1142 − 1.2194j) | (0.8275 − 1.1188j) | (0.2239 − 0.2242j) |
| 954 | (−0.6836 − 0.744j) | (−0.8275 + 1.1188j) | (0.2239 + 0.5805j) |
| 955 | (−1.0229 − 1.1172j) | (−0.8275 − 1.1188j) | (0.2239 − 0.0332j) |
| 956 | (0.4203 − 0.9175j) | (0.7127 + 1.193j) | (0.2239 + 0.2916j) |
| 957 | (0.7214 − 1.4859j) | (0.7127 − 1.193j) | (0.2239 + 0.2239j) |
| 958 | (−0.4409 − 0.9147j) | (−0.7127 + 1.193j) | (0.2239 + 0.5035j) |
| 959 | (−0.6634 − 1.3617j) | (−0.7127 − 1.193j) | (0.2239 + 0.0328j) |
| 960 | (0.8769 + 0.647j) | (0.8858 + 0.8019j) | (0.5035 + 1.0626j) |
| 961 | (1.0411 + 0.7574j) | (0.8858 − 0.8019j) | (0.5035 − 0.3591j) |
| 962 | (−0.8744 + 0.6624j) | (−0.8858 + 0.8019j) | (0.5035 + 1.1878j) |
| 963 | (−1.1172 + 0.8293j) | (−0.8858 − 0.8019j) | (0.5035 − 0.4301j) |
| 964 | (0.9383 + 0.5578j) | (1.0787 + 0.5061j) | (0.5035 − 1.058j) |
| 965 | (1.1115 + 0.6498j) | (1.0787 − 0.5061j) | (0.5035 − 0.7494j) |
| 966 | (−0.9375 + 0.5721j) | (−1.0787 + 0.5061j) | (0.5035 − 1.1847j) |
| 967 | (−1.1891 + 0.7224j) | (−1.0787 − 0.5061j) | (0.5035 − 0.6628j) |
| 968 | (0.814 + 0.5948j) | (0.9607 + 0.7095j) | (0.5035 + 0.7523j) |
| 969 | (1.1276 + 0.8151j) | (0.9607 − 0.7095j) | (0.5035 − 0.1607j) |
| 970 | (−0.8049 + 0.6104j) | (−0.9607 + 0.7095j) | (0.5035 + 0.6629j) |
| 971 | (−1.2139 + 0.906j) | (−0.9607 − 0.7095j) | (0.5035 − 0.0944j) |
| 972 | (0.8693 + 0.5177j) | (1.025 + 0.6104j) | (0.5035 + 0.3594j) |
| 973 | (1.2028 + 0.6993j) | (1.025 − 0.6104j) | (0.5035 + 0.1597j) |
| 974 | (−0.8649 + 0.528j) | (−1.025 + 0.6104j) | (0.5035 + 0.4297j) |
| 975 | (−1.2958 + 0.7845j) | (−1.025 − 0.6104j) | (0.5035 + 0.0937j) |
| 976 | (0.8089 + 0.7301j) | (0.8214 + 0.7431j) | (0.5035 + 0.9504j) |
| 977 | (0.9582 + 0.86j) | (0.8214 − 0.7431j) | (0.5035 − 0.2918j) |
| 978 | (−0.8061 + 0.7389j) | (−0.8214 + 0.7431j) | (0.5035 + 1.3347j) |
| 979 | (−1.0319 + 0.9333j) | (−0.8214 − 0.7431j) | (0.5035 − 0.503j) |
| 980 | (0.9923 + 0.4623j) | (0.9992 + 0.4681j) | (0.5035 − 0.946j) |
| 981 | (1.1683 + 0.541j) | (0.9992 − 0.4681j) | (0.5035 − 0.8449j) |
| 982 | (−0.9856 + 0.4757j) | (−0.9992 + 0.4681j) | (0.5035 − 1.331j) |
| 983 | (−1.2561 + 0.5982j) | (−0.9992 − 0.4681j) | (0.5035 − 0.5804j) |
| 984 | (0.7466 + 0.6777j) | (0.8906 + 0.6574j) | (0.5035 + 0.8462j) |
| 985 | (1.0453 + 0.9182j) | (0.8906 − 0.6574j) | (0.5035 − 0.2242j) |
| 986 | (−0.7472 + 0.6886j) | (−0.8906 + 0.6574j) | (0.5035 + 0.5805j) |
| 987 | (−1.1228 + 1.0167j) | (−0.8906 − 0.6574j) | (0.5035 − 0.0332j) |
| 988 | (0.9147 + 0.4298j) | (0.9499 + 0.5651j) | (0.5035 + 0.2916j) |
| 989 | (1.2633 + 0.5829j) | (0.9499 − 0.5651j) | (0.5035 + 0.2239j) |
| 990 | (−0.9119 + 0.4417j) | (−0.9499 + 0.5651j) | (0.5035 + 0.5035j) |
| 991 | (−1.3666 + 0.6533j) | (−0.9499 − 0.5651j) | (0.5035 + 0.0328j) |
| 992 | (0.8655 − 0.653j) | (0.9556 + 0.8647j) | (0.0328 + 1.0626j) |
| 993 | (1.0331 − 0.7683j) | (0.9556 − 0.8647j) | (0.0328 − 0.3591j) |
| 994 | (−0.8785 − 0.6522j) | (−0.9556 + 0.8647j) | (0.0328 + 1.1878j) |
| 995 | (−1.1227 − 0.8217j) | (−0.9556 − 0.8647j) | (0.0328 − 0.4301j) |
| 996 | (0.9319 − 0.5627j) | (1.1638 + 0.5473j) | (0.0328 − 1.058j) |
| 997 | (1.1045 − 0.6616j) | (1.1638 − 0.5473j) | (0.0328 − 0.7494j) |
| 998 | (−0.938 − 0.5631j) | (−1.1638 + 0.5473j) | (0.0328 − 1.1847j) |
| 999 | (−1.1945 − 0.7134j) | (−1.1638 − 0.5473j) | (0.0328 − 0.6628j) |
| 1000 | (0.8033 − 0.6019j) | (1.0357 + 0.7657j) | (0.0328 + 0.7523j) |
| 1001 | (1.1238 − 0.8203j) | (1.0357 − 0.7657j) | (0.0328 − 0.1607j) |
| 1002 | (−0.8138 − 0.6023j) | (−1.0357 + 0.7657j) | (0.0328 + 0.6629j) |
| 1003 | (−1.2205 − 0.8971j) | (−1.0357 − 0.7657j) | (0.0328 − 0.0944j) |
| 1004 | (0.8538 − 0.5249j) | (1.1055 + 0.6592j) | (0.0328 + 0.3594j) |
| 1005 | (1.1972 − 0.7089j) | (1.1055 − 0.6592j) | (0.0328 + 0.1597j) |
| 1006 | (−0.8684 − 0.5228j) | (−1.1055 + 0.6592j) | (0.0328 + 0.4297j) |
| 1007 | (−1.3042 − 0.7704j) | (−1.1055 − 0.6592j) | (0.0328 + 0.0937j) |
| 1008 | (0.8025 − 0.7331j) | (1.0309 + 0.9337j) | (0.0328 + 0.9504j) |
| 1009 | (0.9536 − 0.865j) | (1.0309 − 0.9337j) | (0.0328 − 0.2918j) |
| 1010 | (−0.8166 − 0.7338j) | (−1.0309 + 0.9337j) | (0.0328 + 1.3347j) |
| 1011 | (−1.0327 − 0.9324j) | (−1.0309 − 0.9337j) | (0.0328 − 0.503j) |
| 1012 | (0.9794 − 0.4689j) | (1.2567 + 0.5915j) | (0.0328 − 0.946j) |
| 1013 | (1.1627 − 0.5531j) | (1.2567 − 0.5915j) | (0.0328 − 0.8449j) |
| 1014 | (−0.9855 − 0.4624j) | (−1.2567 + 0.5915j) | (0.0328 − 1.331j) |
| 1015 | (−1.2569 − 0.5967j) | (−1.2567 − 0.5915j) | (0.0328 − 0.5804j) |
| 1016 | (0.7398 − 0.6807j) | (1.1183 + 0.8269j) | (0.0328 + 0.8462j) |
| 1017 | (1.0371 − 0.9274j) | (1.1183 − 0.8269j) | (0.0328 − 0.2242j) |
| 1018 | (−0.7514 − 0.6796j) | (−1.1183 + 0.8269j) | (0.0328 + 0.5805j) |
| 1019 | (−1.1271 − 1.0119j) | (−1.1183 − 0.8269j) | (0.0328 − 0.0332j) |
| 1020 | (0.905 − 0.437j) | (1.193 + 0.7123j) | (0.0328 + 0.2916j) |
| 1021 | (1.259 − 0.5921j) | (1.193 − 0.7123j) | (0.0328 + 0.2239j) |
| 1022 | (−0.9134 − 0.4372j) | (−1.193 + 0.7123j) | (0.0328 + 0.5035j) |
| 1023 | (−1.3709 − 0.6442j) | (−1.193 − 0.7123j) | (0.0328 + 0.0328j). |

\* \* \* \* \*